US008313814B2

(12) United States Patent
Haruta et al.

(10) Patent No.: US 8,313,814 B2
(45) Date of Patent: Nov. 20, 2012

(54) CELLULOSE ACYLATE FILM, METHOD OF PRODUCING THE SAME, CELLULOSE DERIVATIVE FILM, OPTICALLY COMPENSATORY FILM USING THE SAME, OPTICALLY-COMPENSATORY FILM INCORPORATING POLARIZING PLATE, POLARIZING PLATE AND LIQUID CRYSTAL DISPLAY DEVICE

(75) Inventors: Hiromoto Haruta, Minami-Ashigara (JP); Osamu Takahashi, Haibara-gun (JP); Yutaka Nozoe, Minami-Ashigara (JP); Nobutaka Fukagawa, Minami-Ashigara (JP); Mitsuyoshi Ichihashi, Minami-Ashigara (JP); Hiroaki Sata, Minami-Ashigara (JP); Tadashi Omatsu, Minami-Ashigara (JP); Masaki Okazaki, Minami-Ashigara (JP)

(73) Assignee: FUJIFILM Corporation, Minato-Ku, Tokyo (JP)

( * ) Notice: Subject to any disclaimer, the term of this patent is extended or adjusted under 35 U.S.C. 154(b) by 1176 days.

(21) Appl. No.: 12/085,457

(22) PCT Filed: Nov. 24, 2006

(86) PCT No.: PCT/JP2006/324046

§ 371 (c)(1), (2), (4) Date: May 23, 2008

(87) PCT Pub. No.: WO2007/061139

PCT Pub. Date: May 31, 2007

(65) Prior Publication Data

US 2009/0290100 A1 Nov. 26, 2009

(30) Foreign Application Priority Data

| | | | |
|---|---|---|---|
| Nov. 25, 2005 | (JP) | ................................ | 2005-340910 |
| Dec. 22, 2005 | (JP) | ................................ | 2005-370901 |
| Mar. 23, 2006 | (JP) | ................................ | 2006-081018 |
| Sep. 28, 2006 | (JP) | ................................ | 2006-265003 |
| Sep. 28, 2006 | (JP) | ................................ | 2006-265937 |

(51) Int. Cl.
*C09K 19/00* (2006.01)
*G02F 1/1335* (2006.01)

(52) U.S. Cl. .......... 428/1.1; 428/212; 349/119; 349/117

(58) Field of Classification Search .................. 428/1.1, 428/212

See application file for complete search history.

(56) References Cited

U.S. PATENT DOCUMENTS

| | | | | |
|---|---|---|---|---|
| 2003/0086033 | A1* | 5/2003 | Sasaki et al. | 349/96 |
| 2005/0024561 | A1* | 2/2005 | Elman et al. | 349/117 |
| 2005/0163923 | A1* | 7/2005 | Sasada | 427/160 |
| 2005/0243245 | A1* | 11/2005 | Taguchi et al. | 349/96 |

FOREIGN PATENT DOCUMENTS

| | | | |
|---|---|---|---|
| JP | 9-80424 | A | 3/1997 |
| JP | 9-292522 | A | 11/1997 |
| JP | 10-54982 | A | 2/1998 |
| JP | 10-307291 | A | 11/1998 |
| JP | 11-133408 | A | 5/1999 |
| JP | 11-202323 | A | 7/1999 |
| JP | 11-305217 | A | 11/1999 |
| JP | 2002-241512 | A | 8/2002 |
| JP | 2002-322201 | | 11/2002 |
| JP | 2004-137358 | | 5/2004 |
| JP | 2005-99191 | A | 4/2005 |
| JP | 2005-120352 | A | 5/2005 |
| JP | 2005-138375 | A | 6/2005 |
| JP | 2005-154764 | A | 6/2005 |
| JP | 2005-321528 | A | 11/2005 |
| JP | 4637698 | | 12/2010 |

OTHER PUBLICATIONS

PCT/ISA/210.
PCT/ISA/237.
PCT/ISA/206.
Office Action (Notice of Reasons for Refusal) issued by the Japanese Patent Office issued in corresponding Japanese Patent Application No. 2006-265937 dated Oct. 11, 2011, with an English translation thereof.
Office Action (Notification of Reasons for Refusal) issued by the Japanese Patent Office issued in corresponding Japanese Patent Application No. 2006-265003 dated Jul. 24, 2012, with an English translation thereof.

* cited by examiner

*Primary Examiner* — Ling Choi
*Assistant Examiner* — Gennadiy Mesh
(74) *Attorney, Agent, or Firm* — Buchanan Ingersoll & Rooney PC

(57) ABSTRACT

A method of producing a cellulose derivative film, the method comprising: forming a film with a solvent cast method from a dope including a cellulose derivative satisfying following conditions (a) and (b): (a) at least one among three hydroxyl groups included in a glucose unit of cellulose is substituted by a substituent of which a polarizability anisotropy $\Delta\alpha$ represented as following Expression (1) is $2.5\times10^{-24}$ $cm^3$ or higher: Expression (1): $\Delta\alpha=\alpha x-(\alpha y+\alpha z)/2$, wherein $\alpha x$, $\alpha y$ and $\alpha z$ is as defined in the specification; and (b) when a substitution degree by a substituent of which $\Delta\alpha$ is $2.5\times10^{-24}$ $cm^3$ or higher is $P_A$, and a substitution degree by a substituent of which $\Delta\alpha$ is lower than $2.5\times10^{-24}$ $cm^3$ is $P_B$, the $P_A$ and $P_B$ satisfy following Expressions (3) and (4): Expression (3): $2P_A+P_B>3.0$; and Expression (4): $P_A>0.2$.

5 Claims, 4 Drawing Sheets

CELLULOSE ACYLATE FILM, METHOD OF PRODUCING THE SAME, CELLULOSE DERIVATIVE FILM, OPTICALLY COMPENSATORY FILM USING THE SAME, OPTICALLY-COMPENSATORY FILM INCORPORATING POLARIZING PLATE, POLARIZING PLATE AND LIQUID CRYSTAL DISPLAY DEVICE

TECHNICAL FIELD

The first invention relates to a cellulose acylate film in which a negative retardation in a thickness direction is controlled in a wide range and defects in the film caused by environmental changes are not generated, a method of producing the same, and a polarizing plate and a liquid crystal display device which use the cellulose acylate film, exhibit high contrast and can maintain an excellent visibility even in prolonged use.

The second present invention relates to a cellulose derivative film useful for liquid crystal display devices, and optical materials such as optically compensatory films, polarizing plates and the like, and liquid crystal display devices using the cellulose derivative film.

The third present invention relates to a liquid crystal display device, particularly to a so-called in-plane-switching (IPS) mode or a fringe-field (FFS) mode liquid crystal display device which displays by applying the general crosswise electric field to liquid-crystal molecules aligned homogeneously. The present invention also relates to an optically-compensatory film incorporating a polarizing plate which contributes to an optical compensation for a liquid crystal display device, particularly for an in-plane-switching (IPS) mode or a fringe-field (FFS) mode liquid crystal display device.

BACKGROUND ART

The liquid crystal display device is used as an image display device of small space-saving and of low power consumption, and a field of application thereof is widened year by year, and mainly TN mode is used widely. In this mode, since the liquid crystal rises up against the substrate at the black display, birefringence due to such the liquid-crystal molecules generates when being observed in an oblique direction, and light leakage occurs. For this problem, liquid-crystal cells are optically compensated by using a film formed of hybrid-aligned liquid-crystal molecules, and such mode for preventing the light leakage is put to practical use. However, it is extremely difficult to optically compensate liquid-crystal cells perfectly without causing problems even if liquid-crystal molecules are used, and problem arises in that contrast inversions generating at under areas of images cannot be avoided.

In order to solve the problem, a liquid crystal display device employing so-called in-plane switching (IPS) mode, in which the crosswise fields are applied to liquid crystal, or vertically aligned (VA) mode of vertically aligning the liquid crystal having a negative dielectric anisotropy and dividing the alignment by a protrusion formed in the panel or by a slit electrode, have been proposed and put into practical use. According to theses modes, demands for the liquid crystal display device which exhibit high brightness are rapidly increasing even in the market where a high quality image such as television is required.

Accordingly, small light leakage generating at opposing corners in an oblique incident direction at the black display, which has been heretofore not a problem, has elicited as a cause of lowering displaying-quality. Additionally, further improvements on optical compensation properties that exhibit high contrast and decrease changes in phase difference have been demanded for the optically-compensatory film.

As one of means to improve this color tone or viewing angle of black display, it has been also studied to dispose an optical compensatory material having birefringence between the liquid-crystal layer and the polarizing plate in an IPS mode.

A birefringent medium, in which the optical axes having activity of compensating for the increase or decrease in the retardation of the liquid crystal layer at the inclination are orthogonal to each other, disposed between the substrate and the polarizing plate so as to improve the color when a white or halftone display is directly viewed from the oblique direction, has been disclosed (See Japanese Unexamined Patent Application Publication No. 9-80424). In addition, there is proposed a method of using an optically-compensatory film comprising a styrene-based polymer or discotic liquid-crystal compound having a negative intrinsic birefringence (See Japanese Unexamined Patent Application Publication No. 10-54982, Japanese Unexamined Patent Application Publication No. 11-202323 and Japanese Unexamined Patent Application Publication No. 9-292522), a method of laminating a film in which the birefringence is positive and optical axes are inside the film, and a film in which the birefringence is positive and its optical axis is in a direction normal to the film, as an optically-compensatory film (See Japanese Unexamined Patent Application Publication No. 11-133408), a method of using a biaxial optical compensation sheet of which the retardation is half the wavelength (See Japanese Unexamined Patent Application Publication No. 11-305217), and a method of employing a film which has negative retardation as a protective film for a polarizing plate and providing an optical compensation layer which has positive retardation to a surface of the film (See Japanese Unexamined Patent Application Publication No. 10-307291).

Recently, there has been proposed an optically-compensatory film having a high retardation value which can be used in applications requiring optical anisotropic properties by using a cellulose acylate film. Since many of such films have high stretching magnification and a retardation regulator, the retardation can be controlled in a wide range. As a cellulose acylate film in which an optical axis is in a normal direction of the film, there has been proposed a method of cooling cellulose acylate which has low acyl substitution degree (See Japanese Unexamined Patent Application Publication No. 2005-120352).

In addition, as a means for optical compensation, an optically compensatory film having a negative retardation in the film thickness direction (Rth), in particular, a cellulose ester film which can be used as a protective film for polarizing plates, is being demanded.

In this regard, for example, JP-A No. 2005-120352 suggests a technology of preparing a cellulose acylate film having a negative Rth, by adequately selecting the conditions for preparation, such as the degree of substitution in cellulose acetate, dissolving method, and the like. Furthermore, JP-A No. 2005-99191 suggests a technology of reducing the retardation using compounds having a specific structure.

DISCLOSURE OF THE INVENTION

However, since many of the proposed methods are methods to improve viewing angles by counteracting the anisotropy of birefringence of liquid crystal in the liquid-crystal cell, even in the method known as to compensate this light leakage, it is extremely difficult to perfectly optically compensate for the liquid-crystal cell without causing problems. In an optical compensatory sheet for an IPS mode liquid-crystal cell, in which a stretched-birefringent polymer film is used for optical compensation, it is difficult to control in a wider range a negative retardation in a thickness-direction and plural films are necessarily used. As a result, the optical compensatory sheet increases in thickness, and thus is disadvantageous for thinning of display device. In addition, since an adhesive layer is used in the laminating layer of a stretched film, the adhesive layer shrinks depending on variation of temperature or humidity, and thus, defects such as peel or warpage of the films sometimes occurred.

The first present invention is contrived to solve the above-mentioned problem. An object of the invention is to provide a cellulose derivative film in which defects in the film caused by environmental changes are not generated since a negative retardation in a thickness-direction can be controlled in a wide range, a method of producing the same, and a polarizing plate and a liquid crystal display device which use the cellulose film, exhibit high contrast, and can maintain an excellent visibility even in a prolonged use.

The first present invention is as follows.

[1] A method of producing a cellulose derivative film, the method comprising:

forming a film with a solvent cast method from a dope including a cellulose derivative satisfying following conditions (a) and (b):

(a) at least one hydroxyl group of the cellulose derivative is substituted by a substituent of which a polarizability anisotropy $\Delta\alpha$ represented as following Expression (1) is $2.5\times10^{-24}$ $cm^3$ or higher:

$$\Delta\alpha=\alpha x-(\alpha y+\alpha z)/2, \quad \text{Expression (1)}$$

wherein $\alpha x$ is the largest component among characteristic values obtained after diagonalization of polarizability tensor;

$\alpha y$ is the second largest component among characteristic values obtained after diagonalization of polarizability tensor; and $\alpha z$ is the smallest component among characteristic values obtained after diagonalization of polarizability tensor; and (b) when a substitution degree by a substituent of which $\Delta\alpha$ is $2.5\times10^{-24}$ $cm^3$ or higher is $P_A$, and a substitution degree by a substituent of which $\Delta\alpha$ is lower than $2.5\times10^{-24}$ $cm^3$ is $P_B$, the $P_A$ and $P_B$ satisfy following Expressions (3) and (4):

$$2P_A+P_B>3.0; \text{ and} \quad \text{Expression (3)}$$

$$P_A>0.2. \quad \text{Expression (4)}$$

[2] The method as described in [1] above, which further comprises:

subjecting the film to a stretching treatment after forming the film.

[3] The method as described in [1] or [2] above, wherein the substituent of which $\Delta\alpha$ is $2.5\times10^{-24}$ $Cm^3$ or higher is an aromatic acyl group and the substituent of which $\Delta\alpha$ is lower than $2.5\times10^{-24}$ $cm^3$ is an aliphatic acyl group.

[4] The method as described in [3] above, wherein the aliphatic acyl group is selected from acetyl group, propionyl group and butyryl group, and a substituent in the aromatic ring of the aromatic acyl group is selected from halogen atom, cyano, alkyl group having 1 to 20 carbon atom(s), alkoxy group having 1 to 20 carbon atom(s), aryl group having 6 to 20 carbon atom(s), aryloxy group having 6 to 20 carbon atom(s), acyl group having 1 to 20 carbon atom(s), carbonamide group having 1 to 20 carbon atom(s), sulfonamide group having 1 to 20 carbon atom(s), and ureide group having 1 to 20 carbon atom(s).

[5] The method as described in any of [1] to [4] above, wherein the dope includes at least one retardation regulator.

[6] The method as described in [5] above, wherein the at least one retardation regulator is a compound represented as following formula (1-1):

$$Ar^1-L^1\left(Ar^2-L^2\right)_n Ar^3 \quad \text{Formula (1-1)}$$

where $Ar^1$, $Ar^2$ and $Ar^3$ each independently represents an aryl group or an aromatic heterocycle;

$L^1$ and $L^2$ each independently represents a single bond or a divalent linking group;

n is an integer of 3 or more; and a plurality of $Ar^2$'s and a plurality of $L^2$'s are equal to or different from each other, respectively.

[7] A cellulose derivative film produced by a method as described in any of [1] to [6] above.

[8] The cellulose derivative film as described in [7] above, which satisfies retardations of following Expressions (A) and (B);

$$20\text{ nm}<|Re(630)|<300\text{ nm} \quad \text{(A); and}$$

$$-30\text{ nm}>Rth(630)>-400\text{ nm} \quad \text{(B)}$$

wherein Re(630) is a retardation in an in-plane-direction of the film at a wavelength of 630 nm; and Rth (630) is a retardation in a thickness direction of the film at a wavelength of 630 nm.

[9] The cellulose derivative film as described in [7] or [8] above, which further comprises an optically anisotropic layer satisfying retardations of following Expressions (C) and (D):

$$0\text{ nm}<Re(546)<200\text{ nm} \quad \text{(C)}$$

$$0\text{ nm}<|Rth(546)|<300\text{ nm} \quad \text{(D)}$$

wherein Re(546) is a retardation in an in-plane direction of the film at a wavelength of 546 nm; and Rth (546) is a retardation in a thickness direction of the film at a wavelength of 546 nm.

[10] The cellulose derivative film as described in [9] above, wherein the optically anisotropic layer comprises a discotic liquid crystal layer.

[11] The cellulose derivative film as described in [9] above, wherein the optically anisotropic layer comprises a rod-like liquid crystal layer.

[12] A polarizing plate, which comprises:

a polarizer; and at least one protective film for the polarizer, wherein at least one of the at least one protective film is a cellulose derivative film as described in any of [7] to [11] above.

[13] The polarizing plate as described in [12] above, which further comprises at least one of a hard coating layer, a glare-proof layer and an antireflection layer.

[14] A liquid crystal display device, which comprises a cellulose derivative film as described in any of [7] to [13] above or a polarizing plate as described in any of [12] or [13] above.

[15] The liquid crystal display device as described in [14] above, which is an IPS mode liquid crystal display device.

The technology of JP-A No. 2005-120352 has problems such as that the resulting film has a high equilibrium moisture content, and that when polarizing plates using the resulting film as the protective film are used under high temperature and high humidity, the polarization performance is deteriorated, thus improvement being desired.

On the other hand, the technology described in JP-A No. 2005-99191 suggests a method of reducing the retardations, that is, Re and Rth, of a cellulose acylate film by using specific cellulose acetate compounds having aromatic rings but having low planarity. However, even though the suggested method was used, there was a limit in the Rth reducing effect, thus Rth not having a sufficiently negative value, and that since the compounds described in the aforementioned document, which are used in combination, need to be used in large quantities, there were problems such as bleeding at the surface of the film comprising the compounds during the preparation, and deteriorated handlability due to lowered elastic modulus.

It is an object of the second present invention to provide a cellulose derivative film having a negative Rth, which can be used as an element for optical compensation in various display modes, and also to provide a cellulose derivative film for producing a polarizing plate having excellent durability under high temperature and high humidity conditions.

It is another object of the second invention to provide an optically compensatory film or polarizing plate using the cellulose derivative film, which has excellent viewing angle properties and excellent durability, and a liquid crystal display device using the polarizing plate.

The inventors of the present invention have devotedly investigated. As a result, they found that a cellulose derivative film efficiently exhibiting a desired negative Rth can be provided by using a cellulose derivative having a certain substituent, and a compound reducing the retardation in the film thickness direction, Rth, in combination, thus finally completing the invention. The inventors also found that a polarizing plate having improved durability under high temperature and high humidity conditions can be provided by using a highly hydrophobic substituent as the certain substituent, thereby rendering the equilibrium moisture content of the film very low.

Thus, the second present invention is as follows:

[16] A cellulose derivative film, which comprises:

a cellulose derivative containing a substituent having a polarizability anisotropy represented by following Equation (1) of $2.5\times10^{-24}$ $cm^3$ or greater; and at least one retardation regulator satisfying following Equation (11-1):

$$\Delta\alpha=\alpha x-(\alpha y+\alpha z)/2 \qquad \text{Equation (1)}$$

wherein αx is the largest component among characteristic values obtained after diagonalization of polarizability tensor;

αy is the second largest component among characteristic values obtained after diagonalization of polarizability tensor; and αz is the smallest component among characteristic values obtained after diagonalization of polarizability tensor; and $$Rth(a)-Rth(0)/a\leqq-1.5,\ \text{provided that}\ 0.01\leqq a\leqq30, \qquad \text{Equation (11-1)}$$

wherein Rth(a) represents Rth (nm) at a wavelength of 589 nm of a film having a film thickness of 80 μm, the film comprises: a cellulose acylate having a degree of acetyl substitution of 2.85; and a parts by mass of the at least one retardation regulator relative to 100 parts by mass of the cellulose acylate;

Rth(0) represents Rth (nm) at a wavelength of 589 nm of a film having a film thickness of 80 μm, the film comprises: only a cellulose acylate having a degree of acetyl substitution of 2.85 without the at least one retardation regulator; and a represents parts by mass of the at least one retardation regulator relative to 100 parts by mass of the cellulose acylate.

[17] The cellulose derivative film as described in [16] above, wherein the at least one retardation regulator is any of compounds represented by following Formulas (2-1) to (2-21):

Formula (2-1)

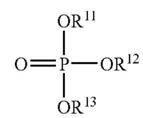

wherein, in Formula (2-1), $R^{11}$ to $R^{13}$ each independently represents an aliphatic group having 1 to 20 carbon atoms, the aliphatic group may be substituted; and $R^{11}$ to $R^{13}$ may be joined to each other to form a ring;

Formula (2-2)

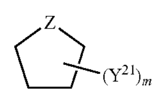

Formula (2-3)

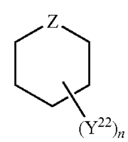

wherein, in Formulas (2-2) and (2-3), Z represents a carbon atom, an oxygen atom, a sulfur atom or —$NR^{25}$—;

$R^{25}$ represents a hydrogen atom or an alkyl group, the 5- or 6-membered ring containing Z may be substituted;

$Y^{21}$ and $Y^{22}$ each independently represents an ester group, an alkoxycarbonyl group, an amide group or a carbamoyl group, respectively having 1 to 20 carbon atoms, and $Y^{21}$ and $Y^{22}$ may be joined to each other to form a ring;

m represents an integer of from 1 to 5; and n represents an integer of from 1 to 6;

Formula (2-4)

$$Y^{31}—L^{31}—Y^{32}$$

Formula (2-5)

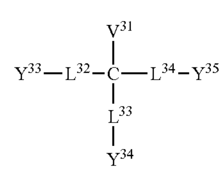

-continued

Formula (2-6)

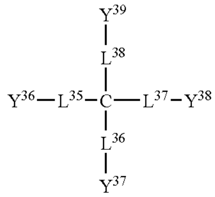

Formula (2-7)

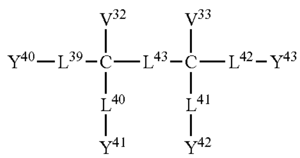

Formula (2-8)

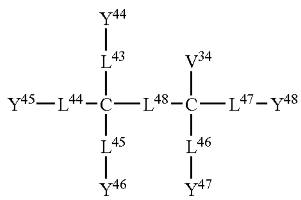

Formula (2-9)

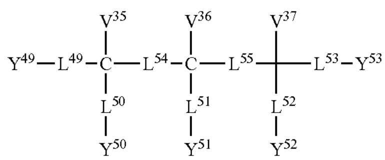

Formula (2-10)

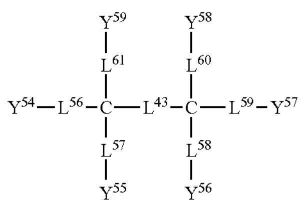

Formula (2-11)

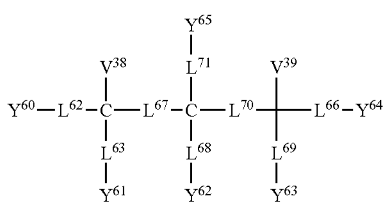

Formula (2-12)

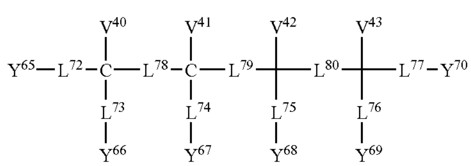

wherein, in Formulas (2-4) to (2-12), $Y^{31}$ to $Y^{70}$ each independently represents an ester group having 1 to 20 carbon atoms, an alkoxycarbonyl group having 1 to 20 carbon atoms, an amide group having 1 to 20 carbon atoms, a carbamoyl group having 1 to 20 carbon atom or a hydroxyl group;

$V^{31}$ to $V^{43}$ each independently represents a hydrogen atom or an aliphatic group having 1 to 20 carbon atoms;

$L^{31}$ to $L^{80}$ each independently represents a saturated divalent linking group having 0 to 40 atoms, and 0 to 20 carbon atoms, wherein the description "$L^{31}$ to $L^{80}$ having 0 atoms" indicates that the groups present at both ends of the linking group are directly forming a single bond; and $V^{31}$ to $V^{43}$ and $L^{31}$ to $L^{80}$ may be further substituted;

Formula (2-13)

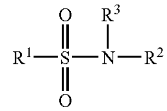

wherein, in Formula (2-13), $R^1$ represents an alkyl group or an aryl group;

$R^2$ and $R^3$ each independently represents a hydrogen atom, an alkyl group or an aryl group;

the sum of the number of carbon atoms of $R^1$, $R^2$ and $R^3$ is 10 or more; and alkyl group and aryl group may respectively be substituted;

Formula (2-14)

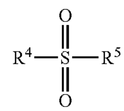

wherein, in Formula (2-14), $R^4$ and $R^5$ each independently represents an alkyl group or an aryl group;

the sum of the number of carbon atoms of $R^4$ and $R^5$ is 10 or more; and alkyl group and aryl group may respectively be substituted;

Formula (2-15)

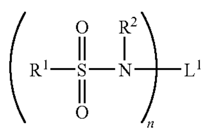

wherein, in Formula (2-15), $R^1$ represents a substituted or unsubstituted aliphatic group or a substituted or unsubstituted aromatic group;

$R^2$ represents a hydrogen atom, a substituted or unsubstituted aliphatic group or a substituted or unsubstituted aromatic group;

$L^1$ represents a linking group having a valency of 2 to 6; and n represents an integer of from 2 to 6 corresponding to the valency of $L^1$;

Formula (2-16)

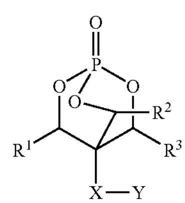

wherein, in Formula (2-16), $R^1$, $R^2$ and $R^3$ each independently represents a hydrogen atom or an alkyl group;

X represents a divalent linking group formed from one or more groups selected from Group 1 of Linking Groups as shown below; and Y represents a hydrogen atom, an alkyl group, an aryl group or an aralkyl group;

Group 1 of Linking Groups represents a single bond, —O—, —CO—, —$NR^4$—, an alkylene group or an arylene group, wherein $R^4$ represents a hydrogen atom, an alkyl group, an aryl group or an aralkyl group;

Formula (2-17)

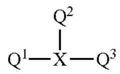

wherein, in Formula (2-17), $Q^1$, $Q^2$ and $Q^3$ each independently represents a 5- or 6-membered ring;

X represents B, C—R wherein R represents a hydrogen atom or a substituent, N, P or P═O;

Formula (2-19)

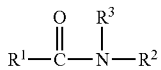

wherein, in Formula (2-19), $R^1$ represents an alkyl group or an aryl group;

$R^2$ and $R^3$ each independently represents a hydrogen atom, an alkyl group or an aryl group; and alkyl group and aryl group may be substituted; and Formula (2-21)

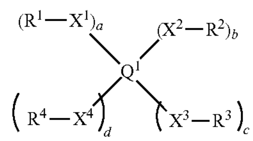

wherein, in Formula (2-21), $R^1$, $R^2$, $R^3$ and $R^4$ each independently represents a hydrogen atom, a substituted or unsubstituted aliphatic group or a substituted or unsubstituted aromatic group;

$X^1$, $X^2$, $X^3$ and $X^4$ each independently represents a divalent linking group formed from one or more groups selected from the group consisting of a single bond, —CO— and —$NR^5$— wherein $R^5$ represents a substituted or unsubstituted aliphatic group or a substituted or unsubstituted aromatic group;

a, b, c and d are each an integer of 0 or greater, and a+b+c+d is 2 or more; and $Q^1$ represents an organic group having a valency of (a+b+c+d).

[18] The cellulose derivative film as described in [16] or [17] above, wherein the substituent having a polarizability anisotropy of $2.5\times10^{-24}$ $cm^3$ or greater is an aromatic-containing substituent.

[19] The cellulose derivative film as described in any of [16] to [18] above, wherein the substituent having a polarizability anisotropy of $2.5\times10^{-24}$ $cm^3$ or greater is an aromatic acyl group.

[20] The cellulose derivative film as described in any of [16] to [19] above, wherein the film has an equilibrium moisture content at 25° C. and 80% RH of 3.0% or less.

[21] The cellulose derivative film as described in any of [16] to [20] above, wherein Rth(λ) of the film satisfies following Equation (2):

$$-600\ \text{nm} \leqq Rth(589) \leqq 0\ \text{nm} \qquad \text{Equation (2)}$$

wherein Rth(λ) represents a retardation of the film in a film thickness direction at a wavelength of λ nm.

[22] An optically compensatory film, which comprises:

a cellulose derivative film as described in any of [16] to [21] above; and an optically anisotropic layer provided on the cellulose derivative film.

[23] A polarizing plate, which comprises:

a polarizing film; and at least two transparent protective films disposed at both sides of the polarizing film, wherein at least one of the at least two transparent protective films is a cellulose derivative film as described in any of [16] to [21] above or an optically compensatory film as described in [22] above.

[24] A liquid crystal display device, which comprises:

a liquid crystal cell; and at least two polarizing plates disposed at both sides of the liquid crystal cell, wherein at least one of the at least two polarizing plates is a polarizing plate as described in [23] above.

[25] The liquid crystal display device as described in [24] above, wherein a display mode is VA mode.

[26] The liquid crystal display device as described in [24] above, wherein a display mode is IPS mode.

Since many of the proposed methods are the method to improve viewing angles by counteracting the anisotropy of birefringence of liquid crystal in the liquid-crystal cell, there is still a problem that when the orthogonal polarizing plate is viewed from an oblique direction, light leakage due to slippage from the orthogonal angle made by crossed polarizing axes cannot be satisfactorily overcome. Also, even in the method known as to compensate this light leakage, it is extremely difficult to perfectly optically compensate for the liquid-crystal cell without causing problems. In an optical compensatory sheet for an IPS mode liquid-crystal cell, in which a stretched-birefringent polymer film is used for the optical compensation, plural films are necessarily used, and as a result, the optical compensatory sheet increase in thickness, and thus is disadvantageous for a thinning of display device. In addition, since an adhesive layer is used in the laminating layer of a stretched film, the adhesive layer shrinks depending on variation of temperature or humidity, and thus, defects such as peel or warpage of the films sometimes occurred.

The third present invention is contrived to solve the above-mentioned problem. It is an object of the third present invention to provide a liquid crystal display device having a simple configuration and improved displaying-quality as well as the viewing angle characteristics. Another object of the third present invention is to provide a liquid crystal display device, particularly to provide an optically-compensatory film incorporating a polarizing plate which contributes for an improvement of viewing angle characteristics of an IPS-mode liquid-crystal display device.

Means for solving the above problems are as follows.

[27] An optically-compensatory film incorporating a polarizing plate, which comprises:

(A) a long polarizing film which has an absorption axis in parallel with a longitudinal direction;

(B) a long second phase difference film which comprises a cellulose acylate film that includes a substituent having a polarizability anisotropy Δα represented by following Expression (1) of $2.5\times10^{-24}$ $cm^{-3}$ or more, and which has a retardation in a thickness-direction Rth of −300 to −40 nm and an in-plane retardation Re of 50 nm or less, wherein an optical axis is not included in an in-plane film; and (C) a long first phase difference film which has a slow axis substantially orthogonal to a longitudinal direction, wherein the long first phase difference film is interposed between the long polarizing film and the long second phase difference film:

$$\Delta\alpha=\alpha x-(\alpha y+\alpha z)/2 \quad \text{Expression (1)}$$

wherein, αx, αy and αz are each a characteristic value obtained after diagonalization of polarizability tensor, and satisfy αx≧αy≧αz.

[28] An optically-compensatory film incorporating a polarizing plate, which comprises following (A), (B) and (C), in this order:

(A) a long polarizing film which has an absorption axis in parallel with a longitudinal direction;

(B) a long second phase difference film which comprises a cellulose acylate film that includes a substituent having a polarizability anisotropy Δα represented by following Expression (1) of $2.5\times10^{-24}$ $cm^{-3}$ or more, and which has a retardation in a thickness-direction Rth of −300 to −40 nm and an in-plane retardation Re of 50 nm or less, wherein an optical axis is not included in an in-plane film; and (C) a long first phase difference film which has a slow axis substantially orthogonal to a longitudinal direction:

$$\Delta\alpha=\alpha x-(\alpha y+\alpha z)/2 \quad \text{Expression (1)}$$

wherein, αx, αy and αz are each a characteristic value obtained after diagonalization of polarizability tensor, and satisfy αx≧αy≧αz.

[29] The optically-compensatory film incorporating a polarizing plate as described in [27] or [28] above, wherein the long first phase difference film has Re of from 60 to 200 nm and Nz value of greater than 0.8 and less than or equal to 1.5 in which Nz value is defined by Nz=Rth/Re+0.5.

[30] A liquid crystal display device, which comprises:

a first polarizing film;

a first phase difference area;

a second phase difference area;

a liquid-crystal layer containing liquid-crystal molecules;

a liquid-crystal cell including a pair of substrates, in which the liquid-crystal layer is interposed between the pair of substrates; and a second polarizing film, wherein the liquid-crystal molecules contained in the liquid-crystal layer is aligned parallel to surfaces of the pair of substrates at a black display, and wherein a retardation in a thickness-direction Rth of the second phase difference area is from −300 to −40 nm.

[31] The liquid crystal display device as described in [30] above, wherein the first phase difference area has an in-plane retardation Re of 60 to 200 nm and Nz value of greater than 0.8 and less than or equal to 1.5 in which Nz value is defined by Nz=Rth/Re+0.5;

the second phase difference area has an in-plane retardation Re of 50 nm or less, and comprises a cellulose acylate film that includes a substituent having a polarizability anisotropy Δα represented by following Expression (1) of $2.5\times10^{-24}$ $cm^3$ or more; and the first polarizing film has a transmission axis in parallel with a slow axis direction of the liquid-crystal molecules at a black display:

$$\Delta\alpha=\alpha x-(\alpha y+\alpha z)/2 \quad \text{Expression (1)}$$

wherein, αx, αy and αz are each a characteristic value obtained after diagonalization of polarizability tensor, and satisfy αx≧αy≧αz.

[32] The liquid crystal display device as described in [30] or [31] above, wherein the first polarizing film, the first phase difference area, the second phase difference area and the liquid-crystal cell are disposed in this order, and wherein a slow axis of the first phase difference area is in parallel with a transmission axis of the first polarizing film.

[33] The liquid crystal display device as described in [30] or [31] above, wherein the first polarizing film, the second phase difference area, the first phase difference area and the liquid-crystal cell are disposed in this order, and wherein a slow axis of the first phase difference area is orthogonal to a transmission axis of the first polarizing film.

[34] The liquid crystal display device as described in any of [30] to [33] above, which further comprises a pair of protective films interposing one of the first polarizing film and the second polarizing film therebetween, wherein at least the protective film disposed nearer to the liquid-crystal layer than another among the pair of protective films has a retardation in a thickness-direction Rth of 40 to 40 nm.

[35] The liquid crystal display device as described in any of [30] to [34] above, which further comprises a pair of protective films interposing one of the first polarizing film and the second polarizing film therebetween, wherein at least the protective film disposed nearer to the liquid-crystal layer than another among the pair of protective films has a retardation in a thickness-direction Rth of −20 to 20 mm.

[36] The liquid crystal display device as described in any of [30] to [35] above, which further comprises a pair of protective films interposing one of the first polarizing film and the second polarizing film therebetween, wherein at least the protective film disposed nearer to the liquid-crystal layer than another among the pair of protective films has a thickness of 60 μm or less.

[37] The liquid crystal display device as described in any of [30] to [36] above, which further comprises a pair of protective films interposing one of the first polarizing film and the second polarizing film therebetween, wherein one of the pair of protective films disposed nearer to the liquid-crystal layer than another is a cellulose acylate film or a norborne-based film.

[38] The liquid crystal display device as described in any of [30] to [37] above, wherein the first phase difference area or the second phase difference area is adjacent to the first polarizing film.

[39] The liquid crystal display device as described in any of [30] to [38] above, wherein the first phase difference area and the second phase difference area are disposed at a position nearer to a substrate opposite to a viewing side among the pair of substrates of the liquid-crystal cell without intercalating any other film.

[40] The optically-compensatory film incorporating a polarizing plate as described in any of [27] to [29] above, wherein the cellulose acylate film is subjected to a stretching treatment.

[41] The optically-compensatory film incorporating a polarizing plate as described in any of [27] to [29] and [40] above, wherein the substituent having a polarizability anisotropy Δα of $2.5\times10^{-24}$ $cm^3$ or more in the cellulose acylate film is an aromatic acyl group.

[42] The optically-compensatory film incorporating a polarizing plate as described in [41] above, wherein the total substitution degree PA of an acyl group in the cellulose acylate film is 2.4 or more to 3.0 or less, and a substitution degree of the aromatic acyl group in the cellulose acylate film is 0.1 or more to 1.0 or less.

[43] The optically-compensatory film incorporating a polarizing plate as described in [41] or [42] above, which further comprises at least one compound capable of reducing Rth in an amount from 0.01 to 30 mass % of a solid portion of the cellulose acylate.

[44] The liquid crystal display device as described in any of [31] to [39] above, wherein the cellulose acylate film is subjected to a stretching treatment.

[45] The liquid crystal display device as described in any of [30] to [39] and [44] above, wherein the substituent having a polarizability anisotropy $\Delta\alpha$ of $2.5\times10^{-24}$ $cm^3$ or more in the cellulose acylate film is an aromatic acyl group.

[46] The liquid crystal display device as described in [45] above, wherein the total substitution degree PA of an acyl group in the cellulose acylate film is 2.4 or more to 3.0 or less, and a substitution degree of the aromatic acyl group in the cellulose acylate film is 0.1 or more to 1.0 or less.

[47] The liquid crystal display device as described in [45] or [46] above, which further comprises at least one compound capable of reducing Rth in an amount from 0.01 to 30 mass % of a solid portion of the cellulose acylate.

BEST MODE FOR CARRYING OUT THE INVENTION

Figure 1:
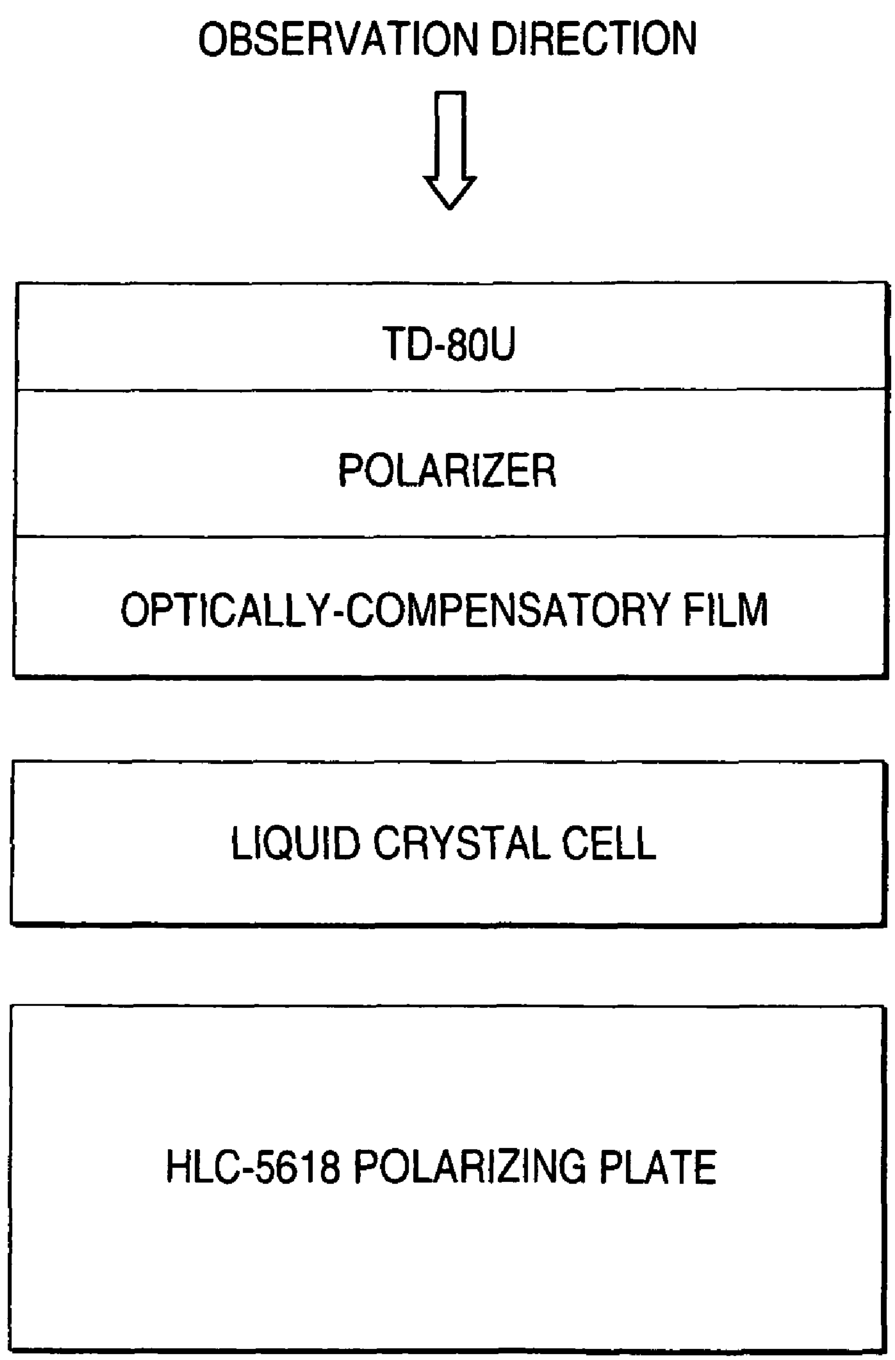
FIG. 1 is a figure illustrating liquid crystal display device used in the example of the invention.

Hereinafter, the first present invention will be described detail.

The first present invention relates to method of producing the cellulose derivative film by forming film from the dope including cellulose derivative satisfying the following condition (a) and (b), with the solvent cast method, and the cellulose derivative film produced by the method above.

(a) At least one hydroxyl group of the cellulose derivative is substituted by the substituent where the polarizability anisotropy $\Delta\alpha$ represented as following mathematical formula (1-1) is $2.5\times10^{-24}$ $cm^3$ or higher.

$$\Delta\alpha=\alpha x-(\alpha y+\alpha z)/2 \qquad \text{Mathematical Expression (1)}$$

(wherein $\alpha x$ is the largest component among characteristic values obtained after diagonalization of polarizability tensor; $\alpha y$ is the second largest component among characteristic values obtained after diagonalization of polarizability tensor; $\alpha z$ is the smallest component among characteristic value obtained after diagonalization of polarizability tensor.)

(b) When the substitution degree by the substituent where above mentioned $\Delta\alpha$ is $2.5\times10^{-24}$ $cm^3$ or higher is $P_A$, and the substitution degree by the substituent where $\Delta\alpha$ is lower than $2.5\times10^{-24}$ $cm^3$ is $P_B$, the above mentioned $P_A$ and $P_B$ satisfy the following mathematical formula (1-3) and (4).

$$2P_A+P_B>3.0 \qquad \text{Mathematical Expression (3)}$$

$$P_A>0.2 \qquad \text{Mathematical Expression (4)}$$

In addition, Since the hydroxyl group which a glucose unit of cellulose has is 3, the relation between $P_A$ and $P_B$ is basically $PA+PB\leqq3$.

(Cellulose Derivative)

The present invention is characterized in that a substituent having a high polarizability anisotropy is introduced as a substituent coupled with three hydroxyl groups in a β glucose ring which is a structural unit of the cellulose derivative to be used, and a film is prepared by being subjected to a stretching treatment. The substituent having a high polarizability anisotropy which is substituted to the hydroxyl groups in a β-glucose ring is orthogonal to the β glucose ring main chain at the time of stretching, and is aligned in a direction that polarizability anisotropy becomes the maximum in a thickness-direction of the film. According to this, the cellulose derivative film in which refraction index become the maximum in the thickness-direction of the film can be obtained. That is, in the surface of the film, the cellulose derivative film in which a slow axis occurs in a direction orthogonal to stretching other than the stretching axis direction and retardation in the thickness-direction Rth readily occurs can be obtained.

Particularly, in the present invention, by introducing the substituent having high polarizability anisotropy, and even more, and by giving this substituent in a certain range, the cellulose derivative film having a desired optical performance can be obtained. This means that the retardation Rth in-plane direction or in a thickness-direction can be widely changed by using the cellulose acylate in which a substitution degree $P_A$ of the substituent having high polarizability anisotropy $\Delta\alpha$, and a substitution degree $P_B$ of the substituent having low polarizability anisotropy $\Delta\alpha$ are adjusted.

The present invention has an object to obtain the cellulose derivative film in which the retardation in a thickness-direction Rth has a negative value.

As a result of the examination, the inventors have found that it is preferable to increase the $P_A$ mentioned above in order to obtain the retardation Rth in the thickness-direction, but also found that the problem that the in-plane retardation may be beyond the desired range and a softening temperature decreases when the $P_A$ is too high. In addition, when the film is formed by solution, there is a case that enough solubility is not obtained.

Thus the inventors have considered that the balance between the $P_A$ and the $P_B$ is important to obtain a desired optical performance and property. As a result, the inventors have found that the retardation Rth of the film in the thickness direction becomes negative by using the cellulose derivative having the substitution degree satisfying $2P_A+P_B>3.0$ whereby other desired performances are obtained.

The substitution degree of the cellulose derivative can be measured by a method descried in the present invention. In addition, the substitution degree of the cellulose derivative can be also measured by a following method. More specifically, the substitution degree of each of substituent can be measured by subjecting a pretreatment for introducing a substituent different from the substituent of this cellulose derivative to the residual hydroxyl group in the cellulose derivative to be measured, measuring $C^{13}$-NMR spectrum of the obtained cellulose, and then measuring a signal intensity ratio corresponding to carbonyl carbon directly coupled with hydroxyl of the cellulose derivative.

Specifically, for example, in case of the cellulose derivative comprising a acetyl group and an aromatic acyl group, a propionyl group is introduced into the residual hydroxyl group as a pretreatment. As a method of introducing the propionyl group, for example, a well-known method descried in Y. Tezuka, Y. Tsuchiya, Carbohydr. Res., 273, 93 (1995) can be performed.

In the $C^{13}$-NMR spectrum of the cellulose derivative in which the pretreatment is performed, since the peaks corresponding to the carbonyl carbons of the acetyl group, the propionyl group, and the aromatic acyl group are observed in different locations, the substitution degrees can be measured from each of the peak intensities.

According to the method mentioned above, substitution degrees of the respective substituents which are substituted to a second position, a third position, and a sixth position of hydroxy groups of the β-glucose ring that is a structural unit of the cellulose derivative can be obtained. This is because a chemical shift of the substitution degree of the each of substituent which is directly substituted to the second position, the third position, and the sixth position hydroxy groups is different from each other.

In the present invention, it is preferable that the above mentioned $P_A$ and $P_B$ have a relation to satisfy the following Expression of both (3) and (4);

$$2P_A+P_B>3.0 \quad \text{Expression (3)}$$

$$0.2<P_A \text{ (preferably } 0.2<P_A<3.0) \quad \text{Expression (4)}$$

Even more particularly, according to the above, to obtain preferable in-plane retardation Re, more preferable film property as well as desired retardation in a thickness direction Rth, it is more preferable to satisfy the following Expression of both (3') and (4');

$$2P_A+P_B>3.0 \quad \text{Expression (3')}$$

$$0.2<P_A<2.0) \quad \text{Expression (4')}$$

It is even more preferable to satisfy the following mathematical formula of both (3") and (4").

$$2P_A+P_B>3.0 \quad \text{Expression (3")}$$

$$0.2<P_A<1.0) \quad \text{Expression (4")}$$

In addition, a range of the aromatic acyl substituent of the second position, the third position, and the sixth position of the β-glucose ring which is a structural unit of the cellulose derivative is not particularly limited as long as the claims of the present invention is satisfied, but to give the negative Rth, it is preferable to introduce the substituent having the high polarizability anisotropy to the second position and the third position of the β-glucose ring. The second and third positions are assumed that they are low in a degree of freedom than the sixth position to which a substituent is introduced via a carbon atom from a β-glucose ring, and introduced substituents are easy in film-thickness direction alignment and thus can be easily aligned in film-thickness direction by a stretching treatment. The substitution degree of the aromatic acyl group of the sixth position is preferably 0 to 1.0, more preferably 0 to 0.8, and most preferably 0 to 0.5.

(Polarizability Anisotropy)

As above, the film of the present invention is characterized to use the cellulose acylate having a specific substituent defined by the polarizability anisotropy. The polarizability anisotropy of the substituent is calculated by using Gaussian 03 (Revision B.03, U.S. Gaussian Corporation software).

Specifically, the polarizability is calculated with B3LYP/6-311+G** level by using the structure of the substituent after being optimized with the B3LYP/6-31G* level calculation. Then, the obtained polarizability tensor is diagonalized, and a diagonal component is used to calculate the polarizability anisotropy.

$$\Delta\alpha=\alpha x-(\alpha y+\alpha z)/2 \quad \text{Mathematical Expression (1)}$$

(wherein αx is the largest component among characteristic values obtained after diagonalization of polarizability tensor; αy is the second largest component among characteristic values obtained after diagonalization of polarizability tensor; αz is the smallest component among characteristic value obtained after diagonalization of polarizability tensor.)

In addition, in the substituent having a high polarizability anisotropy of the present invention, it is preferable that αx and αy are aligned in a direction orthogonal to the cellulose acylate main chain and αz is aligned in a direction parallel to the cellulose acylate main chain. Here, in case where αx is aligned in the thickness direction of the film and αy is aligned in-plane direction, the retardation Rth in a thickness-direction becomes a negative value so that it is particularly preferable. As for such alignments of αx and αy, it is assumed to be affected by the substitution position of the substituent to a glucopyranose ring of the cellulose acylate.

As for the substituent that Δα is $2.5\times10^{-24}$ $cm^3$ or more, aromatic acyl group is preferable.

As for the substituent that Δα is less than $2.5\times10^{-24}$ $cm^3$, aliphatic acyl group is preferable.

Examples of the aromatic acyl group that can be preferably used in the present invention include groups represented by formula (A) mentioned below.

Formula (A)

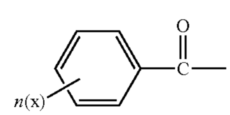

First, formula (A) will be explained. Here, X is the substituent, and the examples of the substituent include a halogen atom, cyano, an alkyl group, an alkoxy group, an aryl group, an aryloxy group, an acyl group, a carbonamide group, a sulfonamide group, an ureido group, an aralkyl group, nitro, an alkoxycarbonyl group, an aryloxycarbonyl group, an aralkyloxycarbonyl group, a carbamoyl group, a sulfamoyl group, an acyloxy group, an alkenyl group, an alkynyl group, an alkylsulfonyl group, an arylsulfonyl group, an alkyloxysulphonyl group, an aryloxysulfonyl group, an alkylsulfonyloxy group and an aryloxysulfonyl group, —S—R, —NH—CO—OR, —PH—R, —P(—R)$_2$, —PH—O—R, —P(—R)(—O—R), —P(—O—R)$_2$, —PH(═O)—R—P(═O)(—R)$_2$, —PH(═O)—O—R, —P(═O)(—R)(—O—R), —P(═O)(—O—R)$_2$, —O—PH(═O)—R, —O—P (═O)(—R)$_2$—O—PH(═O)—O—R, —O—P(═O)(—R)(—O—R), —O—P(═O)(—O—R)$_2$, —NH—PH(═O)—R, —NH—P(═O)(—R)(—O—R), —NH—P(═O)(—O—R)$_2$, $SiH_2$—R, —SiH(—R)$_2$, —Si(—R)$_3$, —O—$SiH_2$—R, —O—SiH(—R)$_2$ and —O—Si(—R)$_3$. The above mentioned R is an aliphatic group, an aromatic group or a heterocycle group. The number of substituent is preferably 1 to 5, more preferably 1 to 4, even more preferably 1 to 3, most preferably 1 to 2. For substituent, a halogen atom, cyano, an alkyl group, an alkoxy group, an aryl group, an aryloxy group, an acyl group, a carbonamide group, a sulfonamide group, and an ureido group are preferable, a halogen atom, cyano, an alkyl group, an alkoxy group, an aryloxy group, an acyl group, and a carbonamide group are more preferable, a halogen atom, cyano, an alkyl group, an alkoxy group, and an aryloxy group are even more preferable, a halogen atom, an alkyl group, and an alkoxy group are most preferable.

The above mentioned halogen atoms include fluorine atom, chlorine atom, bromine atom and iodine atom. The above mentioned alkyl group may have cyclic structure or branch structure. The number of carbon atom of alkyl group is preferably 1 to 20, more preferably 1 to 12, even more preferably 1 to 6, most preferably 1 to 4. The examples of alkyl groups include methyl, ethyl, propyl, isopropyl, butyl, t-butyl, hexyl, cyclohexyl, octyl and 2-ethylhexyl. The above mentioned alkoxy group may have cyclic structure or branch structure. The number of carbon atom of alkoxy group is preferably 1 to 20, more preferably 1 to 12, even more preferably 1 to 6, most preferably 1 to 4. The alkoxy group may additionally be substituted with another alkoxy group. The examples of alkoxy groups include methoxy, ethoxy, 2-methoxyethoxy, 2-methoxy-2-ethoxyethoxy, butyloxy, hexyloxy and octyloxy.

The number of carbon atom of aryl group is preferably 6 to 20, more preferably 6 to 12. The examples of aryl group include phenyl and naphthyl. The number of carbon atom of aryloxy group is preferably 6 to 20, more preferably 6 to 12. The examples of aryloxy group include phenoxy and naphthoxy. The number of carbon atom of acyl group is preferably 1 to 20, more preferably 1 to 12. The examples of acyl group include formyl, acetyl and benzoyl. The number of carbon atom of carbonamide group is preferably 1 to 20, more preferably 1 to 12. The examples of carbonamide group include acetamide and benzamide. The number of carbon atom of sulfonamide group is preferably 1 to 20, more preferably 1 to 12. The examples of sulfonamide group include methane sulfonamide, benzene sulfonamide and p-toluene sulfonamide. The number of carbon atom of ureido group is preferably 1 to 20, more preferably 1 to 12. The examples of ureido group include (unsubstituted) ureido.

The number of carbon atom of aralkyl group is preferably 7 to 20, more preferably 7 to 12. The examples of aralkyl group include benzil, phenethyl and naphthylmethyl. The number of carbon atom of alkoxycarbonyl group is preferably 1 to 20, more preferably 2 to 12. The examples of alkoxycarbonyl group include methoxycarbonyl. The number of carbon atom of aryloxycarbonyl group is preferably 7 to 20, more preferably 7 to 12. The examples of aryloxycarbonyl group include phenoxycarbonyl. The number of carbon atom of aralkyloxycarbonyl group is preferably 8 to 20, more preferably 8 to 12. The examples of aralkyloxycarbonyl group include benzyloxycarbonyl. The number of carbon atom of carbamoyl group is preferably 1 to 20, more preferably 1 to 12. The examples of carbamoyl group include (unsubstituted) carbamoyl, and N-methylcarbamoyl. The number of carbon atom of sulfamoyl group is preferably less than 20, more preferably less than 12. The examples of sulfamoyl group include (unsubstituted) sulfamoyl, and N-methylsulfamoyl. The number of carbon atom of acyloxy group is preferably 1 to 20, more preferably 2 to 12. The examples of acyloxy group include acetoxy, benzoyloxy.

The number of carbon atom of alkenyl group is preferably 2 to 20, more preferably 2 to 12. The examples of alkenyl group include vinyl, allyl and isopropenyl. The number of carbon atom of alkynyl group is preferably 2 to 20, more preferably 2 to 12. The examples of alkynyl group include thienyl. The number of carbon atom of alkynylsulfonyl group is preferably 1 to 20, more preferably 1 to 12. The number of carbon atom of arylsulfonyl group is preferably 6 to 20, more preferably 6 to 12. The number of carbon atom of alkyloxysulfonyl group is preferably 1 to 20, more preferably 1 to 12. The number of carbon atom of aryloxysulfonyl group is preferably 6 to 20, more preferably 6 to 12. The number of carbon atom of alkylsulfonyloxy group is preferably 1 to 20, more preferably 1 to 12. The number of carbon atom of aryloxysulfonyl group is preferably 6 to 20, more preferably 6 to 12.

Additionally, in the formula (A), the number (n) of substituent X that substitute to aromatic ring is 0 or 1 to 5, preferably 1 to 3, particularly preferably 1 or 2.

Furthermore, in the case that the number of substituent that substitute to aromatic ring is 2 or more, the substituent may be each same with or different from, or coupled each other to form condensation polycyclic compound (for example, naphthalene, indene, indan, phenanthrene, quinoline, isoquinoline, chromene, chromane, phthalazine, acridine, indole, indoline).

Additionally, the substituent are preferably selected from halogen atom, cyano, alkyl group having 1 to 20 carbon atom(s), alkoxy group having 1 to 20 carbon atom(s), aryl group having 6 to 20 carbon atom(s), aryloxy group having 6 to 20 carbon atom(s), acyl group having 1 to 20 carbon atom(s), carbonamide group having 1 to 20 carbon atom(s), sulfonamide group having 1 to 20 carbon atom(s), and ureide group having 1 to 20 carbon atom(s).

Specific example of aromatic acyl group represented as following formula (A) is as follows, preferably No. 1, 3, 5, 6, 8, 13, 18, 28, more preferably No. 1, 3, 6, 13.

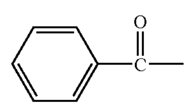

1

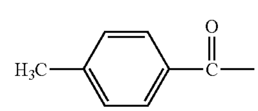

2

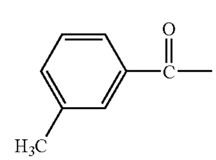

3

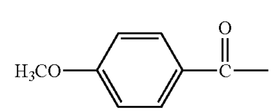

4

-continued
5
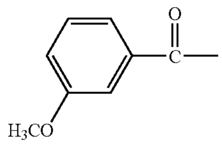
6
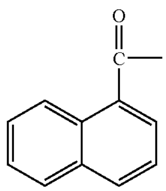
7
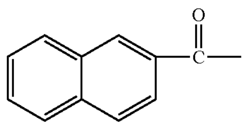
8
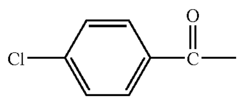
9
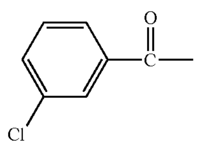
10
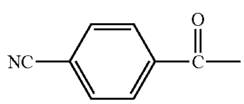
11
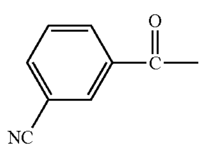
12
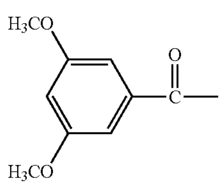
13
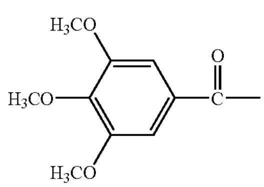
14
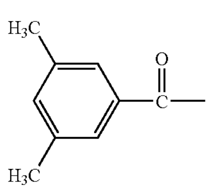
-continued
15
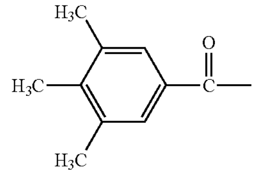
16
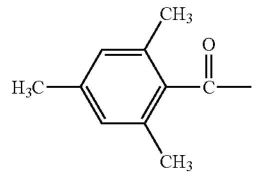
17
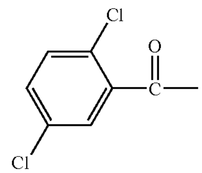
18
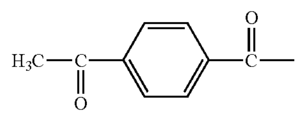
19
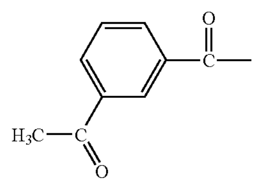
20
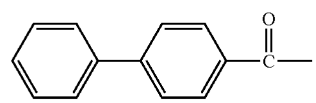
21
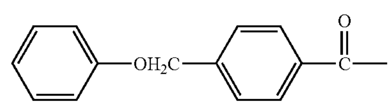
22
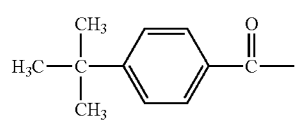
23
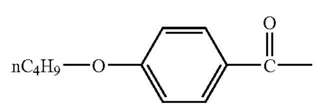
24
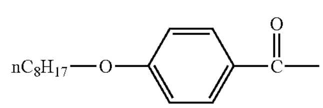
25
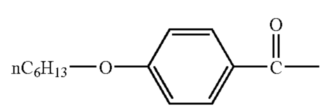
26
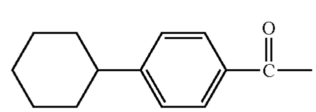

-continued
27
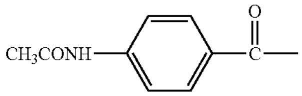
28
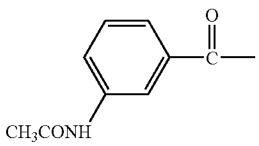
29
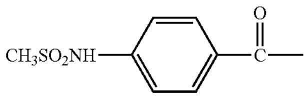
30
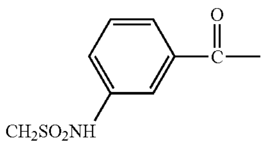
31
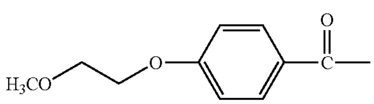
32
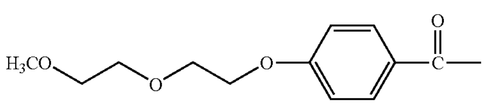
33
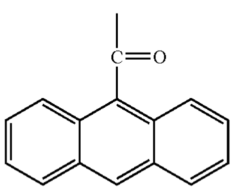
34
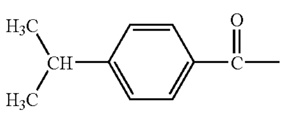
35
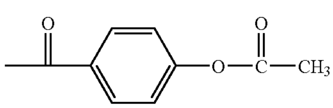
36
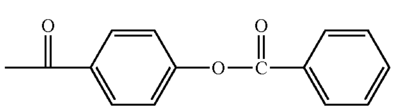
37
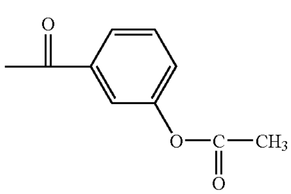
38
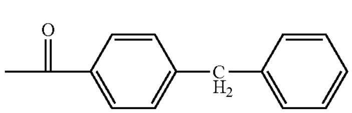
-continued
39
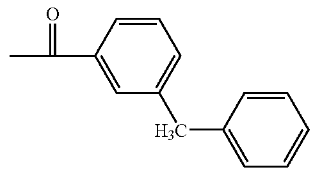
40
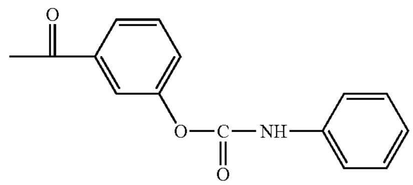
41
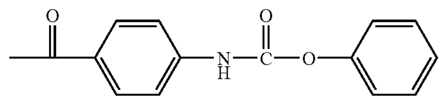
42
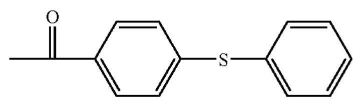
43
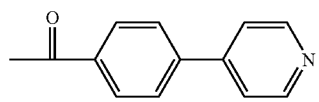
44
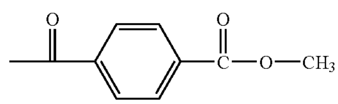
45
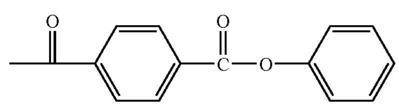
46
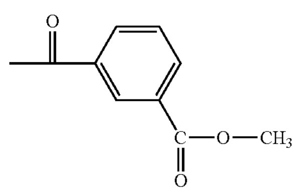
47
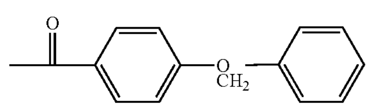
48
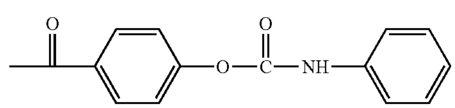
49
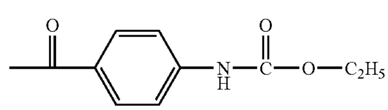
50
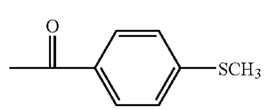

-continued

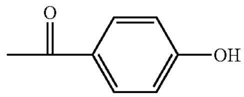

51

Examples of the aliphatic acyl group used preferably in the present invention having 2 to 20 carbon atom(s), particularly, include acetyl, propionyl, butyryl, isobutyryl, valeryl, pivaloyl, hexanoyl, octanoyl, lauroyl, stearoyl, etc, preferably is acetyl, propionyl, and butyryl, particularly preferably is acetyl. In the present invention, the above mentioned aliphatic acyl group include the one having additional substituent, thus substituent is for example things exemplified as X of the above mentioned formula (A).

Next, a method of substituting the aromatic acyl group to hydroxyl group of cellulose generally include a method of using symmetric acid anhydride and mixed acid anhydride induced from aromatic carboxylic acid chloride or aromatic carboxylic acid. Most preferable method is the method using acid anhydride induced from aromatic carboxylic acid (Journal of Applied Polymer Science, Vol. 29, 3981-3990 (1984) description). In the above mentioned method, substitution method of aromatic acyl group include following methods; (1) after producing cellulose fatty acid monoester or diester, introducing aromatic acyl group represented as above mentioned formula (A) to residual hydroxyl group; (2) reacting cellulose directly with mixed acid anhydride of fatty carboxylic acid and aromatic carboxylic acid. In the former, producing method in itself of cellulose fatty acid ester or diester is a method known to those skilled in the art, but reaction of a latter part to introduce aromatic acyl group into more is different by a kind of the aromatic acyl group, but reaction is carried out under the conditions of; reaction temperature preferably from 0 to 100° C., more preferably from 20 to 50° C., reaction time preferably over 30 minutes, more preferably from 30 to 300 minutes. In addition, in the method of the latter using mixed acid anhydride, reaction conditions is different by a kind of mixed acid anhydride, but reaction is carried out under the conditions of; reaction temperature preferably from 0 to 100° C., more preferably from 20 to 50° C., reaction time from 30 to 300 minutes, more preferably 60 to 200 minutes. Both reaction may be carried out in the absence of solvent or presence of solvent, but preferably carried out in a solvent. As the solvent, dichloromethane, chloroform, dioxane can be used.

Cellulose derivative used in the present invention has preferably 10 to 800 of, more preferably 370 to 600 of mass average degree of polymerization. Additionally, cellulose derivative used in the present invention has preferably 1,000 to 230,000 of, more preferably 75,000 to 230,000, most preferably 78,000 to 230,000, of number average molecular weight. Further, the cellulose derivative whose mass average molecular weight is small can be used as additive, blending polymer into cellulose triacetate. According to this, it is expected to control the wavelength dispersion of retardation of the phase difference film.

Cellulose derivative used in the present invention can be synthesized by acid anhydride and acid chloride as acylating agent. When acylating agent is acid anhydride, organic acid (for example, acetic acid) and methylene chloride are used as reaction solvent. A protic catalyst such as sulfuric acid is used as a catalyst substance. When acylating agent is acid chloride, basic compound is used as a catalyst. By the most industrially general synthesis method, cellulose is esterified in blending organic acid constituent including organic acid (acetic acid, propionic acid, butyric acid) corresponding to acetyl group and other acyl group, or acid anhydride thereof (acetic anhydride, propionic anhydride, butyric anhydride) to synthesize cellulose ester.

In this method, there are many cases that cellulose such as cotton linter, wood pulp is activated in the organic acid such as acetic acid, and then esterified in such blending organic acid constituent above with the sulfuric acid catalyst. An organic acid anhydride constituent is generally used in excessive quantity for quantity of hydroxy group existing in cellulose. In this esterification process, hydrolysis reaction (depolymerization reaction) of cellulose main chain $\beta 1 \rightarrow 4$-glycosidic bond is performed as well as esterification reaction. When hydrolysis reaction of main chain advances, degree of polymerization of cellulose ester decrease, and resulting this, properties of a cellulose ester film decrease. Therefore it is preferable to determine that reaction conditions such as reaction temperature in consideration for degree of polymerization and molecular weight of obtained cellulose ester.

It is important to regulate the highest temperature in an esterification reaction process in lower than 50° C. to obtain cellulose ester that degree of polymerization is high (molecular weight is large). The highest temperature is regulated to be preferably from 35 to 50° C., more preferably from 37 to 47° C. The condition that reaction temperature is 35° C. or higher is preferable, as the esterification reaction progress smoothly. The condition that reaction temperature is lower than 50° C. is preferable, as the inconvenience such that degree of polymerization of cellulose ester decrease dose not occur.

After reaction termination, inhibiting increase of the temperature to stop the reaction, further decrease of degree of polymerization can be inhibited, and cellulose ester that degree of polymerization is high can be synthesized. More specifically, after reaction, adding the reaction terminator (for example, water, acetic acid), the surplus acid anhydride which did not participate in esterification reaction hydrolyzes to give the corresponding organic acid as side product. Temperature in reaction apparatus rises because of intense exothermic heat due to this hydrolysis reaction. If addition speed of reaction terminator is not too fast, due to sudden exothermic heat exceeding the ability of cooling of reaction apparatus, hydrolysis reaction of cellulose main chain is remarkably performed, according to this, problem such that degree of polymerization of obtained cellulose ester falls does not occur. In addition, a part of a catalyst couples with cellulose during esterification reaction, the most part thereof that dissociate from cellulose during addition of reaction terminator. If addition speed of reaction terminator is not too fast then, enough reaction time is obtained so that a catalytic substance dissociate from cellulose, and it is hard to produce a problem such that one part of catalyst stay in cellulose in coupled condition. As for the cellulose ester which a part of the catalyst of strong acid couples, stability is so bad that it is easily break down with heat of drying time of product, and degree of polymerization decrease. For these reasons, after esterification reaction, it is desirable to stop reaction by adding reaction terminator, taking time, preferably 4 or more minutes, more preferably for 4 to 30 minutes. In addition, if addition time of reaction terminator is less than 30 minutes, it is preferable because problems such as decrease of industrial producing ability do not occur.

As reaction terminator, water and alcohol which generally break acid anhydride down were used. But, in the present invention, in order to prevent triester precipitation that solubility to various organic solvent is low, mixture of water and organic acid was preferably used as reaction terminator.

When esterification reaction is performed in a condition such as the above, cellulose ester having the high molecular weight whose mass average degree of polymerization is 500 or higher can be easily synthesized.

(In-plane Retardation Re, Retardation in a Thickness-direction Rth)

The Re (λ) is measured with an automatic birefringence analyzer KOBRA-21ADH (manufactured by Ooji Keisokuki Co., Ltd.) for an incoming light of a wavelength [λλ] nm in a direction normal to a film. The Rth (λ) is calculated with KOBRA-21ADH or WR on the basis of retardation values which are obtained by adding three values of the Re (λ), the retardation value measured by an incident light of wavelength λ nm in the direction tilted by +40° with respect to the normal direction of the film around the in-plane slow axis (which is decided by KOBRA 21ADH) as the tilt axis (a rotation axis), and the retardation value measured by an incident light of wavelength λ nm in the direction tilted by −40° with respect to the normal direction of the film around the in-plane slow axis (which is decided by KOBRA 21ADH) as the tilt axis (a rotation axis), a hypothetical mean refractive index, and an entered thickness value of the film. As the hypothetical mean refractive indexes, those values listed in Polymer Handbook (JOHN WILEY & SONS, INC) and catalogs of various optical films can be used. If the values of mean refractive indexes are unknown, the values may be measured with an Abbe refractometer. The values of mean refractive indexes of major optical films are exemplified below: cellulose acylate (1.48), cycloolefin polymer (1.52), polycarbonate (1.59), polymethyl methacrylate (1.49), and polystyrene (1.59). When the hypothetical mean refractive index and a thickness value are put into KOBRA 21ADH, nx, ny and nz are calculated.

The cellulose derivative film of the present invention is particularly advantageously used as a support of optically-compensatory film of IPS type liquid crystal display and ECB type liquid crystal display having a liquid crystal cell of IPS and ECB mode, or a protective film of polarizing plate. These modes are the embodiments that liquid crystal material align in almost parallel at the time of black indication, with a condition that voltage is not applied, and it makes liquid crystal molecules align in parallel to basal plate surface to indicating in black. Thus, as for the cellulose film of the present invention, it is preferable that refraction index to thickness direction is a greatest, and as a result, retardation in a thickness-direction will be negative value. Thus, the range of retardation of in-plane direction, and retardation in a thickness-direction of the present invention is preferably 20 nm<|Re (630)|<300 nm, −30 nm>Rth (630)>−400 nm, more preferably 50 nm<|Re (630)|<180 nm, −50 nm>Rth (630)>−300 nm, particularly 80 nm<|Re (630)|<150 nm, −100 nm>Rth >−200 nm.

For retardation regulator used in the present invention, the compound that certain index of double refraction is large, easily align in the film, that is to say the compound that retardation expressional potency is large is preferable. Thus, after adding a stick type compound or a discotic type compound to the film, with such stretching treatment, by being aligned, retardation can be widely adjusted. Particularly, in the case that the additive has liquid crystallinity, for example, in the case stick type liquid crystal was aligned, double refraction in the stretching direction become high, in the case disk type liquid crystal was aligned in parallel to film surface, double refraction of in-plane direction become high. In the case that a cellulose film of the present invention does not include the retardation regulator, particularly in a case that the cellulose acylate that substitution degree of the aromatic ring acyl group is high is used, the double refraction increases in stretching orthogonal direction (including in-plane direction, thickness-direction). Therefore, in order to obtain the condition that in-plane retardation is low and retardation in a thickness-direction is large number in negative value, by adding the liquid crystallinity compound, the double refraction in stretching direction can be increased and in-plane retardation can be reduced.

(Retardation Regulator)

In the present invention, it is preferable to use retardation regulator as shown in the following formula (1-1) as additive. The compound which expresses retardation of a cellulose derivative film is explained. As a result that the inventor examined zealously, using material that the greatest interterminal distance of a molecule is 20 Å or higher and ratio of molecular long-axis/short axis is 2.0 or higher, as retardation regulator, so that optically anisotropy sufficiently expresses and Re or Rth increase. Thus, with the use of the regulator which align in the film, index of refraction difference of film direction of stretching and stretching orthogonal is easy to occur, and double refraction of stretching direction can easily expresses. In addition, the greatest interterminal distance of a molecule and the ratio of molecular long-axis/short axis indicated in the present invention was done a trial calculation, being based on the resultant which calculate the molecular structure. In the present invention, it is preferable to add compound as shown in the following formula (1-1) as retardation regulator. However, as for effect by the invention, it is not limited as additive express retardation by structure shown in the following.

Preferable additive amount of retardation regulator used in the present invention is 0.01 to 20 part by mass, more preferably 0.1 to 15 part by mass, particularly preferably 1 to 10 part by mass as content for 100 part by mass of cellulose derivative, and masses depend, and preferred, masses are particularly desirable. (In this specification, mass ratio is equal to weight ratio.) In addition, in order to mix into cellulose derivative solution well, it is preferable that retardation regulator has to be compatible with cellulose derivative and compound itself does not clump. To achieve thus condition, for example, the method that the regulator solution is prepared by mixing and stirring solvent and regulator, and then this regulator solution is added to bit of cellulose derivative solution prepared separately and mixed, and then the mixture is additionally mixed with main cellulose derivative dope solution is given. However the present invention is not particularly limited to such an addition method.

As described above, it is preferable that cellulose derivative film in the present invention include at least 1 kind of the compound represented as following formula (1-1) as retardation regulator.

Formula (1-1)

$$Ar^1—L^1—(Ar^2—L^2)_n—Ar^3$$

wherein $Ar^1$, $Ar^2$ and $Ar^3$ independently represent each an aryl group or an aromatic heterocycle; $L^1$ and $L^2$ independently represent each a single bond or a divalent linking group; and n is an integer of 3 or more, provided that $Ar^2$ and $L^2$ may be either the same or different.

Next, the compound represented by the formula (1-1) will be described in greater detail.

In the formula (1-1), $Ar^1$, $Ar^2$ and $Ar^3$ independently represent each an aryl group or an aromatic heterocycle; $L^1$ and $L^2$ independently represent each a single bond or a divalent linking group; and n is an integer of 3 or more. $Ar^2$ and $L^2$ may be either the same or different.

Aryl groups represented by $Ar^1$, $Ar^2$ and $Ar^3$ are preferably aryl groups having from 6 to 30 carbon atoms. They may be either monocyclic groups or form fused rings with other rings. If possible, such an aryl group may have a substituent and examples of the substituent include the substituent T which will be described hereinafter.

Preferable examples of the aryl groups include those having from 6 to 20 carbon atoms, more preferably from 6 to 12 carbon atoms such as phenyl, p-methylphenyl and naphthyl.

Aromatic heterocycles represented by $Ar^1$, $Ar^2$ and $Ar^3$ may be any heterocycles having at least one member selected from among an oxygen atom, a nitrogen atom and a sulfur atom. Preferable examples thereof are 5- or 6-membered aromatic heterocycles having at least one member selected from among an oxygen atom, a nitrogen atom and a sulfur atom. If possible, such a heterocycle may have a substituent and examples of the substituent include the substituent T which will be described hereinafter.

Specific examples of the aromatic heterocycles include furan, pyrrole, thiophene, imidazole, pyrazole, pyridine, pyrazine, pyridazine, triazole, triazine, indole, indazole, purine, thiazoline, thiazole, thiadiazole, oxazoline, oxazole, oxadiazole, quinoline, isoquinoline, phthalazine, naphthylidine, quinoxaline, quinazoline, cinnoline, pteridine, acridine, phenanthridine, phenazine, tetrazole, benzimidazole, benzoxazole, benzthiazole, benzotriazole, tetrazaindene, pyrrolotriazole, pyrazotriazole and so on. Preferable examples of the aromatic heterocycles include benzimidazole, benzoxazole, benzthiazole and benztriazole.

In the formula (1-1), $L^1$ and $L^2$ represent each a single bond or a divalent linking group. Preferable example of the divalent linking group include a group represented by —$NR^7$— (wherein $R^7$ represents a hydrogen atom or an alkyl group or an aryl group which may have a substituent), —$SO_2$—, —CO—, an alkylene group, a substituted alkylene group, an alkenylene group, a substituted alkenylene group, an alkynylene group, —O—, —S—, —SO— and a group obtained by combining two or more of these divalent groups. Among them, —O—, —CO—, —$SO_2NR^7$—, —$NR^7SO_2$—, —$CONR^7$—, —$NR^7CO$—, —COO—, —OCO— and an alkynylene group are more preferable.

In the formula (1-1), $Ar^2$ is bonded to $L^1$ and $L^2$. In the case where $Ar^2$ is a phenylene group, it is most preferred that $L^1$-$Ar^2$-$L^2$ and $L^2$-$Ar^2$-$L^2$ are located in the para-configuration (1,4-positions).

n is an integer of 3 or more, preferably from 3 to 7 and more preferably form 3 to 5.

In the compounds represented by the formula (1-1), a compound represented by the following formula (1-2) is preferred. Next, the formula (1-2) will be described in greater detail.

Formula (1-2)

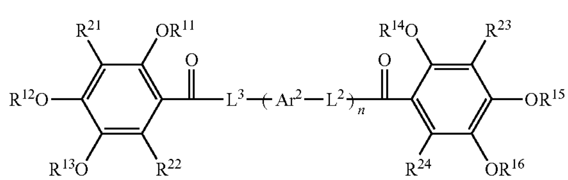

In the formula (1-2), $R^{11}$, $R^{12}$, $R^{13}$, $R^{14}$, $R^{15}$, $R^{16}$, $R^{21}$, $R^{22}$, $R^{23}$ and $R^{24}$ independently represent each a hydrogen atom or a substituent; $Ar^2$ represents an aryl group or an aromatic heterocycle; $L^2$ and $L^3$ independently represent each a single bond or a divalent linking group; and n is an integer of 3 or more, provided that $Ar^2$ and $L^2$ may be either the same or different.

Examples of $Ar^2$, $L^2$ and n are the same as in the formula (1-1). $L^3$ represents a single bond or a divalent linking group. Preferable examples of the divalent linking group include a group represented by —$NR^7$— (wherein $R^7$ represents a hydrogen atom or an alkyl group or an aryl group which may have a substituent), an alkylene group, a substituted alkylene group, —O— and a group obtained by combining two or more of these divalent groups. Among them, —O—, —$NR^7$—, —$NR^7SO_2$— and —$NR^7CO$—, are more preferable.

$R^{11}$, $R^{12}$, $R^{13}$, $R^{14}$, $R^{15}$ and $R^{16}$ independently represent each a hydrogen atom or a substituent. A hydrogen atom, an alkyl group and an aryl group are preferable, a hydrogen atom, an alkyl group having from 1 to 4 carbon atoms (for example, methyl, ethyl, propyl or isopropyl group) and an aryl group having from 6 to 12 carbon atoms (for example, phenyl or naphthyl group) are more preferable and an alkyl group having from 1 to 4 carbon atoms is more preferable.

$R^{21}$, $R^{22}$, $R^{23}$ and $R^{24}$ independently represent each a hydrogen atom or a substituent. A hydrogen atom, an alkyl group an alkoxy group and a hydroxyl group are preferable, and a hydrogen atom, an alkyl group (preferably having from 1 to 4 carbon atoms, more preferably a methyl group) are more preferable.

Next, the substituent T as described above will be illustrated.

Preferable examples of the substituent T include halogen atoms (for example, a fluorine atom, a chlorine atom, a bromine atom and an iodine atom), alkyl groups (preferably alkyl groups having from 1 to 30 carbon atoms such as methyl, ethyl, n-propyl, isopropyl, t-butyl, n-octyl and 2-ethylhexyl), cycloalkyl groups (preferably substituted or unsubstituted cycloalkyl groups having from 3 to 30 carbon atoms such as cyclohexyl, cyclopentyl and 4-n-dodecylcyclohexyl), bicycloalkyl groups (preferably substituted or unsubstituted bicycloalkyl groups having from 5 to 30 carbon atoms, i.e., monovalent groups remaining after removing a hydrogen atom from bicycloalkanes having from 5 to 30 carbon atoms such as bicyclo[1,2,2]heptan-2-yl, bicyclo[2,2,2]octan-3-yl), alkenyl groups (preferably substituted or unsubstituted alkenyl groups having from 2 to 30 carbon atoms such as vinyl and allyl), cycloalkenyl groups (preferably substituted or unsubstituted cycloalkenyl groups having from 3 to 30 carbon atoms, i.e., monovalent groups remaining after removing a hydrogen atom from cycloalkenes having from 3 to 30 carbon atoms such as 2-cyclopenten-1-yl and 2-cyclohexen-1-yl), bicycloalkenyl groups (substituted or unsubstituted bicycloalkenyl groups, preferably substituted or unsubstituted bicycloalkenyl groups having from 5 to 30 carbon atoms, i.e., monovalent groups remaining after removing a hydrogen atom in bicycloalkenes having one double bond such as bicyclo[2,2,1]hept-2-en-1-yl and bicyclo[2,2,2]oct-2-en-4-yl), alkynyl groups (preferably substituted or unsubstituted alkynyl groups having from 2 to 30 carbon atoms such as ethynyl and propargyl), aryl groups (preferably substituted or unsubstituted aryl groups having from 6 to 30 carbon atoms such as phenyl, p-tolyl and naphthyl), heterocycles (preferably monovalent groups remaining after removing one hydrogen atom from substituted or unsubstituted and aromatic or non-aromatic 5- or 6-membered heterocyclic compounds, more preferably 5- or 6-membered aromatic heterocycles having from 3 to 30 carbon atoms such as 2-furyl, 2-thienyl, 2-pyrimidinyl and 2-benzthiazolyl), a cyano group, a hydroxyl group, a nitro group, a carboxyl group, alkoxy groups (preferably substituted or unsubstituted alkoxy groups having from 1 to 30 carbon atoms such as methoxy, ethoxy, isopropoxy, t-butoxy, n-octyloxy and 2-methoxyethoxy), aryloxy groups (preferably substituted or unsubstituted aryloxy groups having from 6 to 30 carbon atoms such as phenoxy, 2-methylphenoxy, 4-t-butylphenoxy, 3-nitrophenoxy and 2-tetradecanoylaminophenoxy), silyloxy groups (preferably silyloxy groups having from 3 to 20 carbon atoms such as trimethylsilyloxy and t-butyldimethylsilyloxy), heterocyclic oxy groups (preferably substituted or unsubstituted heterocyclic oxy groups having from 2 to 30 carbon atoms such as 1-phenyltetrazol-5-oxy and 2-tetrahydropyranyloxy), acyloxy groups (preferably a formyloxy group, substituted or unsubstituted alkylcarbonyloxy groups having from 2 to 30 carbon atoms and substituted or unsubstituted arylcarbonyloxy groups having from 6 to 30 carbon atoms such as formyloxy, acetyloxy, pivaloyloxy, stearoyloxy, benzoyloxy and p-methoxyphenylcarbonyloxy), carbamoyloxy groups (preferably substituted or unsubstituted carbamoyloxy groups having from 1 to 30 carbon atoms such as N,N-dimethylcarbamoyloxy, N,N-diethylcarbamoyloxy, morpholinocarbonyloxy, N,N-di-n-octylaminocarbonyloxy and N-n-octylcarbamoyloxy), alkoxycarbonyloxy groups (preferably substituted or unsubstituted alkoxycarbonyloxy groups having from 2 to 30 carbon atoms such as methoxycarbonyloxy, ethoxycarbonyloxy, t-butoxycarbonyloxy and n-octylcarbonyloxy), aryloxycarbonyloxy groups (preferably substituted or unsubstituted aryloxycarbonyloxy groups having from 7 to 30 carbon atoms such as phenoxycarbonyloxy, p-methoxyphenoxycarbonyloxy and p-n-hexadecyloxyphenoxycarbonyloxy), amino groups (preferably substituted or unsubstituted alkylamino groups having from 1 to 30 carbon atoms and substituted or unsubstituted anilino groups having from 6 to 30 carbon atoms such as amino, methylamino, dimethylamino, anilino, N-methyl-anilino and diphenylamino), acylamino groups (preferably a formylamino group, substituted or unsubstituted alkylcarbonylamino groups having from 1 to 30 carbon atoms and substituted or unsubstituted arylcarbonylamino groups having from 6 to 30 carbon atoms such as formylamino, acetylamino, pivaloylamino, lauroylamino and benzoylamino), aminocarbonylamino groups (preferably substituted or unsubstituted aminocarbonylamino groups having from 1 to 30 carbon atoms such as carbamoylamino, N,N-dimethylaminocarbonylamino, N,N-diethylaminocarbonylamino and morpholinocarbonylamino), alkoxycarbonylamino groups (preferably substituted or unsubstituted alkoxycarbonylamino groups having from 2 to 30 carbon atoms such as methoxycarbonylamino, ethoxycarbonylamino, t-butoxycarbonylamino, n-octadecyloxycarbonylamino and N-methyl-methoxycarbonylamino), aryloxycarbonylamino groups (preferably substituted or unsubstituted aryloxycarbonylamino groups having from 7 to 30 carbon atoms such as phenoxycarbonylamino, p-chlorophenoxycarbonylamino and m-n-octyloxyphenoxycarbonylamino), sulfamoylamino groups (preferably substituted or unsubstituted sulfamoylamino groups having from 0 to 30 carbon atoms such as sulfamoylamino, N,N-dimethylaminosulfonylamino and N-n-octylaminosulfonylamino), alkyl- and arylsulfonylamino groups (preferably substituted or unsubstituted alkylsulfonylamino groups having from 1 to 30 carbon atoms and substituted or unsubstituted arylsulfonylamino groups having from 6 to 30 carbon atoms such as methylsulfonylamino, butylsulfonylamino, phenylsulfonylamino, 2,3,5-trichlorophenylsulfonylamino and p-methylphenylsulfonylamino), a mercapto group, alkylthio groups (preferably substituted or unsubstituted alkylthio groups having from 1 to 30 carbon atoms such as methylthio, ethylthio and n-hexadecylthio), arylthio groups (preferably substituted or unsubstituted arylthio groups having from 6 to 30 carbon atoms such as phenylthio, p-chlorophenylthio and m-methoxyphenylthio), heterocyclic thio groups (preferably substituted or unsubstituted heterocyclic thio groups having from 2 to 30 carbon atoms such as 2-benzothiazolylthio and 1-phentyltetrazol-5-ylthio), sulfamoyl groups (preferably sulfamoyl groups having from 0 to 30 carbon atoms such as N-ethylsulfamoyl, N-(3-dodecyloxypropyl)sulfamoyl, N,N-dimethylsulfamoyl, N-acetylsulfamoyl, N-benzoylsulfamoyl and N—(N'-phenylcarbamoyl)sulfamoyl), a sulfo group, alkyl- and arylsulfinyl groups (preferably substituted or unsubstituted alkylsulfinyl group having from 1 to 30 carbon atoms and substituted or unsubstituted arylsulfinyl group having from 6 to 30 carbon atoms such as methylsulfinyl, ethylsulfinyl, phenylsulfinyl and p-methylphenylsulfinyl), alkyl- and arylsulfonyl groups (preferably substituted or unsubstituted alkylsulfonyl groups having from 1 to 30 carbon atoms and substituted or unsubstituted arylsulfonyl groups having from 6 to 30 carbon atoms such as methylsulfonyl, ethylsulfonyl, phenylsulfonyl and p-methylphenylsulfonyl), acyl groups (preferably a formyl group, substituted or unsubstituted alkylcarbonyl groups having from 2 to 30 carbon atoms and substituted or unsubstituted arylcarbonyl groups having from 7 to 30 carbon atoms such as acetyl and pivaloylbenzoyl), aryloxycarbonyl groups (preferably substituted or unsubstituted aryloxycarbonyl groups having from 7 to 30 carbon atoms such as phenoxycarbonyl, o-chlorophenoxycarbonyl, m-nitrophenoxycarbonyl and p-t-butylphenoxycarbonyl), alkoxycarbonyl groups (preferably substituted or unsubstituted alkoxycarbonyl groups having from 2 to 30 carbon atoms such as methoxycarbonyl, ethoxycarbonyl, t-butoxycarbonyl and n-octadecyloxycarbonyl), carbamoyl groups (preferably substituted or unsubstituted carbamoyl having from 1 to 30 carbon atoms such as carbamoyl, N-methylcarbamoyl, N,N-dimethylcarbamoyl, N,N-di-n-octylcarbamoyl and N-(methylsulfonyl)carbamoyl), aryl- and heterocyclic azo groups (preferably substituted or unsubstituted arylazo groups having from 6 to 30 carbon atoms and substituted or unsubstituted heterocyclic azo groups having from 3 to 30 carbon atoms such as phenylazo, p-chlorophenylazo and 5-ethylthio-1,3,4-thiadiazol-2-ylaoz), imide groups (preferably N-succinimide and N-phthalimide), phosphino groups (preferably substituted or unsubstituted phosphino groups having from 2 to 30 carbon atoms such as dimethylphosphino, diphenylphosphino and methylphenoxyphosphino), phosphinyl groups (preferably substituted or unsubstituted phosphinyl groups having from 2 to 30 carbon atoms such as phosphinyl, dioctyloxyphosphinyl and diethoxyphosphinyl), phosphinyloxy groups (preferably substituted or unsubstituted phosphinyloxy groups having from 2 to 30 carbon atoms such as diphenoxyphosphinyloxy and dioctyloxyphosphinyloxy), phosphinylamino groups (preferably substituted or unsubstituted phosphinylamino groups having from 2 to 30 carbon atoms such as dimethoxyphosphinylamino and dimethylaminophosphinylamino) and silyl groups (preferably substituted or unsubstituted silyl groups having from 3 to 30 carbon atoms such as trimethylsilyl, t-butyldimethylsilyl and phenyldimethylsilyl).

In the substituents as cited above, those having a hydrogen atom may be further substituted, after removing the hydrogen atom, by a substituent as described above. Examples of such functional groups include alkylcarbonylaminosulfonyl groups, arylcarbonylaminosulfonyl groups, alkylsulfonylaminocarbonyl groups and arylsulfonylaminocarbonyl groups. Examples thereof include methylsulfonylaminocarbonyl, p-methylphenylsulfonylaminocarbonyl, acetylaminosulfonyl and benzoylaminosulfonyl groups.

In the case of having two or more substituents, these substituents may be either the same or different. If possible, these substituents may be bonded together to form a ring.

Next, the compounds represented by the formula (1-1) and the formula (1-2) will be described in greater detail by referring to specific examples thereof, though the invention is not restricted to these specific examples.

(1)

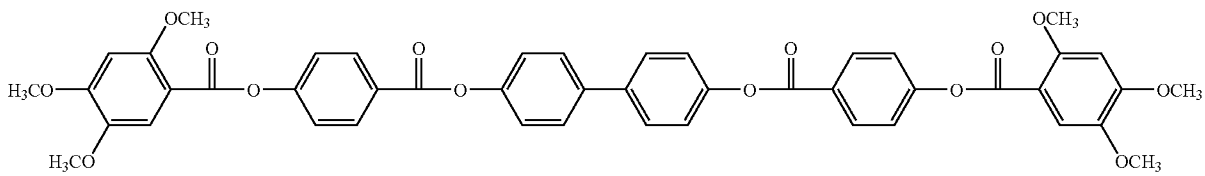

(2)

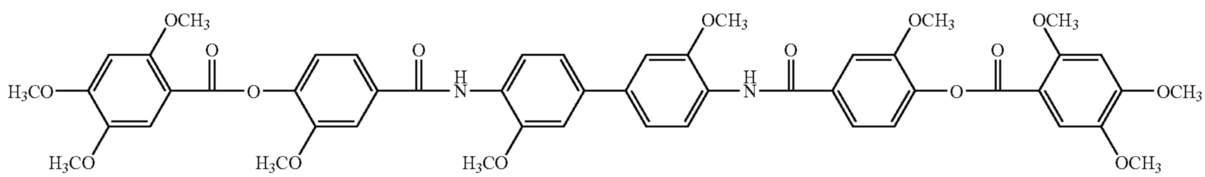

(3)

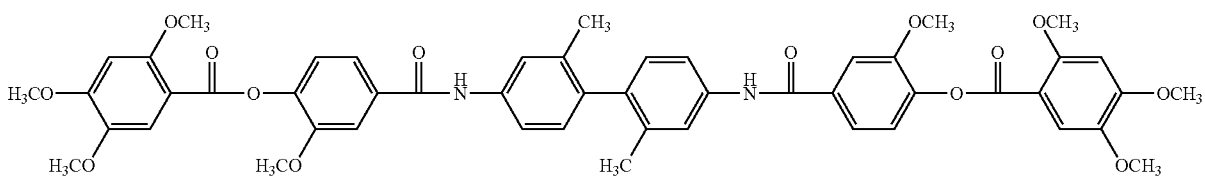

(4)

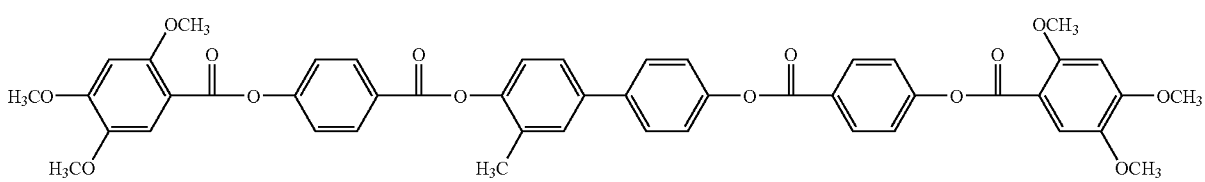

(5)

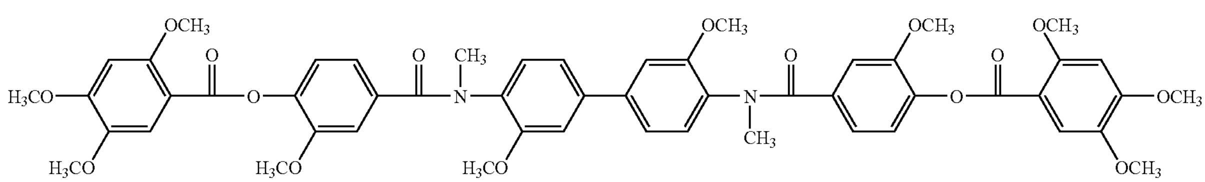

(6)

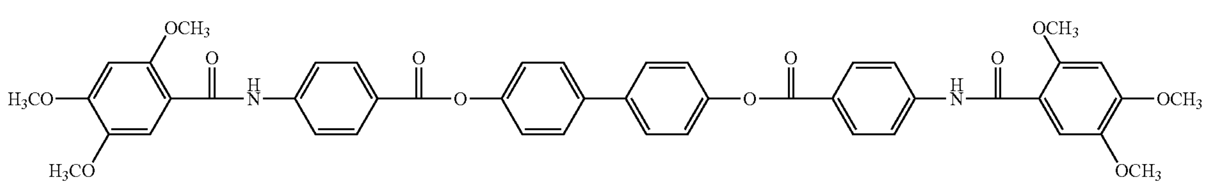

(7)

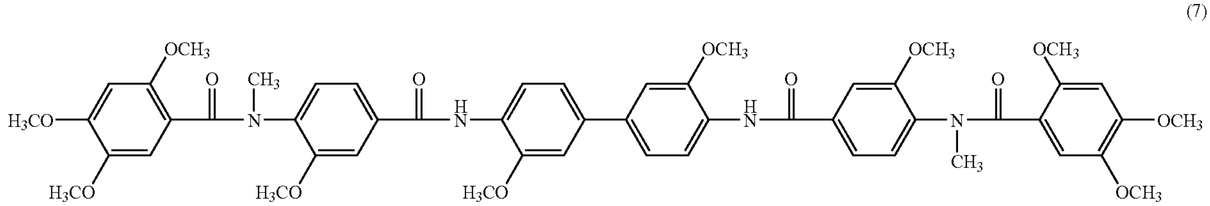

-continued
(8)
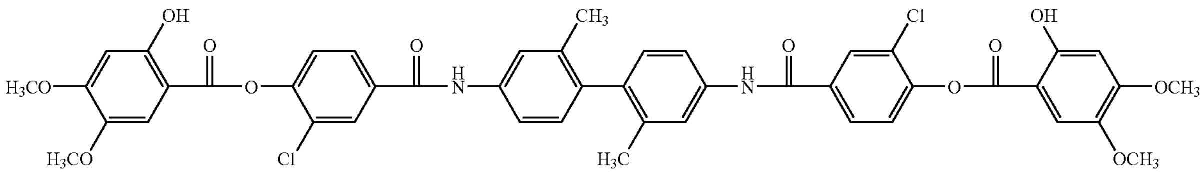
(9)
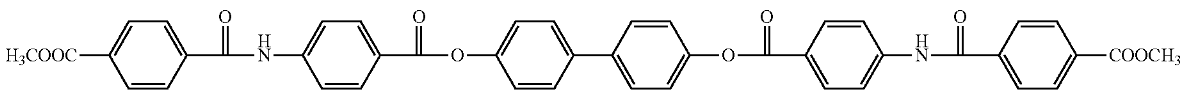
(10)
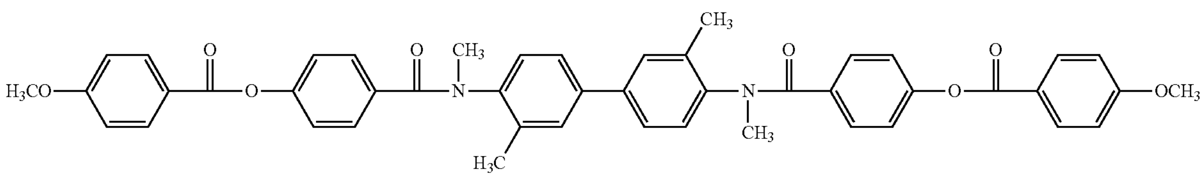
(11)
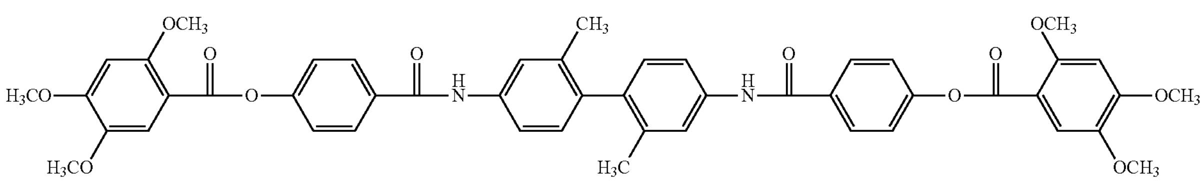
(12)
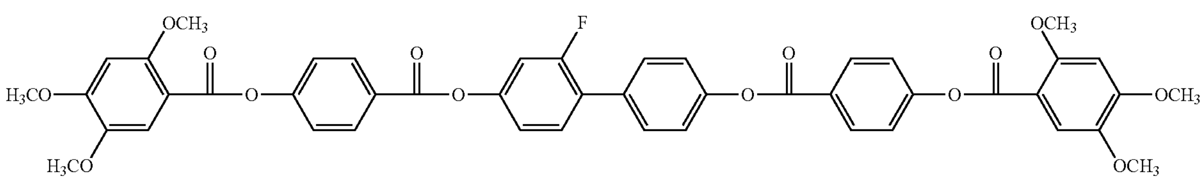
(13)
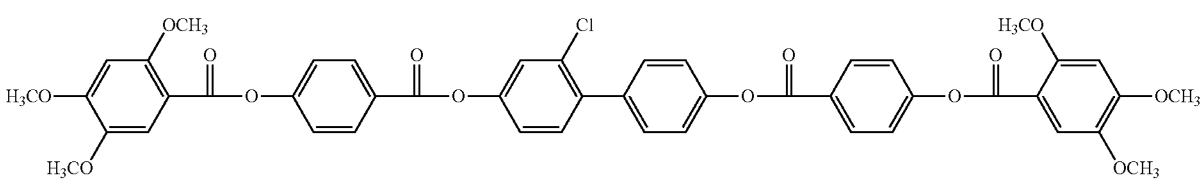
(14)
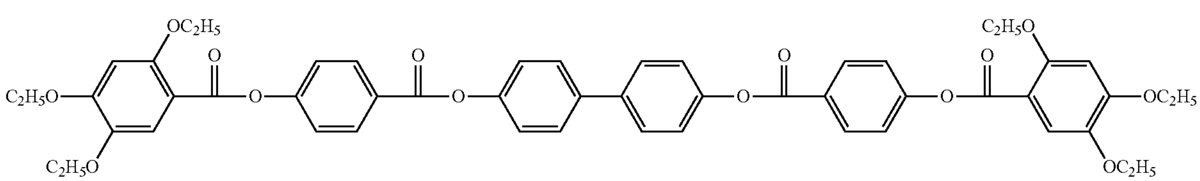
(15)
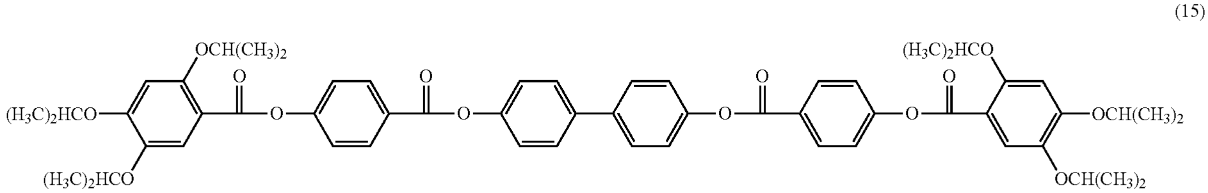

-continued
(16)
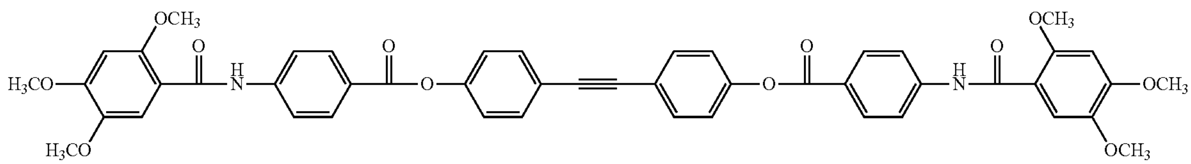
(17)
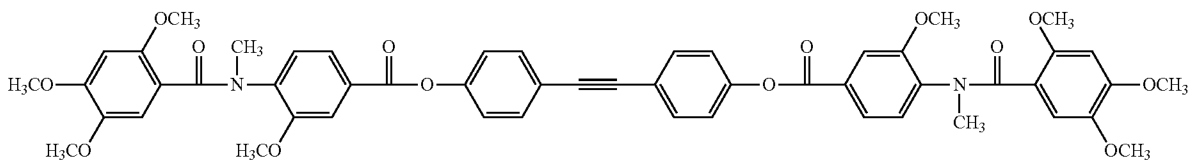
(18)
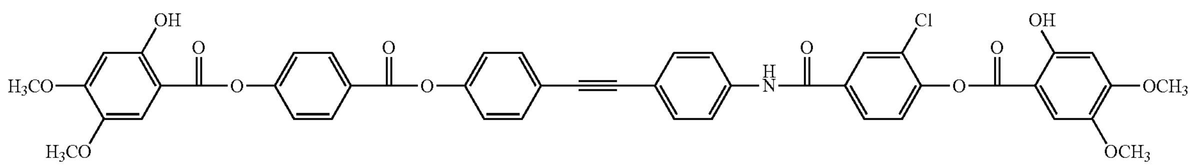
(19)
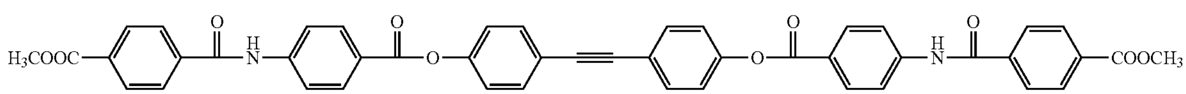
(20)
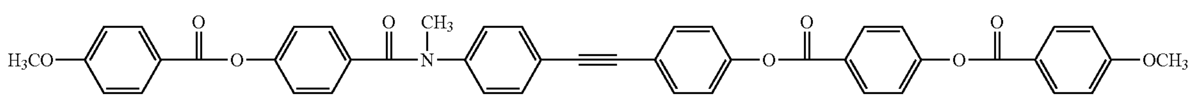
(21)
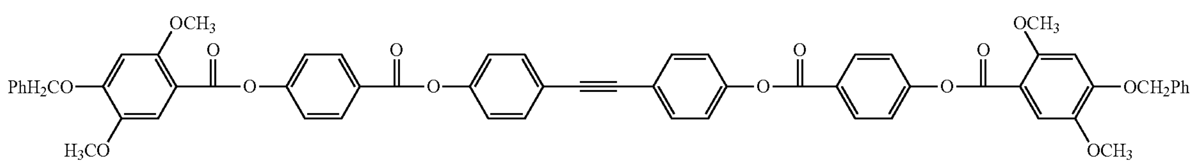
(22)
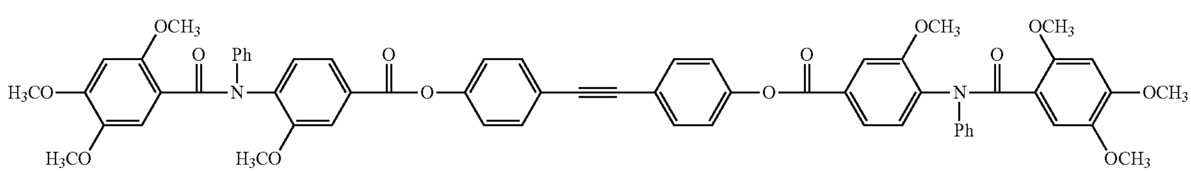
(23)
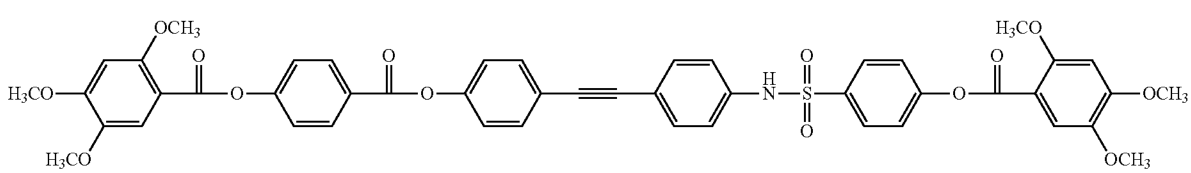
(24)
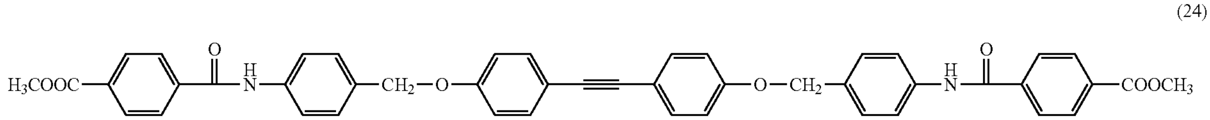
(25)
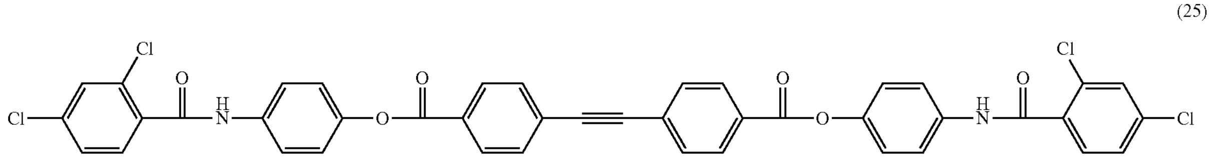

-continued
(26)
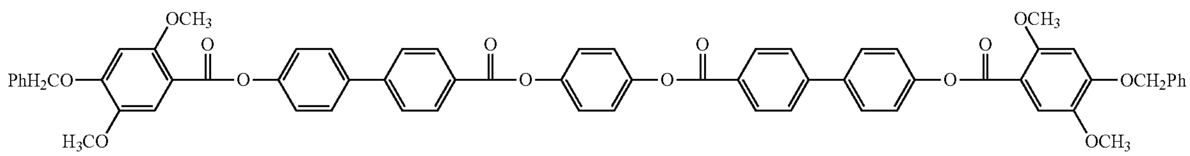
(27)
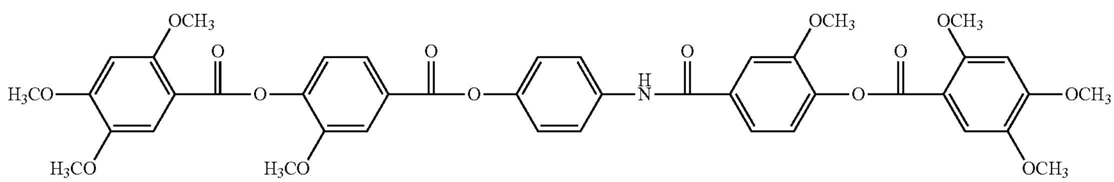
(28)
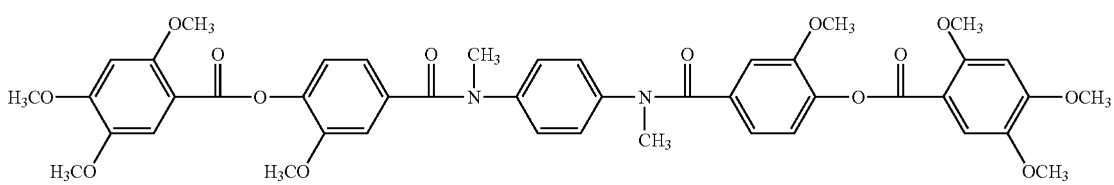
(29)
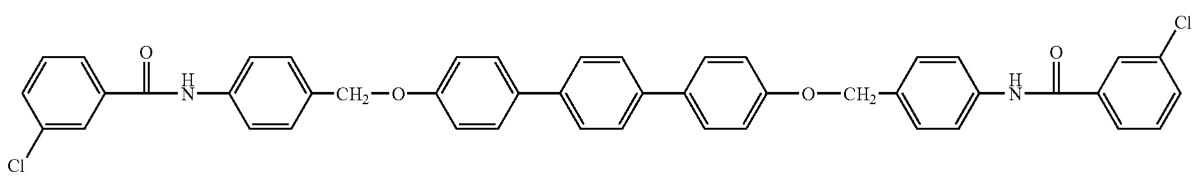
(30)
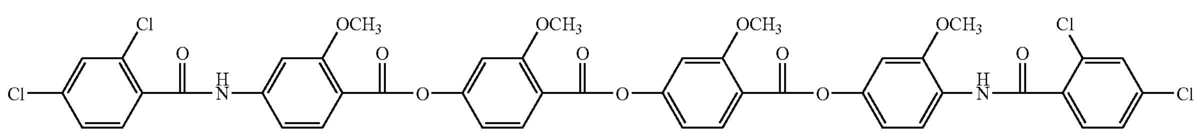
(31)
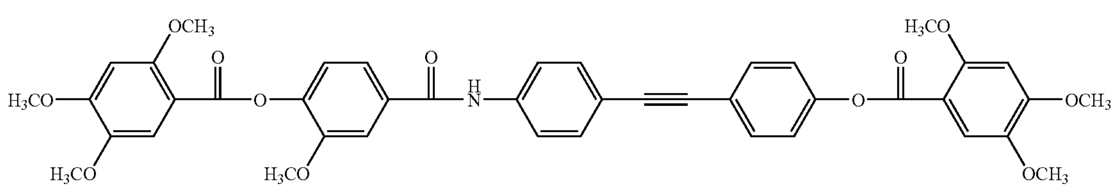
(32)
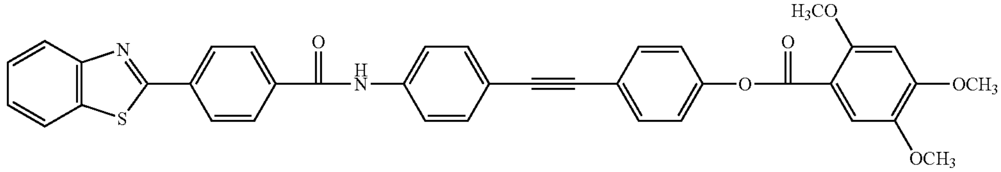
(33)
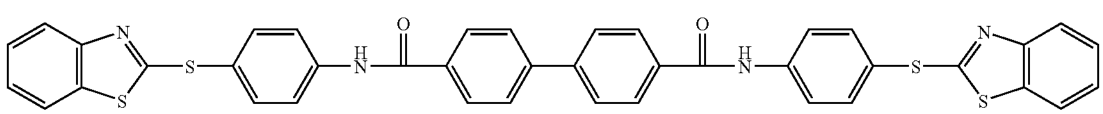

-continued
(34)
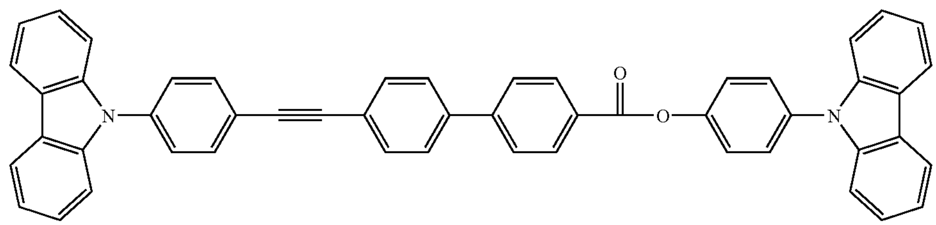
(35)
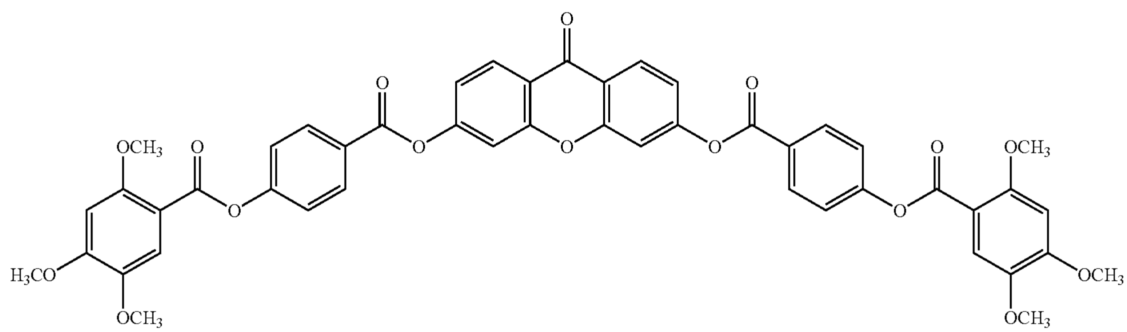
(36)
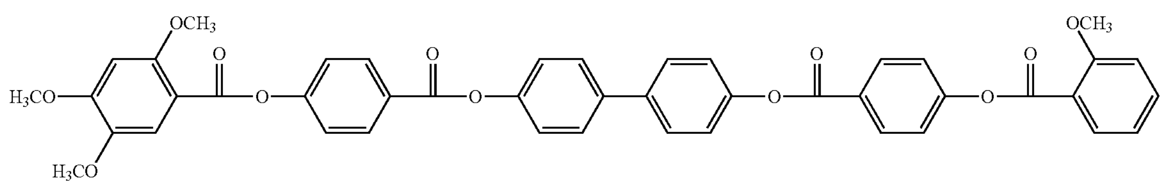
(37)
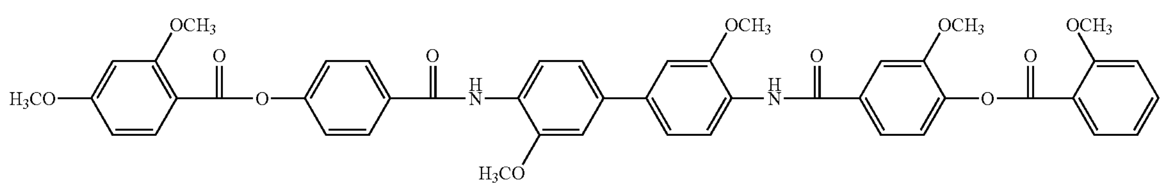
(38)
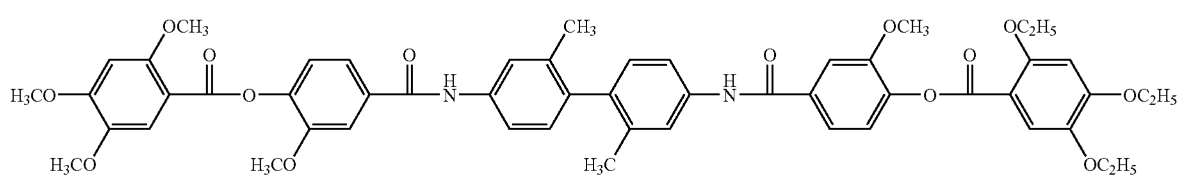
(39)
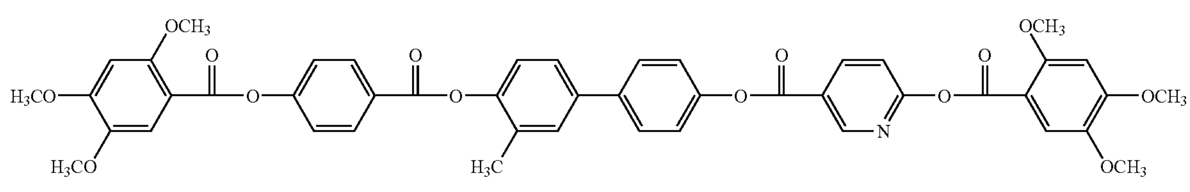

-continued (40)

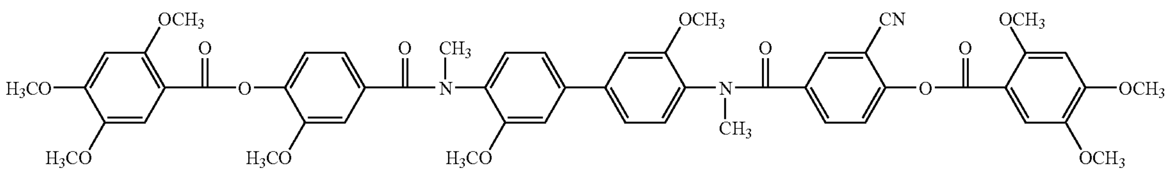

Moreover, a compound represented by the following formula (1-3) is preferred too.

Formula (1-3)

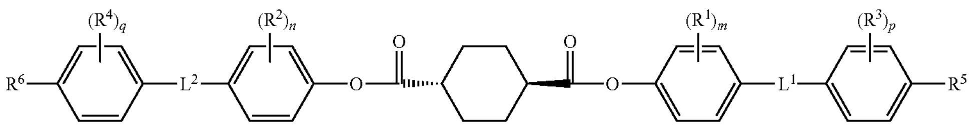

wherein $R^1$, $R^2$, $R^3$, $R^4$, $R^5$ and $R^6$ independently represent each a substituent; $L^1$ and $L^2$ independently represent each a single bond or a divalent linking group; n and m independently represent each an integer of from 0 to 4; and p and q independently represent each an integer of from 0 to 3.

$R^1$, $R^2$, $R^3$, $R^4$, $R^5$ and $R^6$ independently represent each a hydrogen atom or a substituent. $R^1$, $R^2$, $R^3$, $R^4$, $R^5$ and $R^6$ may be either the same or different. Preferable examples of the substituents include halogen atoms (for example, a fluorine atom, a chlorine atom, a bromine atom and an iodine atom), alkyl groups (preferably alkyl groups having from 1 to 30 carbon atoms such as methyl, ethyl, n-propyl, isopropyl, t-butyl, n-octyl and 2-ethylhexyl), cycloalkyl groups (preferably substituted or unsubstituted cycloalkyl groups having from 3 to 30 carbon atoms such as cyclohexyl, cyclopentyl and 4-n-dodecylcyclohexyl), bicycloalkyl groups (preferably substituted or unsubstituted bicycloalkyl groups having from 5 to 30 carbon atoms, i.e., monovalent groups remaining after removing a hydrogen atom from bicycloalkanes having from 5 to 30 carbon atoms such as bicyclo[1,2,2]heptan-2-yl, bicyclo[2,2,2]octan-3-yl), alkenyl groups (preferably substituted or unsubstituted alkenyl groups having from 2 to 30 carbon atoms such as vinyl and allyl), cycloalkenyl groups (preferably substituted or unsubstituted cycloalkenyl groups having from 3 to 30 carbon atoms, i.e., monovalent groups remaining after removing a hydrogen atom from cycloalkenes having from 3 to 30 carbon atoms such as 2-cyclopenten-1-yl and 2-cyclohexen-1-yl), bicycloalkenyl groups (substituted or unsubstituted bicycloalkenyl groups, preferably substituted or unsubstituted bicycloalkenyl groups having from 5 to 30 carbon atoms, i.e., monovalent groups remaining after removing a hydrogen atom in bicycloalkenes having one double bond such as bicyclo[2,2,1]hept-2-en-1-yl and bicyclo[2,2,2]oct-2-en-4-yl), alkynyl groups (preferably substituted or unsubstituted alkynyl groups having from 2 to 30 carbon atoms such as ethynyl and propargyl), aryl groups (preferably substituted or unsubstituted aryl groups having from 6 to 30 carbon atoms such as phenyl, p-tolyl and naphthyl), heterocycles (preferably monovalent groups remaining after removing one hydrogen atom from substituted or unsubstituted and aromatic or non-aromatic 5- or 6-membered heterocyclic compounds, more preferably 5- or 6-membered aromatic heterocycles having from 3 to 30 carbon atoms such as 2-furyl, 2-thienyl, 2-pyrimidinyl and 2-benzthiazolyl), a cyano group, a hydroxyl group, a nitro group, a carboxyl group, alkoxy groups (preferably substituted or unsubstituted alkoxy groups having from 1 to 30 carbon atoms such as methoxy, ethoxy, isopropoxy, t-butoxy, n-octyloxy and 2-methoxyethoxy), aryloxy groups (preferably substituted or unsubstituted aryloxy groups having from 6 to 30 carbon atoms such as phenoxy, 2-methylphenoxy, 4-tert-butylphenoxy, 3-nitrophenoxy and 2-tetradecanoylaminophenoxy), silyloxy groups (preferably silyloxy groups having from 3 to 20 carbon atoms such as trimethylsilyloxy and tert-butyldimethylsilyloxy), heterocyclic oxy groups (preferably substituted or unsubstituted heterocyclic oxy groups having from 2 to 30 carbon atoms such as 1-phenyltetrazol-5-oxy and 2-tetrahydropyranyloxy), acyloxy groups (preferably a formyloxy group, substituted or unsubstituted alkylcarbonyloxy groups having from 2 to 30 carbon atoms and substituted or unsubstituted arylcarbonyloxy groups having from 6 to 30 carbon atoms such as formyloxy, acetyloxy, pivaloyloxy, stearoyloxy, benzoyloxy and p-methoxyphenylcarbonyloxy), carbamoyloxy groups (preferably substituted or unsubstituted carbamoyloxy groups having from 1 to 30 carbon atoms such as N,N-dimethylcarbamoyloxy, N,N-diethylcarbamoyloxy, morpholinocarbonyloxy, N,N-di-n-octylaminocarbonyloxy and N-n-octylcarbamoyloxy), alkoxycarbonyloxy groups (preferably substituted or unsubstituted alkoxycarbonyloxy groups having from 2 to 30 carbon atoms such as methoxycarbonyloxy, ethoxycarbonyloxy, tert-butoxycarbonyloxy and n-octylcarbonyloxy), aryloxycarbonyloxy groups (preferably substituted or unsubstituted aryloxycarbonyloxy groups having from 7 to 30 carbon atoms such as phenoxycarbonyloxy, p-methoxyphenoxycarbonyloxy and p-n-hexadecyloxyphenoxycarbonyloxy), amino groups (preferably an amino group, substituted or unsubstituted alkylamino groups having from 1 to 30 carbon atoms and substituted or unsubstituted anilino groups having from 6 to 30 carbon atoms such as amino, methylamino, dimethylamino, anilino, N-methylanilino and diphenylamino), acylamino groups (preferably a formylamino group, substituted or unsubstituted alkylcarbonylamino groups having from 1 to 30 carbon atoms and substituted or unsubstituted arylcarbonylamino groups having from 6 to 30 carbon atoms such as formylamino, acetylamino, pivaloylamino, lauroylamino and benzoylamino), aminocarbonylamino groups (preferably substituted or unsubstituted aminocarbonylamino groups having from 1 to 30 carbon atoms such as carbamoylamino, N,N-dimethylaminocarbonylamino, N,N-diethylaminocarbonylamino and morpholinocarbonylamino), alkoxycarbonylamino groups (preferably substituted or unsubstituted alkoxycarbonylamino groups having from 2 to 30 carbon atoms such as methoxycarbonylamino, ethoxycarbonylamino, tert-butoxycarbonylamino, n-octadecyloxycarbonylamino and N-methyl-methoxycarbonylamino), aryloxycarbonylamino groups (preferably substituted or unsubstituted aryloxycarbonylamino groups having from 7 to 30 carbon atoms such as phenoxycarbonylamino, p-chlorophenoxycarbonylamino and m-n-octyloxyphenoxycarbonylamino), sulfamoylamino groups (preferably substituted or unsubstituted sulfamoylamino groups having from 0 to 30 carbon atoms such as sulfamoylamino, N,N-dimethylaminosulfonylamino and N-n-octylaminosulfonylamino), alkyl- and arylsulfonylamino groups (preferably substituted or unsubstituted alkylsulfonylamino groups having from 1 to 30 carbon atoms and substituted or unsubstituted arylsulfonylamino groups having from 6 to 30 carbon atoms such as methylsulfonylamino, butylsulfonylamino, phenylsulfonylamino, 2,3,5-trichlorophenylsulfonylamino and p-methylphenylsulfonylamino), a mercapto group, alkylthio groups (preferably substituted or unsubstituted alkylthio groups having from 1 to 30 carbon atoms such as methylthio, ethylthio and n-hexadecylthio), arylthio groups (preferably substituted or unsubstituted arylthio groups having from 6 to 30 carbon atoms such as phenylthio, p-chlorophenylthio and m-methoxyphenylthio), heterocyclic thio groups (preferably substituted or unsubstituted heterocyclic thio groups having from 2 to 30 carbon atoms such as 2-benzothiazolylthio and 1-phentyltetrazol-5-ylthio), sulfamoyl groups (preferably sulfamoyl groups having from 0 to 30 carbon atoms such as N-ethylsulfamoyl, N-(3-dodecyloxypropyl)sulfamoyl, N,N-dimethylsulfamoyl, N-acetylsulfamoyl, N-benzoylsulfamoyl and N—(N'-phenylcarbamoyl)sulfamoyl), a sulfo group, alkyl- and arylsulfinyl groups (preferably substituted or unsubstituted alkylsulfinyl group having from 1 to 30 carbon atoms and substituted or unsubstituted arylsulfinyl group having from 6 to 30 carbon atoms such as methylsulfinyl, ethylsulfinyl, phenylsulfinyl and p-methylphenylsulfinyl), alkyl- and arylsulfonyl groups (preferably substituted or unsubstituted alkylsulfonyl groups having from 1 to 30 carbon atoms and substituted or unsubstituted arylsulfonyl groups having from 6 to 30 carbon atoms such as methylsulfonyl, ethylsulfonyl, phenylsulfonyl and p-methylphenylsulfonyl), acyl groups (preferably a formyl group, substituted or unsubstituted alkylcarbonyl groups having from 2 to 30 carbon atoms and substituted or unsubstituted arylcarbonyl groups having from 7 to 30 carbon atoms such as acetyl and pivaloylbenzoyl), aryloxycarbonyl groups (preferably substituted or unsubstituted aryloxycarbonyl groups having from 7 to 30 carbon atoms such as phenoxycarbonyl, o-chlorophenoxycarbonyl, m-nitrophenoxycarbonyl and p-tert-butylphenoxycarbonyl), alkoxycarbonyl groups (preferably substituted or unsubstituted alkoxycarbonyl groups having from 2 to 30 carbon atoms such as methoxycarbonyl, ethoxycarbonyl, tert-butoxycarbonyl and n-octadecyloxycarbonyl), carbamoyl groups (preferably substituted or unsubstituted carbamoyl having from 1 to 30 carbon atoms such as carbamoyl, N-methylcarbamoyl, N,N-dimethylcarbamoyl, N,N-di-n-octylcarbamoyl and N-(methylsulfonyl)carbamoyl), aryl- and heterocyclic azo groups (preferably substituted or unsubstituted arylazo groups having from 6 to 30 carbon atoms and substituted or unsubstituted heterocyclic azo groups having from 3 to 30 carbon atoms such as phenylazo, p-chlorophenylazo and 5-etylthio-1,3,4-thiadiazol-2-ylaoz), imide groups (preferably N-succinimide and N-phthalimide), phosphino groups (preferably substituted or unsubstituted phosphino groups having from 2 to 30 carbon atoms such as dimethylphosphino, diphenylphosphino and methylphenoxyphosphino), phosphinyl groups (preferably substituted or unsubstituted phosphinyl groups having from 2 to 30 carbon atoms such as phosphinyl, dioctyloxyphosphinyl and diethoxyphosphinyl), phosphinyloxy groups (preferably substituted or unsubstituted phosphinyloxy groups having from 2 to 30 carbon atoms such as diphenoxyphosphinyloxy and dioctyloxyphosphinyloxy), phosphinylamino groups (preferably substituted or unsubstituted phosphinylamino groups having from 2 to 30 carbon atoms such as dimethoxyphosphinylamino and dimethylaminophosphinylamino) and silyl groups (preferably substituted or unsubstituted silyl groups having from 3 to 30 carbon atoms such as trimethylsilyl, tert-butyldimethylsilyl and phenyldimethylsilyl).

In the substituents as cited above, those having a hydrogen atom may be further substituted, after removing the hydrogen atom, by a substituent as described above. Examples of such functional groups include alkylcarbonylaminosulfonyl groups, arylcarbonylaminosulfonyl groups, alkylsulfonylaminocarbonyl groups and arylsulfonylaminocarbonyl groups. Examples thereof include methylsulfonylaminocarbonyl, p-methylphenylsulfonylaminocarbonyl, acetylaminosulfonyl and benzoylaminosulfonyl groups.

Among all, preferable examples of the substituents include alkyl groups, alkoxy groups, alkoxycarbonyl groups, acyl groups, alkoxycarbonyloxy groups, cycloalkyl groups, acylamino groups, cyano group and halogen atoms.

In the case of having two or more substituents, these substituents may be either the same or different. If possible, these substituents may be bonded together to form a ring.

In the formula (1-3), $L^1$ and $L^2$ represent each a single bond or a divalent linking group. $L^1$ and $L^2$ may be either the same or different. Preferable example of the divalent linking group include a group represented by —$NR^7$— (wherein $R^7$ represents a hydrogen atom or an alkyl group or an aryl group which may have a substituent), —$SO_2$—, —CO—, an alkylene group, a substituted alkylene group, an alkenylene group, a substituted alkenylene group, an alkynylene group, —O—, —S—, —SO— and a group obtained by combining two or more of these divalent groups. Among them, —O—, —CO—, —$SO_2NR^7$—, —$NR^7SO_2$—, —$CONR^7$—, —$NR^7CO$—, —COO—, —OCO— and an alkynylene group are more preferable. As the substituent, the examples cited as the substituents $R^1$, $R^2$, $R^3$, $R^4$, $R^5$ and $R^6$ are applicable.

n and m independently represent each an integer of from 0 to 4. In the case where m and n are each 2 or more, $R^1$s and $R^2$s in the repeating unit may be either the same or different. p and q independently represent each an integer of from 0 to 3. In the case where p and q are each 2 or more, $R^3$s and $R^4$s in the repeating unit may be either the same or different. Furthermore, $R^3$ and $R^5$, and $R^4$ and $R^6$ may be bonded together to form each a ring. From the viewpoint of controlling retardation, it is preferred that the compound represented by the formula (1-1) is a symmetric compound (i.e., the groups attached to the 1- and 4-position of cyclohexane located at the center in the formula (1-3) have the same structures).

Next, the compounds represented by the formula (1-3) will be described in greater detail by referring to specific examples thereof, though the invention is not restricted to these specific examples.

(1)
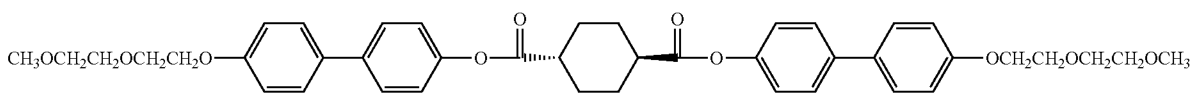
(2)
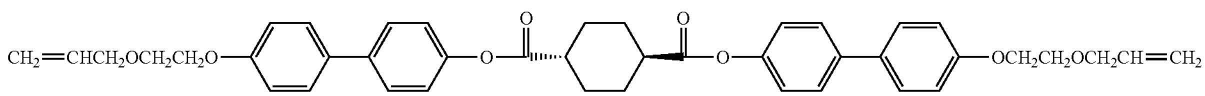
(3)
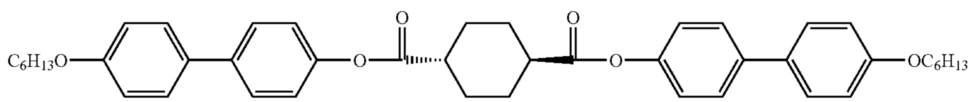
(4)
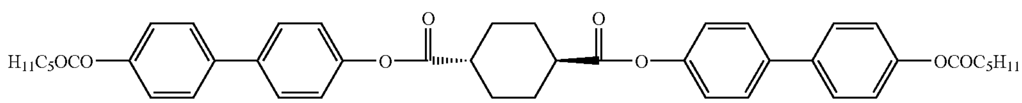
(5)
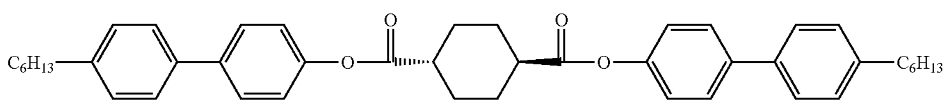
(6)
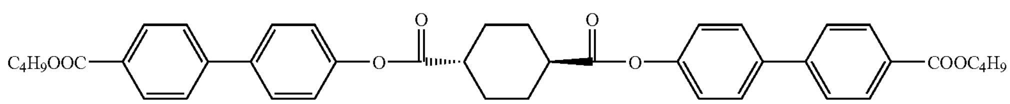
(7)
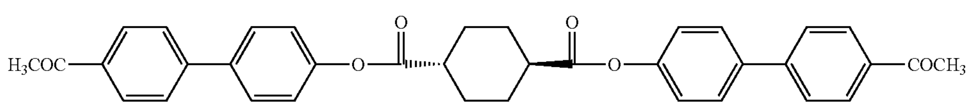
(8)
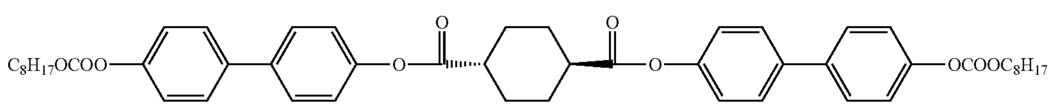
(9)
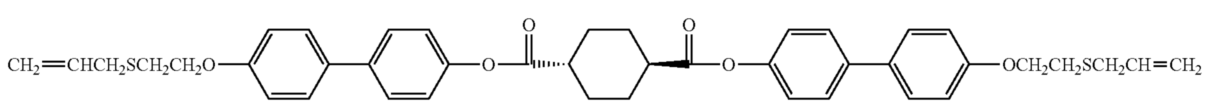
(10)
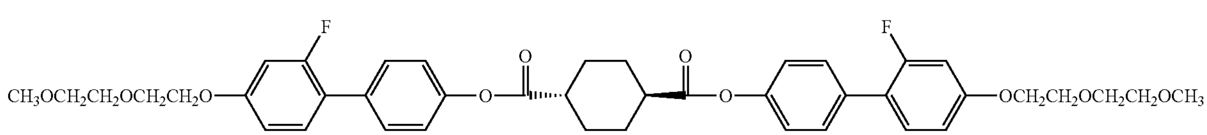
(11)
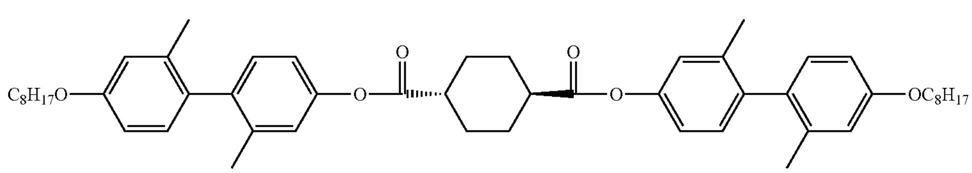
(12)
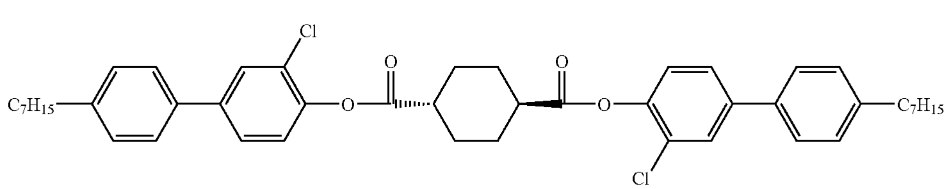

-continued
(13)
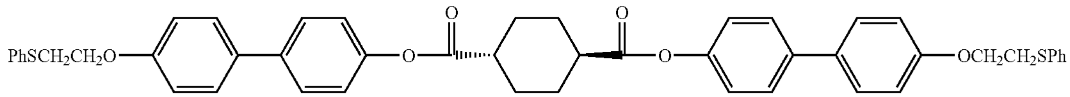
(14)
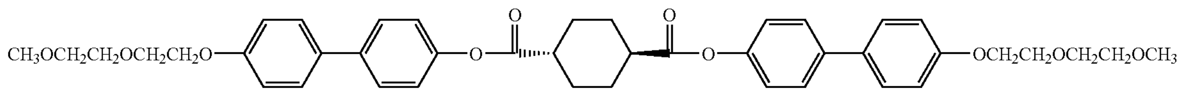
(15)
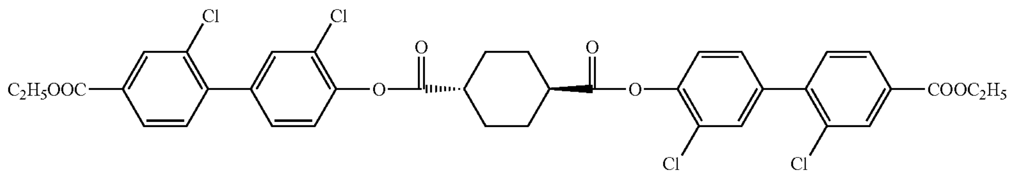
(16)
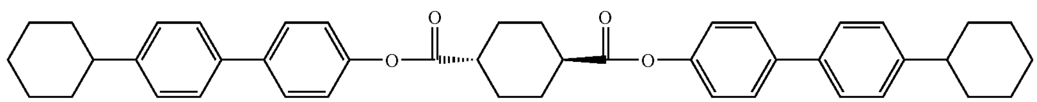
(17)
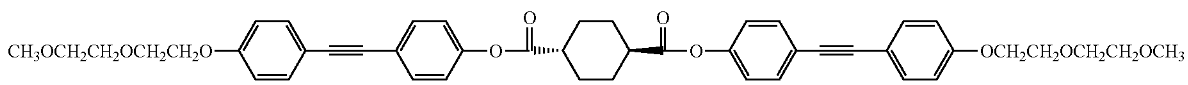
(18)
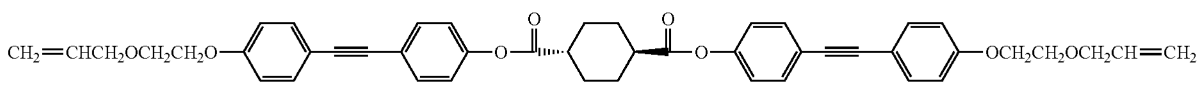
(19)
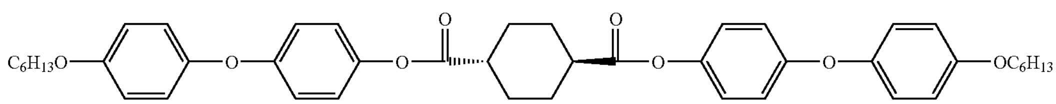
(20)
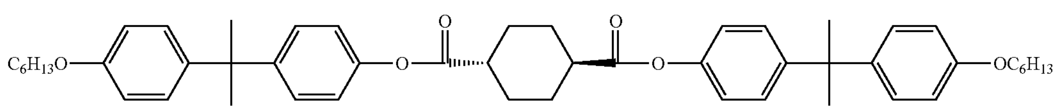
(21)
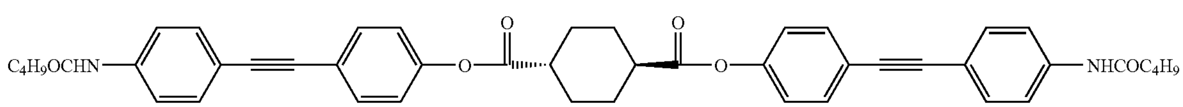
(22)
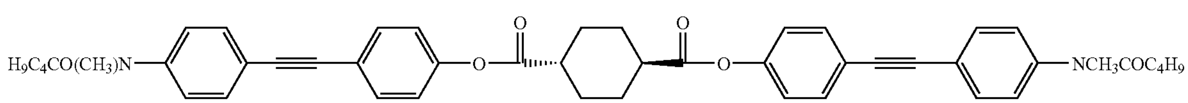
(23)
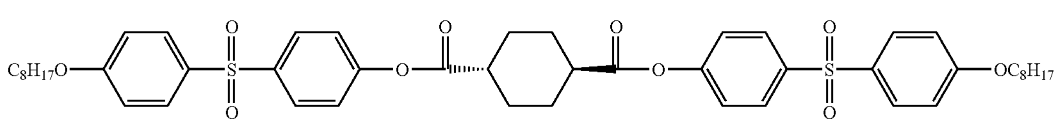
(24)
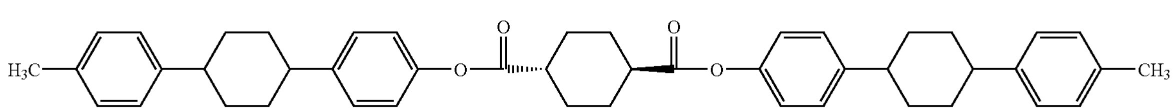
(25)
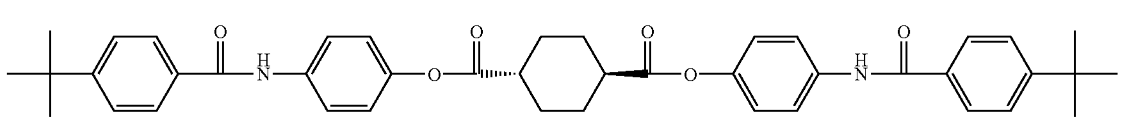

-continued
(26)
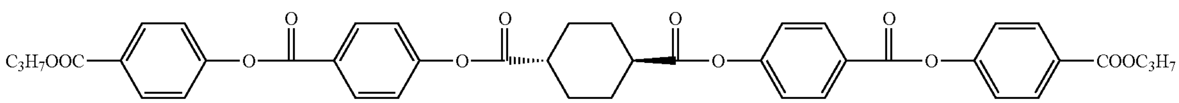
(27)
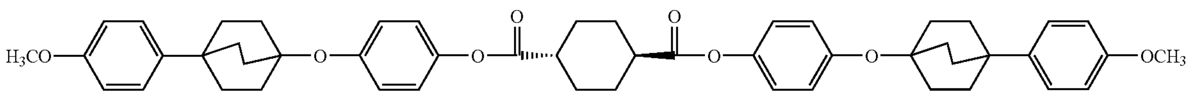
(28)
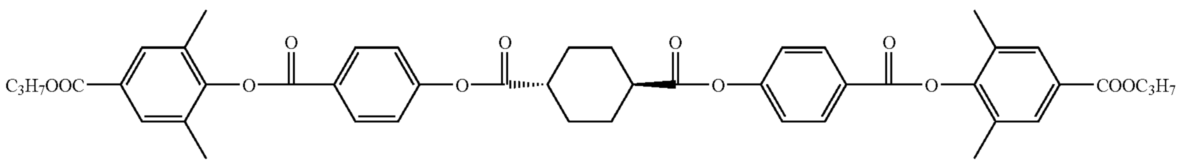
(29)
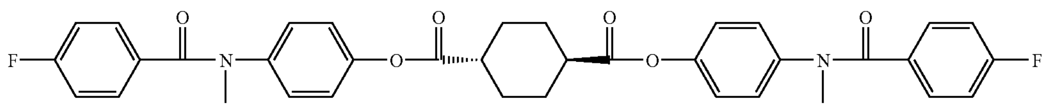
(30)
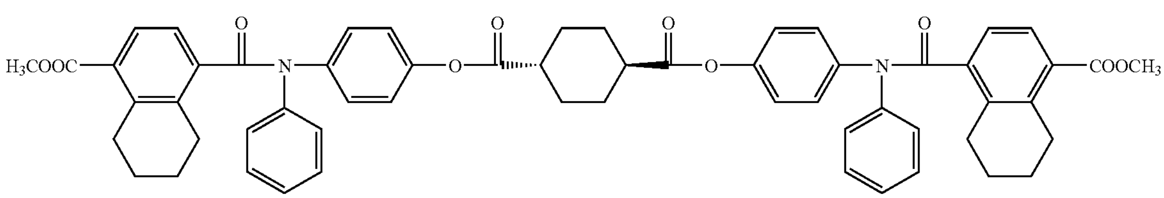
(31)
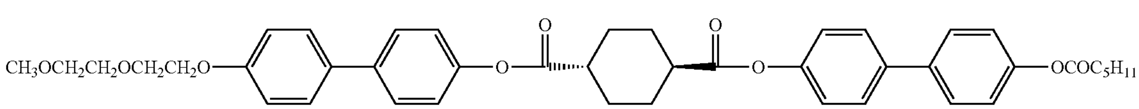
(32)
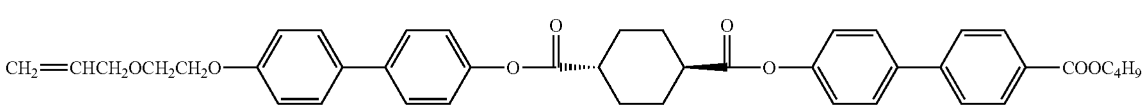
(33)
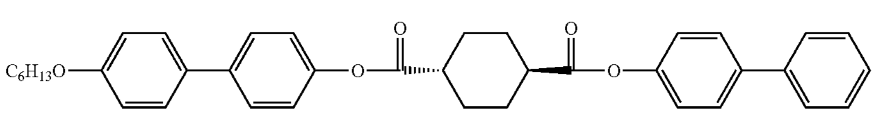
(34)
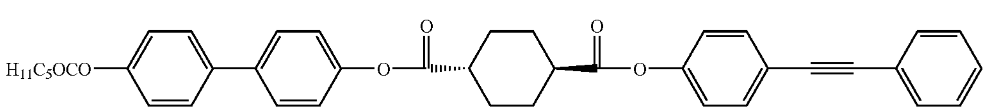
(35)
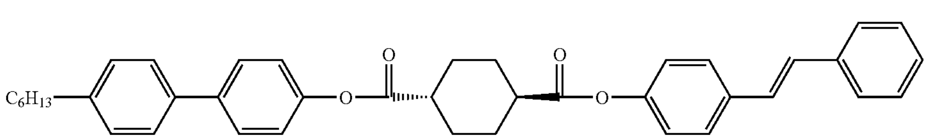

-continued (36)

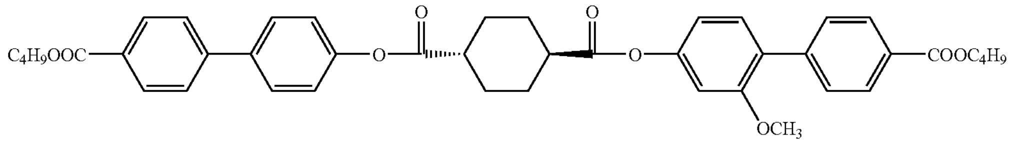

(37)

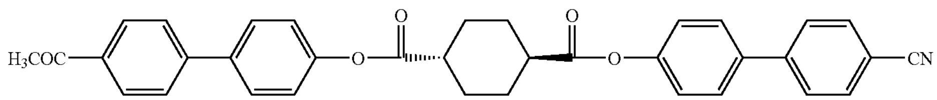

(38)

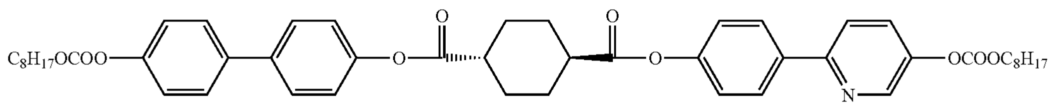

Moreover, a compound represented by the following formula (1-4) is preferred too.

Formula (1-4)

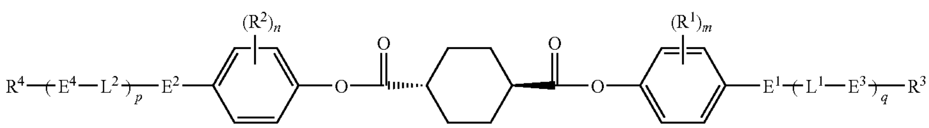

wherein $R^1$, $R^2$, $R^3$ and $R^4$ independently represent each a substituent; $E^1$, $E^2$, $E^3$ and $E^4$ independently represent each an oxygen atom or a sulfur atom; $L^1$ and $L^2$ independently represent each a divalent linking group; n and m independently represent each an integer of from 0 to 4; and p and q independently represent each an integer of from 0 to 10.

$R^1$ and $R^2$ independently represent each a substituent. Preferable examples of the substituents include halogen atoms (for example, a fluorine atom, a chlorine atom, a bromine atom and an iodine atom), alkyl groups (preferably alkyl groups having from 1 to 30 carbon atoms such as methyl, ethyl, n-propyl, isopropyl, t-butyl, n-octyl and 2-ethylhexyl), cycloalkyl groups (preferably substituted or unsubstituted cycloalkyl groups having from 3 to 30 carbon atoms such as cyclohexyl, cyclopentyl and 4-n-dodecylcyclohexyl), bicycloalkyl groups (preferably substituted or unsubstituted bicycloalkyl groups having from 5 to 30 carbon atoms, i.e., monovalent groups remaining after removing a hydrogen atom from bicycloalkanes having from 5 to 30 carbon atoms such as bicyclo[1,2,2]heptan-2-yl, bicyclo[2,2,2]octan-3-yl), alkenyl groups (preferably substituted or unsubstituted alkenyl groups having from 2 to 30 carbon atoms such as vinyl and allyl), cycloalkenyl groups (preferably substituted or unsubstituted cycloalkenyl groups having from 3 to 30 carbon atoms, i.e., monovalent groups remaining after removing a hydrogen atom from cycloalkenes having from 3 to 30 carbon atoms such as 2-cyclopenten-1-yl and 2-cyclohexen-1-yl), bicycloalkenyl groups (substituted or unsubstituted bicycloalkenyl groups, preferably substituted or unsubstituted bicycloalkenyl groups having from 5 to 30 carbon atoms, i.e., monovalent groups remaining after removing a hydrogen atom in bicycloalkenes having one double bond such as bicyclo[2,2,1]hept-2-en-1-yl and bicyclo[2,2,2]oct-2-en-4-yl), alkynyl groups (preferably substituted or unsubstituted alkynyl groups having from 2 to 30 carbon atoms such as ethynyl and propargyl), aryl groups (preferably substituted or unsubstituted aryl groups having from 6 to 30 carbon atoms such as phenyl, p-tolyl and naphthyl), heterocycles (preferably monovalent groups remaining after removing one hydrogen atom from substituted or unsubstituted and aromatic or non-aromatic 5- or 6-membered heterocyclic compounds, more preferably 5- or 6-membered aromatic heterocycles having from 3 to 30 carbon atoms such as 2-furyl, 2-thienyl, 2-pyrimidinyl and 2-benzthiazolyl), a cyano group, a hydroxyl group, a nitro group, a carboxyl group, alkoxy groups (preferably substituted or unsubstituted alkoxy groups having from 1 to 30 carbon atoms such as methoxy, ethoxy, isopropoxy, t-butoxy, n-octyloxy and 2-methoxyethoxy), aryloxy groups (preferably substituted or unsubstituted aryloxy groups having from 6 to 30 carbon atoms such as phenoxy, 2-methylphenoxy, 4-tert-butylphenoxy, 3-nitrophenoxy and 2-tetradecanoylaminophenoxy), silyloxy groups (preferably silyloxy groups having from 3 to 20 carbon atoms such as trimethylsilyloxy and tert-butyldimethylsilyloxy), heterocyclic oxy groups (preferably substituted or unsubstituted heterocyclic oxy groups having from 2 to 30 carbon atoms such as 1-phenyltetrazol-5-oxy and 2-tetrahydropyranyloxy), acyloxy groups (preferably a formyloxy group, substituted or unsubstituted alkylcarbonyloxy groups having from 2 to 30 carbon atoms and substituted or unsubstituted arylcarbonyloxy groups having from 6 to 30 carbon atoms such as formyloxy, acetyloxy, pivaloyloxy, stearoyloxy, benzoyloxy and p-methoxyphenylcarbonyloxy), carbamoyloxy groups (preferably substituted or unsubstituted carbamoyloxy groups having from 1 to 30 carbon atoms such as N,N-dimethylcarbamoyloxy, N,N-diethylcarbamoyloxy, morpholinocarbonyloxy, N,N-di-n-octylaminocarbonyloxy and N-n-octylcarbamoyloxy), alkoxycarbonyloxy groups (preferably substituted or unsubstituted alkoxycarbonyloxy groups having from 2 to 30 carbon atoms such as methoxycarbonyloxy, ethoxycarbonyloxy, tert-butoxycarbonyloxy and n-octylcarbonyloxy), aryloxycarbonyloxy groups (preferably substituted or unsubstituted aryloxycarbonyloxy groups having from 7 to 30 carbon atoms such as phenoxycarbonyloxy, p-methoxyphenoxycarbonyloxy and p-n-hexadecyloxyphenoxycarbonyloxy), amino groups (preferably an amino group, substituted or unsubstituted alkylamino groups having from 1 to 30 carbon atoms and substituted or unsubstituted anilino groups having from 6 to 30 carbon atoms such as amino, methylamino, dimethylamino, anilino, N-methyl-anilino and diphenylamino), acylamino groups (preferably a formylamino group, substituted or unsubstituted alkylcarbonylamino groups having from 1 to 30 carbon atoms and substituted or unsubstituted arylcarbonylamino groups having from 6 to 30 carbon atoms such as formylamino, acetylamino, pivaloylamino, lauroylamino and benzoylamino), aminocarbonylamino groups (preferably substituted or unsubstituted aminocarbonylamino groups having from 1 to 30 carbon atoms such as carbamoylamino, N,N-dimethylaminocarbonylamino, N,N-diethylaminocarbonylamino and morpholinocarbonylamino), alkoxycarbonylamino groups (preferably substituted or unsubstituted alkoxycarbonylamino groups having from 2 to 30 carbon atoms such as methoxycarbonylamino, ethoxycarbonylamino, tert-butoxycarbonylamino, n-octadecyloxycarbonylamino and N-methyl-methoxycarbonylamino), aryloxycarbonylamino groups (preferably substituted or unsubstituted aryloxycarbonylamino groups having from 7 to 30 carbon atoms such as phenoxycarbonylamino, p-chlorophenoxycarbonylamino and m-n-octyloxyphenoxycarbonylamino), sulfamoylamino groups (preferably substituted or unsubstituted sulfamoylamino groups having from 0 to 30 carbon atoms such as sulfamoylamino, N,N-dimethylaminosulfonylamino and N-n-octylaminosulfonylamino), alkyl- and arylsulfonylamino groups (preferably substituted or unsubstituted alkylsulfonylamino groups having from 1 to 30 carbon atoms and substituted or unsubstituted arylsulfonylamino groups having from 6 to 30 carbon atoms such as methylsulfonylamino, butylsulfonylamino, phenylsulfonylamino, 2,3,5-trichlorophenylsulfonylamino and p-methylphenylsulfonylamino), a mercapto group, alkylthio groups (preferably substituted or unsubstituted alkylthio groups having from 1 to 30 carbon atoms such as methylthio, ethylthio and n-hexadecylthio), arylthio groups (preferably substituted or unsubstituted arylthio groups having from 6 to 30 carbon atoms such as phenylthio, p-chlorophenylthio and m-methoxyphenylthio), heterocyclic thio groups (preferably substituted or unsubstituted heterocyclic thio groups having from 2 to 30 carbon atoms such as 2-benzothiazolylthio and 1-phentyltetrazol-5-ylthio), sulfamoyl groups (preferably sulfamoyl groups having from 0 to 30 carbon atoms such as N-ethylsulfamoyl, N-(3-dodecyloxypropyl)sulfamoyl, N,N-dimethylsulfamoyl, N-acetylsulfamoyl, N-benzoylsulfamoyl and N—(N'-phenylcarbamoyl)sulfamoyl), a sulfo group, alkyl- and arylsulfinyl groups (preferably substituted or unsubstituted alkylsulfinyl group having from 1 to 30 carbon atoms and substituted or unsubstituted arylsulfinyl group having from 6 to 30 carbon atoms such as methylsulfinyl, ethylsulfinyl, phenylsulfinyl and p-methylphenylsulfinyl), alkyl- and arylsulfonyl groups (preferably substituted or unsubstituted alkylsulfonyl groups having from 1 to 30 carbon atoms and substituted or unsubstituted arylsulfonyl groups having from 6 to 30 carbon atoms such as methylsulfonyl, ethylsulfonyl, phenylsulfonyl and p-methylphenylsulfonyl), acyl groups (preferably a formyl group, substituted or unsubstituted alkylcarbonyl groups having from 2 to 30 carbon atoms and substituted or unsubstituted arylcarbonyl groups having from 7 to 30 carbon atoms such as acetyl and pivaloylbenzoyl), aryloxycarbonyl groups (preferably substituted or unsubstituted aryloxycarbonyl groups having from 7 to 30 carbon atoms such as phenoxycarbonyl, o-chlorophenoxycarbonyl, m-nitrophenoxycarbonyl and p-tert-butylphenoxycarbonyl), alkoxycarbonyl groups (preferably substituted or unsubstituted alkoxycarbonyl groups having from 2 to 30 carbon atoms such as methoxycarbonyl, ethoxycarbonyl, tert-butoxycarbonyl and n-octadecyloxycarbonyl), carbamoyl groups (preferably substituted or unsubstituted carbamoyl having from 1 to 30 carbon atoms such as carbamoyl, N-methylcarbamoyl, N,N-dimethylcarbamoyl, N,N-di-n-octylcarbamoyl and N-(methylsulfonyl)carbamoyl), aryl- and heterocyclic azo groups (preferably substituted or unsubstituted arylazo groups having from 6 to 30 carbon atoms and substituted or unsubstituted heterocyclic azo groups having from 3 to 30 carbon atoms such as phenylazo, p-chlorophenylazo and 5-etylthio-1,3,4-thiadiazol-2-ylaoz), imide groups (preferably N-succinimide and N-phthalimide), phosphino groups (preferably substituted or unsubstituted phosphino groups having from 2 to 30 carbon atoms such as dimethylphosphino, diphenylphosphino and methylphenoxyphosphino), phosphinyl groups (preferably substituted or unsubstituted phosphinyl groups having from 2 to 30 carbon atoms such as phosphinyl, dioctyloxyphosphinyl and diethoxyphosphinyl), phosphinyloxy groups (preferably substituted or unsubstituted phosphinyloxy groups having from 2 to 30 carbon atoms such as diphenoxyphosphinyloxy and dioctyloxyphosphinyloxy), phosphinylamino groups (preferably substituted or unsubstituted phosphinylamino groups having from 2 to 30 carbon atoms such as dimethoxyphosphinylamino and dimethylaminophosphinylamino) and silyl groups (preferably substituted or unsubstituted silyl groups having from 3 to 30 carbon atoms such as trimethylsilyl, tert-butyldimethylsilyl and phenyldimethylsilyl).

In the substituents as cited above, those having a hydrogen atom may be further substituted, after removing the hydrogen atom, by a substituent as described above. Examples of such functional groups include alkylcarbonylaminosulfonyl groups, arylcarbonylaminosulfonyl groups, alkylsulfonylaminocarbonyl groups and arylsulfonylaminocarbonyl groups. Examples thereof include methylsulfonylaminocarbonyl, p-methylphenylsulfonylaminocarbonyl, acetylaminosulfonyl and benzoylaminosulfonyl groups.

In the case of having two or more substituents, these substituents may be either the same or different. If possible, these substituents may be bonded together to form a ring.

$R^3$ and $R^4$ independently represent each a substituent. Preferable examples of the substituents are the same as those cited above concerning $R^1$ and $R^2$. Among all, particularly preferable examples of the substituents include alkyl groups, cycloalkyl groups, bicycloalkyl groups, alkenyl groups, cycloalkenyl groups, bicycloalkenyl groups, alkynyl groups, aryl groups, heterocycles, sulfamoyl groups, alkyl- and arylsulfonyl groups, acyl groups, aryloxycarbonyl groups, alkoxycarbonyl groups and a carbamoyl groups. Still preferable examples of the substituents include alkyl groups, cycloalkyl groups, alkenyl groups, aryl groups, acyl groups, aryloxycarbonyl groups, alkoxycarbonyl groups and a carbamoyl groups.

$L^1$ and $L^2$ represent each a divalent linking group. $L^1$ and $L^2$ may be either the same or different.

The divalent linking groups are divalent linking groups other than arylene groups. Preferable example thereof include an alkylene group, a substituted alkylene group, an alkenylene group, a substituted alkenylene group, an alkynylene group and a group obtained by combining two or more of these divalent groups. In the case of a divalent group consisting of two or more groups, these groups may be further bonded via another divalent linking group. Examples of the divalent linking group include a group represented by —$NR^7$— (wherein $R^7$ represents a hydrogen atom or an alkyl group or an aryl group which may have a substituent), —O—, —S—, —SO—, —$SO_2$—, —CO—, —$SO_2NR^7$—, —$NR^7SO_2$—, —$CONR^7$—, —$NR^7CO$—, —COO— and —OCO—. As the substituent, the examples cited as the substituents $R^1$, $R^2$, $R^3$, $R^4$, $R^5$ and $R^6$ are applicable.

n and m independently represent each an integer of from 0 to 4. In the case where m and n are each 2 or more, $R^1$s and $R^2$s in the repeating unit may be either the same or different. p and q independently represent each an integer of from 1 to 10. In the case where p and q are each 2 or more, $E^3$s and $E^4$s and $L^1$s and $L^2$s in the repeating unit may be either the same or different. From the viewpoint of controlling retardation, it is preferred that the compound represented by the formula (1-4) is a symmetric compound or an almost symmetric compound (i.e., the groups attached to the 1- and 4-position of cyclohexane located at the center in the formula (1-1) have the same or closely similar structures).

Next, the compounds represented by the formula (1-4) will be described in greater detail by referring to specific examples thereof, though the invention is not restricted to these specific examples.

(1)

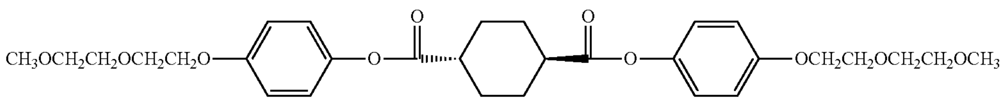

(2)

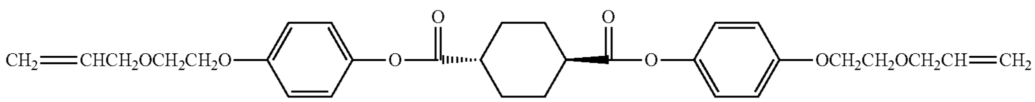

(3)

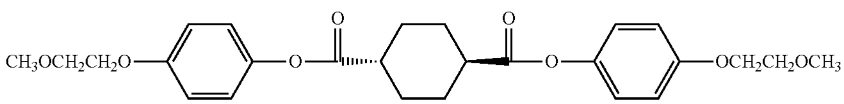

(4)

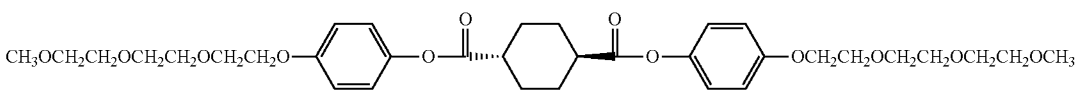

(5)

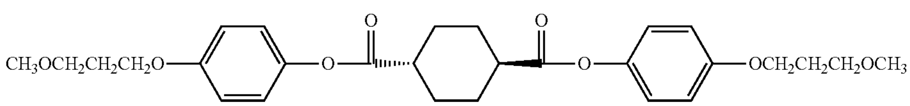

(6)

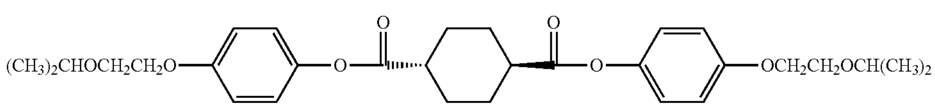

(7)

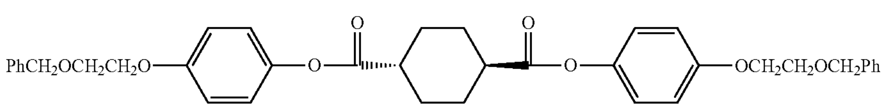

(8)

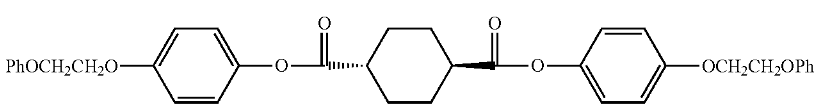

(9)

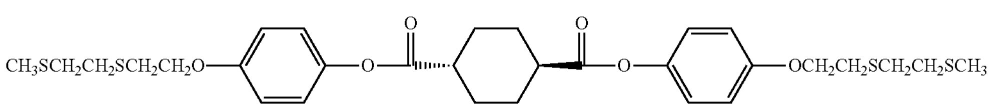

(10)

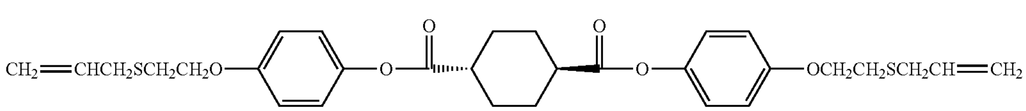

(11)

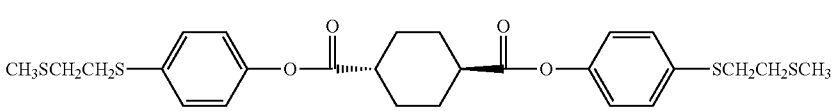

-continued
(12)
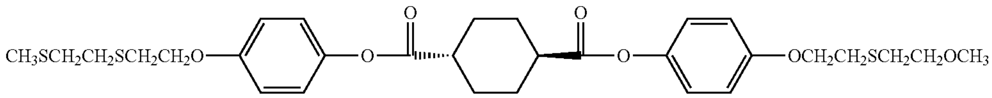
(13)
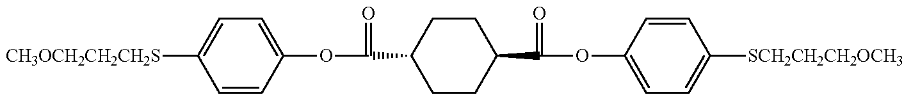
(14)
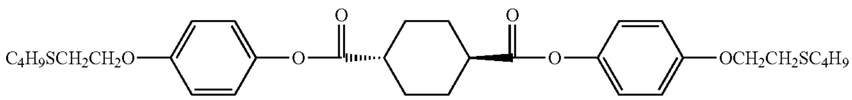
(15)
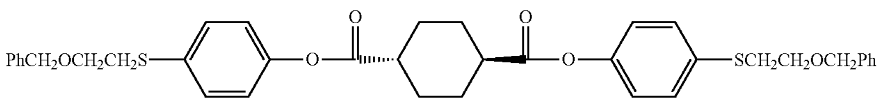
(16)
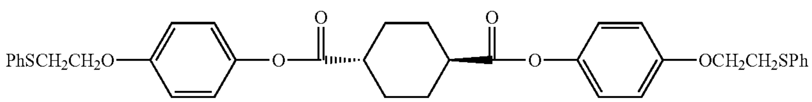
(17)
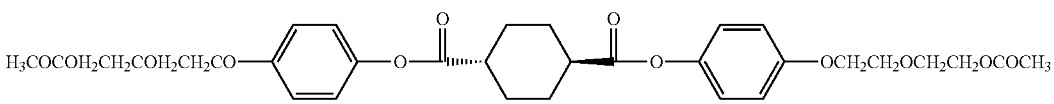
(18)
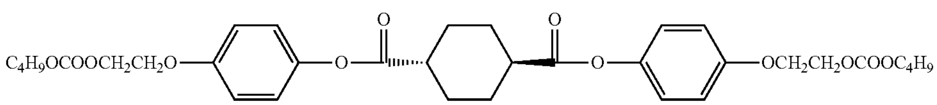
(19)
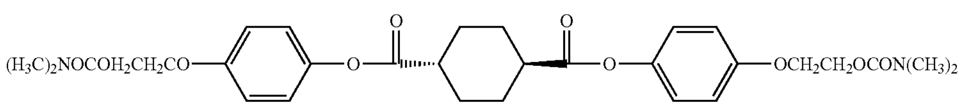
(20)
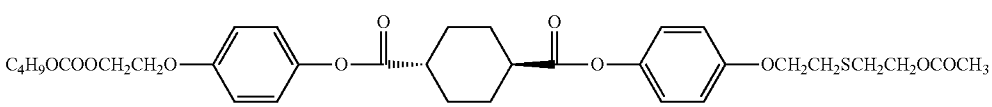
(21)
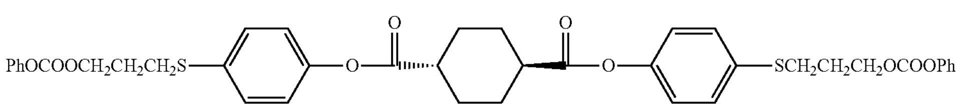
(22)
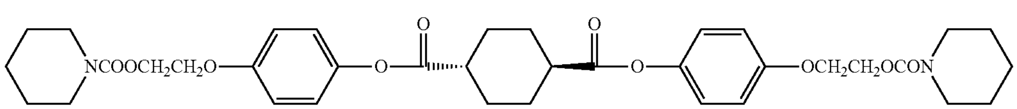
(23)
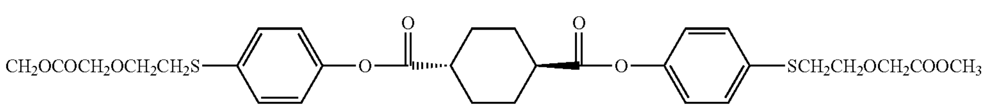
(24)
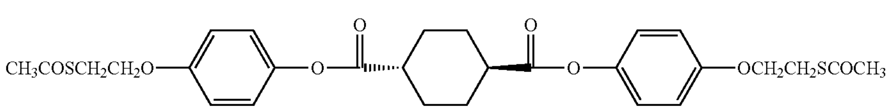
(25)
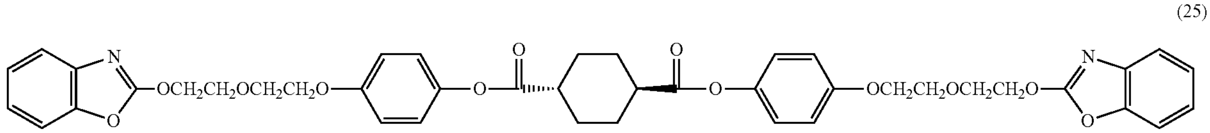

-continued
(26)
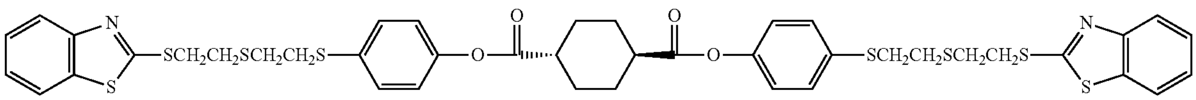
(27)
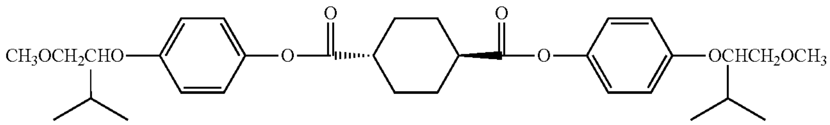
(28)
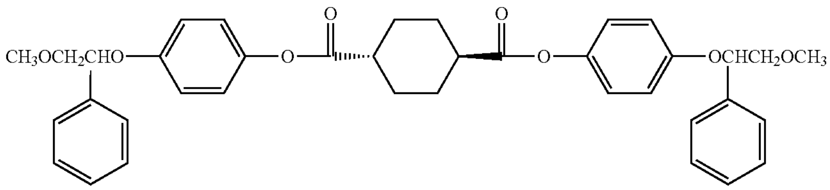
(29)
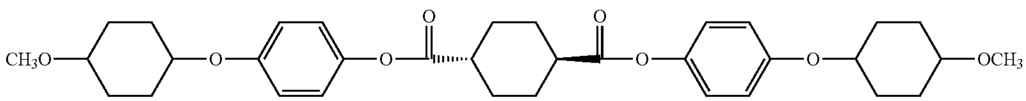
(30)
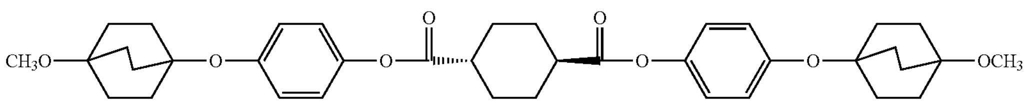
(31)
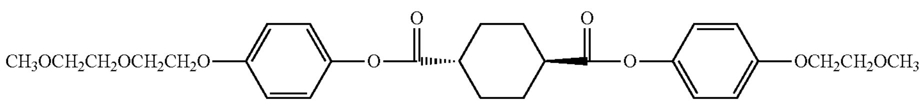
(32)
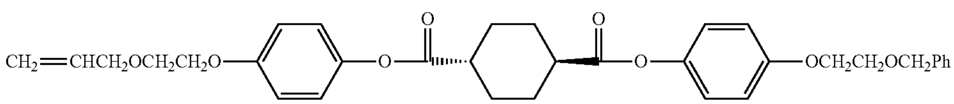
(33)
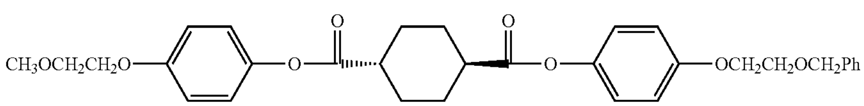
(34)
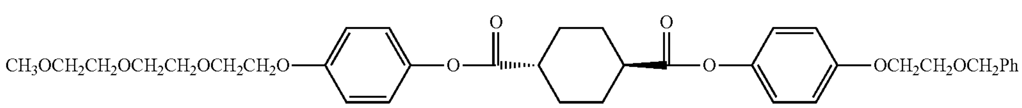
(35)
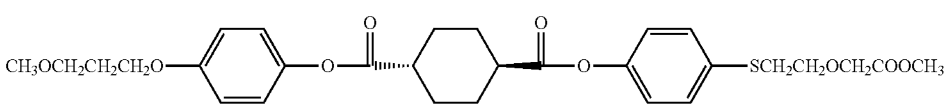
(36)
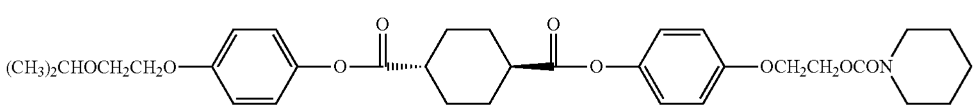
(37)
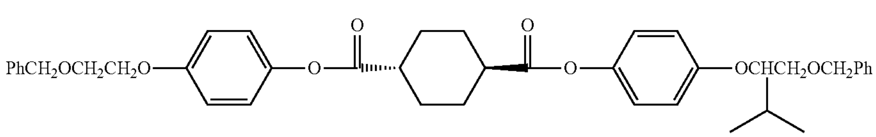
(38)
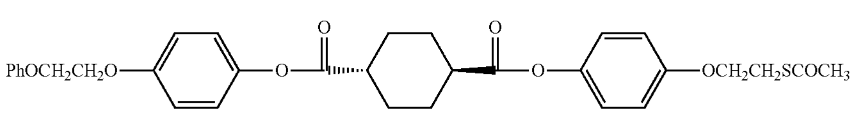

(Method of Compound Addition)

In addition, these retardation regulators may be used alone and used by mixing 2 or more kinds of compound in any ratio. Further, the time to add these retardation regulators may be any time in a dope producing process, and the end of a dope producing process.

To the cellulose derivative in the present invention, beside the above mentioned retardation regulator, as usage, the various kinds of additive, for example, compound that reduce optically anisotropic, plasticizer, ultraviolet absorbent except ultraviolet absorber to use for adjustment of transmission variation, degradation inhibitor, particle, exfoliation promoter, etc can be added. Further, the time to add thus additive solution may be any step in a dope producing process, immediately after the cotton solves, and the end of a dope producing process.

Next, cellulose derivative present used in the present invention is explained in detail.

[Cotton of Cellulose Derivative Ingredient]

Example of cellulose of cellulose derivative ingredient used in the present invention include cotton linter, wood pulp (hardwood pulp, softwood pulp), and cellulose derivative obtained from any cellulose can be used, and possibly used being mixed. Detailed description about these cellulose ingredients used are, for example, described in plastic material lecture (17) cellulose resin (Marusawa & Uda ed, Nikkan Kogyo Shinbun Ltd, 1970 publication) and Japan Institute of Invention and Innovation invention publication technique 2001-1745 (page 7 to page 8), but the cellulose derivative film of the present is not particularly limited.

[Degree of Polymerization of Cellulose Derivative]

Degree of polymerization of cellulose derivative used in the present invention is preferably from 10 to 500, more preferably from 150 to 450, particularly preferably from 180 to 400 in viscosity average degree of polymerization. When a degree of polymerization is too high, degree of viscosity of dope solution of cellulose derivative becomes high, and film forming becomes difficult by casting. Intensity of the film produced decrease, when degree of polymerization is too low. Average degree of polymerization can be measured by limiting viscosity method of Uda et al. (Kazuo Uda, Hideo Saito, Society of Fiber Science and Technology, Japan, the first issue Vol. 18, page 105 to 120, 1962). Detail is described in Japanese Patent 9-95538.

In addition, molecular weight distribution of cellulose derivative preferably used in the present invention is assessed by means of gel permeation chromatography, and it is preferable that polydispersity index Mw/Mn (Mw is mass average molecular weight, Mn is the number average molecular weight) is small, and molecular weight distribution is narrow. Particularly, value of Mw/Mn is preferably from 1.0 to 3.0, more preferably from 1.0 to 2.0, most preferably from 1.0 to 1.6.

When a low molecular component is removed, average molecular weight (degree of polymerization) becomes high, but it is useful because the degree of viscosity becomes low compare with the usual cellulose derivative. Cellulose derivative with a little low molecular component can be obtained by removing low molecular component from the cellulose synthesized in the usual method. The removal of low molecular component can be performed by washing cellulose derivative in suitable organic solvent. In addition, when cellulose derivative with a little low molecular component is produced, it is preferable to adjust amount of sulfuric acid catalyst in oxidation reaction to from 0.5 to 25 masses for cellulose 100 masse part. When amount of sulfuric acid catalyst is in the above mentioned range, even in point of molecular weight part distribution, preferable (molecular weight distribution is uniform) cellulose derivative can be synthesized. When it is used at the time of producing cellulose of the present invention, the percent of the water content of the cellulose derivative is preferably less than 2 mass %, more particularly less than 1 mass %, particularly preferably less than 0.7 mass %. Generally, cellulose derivative contains water, and 2.5 to 5 mass % is known. In order to give this percent of the water content of the cellulose derivative, it is necessary to dry, and the method is not particularly limited, as long as the method gives the desired percent of the water content. As for these cellulose of the present invention, the ingredient cotton and synthesis method are described in page 7 to page 12 in Japan Institute of Invention and Innovation invention publication technique (No. 2001-1745, 15th of March, 2001 publication, Japan Institute of Invention and Innovation invention).

Cellulose of the present invention can be used as single or being mixed two or more kinds of different cellulose derivative, as long as substituent, substitution degree, degree of polymerization, molecular weight distribution are in the ranges mentioned above.

[Organic Solvent of Cellulose Derivative Solution]

It is preferable to produce cellulose derivative films with the solvent cast method, and solution (dope) which dissolved cellulose derivative in organic solvent is used. As for the organic solvent preferably used as main solvent in the present invention, solvent selected from ester, ketone, ether, having 3 to 20 carbon atoms, and halogenated hydrocarbon having 1 to 7 carbon atom(s), is preferable. Ester, ketone and ether may have cyclic structure. Compound having 2 or more groups of any of functional groups of ester, ketone and ether (i.e. —O—, —CO—, and —COO—) can also be used as main solvent, for example, and may have the other functional group, for example, such alcoholic hydroxy group. In the case of the main solvent having functional groups two or more kinds, the number of carbon atom should be in stipulated range of compound having either functional group.

As for the cellulose derivative film of the present invention, chlorine-based halogenated hydrocarbon may be used as main solution, and as described in Japan Institute of Invention and Innovation invention publication technique 2001-1745 (page 12 to page 16), non-chlorine-based solvent may also be used as main solvent, the main solvent is not particularly limited to a cellulose acylate film of the present invention.

In addition, including the dissolution method, the solvents of cellulose derivative solution and film of the present invention are disclosed in following patent, and are preferable embodiment. For example, they are described in each bulletin such as Japanese Unexamined Patent Application Numbers 2000-95876, 12-95877, 10-324774, 8-152514, 10-330538, 9-95538, 9-95557, 10-235664, 12-63534, 11-21379, 10-182853, 10-278056, 10-279702, 10-323853, 10-237186, 11-60807, 11-152342, 11-292988, 11-60752, 11-60752. According to these patents, there is description about the solution property and a coexistence material coexisting with, which is also preferable embodiment for the present invention, as well as the solvent which is preferable for the cellulose of the present invention.

[Producing Process of a Cellulose Film]

[Dissolution Process]

The producing cellulose derivative solution (dope) of the present invention may be carried out at room temperature, and further carried out in cooling dissolution process or in high temperature dissolution method, and also in these combinations, where the dissolution method is not particularly limited. As for the each process of the production of cellulose derivative solution in the present invention, further the solution concentration involved in the dissolution process, the filtration, the production process described in detail in page 22 to page 25 in Japan Institute of Invention and Innovation invention publication technique (No. 2001-1745, 15th of March, 2001 publication, Japan Institute of Invention and Innovation invention) is preferably used.

(Degree of Transparency of Dope Solution)

The transparency of dope of cellulose derivative solution is desirably 85% or more, more desirably 88% or more, even more desirably 90% or more. It was confirmed that various additive was dissolved enough in cellulose dope solution in the present invention. For the specific calculation method degree of transparency of dope, dope solution is poured into glass cell of 1 cm angle, and the absorbance of 550 nm was measured in spectral photometer (UV –3150, Shimadzu Corporation). Solvent only was measured as a blank in advance, and then degree of transparency of cellulose derivative solution was calculated from the ratio with absorbance of a blank.

[Casting, Stretching, Drying, Reel Up Process]

Next, production method of a film with the use of cellulose derivative solution of the present invention is described. As for the method to produce cellulose films of the present invention and the facilities, solution casting film production method and solution casting film production device which is conventionally used for the production of cellulose triacetate film, was used. Dope (cellulose derivative solution) prepared by a dissolver (a pot) was stored in a storage pot once, and defoaming the foam included in the dope to be finally prepared. Dope was sent from dope outlet, through for example, pressurized determination gear pump that can high precisely send solution by the fixed quantity depending on the number of the rotation, to pressurized die, and casted uniformly on metal support of the casting part that runs endlessly from cap (slit) of pressurized die, and the not properly dried dope film (it is also referred to as the web) was exfoliated from the metal support in the exfoliation point which approximately went around. Both ends of the web obtained were picked up with a clip and stretched in width direction, and then obtained film was automatically transported by roll group of drying device, and after stop drying reeled up to be predetermined length roll by the winding machine. Combination with drying device of a tenter and a device of roll group is changed with the purpose. As for the main uses for cellulose derivative film of the present invention, the functionality protective film that is optical element, and the solution casting film production method used for the electron display and silver halide photosensitized materials, there are many cases that besides solution casting film production device, for the surface fabrication to the film such as under coat layer, antistatic layer, antihalation layer, protective layer, coating applicator is added. These are described in detail in page 25 to page 30 in Japan Institute of Invention and Innovation invention publication technique (No. 2001-1745, 15th of March, 2001 publication, Japan Institute of Invention and Innovation invention) and classified into categories such as casting (including co-casting), metal plate, drying, exfoliation, and can be preferably used in the present invention.

In addition, the thickness of the cellulose derivative is determined, depending on the use thereof, and not limited, but is preferably from 10 to 200 μm, more preferably from 20 to 150 μm, even more preferably from 30 to 200 μm, particularly preferably from 30 to 100 μm.

As for the width of the cellulose derivative, suitable width may be selected, depending on the use thereof, particularly, panel size of liquid crystal display device, and not limited, but is preferably from 600 to 300 nm, more preferably from 1,000 to 2,500 nm, most preferably from 1,300 to 2,300 nm.

In addition, the stretching treatment in the present invention is not particularly limited, but, for example, either or both method of the method giving multiple rolls rim speed difference, using the rim speed difference between rolls, the film is stretched in the direction transported, the method that film end part is picked up with a clip and stretched in width direction, can be used. As for stretching magnification, it is preferably 1.03 fold to 2.00 fold, more preferably 1.05 fold to 1.5 fold, particularly preferably 1.10 fold to 1.25 fold.

[Cellulose Film Properties Evaluation]

(Haze of the Film)

The haze of the present invention is desirably from 0.01 to 2.0%, more desirably from 0.05 to 1.5%, even more desirably from 0.1 to 1.0%, 60% RH, with the Transparency of a film is important as an optics film. The measurement of the haze is carried out, using cellulose derivative film samples 40 mm×80 nm of the present invention, at 25° C., Haze meter (HGM-2DP, Suga testing machine) in the accordance with JIS K-6714.

(Measurement of Contrast)

As the evaluation method of contrast, the average brightness (unit: $Cd/m^2$) when the liquid crystal display device at the black display state is measured in 10 points at polar angle 60° at all-round angle, and difference of maximum value and minimum value of 10 points of the percentage change=10 points measurement/average brightness (unit: %), were measured. Thus, A smaller the average brightness and brightness percentage change of the film gives the indication that the contrast is high and viewing angle dependence is small. The average brightness in the film is preferably less than 0.4, more preferably less than 0.3, particularly preferably less than 0.25. Additionally, the percentage change in the film is preferably less than 30%, more preferably less than 25%, particularly preferably less than 20%.

(Measurement of Black Brightness)

As the evaluation method of black brightness, the black brightness was calculated by using the average brightness (unit: $Cd/m^2$) at the time of that 0 points measurement was carried out in the screen, in random order, at polar angle 10°. The black brightness is preferably black brightness <0.25, more preferably black brightness <0.20, particularly preferably black brightness <0.18.

Firstly, the use of the cellulose derivative film produced in the present invention is briefly described. The film of the present invention is particularly useful as protective film for polarizing plate, optically-compensatory film (sheet) of liquid crystal display device, optically-compensatory film of reflection type liquid crystal device, support of silver halide photosensitized materials.

[Functional Layer]

The cellulose derivative film of the film is applied to optic application and photosensitized materials as the application thereof. Particularly, it is preferable that optic application is liquid crystal display device, and it is more preferable that the liquid crystal display device is construction that is set up with the liquid crystal cell where the liquid crystal cell is supported between two of the electrode substrates, two plates of the polarizing plate is set up in the both side of the liquid crystal cell, and at least one plate of the optically-compensatory film is set up in between the liquid crystal cell and the polarizing plate. For these liquid crystal display device, TN, IPS, FLC, AFLC, OCB, STN, ECB, VA and HAN are preferable.

At that time, in the case that the cellulose derivative of the present invention is used for the above mentioned optics application, providing the various functional layers is carried out. Example of those functional layers include for example, antistatic layer, cured resin layer (transparent hard court layer), antireflective layer, easy adhesive layer, glare-proof layer, optically anisotropic layer, alignment layer, liquid crystal layer, etc. Example of these function layers and materials thereof that the cellulose derivative film can be used for include surfactant, lubricant agent, matte agent, antistatic layer, hard court layer, etc, and are described in detail in page 32 to page 45 in Japan Institute of Invention and Innovation invention publication technique (No. 2001-1745, 15th of March, 2001 publication, Japan Institute of Invention and Innovation invention) and can be preferably used in the present invention.

[Optically Anisotropic Layer]

It is preferably that the cellulose derivative film of the present invention has the optically anisotropic layer satisfying the retardation of following (C) and (d).

$$0\ \text{nm}<Re(546)<400\ \text{nm} \tag{C}$$

$$0\ \text{nm}<|Rth(546)|<400\ \text{nm} \tag{D}$$

(wherein Re(546) is the retardation of in-plane-direction of the film at a wavelength of 546 nm. Alternatively Rth (546) is the retardation in a thickness-direction of the film at a wavelength of 546 nm.)

Preferably is $$0\ \text{nm}<Re(546)<200\ \text{nm} \tag{C'}$$

$$0\ \text{nm}<|Rth(546)|<300\ \text{nm} \tag{D'}$$

As for the optically anisotropic layer to obtain each of the above mentioned retardation, discotic-type liquid crystal layer or stick-type liquid crystal layer is preferable.

Optically anisotropic layer is not particularly limited, as long as it is in the range satisfying the above mentioned optics properties, and the suitable layer is used to the necessary Re (546), Rth (546). As for the optically anisotropic layer satisfying Re value, Rth value, for example a method to laminate the polymer film which alignment processing was made on or a method liquid crystal is applied to process alignment can be preferably used. In that case of the former, for example, the polymer film which processed alignment by stretching may be pasted to a cellulose derivative film through a adhesive, etc, and after having provided cellulose derivative film with polymer layer by coating method, stretching may be processed. A kind of a polymer is not particularly limited, and polyimide, polyamide, polycarbonate, polyester, polyether, polysulfone, polyolefin, cellulose ester, etc, can be used.

In the latter case, a liquid crystal layer is not particularly limited, but a discotic-type liquid crystal layer or a stick-type liquid crystal layer is preferably used. These layers may include alignment control agents, besides a discotic-type liquid crystal layer or a stick-type liquid crystal layer may be used if necessary.

It is preferable that the optic axis of a liquid crystal layer align substantially in parallel to a film plane. Substantially in parallel means that the angle between a film plane and optic axis is in the range from 0° to 20°. The range from 0° to 10° is preferable, and the range from 0° to 5° is preferable.

The discotic-type liquid crystal is not particularly limited, as long as it is in the range satisfying the claim of the present invention, but for example, triphenylene liquid crystal can be preferably used. Discotic-type liquid crystal compound is described in various documents (C. Destrade et al., Mol. Crysr. Liq. Cryst., vol. 71, page 111(1981); Chemical Society of Japan, quarterly chemistry general remarks, No. 22, chemistry of liquid crystal, Chapter 5, Chapter 10 Section 2 (1994); B. Kohne et al., Angew. Chem. Soc. Chem. Comm., page 1794 (1985); J. Zhang et al., J. Am. Chem. Soc., vol. 116, page 2655 (1994)) About polymerization of a discotic-type liquid crystal compound, there is description in Japanese Unexamined Patent Application No. 8-27284 bulletin.

As for the discotic-type liquid crystal compound, it is preferable to have polymerizable group to be able to be fixed by polymerization. For example, the structure that a discotic core of a liquid crystal compound is bound with a polymerizable group as substituent is conceivable, but it becomes difficult to keep aligned state in polymerization reaction when a discotic core of a liquid crystal compound is bound with a polymerizable group directly. Thus structure having linking group between the discotic core and polymerization-related bases is preferable. It is, that is to say, preferable that the discotic-type liquid crystal compound having a polymerizable group is the compound represented as following formula.

$$D(\text{-}L\text{-}P)_n$$

Wherein D is a discotic core, L is linking group of bivalent, P is polymerizable group, and n is integer from 4 to 12. Wherein the preferable examples of a discotic core (D), linking group of bivalent (L), and polymerizable group (P) is respectively. (D1) to (D15), (L1) to (L25), (P1) to (P18) described in Japanese Unexamined Patent Application No. 2001-4837 bulletin, and the contents described in the same bulletin can be preferably used. In addition, the discotic nematic liquid crystal phase-solid phase conversion temperature of a liquid crystal compound, is preferably from 70° C. to 300° C., more preferably from 70° C. to 170° C.

As for the stick-type liquid crystal, azomethine, azoxy, cyano biphenyl, cyanophenyl ester, benzoic acid ester, cyclohexane carboxylic acid phenyl ester, cyanophenyl cyclohexane, cyano substitution phenyl pyrimidine, alkoxy substitution phenyl pyrimidine, phenyldioxane, tolan and alkenyl cyclohexyl benzonitrile are preferably used. As well as a low molecular liquid crystal compound such as the above, a high molecular liquid crystal compound can also be used. As for the stick-type liquid crystal, it is preferable to fix alignment by means of polymerization same as discotic-type liquid crystal. As for liquid crystal compound, a thing having the partial structure which can yield polymerization and cross-linking reaction by active luminous rays and electron radiations, heat is preferably used. The number of the partial structure is preferable 1 to 6, and more preferably 1 to 3. As a polymerizable stick-type liquid crystal compound the compounds described in Makromol. Chem., vol. 190, page 2255 (1989), Advanced Materials vol. 5, page 107 (1993), U.S. Pat. Nos. 4,683,327 specification, 5,622,648 specification, 5,770, 107 specification, International publication WO95/22586 bulletin, 95/24455 bulletin, 97/00600 bulletin, 98/23580 bulletin, 98/52905 bulletin, Japanese Unexamined Patent Application Numbers 1-272551 bulletin, 6-16616 bulletin, 7-110469 bulletin, 11-80081 bulletin, 2001-328973 bulletin, 2004-240188 bulletin, 2005-99236 bulletin, 2005-99237 bulletin, 2005-121827 bulletins, 2002-30042 bulletin.

An alignment control method of a liquid crystal layer is not particularly limited, heretofore known methods such as a rubbing process, or a method applied on the aligned film which irradiated with polarization UV light and to treat with heat can be used.

[Application (Polarizing Plate)]

Application of cellulose derivative film of the present invention is explained. A Cellulose derivative film of the present invention is particularly useful as polarizing plate protective film use. When it is used as polarizing plate protective film, a producing method of polarizing plate is not particularly limited, and it is produced by a general method.

There is a method to treat the obtained cellulose film with alkali, and polyvinyl alcohol film is pasted together to both sides of the polarizer produced by immersion stretching in iodine solution, using the polyvinyl alcohol aqueous solution. Instead of alkali treatment, easy adhesion processing described in Japanese Unexamined Patent Application No. 6-94915, No. 6-118232 bulletin, may be given.

Examples of the adhesive that is used to paste treated plane with protective film and polarizer include, for example, the polyvinyl alcohol adhesive such as polyvinyl alcohol, polyvinyl butyral, vinyl latex such as butyl acrylate.

The polarizing plate consists of protective film which protect polarizer and the both sides thereof, where further protective film is pasted on one side of the polarizing plate, and separate film is pasted on the other side of the polarizing plate. A protective film and a separate film are used at the time of polarizing plate shipment for the purpose of protecting polarizing plate in article of manufacture inspection. For this case, a protective film is pasted for the purpose of protecting a surface of polarizing plate, and used in the other side of the plane that polarizing plate is pasted to liquid crystal. In addition, a separate film is used for the purpose of covering an adhesive layer which pasts to liquid crystal plate, and used in plane side where polarizing plate is pasted to liquid crystal plate.

In the liquid crystal display device, basal plate including liquid crystal which is usually placed between two pieces of polarizing plate, but even if the polarizing plate protective film which is applied a cellulose film of the present invention places at any site, superior display properties are obtained. Particularly, since as for the polarizing plate protective film in the indication side of first surface of liquid crystal display device, the transparent hard court layer, glare-proof layer, antireflective layer, etc, are provided, it is preferable that the polarizing plate is used to this part.

(Construction of General Liquid Crystal Display Device)

When a cellulose derivative film is used as an optically-compensatory film, transmission axis of polarizing plate and slow axis of optically-compensatory film consisting of cellulose derivative film may be placed in any angle. The liquid crystal display device has the construction that is set up with the liquid crystal cell where the liquid crystal cell is supported between two of the electrode substrates, two plates of the polarizing plate is set up in the both side of the liquid crystal cell, and at least one plate of the optically-compensatory film is set up in between the liquid crystal cell and the polarizing plate.

Liquid crystal layer of liquid crystal cell is usually formed by enclosing a liquid crystal into the space formed by putting spacer between two pieces of basal plate. The transference electrode layer forms on basal plate as a transparent film including conductive material. In a liquid crystal cell, the gas barrier layer, the hard coat layer or under coat layer (it is applied to an adhesion bond of the transference electrode layer) (under coat layer) may be further provided. These layer is usually provided on a basal plate. A basal plate of a liquid crystal cell usually has thickness of 50 μm to 2 mm.

(A Kind of Liquid Crystal Display Device)

The cellulose derivative film of the present invention can be applied to a liquid crystal cell of various indicating mode. Various indicating mode such as TN (Twisted Nematic), IPS (In-Plane Switching), FLC (Ferroelectric Liquid Crystal), AFLC (Anti-ferroelectric Liquid Crystal) OCB (Optically Compensatory Bend), STN (Supper Twisted Nematic), VA (Vertically Aligned), ECB (Electrically Controlled Birefringence), and HAN (Hybrid Aligned Nematic) is suggested. In addition, the indication mode which the indication mode is aligned and divided is also suggested. The cellulose film of the present invention are effective in liquid crystal display device of any indication mode, it is preferably to be used for liquid crystal display device of IPS mode. In addition, it is effective in any liquid crystal display device of a transmission type, a reflection type, half transmission type.

(TN Type Liquid Crystal Display Device)

The cellulose derivative film of the present invention may be used as support of an optically-compensatory sheet of TN type liquid crystal display device having a liquid crystal cell of a TN mode. For a liquid crystal cell of a TN mode and a TN type liquid crystal display device, it is known well for a long time. About an optically-compensatory sheet which is applied to a TN type liquid crystal display device, there are descriptions at each bulletin such as Japanese Unexamined Patent Application Numbers 3-9325, 6-148429, 8-50206, 9-26572. In addition, there are descriptions in the article of Mori (Mori) et al. (Jpn. J. Appl. Phys. Vol. 36 (1997) p. 143 and Jpn. J. Appl. Phys. Vol. 36 (1997) p. 1068).

(STN-type Liquid Crystal Display)

The Cellulose Film of the Present Invention May be Used as Support of an Optically-compensatory sheet of STN-type liquid crystal display device having a liquid crystal cell of a STN mode. In the STN-type liquid crystal display device, the stick-type liquid crystal molecule in liquid crystal cells is generally turned to a range from 90 to 360 degree, and the product (Δnd) of the refractive anisotropy of the stick-type liquid crystal molecule×the cell gap (d) is in the range from 300 to 150 nm. About optically-compensatory sheet to apply to STN-type liquid crystal display device, there is description at Japanese Unexamined Patent Application No. 2000-105316 bulletin.

(VA-type Liquid Crystal Display Device)

The Cellulose Derivative Film of the Present Invention is Particularly Advantageously Used as support of an optically-compensatory sheet of VA-type liquid crystal display device having a liquid crystal cell of VA mode. It is preferable that the Re of an optically-compensatory used for VA-type liquid crystal display device is from 0 to 150 nm, and Rth is from 70 to 400 nm. Re is more preferably 20 to 70 nm. When two pieces of optically-anisotropic polymer film is used for VA type-liquid crystal display device, it is preferable that Rth of a film is from 70 to 250 nm. When one piece of optically anisotropic polymer film is used for VA-type liquid crystal display device, it is preferable that Rth of a film is from 150 to 400 nm. The VA-type liquid crystal display device may be the method that is aligned and divided described in for example, Japanese Unexamined Patent Application No. 10-123576 bulletin.

(IPS-type Liquid Crystal Display Device and ECB-Type Liquid Crystal Display Device)

The cellulose derivative film of the present invention is particularly advantageously used as a support of optically-compensatory film sheet of IPS-type liquid crystal display device and ECB-type liquid crystal display device, or also as a protective film of polarizing plate. These mode is the embodiment that liquid crystal material does alignment in generally parallelism at the time of black indication, and it makes do parallel alignment for basal plate face, and black displays liquid crystal molecules in voltage nothing application condition. These modes are the embodiments that liquid crystal material align in almost parallel at the time of black indication, with a condition that voltage is not applied, and it makes liquid crystal molecules align in parallel to basal plate surface to indicating in black. In these embodiments, the polarizing plate with the use of a cellulose derivative film of the present invention contributes to improvement of color, expansion of viewing angle, improvement of contrast. In this embodiment, it is preferable that among protective film of the above mentioned polarizing plate above and below a liquid crystal cell, for the protective film placed between a liquid crystal cell and polarizing plate (protective film of the cell side), the polarizing plate with the use of cellulose derivative film of the present invention is used in at least one side. More preferably, an optically anisotropic layer is placed between protective film and liquid crystal cells of polarizing plate, and it is preferable that a value of retardation of a placed optically anisotropic layer is set less than 2-fold of a value of Δn·d of a liquid crystal layer.

(OCB-type Liquid Crystal Display Device and HAN-type Liquid Crystal Display Device)

The cellulose derivative film is particularly advantageously used as a support of optically-compensatory film sheet of OCB-type liquid crystal display device having a liquid crystal cell of OCB mode or HAN-type liquid crystal display device having a liquid crystal cell of HAN mode. It is preferable that in the optically-compensatory film used for OCB-type liquid crystal display device or HAN-type liquid crystal display device, there is the direction that absolute value of retardation is minimized in neither plane of optically compensatory sheet nor normal direction. The optical property of optically-compensatory film sheet to apply to OCB-type liquid crystal display device or HAN-type liquid crystal display device is also determined by arrangement with optical property of an optically anisotropic layer, optical property of support and configuration of an optically anisotropic layer and support. About an optically-compensatory sheet which is applied to a OCB-type liquid crystal display device or HAN-type liquid crystal display device, there are descriptions at Japanese Unexamined Patent Application No. 9-197397 bulletin. In addition, there is description in the article of Mori (Mori) et al. (Jpn. J. Appl. Phys. Vol. 38 (1999) p. 2837 and Jpn.

(Reflective Liquid Crystal Display Device)

A cellulose film of the present invention is also advantageously used as optically-compensatory sheet of Reflective liquid crystal display device such as TN-type, STN-type, HAN-type, GH (Guest-Host) type. These indication modes are known well for a long time. About TN type reflective liquid crystal display device, there are descriptions at each bulletin such as Japanese Unexamined Patent Application No. 10-123478, WO9848320, and U.S. Pat. No. 3,022,477. About an optically-compensatory sheet to apply to reflective type liquid crystal display device, there is description in WO00/65384.

(Other Liquid Crystal Display Device)

The cellulose film of the present invention is also advantageously used as support of optically-compensatory sheet of ASM-type liquid crystal display device having a liquid crystal cell of ASM (Axially Symmetric Aligned Microcell) mode. There is a characteristic that in a liquid crystal cell of ASM mode, thickness of a cell is maintained with the resin spacer which can adjust position. The other properties are similar to a liquid crystal cell of TN mode. About a liquid crystal cell of an ASM mode and ASM type liquid crystal display device, there is description in the article of Kurne (Kume) et al. (Kume et al., SID 98 Digest 1089 (1998)).

Hereinafter, the second present invention will be described detail.

In the present specification, the symbol "~" is used to mean that the numerical values described before and after the symbol are included in the range as the lower limit and the upper limit. The term "polymerization" as used herein is intended to include copolymerization. Also, the term "on the support" or "on the alignment film" as used herein is intended to include both the case of referring to the direct surface of the support or the like, and the case of referring to the surface of any layer (film) provided on the support or the like.

Hereinafter, the cellulose derivative film of the invention will be described in detail.

The cellulose derivative film of the invention is characterized by at least comprising a cellulose derivative which contains a substituent having a specific polarizability anisotropy, and one or more retardation regulator satisfying a specific equation.

[Cellulose Derivative]

First, the cellulose derivative used in the cellulose derivative film of the invention will be discussed.

The cellulose derivative used in the cellulose derivative film of the invention is a cellulose derivative which has a substituent having the polarizability anisotropy to be described later in a specific range (having a large polarizability anisotropy), as the substituent linked to at least one of the three hydroxyl groups on the β-glucose ring, which is a constituent unit of cellulose derivatives. Although the detailed mechanism is not clear, the polarizability anisotropy of the substituent can be distributed further into the film thickness direction of the film, by combining the cellulose derivative having a substituent with a large polarizability anisotropy with the retardation regulator to be described later, and as a result, Rth of the film can be further reduced.

The substituent having a specifically large polarizability anisotropy according to the invention will be described in detail.

The polarizability of the substituent according to the invention can be determined by computation using a molecular orbital method or a density functional method, and the cellulose derivative film of the invention has a substituent having a polarizability anisotropy represented by the following Equation (1), of $2.5\times10^{-24}$ $cm^3$ or greater as the substituent having large polarizability anisotropy. Practically, the polarizability anisotropy of the substituent is preferably $300\times10^{-24}$ $cm^3$ or less. If the polarizability anisotropy is less than $2.5\times10^{-24}$ $cm^3$, the effect of Rth reduction due to the polarizability anisotropy of the substituent would be insufficient. Also, in order to obtain a film having Rth in the desired negative value range, the amount of the retardation regulator satisfying the Equation (11-1) need to used will become excessively large, thus Tg of the film being lowered, and there would be a problem in the production suitability, leading to concern about the costs. If the polarizability anisotropy is $300\times10^{-24}$ $cm^3$ or less, such problems as that the size of the substituent for attaining polarizability anisotropy becomes oversized, leading to insufficient solubility of the cellulose derivative, and that the toughness of the resulting film is insufficient so that handlability becomes poor, will be occur, which is preferable. The polarizability anisotropy of the substituent is more preferably from $4.0\times10^{-24}$ $cm^3$ to $300\times10^{-24}$ $cm^3$, still more preferably from $6.0\times10^{-24}$ $cm^3$ to $300\times10^{-24}$ $cm^3$, and most preferably $8.0\times10^{-24}$ $cm^3$ to $300\times10^{-24}$ $cm^3$.

$$\Delta\alpha=\alpha x-(\alpha y+\alpha z)/2 \qquad \text{Equation (1)}$$

wherein αx is the largest component of a characteristic value obtained after diagonalization of the polarizability tensor;

αy is the second largest component of the characteristic value obtained after diagonalization of the polarizability tensor; and αz is the smallest component of the characteristic value obtained after diagonalization of the polarizability tensor.

(Polarizability Anisotropy of Substituent)

The polarizability anisotropy of a substituent was calculated using Gaussian 03 (Revision B.03, software from Gaussian, Inc. US). Specifically, the polarizability was first calculated at the level of B3LYP/6-311+G** using a structure optimized to the level of B3LYP/6-31G*, the obtained polarizability tensor was diagonalized, and then the polarizability anisotropy was computed from the diagonal components. In the computation of the polarizability anisotropy of substituent according to the invention, the substituent linked to the hydroxyl group on a β-glucose ring, which is a constituent unit of cellulose derivatives, was taken as a partial structure containing the oxygen atom of the hydroxyl group for the calculation, and the polarizability anisotropy was thus determined.

Furthermore, the cellulose derivative used in the cellulose derivative film of the invention preferably has a highly hydrophobic substituent. When a cellulose derivative having a hydrophobic substituent is used, the equilibrium moisture content of the cellulose derivative film can be reduced, and any changes in the performance under high temperature and high humidity can be suppressed when the cellulose derivative film is used for optical elements. With regard to the hydrophobic substituent, the log P value for the structure of the —OH moiety resulting from hydrolysis of the substituent on the α-glucose ring, a constituent unit of cellulose, is preferably 1.0 or larger, more preferably 1.5 or larger, and still more preferably 2.0 or larger. When a substituent having a log P value of 10 or larger is contained, the effect of suppressing changes in the performance under high temperature and high humidity becomes significant, and a larger log P value gives a greater effect. It is also preferable that the log P value is less than or equal to 10.

For the substituent having high polarizability, any substituent that can be linked to the hydroxyl group of β-glucose may be used, and examples thereof include an alkyloxy group, an aryloxy group, an alkylcarbonyloxy group, an arylcarbonyloxy group, an alkylphosphoric acid oxy group, an arylphosphate oxy group, an alkylboric acid oxy group, an arylboric acid oxy group, an alkylcarbonic acid oxy group, an arylcarbonic acid oxy group, and the like. The highly hydrophobic substituent may be exemplified by those substituents listed as the substituent having a large polarizability.

A substituent which is particularly preferred for the invention from the aspects of large polarizability anisotropy and high hydrophobicity, may be a substituent containing an aromatic ring, and aromatic acyl group and the like are more preferred.

Under the purposes of reducing Rth of a film to a desired range while maintaining the solubility in a solvent as a dope, and of improving the durability of a polarizing plate when the film is used as a protective film for polarizing plates by reducing the equilibrium moisture content of the film, the degree of substitution of the substituent having a large polarizability and the degree of substitution of the highly hydrophobic substituent (SB) is preferably from 0.01 to 3.0, more preferably from 0.1 to 2.7, and still more preferably from 0.3 to 2.5.

When the cellulose derivative of the invention is to be used in forming a film by solution casting, the cellulose derivative preferably contains a substituent having a polarizability anisotropy of less than $2.5\times10^{-24}$ $cm^3$ as the substituent linked to the hydroxyl group of β-glucose, from the viewpoint of solubility or handlability of the film, in order to have the elastic modulus of the cast film in an appropriate range. The substituent having a polarizability anisotropy of less than $2.5\times10^{-24}$ $cm^3$ may be any substituent that can be linked to the hydroxyl group of β-glucose, and preferred examples thereof include alkyloxy, aryloxy, alkylcarbonyloxy, arylcarbonyloxy, alkylphosphoric acid oxy, arylphosphoric acid oxy, alkylboric acid oxy, arylboric acid oxy, alkylcarbonic acid oxy, arylcarbonic acid oxy and the like. Aliphatic acyl groups, specifically an acetyl group, a propionyl group, a butyryl group and the like are preferred, and more preferred is an acetyl group. The total degree of substitution (SS) of the substituent having a small polarizability anisotropy is preferably within the scope of satisfying the following Expression (S1) with respect to the total degree of substitution of the substituent having a large polarizability. More preferably, the total degree of substitution is within the scope of satisfying Expression (S2), and still more preferably, within the scope of satisfying Expression (S3).

$$0 \leqq SS \leqq 3.0-SB \qquad \text{Expression (S1)}$$

$$1.0 \leqq SS \leqq 3.0-SB \qquad \text{Expression (S2)}$$

$$2.0 \leqq SS \leqq 3.0-SB \qquad \text{Expression (S3)}$$

As examined above, the substituent which is particularly preferable for the invention from the aspects of large polarizability anisotropy and high hydrophobicity may be exemplified by an aromatic-containing substituent, and an aromatic acyl group and the like are more preferred.

For the cellulose derivative used according to the invention, a mixed acid ester has an aliphatic acyl group, and a substituted or unsubstituted aromatic acyl group, which is a substituent having a large polarizability anisotropy, is preferably used. Here, the substituted or unsubstituted aromatic acyl group may be exemplified by a group represented by the following Formula (A):

Formula (A)

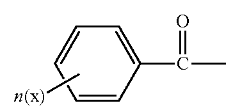

First, General Formula (A) will be explained. Here, X is the substituent, and the examples of the substituent include a halogen atom, cyano, an alkyl group, an alkoxy group, an aryl group, an aryloxy group, an acyl group, a carbonamide group, a sulfonamide group, an ureido group, an aralkyl group, nitro, an alkoxycarbonyl group, an aryloxycarbonyl group, an aralkyloxycarbonyl group, a carbamoyl group, a sulfamoyl group, an acyloxy group, an alkenyl group, an alkynyl group, an alkylsulfonyl group, an arylsulfonyl group, an alkyloxysulphonyl group, an aryloxysulfonyl group, an alkylsulfonyloxy group and an aryloxysulfonyl group, —S—R, —NH—CO—OR, —PH—R, —P(—R)$_2$, —PH—O—R, —P(—R)(—O—R), —P(—O—R)$_2$, —PH(═O)—R—P(═O)(—R)$_2$, —PH(═O)—O—R, —P(═O)(—R)(—O—R), —P(═O)(—O—R)$_2$, —O—PH(═O)—R, —O—P(═O)(—R)$_2$—O—PH(═O)—O—R, —O—P(═O)(—R)(—O—R), —O—P(═O)(—O—R)$_2$, —NH—PH(═O)—R, —NH—P(═O)(—R)(—O—R), —NH—P(═O)(—O—R)$_2$, —SiH$_2$—R, —SiH(—R)$_2$, —Si(—R)$_3$, —O—SiH$_2$—R, —O—SiH(—R)$_2$ and —O—Si(—R)$_3$. The above mentioned R is an aliphatic group, an aromatic group or a heterocycle group. The number of substituent is preferably 1 to 5, more preferably 1 to 4, even more preferably 1 to 3, most preferably 1 to 2. For substituent, a halogen atom, cyano, an alkyl group, an alkoxy group, an aryl group, an aryloxy group, an acyl group, a carbonamide group, a sulfonamide group, and an ureido group are preferable, a halogen atom, cyano, an alkyl group, an alkoxy group, an aryloxy group, an acyl group, and a carbonamide group are more preferable, a halogen atom, cyano, an alkyl group, an alkoxy group, and an aryloxy group are even more preferable, a halogen atom, an alkyl group, and an alkoxy group are most preferable.

The above mentioned halogen atoms include fluorine atom, chlorine atom, bromine atom and iodine atom. The above mentioned alkyl group may have cyclic structure or branch structure. The number of carbon atom of alkyl group is preferably 1 to 20, more preferably 1 to 12, even more preferably 1 to 6, most preferably 1 to 4. The examples of alkyl groups include methyl, ethyl, propyl, isopropyl, butyl, t-butyl, hexyl, cyclohexyl, octyl and 2-ethylhexyl. The above mentioned alkoxy group may have cyclic structure or branch structure. The number of carbon atom of alkoxy group is preferably 1 to 20, more preferably 1 to 12, even more preferably 1 to 6, most preferably 1 to 4. The alkoxy group may additionally be substituted with another alkoxy group. The examples of alkoxy groups include methoxy, ethoxy, 2-methoxyethoxy, 2-methoxy-2-ethoxyethoxy, butyloxy, hexyloxy and octyloxy.

The number of carbon atom of aryl group is preferably 6 to 20, more preferably 6 to 12. The examples of aryl group include phenyl and naphthyl. The number of carbon atom of aryloxy group is preferably 6 to 20, more preferably 6 to 12. The examples of aryloxy group include phenoxy and naphthoxy. The number of carbon atom of acyl group is preferably 1 to 20, more preferably 1 to 12. The examples of acyl group include formyl, acetyl and benzoyl. The number of carbon atom of carbonamide group is preferably 1 to 20, more preferably 1 to 12. The examples of carbonamide group include acetamide and benzamide. The number of carbon atom of sulfonamide group is preferably 1 to 20, more preferably 1 to 12. The examples of sulfonamide group include methane sulfonamide, benzene sulfonamide and p-toluene sulfonamide. The number of carbon atom of ureido group is preferably 1 to 20, more preferably 1 to 12. The examples of ureido group include (unsubstituted) ureido.

The number of carbon atom of aralkyl group is preferably 7 to 20, more preferably 7 to 12. The examples of aralkyl group include benzil, phenethyl and naphthylmethyl. The number of carbon atom of alkoxycarbonyl group is preferably 1 to 20, more preferably 2 to 12. The examples of alkoxycarbonyl group include methoxycarbonyl. The number of carbon atom of aryloxycarbonyl group is preferably 7 to 20, more preferably 7 to 12. The examples of aryloxycarbonyl group include phenoxycarbonyl. The number of carbon atom of aralkyloxycarbonyl group is preferably 8 to 20, more preferably 8 to 12. The examples of aralkyloxycarbonyl group include benzyloxycarbonyl. The number of carbon atom of carbamoyl group is preferably 1 to 20, more preferably 1 to 12. The examples of carbamoyl group include (unsubstituted) carbamoyl, and N-methylcarbamoyl. The number of carbon atom of sulfamoyl group is preferably less than 20, more preferably less than 12. The examples of sulfamoyl group include (unsubstituted) sulfamoyl, and N-methylsulfamoyl. The number of carbon atom of acyloxy group is preferably 1 to 20, more preferably 2 to 12. The examples of acyloxy group include acetoxy, benzoyloxy.

The number of carbon atom of alkenyl group is preferably 2 to 20, more preferably 2 to 12. The examples of alkenyl group include vinyl, allyl and isopropenyl. The number of carbon atom of alkynyl group is preferably 2 to 20, more preferably 2 to 12. The examples of alkynyl group include thienyl. The number of carbon atom of alkynylsulfonyl group is preferably 1 to 20, more preferably 1 to 12. The number of carbon atom of arylsulfonyl group is preferably 6 to 20, more preferably 6 to 12. The number of carbon atom of alkyloxysulfonyl group is preferably 1 to 20, more preferably 1 to 12. The number of carbon atom of aryloxysulfonyl group is preferably 6 to 20, more preferably 6 to 12. The number of carbon atom of alkylsulfonyloxy group is preferably 1 to 20, more preferably 1 to 12. The number of carbon atom of aryloxysulfonyl group is preferably 6 to 20, more preferably 6 to 12.

Next, with regard to the fatty acid ester residue in the cellulose mixed acid ester of the invention, the aliphatic acyl group has 2 to 20 carbon atoms, and specifically, acetyl, propionyl, butyryl, isobutyryl, valeryl, pivaloyl, hexanoyl, octanoyl, lauroyl, stearoyl and the like may be mentioned. Preferred are acetyl, propionyl and butyryl, and particularly preferred is acetyl. According to the invention, the aliphatic acyl group is meant to be further substituted, and substituents therefore may be exemplified by those listed as X in Formula (A) described in the above.

Moreover, when there are two or more substituents substituting the aromatic ring, they may be identical to or different from each other, or they may be joined to each other to form a fused polycyclic compound (for example, naphthalene, indene, indane, phenanthrene, quinoline, isoquinoline, chromene, chromane, phthalazine, acridine, indoline, etc.).

For the substitution of an aromatic acyl group to the hydroxyl group of cellulose, generally a method of using a symmetric acid anhydride derived from an aromatic carboxylic acid chloride or an aromatic carboxylic acid, and a mixed acid anhydride may be mentioned. Particularly preferably, a method of using an acid anhydride derived from an aromatic carboxylic acid (described in Journal of Applied Polymer Science, Vol. 29, 3981-3990 (1984)) may be mentioned. For the method of preparing the cellulose mixed acid ester compound of the invention among the methods described above, (1) a method of first preparing a cellulose fatty acid monoester or diester, and then introducing the aromatic acyl group represented by Formula (A) to the remaining hydroxyl groups, (2) a method of directly reacting a mixed acid anhydride of an aliphatic carboxylic acid and an aromatic carboxylic acid with cellulose, and the like may be mentioned. In the first step of (1), the method itself for preparing a cellulose fatty acid ester or diester is a well known method; however, the reaction of the second step in which an aromatic acyl group is further introduced to the ester or diester, is performed at a reaction temperature of preferably 0 to 100° C., and more preferably 20 to 50° C., for a reaction time of preferably 30 minutes or longer, and more preferably 30 to 300 minutes, although the reaction conditions may vary depending on the type of the aromatic acyl group. Also, for the latter method of using a mixed acid anhydride, the reaction conditions may vary depending on the type of the mixed acid anhydride, the reaction temperature is preferably 0 to 100° C., and more preferably 20 to 50° C., and the reaction time is preferably 30 to 300 minutes, and more preferably 60 to 200 minutes. For both of the above-described reactions, the reaction may be performed either without solvent or in a solvent, but the reaction is preferably performed using a solvent. A solvent that can be used may be dichloromethane, chloroform, dioxane or the like.

The degree of substitution of the aromatic acyl group is, in the case of cellulose fatty acid monoesters, preferably from 0.01 to 2.0, more preferably from 0.1 to 2.0, and still more preferably from 0.3 to 2.0, with respect to the residual hydroxyl group. The same degree of substitution is, in the case of cellulose fatty acid diesters, preferably from 0.01 to 1.0, more preferably from 0.1 to 1.0, and still more preferably from 0.3 to 1.0, with respect to the residual hydroxyl group.

Specific examples of the aromatic acyl group represented by Formula (A) will be shown below, but the invention is not intended to be limited thereto. Preferred among these are No. 1, 3, 5, 6, 8, 13, 18 and 28, and more preferred are No. 1, 3, 6 and 13.
1
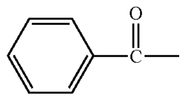
2
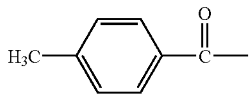
3
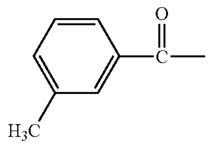
4
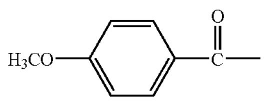
5
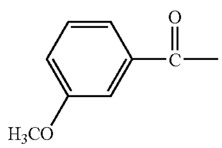
6
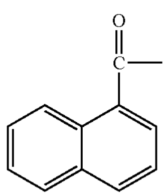
7
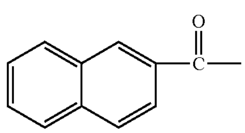
8
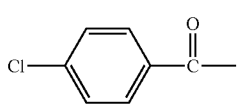
9
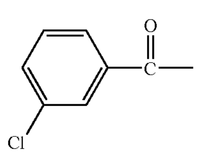
10
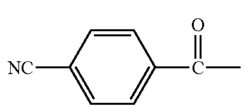
11
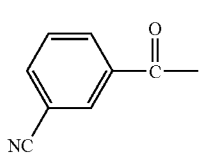
-continued
12
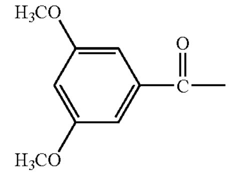
13
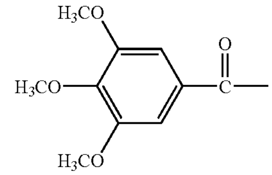
14
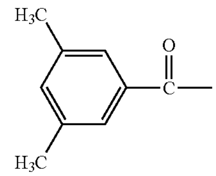
15
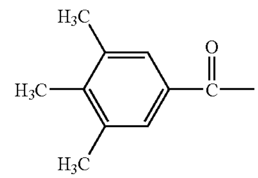
16
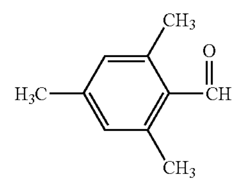
17
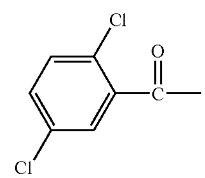
18
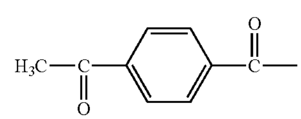
19
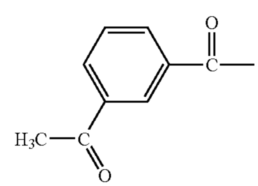
20
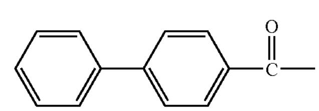
21
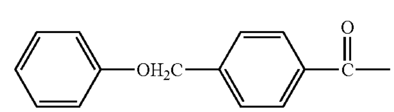

-continued
22
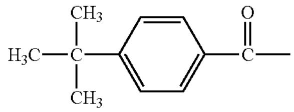
23
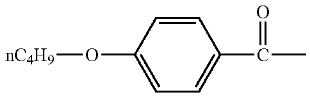
24
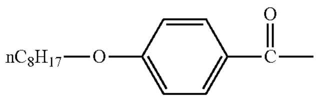
25
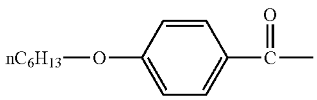
26
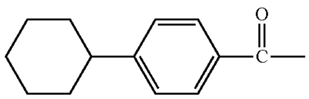
27
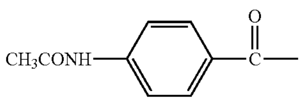
28
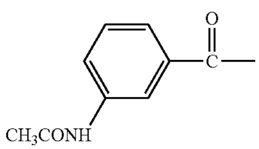
29
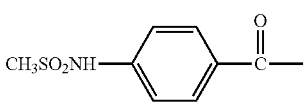
30
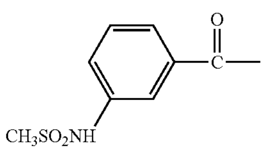
31
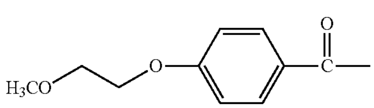
32
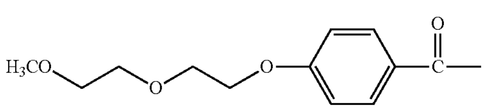
33
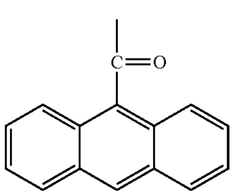
34
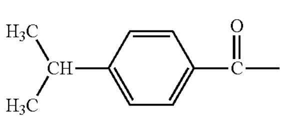
-continued
35
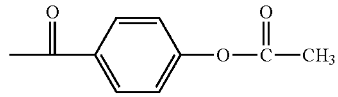
36
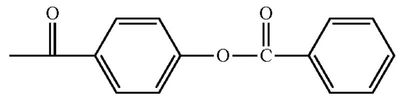
37
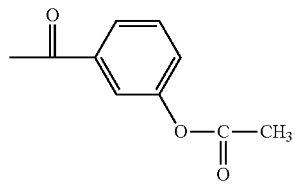
38
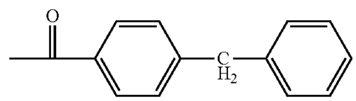
39
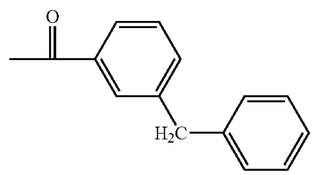
40
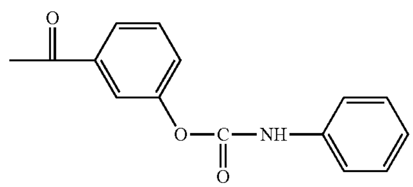
41
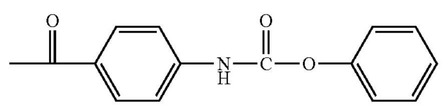
42
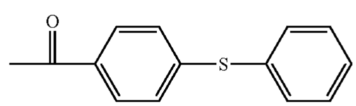
43
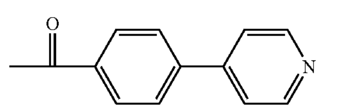
44
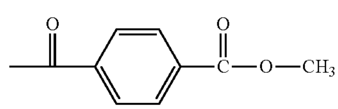
45
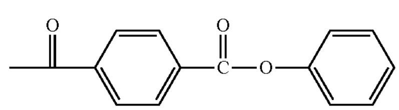
46
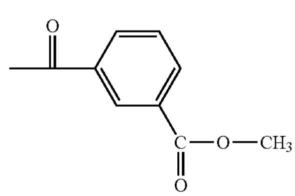

-continued

47

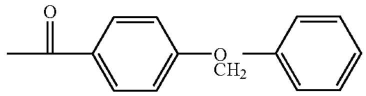

48

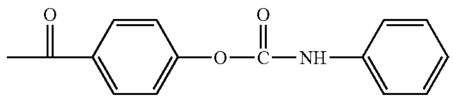

49

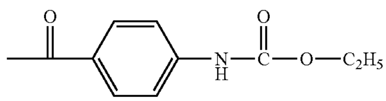

50

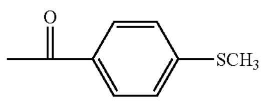

51

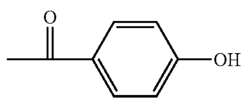

52

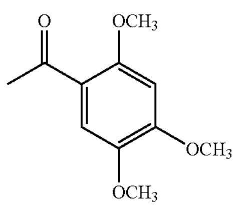

The cellulose derivative used for the invention preferably has a mass average degree of polymerization of 350 to 800, and more preferably has a mass average degree of polymerization of 370 to 600. The cellulose derivative used for the invention preferably has a number average molecular weight of 70,000 to 230,000, more preferably has a number average molecular weight of 75,000 to 230,000, and most preferably has a number average molecular weight of 78,000 to 120,000.

The cellulose derivative used for the invention can be synthesized employing an acid anhydride, an acid chloride or a halide as an acylating agent, alkylating agent or arylating agent. When an acid anhydride is used as the acylating agent, an organic acid (for example, acetic acid) or methylene chloride is used as the reaction solvent. For the catalyst, a protic catalyst such as sulfuric acid is used. When an acid chloride is used as the acylating agent, an alkaline compound is used as the catalyst. In the most general method of synthesis from an industrial viewpoint, cellulose ester is synthesized by esterifying cellulose with a mixed organic acid component containing an organic acid (acetic acid, propionic acid, butyric acid) which correspond to an acetyl group and another acyl group, or such an acid anhydride (acetic anhydride, propionic anhydride, butyric anhydride). In one of general methods for introducing an alkyl group or an aryl group as the substituent, a cellulose ester is synthesized by dissolving cellulose in an alkali solution, and then esterifying the cellulose to an alkyl halide compound, an aryl halide compound, or the like.

In this method, there are many cases that cellulose such as cotton linter, wood pulp is activated in the organic acid such as acetic acid, and then esterified in such blending organic acid constituent above with the sulfuric acid catalyst. An organic acid anhydride constituent is generally used in excessive quantity for quantity of hydroxy group existing in cellulose. In this esterification process, hydrolysis reaction (depolymerization reaction) of cellulose main chain β1→4-glycosidic bond is performed as well as esterification reaction. When hydrolysis reaction of main chain advances, degree of polymerization of cellulose ester decrease, and resulting this, properties of a cellulose ester film decrease. Therefore it is preferable to determine that reaction conditions such as reaction temperature in consideration for degree of polymerization and molecular weight of obtained cellulose ester.

It is important to regulate the highest temperature in an esterification reaction process in lower than 50° C. to obtain cellulose ester that degree of polymerization is high (molecular weight is large). The highest temperature is regulated to be preferably from 35 to 50° C., more preferably from 37 to 47° C. The condition that reaction temperature is higher than 35° C. is preferable, as the esterification reaction progress smoothly. The condition that reaction temperature is lower than 50° C. is preferable, as the inconvenience such that degree of polymerization of cellulose ester decrease dose not occur.

After reaction termination, inhibiting increase of the temperature to stop the reaction, further decrease of degree of polymerization can be inhibited, and cellulose ester that degree of polymerization is high can be synthesized. More specifically, after reaction, adding the reaction terminator (for example, water, acetic acid), the surplus acid anhydride which did not participate in esterification reaction hydrolyzes to give the corresponding organic acid as side product. Temperature in reaction apparatus rises because of intense exothermic heat due to this hydrolysis reaction. If addition speed of reaction terminator is not too fast, due to sudden exothermic heat exceeding the ability of cooling of reaction apparatus, hydrolysis reaction of cellulose main chain is remarkably performed, according to this, problem such that degree of polymerization of obtained cellulose ester falls does not occur. In addition, a part of a catalyst couples with cellulose during esterification reaction, the most part thereof that dissociate from cellulose during addition of reaction terminator. If addition speed of reaction terminator is not too fast then, enough reaction time is obtained so that a catalytic substance dissociate from cellulose, and it is hard to produce a problem such that one part of catalyst stay in cellulose in coupled condition. As for the cellulose ester which a part of the catalyst of strong acid couples, stability is so bad that it is easily break down with heat of drying time of product, and degree of polymerization decrease. For these reasons, after esterification reaction, it is desirable to stop reaction by adding reaction terminator, taking time, preferably more than 4 minutes, more preferably for 4 to 30 minutes. In addition, if addition time of reaction terminator is less than 30 minutes, it is preferable because problems such as decrease of industrial producing ability do not occur.

As reaction terminator, water and alcohol which generally break acid anhydride down were used. But, in the present invention, in order to prevent triester precipitation that solubility to various organic solvent is low, mixture of water and organic acid was preferably used as reaction terminator. When esterification reaction is performed in a condition such as the above, cellulose ester having the high molecular weight whose mass average degree of polymerization is 350 to 800 can be easily synthesized.

[Retardation Regulator]

The retardation regulator that is used as an essential component according to the invention, is a compound for reducing retardation in the film thickness in a film, and is a compound satisfying the following Expression (11-1).

$$Rth(a)-Rth(0)/a \leqq -1.5 \quad \text{Expression (11-1)}$$

(provided that $0.01 \leqq a \leqq 30$).

Rth(a): Rth (nm) at a wavelength of 589 nm, of a 80 μm-thick film comprising a cellulose acylate having a degree of acetyl substitution of 2.85, and a parts by mass of a retardation regulator relative to 100 parts by mass of cellulose acylate;

Rth(0): Rth (nm) at a wavelength of 589 nm, of a 80 μm-thick film comprising only a cellulose acylate having a degree of acetyl substitution of 2.85, with no retardation regulator; and a: parts by mass of the retardation regulator relative to 100 parts by mass of cellulose acylate.

When a compound satisfying the above Expression (11-1) is used as the retardation regulator, a sufficient effect of reducing Rth is obtained, and a film exhibiting a desired Rth can be prepared without using an excessive amount of retardation regulator.

According to the invention, Rth can be further reduced by combining a cellulose derivative having a substituent with a large polarizability anisotropy (may be described as "high polarizability anisotropy"), and a compound reducing Rth.

The retardation regulator more preferably satisfies the Expression (11-2), and still more preferably satisfies the Expression (11-3):

$$Rth(a)-Rth(0)/a \leqq -2.0 \quad \text{Expression (11-2)}$$

$$Rth(a)-Rth(0)/a \leqq -2.5 \quad \text{Expression (11-3)}$$

(provided that $0.01 \leqq a \leqq 30$).

The retardation regulator used for the invention is also preferably a compound, for which Re at a wavelength of 589 nm satisfies the following Expression (10) when the compound is added to a cellulose acylate film having a degree of acetyl substitution of 2.86:

$$|Re(a)-Re(0)|/a \geqq 1.0 \quad \text{Expression (10)}$$

Re(e): Re (nm) at a wavelength of 589 nm, of a 80 μm-thick film comprising a cellulose acylate having a degree of acetyl substitution of 2.85, and a parts by mass of a retardation regulator relative to 100 parts by mass of cellulose acylate; and Re(0): Re (nm) at a wavelength of 589 nm, of a 80 μm-thick film comprising a cellulose acylate having a degree of acetyl substitution of 2.85, with no retardation regulator.

According to the invention, Rth can be further reduced by combining the cellulose derivative having a substitution with a large polarizability anisotropy (may also be described as "high polarizability anisotropy"), and a retardation regulator. Although the mechanism of further reducing Rth is not clear, it is assumed that by using the retardation regulator which has high compatibility with the substituent on the cellulose derivative having a high polarizability, the degree of freedom in orientation of the substituent during film formation is increased, with the proportion of the substituent aligning in the direction of film thickness being increased along, and consequently, Rth of the film can be reduced.

As examples of the retardation regulator for the cellulose derivative film, which can be favorably used for the invention, compounds of Formulas (2-1) to (2-21) will be first shown below, but the invention is not limited to these compounds.

Formula (2-1)

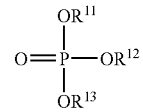

wherein $R^{11}$ to R13 each independently represent an aliphatic group having 1 to 20 carbon atoms, and $R^{11}$ to R13 may also be joined to each other to form a ring.

Formula (2-2)

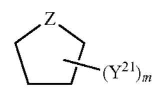

Formula (2-3)

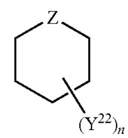

wherein, in Formulas (2-2) and (2-3), Z represents a carbon atoms, an oxygen atom, a sulfur atom or —$NR^{25}$—, wherein $R^{25}$ represents a hydrogen atom or an alkyl group; the 5- or 6-membered ring containing Z may be substituted; $Y^{21}$ and $Y^{22}$ each independently represent an ester group, an alkoxycarbonyl group, an amide group or a carbamoyl group, respectively having 1 to 20 carbon atoms, or $Y^{21}$ and $Y^{22}$ may be joined to each other to form a ring; m represents an integer from 1 to 5; and n represents an integer from 1 to 6.

Formula (2-4)

$$Y^{31}—L^{31}—Y^{32}$$

Formula (2-5)

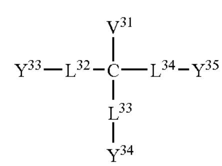

Formula (2-6)

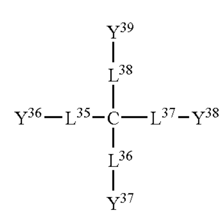

Formula (2-7)

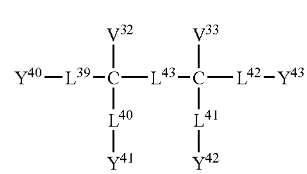

-continued

Formula (2-8)

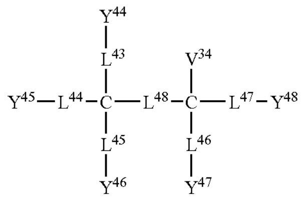

Formula (2-9)

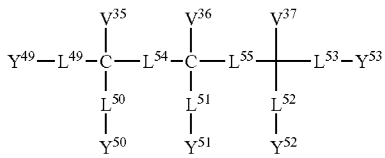

Formula (2-10)

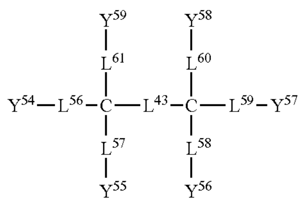

Formula (2-11)

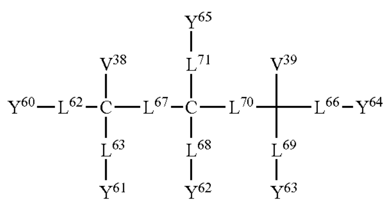

Formula (2-12)

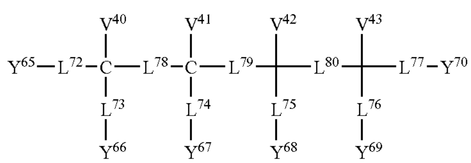

wherein, in Formulas (2-4) to (2-12), $Y^{31}$ to $Y^{70}$ each independently represent an ester group having 1 to 20 carbon atoms, an alkoxycarbonyl group having 1 to 20 carbon atoms, an amide group having 1 to 20 carbon atoms, a carbamoyl group having 1 to 20 carbon atoms, or a hydroxyl group; $V^{31}$ to $V^{43}$ each independently represent a hydrogen atom or an aliphatic group having 1 to 20 carbon atoms; $L^{31}$ to $L^{80}$ each independently represent a saturated divalent linking group having 0 to 40 atoms, with 0 to 20 carbon atoms, wherein the description "$L^{31}$ to $L^{80}$ having 0 atoms" implies that the groups present at both ends of the linking group are directly forming a single bond; and $V^{31}$ to $V^{43}$ and $L^{31}$ to $L^{80}$ may be further substituted.

Formula (2-13)

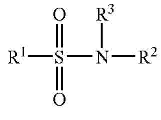

wherein, in Formula (2-13), $R^1$ represents an alkyl group or an aryl group; $R^2$ and $R^3$ each independently represent a hydrogen atom, an alkyl group or an aryl group; the sum of the number of carbon atoms of $R^1$, $R^2$ and $R^3$ is 10 or more; and the alkyl group and the aryl group may respectively be substituted.

Formula (2-14)

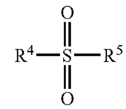

Wherein, in Formula (2-14), $R^4$ and $R^5$ each independently represent an alkyl group or an aryl group; the sum of the number of carbon atoms of $R^4$ and $R^5$ is 10 or more; and the alkyl group and the aryl group may respectively be substituted.

Formula (2-15)

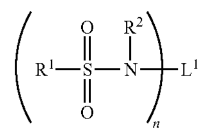

wherein, in Formula (2-15), $R^1$ represents a substituted or unsubstituted aliphatic group, or a substituted or unsubstituted aromatic group; $R^2$ represents a hydrogen atom, a substituted or unsubstituted aliphatic group, or a substituted or unsubstituted aromatic group; $L^1$ represents a linking group having a valency of 2 to 6; and n represents an integer from 2 to 6 corresponding to the valency of $L^1$.

Formula (2-16)

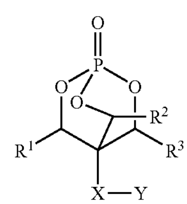

Wherein, in Formula (2-16), $R^1$, $R^2$ and $R^3$ each independently represent a hydrogen atom or an alkyl group; X represents a divalent linking group formed from one or more groups selected from Group 1 of Linking Groups as shown below; and Y represents a hydrogen atom, an alkyl group, an aryl group or an aralkyl group.

(Group 1 of Linking Groups)

Represents a single bond, —O—, —CO—, —$NR^4$—, an alkylene group or an arylene group, wherein $R^4$ represents a hydrogen atom, an alkyl group, an aryl group or an aralkyl group.

Formula (2-17)

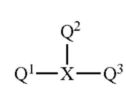

Wherein, in Formula (2-17), Q1, Q2 and Q3 each independently represent a 5- or 6-membered ring; X represents B, C—R (wherein R represents a hydrogen atom or a substituent), N, P or P═O.

The compound represented by the Formula (2-17) may be preferably exemplified by a compound represented by the following Formula (2-18):

Formula (2-18)

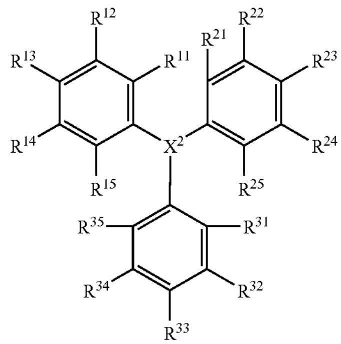

wherein, in Formula (2-18), $X^2$ represents B, C—R (wherein R represents a hydrogen atom or a substituent), or N; $R^{11}$, $R^{12}$, $R^{13}$, $R^{14}$, $R^{15}$, $R^{21}$, $R^{22}$, $R^{23}$, $R^{24}$, $R^{25}$, $R^{31}$, $R^{32}$, $R^{33}$, $R^{34}$ and $R^{35}$ each independently represent a hydrogen atom or a substituent.

Formula (2-19)

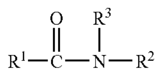

wherein, in Formula (2-19), $R^1$ represents an alkyl group or an aryl group; $R^2$ and $R^3$ each independently represent a hydrogen atom, an alkyl group or an aryl group; and the alkyl group and the aryl group may be substituted.

The compound represented by the Formula (2-19) may be preferably exemplified by a compound represented by the following Formula (2-20):

Formula (2-20)

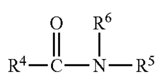

wherein, in Formula (2-20), $R^4$, $R^5$ and $R^6$ each independently represent an alkyl group or an aryl group, wherein the alkyl group may be straight-chained, branched or cyclic, and is preferably a group having 1 to 20 carbon atoms, more preferably a group having 1 to 15 carbon atoms, and most preferably a group having 1 to 12 carbon atoms. For the cyclic alkyl group, a cyclohexyl group is particularly preferred. The aryl group is preferably a group having 6 to 36 carbon atoms, and more preferably a group having 6 to 24 carbon atoms.

Formula (2-21)

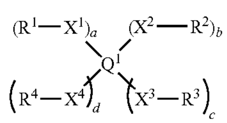

wherein, in Formula (2-21), $R^1$, $R^2$, $R^3$ and $R^4$ each independently represent a hydrogen atom, a substituted or unsubstituted aliphatic group, or a substituted or unsubstituted aromatic group; $X^1$, $X^2$, $X^3$ and $X^4$ each independently represent a divalent linking group formed from one or more groups selected from the group consisting of a single bond, —CO—, and —$NR^5$— (wherein $R^5$ represents a substituted or unsubstituted aliphatic group, or a substituted or unsubstituted aromatic group); a, b, c and d are each an integer of 0 or greater, and a+b+c+d is 2 or more; and Q1 represents an organic group having a valency of (a+b+c+d).

Specific examples of the compound reducing the optical anisotropy of cellulose derivative films, which is favorably used for the invention, will be shown in the following with reference to the compounds represented by the Formulas (2-1) to (2-21), but the invention is not limited to these compounds.

The compound of Formula (2-1) will be illustrated.

Formula (2-1)

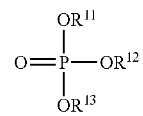

In Formula (2-1), $R^{11}$ to R13 each independently represent an aliphatic group having 1 to 20 carbon atoms, wherein the aliphatic group may be substituted, and $R^{11}$ to R13 may also be joined to each other to form a ring.

$R^{11}$ to R13 will be illustrated in detail. $R^{11}$ to R13 are each an aliphatic group having preferably 1 to 20 carbon atoms, more preferably 1 to 16 carbon atoms, and particularly preferably 1 to 12 carbon atoms, and here, the aliphatic group is preferably an aliphatic hydrocarbon group, more preferably an alkyl group (including straight-chained, branched and cyclic alkyl groups), an alkenyl group or an alkynyl group. Examples of the alkyl group include methyl, ethyl, n-propyl, isopropyl, n-butyl, isobutyl, sec-butyl, t-butyl, n-pentyl, t-amyl, n-hexyl, n-octyl, decyl, dodecyl, eicosyl, 2-ethylhexyl, cyclopentyl, cyclohexyl, cycloheptyl, 2,6-dimethylcyclohexyl, 4-t-butylcyclohexyl, cyclopentyl, 1-adamantyl, 2-adamantyl, bicycle[2.2.2]octan-3-yl and the like; examples of the alkenyl group include vinyl, allyl, prenyl, geranyl, oleyl, 2-cyclopenten-1-yl, 2-cyclohexen-1-yl and the like; and examples of the alkynyl group include ethynyl, propargyl and the like.

The aliphatic group represented by $R^{11}$ to R13 may be substituted or unsubstituted, and examples of the substituent include a halogen atom (a fluorine atom, a chlorine atom, bromine atom or an iodine atom), an alkyl group (including straight-chained, branched and cyclic alkyl groups, a bicyclo alkyl group, and an active methine group), an alkenyl group, an alkynyl group, an aryl group, a heterocyclic group (irrespective of the position being substituted), an acyl group, an alkoxycarbonyl group, an aryloxycarbonyl group, a heterocyclic oxycarbonyl group, a carbamoyl group, an N-acyl carbamoyl group, an N-sulfonyl carbamoyl group, an N-carbamoyl carbamoyl group, an N-sulfamoyl carbamoyl group, a carbazoyl group, a carboxyl group or a salt thereof, an oxalyl group, an oxamoyl group, a cyano group, a carbonimidoyl group, a formyl group, a hydroxyl group, an alkoxy group (including the groups having repetition of ethyleneoxy group or propyleneoxy group units), an aryloxy group, a heterocyclic oxy group, an acyloxy group, an (alkoxy or aryloxy) carbonyloxy group, a carbamoyloxy group, a sulfonyloxy group, an (alkyl, aryl or heterocyclic)amino group, an amino group, an acylamino group, a sulfonamide group, a ureido group, a thioureido group, an imide group, an (alkoxy or aryloxy) carbonylamino group, a sulfamoylamino group, a semicarbazide group, an ammonio group, an oxamoylamino group, an N-(alkyl or aryl)sulfonylureido group, an N-acylureido group, an N-acyl sulfamoylamino group, a heterocyclic group containing a quaternized nitrogen atom (for example, a pyridinio group, an imidazolio group, a quinolinio group, an isoquinolinio group), an isocyano group, an imino group, an (alkyl or aryl)sulfonyl group, an (alkyl or aryl) sulfinyl group, a sulfo group or a salt thereof, a sulfamoyl group, an N-acyl sulfamoyl group, an N-sulfonyl sulfamoyl group or a salt thereof, a phosphino group, a phosphinyl group, a phosphinyloxy group, a phosphinylamino group, a silyl group, and the like.

These groups may be further combined to form a composite substituent, and examples of such substituent include an ethoxy ethoxy ethyl group, a hydroxyl ethoxy ethyl group, an ethoxy carbonyl ethyl group, and the like. Further, $R^{11}$ to R13 may contain a phosphoric acid ester group as a substituent, and the compound of Formula (2-1) may also contain a plurality of phosphoric acid ester groups within the same molecule.

Examples (C-1 to C-76) of the compound represented by Formula (2-1) will be shown below, but the invention is not limited to these. In addition, the values of log P have beendetermined according to Crippen's fragmentation method (J. Chem. Inf. Comput. Sci., 27, 21 (1987)).

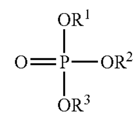

Wherein $R^1$ to $R^3$ have the same meaning as $R^{11}$ to R13 of the Formula (2-1), and specific examples will be shown by means of C-1 to C-76 in the following.

TABLE 2-1

| compound | $R^1$ | $R^2$ | $R^3$ | logP |
|---|---|---|---|---|
| C-1 | $CH_3$ | $C_2H_5$ | $C_2H_5$ | 1.24 |
| C-2 | $C_2H_5$ | $C_2H_5$ | $C_2H_5$ | 1.58 |
| C-3 | $C_3H_7$ | $C_3H_7$ | $C_3H_7$ | 2.99 |
| C-4 | i-$C_3H_7$ | i-$C_3H_7$ | i-$C_3H_7$ | 2.82 |
| C-5 | $C_4H_9$ | $C_4H_9$ | $C_4H_9$ | 4.18 |
| C-6 | i-$C_4H_9$ | i-$C_4H_9$ | i-$C_4H_9$ | 4.2 |
| C-7 | s-$C_4H_9$ | s-$C_4H_9$ | s-$C_4H_9$ | 4.23 |
| C-8 | t-$C_4H_9$ | t-$C_4H_9$ | t-$C_4H_9$ | 3.06 |
| C-9 | $C_5H_{11}$ | $C_5H_{11}$ | $C_5H_{11}$ | 5.37 |
| C-10 | $CH_2C(CH_3)_3$ | $CH_2C(CH_3)_3$ | $CH_2C(CH_3)_3$ | 5.71 |
| C-11 | c-$C_5H_9$ | c-$C_5H_9$ | c-$C_5H_9$ | 4.12 |
| C-12 | 1-ethylpropyl | 1-ethylpropyl | 1-ethylpropyl | 5.63 |
| C-13 | $C_6H_{13}$ | $C_6H_{13}$ | $C_6H_{13}$ | 6.55 |
| C-14 | c-$C_6H_{11}$ | c-$C_6H_{11}$ | c-$C_6H_{11}$ | 5.31 |
| C-15 | $C_7H_{15}$ | $C_7H_{15}$ | $C_7H_{15}$ | 7.74 |
| C-16 | 4-methylcyclohexyl | 4-methylcyclohexyl | 4-methylcyclohexyl | 6.3 |
| C-17 | 4-t-butylcyclohexyl | 4-t-butylcyclohexyl | 4-t-butylcyclohexyl | 9.78 |
| C-18 | $C_8H_{17}$ | $C_8H_{17}$ | $C_8H_{17}$ | 8.93 |
| C-19 | 2-ethylhexyl | 2-ethylhexyl | 2-ethylhexyl | 8.95 |
| C-20 | 3-methylbutyl | 3-methylbutyl | 3-methylbutyl | 5.17 |

TABLE 2-2

| compound | $R^1$ | $R^2$ | $R^3$ | logP |
|---|---|---|---|---|
| C-21 | 1,3-dimethylbutyl | 1,3-dimethylbutyl | 1,3-dimethylbutyl | 6.41 |
| C-22 | 1-isopropyl-2-methylpropyl | 1-isopropyl-2-methylpropyl | 1-isopropyl-2-methylpropyl | 8.05 |
| C-23 | 2-ethylbutyl | 2-ethylbutyl | 2-ethylbutyl | 6.57 |
| C-24 | 3,5,5-trimethylhexyl | 3,5,5-trimethylhexyl | 3,5,5-trimethylhexyl | 9.84 |
| C-25 | cyclohexylmethyl | cyclohexylmethyl | cyclohexylmethyl | 6.25 |
| C-26 | $CH_3$ | $CH_3$ | 2-ethylhexyl | 3.35 |
| C-27 | $CH_3$ | $CH_3$ | 1-adamantyl | 2.27 |
| C-28 | $CH_3$ | $CH_3$ | $C_{12}H_{25}$ | 4.93 |
| C-29 | $C_2H_5$ | $C_2H_5$ | 2-ethylhexyl | 4.04 |
| C-30 | $C_2H_5$ | $C_2H_5$ | 1-adamantyl | 2.96 |
| C-31 | $C_2H_5$ | $C_2H_5$ | $C_{12}H_{25}$ | 5.62 |
| C-32 | $C_4H_9$ | $C_4H_9$ | cyclohexyl | 4.55 |
| C-33 | $C_4H_9$ | $C_4H_9$ | $C_6H_{13}$ | 4.97 |
| C-34 | $C_4H_9$ | $C_4H_9$ | $C_8H_{17}$ | 5.76 |
| C-35 | $C_4H_9$ | $C_4H_9$ | 2-ethylhexyl | 5.77 |
| C-36 | $C_4H_9$ | $C_4H_9$ | $C_{10}H_{21}$ | 6.55 |
| C-37 | $C_4H_9$ | $C_4H_9$ | $C_{12}H_{25}$ | 7.35 |
| C-38 | $C_4H_9$ | $C_4H_9$ | 1-adamantyl | 4.69 |
| C-39 | $C_4H_9$ | $C_4H_9$ | $C_{16}H_{33}$ | 8.93 |
| C-40 | $C_4H_9$ | $C_4H_9$ | dicyclopentadienyl | 4.68 |

TABLE 2-3

| compound | $R^1$ | $R^2$ | $R^3$ | logP |
|---|---|---|---|---|
| C-41 | $C_6H_{13}$ | $C_6H_{13}$ | $C_{14}H_{29}$ | 9.72 |
| C-42 | $C_6H_{13}$ | $C_6H_{13}$ | $C_8H_{17}$ | 7.35 |
| C-43 | $C_6H_{13}$ | $C_6H_{13}$ | 2-ethylhexyl | 7.35 |
| C-44 | $C_6H_{13}$ | $C_6H_{13}$ | $C_{10}H_{21}$ | 8.14 |
| C-45 | $C_6H_{13}$ | $C_6H_{13}$ | $C_{12}H_{25}$ | 8.93 |
| C-46 | $C_6H_{13}$ | $C_6H_{13}$ | 1-adamantyl | 6.27 |
| C-47 | 4-chlorobutyl | 4-chlorobutyl | 4-chlorobutyl | 4.18 |
| C-48 | 4-chlorohexyl | 4-chlorohexyl | 4-chlorohexyl | 6.55 |
| C-49 | 4-bromobutyl | 4-bromobutyl | 4-bromobutyl | 4.37 |
| C-50 | 4-bromohexyl | 4-bromohexyl | 4-bromohexyl | 6.74 |
| C-51 | $(CH_2)_2OCH_2CH_3$ | $(CH_2)_2OCH_2CH_3$ | $(CH_2)_2OCH_2CH_3$ | 1.14 |
| C-52 | $C_8H_{17}$ | $C_8H_{17}$ | $(CH_2)_2O(CH_2)_2OCH_2CH_3$ | 6.55 |
| C-53 | $C_6H_{13}$ | $C_6H_{13}$ | $(CH_2)_2O(CH_2)_2OCH_2CH_3$ | 4.96 |
| C-54 | $C_4H_9$ | $C_4H_9$ | $(CH_2)_2O(CH_2)_2OCH_2CH_3$ | 3.38 |
| C-55 | $C_4H_9$ | $C_4H_9$ | $(CH_2)_2O(CH_2)_2OCH_2OH$ | 2.59 |
| C-56 | $C_6H_{13}$ | $C_6H_{13}$ | $(CH_2)_2O(CH_2)_2OCH_2OH$ | 4.18 |
| C-57 | $C_8H_{17}$ | $C_8H_{17}$ | $(CH_2)_2O(CH_2)_2OCH_2OH$ | 5.76 |
| C-58 | $C_4H_9$ | $(CH_2)_2O(CH_2)_2OCH_2OH$ | $(CH_2)_2O(CH_2)_2OCH_2OH$ | 2.2 |
| C-59 | $C_4H_9$ | $C_4H_9$ | $CH_2CH{=}CH_2$ | 4.19 |
| C-60 | $C_4H_9$ | $CH_2CH{=}CH_2$ | $CH_2CH{=}CH_2$ | 3.64 |

TABLE 2-4

| compound | $R^1$ | $R^2$ | $R^3$ | logP |
|---|---|---|---|---|
| C-61 | $(CH_2)_2CO_2CH_2CH_3$ | $(CH_2)_2CO_2CH_2CH_3$ | $(CH_2)_2CO_2CH_2CH_3$ | 1.1 |
| C-62 | $(CH_2)_2CO_2(CH_2)_3CH_3$ | $(CH_2)_2CO_2(CH_2)_3CH_3$ | $(CH_2)_2CO_2(CH_2)_3CH_3$ | 3.69 |
| C-63 | $(CH_2)_2CONH(CH_2)_3CH_3$ | $(CH_2)_2CONH(CH_2)_3CH_3$ | $(CH_2)_2CONH(CH_2)_3CH_3$ | 1.74 |
| C-64 | $C_4H_9$ | $C_4H_9$ | $(CH_2)_4OP{=}O(OC_4H_9)_2$ | 6.66 |
| C-65 | $C_4H_9$ | $C_4H_9$ | $(CH_2)_3OP{=}O(OC_4H_9)_2$ | 6.21 |
| C-66 | $C_4H_9$ | $C_4H_9$ | $(CH_2)_2OP{=}O(OC_4H_9)_2$ | 6.16 |
| C-67 | $C_4H_9$ | $C_4H_9$ | $(CH_2)_2O(CH_2)_2OP{=}O(OC_4H_9)_2$ | 5.99 |
| C-68 | $C_6H_{13}$ | $C_6H_{13}$ | $(CH_2)_2O(CH_2)_2OP{=}O(OC_4H_9)_2$ | 7.58 |
| C-69 | $C_6H_{13}$ | $C_6H_{13}$ | $(CH_2)_4OP{=}O(OC_4H_9)_2$ | 8.25 |
| C-70 | c-$C_6H_{13}$ | c-$C_6H_{13}$ | $(CH_2)_2O(CH_2)_2OP{=}O(OC_4H_9)_2$ | 6.35 |
| C-71 | $C_6H_{12}Cl$ | $C_6H_{12}Cl$ | $(CH_2)_2O(CH_2)_2OP{=}O(OC_4H_9)_2$ | 7.18 |
| C-72 | $C_4H_8Cl$ | $C_4H_8Cl$ | $(CH_2)_2O(CH_2)_2OP{=}O(OC_4H_9)_2$ | 5.6 |
| C-73 | $C_4H_8Cl$ | $C_4H_8Cl$ | $(CH_2)_2O(CH_2)_2OP{=}O(OC_4H_8Cl)_2$ | 5.59 |
| C-74 | $C_4H_9$ | $C_4H_9$ | 2-tetrahydrofuranyl | 3.27 |
| C-75 | $C_4H_9$ | 2-tetrahydrofuranyl | 2-tetrahydrofuranyl | 2.36 |
| C-76 | 2-tetrahydrofuranyl | 2-tetrahydrofuranyl | 2-tetrahydrofuranyl | 1.45 |

The compounds of Formula (2-2) and (2-3) will be illustrated.

Formula (2-2)

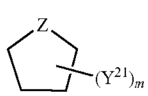

Formula (2-3)

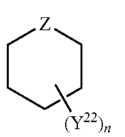

In Formulas (2-2) and (2-3), Z represents a carbon atom, an oxygen atom, a sulfur atom, or —$NR^{25}$—, wherein $R^{25}$ represents a hydrogen atom or an alkyl group. The 5- or 6-membered ring containing Z may be substituted, and a plurality of substituents may be joined to each other to form a ring. Examples of the 5- or 6-membered ring containing Z include tetrahydrofuran, tetrahydropyran, tetrahydrothiophene, thiane, pyrrolidine, piperidine, indoline, isoindoline, chromane, isochromane, tetrahydro-2-furanone, tetrahydro-2-pyrone, 4-butane lactam, 6-hexanolactam, and the like.

Further, examples of the 5- or 6-membered ring containing Z include a lactone structure or a lactam structure, that is, a cyclic ester or cyclic amide structure having an oxo group on the carbon adjacent to Z. Examples of such cyclic ester or cyclic amide structure include 2-pyrrolidone, 2-piperidone, 5-pentanolide and 6-hexanolide.

$R^{25}$ represents a hydrogen atom, or an alkyl group (including straight-chained, branched and cyclic alkyl groups) having preferably 1 to 20 carbon atoms, more preferably 1 to 16 carbon atoms, and particularly preferably 1 to 12 carbon atoms. Examples of the alkyl group represented by $R^{25}$ include methyl, ethyl, n-propyl, isopropyl, n-butyl, isobutyl, sec-butyl, t-butyl, n-pentyl, t-amyl, n-hexyl, n-octyl, decyl, dodecyl, eicosyl, 2-ethylhexyl, cyclopentyl, cyclohexyl, cycloheptyl, 2,6-dimethylcyclohexyl, 4-t-butylcyclohexyl, cyclopentyl, 1-adamantyl, 2-adamantyl, bicyclo[2.2.2]octan-3-yl, and the like. The alkyl group represented by $R^{25}$ may be further substituted, and examples of the substituent include those exemplified above as the groups which may be substituted on $R^{11}$ to R13.

$Y^{21}$ to $Y^{22}$ each independently represent an ester group, an alkoxycarbonyl group, an amide group or a carbamoyl group. The ester may have preferably 1 to 20 carbon atoms, more preferably 1 to 16 carbon atoms, and particularly preferably 1 to 12 carbon atoms, and examples thereof include acetoxy, ethylcarbonyloxy, propylcarbonyloxy, n-butylcarbonyloxy, isobutylcarbonyloxy, t-butylcarbonyloxy, sec-butylcarbonyloxy, n-pentylcarbonyloxy, t-amylcarbonyloxy, n-hexylcarbonyloxy, cyclohexylcarbonyloxy, 1-ethylpentylcarbonyloxy, n-heptylcarbonyloxy, n-nonylcarbonyloxy, n-undecylcarbonyloxy, benzylcarbonyloxy, 1-naphthalenecarbonyloxy, 2-naphthalenecarbonyloxy, 1-adamantane carbonyloxy, and the like. The alkoxycarbonyl group may have preferably 1 to 20 carbon atoms, more preferably 1 to 16 carbon atoms, and particularly preferably 1 to 12 carbon atoms, and examples thereof include methoxycarbonyl, ethoxycarbonyl, n-propyloxycarbonyl, isopropyloxycarbonyl, n-butoxycarbonyl, t-butoxycarbonyl, isobutyloxycarbonyl, sec-butyloxycarbonyl, n-pentyloxycarbonyl, t-amyloxycarbonyl, n-hexyloxycarbonyl, cyclohexyloxycarbonyl, 2-ethylhexyloxycarbonyl, 1-ethylpropyloxycarbonyl, n-octyloxycarbonyl, 3,7-dimethyl-3-octyloxycarbonyl, 3,5,5-trimethylhexyloxycarbonyl, 4-t-butylcyclohexyloxycarbonyl, 2,4-dimethylpentyl-3-oxycarbonyl, 1-adamantaneoxycarbonyl, 2-adamantaneoxycarbonyl, dicyclopentadienyloxycarbonyl, n-decyloxycarbonyl, n-dodecyloxycarbonyl, n-tetradecyloxycarbonyl, n-hexadecyloxycarbonyl, and the like. The amide group may have preferably 1 to 20 carbon atoms, more preferably 1 to 16 carbon atoms, and particularly preferably 1 to 12 carbon atoms, and examples thereof include acetamide, ethylcarboxamide, n-propylcarboxamide, isopropylcarboxamide, n-butylcarboxamide, t-butylcarboxamide, isobutylcarboxamide, sec-butylcarboxamide, n-pentylcarboxamide, t-amylcarboxamide, n-hexylcarboxamide, cyclohexylcarboxamide, 1-ethylpentylcarboxamide, 1-ethylpropylcarboxamide, n-heptylcarboxamide, n-octylcarboxamide, 1-adamantanecarboxamide, 2-adamantanecarboxamide, n-nonylcarboxamide, n-dodecylcarboxamide, n-pentacarboxamide, n-hexadecylcarboxamide, and the like. The carbamoyl group may have preferably 1 to 20 carbon atoms, more preferably 1 to 16 carbon atoms, and particularly preferably 1 to 12 carbon atoms, and examples thereof include methylcarbamoyl, dimethylcarbamoyl, ethylcarbamoyl, diethylcarbamoyl, n-propylcarbamoyl, isopropylcarbamoyl, n-butylcarbamoyl, t-butylcarbamoyl, isobutylcarbamoyl, sec-butylcarbamoyl, n-pentylcarbamoyl, t-amylcarbamoyl, n-hexylcarbamoyl, cyclohexylcarbamoyl, 2-ethylhexylcarbamoyl, 2-ethylbutylcarbamoyl, t-octylcarbamoyl, n-heptylcarbamoyl, n-octylcarbamoyl, 1-adamantanecarbamoyl, 2-adamantanecarbamoyl, n-decylcarbamoyl, n-dodecylcarbamoyl, n-tetradecylcarbamoyl, n-hexadecylcarbamoyl, and the like. $Y^{21}$ and $Y^{22}$ may be joined to each other to form a ring. $Y^{21}$ and $Y^{22}$ may be further substituted, and examples of the substituent include those exemplified above as the groups which may be substituted on $R^{11}$ to R13.

Examples (C-201 to C-231) of the compound represented by Formula (2-2) or (2-3) will be described in the following, but the invention is not limited to these. In addition, the values of log P described within the brackets have been determined according to Crippen's fragmentation method (J. Chem. Inf. Comput. Sci., 27, 21 (1987)).

C-201

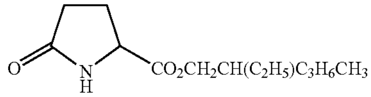

(2.00)

C-202

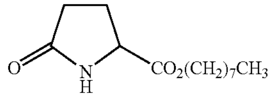

(2.02)

-continued

C-203

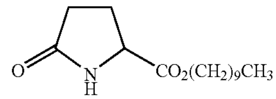

(3.69)

C-204

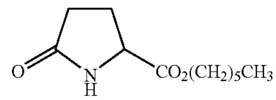

(1.18)

C-205

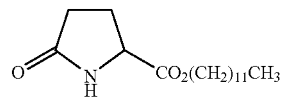

(5.36)

C-206

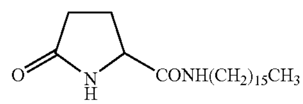

(4.68)

C-207

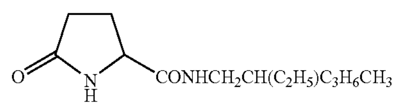

(1.32)

C-208

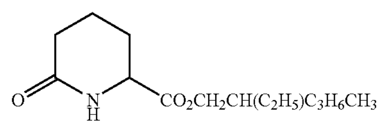

(2.42)

C-209

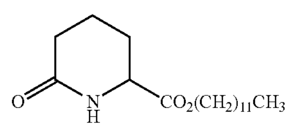

(4.10)

C-210

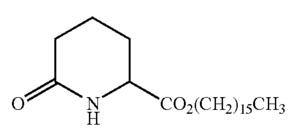

(5.77)

C-211

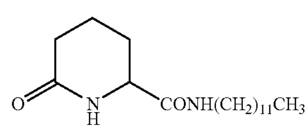

(3.43)

C-212

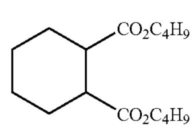

(3.84)

-continued
C-213
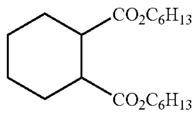
(5.51)
C-214
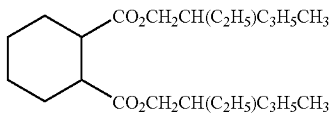
(7.14)
C-215
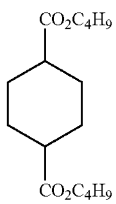
(3.84)
C-216
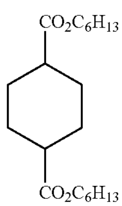
(5.51)
C-217
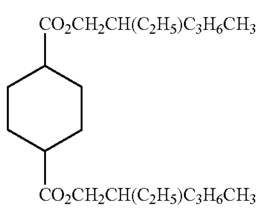
(7.14)
C-218
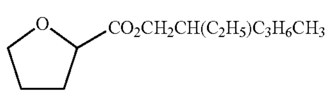
(2.98)
C-219
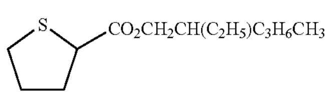
(3.70)
C-220
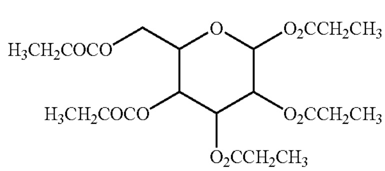
(2.15)
-continued
C-221
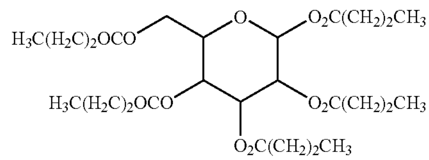
(4.45)
C-222
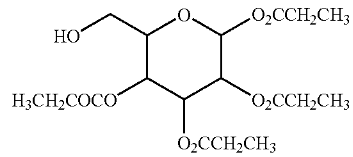
(1.27)
C-223
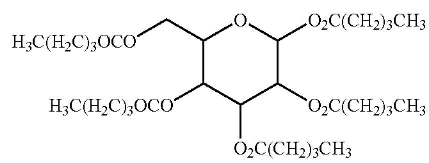
(6.53)
C-224
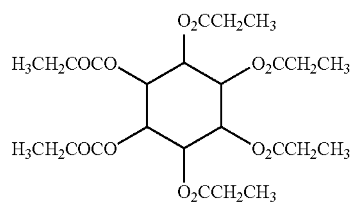
(2.23)
C-225
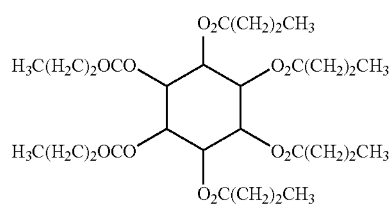
(5.01)
C-226
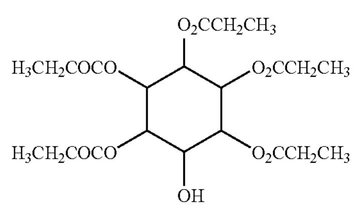
(1.31)
C-227
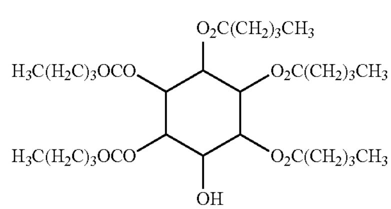
(5.69)

-continued

C-228

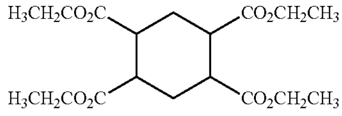

(1.56)

C-229

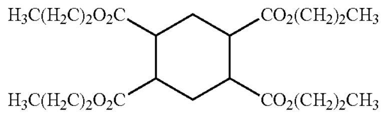

(3.51)

C-230

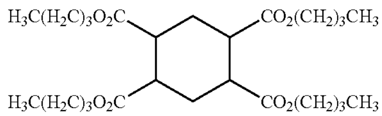

(5.18)

C-231

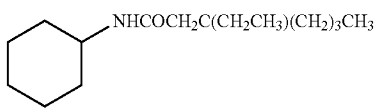

(3.90)

The compounds of Formulas (2-4) to (2-12) will be illustrated.

Formula (2-4)

$$Y^{31}—L^{31}—Y^{32}$$

Formula (2-5)

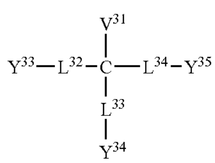

Formula (2-6)

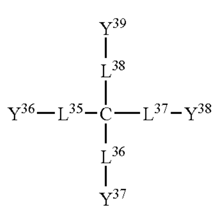

Formula (2-7)

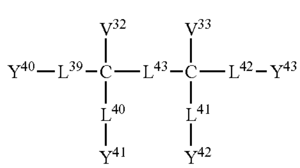

Formula (2-8)

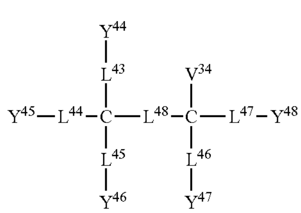

-continued

Formula (2-9)

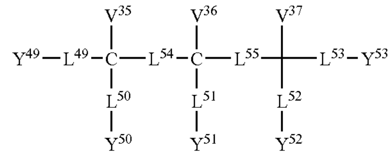

Formula (2-10)

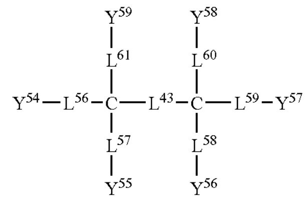

Formula (2-11)

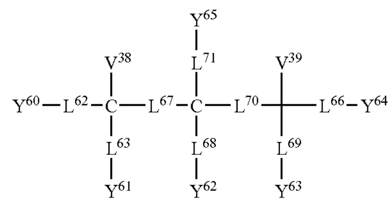

Formula (2-12)

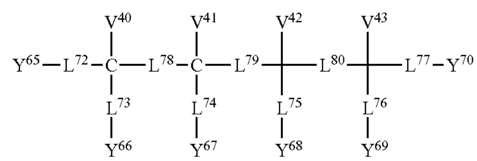

In Formulas (2-4) to (2-12), $Y^{31}$ to $Y^{70}$ each independently represent an ester group, an alkoxycarbonyl group, an amide group, a carbamoyl group or a hydroxyl group. The ester group may have preferably 1 to 20 carbon atoms, more preferably 1 to 16 carbon atoms, and particularly preferably 1 to 12 carbon atoms, and examples thereof include acetoxy, ethylcarbonyloxy, propylcarbonyloxy, n-butylcarbonyloxy, isobutylcarbonyloxy, t-butylcarbonyloxy, sec-butylcarbonyloxy, n-pentylcarbonyloxy, t-amylcarbonyloxy, n-hexylcarbonyloxy, cyclohexylcarbonyloxy, 1-ethylpentylcarbonyloxy, n-heptylcarbonyloxy, n-nonylcarbonyloxy, n-undecylcarbonyloxy, benzylcarbonyloxy, 1-naphthalenecarbonyloxy, 2-naphthalenecarbonyloxy, 1-adamantanecarbonyloxy, and the like. The alkoxycarbonyl group may have preferably 1 to 20 carbon atoms, more preferably 1 to 16 carbon atoms, and particularly preferably 1 to 12 carbon atoms, and examples thereof include methoxycarbonyl, ethoxycarbonyl, n-propyloxycarbonyl, isopropyloxycarbonyl, n-butoxycarbonyl, t-butoxycarbonyl, isobutyloxycarbonyl, sec-butyloxycarbonyl, n-pentyloxycarbonyl, t-amyloxycarbonyl, n-hexyloxycarbonyl, cyclohexyloxycarbonyl, 2-ethylhexyloxycarbonyl and the like, 1-ethylpropyloxycarbonyl, n-octyloxycarbonyl, 3,7-dimethyl-3-octyloxycarbonyl, 3,5,5-trimethylhexyloxycarbonyl, 4-t-butylcyclohexyloxycarbonyl, 2,4-dimethylpentyl-3-oxycarbonyl, 1-adamantaneoxycarbonyl, 2-adamantaneoxycarbonyl, dicyclopentadienyloxycarbonyl, n-decyloxycarbonyl, n-dodecyloxycarbonyl, n-tetradecyloxycarbonyl, n-hexadecyloxycarbonyl, and the like. The amide group may have preferably 1 to 20 carbon atoms, more preferably 1 to 16 carbon atoms, and particularly preferably 1 to 12 carbon atoms, and examples thereof include acetamide, ethylcarboxamide, n-propylcarboxamide, isopropylcarboxamide, n-butylcarboxamide, t-butylcarboxamide, isobutylcarboxamide, sec-butylcarboxamide, n-pentylcarboxamide, t-amylcarboxamide, n-hexylcarboxamide, cyclohexylcarboxamide, 1-ethylpentylcarboxamide, 1-ethylpropylcarboxamide, n-heptylcarboxamide, n-octylcarboxamide, 1-adamantanecarboxamide, 2-adamantanecarboxamide, n-nonylcarboxamide, n-dodecylcarboxamide, n-pentacarboxamide, n-hexadecylcarboxamide, and the like. The carbamoyl group may have preferably 1 to 20 carbon atoms, more preferably 1 to 16 carbon atoms, and particularly preferably 1 to 12 carbon atoms, and examples thereof include methylcarbamoyl, dimethylcarbamoyl, ethylcarbamoyl, diethylcarbamoyl, n-propylcarbamoyl, isopropyl carbamoyl, n-butylcarbamoyl, t-butylcarbamoyl, isobutylcarbamoyl, sec-butylcarbamoyl, n-pentylcarbamoyl, t-amylcarbamoyl, n-hexylcarbamoyl, cyclohexylcarbamoyl, 2-ethylhexylcarbamoyl, 2-ethylbutylcarbamoyl, t-octylcarbamoyl, n-heptylcarbamoyl, n-octylcarbamoyl, 1-adamantanecarbamoyl, 2-adamantanecarbamoyl, n-decylcarbamoyl, n-dodecylcarbamoyl, n-tetradecylcarbamoyl, n-hexadecylcarbamoyl, and the like. $Y^{31}$ to $Y^{70}$ may be further substituted, and examples of the substituent include those exemplified above as the groups which may be substituted on $R^{11}$ to R13.

$V^{31}$ to $V^{43}$ each independently represent a hydrogen atom, or an aliphatic group having preferably 1 to 20 carbon atoms, more preferably 1 to 16 carbon atoms, and particularly preferably 1 to 12 carbon atoms. Herein, the aliphatic group is preferably an aliphatic hydrocarbon group, more preferably an alkyl group (including straight-chained, branched and cyclic alkyl groups), an alkenyl group or an alkynyl group. Examples of the alkyl group include methyl, ethyl, n-propyl, isopropyl, n-butyl, isobutyl, sec-butyl, t-butyl, n-pentyl, t-amyl, n-hexyl, n-octyl, decyl, dodecyl, eicosyl, 2-ethylhexyl, cyclopentyl, cyclohexyl, cycloheptyl, 2,6-dimethylcyclohexyl, 4-t-butylcyclohexyl, cyclopentyl, 1-adamantyl, 2-adamantyl, bicyclo[2.2.2]octan-3-yl and the like; examples of the alkenyl group include vinyl, allyl, prenyl, geranyl, oleyl, 2-cyclopenten-1-yl, 2-cyclohexen-1-yl and the like; and examples of the alkynyl group include ethynyl, propargyl and the like. $V^{31}$ to $V^{43}$ may be further substituted, and examples of the substituent include those exemplified above as the groups which may be substituted on $R^{11}$ to R13.

$L^{31}$ to $L^{80}$ each independently represent a saturated divalent linking group having 0 to 40 atoms, with 0 to 20 carbon atoms. Herein, the description "$L^{31}$ to $L^{80}$ having 0 atom" implies that the groups present at both ends of the linking group are directly forming a single bond. Preferred examples of $L^{31}$ to $L^{80}$ include an alkylene group (for example, methylene, ethylene, propylene, trimethylene, tetramethylene, pentamethylene, hexamethylene, methylethylene, ethylethylene, etc.), a cyclic divalent group (for example, cis-1,4-cyclohexylene, trans-1,4-cyclohexylene, 1,3-cyclopentylidene, etc.), ether, thioether, ester, amide, sulfone, sulfoxide, sulfide, sulfonamide, ureylene, thioureylene and the like. These divalent groups may be combined to form a divalent composite group, and examples of the composite substituent include —(CH2)2O(CH2)2-, —(CH2)2O(CH2)2O(CH2)-, —(CH2)2S(CH2)2-, —(CH2)2O2C(CH2)2-, and the like. $L^{31}$ to $L^{80}$ may be further substituted, and examples of the substituent include those exemplified above as the groups which may be substituted on $R^{11}$ to R13.

In Formulas (2-4) to (2-12), preferred examples of the compound formed by combinations of $Y^{31}$ to $Y^{70}$, $V^{31}$ to $V^{43}$ and $L^{31}$ to $L^{80}$ include citric acid esters (for example, triethyl O-acetylcitrate, tributyl O-acetylcitrate, acetyltriethyl citrate, acetyltributyl citrate, tri(ethyloxycarbonyl methylene) O-acetylcitrate ester, etc.), oleic acid esters (for example, ethyl oleate, butyl oleate, 2-ethylhexyl oleate, phenyl oleate, cyclohexyl oleate, octyl oleate, etc.), ricinoleic acid esters (for example, methyl acetyl ricinoleate, etc.), sebacic acid esters (for example, dibutyl sebacate, etc.), carboxylic acid esters of glycerin (for example, triacetin, tributyrin, etc.), glycolic acid esters (for example, butyl phthalyl butyl glycolate, ethyl phthalyl ethyl glycolate, methyl phthalyl ethyl glycolate, butyl phthalyl butyl glycolate, methyl phthalyl methyl glycolate, propyl phthalyl propyl glycolate, butyl phthalyl butyl glycolate, octyl phthalyl octyl glycolate, etc.), carboxylic acid esters of pentaerythritol (for example, pentaerythritol tetraacetate, pentaerythritol tetrabutyrate, etc.), carboxylic acid esters of dipentaerythritol (for example, dipentaerythritol hexaacetate, dipentaerythritol hexabutyrate, dipentaerythritol tetraacetate, etc.), carboxylic acid esters of trimethylolpropane (trimethylolpropane triacetate, trimethylolpropane diacetate, trimethylolpropane monopropionate, trimethylolpropane tripropionate, trimethylolpropane tributyrate, trimethylolpropane tripivaloate, trimethylolpropane tri(t-butylacetate), trimethylolpropane di-2-ethylhexanate, trimethylolpropane tetra-2-ethylhexanate, trimethylolpropane diacetate monooctanate, trimethylolpropane trioctanate, trimethylolpropane tri(cyclohexanecarboxylate), etc.), glycerol esters described in JP-A No. 11-246704, diglycerol esters described in JP-A. No. 2000-63560, citric acid esters described in JP-A. No. 11-92574, pyrrolidone carboxylic acid esters (methyl 2-pyrrolidone-5-carboxylate, ethyl 2-pyrrolidone-5-carboxylate, butyl 2-pyrrolidone-5-carboxylate, 2-ethylhexyl 2-pyrrolidone-5-carboxylate), cyclohexanedicarboxylic acid esters (dibutyl cis-1,2-cyclohexanedicarboxylate, dibutyl trans-1,2-cyclohexanedicarboxylate, dibutyl cis-1,4-cyclohexanedicarboxylate, dibutyl trans-1,4-cyclohexanedicarboxylate, etc.), xylitol carboxylic esters (xylitol pentaacetate, xylitol tetraacetate, xylitol pentapropionate, etc.), and the like.

Examples (C-401 to C-448) of the compounds represented by the Formulas (2-4) to (2-12) will be described in the following, but the invention is not limited to these. In addition, the values of log P described in the brackets have been determined according to Crippen's fragmentation method (J. Chem. Inf. Comput. Sci., 27, 21 (1987)).

C-401

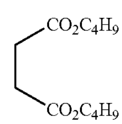

(2.37)

C-402

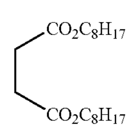

(5.71)

C-403

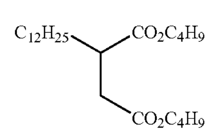

(7.53)

-continued
C-404
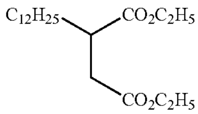
(5.72)
C-405
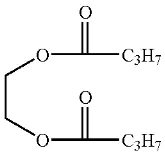
(1.81)
C-406
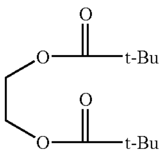
(3.52)
C-407
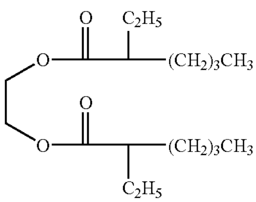
(5.45)
C-408
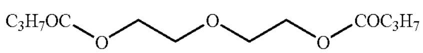
(1.66)
C-409
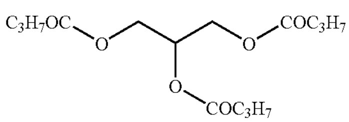
(2.58)
C-410
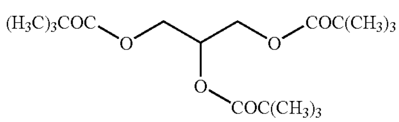
(5.14)
C-411
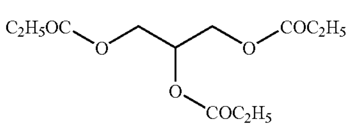
(1.32)
C-412
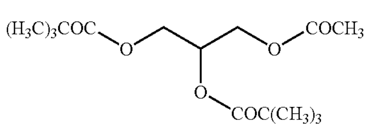
(3.22)
C-413
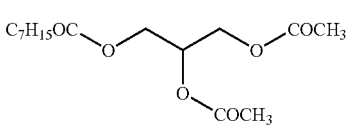
(2.10)
-continued
C-414
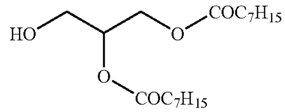
(4.61)
C-415
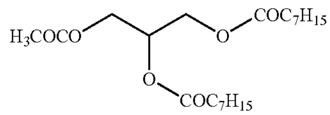
(4.84)
C-416
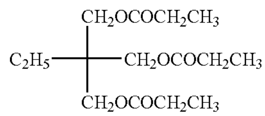
(2.43)
C-417
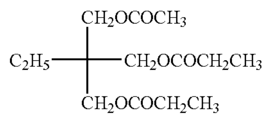
(1.78)
C-418
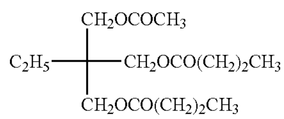
(2.61)
C-419
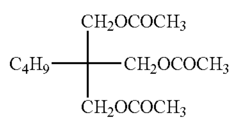
(1.31)
C-420
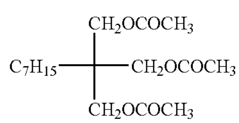
(2.56)
C-421
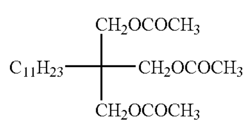
(4.23)
C-422
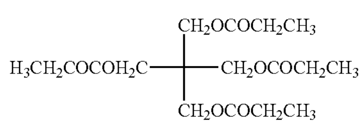
(1.84)
C-423
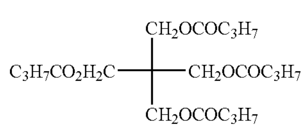
(3.51)

C-424
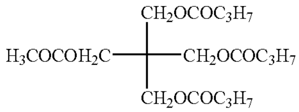
(2.44)
C-425
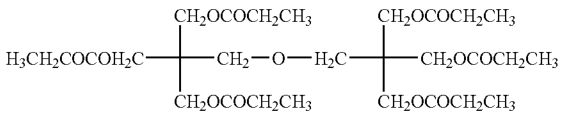
(2.54)
C-426
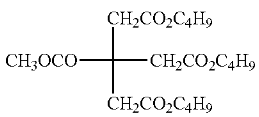
(3.01)
C-427
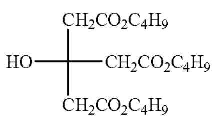
(2.78)
C-428
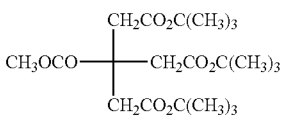
(1.91)
C-429
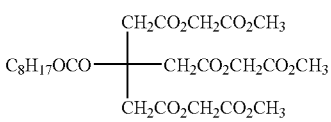
(1.03)
C-430
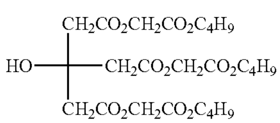
(1.36)
C-431
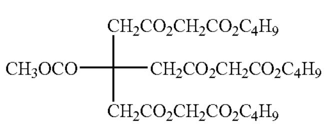
(1.59)
C-432
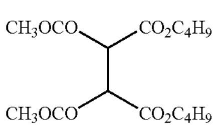
(1.52)
C-433
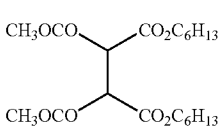
(3.19)
C-434
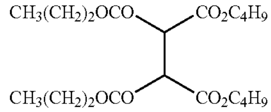
(3.66)
C-435
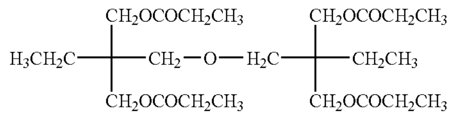
(3.73)
C-436
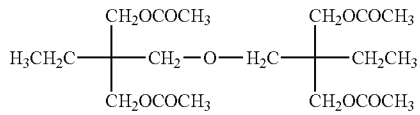
(1.12)
C-437
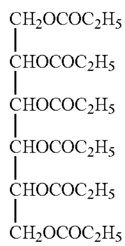
(2.36)
C-438
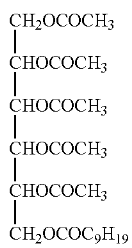
(2.02)
C-439
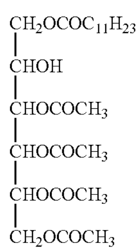
(2.62)
C-440
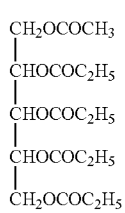
(1.36)

-continued

C-441

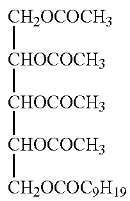

(2.32)

C-442

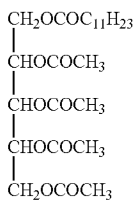

(3.16)

C-443

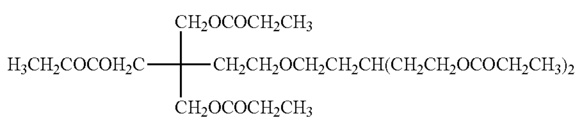

(3.37)

C-444

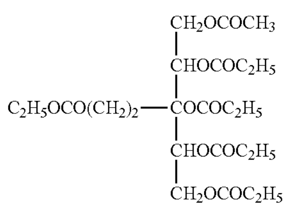

(1.63)

C-445

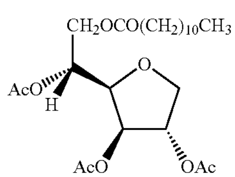

(3.03)

C-446

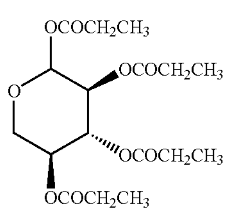

(1.69)

C-447

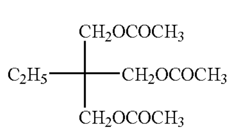

(0.47)

-continued

C-448

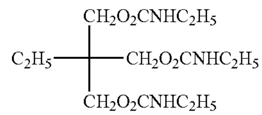

(3.60)

The compounds of the Formula (2-13) and (2-14) will be illustrated.

Formula (2-13)

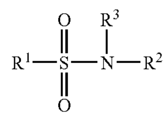

Formula (2-14)

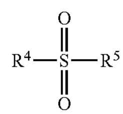

In the Formula (2-13), $R^1$ represents an alkyl group or an aryl group, and $R^2$ and $R^3$ each independently represent a hydrogen atom, an alkyl group or an aryl group. Further, the sum of the number of carbon atoms of $R^1$, $R^2$ and $R^3$ is 10 or more, and the alkyl group and the aryl group may respectively be substituted. In the Formula (2-14), $R^4$ and $R^5$ each independently represent an alkyl group or an aryl group. The sum of the number of carbon atoms of $R^4$ and $R^5$ is 10 or more, and the alkyl group and the aryl group may respectively be substituted.

For the substituent, a fluorine atom, an alkyl group, an aryl group, an alkoxy group, a sulfone group and a sulfonamide group are preferred, and an alkyl group, an aryl group, an alkoxy group, a sulfone group and a sulfonamide group are particularly preferred. The alkyl group may be straight-chained, branched or cyclic, and may be a group having preferably 1 to 25 carbon atoms, more preferably 6 to 25 carbon atoms, and particularly preferably 6 to 20 carbon atoms (for example, methyl, ethyl, propyl, isopropyl, butyl, isobutyl, t-butyl, amyl, isoamyl, t-amyl, hexyl, cyclohexyl, heptyl, octyl, bicyclooctyl, nonyl, adamantly, decyl, t-octyl, undecyl, dodecyl, tridecyl, tetradecyl, pentadecyl, hexadecyl, heptadecyl, octadecyl, nonadecyl, didecyl). The aryl group is preferably a group having 6 to 30 carbon atoms, and particularly preferably a group having 6 to 24 carbon atoms (for example, phenyl, biphenyl, terphenyl, naphthyl, binaphthyl, triphenylphenyl).

Preferred examples of the compound represented by Formula (2-13) or Formula (2-14) are shown in the following, but the invention is not limited to these specific examples.

A-1

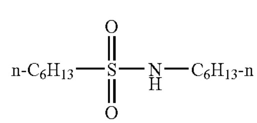

A-2

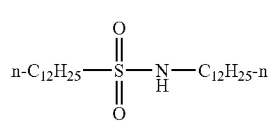

-continued
A-3
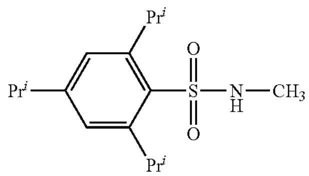
A-4
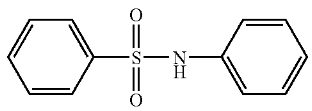
A-5
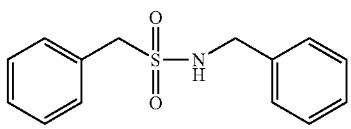
A-6
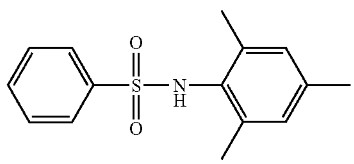
A-7
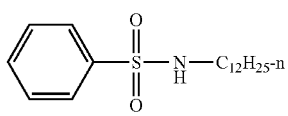
A-8
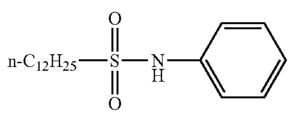
A-9
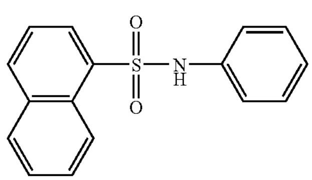
A-10
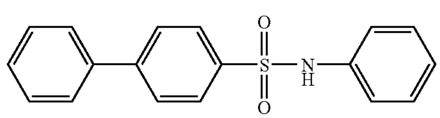
A-11
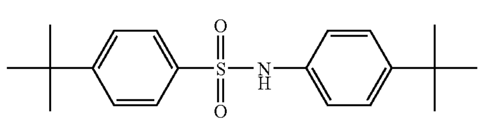
A-12
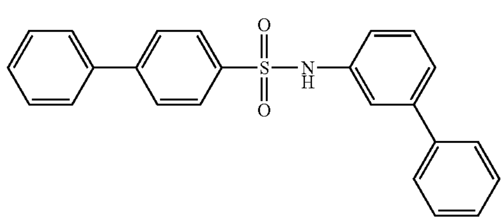
-continued
A-13
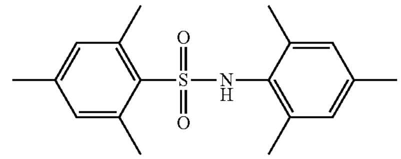
A-14
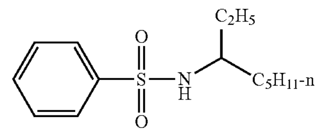
A-15
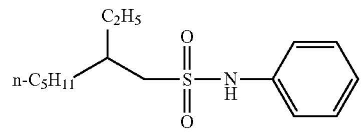
A-16
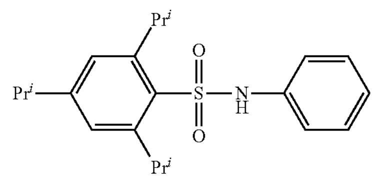
A-17
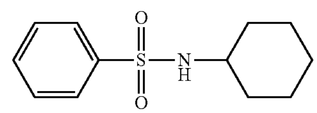
A-18
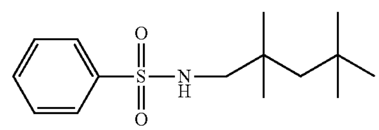
A-19
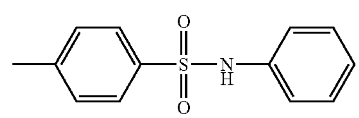
A-20
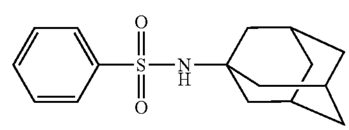
A-21
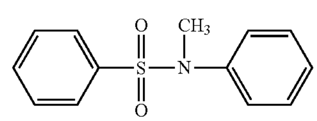
A-22
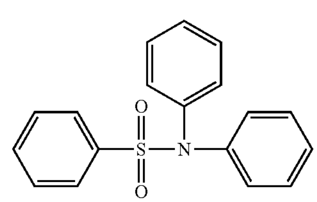
A-23
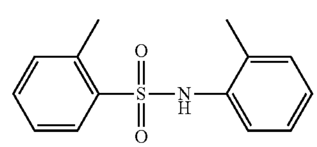

-continued
A-24
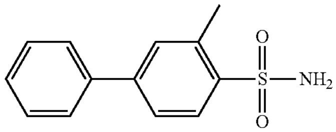
A-25
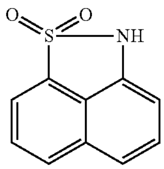
A-26
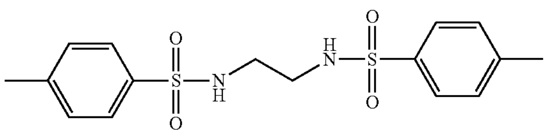
A-27
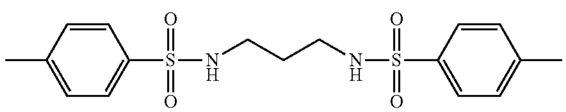
A-28
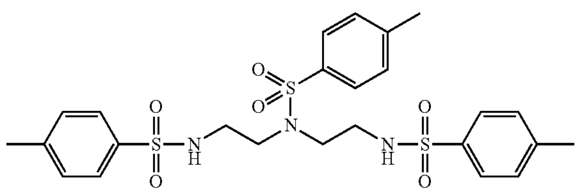
A-29
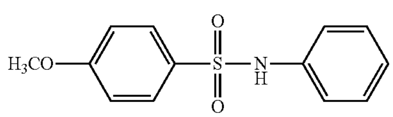
A-30
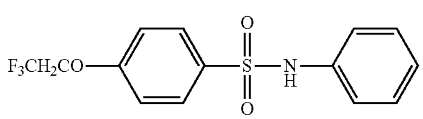
A-31
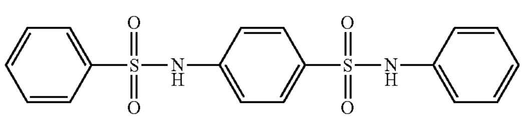
A-32
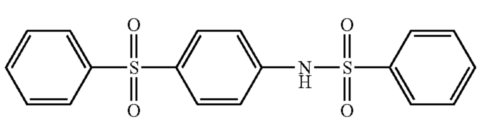
A-33
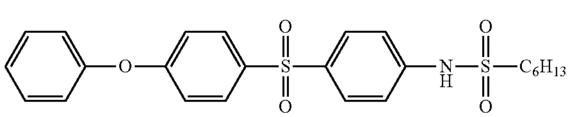
A-34
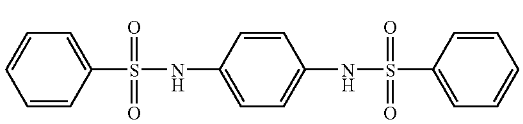
-continued
A-35
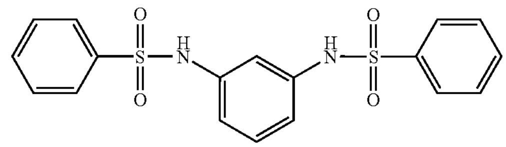
A-36
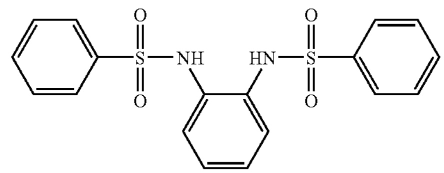
A-37
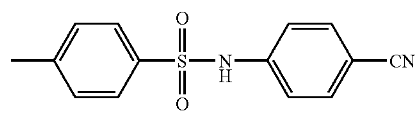
A-38
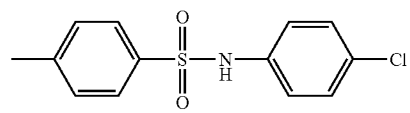
A-39
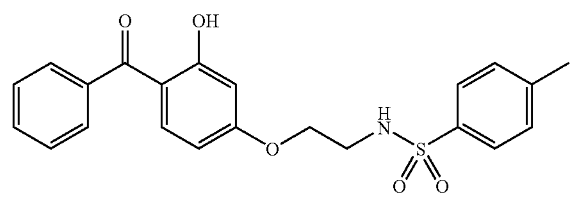
A-40
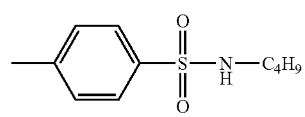
A-41
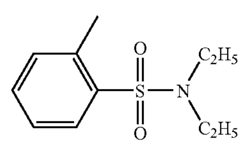
A-42
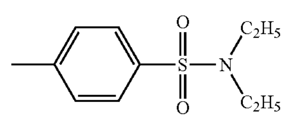
A-43
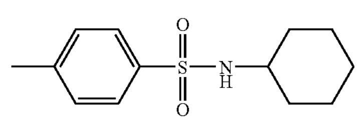
A-44
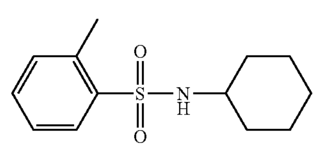
A-45
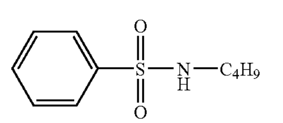

-continued
A-46
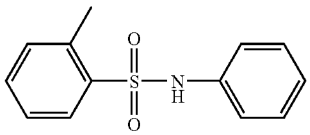
A-47
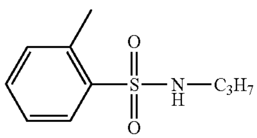
A-48
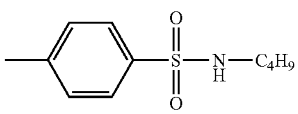
A-49
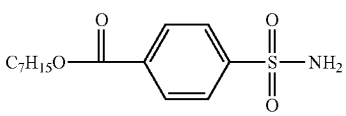
A-50
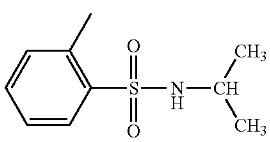
A-51
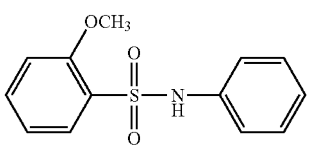
B-1
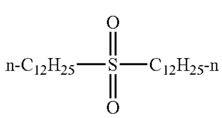
B-2
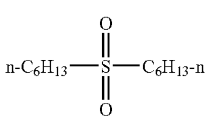
B-3
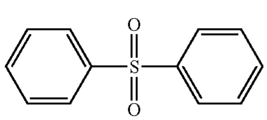
B-4
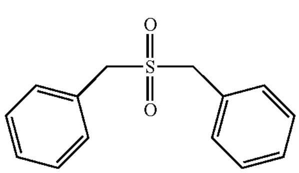
B-5
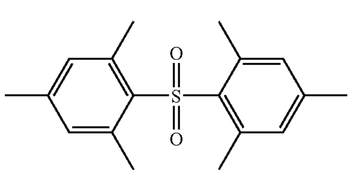
-continued
B-6
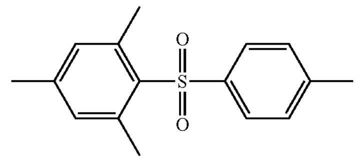
B-7
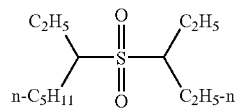
B-8
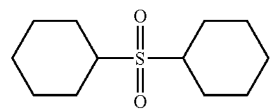
B-9
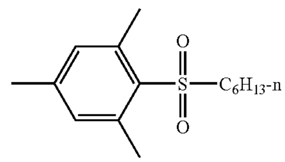
B-10
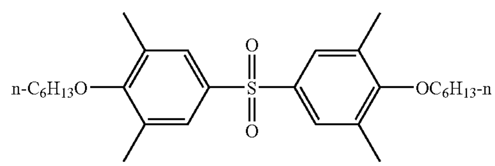
B-11
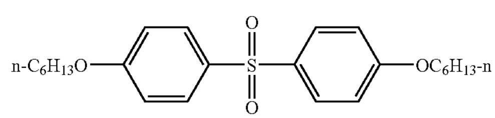
B-12
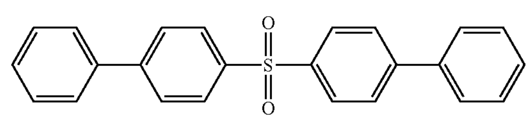
B-13
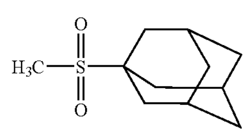
B-14
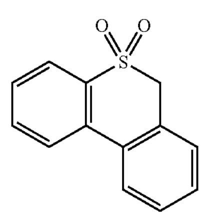
B-15
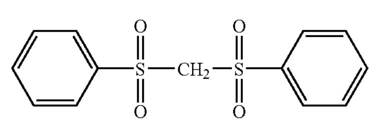

-continued
B-16
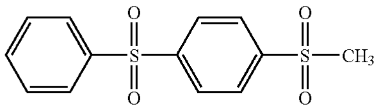
B-17
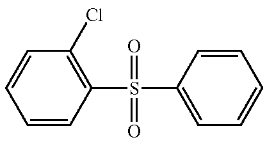
B-18
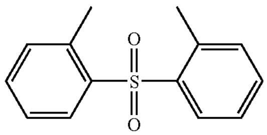
B-19
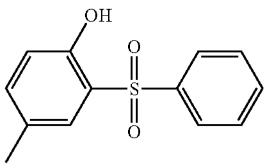
B-20
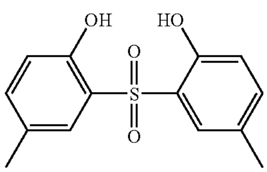
B-21
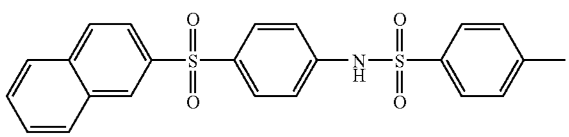
B-22
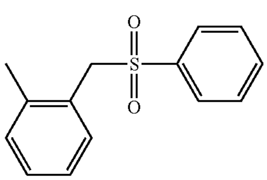
B-23
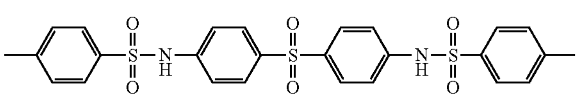
B-24
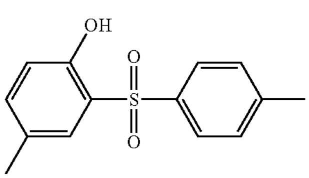
B-25
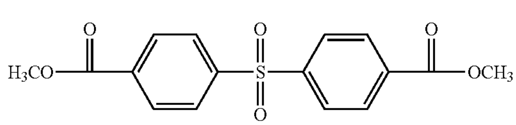
-continued
B-26
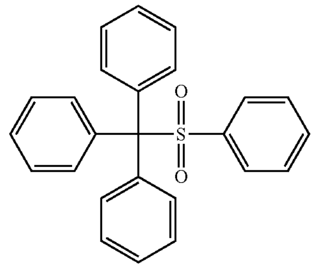
B-27
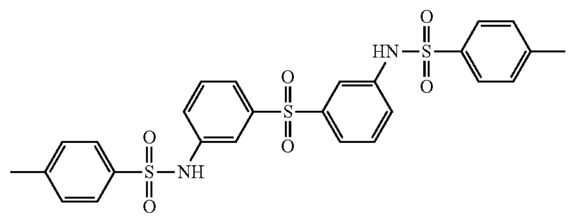
B-28
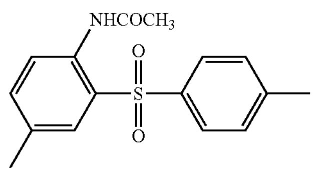
B-29
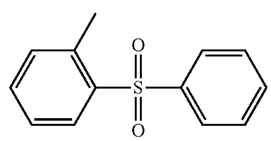
B-30
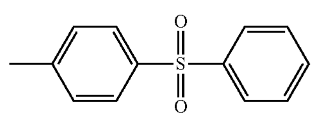
B-31
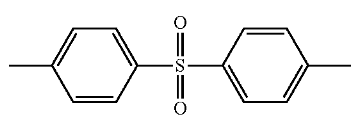
B-32
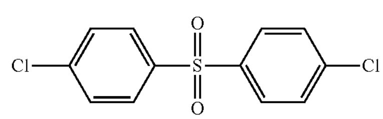
B-33
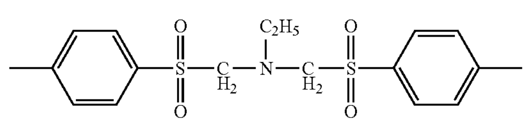
B-34
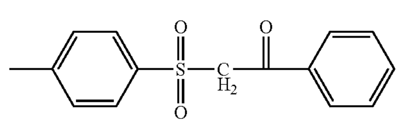
B-35
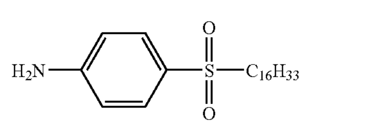

The compound represented by Formula (2-15) will be illustrated.

Formula (2-15)

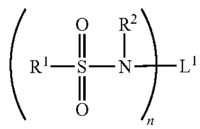

In the Formula (2-15), $R^1$ represents a substituted or unsubstituted aliphatic group, or a substituted or unsubstituted aromatic group, and $R^2$ represents a hydrogen atom, a substituted or unsubstituted aliphatic group, or a substituted or unsubstituted aromatic group. For the substituent, Substituent T to be described below may be mentioned (hereinafter, remains the same unless stated otherwise). $L^1$ represents a linking group having a valency of 2 to 6. The valency of $L^1$ is preferably 2 to 4, and more preferably 2 or 3. n represents an integer from 2 to 6 corresponding to the valency of $L^1$, representing more preferably 2 to 4, and particularly preferably 2 or 3.

Two or more of $R^1$ and $R^2$ contained in one compound may be respectively identical or different. Preferably, they are identical.

The compound of the Formula (2-15) is preferably a compound represented by the following Formula (2-15a).

Formula (2-15a)

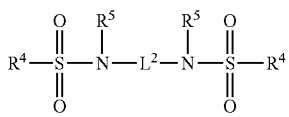

In the Formula (2-15a), $R^4$ is a substituted or unsubstituted aliphatic group, or a substituted or unsubstituted aromatic group. $R^4$ is preferably a substituted or unsubstituted aromatic group, and more preferably an unsubstituted aromatic group. $R^5$ is a hydrogen atom, a substituted or unsubstituted aliphatic group, or a substituted or unsubstituted aromatic group. $R^5$ is preferably a hydrogen atom, or a substituted or unsubstituted aliphatic group, and more preferably a hydrogen atom. $L^2$ is a divalent linking group formed from one or more groups selected from —O—, —S—, —CO—, —$NR^3$— (wherein $R^3$ is a hydrogen atom, a substituted or unsubstituted aliphatic group, or a substituted or unsubstituted aromatic group), an alkylene group and an arylene group. The combination of linking groups is not particularly limited, but it is preferable to select from —O—, —S—, —$NR^3$— and an alkylene group, and particularly preferable to select from —O—, —S— and an alkylene group. The linking group is preferably a linking group comprising two or more selected from —O—, —S— and an alkylene group.

The substituted or unsubstituted aliphatic group may be straight-chained, branched or cyclic, and is preferably a group having 1 to 25 carbon atoms, more preferably a group having 6 to 25 carbon atoms, and particularly preferably a group having 6 to 20 carbon atoms. Specific examples of the aliphatic group include a methyl group, an ethyl group, an n-propyl group, an isopropyl group, a cyclopropyl group, an n-butyl group, an isobutyl group, a tert-butyl group, an amyl group, an isoamyl group, a tert-amyl group, an n-hexyl group, a cyclohexyl group, an n-heptyl group, an n-octyl group, a bicyclooctyl group, an adamantyl group, an n-decyl group, a tert-octyl group, a dodecyl group, a hexadecyl group, an octadecyl group, a didecyl group, and the like.

The aromatic group may be an aromatic hydrocarbon group or an aromatic heterocyclic group, and more preferably, it is an aromatic hydrocarbon group. The aromatic hydrocarbon group is preferably a group having 6 to 24 carbon atoms, and more preferably a group having 6 to 12 carbon atoms. Examples of the rings, which are specific examples of the aromatic hydrocarbon group, include benzene, naphthalene, anthracene, biphenyl, terphenyl and the like. The aromatic hydrocarbon group is particularly preferably benzene, naphthalene or biphenyl. The aromatic heterocyclic group is preferably a group containing at least one of an oxygen atom, a nitrogen atom or a sulfur atom. Specific examples of the heterocyclic ring include furan, pyrrole, thiophene, imidazole, pyrazole, pyridine, pyrazine, pyridazine, triazole, triazine, indole, indazole, purine, thiazoline, thiadiazole, oxazoline, oxazole, oxadiazole, quinoline, isoquinoline, phthalazine, naphthyridine, quinoxaline, quinazoline, cinnoline, pteridine, acridine, phenanthroline, phenazine, tetrazole, benzimidazole, benzoxazole, benzothiazole, benzotriazole, tetrazaindene, and the like. The aromatic heterocyclic group is particularly preferably pyridine, triazine or quinoline.

Furthermore, the above-described Substituent T has the same meaning as discussed for the Formula (2-21) as follows.

For the compound represented by the Formula (2-15), a compound represented by the following Formula (2-15c) can be mentioned more favorably.

Formula (2-15c)

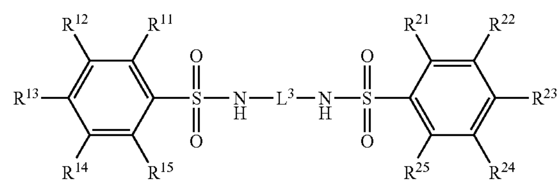

In the Formula (2-15c), $R^{11}$, $R^{12}$, $R^{13}$, $R^{14}$, $R^{15}$, $R^{21}$, $R^{22}$, $R^{23}$, $R^{24}$ and $R^{25}$ each independently represent a hydrogen atom or a substituent, and for the substituents, the Substituent T to be described later can be used. $R^{11}$, $R^{12}$, $R^{13}$, $R^{14}$, $R^{15}$, $R^{21}$, $R^{22}$, $R^{23}$, $R^{24}$ and $R^{25}$ are each preferably an alkyl group, an alkenyl group, an alkynyl group, an aryl group, an amino group, an alkoxy group, an aryloxy group, an acyl group, an alkoxycarbonyl group, an aryloxycarbonyl group, an acyloxy group, an acylamino group, an alkoxycarbonylamino group, an aryloxycarbonylamino group, a sulfonylamino group, a sulfamoyl group, a carbamoyl group, an alkylthio group, an arylthio group, a sulfonyl group, a sulfinyl group, an ureido group, a phosphoric acid amide group, a hydroxyl group, a mercapto group, a halogen atom (for example, a fluorine atom, a chlorine atom, a bromine atom, an iodine atom), a cyano group, a sulfo group, a carboxyl group, a nitro group, a hydroxamic acid group, a sulfino group, a hydrazino group, an imino group, a heterocyclic group (preferably having 1 to 30 carbon atoms, and more preferably 1 to 12 carbon atoms, and having a heteroatom such as a nitrogen atom, an oxygen atom, or a sulfur atom; specific examples thereof include an imidazolyl group, a pyridyl group, a quinolyl group, a furyl group, a piperidyl group, a morpholino group, a benzoxazolyl group, a benzimidazolyl group, a benzothiazolyl group and the like), and a silyl group; more preferably an alkyl group, an aryl group, an aryloxycarbonylamino group, an alkoxy group and an aryloxy group; and still more preferably an alkyl group, an aryl group and an aryloxycarbonylamino group. These substituents may be further substituted, and when there are two or more substituents, they may be identical or different. If possible, they may be joined to each other to form a ring. It is preferable that $R^{11}$ and $R^{21}$, $R^{12}$ and R22, $R^{13}$ and $R^{23}$, $R^{14}$ and $R^{24}$, $R^{15}$ and R25 are respectively identical. Moreover, it is preferable that $R^{11}$ to R25 are all hydrogen atoms.

$L^3$ represents a divalent linking group formed from at least one group selected from —O—, —S—, —CO—, —$NR^3$— (wherein $R^3$ represents a hydrogen atom, an aliphatic group or an aromatic group), an alkylene group and an arylene group. The combination of linking groups is not particularly limited, but it is preferable to select from —O—, —S—, —$NR^3$— and an alkylene group, and particularly preferable to select from —O—, —S— and an alkylene group.

Furthermore, the linking group is more preferably a linking group comprising two or more selected from —O—, —S— and an alkylene group.

Preferred examples of the compound represented by Formula (2-15), particularly by Formula (2-15a) or Formula (2-15c), are shown in the following, but the invention is not limited to these specific examples.

(SC-1)

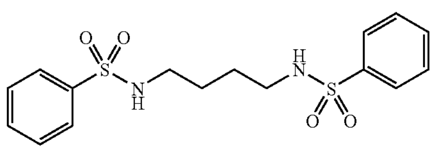

(SC-2)

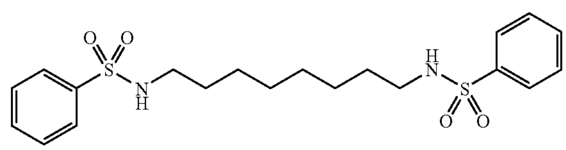

(SC-3)

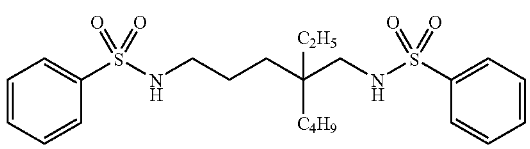

(SC-4)

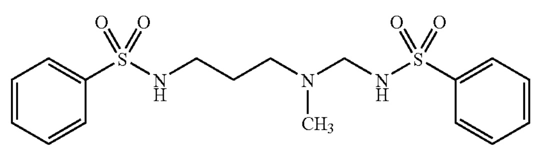

(SC-5)

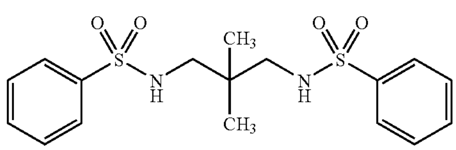

(SC-6)

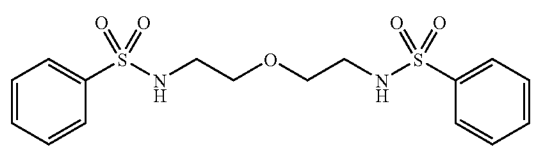

(SC-7)

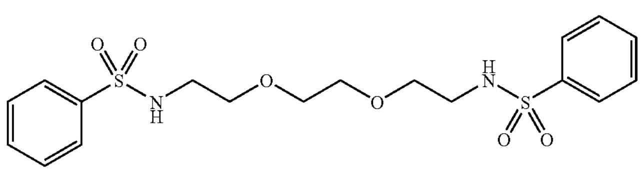

(SC-8)

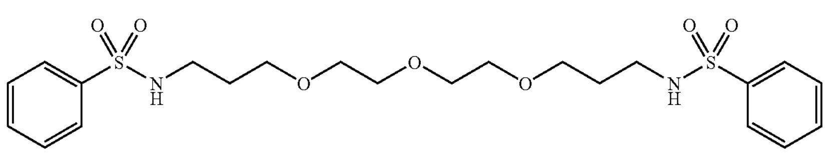

(SC-9)

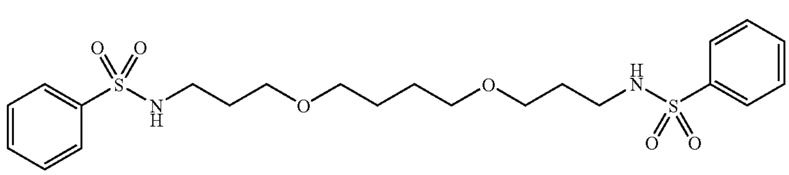

(SC-10)

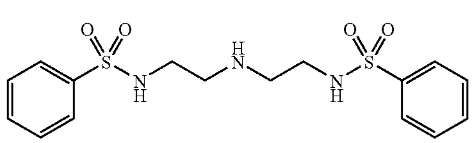

(SC-11)

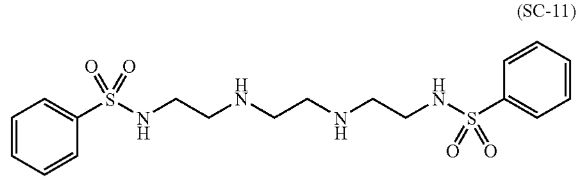

-continued (SC-12)

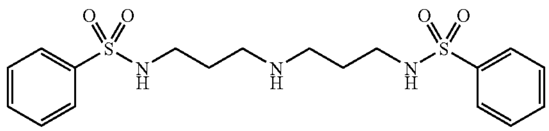

(SC-13)

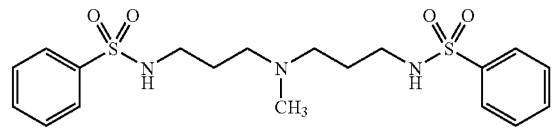

(SC-14)

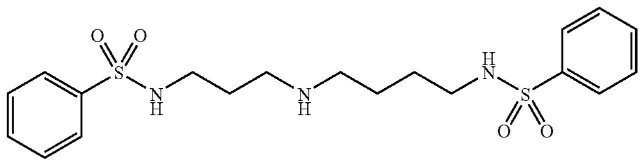

(SC-15)

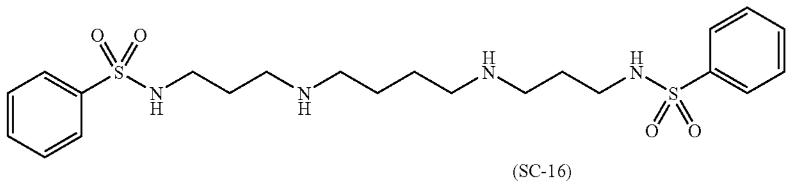

(SC-16)

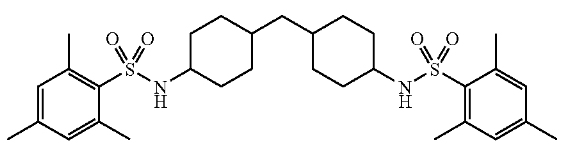

(SC-17)

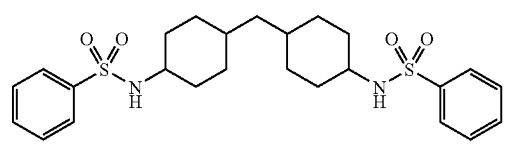

(SC-18)

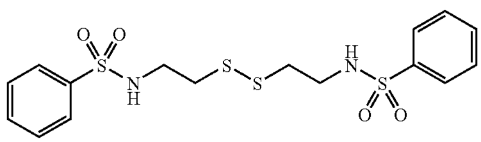

(SC-19)

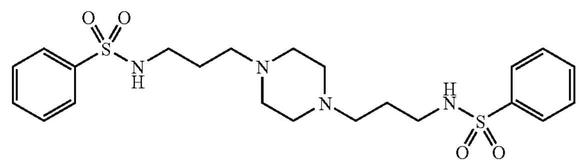

The compounds used in the invention can be all prepared from existing compounds. The compound represented by Formula (2-15), particularly Formula (2-15a) or (2-15c), is in general obtained by a condensation reaction between a sulfonyl chloride and a polyfunctional amine.

The compound of Formula (2-16) will be illustrated.

Formula (2-16)

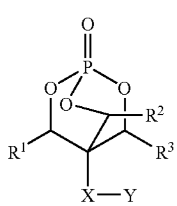

In the Formula (2-16), it is preferable that $R^1$, $R^2$ and $R^3$ each independently represent a hydrogen atom or an alkyl group having 1 to 5 carbon atoms (for example, methyl, ethyl, propyl, isopropyl, butyl, amyl, isoamyl), and it is particularly preferable that at least one of $R^1$, $R^2$ and $R^3$ is an alkyl group having 1 to 3 carbon atoms (for example, methyl, ethyl, propyl, isopropyl). X is preferably a divalent linking group formed from one or more groups selected from a single bond, —O—, —CO—, an alkylene group (preferably having 1 to 6 carbon atoms, and more preferably having 1 to 3 carbon atoms; for example, methylene, ethylene, propylene) and an arylene group (preferably having 6 to 24 carbon atoms, and more preferably having 6 to 12 carbon atoms; for example, phenylene, biphenylene, naphthalene), and particularly preferably a divalent linking group formed from one or more groups selected from —O—, an alkylene group and an arylene group. Y is preferably a hydrogen atom, an alkyl group (preferably having 2 to 25 carbon atoms, and more preferably having 2 to 20 carbon atoms; for example, ethyl, isopropyl, 1-butyl, hexyl, 2-ethylhexyl, t-octyl, dodecyl, cyclohexyl, dicyclohexyl, adamantyl), an aryl group (preferably having 6 to 24 carbon atoms, and more preferably having 6 to 18 carbon atoms; for example, phenyl, biphenyl, terphenyl, naphthyl), or an aralkyl group (preferably having 7 to 30 carbon atoms, and more preferably 7 to 20 carbon atoms; for example, benzyl, cresyl, t-butylphenyl, diphenylmethyl, triphenylmethyl), and particularly preferably an alkyl group, an aryl group or an aralkyl group. For the combination of —X—Y, the total number of carbon atoms of —X—Y is preferably 0 to 40, more preferably 1 to 30, and most preferably 1 to 25.

Preferred examples of the compound represented by the Formula (2-16) are shown in the following, but the invention is not limited to these specific examples.

PL-1

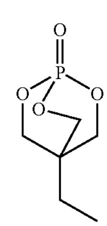

-continued
PL-2
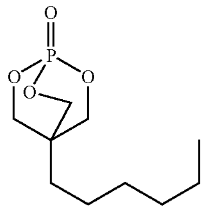
PL-3
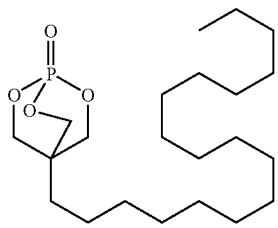
PL-4
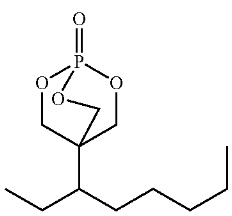
PL-5
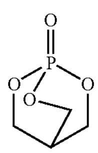
PL-6
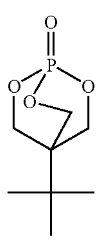
PL-7
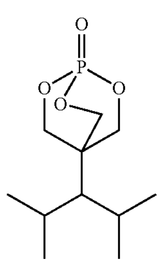
-continued
PL-8
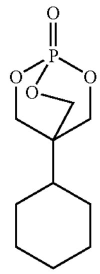
PL-9
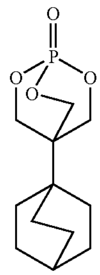
PL-10
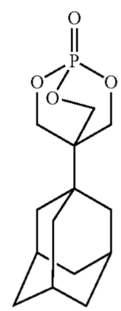
PL-11
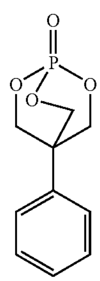
PL-12
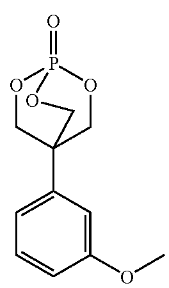
PL-13
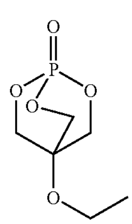

-continued
Pl-14
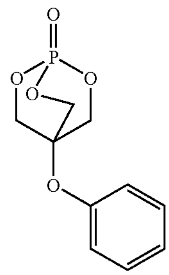
PL-15
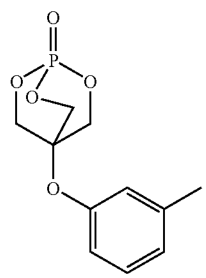
PL-16
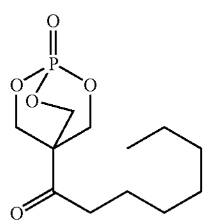
PL-17
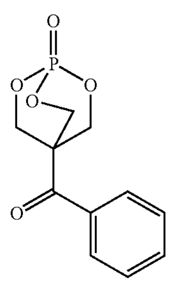
PL-18
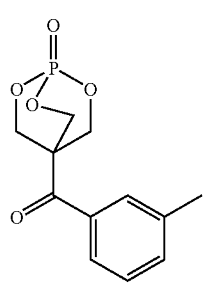
-continued
PL-19
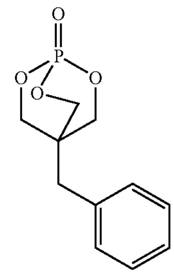
PL-20
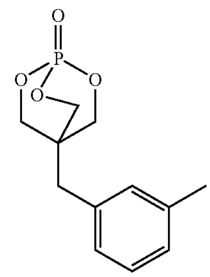
PL-21
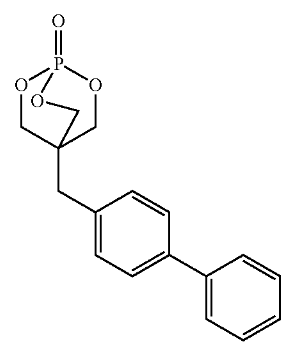
PL-22
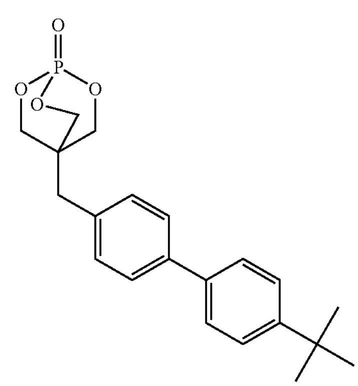

-continued
PL-23
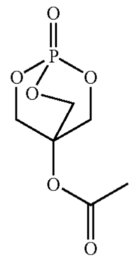
PL-24
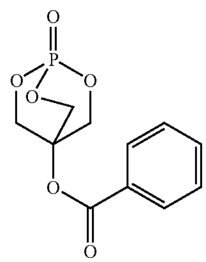
PL-25
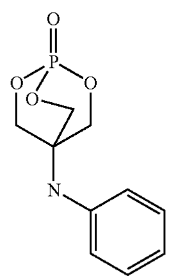
PL-26
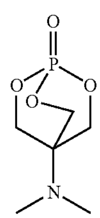
PL-27
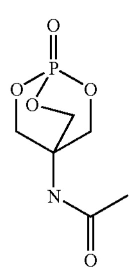
-continued
PL-28
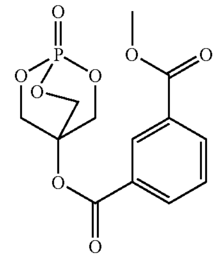
PL-29
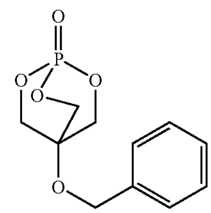
PL-30
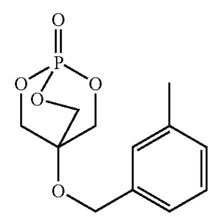
PL-31
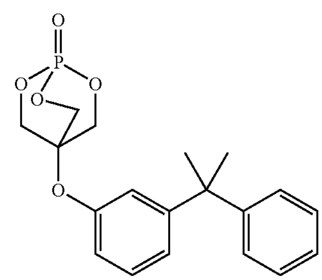
PL-32
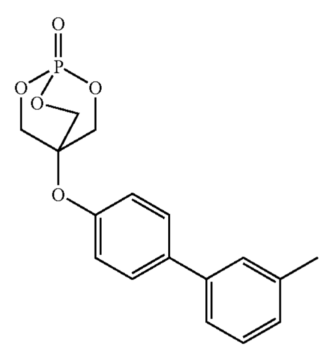

-continued
PL-33
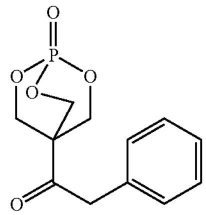
PL-34
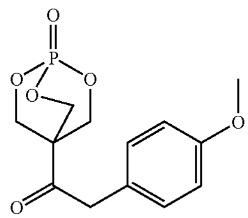
PL-35
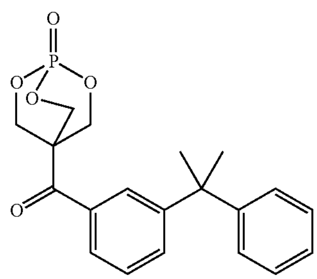
PL-36
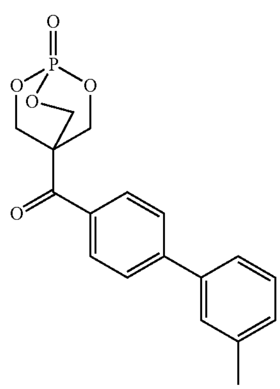
PL-37
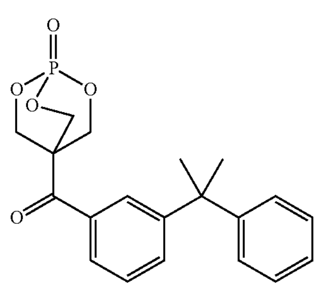
-continued
PL-38
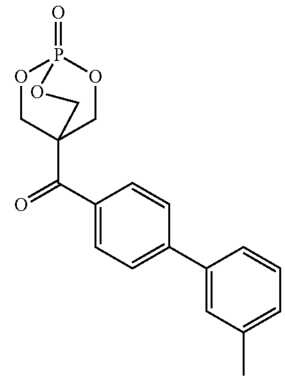
PL-39
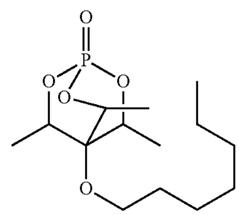
PL-40
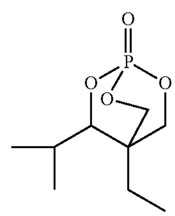
PL-41
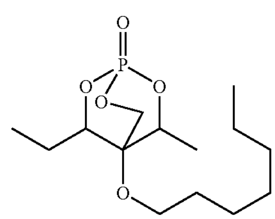
PL-42
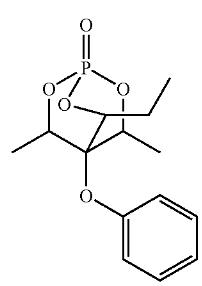

-continued

PL-43

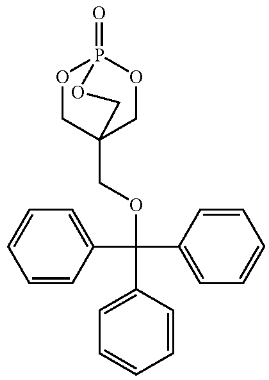

The compound of Formula (2-17) will be illustrated.

Formula (2-17)

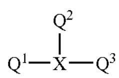

In the Formula (2-17), Q1, Q2 and Q3 each independently represent a 5- or 6-membered ring, and each may be a hydrocarbon ring or a heterocyclic ring. Further, the ring may be a single ring, or may form a fused ring with other rings. The hydrocarbon ring is preferably a substituted or unsubstituted cyclohexane ring, a substituted or unsubstituted cyclopentane ring, or an aromatic hydrocarbon ring, and more preferably an aromatic hydrocarbon ring. The heterocyclic ring is preferably a 5- or 6-membered ring containing at least one of an oxygen atom, a nitrogen atom or a sulfur atom. The heterocyclic ring is more preferably an aromatic heterocyclic ring containing at least one of an oxygen atom, a nitrogen atom or a sulfur atom.

Q1, Q2 and Q3 are each preferably an aromatic hydrocarbon ring or an aromatic heterocyclic ring. The aromatic hydrocarbon ring is preferably (preferably a monocyclic or bicyclic aromatic hydrocarbon ring having 6 to 30 carbon atoms (for example, a benzene ring, a naphthalene ring may be mentioned), more preferably an aromatic hydrocarbon ring having 6 to 20 carbon atoms, and still more preferably an aromatic hydrocarbon ring having 6 to 12 carbon atoms), and more preferably a benzene ring.

The aromatic heterocyclic ring is preferably an aromatic heterocyclic ring containing an oxygen atom, a nitrogen atom or a sulfur atom. Specific examples of the heterocyclic ring include furan, pyrrole, thiophene, imidazole, pyrazole, pyridine, pyrazine, pyridazine, triazole, triazine, indole, indazole, purine, thiazoline, thiazole, thiadiazole, oxazoline, oxazole, oxadiazole, quinoline, isoquinoline, phthalazine, naphthyridine, quinoxaline, quinazoline, cinnoline, pteridine, acridine, phenanthroline, phenazine, tetrazole, benzimidazole, benzoxazole, benzothiazole, benzotriazole, tetrazaindene and the like. Preferred examples of the aromatic heterocyclic ring are pyridine, triazine and quinoline. More preferably, Q1, Q2 and Q3 are each preferably an aromatic hydrocarbon ring, and more preferably a benzene ring. Q1, Q2 and Q3 may be substituted, and the substituent may be exemplified by the Substituent T to be described later.

X represents B, C—R (wherein R represents a hydrogen atom or a substituent), N, P, or P═O. X is preferably B, C—R (wherein R is preferably an aryl group, a substituted or unsubstituted amino group, an alkoxy group, an aryloxy group, an acyl group, an alkoxycarbonyl group, an aryloxycarbonyl group, an acyloxy group, an acylamino group, an alkoxycarbonylamino group, an aryloxycarbonylamino group, a sulfonylamino group, a hydroxyl group, a mercapto group, a halogen atom (for example, a fluorine atom, a chlorine atom, a bromine atom, an iodine atom), or a carboxyl group; more preferably an aryl group, an alkoxy group, an aryloxy group, a hydroxyl group, or a halogen atom; still more preferably an alkoxy group or a hydroxyl group; and particularly preferably a hydroxyl group), or N. X is more preferably C—R or N, and particularly preferably C—R.

The compound represented by Formula (2-17) may be preferably exemplified by the compound represented by the following Formula (2-18).

Formula (2-18)

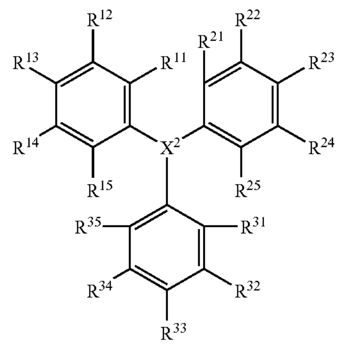

In Formula (2-18), $X^2$ represents B, C—R (wherein R represents a hydrogen atom or a substituent), N, P, or P═O; $R^{11}$, $R^{12}$, $R^{13}$, $R^{14}$, $R^{15}$, $R^{21}$, $R^{22}$, $R^{23}$, $R^{24}$, $R^{25}$, $R^{31}$, $R^{32}$, $R^{33}$, R $R^{34}$ and $R^{35}$ each independently represent a hydrogen atom or a substituent.

$X^2$ represents B, C—R (wherein R represents a hydrogen atom or a substituent), N, P, or P═O. $X^2$ is preferably B, C—R (wherein R is preferably an aryl group, a substituted or unsubstituted amino group, an alkoxy group, an aryloxy group, an acyl group, an alkoxycarbonyl group, an aryloxycarbonyl group, an acyloxy group, an acylamino group, an alkoxycarbonylamino group, an aryloxycarbonylamino group, a sulfonylamino group, a hydroxyl group, a mercapto group, a halogen atom (for example, a fluorine atom, a chlorine atom, a bromine atom, an iodine atom), or a carboxyl group; more preferably an aryl group, an alkoxy group, an aryloxy group, a hydroxyl group, or a halogen atom; still more preferably an alkoxy group or a hydroxyl group; and particularly preferably a hydroxyl group), N or P═O; more preferably C—R or N; and particularly preferably C—R.

$R^{11}$, $R^{12}$, $R^{13}$, $R^{14}$, $R^{15}$, $R^{21}$, $R^{22}$, $R^{23}$, $R^{24}$, R25, $R^{31}$, $R^{32}$, $R^{33}$, $R^{34}$ and $R^{35}$ each independently represent a hydrogen atom or a substituent, and for the substituent, the Substituent T to be described later can be used. $R^{11}R^{12}$, $R^{13}$, $R^{14}$, $R^{15}$, $R^{21}$, $R^{22}$, $R^{23}$, $R^{24}$, $R^{25}$, $R^{31}$, $R^{32}$, $R^{33}$, $R^{34}$ and $R^{35}$ are each preferably an alkyl group, an alkenyl group, an alkynyl group, an aryl group, a substituted or unsubstituted amino group, an alkoxy group, an aryloxy group, an acyl group, an alkoxycarbonyl group, an aryloxycarbonyl group, an acyloxy group, an acylamino group, an alkoxycarbonylamino group, an aryloxycarbonylamino group, a sulfonylamino group, a sulfamoyl group, a carbamoyl group, an alkylthio group, an arylthio group, a sulfonyl group, a sulfinyl group, an ureido group, a phosphoric acid amide group, a hydroxyl group, a mercapto group, a halogen atom (e.g., a fluorine atom, a chlorine atom, a bromine atom, an iodine atom), a cyano group, a sulfo group, a carboxyl group, a nitro group, a hydroxamic acid group, a sulfino group, a hydrazino group, an imino group, a heterocyclic group (preferably having 1 to 30 carbon atoms and more preferably 1 to 12 carbon atoms, and having a heteroatom such as a nitrogen atom, an oxygen atom or a sulfur atom; specifically examples thereof include imidazolyl, pyridyl, quinolyl, furyl, piperidyl, morpholino, benzoxazolyl, benzimidazolyl, benzothiazolyl, and the like), or a silyl group; more preferably an alkyl group, an aryl group, a substituted or unsubstituted amino group, an alkoxy group, or an aryloxy group; and even more preferably an alkyl group, an aryl group, or an alkoxy group.

These substituents may be further substituted. When there are two or more substituents, they may be identical or different. If possible, they may be joined to each other to form a ring.

The above-described Substituent T will be illustrated below. Examples of the Substituent T include an alkyl group (preferably having 1 to 20 carbon atoms, more preferably 1 to 12 carbon atoms, and particularly preferably 1 to 8 carbon atoms; examples thereof include methyl, ethyl, isopropyl, tert-butyl, n-octyl, n-decyl, n-hexadecyl, cyclopropyl, cyclopentyl, cyclohexyl, and the like), an alkenyl group (preferably having 2 to 20 carbon atoms, more preferably 2 to 12 carbon atoms, and particularly preferably 2 to 8 carbon atoms; examples thereof include vinyl, allyl, 2-butenyl, 3-pentenyl, and the like), an alkynyl group (preferably having 2 to 20 carbon atoms, more preferably 2 to 12 carbon atoms, and particularly preferably 2 to 8 carbon atoms; examples thereof include propargyl, 3-pentynyl, and the like), an aryl group (preferably having 6 to 30 carbon atoms, more preferably 6 to 20 carbon atoms, and particularly preferably 6 to 12 carbon atoms; examples thereof include phenyl, p-methylphenyl, naphthyl, and the like), a substituted or unsubstituted amino group (preferably having 0 to 20 carbon atoms, more preferably 0 to 10 carbon atoms, and particularly preferably 0 to 6 carbon atoms; examples thereof include amino, methylamino, dimethylamino, diethylamino, dibenzylamino, and the like), an alkoxy group (preferably having 1 to 20 carbon atoms, more preferably 1 to 12 carbon atoms, and particularly preferably 1 to 8 carbon atoms; examples thereof include methoxy, ethoxy, butoxy, and the like), an aryloxy group (preferably having 6 to 20 carbon atoms, more preferably 6 to 16 carbon atoms, and particularly preferably 6 to 12 carbon atoms; examples thereof include phenyloxy, 2-naphthyloxy, and the like), an acyl group (preferably having 1 to 20 carbon atoms, more preferably 1 to 16 carbon atoms, and particularly preferably 1 to 12 carbon atoms; examples thereof include acetyl, benzoyl, formyl, pivaloyl, and the like), an alkoxycarbonyl group (preferably having 2 to 20 carbon atoms, more preferably 2 to 16 carbon atoms, and particularly preferably 2 to 12 carbon atoms; examples thereof include methoxycarbonyl, ethoxycarbonyl, and the like), an aryloxycarbonyl group (preferably having 7 to 20 carbon atoms, more preferably 7 to 16 carbon atoms, and particularly preferably 7 to 10 carbon atoms; examples thereof include phenyloxycarbonyl and the like), an acyloxy group (preferably having 2 to 20 carbon atoms, more preferably 2 to 16 carbon atoms, and particularly preferably 2 to 10 carbon atoms; examples thereof include acetoxy, benzoyloxy, and the like), an acylamino group (preferably having 2 to 20 carbon atoms, more preferably 2 to 16 carbon atoms, and particularly preferably 2 to 10 carbon atoms; examples thereof include acetylamino, benzoylamino, and the like), an alkoxycarbonylamino group (preferably having 2 to 20 carbon atoms, more preferably 2 to 16 carbon atoms, and particularly preferably 2 to 12 carbon atoms; examples thereof include methoxycarbonylamino and the like), an aryloxycarbonylamino group (preferably having 7 to 20 carbon atoms, more preferably 7 to 16 carbon atoms, and particularly preferably 7 to 12 carbon atoms; examples thereof include phenyloxycarbonylamino and the like), a sulfonylamino group (preferably having 1 to 20 carbon atom, more preferably 1 to 16 carbon atoms, and particularly preferably 1 to 12 carbon atoms; e.g., methanesulfonylamino, benzenesulfonylamino, etc.), a sulfamoyl group (preferably having 0 to 20 carbon atoms, more preferably 0 to 16 carbon atoms, and particularly preferably having 0 to 12 carbon atoms; examples thereof include sulfamoyl, methylsulfamoyl, dimethylsulfamoyl, phenylsulfamoyl, and the like), a carbamoyl group (preferably having 1 to 20 carbon atoms, more preferably 1 to 16 carbon atoms, and particularly preferably 1 to 12 carbon atoms; examples thereof include carbamoyl, methylcarbamoyl, diethylcarbamoyl, phenylcarbamoyl, and the like), an alkylthio group (preferably having 1 to 20 carbon atoms, more preferably 1 to 16 carbon atoms, and particularly preferably 1 to 12 carbon atoms; examples thereof include methylthio, ethylthio, and the like), an arylthio group (preferably having 6 to 20 carbon atoms, more preferably 6 to 16 carbon atoms, and particularly preferably 6 to 12 carbon atoms; examples thereof include phenylthio and the like), a sulfonyl group (preferably having 1 to 20 carbon atoms, more preferably 1 to 16 carbon atoms, and particularly preferably 1 to 12 carbon atoms; examples thereof include mesyl, tosyl, and the like), a sulfinyl group (preferably having 1 to 20 carbon atoms, more preferably 1 to 16 carbon atoms, and particularly preferably 1 to 12 carbon atoms; examples thereof include methanesulfinyl, benzenesulfinyl, and the like), an ureido group (preferably having 1 to 20 carbon atoms, more preferably 1 to 16 carbon atoms, and particularly preferably 1 to 12 carbon atoms; examples thereof include ureido, methylureido, phenylureido, and the like), a phosphoric acid amide group (preferably having 1 to 20 carbon atoms, more preferably 1 to 16 carbon atoms, and particularly preferably 1 to 12 carbon atoms; examples thereof include diethylphosphoric acid amide, phenylphosphoric acid amide, and the like), a hydroxyl group, a mercapto group, a halogen atom (for example, a fluorine atom, a chloride atom, a bromine atom, an iodine atom), a cyano group, a sulfo group, a carboxyl group, a nitro group, a hydroxamic acid group, a sulfino group, a hydrazino group, an imino group, a heterocyclic group (preferably having 1 to 30 carbon atoms, and more preferably 1 to 12 carbon atoms, and having a heteroatom such as a nitrogen atom, an oxygen atom, or a sulfur atom; specific examples include imidazolyl, pyridyl, quinolyl, furyl, piperidyl, morpholino, benzoxazolyl, benzimidazolyl, benzothiazolyl, and the like), a silyl group (preferably having 3 to 40 carbon atoms, more preferably 3 to 30 carbon atoms, and particularly preferably 3 to 24 carbon atoms; examples thereof include trimethylsilyl, triphenylsilyl, and the like), and the like. These substituents may be further substituted. When there are two or more substituents, they may be identical or different. If possible, they may be joined to each other to form a ring.

Specific examples of the compound represented by Formula (2-17) or (2-18) will be shown in the following, but the invention is not limited by any means to the following specific examples.

-continued
D-1
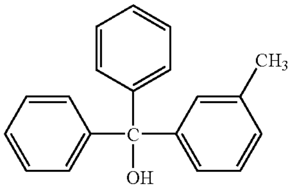
D-2
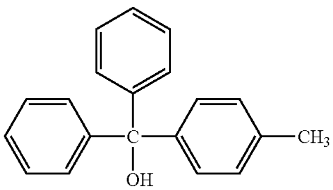
D-3
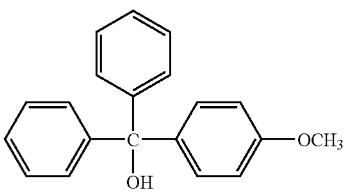
D-4
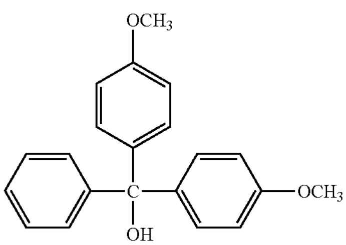
D-5
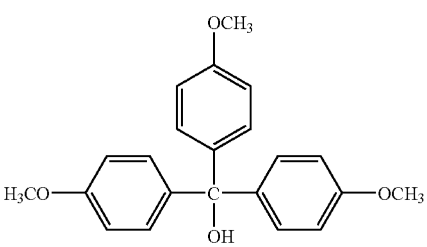
D-6
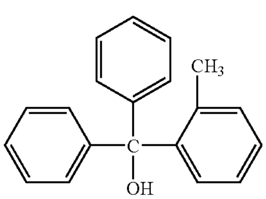
D-7
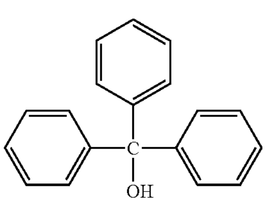
D-8
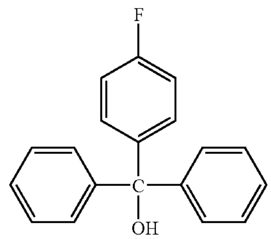
D-9
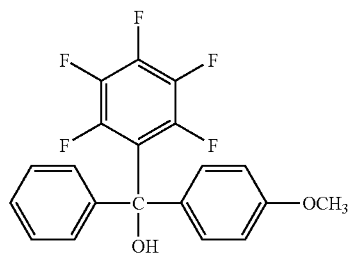
D-10
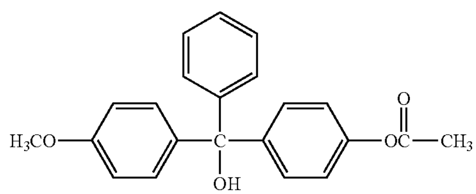
D-11
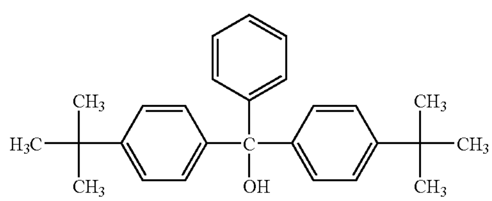
D-12
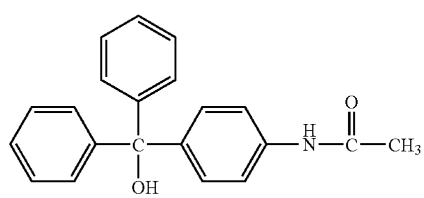
D-13
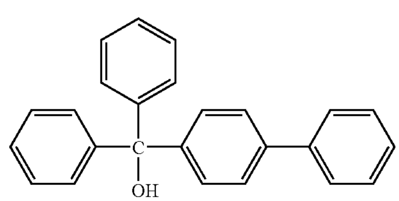
D-14
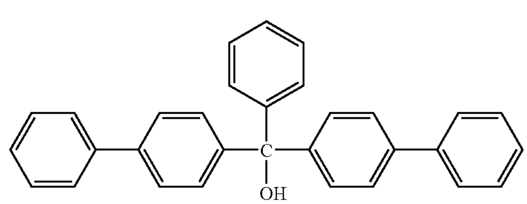

-continued
D-15
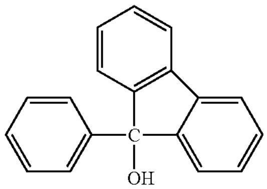
D-16
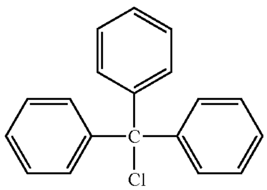
D-17
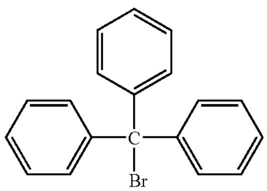
D-18
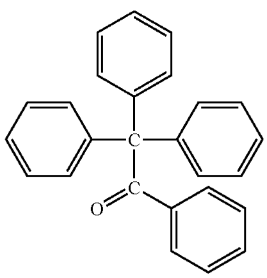
D-19
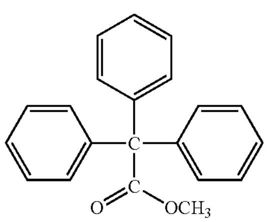
D-20
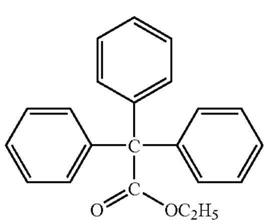
D-21
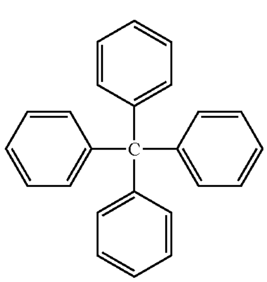
-continued
D-22
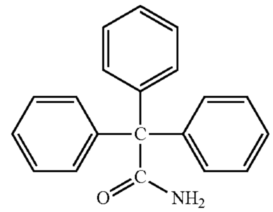
D-23
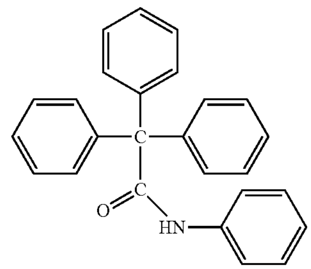
D-24
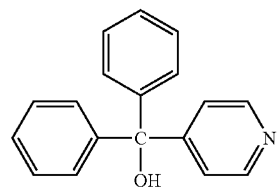
E-1
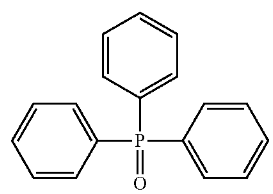
E-2
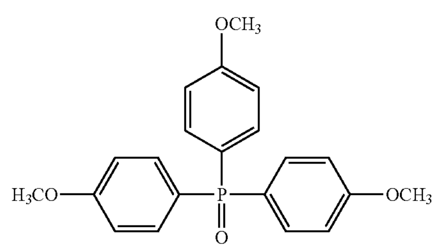
E-3
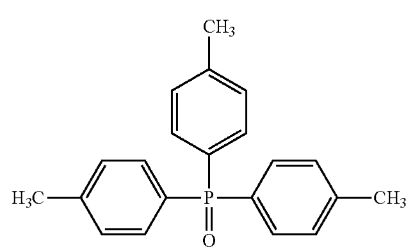
E-4
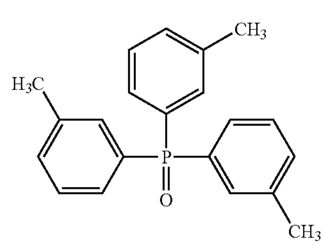

E-5
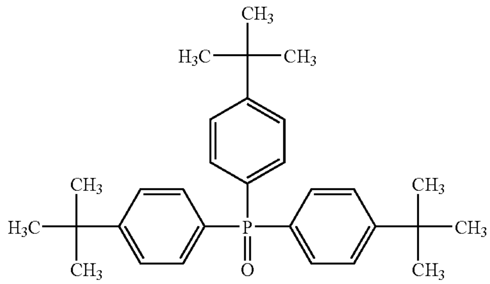
E-6
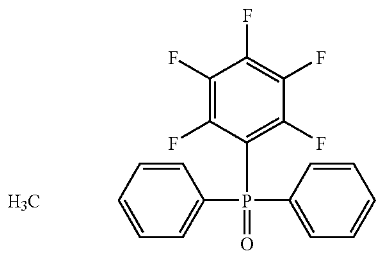
E-7
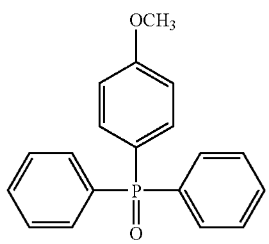
E-8
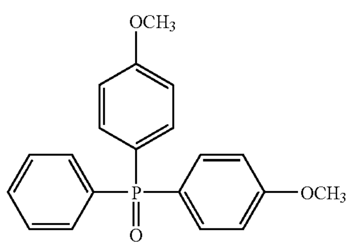
E-9
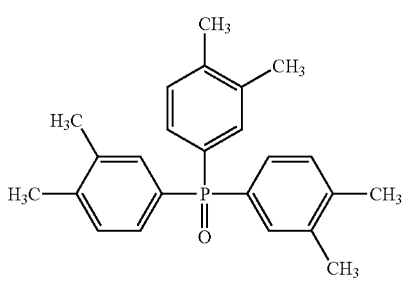
E-10
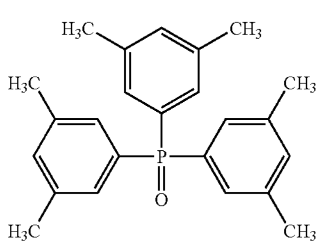
E-11
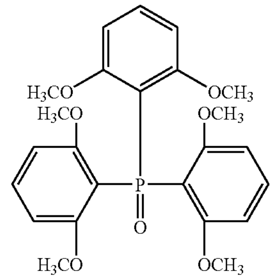
E-12
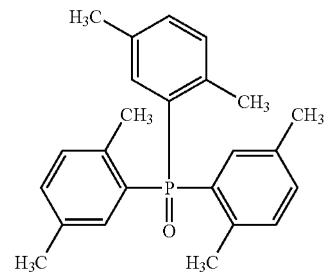
E-13
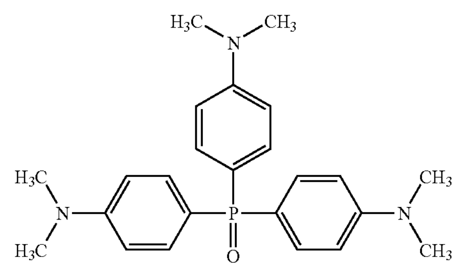
E-14
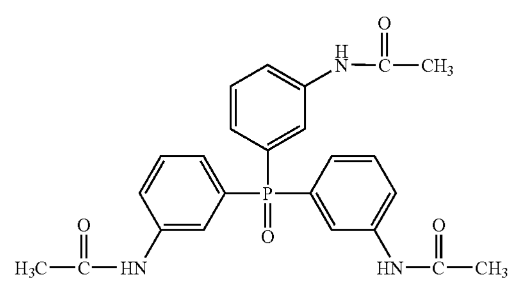
E-15
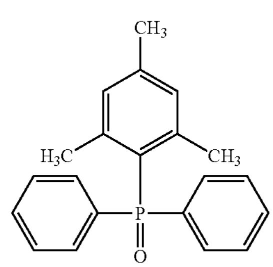

-continued
E-16
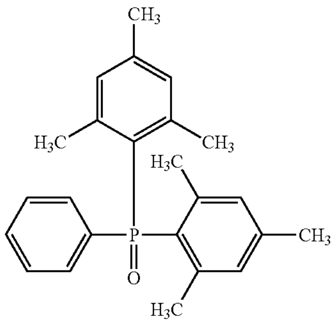
E-17
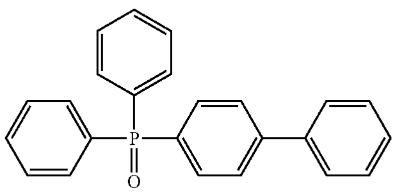
E-18
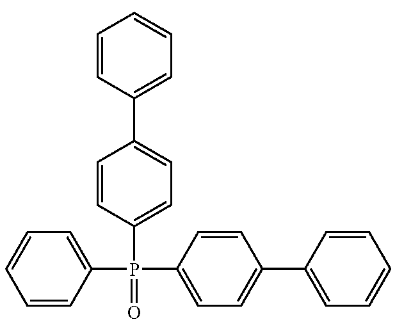
E-19
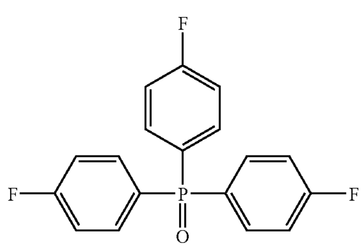
E-20
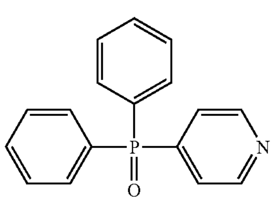
E-21
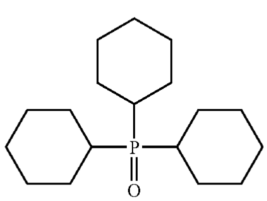
-continued
E-22
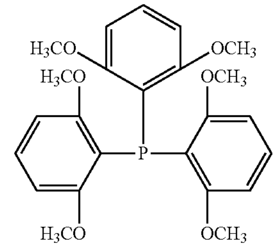
E-23
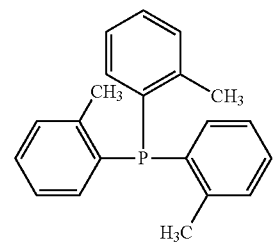
E-24
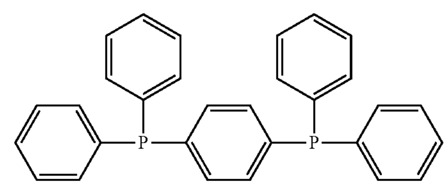
E-25
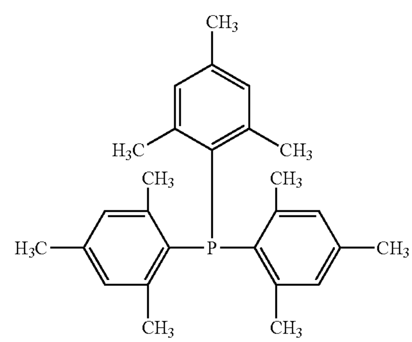
E-26
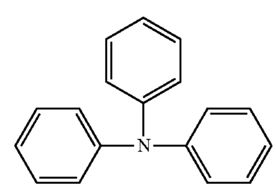
E-27
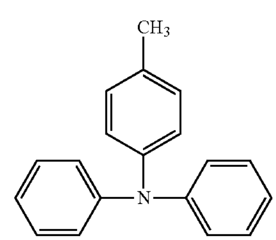

-continued

E-28

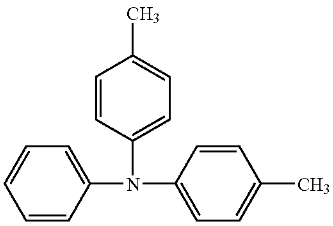

E-29

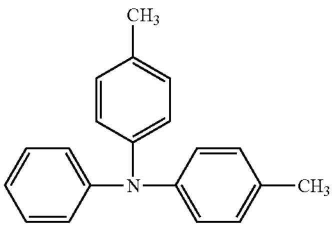

E-30

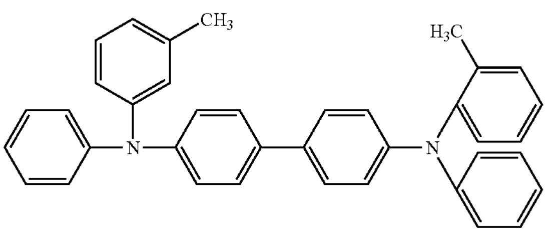

E-31

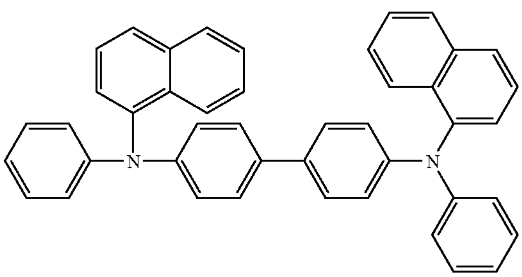

E-32

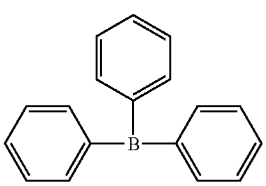

The compound of Formula (2-19) will be illustrated.

Formula (2-19)

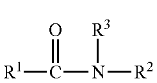

In Formula (2-19), R1 represents an alkyl group or an aryl group; and $R^2$ and $R^3$ independently represent a hydrogen atom, an alkyl group or an aryl group. The alkyl group and the aryl group may be substituted.

The compound of Formula (2-19) is preferably a compound represented by the following Formula (2-20).

Formula (2-20)

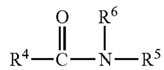

In the Formula (2-20), $R^4$, $R^5$ and $R^6$ each independently represent an alkyl group or an aryl group. Herein, the alkyl group may be straight-chained, branched or cyclic, and is preferably a group having 1 to 20 carbon atoms, more preferably a group having 1 to 15 carbon atoms, and most preferably a group having 1 to 12 carbon atoms. The cyclic alkyl group is particularly preferably a cyclohexyl group, and the aryl group is preferably a group having 6 to 36 carbon atoms, and more preferably a group having 6 to 24 carbon atoms.

The alkyl group and the aryl group described above may be substituted, and for the substituent, preferred are a halogen atom (for example, chlorine, bromine, fluorine and iodine), an alkyl group, an aryl group, an alkoxy group, an aryloxy group, an acyl group, an alkoxycarbonyl group, an aryloxycarbonyl group, an acyloxy group, a sulfonylamino group, a hydroxyl group, a cyano group, an amino group, and an acylamino group; more preferred are a halogen atom, an alkyl group, an aryl group, an alkoxy group, an aryloxy group, a sulfonylamino group and an acylamino group; and most preferably an alkyl group, an aryl group, a sulfonylamino group, and an acylamino group.

Preferred examples of the compound represented by Formula (2-19) or Formula (2-20) will be shown in the following, but the invention is not limited to these specific examples.

FA-1

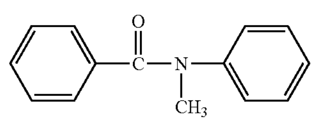

FA-2

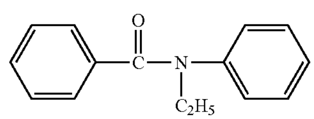

FA-3

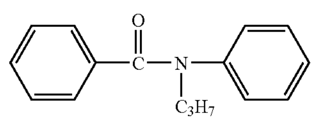

FA-4

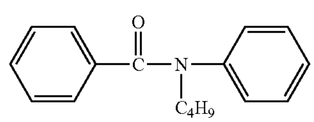

FA-5

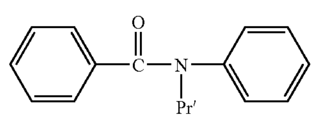

FA-6

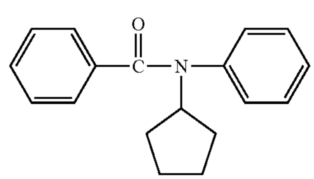

-continued
FA-7
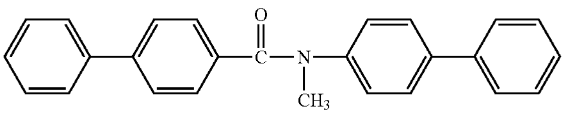
FA-8
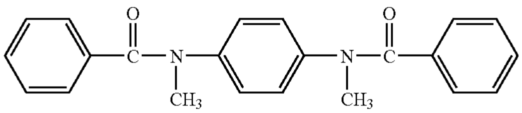
FA-9
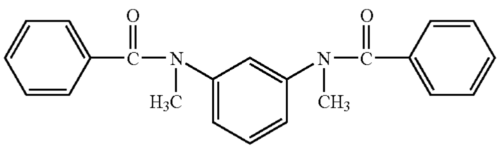
FA-10
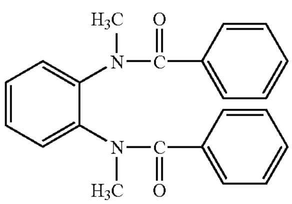
FA-11
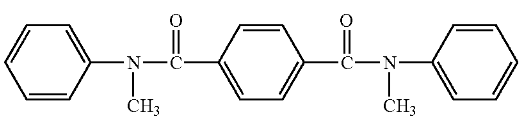
FA-12
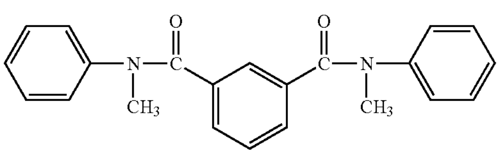
FA-13
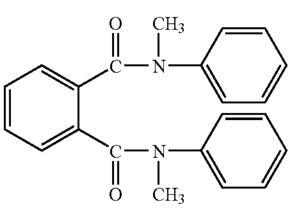
FA-14
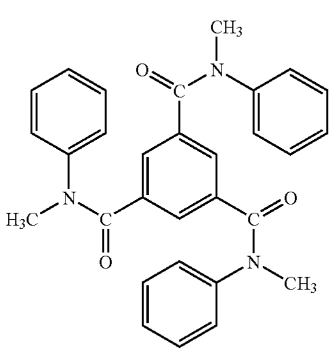
-continued
FA-15
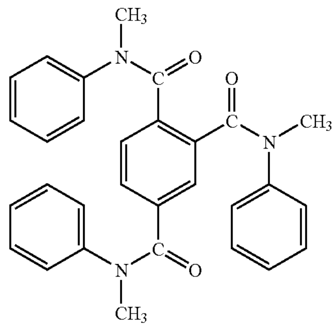
FA-16
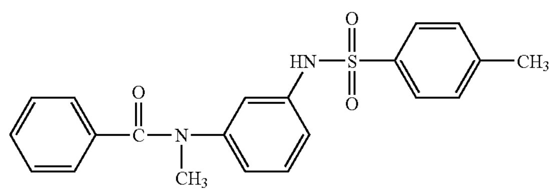
FA-17
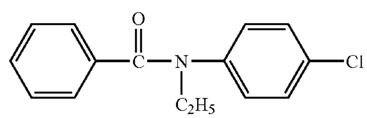
FA-18
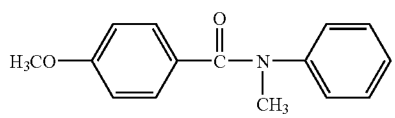
FA-19
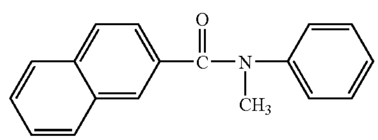
FA-20
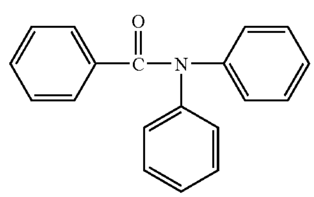
FA-21
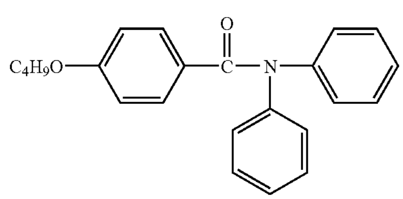
FA-22
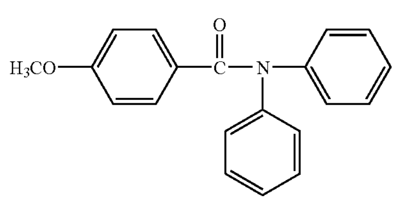

-continued
FA-23
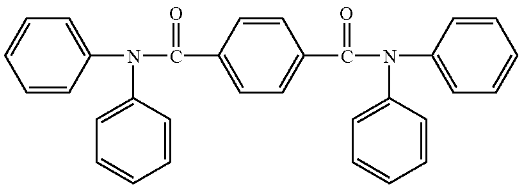
FA-24
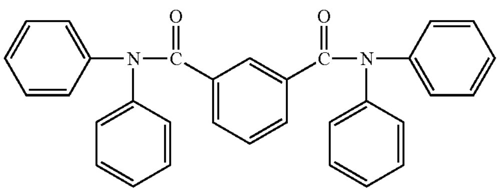
FA-25
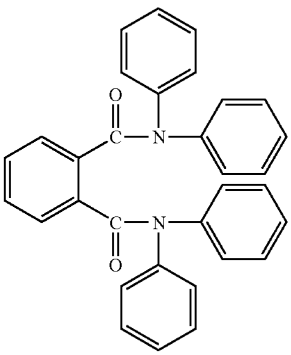
FA-26
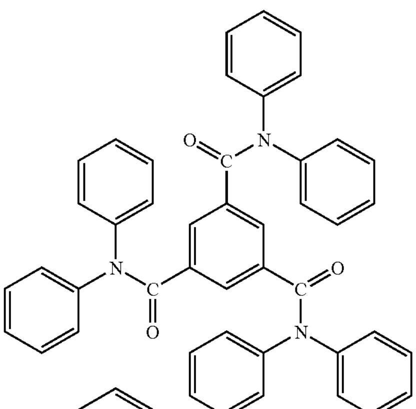
FA-27
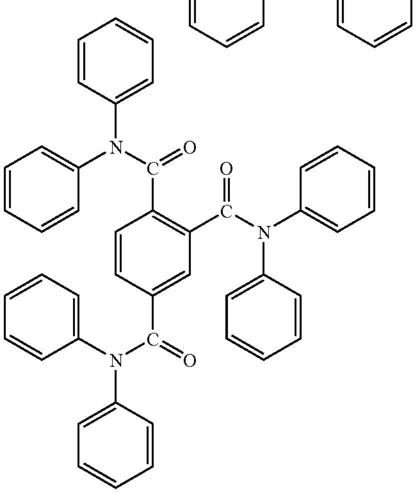
-continued
FA-28
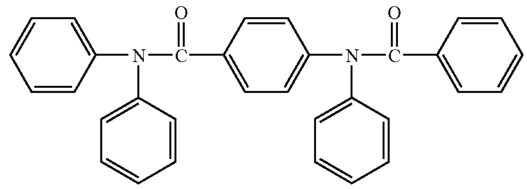
FB-1
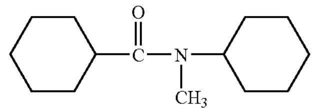
FB-2
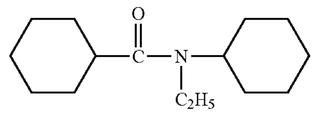
FB-3
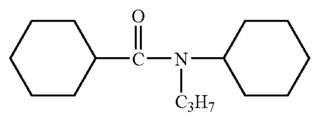
FB-4
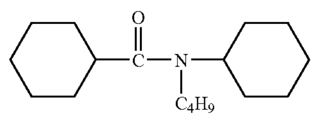
FB-5
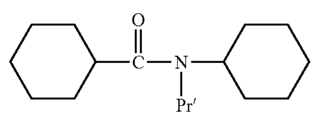
FB-6
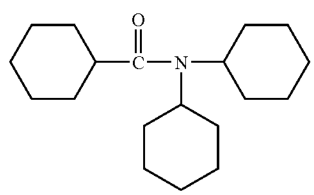
FB-7
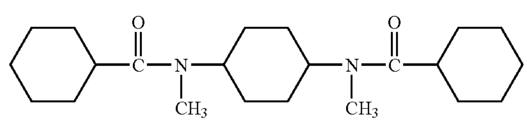
FB-8
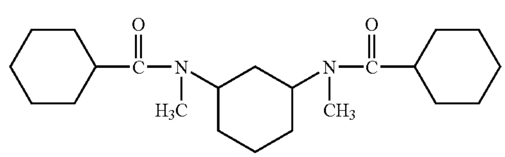
FB-9
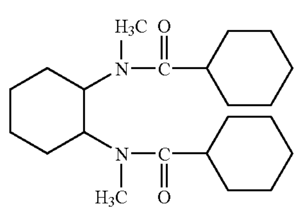

-continued
FB-10
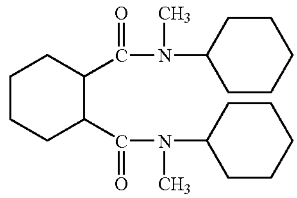
FB-11
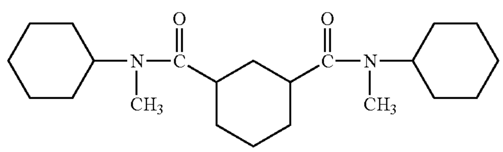
FB-12
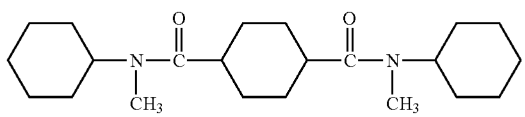
FB-13
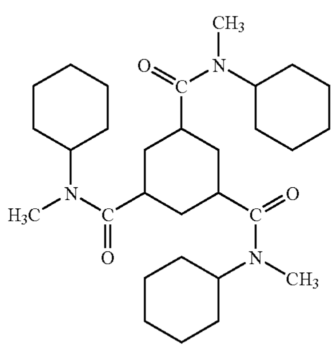
FB-14
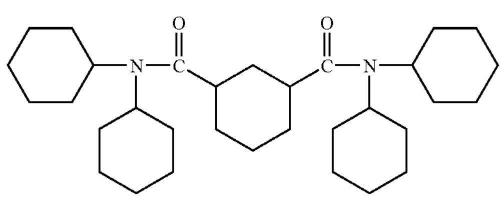
FB-15
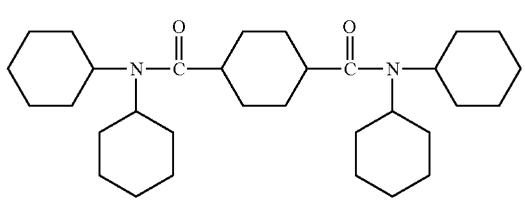
-continued
FB-16
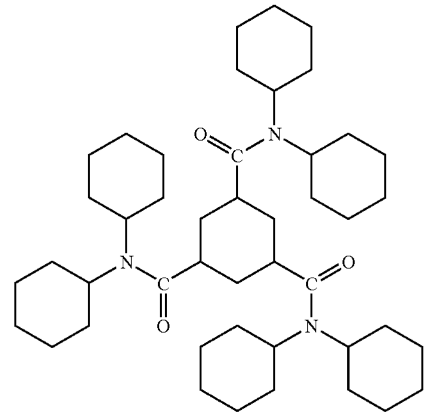
FB-17
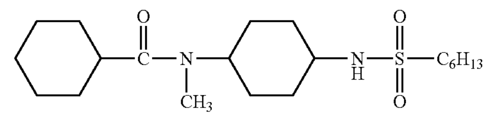
FB-18
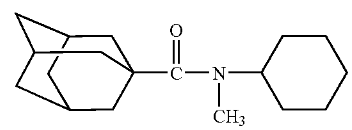
FB-19
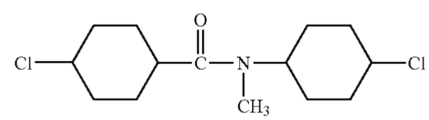
FB-20
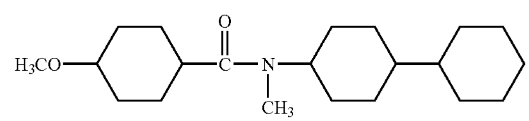
FB-21
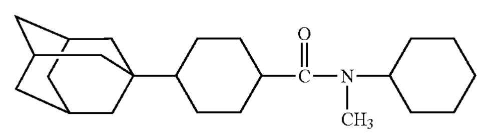
FB-22
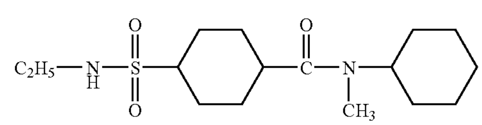
FB-23
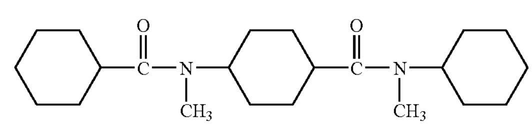
FB-24
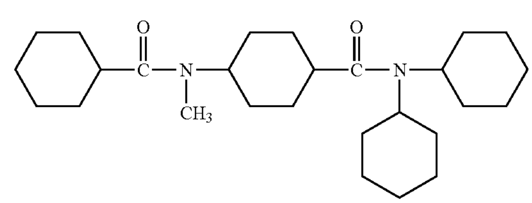

-continued
FC-1
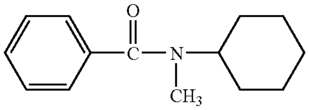
FC-2
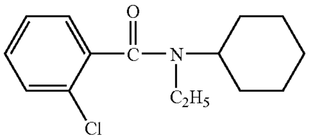
FC-3
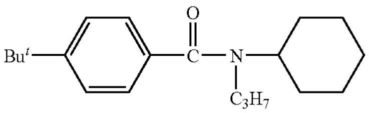
FC-4
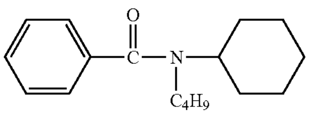
FC-5
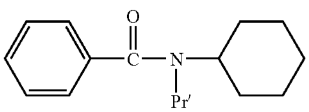
FC-6
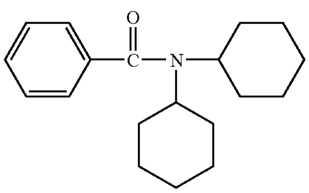
FC-7
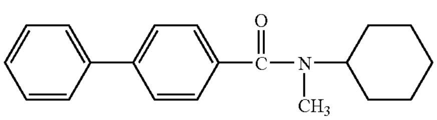
FC-8
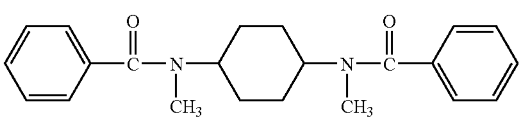
FC-9
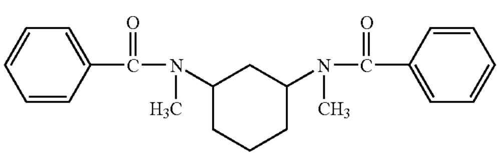
FC-10
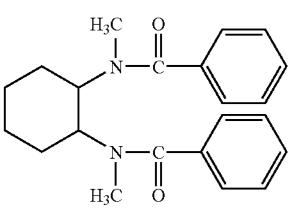
FC-11
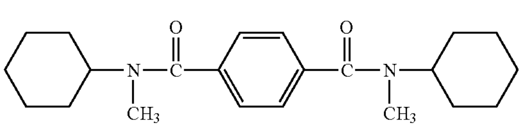
-continued
FC-12
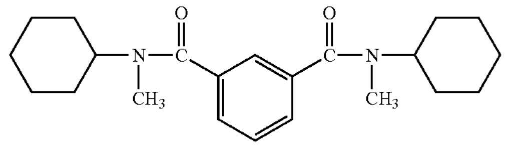
FC-13
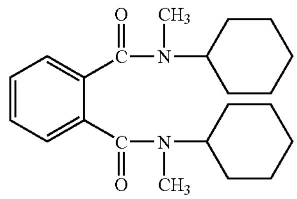
FC-14
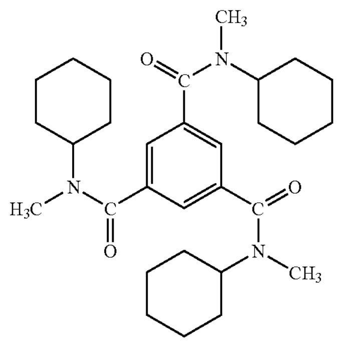
FC-15
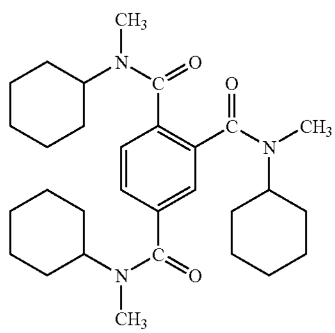
FC-16
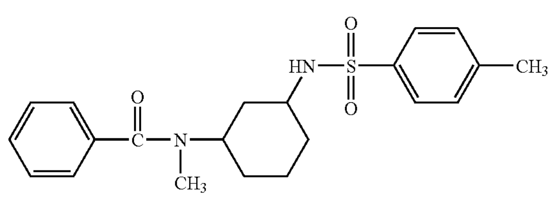
FC-17
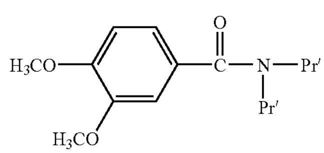
FC-18
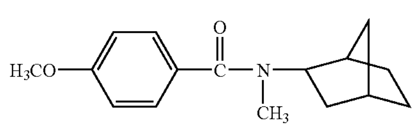

-continued
FC-19
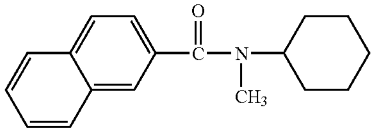
FC-20
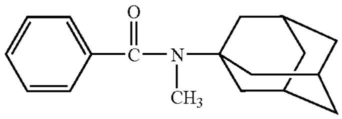
FC-21
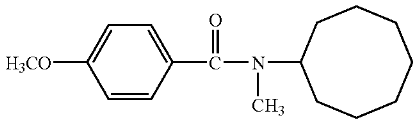
FC-22
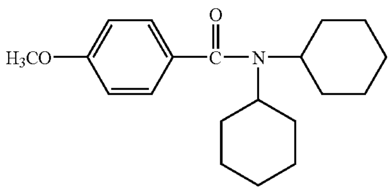
FC-23
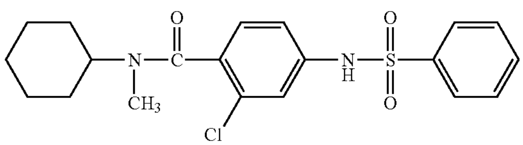
FC-24
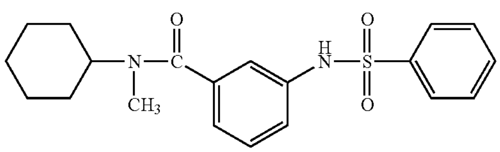
FC-25
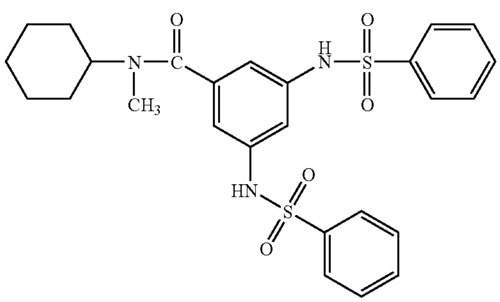
FD-1
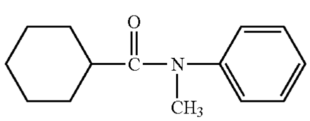
FD-2
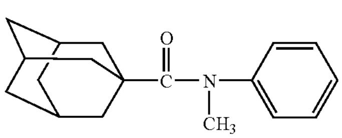
FD-3
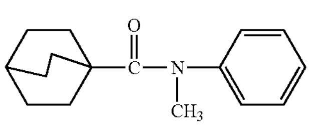
-continued
FD-4
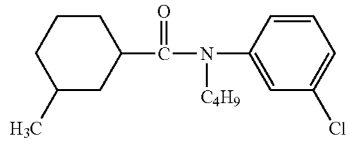
FD-5
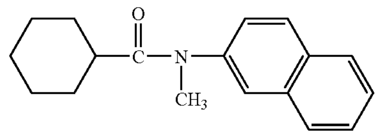
FD-6
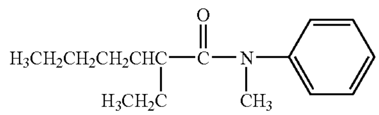
FD-7
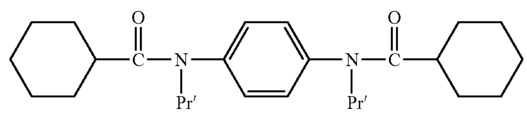
FD-8
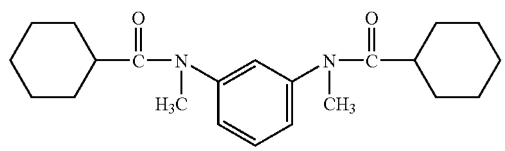
FD-9
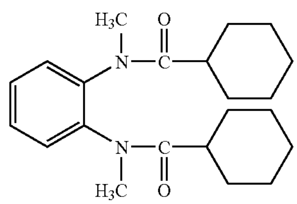
FD-10
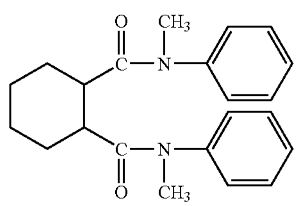
FD-11
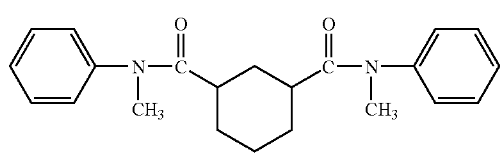
FD-12
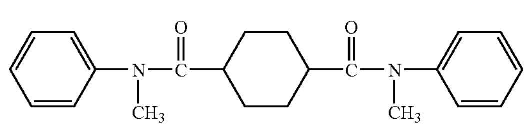

-continued
FD-13
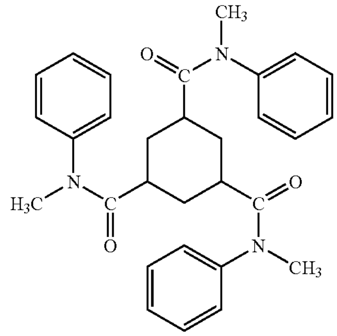
FD-14
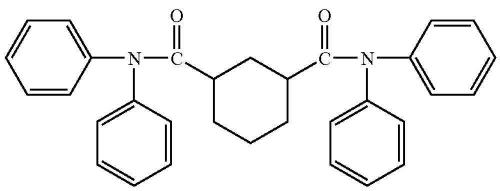
FD-15
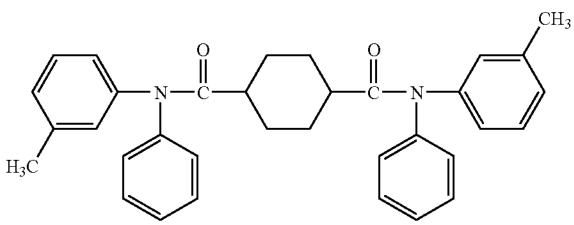
FD-16
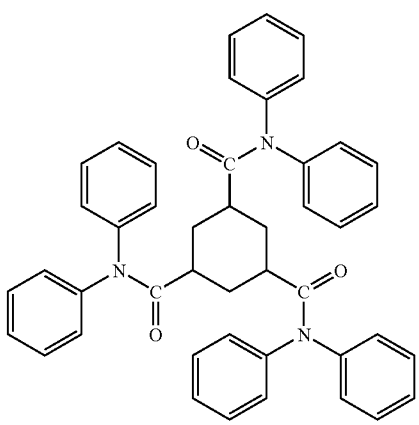
FD-17
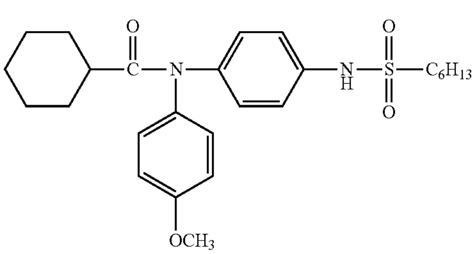
-continued
FD-18
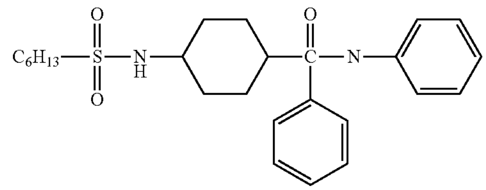
FD-19
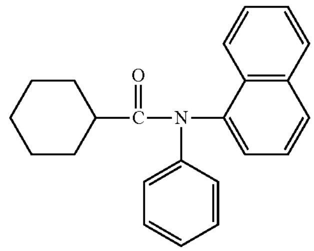
FD-20
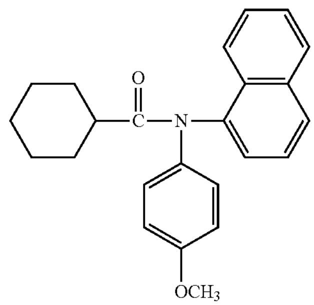
FD-21
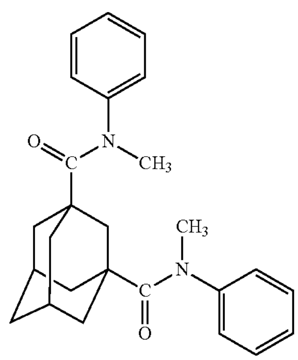
FD-22
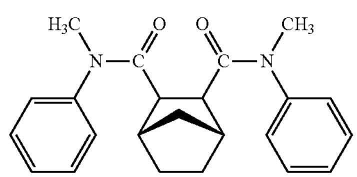
The compound represented by the following Formula (2-21) will be illustrated below.
Formula (2-21)
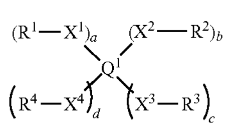
In Formula (2-21), $R^1$, $R^2$, $R^3$ and $R^4$ each represent a hydrogen atom, a substituted or unsubstituted aliphatic group, or a substituted or unsubstituted aromatic group. $X^1$, $X^2$, $X^3$ and $X^4$ each represent a divalent linking group comprising one or more groups selected from the group consisting of a single bond, —CO—, and —$NR^5$— (wherein $R^5$ represents a substituted or unsubstituted aliphatic group, or a substituted or unsubstituted aromatic group). a, b, c and d are each an integer of 0 or greater, and a+b+c+d is 2 or greater. Q1 represents an organic group having a valency of (a+b+c+d).

The compound represented by the Formula (2-21) is preferably a compound represented by the following Formulas (2-21a) to (2-21d).

Formula (2-21a)

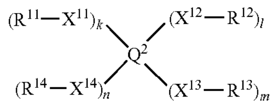

In Formula (2-21a), $R^{11}$, $R^{12}$, $R^{13}$ and $R^{14}$ each represent a hydrogen atom, a substituted or unsubstituted aliphatic group, or a substituted or unsubstituted aromatic group. $X^{11}$, $X^{12}$, $X^{13}$ and $X^{14}$ each represent a divalent linking group formed from one or more groups selected from the group consisting of a single bond, —CO— and —$NR^5$— (wherein $R^5$ represents a substituted or unsubstituted aliphatic group, or a substituted or unsubstituted aromatic group). k, l, m and n are each 0 or 1, and k+l+m+n is 2, 3 or 4. Q2 represents an organic group having a valency of 2 to 4.

Formula (2-21b)

$$R^{21}—Y^1—L^1—Y^2—R^{22}$$

In Formula (2-21b), $R^{21}$ and $R^{22}$ each represent a substituted or unsubstituted aliphatic group, or a substituted or unsubstituted aromatic group. $Y^1$ and $Y^2$ each represent —$CONR^{23}$— or —$NR^{24}CO$— (wherein $R^{23}$ and $R^{24}$ each represent a substituted or unsubstituted aliphatic group, or a substituted or unsubstituted aromatic group). $L^1$ represents a divalent organic group formed from one or more groups selected from the group consisting of —O—, —S—, —SO—, —SO2-, —CO—, —$NR^{25}$— (wherein $R^{25}$ represents a hydrogen atom, a substituted or unsubstituted aliphatic group, or a substituted or unsubstituted aromatic group), an alkylene group and an arylene group.

Formula (2-21c)

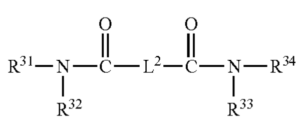

In Formula (2-21c), $R^{31}$, $R^{32}$, $R^{33}$ and $R^{34}$ each represent a substituted or unsubstituted aliphatic group, or a substituted or unsubstituted aromatic group. $L^2$ represents a divalent organic group formed from one or more groups selected from the group consisting of —O—, —S—, —SO—, —SO2-, —CO—, —$NR^{35}$— (wherein $R^{35}$ represents a hydrogen atom, a substituted or unsubstituted aliphatic group, or a substituted or unsubstituted aromatic group), an alkylene group and an arylene group.

Formula (2-21d)

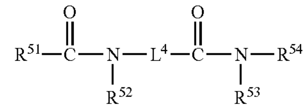

In Formula (2-21d), $R^{51}$, $R^{52}$, $R^{53}$ and $R^{54}$ each represent a substituted or unsubstituted aliphatic group, or a substituted or unsubstituted aromatic group. $L^4$ represents a divalent organic group formed from one or more groups selected from the group consisting of —O—, —S—, —SO—, —SO2-, —CO—, —$NR^{55}$— (wherein $R^{55}$ represents a hydrogen atom, a substituted or unsubstituted aliphatic group, or a substituted or unsubstituted aromatic group), an alkylene group and an arylene group.

Hereinafter, the compound represented by Formula (2-21) will be illustrated in more detail.

In the Formula (2-21), $R^1$, $R^2$, $R^3$ and $R^4$ each represent a hydrogen atom, a substituted or unsubstituted aliphatic group, or a substituted or unsubstituted aromatic group, with an aliphatic group being preferred. The aliphatic group may be straight-chained, branched or cyclic, and is more preferably cyclic. For the substituents which may be carried by the aliphatic group and the aromatic group, the Substituent T to be described later may be mentioned, but an unsubstituted group is preferred. $X^1$, $X^2$, $X^3$ and $X^4$ each represent a divalent linking group formed from one or more groups selected from the group consisting of a single bond, —CO—, and —$NR^5$— (wherein $R^5$ represents a substituted or unsubstituted aliphatic group, or a substituted or unsubstituted aromatic group, with an unsubstituted group and/or an aliphatic group being more preferred). The combination of $X^1$, $X^2$, $X^3$ and $X^4$ is not particularly limited, but it is more preferable to select from —CO— and —$NR^5$—. a, b, c and d are each an integer of 0 or greater, and a+b+c+d is 2 or greater. a+b+c+d is preferably 2 to 8, more preferably 2 to 6, and still more preferably 2 to 4. Q1 represents an organic group (excluding cyclic groups) having a valency of (a+b+c+d). The valency of Q1 is preferably 2 to 8, more preferably 2 to 6, and most preferably 2 to 4. An organic group means a group formed from an organic compound.

In the Formula (2-21a), $R^{11}$, $R^{12}$, $R^{13}$ and $R^{14}$ each represent a hydrogen atom, a substituted or unsubstituted aliphatic group, or a substituted or unsubstituted aromatic group, with an aliphatic group being preferred. The aliphatic group may be straight-chained, branched or cyclic, and is more preferably cyclic. For the substituents which may be carried by the aliphatic group and the aromatic group, the Substituent T to be described later may be mentioned, but an unsubstituted group is preferred. $X^{11}$, $X^{12}$, $X^{13}$ and $X^{14}$ each represent a divalent linking group formed from one or more groups selected from the group consisting of a single bond, —CO—, and —$NR^{15}$— (wherein $R^{15}$ represents a substituted or unsubstituted aliphatic group, or a substituted or unsubstituted aromatic group, with an unsubstituted group and/or an aliphatic group being more preferred). The combination of $X^{11}$, $X^{12}$, $X^{13}$ and $X^{14}$ is not particularly limited, but it is more preferable to select from —CO— and —$NR^{15}$—. k, l, m and n are each 0 or 1, and k+l+m+n is 2, 3 or 4. Q1 represents an organic group (excluding cyclic groups) having a valency of 2 to 4. The valency of Q1 is preferably 2 or 3.

In the Formula (2-21b), $R^{21}$ and $R^{22}$ each represent a substituted or unsubstituted aliphatic group, or a substituted or unsubstituted aromatic group, with an aliphatic group being preferred. The aliphatic group may be straight-chained, branched or cyclic, and is more preferably cyclic. For the substituents which may be carried by the aliphatic group and the aromatic group, the Substituent T to be described later may be mentioned, but an unsubstituted group is preferred. $Y^1$ and $Y^2$ each independently represent —CONR$^{23}$— or —NR$^{24}$CO—, and $R^{23}$ and $R^{24}$ each represent a substituted or unsubstituted aliphatic group, or a substituted or unsubstituted aromatic group, with an unsubstituted group and/or an aliphatic group being more preferred. $L^1$ represents a divalent organic group (excluding cyclic groups) formed from one or more groups selected from the group consisting of —O—, —S—, —SO—, —SO2-, —CO—, —NR$^{25}$—, an alkylene group and an arylene group. The combination of $L^1$ is not particularly limited, but it is preferable to select from —O—, —S—, —NR$^{25}$— and an alkylene group, more preferable to select from —O—, —S— and an alkylene group, and most preferable to select from —O—, —S— and an alkyene group.

In the Formula (2-21c), $R^{31}$, $R^{32}$, $R^{33}$ and $R^{34}$ each represent a substituted or unsubstituted aliphatic group, or a substituted or unsubstituted aromatic group, with an aliphatic group being preferred. The aliphatic group may be straight-chained, branched or cyclic, and is more preferably cyclic. For the substituents which may be carried by the aliphatic group and the aromatic group, the Substituent T to be described later may be mentioned, but an unsubstituted group is preferred. $L^2$ represents a divalent organic group formed from one or more groups selected from the group consisting of —O—, —S—, —SO—, —SO2-, —CO—, —NR$^{35}$— (wherein $R^{35}$ represents a hydrogen atom, a substituted or unsubstituted aliphatic group, or a substituted or unsubstituted aromatic group, with an unsubstituted group and/or an aliphatic group being more preferred), an alkylene group and an arylene group. The combination of $L^2$ is not particularly limited, but it is preferable to select from —O—, —S—, —NR$^{35}$— and an alkylene group, more preferable to select from —O—, —S— and an alkylene group, and most preferable to select from —O—, —S— and an alkyene group.

In the Formula (2-21d), $R^{51}$, $R^{52}$, $R^{53}$ and $R^{54}$ each represent a substituted or unsubstituted aliphatic group, or a substituted or unsubstituted aromatic group, with an aliphatic group being preferred. The aliphatic group may be straight-chained, branched or cyclic, and is more preferably cyclic. For the substituents which may be carried by the aliphatic group and the aromatic group, the Substituent T to be described later may be mentioned, but an unsubstituted group is preferred. $L^4$ represents a divalent organic group formed from one or more groups selected from the group consisting of —O—, —S—, —SO—, —SO2-, —CO—, —NR$^{55}$— (wherein $R^{55}$ represents a substituted or unsubstituted aliphatic group, or a substituted or unsubstituted aromatic group, with an unsubstituted group and/or an aliphatic group being more preferred), an alkylene group and an arylene group. The combination of $L^4$ is not particularly limited, but it is preferable to select from —O—, —S—, —NR$^{55}$— and an alkylene group, more preferable to select from —O—, —S— and an alkylene group, and most preferable to select from —O—, —S— and an alkyene group.

Hereinafter, the substituted or unsubstituted aliphatic group that has been mentioned as a substituent for Formula (2-21) and Formulas (2-21a) to (2-21d) will be illustrated. The aliphatic group may be straight-chained, branched or cyclic, and is preferably a group having 1 to 25 carbon atoms, more preferably a group having 6 to 25 carbon atoms, and particularly preferably a group having 6 to 20 carbon atoms. Specific examples of the aliphatic group include a methyl group, an ethyl group, an n-propyl group, an isopropyl group, a cyclopropyl group, an n-butyl group, an isobutyl group, a tert-butyl group, an isopropyl group, a cyclopropyl group, an n-butyl group, an isobutyl group, a tert-butyl group, an amyl group, an isoamyl group, a tert-amyl group, an n-hexyl group, a cyclohexyl group, an n-heptyl group, an n-octyl group, a bicylooctyl group, an adamantyl group, an n-decyl group, a tert-octyl group, a dodecyl group, a hexadecyl group, an octadecyl group, a didecyl group, and the like.

Hereinafter, the aromatic group that has been mentioned as a substituent for Formula (2-21) and Formulas (2-21a) to (2-21d) will be illustrated. The aromatic group may be an aromatic hydrocarbon group, or an aromatic heterocyclic group, and is more preferably an aromatic hydrocarbon group. The aromatic hydrocarbon group preferably has 6 to 24 carbon atoms, and more preferably 6 to 12 carbon atoms. Examples of the rings as specific examples of the aromatic hydrocarbon group include the respective cyclic groups of benzene, naphthalene, anthracene, biphenyl, terphenyl and the like. For the aromatic hydrocarbon group, the respective groups of benzene, naphthalene and biphenyl are particularly preferred. The aromatic heterocyclic group preferably contains at least one of an oxygen atom, a nitrogen atom or a sulfur atom. Specific examples of the heterocyclic ring include the respective rings of furan, pyrrole, thiophene, imidazole, pyrazole, pyridine, pyrazine, pyridazine, triazole, triazine, indole, indazole, purine, thiazoline, thiadiazole, oxazoline, oxazole, oxadiazole, quinoline, isoquinoline, phthalazine, naphthyridine, quinoxaline, quinazoline, cinnoline, pteridine, acridine, phenanthroline, phenazine, tetrazole, benzimidazole, benzoxazole, benzothiazole, benzotriazole, tetrazaindene and the like. The aromatic heterocyclic group is particularly preferably a pyridine ring, a triazine ring, or a quinoline ring.

Furthermore, hereinafter, the above-described Substituent T in relation to the respective formulas described above will be illustrated in detail.

The Substituent T may be exemplified by an alkyl group (preferably having 1 to 20 carbon atoms, more preferably 1 to 12 carbon atoms, and particularly preferably 1 to 8 carbon atoms; examples thereof include a methyl group, an ethyl group, an isopropyl group, a tert-butyl group, an n-octyl group, an n-decyl group, an n-hexadecyl group, a cyclopropyl group, a cyclopentyl group, a cyclohexyl group, and the like), an alkenyl group (preferably having 2 to 20 carbon atoms, more preferably 2 to 12 carbon atoms, and particularly preferably 2 to 8 carbon atoms; examples thereof include a vinyl group, an allyl group, a 2-butenyl group, a 3-pentenyl group, and the like), an alkynyl group (preferably having 2 to 20 carbon atoms, more preferably 2 to 12 carbon atoms, and particularly preferably 2 to 8 carbon atoms; examples thereof include a propargyl group, a 3-pentynyl group, and the like), an aryl group (preferably having 6 to 30 carbon atoms, more preferably 6 to 20 carbon atoms, and particularly preferably 6 to 12 carbon atoms; examples thereof include a phenyl group, a biphenyl group, a naphthyl group, and the like), an amino group (preferably having 0 to 20 carbon atoms, more preferably 0 to 10 carbon atoms, and particularly preferably 0 to 6 carbon atoms; examples thereof include an amino group, a methylamino group, a dimethylamino group, a diethylamino group, a dibenzylamino group, and the like).

An alkoxy group (preferably having 1 to 20 carbon atoms, more preferably 1 to 12 carbon atom, and particularly preferably 1 to 8 carbon atoms; examples thereof include a methoxy group, an ethoxy group, a butoxy group, and the like), an aryloxy group (preferably having 6 to 20 carbon atoms, more preferably 6 to 16 carbon atoms, and particularly preferably 6 to 12 carbon atoms; examples thereof include a phenyloxy group, a 2-naphthyloxy group, and the like), an acyl group (preferably having 1 to 20 carbon atoms, more preferably 1 to 16 carbon atoms, and particularly preferably 1 to 12 carbon atoms; examples thereof include an acetyl group, a benzoyl group, a formyl group, a pivaloyl group, and the like), an alkoxycarbonyl group (preferably having 2 to 20 carbon atoms, more preferably 2 to 16 carbon atoms, and particularly preferably 2 to 12 carbon atoms; examples thereof include a methoxycarbonyl group, an ethoxycarbonyl group, and the like), an aryloxycarbonyl group (preferably having 7 to 20 carbon atoms, more preferably 7 to 16 carbon atoms, and particularly preferably 7 to 10 carbon atoms; examples thereof include a phenyloxycarbonyl group and the like), an acyloxy group (preferably having 2 to 20 carbon atoms, more preferably 2 to 16 carbon atoms, and particularly preferably 2 to 10 carbon atoms; examples thereof include an acetoxy group, a benzoyloxy group, and the like), an acylamino group (preferably having 2 to 20 carbon atoms, more preferably 2 to 16 carbon atoms, and particularly preferably 2 to 10 carbon atoms; examples thereof include an acetylamino group, a benzoylamino group, and the like), an alkoxycarbonylamino group (preferably having 2 to 20 carbon atoms, more preferably 2 to 16 carbon atoms, and particularly preferably 2 to 12 carbon atoms; examples thereof include a methoxycarbonylamino group and the like), an aryloxycarbonylamino group (preferably having 7 to 20 carbon atoms, more preferably 7 to 16 carbon atoms, and particularly preferably 7 to 12 carbon atoms; examples thereof include a phenyloxycarbonylamino group and the like), a sulfonylamino group (preferably having 1 to 20 carbon atom, more preferably 1 to 16 carbon atoms, and particularly preferably 1 to 12 carbon atoms; examples thereof include a methanesulfonylamino group, a benzenesulfonylamino group, and the like), a sulfamoyl group (preferably having 0 to 20 carbon atoms, more preferably 0 to 16 carbon atoms, and particularly preferably having 0 to 12 carbon atoms; examples thereof include a sulfamoyl group, a methylsulfamoyl group, a dimethylsulfamoyl group, a phenylsulfamoyl group, and the like), a carbamoyl group (preferably having 1 to 20 carbon atoms, more preferably 1 to 16 carbon atoms, and particularly preferably 1 to 12 carbon atoms; examples thereof include a carbamoyl group, a methylcarbamoyl group, a diethylcarbamoyl group, a phenylcarbamoyl group, and the like), An alkylthio group (preferably having 1 to 20 carbon atoms, more preferably 1 to 16 carbon atoms, and particularly preferably 1 to 12 carbon atoms; examples thereof include a methylthio group, an ethylthio group, and the like), an arylthio group (preferably having 6 to 20 carbon atoms, more preferably 6 to 16 carbon atoms, and particularly preferably 6 to 12 carbon atoms; examples thereof include a phenylthio group and the like), a sulfonyl group (preferably having 1 to 20 carbon atoms, more preferably 1 to 16 carbon atoms, and particularly preferably 1 to 12 carbon atoms; examples thereof include a mesyl group, a tosyl group, and the like), a sulfinyl group (preferably having 1 to 20 carbon atoms, more preferably 1 to 16 carbon atoms, and particularly preferably 1 to 12 carbon atoms; examples thereof include a methanesulfinyl group, a benzenesulfinyl group, and the like), an ureido group (preferably having 1 to 20 carbon atoms, more preferably 1 to 16 carbon atoms, and particularly preferably 1 to 12 carbon atoms; examples thereof include a ureido group, a methylureido group, a phenylureido group, and the like), a phosphoric acid amide group (preferably having 1 to 20 carbon atoms, more preferably 1 to 16 carbon atoms, and particularly preferably 1 to 12 carbon atoms; examples thereof include a diethylphosphoric acid amide group, a phenylphosphoric acid amide group, and the like), a hydroxyl group, a mercapto group, a halogen atom (for example, a fluorine atom, a chloride atom, a bromine atom, an iodine atom), a cyano group, a sulfo group, a carboxyl group, a nitro group, a hydroxamic acid group, a sulfino group, a hydrazino group, an imino group, a heterocyclic group (preferably having 1 to 30 carbon atoms, more preferably 1 to 12 carbon atoms, and having a heteroatom such as a nitrogen atom, an oxygen atom, or a sulfur atom; specific examples thereof include an imidazolyl group, a pyridyl group, a quinolyl group, a furyl group, a piperidyl group, a morpholino group, a benzoxazolyl group, a benzimidazolyl group, a benzothiazolyl group, and the like), and a silyl group (preferably having 3 to 40 carbon atoms, more preferably 3 to 30 carbon atoms, and particularly preferably 3 to 24 carbon atoms; examples thereof include a trimethylsilyl group, a triphenylsilyl group, and the like), and the like.

These substituents may be further substituted. When there are two or more substituents, they may be identical or different. If possible, they may be joined to each other to form a ring.

Preferred examples of the compound represented by Formula (2-21) will be shown in the following, but the invention is not limited to these specific examples.

(CA-1)

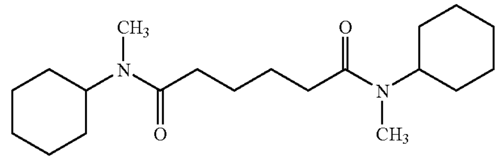

(CA-2)

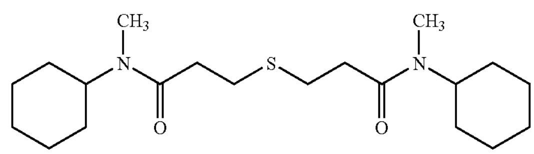

(CA-3)

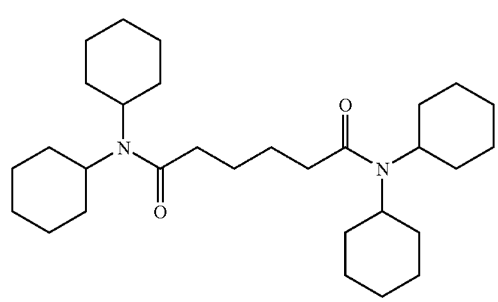

(CA-4)

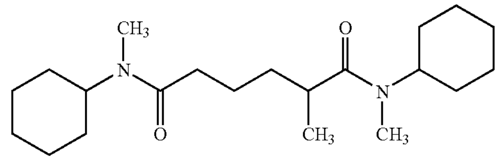

(CA-5)

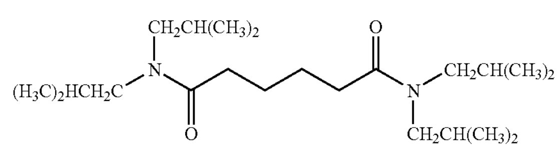

-continued
(CA-6)
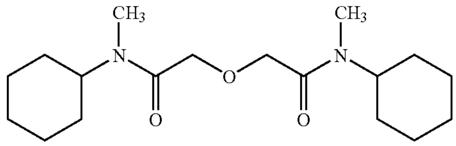
(CA-7)
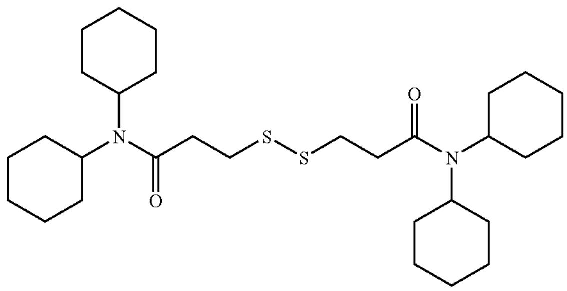
(CA-8)
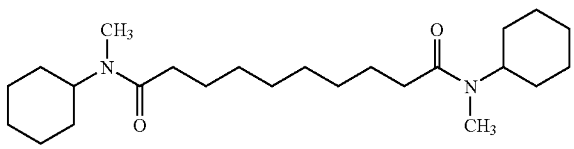
(CA-9)
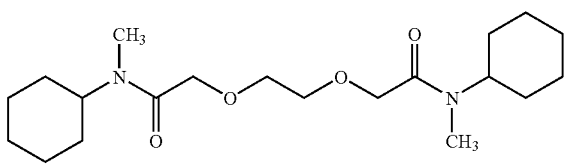
(CA-10)
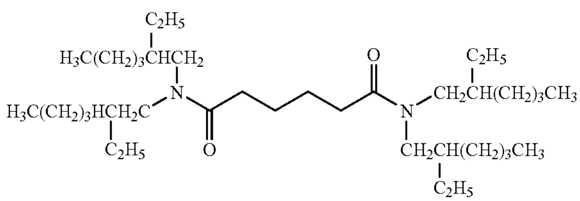
(CA-11)
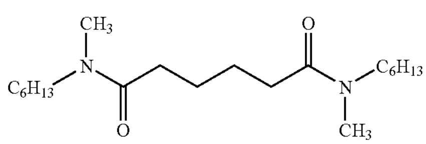
(CA-12)
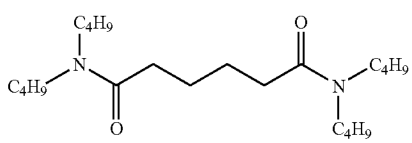
(CA-13)
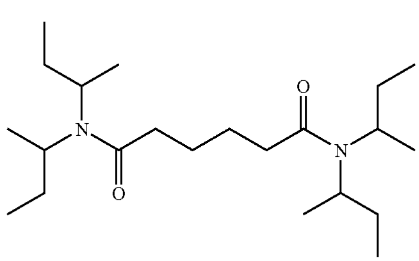
-continued
(CA-14)
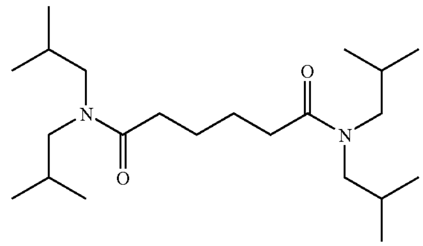
(CA-15)
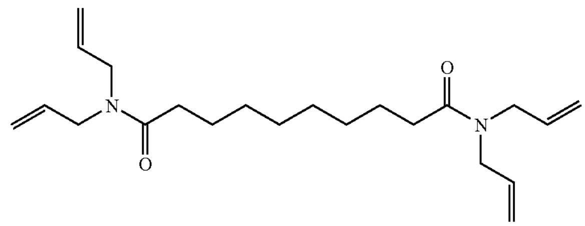
(CA-16)
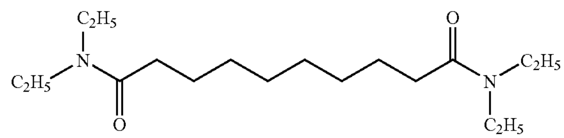
(CA-17)
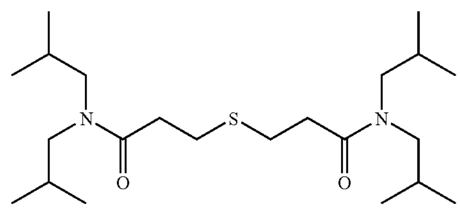
(CA-18)
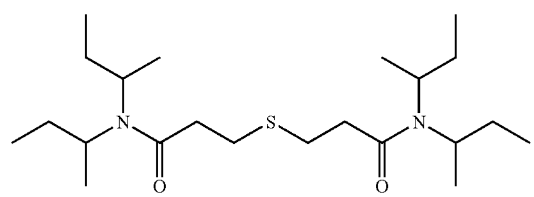
(CA-19)
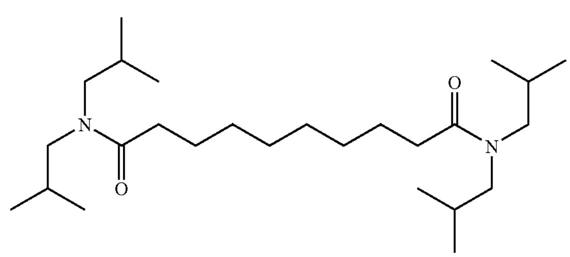
(CA-20)
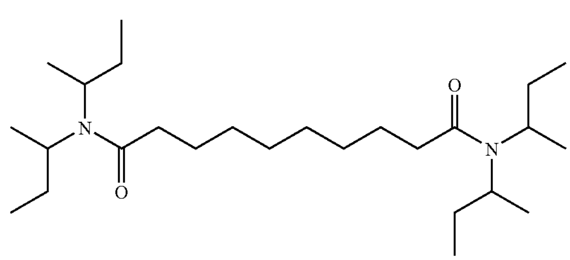

-continued (CA-21)

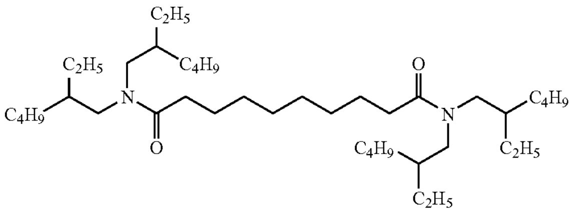

(CA-22)

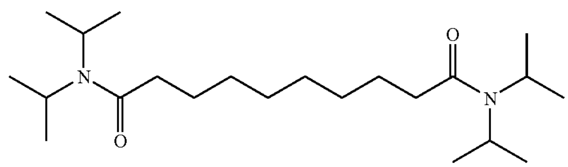

(CB-1)

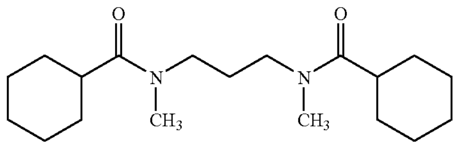

(CB-2)

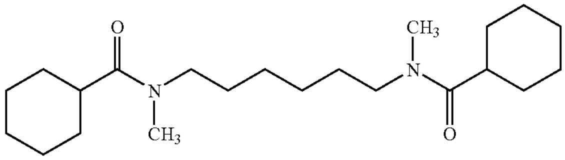

(CB-3)

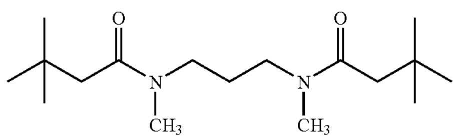

(CB-4)

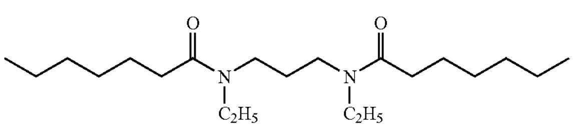

(CB-5)

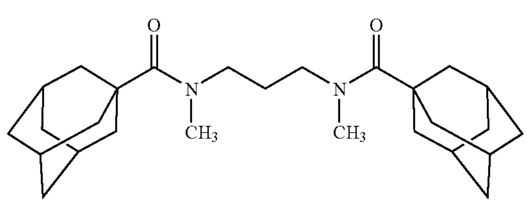

(CC-1)

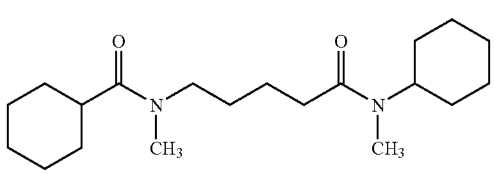

(CC-2)

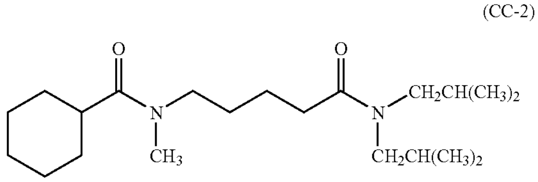

-continued (CC-3)

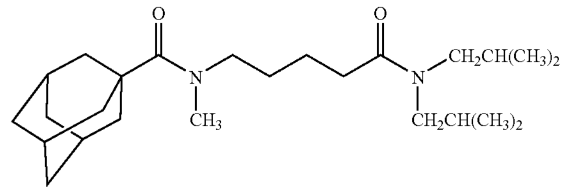

(CC-4)

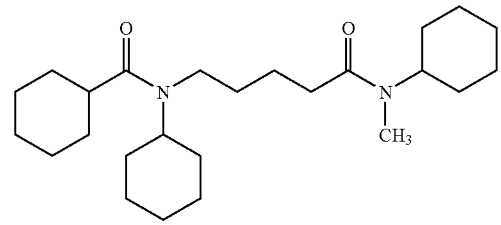

The compounds used in the invention can be all prepared from existing compounds. The compound represented by Formula (2-21) or any one of Formulas (2-21a) to (2-21d) is obtained by, for example, a condensation reaction between a carbonyl chloride and an amine.

(Log P Value)

In the case of producing the cellulose derivative film of the invention, it is preferable to use a compound having an octanol-water partition coefficient (log P value) of 0 to 10 as a retardation regulator, for the purpose of increasing the compatibility of the substituent having a high polarizability anisotropy with the retardation regulator, and thereby further increasing the proportion of the substituent on the cellulose derivative in the film aligning in the film thickness direction. When the log P value is 10 or less, the compatibility with the substituent on the cellulose derivative is good, there is obtained an effect of sufficiently reducing Rth, and a problem such as clouding of the film or powder formation does not occur, which is preferable. When the log P value is 0 or greater, the hydrophilicity does not become excessively high, and a problem of deteriorating the moisture resistance of the cellulose derivative film does not occur, which is preferable. The log P value is more preferably in the range of 1 to 6, and particularly preferably in the range of 1.5 to 5.

The measurement of the octanol-water partition coefficient (log P value) can be performed according to the shake-flask method described in Japan Industrial Standards (JIS) Z7260-107 (2000). The octanol-water partition coefficient (log P value) may also be estimated, instead of an actual measurement, by a calculational chemical method or an empirical method. For the calculation method, Crippen's fragmentation method (J. Chem. Inf. Comput. Sci., 27, 21 (1987)), Viswanadhan's fragmentation method (J. Chem. Inf. Comput. Sci., 29, 163 (1989)), or Broto's fragmentation method (Eur. J. Med. Chem.-Chim. Theor., 19, 71 (1984)) and the like are preferably used, and Crippen's fragmentation method (J. Chem. Inf. Comput. Sci., 27, 21 (1987)) is more preferably used. In case that a compound shows different log P values depending on the measuring method or the calculation method, the Crippen's fragmentation method is preferably used for determining as to whether the compound is within the range of the invention.

[Physical Properties of Retardation Regulator]

The retardation regulator may or may not contain an aromatic group, as described above. The retardation regulator preferably has a molecular weight of 3000 or less, more preferably a molecular weight of from 150 to 3000, still more preferably from 170 to 2000, and particularly preferably from 200 to 1000. Within this range of molecular weight, the retardation regulator may have a specific monomer structure, or may have an oligomer structure combining a plurality of the monomer units, or a polymer structure. The retardation regulator is preferably a liquid at 25° C., or a solid having a melting point of 25 to 250° C., and more preferably a liquid at 25° C., or a solid having a melting point of 25 to 200° C. It is also preferable that the retardation regulator does not evaporate in the course of casting and drying a dope solution for preparing cellulose derivative film.

The amount of the retardation regulator to be added is preferably 0.01 to 30% by mass, more preferably 1 to 25% by mass, and particularly preferably 3 to 20% by mass, of the cellulose derivative.

The retardation regulator may be used alone, or as a mixture of two or more compounds at any ratio.

The time for adding the retardation regulator may be at any time during the process for dope preparation, and may be at the end of the process for dope preparation.

[Other Retardation Regulators]

It is also possible to decrease the optical anisotropy by adding a polyhydric alcohol ester compound, a carboxylic acid ester compound, a polycyclic carboxylic compound, or a bisphenol derivative to the cellulose derivative. That is, these compounds are also the compounds decreasing the optical anisotropy of the cellulose derivative film, and according to the invention, these compounds can be used as the retardation regulator. These compounds preferably have an octanol-water partition coefficient (log P value) of 0 to 10, in a similar way that the compounds represented by the Formulas (2-1) to (2-21) do.

Specific examples of the polyhydric alcohol ester compound, carboxylic acid ester compound, polycyclic carboxylic acid compound and bisphenol derivative, respectively having an octanol-water partition coefficient (log P value) of 0 to 10, will be illustrated in the following.

(Polyhydric Alcohol Ester Compound)

The polyhydric alcohol ester that is suitably used for the invention is an ester of a polyhydric alcohol having a valency of two or more, with one or more monocarboxylic acid. Examples of the polyhydric alcohol ester compound may include the following, but the invention is not limited to these.

(Polyhydric Alcohol)

Preferred examples of the polyhydric alcohol include adonitol, arabitol, ethylene glycol, diethylene glycol, triethylene glycol, tetraethylene glycol, 1,2-propanediol, 1,3-propanediol, dipropylene glycol, tripropylene glycol, 1,2-butanediol, 1,3-butanediol, 1,4-butanediol, dibutylene glycol, 1,2,4-butanetriol, 1,5-pentanediol, 1,6-hexanediol, hexanetriol, galactitol, mannitol, 3-methylpentane-1,3,5-triol, pinacol, sorbitol, trimethylolpropane, trimethylolethane, xylitol, and the like. Particularly preferred are triethylene glycol, tetraethylene glycol, dipropylene glycol, tripropylene glycol, sorbitol, trimethylolpropane and xylitol.

(Monocarboxylic Acid)

For the preferred monocarboxylic acid, a known aliphatic monocarboxylic acid, an alicyclic monocarboxylic acid, an aromatic monocarboxylic acid, and the like can be used, without particular limitation. It is preferable to use an alicyclic monocarboxylic acid or an aromatic monocarboxylic acid, from the aspect of improving moisture permeability, water content, and retainability of the cellulose acylate film.

Preferred examples of the monocarboxylic acid include the following, but the invention is not limited to these.

For the aliphatic monocarboxylic acid, a straight-chained or branched aliphatic acid preferably having 1 to 32 carbon atoms can be used. It is more preferable to use a group having 1 to 20 carbon atoms, and particularly preferably 1 to 10 carbon atoms. It is preferable to contain an acetic acid because of improving compatibility with a cellulose ester. It is also preferable to use a mixture of an acetic acid and other monocarboxylic acids, because addition of acetic acid increases compatibility with the cellulose ester.

Preferred examples of the aliphatic monocarboxylic acid include saturated fatty acids such as acetic acid, propionic acid, butyric acid, valeric acid, caproic acid, enanthic acid, caprylic acid, pelargonic acid, capric acid, 2-ethylhexane carboxylic acid, undecylic acid, lauric acid, tridecylic acid, myristic acid, pentadecylic acid, palmitic acid, heptadecylic acid, stearic acid, nonadecanoic acid, arachic acid, behenic acid, lignoceric acid, cerotic acid, heptacosane acid, montanoic acid, melissic acid, lacseric acid, and the like; and unsaturated fatty acids such as undecylenic acid, oleic acid, sorbic acid, linoleic acid, linolenic acid, arachidonic acid, and the like. These may be further substituted.

Preferred examples of the alicyclic monocarboxylic acid include cyclopentanecarboxylic acid, cyclohexanecarboxylic acid, cyclooctanecarboxylic acid, and derivatives thereof.

Preferred examples of the aromatic monocarboxylic acid include benzoic acid; those in which an alkyl group is introduced into the benzene ring of benzoic acid, such as toluic acid; aromatic monocarboxylic acids having two or more benzene rings, such as biphenylcarboxylic acid, naphthalene carboxylic acid, tetralincarboxylic acid and the like, and derivatives thereof. Particularly, benzoic acid is preferred.

The carboxylic acid for the polyhydric alcohol ester of the invention may be used alone or as a mixture of two or more species. In addition, all of the OH groups in the polyhydric alcohol may be esterified, or a portion of the OH groups may be remained intact. Preferably, the polyhydric alcohol ester preferably contains 3 or more of aromatic rings or cycloalkyl rings in the molecule.

For the polyhydric alcohol ester compound, the following compounds can be listed as examples. But, the invention is not limited to these.

I-1

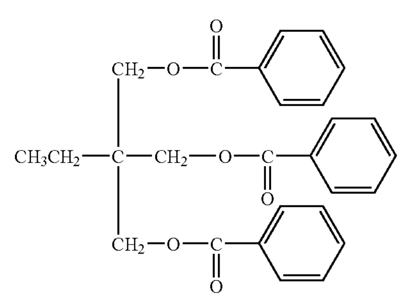

I-2

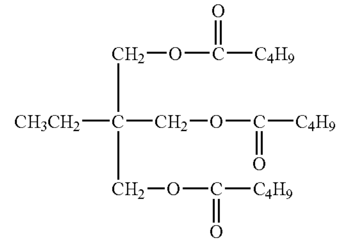

-continued

I-3

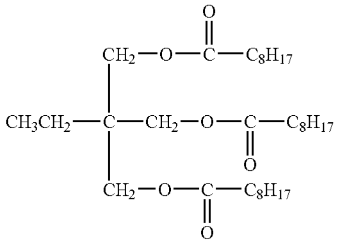

I-4

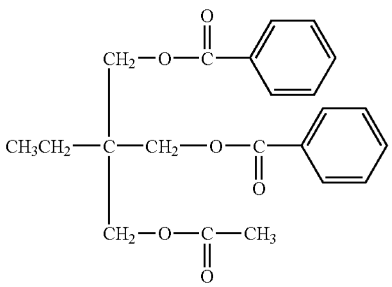

I-5

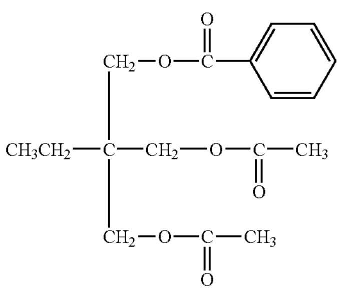

I-6

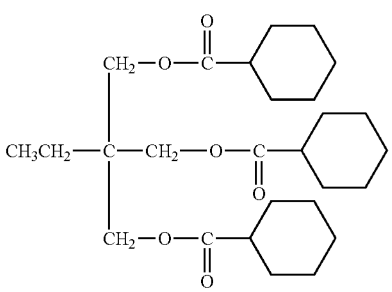

I-7

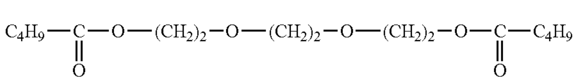

I-8

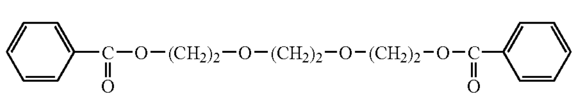

I-9

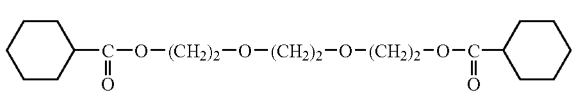

I-10

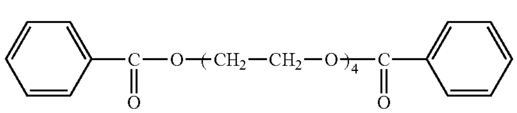

(Carboxylic Acid Ester Compound)

For the carboxylic acid ester compound, the following compounds may be listed as examples, but the invention is not limited to these. Specifically, examples of the carboxylic acid ester compound include phthalic acid esters, citric acid esters, and the like. Examples of the phthalic acid esters include dimethyl phthalate, diethyl phthalate, dicyclohexyl phthalate, dioctyl phthalate, diethylhexyl phthalate, and the like. Examples of the citric acid esters include acetyl triethyl citrate and acetyl tributyl citrate. In addition to these, butyl oleate, methylacetyl ricinolate, dibutyl sebacate, triacetin, trimethylolpropane tribenzoate, and the like may also be mentioned. Alkylphthalylalkyl glycolate is also favorably used for this purpose. The alkyl of alkylphthalylalkyl glycolate is an alkyl group of 1 to 8 carbon atoms. Examples of the alkylphthalylalkyl glycolate include methylphthalylmethyl glycolate, ethylphthalylethyl glycolate, propylphthalylpropyl glycolate, butylphthalylbutyl glycolate, octylphthalyloctyl glycolate, methylphthalylethyl glycolate, ethylphthalylmethyl glycolate, ethylphthalylpropyl glycolate, propylphthalylethyl glycolate, methylphthalylpropyl glycolate, methylphthalylbutyl glycolate, ethylphthalylbutyl glycolate, butylphthalylmethyl glycolate, butylphthalylethyl glycolate, propylphthalylbutyl glycolate, butylphthalylpropyl glycolate, methylphthalyloctyl glycolate, ethylphthalyloctyl glycolate, octylphthalylmethyl glycolate, octylphthalylethyl glycolate, and the like. Methylphthalylmethyl glycolate, ethylphthalylethyl glycolate, propylphthalylpropyl glycolate, butylphthalylbutyl glycolate and octylphthalyloctyl glycolate are preferably used, and ethylphthalylethyl glycolate is particularly preferably used. Furthermore, these alkylphthalylalkyl glycolates may be used as a mixture of two or more species.

For the carboxylic acid ester compound, the following compounds can be listed as examples, but the invention is not limited to these.

J-1

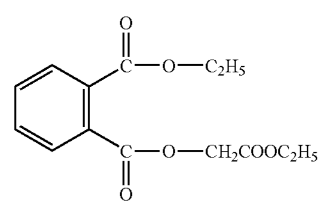

J-2

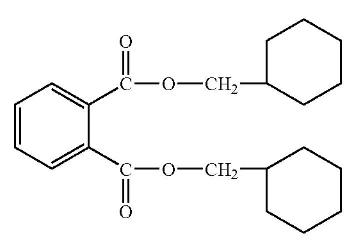

J-3

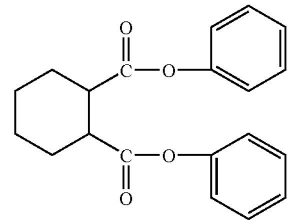

-continued

J-4

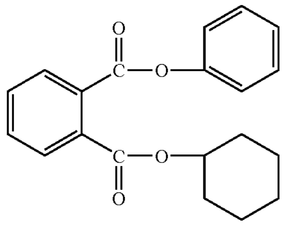

J-5

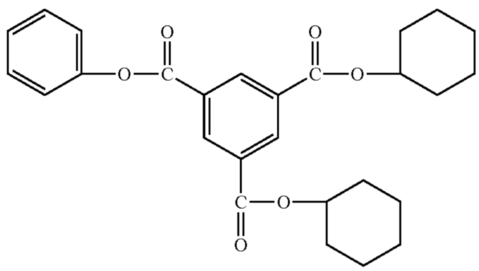

J-6

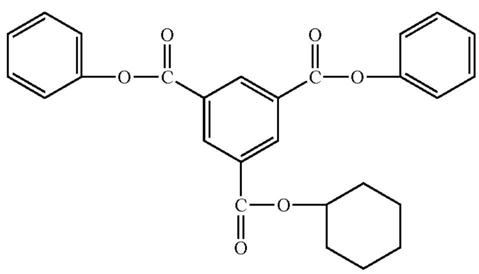

J-7

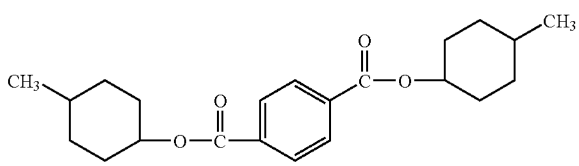

J-8

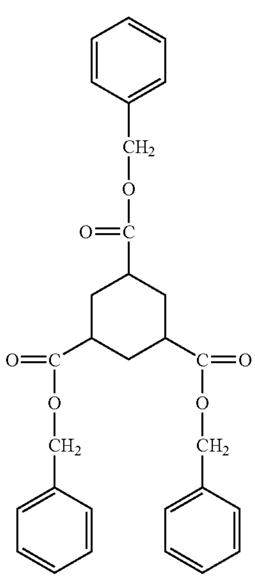

-continued

J-9

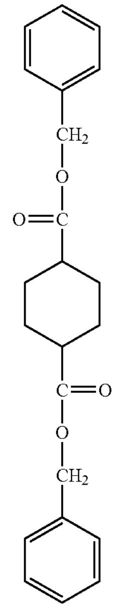

(Polycylic Carboxylic Acid Compound)

The polycyclic carboxylic acid compound used for the invention is preferably a compound having a molecular weight of 3000 or less, and particularly preferably a compound having a molecular weight of 250 to 2000. With regard to the cyclic structure, the size of the ring is not particularly limited, but the ring preferably consists of 3 to 8 atoms, and particularly preferably the ring is a 6-membered ring and/or a 5-membered ring. The ring may contain carbon, oxygen, nitrogen, silicon or other atoms, and part of the bonds in the ring may be unsaturated bonds. For example, the 6-membered ring may be a benzene ring or a cyclohexane ring. The compound of the invention may contain a plurality of such cyclic structures; for example, the compound may have any of a benzene ring and a cyclohexane ring within the molecule, or may have two cyclohexane rings, or may be a derivative of naphthalene or a derivative of anthracene or the like. More preferably, the compound is preferably a compound containing three or more of such cyclic groups within the molecule. It is also preferable that at least one bond in the cyclic structure does not involve unsaturated bonding. Specifically, typical examples are abietic acid derivatives such as abietic acid, dehydroabietic acid, parastric acid and the like. The chemical formulas of these compounds will be shown below, but the invention is not limited to these.

K-1

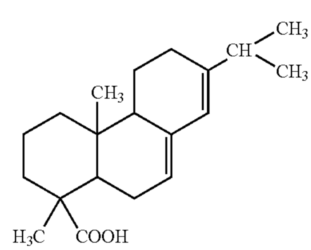

-continued

K-2

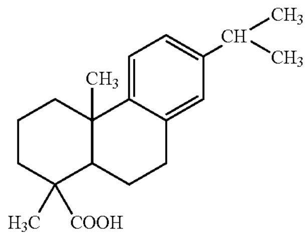

K-3

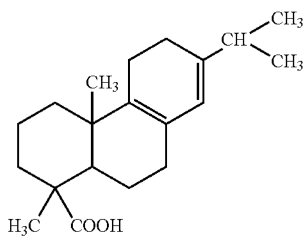

K-4

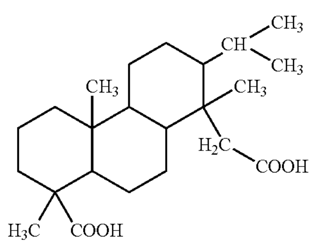

-continued

K-5

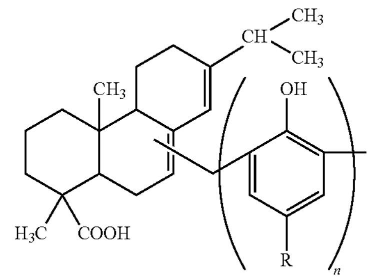

In K-5, R represents a hydrogen atom, a substituted or unsubstituted aliphatic group, or a substituted or unsubstituted aromatic group, with an aliphatic group being preferred. The aliphatic group may be straight-chained, branched or cyclic, and is more preferably cyclic. In addition, n may be an integer of 1 or greater. It is preferable that $1 \leqq n \leqq 20$, and more preferable that $1 \leqq n \leqq 10$.

(Bisphenol Derivative)

The bisphenol derivative used in the invention preferably has a molecular weight of 10,000 or less, and within this range, the derivative may be a monomer, an oligomer or a polymer. The derivative may also be a copolymer with other polymers, or may be modified with reactive substituents at the ends. The chemical formulas of these compounds will be shown below, but the invention is not limited to these.

L-1

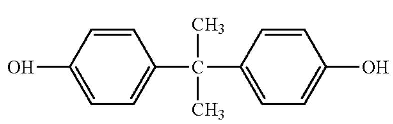

L-2

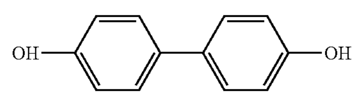

L-3

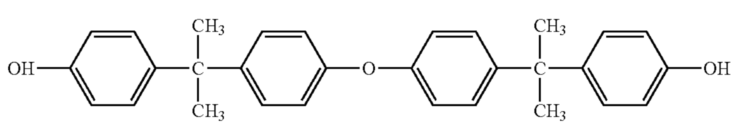

L-4

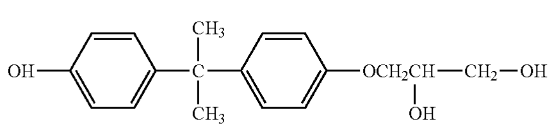

L-5

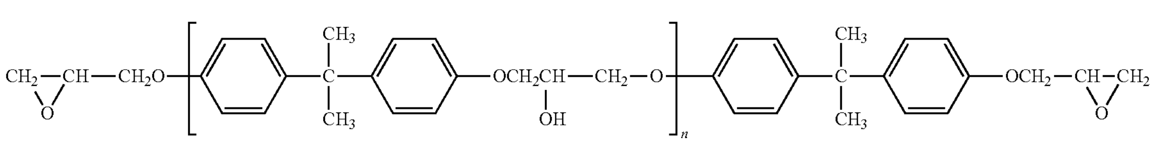

-continued

L-6

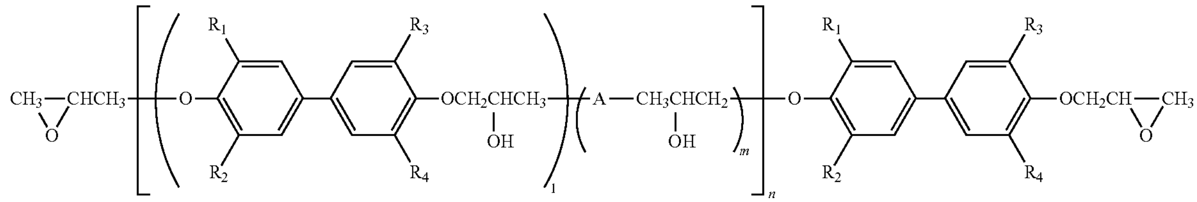

In addition, among the specific examples of the bisphenol derivative, $R^1$ to $R^4$ each represent a hydrogen atom, or an alkyl group having 1 to 10 carbon atoms. l, m and n represent repeated units, and are each preferably an integer from 1 to 100, and more preferably an integer from 1 to 20, although the invention is not limited. The amount of mixing of the polyhydric ester compound, carboxylic acid ester compound, polycyclic carboxylic acid compound, and bisphenol derivative, respectively having a log P value of 0 to 10, is preferably 0.1 to 30 parts by mass, and more preferably 1 to 20 parts by mass, relative to 100 parts by mass of the cellulose derivative.

[Other Additives]

The cellulose derivative film of the invention can be prepared by adding various additives (for example, a chromatic dispersion controlling agent, an ultraviolet preventing agent, a plasticizer, an anti-deterioration agent, matting agent microparticles, an optical properties adjusting agent, etc.) to the cellulose derivative film, in correspondence to the uses in the respective preparation processes, and thus, the additives will be illustrated in the following. The time for addition may be any time during the process for dope preparation, and a process for preparing by adding the additives at the end of the process for dope preparation may also be used.

(Chromatic Dispersion Controlling Agent)

For the cellulose derivative film of the invention, a compound having the maximal spectroscopic absorption at 250 nm to 400 nm can be used as the chromatic dispersion controlling agent.

λmax of the chromatic dispersion controlling agent is more preferably from 270 nm to 360 nm. Furthermore, the absorbance at 400 nm is preferably 0.20 or less, and more preferably 0.10 or less.

When a chromatic dispersion controlling agent having the absorption characteristics described above is used, a film having high optical isotropy over the entire visible light region, with no coloration, can be obtained.

The chromatic dispersion controlling agent may also function as an ultraviolet absorbent.

For the chromatic dispersion controlling agent, it is particularly preferable to use a compound represented by the following Formulas (III) to (VII).

Formula (III)

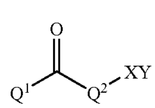

Wherein Q1 and Q2 each independently represent an aromatic ring; X represents a substituent, Y represents an oxygen atom, a sulfur atom or a nitrogen atom; and XY may be a hydrogen atom.

Formula (IV)

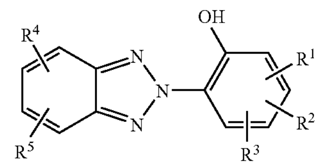

Wherein, $R^1$, $R^2$, $R^3$, $R^4$ and $R^5$ are each independently a monovalent organic group; and at least one of $R^1$, $R^2$ and $R^3$ is an unsubstituted branched or straight-chained alkyl group having 10 to 20 carbon atoms in total.

Formula (V)

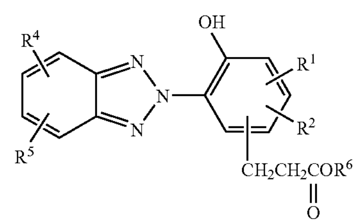

Wherein $R^1$, $R^2$, $R^4$ and $R^5$ are each independently a monovalent organic group; and $R^6$ is a branched alkyl group.

Also, as described in JP-A No. 2003-315549, the compound represents by Formula (VI) can also be favorably used.

Formula (VI)

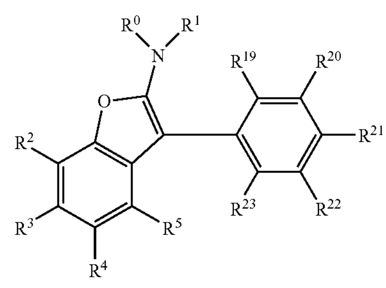

Wherein $R^0$ and $R^1$ each independently represent a hydrogen atom, an alkyl group having 1 to 25 carbon atoms, a phenylalkyl group having 7 to 9 carbon atoms, a phenyl group which is either unsubstituted or substituted with an alkyl group having 1 to 4 carbon atoms, a substituted or unsubstituted oxycarbonyl group, or a substituted or unsubstituted aminocarbonyl group; and $R^2$ to $R^5$ and $R^{19}$ to $R^{23}$ each independently represent a hydrogen atom, or a substituted or unsubstituted alkyl group having 2 to 20 carbon atoms.

Furthermore, for example, an oxybenzophenone compound, a benzotriazole compound, a salicylic acid ester compound, a cyanoacrylate compound, a nickel complex salt compound or the like can also be used as the chromatic dispersion controlling agent.

For the compound represented by Formula (III), for example, benzophenone compounds may be mentioned.

Furthermore, specific examples of the benzotriazole compound will be listed as follows, but the benzotriazole compounds that can be used for the invention are not limited to these.

2-(2'-Hydroxy-5'-methylphenyl)benzotriazole, 2-(2'-hydroxy-3',5'-di-tert-butylphenyl)benzotriazole, 2-(2'-hydroxy-3'-tert-butyl-5'-methylphenyl)benzotriazole, 2-(2'-hydroxy-3',5'-di-tert-butylphenyl)-5-chlorobenzotriazole, 2-(2'-hydroxy-3'-(3",4",5",6"-tetrahydrophthalimidemethyl)-5'-methylphenyl)benzotriazole, 2,2-methylenebis(4-(1,1,3,3-tetramethylbutyl)-6-(2H-benzotriazole-2-yl)phenol), 2-(2'-hydroxy-3'-tert-butyl-5'-methylphenyl)-5-chlorobenzotriazole, 2,4-dihyroxybenzophenone, 2,2'-dihydroxy-4-methoxybenzophenone, 2-hydroxy-4-methoxy-5-sulfobenzophenone, bis(2-methoxy-4-hydroxy-5-benzoylphenylmethane), (2,4-bis-(n-octylthio)-6-(4-hydroxy-3,5-di-tert-butylanilino)-1,3,5-triazine, 2-(2'-hydroxy-3',5'-di-tert-butylphenyl)-5-chlorobenzotriazole, 2-(2'-hydroxy-3',5'-di-tert-amylphenyl)-5-chlorobenzotriazole, 2,6-di-tert-butyl-p-cresol, pentaerythrityltetrakis[3-(3,5-di-tert-butyl-4-hydroxyphenyl)propionate], triethylene glycol-bis[3-(3-tert-butyl-5-methyl-4-hydroxyphenyl) propionate], 1,6-hexanediol-bis[3-(3,5-di-tert-butyl-4-hydroxyphenyl)propionate], 2,4-bis-(n-octylthio)-6-(4-hydroxy-3,5-di-tert-butylanilino)-1,3,5-triazine, 2,2-thio-diethylenebis[3-(3,5-di-tert-butyl-4-hydroxyphenyl) propionate], octadecyl-3-(3,5-di-tert-butyl-4-hydroxyphenyl)propionate, N,N'-hexamethylenebis(3,5-di-tert-butyl-4-hydroxy-hydrocinnamide), 1,3,5-trimethyl-2,4,6-tris(3,5-di-tert-butyl-4-hydroxybenzyl)benzene, tris-(3,5-di-tert-butyl-4-hydroxybenzyl)-isocyanurate and the like may be mentioned. In particular, (2,4-bis-(n-octylthio)-6-(4-hydroxy-3,5-di-tert-butylanilino)-1,3,5-triazine, 2(2'-hydroxy-3',5'-di-tert-butylphenyl)-5-chlorobenzotriazole, (2(2'-hydroxy-3',5'-di-tert-amylphenyl)-5-chlorobenzotriazole, 2,6-di-tert-butyl-p-cresol, pentaerythrityltetrakis[3-(3,5-di-tert-butyl-4-hydroxyphenyl)propionate], and triethylene glycol-bis[3-(3-tert-butyl-5-methyl-4-hydroxyphenyl)propionate] are preferred. Also, for example, hydrazine metal deactivators such as N,N'-bis[3-(3,5-di-tert-butyl-4-hydroxyphenyl)propionyl]hydrazine and the like, and phosphorus processing stabilizers such as tris(2,4-di-tert-butylphenyl) phosphate and the like may be used in combination. The amount of these compounds to be added is preferably 1 ppm to 1.0%, and more preferably 10 to 1000 ppm, as a weight ratio to the cellulose derivative.

Q1-Q2-OH    Formula (VII)

Wherein Q1 represents a 1,3,5-triazine ring; and Q2 represents an aromatic ring.

A more preferred example of the chromatic dispersion controlling agent represented by Formula (VII) is a compound represented by the following Formula (VII-A).

Formula (VII-A)

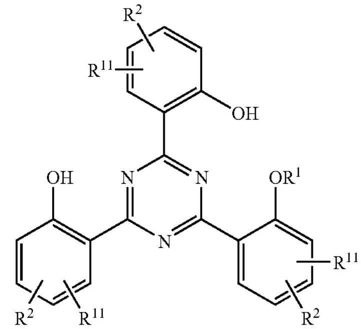

In Formula (VII-A), more preferably, $R^1$ represents an alkyl group having 1 to 18 carbon atoms; a cycloalkyl group having 5 to 12 carbon atoms; an alkenyl group having 3 to 18 carbon atoms; a phenyl group; an alkyl group having 1 to 18 carbon atoms, substituted with a phenyl group, OH, an alkoxy group having 1 to 18 carbon atoms, a cycloalkoxy group having 5 to 12 carbon atoms, an alkenyloxy group having 3 to 18 carbon atoms, a halogen atom, —COOH, —COOR$^4$, —O—CO—R$^5$, —O—CO—O—R$^6$, —CO—NH2, —CO—NHR$^7$, —CO—N(R$^7$)(R$^8$), CN, NH2, NHR$^7$, —N(R$^7$)(R$^8$), —NH—CO—R$^5$, a phenoxy group, a phenoxy group substituted with an alkyl group having 1 to 18 carbon atoms, a phenyl-alkoxy group with 1 to 4 carbon atoms in the alkoxy moiety, a bicycloalkoxy group having 6 to 15 carbon atoms, a bicycloalkylalkoxy group having 6 to 15 carbon atoms, a bicycloalkenylalkoxy group having 6 to 15 carbon atoms, or a tricycloalkoxy group having 6 to 15 carbon atoms; a cycloalkyl group having 5 to 12 carbon atoms, substituted with OH, an alkyl group having 1 to 4 carbon atoms, an alkenyl group having 2 to 6 carbon atoms, or —O—CO—R$^5$; a glycidyl group; —CO—R$^9$; or —SO2-R$^{10}$; or $R^1$ represents an alkyl group having 3 to 50 carbon atoms, interrupted by one or more oxygen atoms and/or substituted with OH, a phenoxy group or an alkylphenoxy group having 7 to 18 carbon atoms; or $R^1$ represents one of definitions represented by -A; —CH2-CH(XA)-CH2-O—R$^{12}$; —CR$^{13}$R'$^{13}$—(CH2) m-X-A; —CH2-CH(OA)-R$^{14}$; —CH2-CH(OH)—CH2-XA;

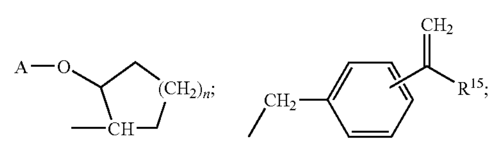

—CR$^{15}$R'15-C(═CH2)-R"15; —CR$^{13}$R'13-(CH2)m-CO—X-A; —CR$^{13}$R'13-(CH2)m-CO—O—CR$^{15}$R'15-C(═CH2)-R"15 and —CO—O—CR$^{15}$R'15-C(═CH2)-R'15 (wherein A represents —CO—CR$^{16}$═CH—RR$^{17}$); groups $R^2$ each independently represent an alkyl group having 6 to 18 carbon atoms; an alkenyl group having 2 to 6 carbon atoms; a phenyl group; a phenylalkyl group having 7 to 11 carbon atoms; COOR$^4$; CN; —NH—CO—R$^5$; a halogen atom; a trifluoromethyl group; or —O—R$^3$; $R^3$ represents the definitions given for $R^1$; $R^4$ represents an alkyl group having 1 to 18 carbon atoms; an alkenyl group having 3 to 18 carbon atoms; a phenyl group; a phenylalkyl group having 7 to 11 carbon atoms; or a cycloalkyl group having 5 to 12 carbon atoms; or $R^4$ represents an alkyl group having 3 to 50 carbon atoms, which is interrupted by one or more of —O—, —NH—, —NR$^7$— or —S—, and may be substituted with OH, a phenoxy group or an alkylphenoxy group having 7 to 18 carbon atoms; $R^5$ represents H; an alkyl group having 1 to 18 carbon atoms; an alkenyl group having 2 to 18 carbon atoms; a cycloalkyl group having 5 to 12 carbon atoms; a phenyl group; a phenylalkyl group having 7 to 11 carbon atoms; a bicycloalkyl group having. 6 to 15 carbon atoms; a bicycloalkenyl group having 6 to 15 carbon atoms; or a tricycloalkyl group having 6 to 15 carbon atoms; $R^6$ represents H; an alkyl group having 1 to 18 carbon atoms, an alkenyl group having 3 to 18 carbon atoms; a phenyl group; a phenylalkyl group having 7 to 11 carbon atoms; or a cycloalkyl group having 5 to 12 carbon atoms; $R^7$ and $R^8$ each independently an alkyl group having 1 to 12 carbon atoms; an alkoxyalkyl group having 3 to 12 carbon atoms; a dialkylaminoalkyl group having 4 to 16 carbon atoms; or a cycloalkyl group having 5 to 12 carbon atoms; or $R^7$ and $R^8$ together represent an alkylene group having 3 to 9 carbon atoms; an oxyalkylene group having 3 to 9 carbon atoms; or an azaalkylene group having 3 to 9 carbon atoms; $R^9$ represents an alkyl group having 1 to 18 carbon atoms; an alkenyl group having 2 to 18 carbon atoms; a phenyl group; a cycloalkyl group having 5 to 12 carbon atoms; a phenylalkyl group having 7 to 11 carbon atoms; a bicycloalkyl group having 6 to 15 carbon atoms; a bicycloalkylalkyl group having 6 to 15 carbon atoms; a bicycloalkenyl group having 6 to 15 carbon atoms; or a tricycloalkyl group having 6 to 15 carbon atoms; $R^{10}$ represents an alkyl group having 1 to 12 carbon atoms; a phenyl group; a naphthyl group; or an alkylphenyl group having 7 to 14 carbon atoms; groups $R^{11}$ each independently represent H; an alkyl group having 1 to 18 carbon atoms; an alkenyl group having 3 to 6 carbon atoms; a phenyl group; a phenylalkyl group having 7 to 11 carbon atoms; a halogen atom; or an alkoxy group having 1 to 18 carbon atoms; $R^{12}$ represents an alkyl group having 1 to 18 carbon atoms; an alkenyl group having 3 to 18 carbon atoms; a phenyl group; a phenyl group substituted with one to three of an alkyl group having 1 to 8 carbon atoms, an alkoxy group having 1 to 8 carbon atoms, an alkenoxy group having 3 to 8 carbon atoms, a halogen atom or a trifluoromethyl group; or a phenylalkyl group having 7 to 11 carbon atoms; a cycloalkyl group having 5 to 12 carbon atoms; a tricycloalkyl group having 6 to 15 carbon atoms; a bicycloalkyl group having 6 to 15 carbon atoms; a bicycloalkylalkyl group having 6 to 15 carbon atoms; a bicycloalkenylalkyl group having 6 to 15 carbon atoms; or —CO—$R^5$; or $R^{12}$ represents an alkyl group having 3 to 50 carbon atoms, which is interrupted by one or more of —O—, —NH—, —$NR^7$— or —S—, and may be substituted with OH, a phenoxy group or an alkylphenoxy group having 7 to 18 carbon atoms; $R^{13}$ and R'13 each independently represent H, an alkyl group having 1 to 18 carbon atoms; or a phenyl group; $R^{14}$ represents an alkyl group having 1 to 18 carbon atoms; an alkoxyalkyl group having 3 to 12 carbon atoms; a phenyl group; a phenyl-alkyl group with the alkyl moiety having 1 to 4 carbon atoms; $R^{15}$, $R'^{15}$ and $R''^{15}$ each independently represent H or CH3; $R^{16}$ represents H; —CH2-COO—$R^4$; an alkyl group having 1 to 17 carbon atoms; or CN; $R^{17}$ represents H; —$COOR^4$; an alkyl group having 1 to 17 carbon atoms; or a phenyl group; X represents —NH—; —$NR^7$—; —O—; —NH—(CH2)p-NH—; or —O—(CH2)q-NH—; index m represents a number from 0 to 19; n represents a number from 1 to 8; p represents a number 0 to 4; and q represents a number from 2 to 4; with the proviso that in Formula (VII-A), at least one of $R^1$, $R^2$ and $R^{11}$ contains two or more carbon atoms.

The compound represented by Formula (VII-A) will be further illustrated.

The groups $R^1$ to $R^{10}$, $R^{12}$ to $R^{14}$, $R^{16}$ and $R^{17}$ as alkyl groups are branch groups or branched alkyl groups, and examples thereof include a methyl group, an ethyl group, a propyl group, an isopropyl group, an n-butyl group, a secondary butyl group, an isobutyl group, a tertiary butyl group, a 2-ethylbutyl group, an n-pentyl group, an isopentyl group, a 1-methylpentyl group, a 1,3-dimethylbutyl group, an n-hexyl group, a 1-methylhexyl group, a n-heptyl group, an isoheptyl group, a 1,1,3,3-tetramethylbutyl group, a 1-methylheptyl group, a 3-methylheptyl group, an n-octyl group, a 2-ethylhexyl group, a 1,1,3-trimethylhexyl group, a 1,1,3,3-tetramethylpentyl group, a nonyl group, a decyl group, an undecyl group, a 1-methylundecyl group, a dodecyl group, a 1,1,3,3,5,5-hexamethylhexyl group, a tridecyl group, a tetradecyl group, a pentadecyl group, a hexadecyl group, a heptadecyl group, or an octadecyl group.

$R^1$, $R^3$ to $R^9$ and $R^{12}$ as cycloalkyl groups respectively having 5 to 12 carbon atoms are, for example, each a cyclopentyl group, a cyclohexyl group, a cycloheptyl group, a cyclooctyl group, a cyclononyl group, a cyclodecyl group, a cycloundecyl group, or a cyclododecyl group. Preferred are a cyclopentyl group, a cyclohexyl group, a cyclooctyl group and a cyclododecyl group.

$R^6$, $R^9$, $R^{11}$ and $R^{12}$ as alkenyl groups are in particular each an allyl group, an isopropenyl group, a 2-butenyl group, a 3-butenyl group, an isobutenyl group, an n-penta-2,4-diethyl group, a 3-methylbut-2-enyl group, an n-oct-2-enyl group, an n-dodec-2-enyl group, an isododecenyl group, an n-dodec-2-enyl group, and an n-octadec-4-enyl group.

The substituted alkyl group, cycloalkyl group or phenyl group has 1 or 2 or more substituents, and may have a substituent on the carbon atom forming a bond (on the α-position) or on other carbon atoms. In case that the substituent is bonded to a heteroatom (for example, an alkoxy group), the bonding position of the substituent is preferably the α-position, and the substituted alkyl group preferably has 2 or more carbon atoms, and more preferably 3 or more carbon atoms. Two or more substituents are preferably bonded to different carbon atoms.

The alkyl group interrupted by —O—, —NH—, —$NR^7$— or —S— may be interrupted by one or more of these groups, in each case, generally one such group being inserted in one bond, and hetero-hetero bonding such as O—O, S—S, NH—NH and the like not being formed. In case that the interrupted alkyl group is further substituted, the substituent is in general not on the α-position to the heteroatom. In case that two or more of such group interrupted by —O—, —NH—, —$NR^7$— or —S— are formed within one group, the groups are generally identical.

The aryl group is in general an aromatic hydrocarbon group, for example, a phenyl group, a biphenyl group, or a naphthyl group, with a phenyl group and a biphenyl group being preferred. The aralkyl group is in general an alkyl group substituted with an aryl group, especially a phenyl group. Thus, aralkyl groups having 7 to 20 carbon atoms include, for example, a benzyl group, an α-methylbenzyl group, a phenylethyl group, a phenylpropyl group, a phenylbutyl group, a phenylpentyl group and a phenylhexyl group; and a phenylalkyl group having 7 to 11 carbon atoms is preferably a benzyl group, an α-methylbenzyl group, or an α,α-dimethylbenzyl group.

The alkylphenyl group and the alkylphenoxy group are respectively a phenyl group and a phenoxy group substituted with an alkyl group.

The halogen atom serving as a halogen substituent is a fluorine atom, a chlorine atom, a bromine atom or an iodine atom, with a fluorine atom or a chlorine atom being more preferred, and a chlorine atom being particularly preferred.

The alkylene group having 1 to 20 carbon atoms is, for example, a methylene group, an ethylene group, a propylene group, a butylene group, a pentylene group, a hexylene group or the like. Herein, the alkyl chain may be branched, such as in an isopropylene group.

The cycloalkenyl group having 4 to 12 carbon atoms is, for example, a 2-cyclobuten-2-yl group, a 2-cyclopenten-2-yl group, a 2,4-cyclopentadien-2-yl group, a 2-cyclohexen-1-yl group, a 2-cyclohepten-1-yl group, or a 2-cycloocten-1-yl group.

The bicycloalkyl group having 6 to 15 carbon atoms is, for example, a bornyl group, a norbornyl group, or a [2.2.2] bicyclooctyl group. A bornyl group and a norbornyl group, particularly a bornyl group and a norborn-2-yl group are preferred.

The bicycloalkoxy group having 6 to 15 carbon atoms is, for example, a bornyloxy group or a norborn-2-yloxy group.

The bicycloalkyl-alkyl or -alkoxy group having 6 to 15 carbon atoms is an alkyl group or alkoxy group substituted with a bicycloalkyl group, with the total number of carbon atoms being 6 to 15. Specific examples thereof include a norbornan-2-methyl group and a norbornyl-2-methoxy group.

The bicycloalkenyl group having 6 to 15 carbon atoms is, for example, a norbornenyl group, or a norbornadienyl group. Preferred is a norbornenyl group, particularly a norborn-5-enyl group.

The bicycloalkenylalkoxy group having 6 to 15 carbon atoms is an alkoxy group having a bicycloalkenyl group, with the total number of carbon atoms being 6 to 15, for example, a norborn-5-ene-2-methoxy group.

The tricycloalkyl group having 6 to 15 carbon atoms is, for example, a 1-adamantyl group or a 2-adamantyl group. Preferred is a 1-adamantyl group.

The tricycloalkoxy group having 6 to 15 carbon atoms is, for example, an adamantyloxy group. The heteroaryl group having 3 to 12 carbon atoms is preferably a pyridinyl group, a pyrimidinyl group, a triazinyl group, a pyrrolyl group, a furanyl group, a thiophenyl group or a quinolinyl group.

The compound represented by Formula (VII-A) is more preferably such that $R^1$ represents an alkyl group having 1 to 18 carbon atom; a cycloalkyl group having 5 to 12 carbon atoms; an alkenyl group having 3 to 12 carbon atoms; a phenyl group; an alkyl group having 1 to 18 carbon atoms, substituted with a phenyl group, OH, an alkoxy group having 1 to 18 carbon atoms, a cycloalkoxy group having 5 to 12 carbon atoms, an alkenyloxy group, having 3 to 18 carbon atoms, a halogen atom, —COOH, —COOR$^4$, —O—CO—R$^5$, —O—CO—O—R$^6$, —CO—NH2, —CO—NHR$^7$, —CO—N(R$^7$)(R$^8$), CN, NH2, NHR$^7$, —N(R$^7$)(R$^8$), —NH—CO—R$^5$, a phenoxy group, a phenoxy group substituted with an alkyl group having 1 to 18 carbon atoms, a phenyl-alkoxy group with the alkoxy moiety having 1 to 4 carbon atoms, a bornyloxy group, norborn-2-yloxy group, a norbornyl-2-methoxy group, a norborn-5-ene-2-methoxy group, or an adamantyloxy group; a cycloalkyl group having 5 to 12 carbon atoms, substituted with OH, an alkyl group having 1 to 4 carbon atom, an alkenyl group having 2 to 6 carbon atoms, and/or —O—CO—R$^5$; a glycidyl group; —CO—R$^9$, or —SO2-R$^{10}$; or $R^1$ represents one of definitions represented by -A; —CH2-CH(XA)-CH2-O—R$^{12}$; —CR$^{13}$R'13-(CH2) m-X-A; —CH2-CH(OA)-R$^{14}$; —CH2-CH(OH)—CH2-XA;

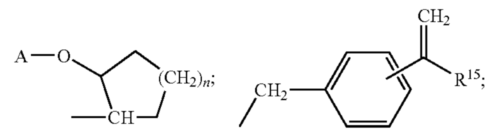

—CR$^{15}$R"$^{15}$—C(═CH2)-R"$^{15}$; —CR$^{13}$R'13-(CH2)m-CO—X-A; —CR$^{13}$R'13-(CH2)m-CO—O—CR15R'15-C(═CH2)-R"15, and —CO—O—CR$^{15}$R'$^{15}$—C(═CH2)-R"$^{15}$ (wherein A represents —CO—CR$^{16}$═CH—R$^{17}$); groups $R^2$ each represent an alkyl group having 6 to 18 carbon atoms; an alkenyl group having 2 to 6 carbon atoms; a phenyl group; —O—R$^3$ or —NH—CO—R$^5$; and groups $R^3$ each independently represent the definitions given for $R^1$; $R^4$ represents an alkyl group having 1 to 18 carbon atoms; an alkenyl group having 3 to 18 carbon atoms; a phenyl group; a phenylalkyl group having 7 to 11 carbon atoms; or a cycloalkyl group having 5 to 12 carbon atoms; or $R^4$ represents an alkyl group having 3 to 50 carbon atoms, which is interrupted by one or more of —O—, —NH—, —NR$^7$— or —S—, and may be substituted with OH, a phenoxy group or an alkylphenoxy group having 7 to 18 carbon atoms; $R^5$ represents H; an alkyl group having 1 to 18 carbon atoms; an alkenyl group having 2 to 18 carbon atoms; a cycloalkyl group having 5 to 12 carbon atoms; a phenyl group; a phenylalkyl group having 7 to 11 carbon atoms; a norborn-2-yl group; a norborn-5-en-2-yl group; or an adamantyl group; $R^6$ represents H; an alkyl group having 1 to 18 carbon atoms; an alkenyl group having 3 to 18 carbon atoms; a phenyl group; a phenylalkyl group having 7 to 11 carbon atoms; or a cycloalkyl group having 5 to 12 carbon atoms; $R^7$ and $R^8$ each independently represent an alkyl group having 1 to 12 carbon atoms; an alkoxyalkyl group having 3 to 12 carbon atoms; a dialkylaminoalkyl group having 4 to 16 carbon atoms; or a cycloalkyl group having 5 to 12 carbon atoms; or $R^7$ and $R^8$ together represent an alkylene group having 3 to 9 carbon atoms, an oxaalkylene group having 3 to 9 carbon atoms, or an azaalkylene group having 3 to 9 carbon atoms; $R^9$ represents an alkyl group having 1 to 18 carbon atoms; an alkenyl group having 2 to 18 carbon atoms; a phenyl group; a cycloalkyl group having 5 to 12 carbon atoms; a phenylalkyl group having 7 to 11 carbon atoms; a norborn-2-yl group; a norborn-5-en-2-yl group; or an adamantyl group; $R^{10}$ represents an alkyl group having 1 to 12 carbon atoms; a phenyl group; a naphthyl group; or an alkylphenyl group having 7 to 14 carbon atoms; groups $R^{11}$ each independently represent H; an alkyl group having 1 to 18 carbon atoms; or a phenylalkyl group having 7 to 11 carbon atoms; $R^{12}$ represents an alkyl group having 1 to 18 carbon atoms; an alkenyl group having 3 to 18 carbon atoms; a phenyl group; a phenyl group substituted with one to three of an alkyl group having 1 to 8 carbon atoms, an alkoxy group having 1 to 8 carbon atoms, an alkenoxy group having 3 to 8 carbon atoms, a halogen atom or a trifluoromethyl group; or a phenylalkyl group having 7 to 11 carbon atoms; a cycloalkyl group having 5 to 12 carbon atoms; a 1-adamantyl group; a 2-adamantyl group; a norbornyl group; a norbornane-2-methyl group; or —CO—R$^5$; or $R^{12}$ represents an alkyl group having 3 to 50 carbon atoms, which is interrupted by one or more of —O—, —NH—, —NR$^7$— or —S—, and may be substituted with OH, a phenoxy group or an alkylphenoxy group having 7 to 18 carbon atoms; $R^{13}$ and R'13 each independently represent H; an alkyl group having 1 to 18 carbon atoms; or a phenyl group; $R^{14}$ represents an alkyl group having 1 to 18 carbon atoms; an alkoxyalkyl group having 3 to 12 carbon atoms; a phenyl group; or a phenyl-alkyl group with the alkyl moiety having 1 to 4 carbon atoms; $R^{15}$, $R'^{15}$ and $R''^{15}$ each independently represent H or CH3; $R^{16}$ represents H; —CH2-COO—$R^4$; an alkyl group having 1 to 4 carbon atoms; or CN; $R^{17}$ represents H; —$COOR^4$; an alkyl group having 1 to 17 carbon atoms; or a phenyl group; X represents —NH—; —$NR^7$—; —O—; —NH—(CH2)p-NH—; or —O—(CH2)q-NH—; and index m represents a number from 0 to 19; n represents a number from 1 to 8; p represents a number from 0 to 4; and q represents a number from 2 to 4.

The compounds represented by Formulas (VII) and (VII-A) can be obtained by conventionally used methods, for example according to the method disclosed in EP No. 434608 or in the publication by H. Brunetti and C. E. Luthi, Helv. Chim. Acta, 55, 1566 (1972), or a method equivalent thereto, by Friedel-Crafts addition of halotriazine to a corresponding phenol, in the same manner as for known compounds.

Next, preferred examples of the compound represented by Formulas (VII) and (VII-A) will be shown in the following, but the compounds that can be used in the invention are not limited to these specific examples.

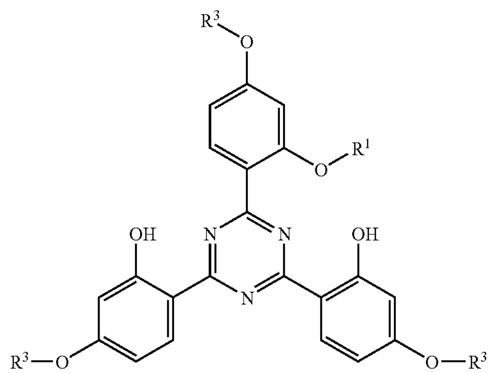

TABLE 2-5

| Compound No. | $R^3$ | $R^1$ |
|---|---|---|
| UV-1 | —$CH_2CH(OH)CH_2OC_4H_9$-n | —$CH_3$ |
| UV-2 | —$CH_2CH(OH)CH_2OC_4H_9$-n | —$C_2H_5$ |
| UV-3 | $R^3 = R^1 =$ —$CH_2CH(OH)CH_2OC_4H_9$-n | |
| UV-4 | —$CH(CH_3)$—CO—O—$C_2H_5$ | —$C_2H_5$ |
| UV-5 | $R^3 = R^1 =$ —$CH(CH_3)$—CO—$C_2H_5$ | |
| UV-6 | —$C_2H_5$ | —$C_2H_5$ |
| UV-7 | —$CH_2CH(OH)CH_2OC_4H_9$-n | —$CH(CH_3)_2$ |
| UV-8 | —$CH_2CH(OH)CH_2OC_4H_9$-n | —$CH(CH_3)$—$C_2H_5$ |
| UV-9 | $R^3 = R^1 =$ —$CH_2CH(C_2H_5)$—$C_4H_9$-n | |
| UV-10 | —$C_8H_{17}$-n | —$C_8H_{17}$-n |
| UV-11 | —$C_3H_7$-n | —$CH_3$ |
| UV-12 | —$C_3H_7$-n | —$C_2H_5$ |
| UV-13 | —$C_3H_7$-n | —$C_3H_7$-n |
| UV-14 | —$C_3H_7$-iso | —$CH_3$ |
| UV-15 | —$C_3H_7$-iso | —$C_2H_5$ |
| UV-16 | —$C_3H_7$-iso | —$C_3H_7$-iso |
| UV-17 | —$C_4H_9$-n | —$CH_3$ |
| UV-18 | —$C_4H_9$-n | —$C_2H_5$ |
| UV-19 | —$C_4H_9$-n | —$C_4H_9$-n |

TABLE 2-6

| Compound No. | $R^3$ | $R^1$ |
|---|---|---|
| UV-20 | —$CH_2CH(CH_3)_2$ | —$CH_3$ |
| UV-21 | —$CH_2CH(CH_3)_2$ | —$C_2H_5$ |
| UV-22 | —$CH_2CH(CH_3)_2$ | —$CH_2CH(CH_3)_2$ |
| UV-23 | n-hexyl | —$CH_3$ |

TABLE 2-6-continued

| Compound No. | $R^3$ | $R^1$ |
|---|---|---|
| UV-24 | n-hexyl | —$C_2H_5$ |
| UV-25 | n-hexyl | n-hexyl |
| UV-26 | —$C_7H_{15}$(-n) | —$CH_3$ |
| UV-27 | —$C_7H_{15}$(-n) | —$C_2H_5$ |
| UV-28 | —$C_7H_{15}$(-n) | —$C_7H_{15}$(-n) |
| UV-29 | —$C_8H_{17}$(-n) | —$CH_3$ |
| UV-30 | —$C_8H_{17}$(-n) | —$C_2H_5$ |
| UV-31 | —$CH_2CH_2CH(CH_3)_2$ | —$CH_2CH_2CH(CH_3)_2$ |
| UV-32 | —$C_5H_{11}$(-n) | —$C_5H_{11}$(-n) |
| UV-33 | —$C_{12}H_{25}$(-n) | —$C_{12}H_{25}$(-n) |
| UV-34 | —$C_{16}H_{37}$(n) | —$C_2H_5$ |
| UV-35 | —$CH_2$—CO—O—$C_2H_5$ | —$CH_2$—CO—O—$C_2H_5$ |

In addition to these, those photostabilizers listed in the catalogue for "Adeka Stab", an overview of additives for plastics provided by Asahi Denka Co., Ltd. can be used, the photostabilizers and ultraviolet absorbents listed in the product information for Cinubin provided by Ciba Specialty Chemicals, Inc. can also be used, and SEESORB, SEENOX, SEETEC (all trade names) and the like listed in the catalogue provided by Shipro Kasei Kaisha, Ltd. can also be used. The ultraviolent absorbents and anti-oxidants manufactured by Johoku Chemical Co., Ltd. can also be used. The VIOSORB (trade name) manufactured by Kyodo Yakuhin Co., Ltd., and the ultraviolet absorbents manufactured by Yoshitomi Yakuhin Corp. can also be used.

In addition, as described in JP-A No. 2001-187825, it is also preferable to use benzotriazole-based ultraviolet absorbing compounds having melting points of 20° C. or lower, and ultraviolet absorbing compounds having ester groups in the molecule, to use ultraviolet absorbing compounds having melting points of 20° C. or lower and ultraviolet absorbing compounds having melting points of higher than 20° C. in combination, or to use benzotriazole-based ultraviolet absorbents having partition coefficients of 9.2 or greater.

Among those, in particular, if ultraviolet absorbing compounds having melting points of 20° C. or lower, or ultraviolet absorbents having partition coefficients of 9.2 or greater are used, the effect of reducing chromatic dispersion for the Rth value is enhanced, which is preferable. The partition coefficient is more preferable to be 9.3 or greater.

According to the invention, it is also preferable to use, as the chromatic dispersion controlling agent, a compound which has a spectroscopic absorption spectrum such that, when a spectroscopic absorption spectrum is measured using a sample comprising the compound dissolved in a solvent at a concentration of 0.1 g/liter in a cell with 1 cm-long edges, in comparison with a sample comprising the solvent only, the wavelength at which the transmittance becomes 50% is in the range of 392 to 420 nm, and which has a function as an ultraviolet absorbent, and a compound which has a spectroscopic absorption spectrum such that the aforementioned wavelength is in the range of 360 to 390 nm, and which has a function as an ultraviolet absorbent.

For the cellulose derivative film of the invention, it is preferable to adjust the amount of the chromatic dispersion controlling agent to be used in accordance with the chromatic dispersion of the desired optical performance. Depending on the chromatic dispersion of the desired optical performance, the amount of the chromatic dispersion controlling agent to be used is preferably from 0.1 parts by mass to 30 parts by mass, more preferably from 0.1 parts by mass to 25 parts by mass, and still more preferably from 0.1 parts by mass to 20 parts by mass, relative to 100 parts by mass of the cellulose derivative.

Moreover, the chromatic dispersion controlling agent may be added in advance at the time of preparing a solution mixture of the cellulose derivative, or may be added at any time during the course from preparing in advance a dope of the cellulose derivative to casting. In the case of latter, to add and mix in-line a dope solution in which the cellulose derivative is dissolved in a solvent, and a solution in which the chromatic dispersion controlling agent and a small amount of the cellulose derivative are dissolved, an in-line mixer such as, for example, a static mixer (manufactured by Toray Engineering Co., Ltd.), an SWJ (a Toray static in-line mixer, Hi-Mixer) or the like is favorably used. To the chromatic dispersion controlling agent being added later, a matting agent may be added at the same time, or additives such as the retardation regulator, plasticizer, anti-deterioration agent, peeling accelerator and the like may also be added. In the case of using an in-line mixer, it is preferable to dissolve at high concentration under high pressure, and the type of the pressurizing vessel is not particularly limited, as long as the vessel can endure the predetermined pressure, and heating and stirring can be performed under high pressure. The pressurizing vessel is also appropriately equipped with measuring gauges such as a barometer, a thermometer and the like. Pressurization may be performed by injecting an inert gas such as nitrogen gas or the like, or by increasing the vapor pressure of the solvent by heating. Heating is preferably performed externally, and for example, a jacketed type of heater is easy and preferable for temperature control. The heating temperature after adding a solvent is at or above the boiling point of the solvent used, and preferably at a temperature in which the solvent does not boil; for example, it is suitable to set the temperature to the range of 30 to 150° C. Also, the pressure is adjusted so that the solvent does not boil at the set temperature. After dissolution, the dope is removed from the vessel while cooling, or the solution is extracted from the vessel by a pump or the like and then cooled by a heat exchanger or the like, and the resultant is supplied for film formation. Herein, the cooling temperature may be lowered to room temperature, but it is preferable to cool the dope to a temperature 5 to 10° C. lower than the boiling point, and to perform casting at that temperature, in view of reducing the dope viscosity.

[Microparticles of Matting Agent]

It is preferable that the cellulose derivative film of the invention contains microparticles as a matting agent. Examples of the microparticles that are used for the invention include silicon dioxide, titanium dioxide, aluminum oxide, zirconium oxide, calcium carbonate, calcium carbonate, talc, clay, calcined kaolin, calcined calcium silicate, hydrated calcium silicate, aluminum silicate, magnesium silicate and calcium phosphate. Microparticles containing silicon are preferred from the viewpoint of having low turbidity, and silicon dioxide is particularly preferred. It is preferable that microparticles of silicone dioxide have an average primary particle size of 20 nm or less, and an apparent specific gravity of 70 g/liter or more. Microparticles having a small average primary particle size such as of 5 to 16 nm are preferred, since the haze of the resulting film can be lowered thereby. The apparent specific gravity is preferably from 90 to 200 g/liter or more, and more preferably from 100 to 200 g/liter or more. A higher apparent specific gravity makes it possible to prepare a dispersion having a higher concentration, thereby favorably improving the haze and the aggregates.

These microparticles usually form secondary particles having an average particle size of 0.1 to 3.0 μm, and these microparticles exist as aggregates of primary particles in the film, providing irregularities of 0.1 to 3.0 μm on the film surface. The average secondary particle size is preferably from 0.2 μm to 1.5 μm, more preferably from 0.4 μm to 1.2 μm, and most preferably from 0.6 μm to 1.1 μm. The primary and secondary particle sizes were determined by observing a particle in the film under a scanning electron microscope, and referring the diameter of the circumcircle of the particle as the particle size. 200 particles were observed at various sites, and the mean value was taken as the average particle size.

As the microparticles of silicon dioxide, commercially available products such as, for example, AEROSIL R972, R972V, R974, R812, 200, 200V, 300, R202, OX50, TT600 (each manufactured by Nippon Aerosil Co., Ltd.), and the like can be used. As the microparticles of zirconium oxide, products marketed under the trade name of, for example, AEROSIL R976 and R811 (each manufactured by Nippon Aerosil Co., Ltd.) can be used.

Among these, AEROSIL 200V and AEROSIL R972V are particularly preferable, since they are microparticles of silicon dioxide having an average primary particle size of 20 nm or less and an apparent specific gravity of 70 g/liter or more, and they exert an effect of largely lowering the coefficient of friction while maintaining the turbidity of the optical film at a low level.

According to the invention, to obtain a cellulose derivate film having particles with a small average secondary particle size, several techniques for preparing a dispersion of microparticles may be contemplated. For example, a microparticle dispersion is prepared in advance by mixing the microparticles with a solvent while stirring, and then this microparticle dispersion is added to a small amount of a cellulose derivative solution that has been prepared separately, and dissolved therein while stirring. Then, the resulting mixture is further mixed with the main portion of the cellulose derivative solution (dope solution). This method is a preferred preparation method from the viewpoints of achieving a high dispersibility of the silicon dioxide microparticles, and causing little re-aggregation of the silicon dioxide microparticles. In addition to this, there is also a method comprising adding a small amount of a cellulose ester to a solvent, dissolving it while stirring, then adding microparticles to the resulting solution, dispersing the microparticles with a dispersing machine to obtain a microparticle additive solution, and then sufficiently mixing this microparticle additive solution with a dope solution using an in-line mixer. Although the invention is not restricted to these methods, the concentration of silicon dioxide to be achieved upon mixing and dispersing silicon dioxide microparticles in a solvent or the like is preferably 5 to 30% by mass, more preferably 10 to 25% by mass, and most preferably 15 to 20% by mass. A higher dispersion concentration is preferred, because the solution turbidity is lowered relative to the amount added, and the haze and aggregation are improved thereby. The amount of the matting agent microparticles to be contained in the final dope solution of cellulose derivative is preferably 0.01 to 1.0 g, more preferably 0.03 to 0.3 g, and most preferably 0.08 to 0.16 g, per 1 m3. The amount of the matting agent microparticles to be mixed is preferably 0.01 to 2.0 parts by mass, and more preferably 0.01 to 1.0 part by mass, relative to 100 parts by mass of the cellulose derivative.

Preferred examples of lower alcohols usable as the solvent include methyl alcohol, ethyl alcohol, propyl alcohol, isopropyl alcohol, butyl alcohol and the like. Solvents other than lower alcohols are not particularly limited, but it is preferable to use the solvents that are used in forming cellulose ester films.

[Plasticizer, Anti-deterioration Agent, Releasing Agent]

The cellulose derivative film of the invention may include, in addition to the chromatic dispersion controlling agent, various additives (for example, a plasticizer, an anti-deterioration agent, a releasing agent, an infrared absorbent, etc.), which may be solids or oily substances. That is, the melting points or boiling points are not particularly restricted. For example, a mixture of plasticizers of 20° C. or lower and of 20° C. or higher, and the like are described in JP-A No. 2001-151901 and the like. Furthermore, infrared absorbents are described, for example, in JP-A No. 2001-194522. The time of addition may be any time during the process for dope preparation, but it is preferable to add additives at the final step of the process for dope preparation. Moreover, the amount of each additive being added is not particularly limited so long as the function is exhibited, and in the case where the cellulose derivative film is formed of a multilayer, the kind or the amount of addition of the additives may be different in each layer. These are conventionally known technologies and are described in, for example, JP-A No. 2001-151902 and the like. For details thereof, those materials described in detail in Technical Report of Japan Institute of Invention and Innovation (Technical Publication No. 2001-1745, pp. 16-22, Mar. 15, 2001, published by Japan Institute of Invention and Innovation) are favorably used.

[Organic Solvent for Cellulose Derivative Solution]

According to the invention, the cellulose derivative film is preferably produced by a solvent casting method, and the film is produced using a solution (dope) prepared by dissolving the cellulose derivative in an organic solvent.

According to the invention, it is preferable for the cellulose derivative solution to contain at least two or more alcoholic solvents as the organic solvent for dissolving the cellulose derivative, for the purpose of accelerating gelation of the undried dope film that is formed by casting a cellulose derivative solution on a metal support during the casting process to be described later, improving the peelability of the film, and increasing the elastic modulus of the produced film. As the alcoholic solvent, any alcohol having 1 to 8 carbon atoms may be used. Also, it is preferable that at least one species is an alcohol having 3 to 8 carbon atoms, more preferably having 4 to 6 carbon atoms. The content of the alcohol in the solvent composition may be any amount between 0.1 and 40%, more preferably between 1.0 to 30%, and still more preferably between 2.0 and 20%. The organic solvent that is favorably used as the main solvent of the invention is preferably a solvent selected from esters, ketones and ethers, respectively having 3 to 12 carbon atoms, and halogenated hydrocarbons having 1 to 7 carbon atoms. The esters, ketones and ethers may have a cyclic structure. A compound having any two or more of functional groups of ester, ketone or ether (i.e., —O—, —CO— or —COO—) can also be used as the main solvent, and such a compound may also have other functional groups such as, for example, an alcoholic hydroxyl group. In the case of using a main solvent having functional groups of two or more species, the number of carbon atoms of such solvent is acceptable if the number is within a range defined for compounds having any functional groups. As the main solvent, chlorinated solvents or acetic acid esters are preferably used, with methylene chloride or methyl acetate being more preferred.

For the cellulose derivative film of the invention, a chlorine-based halogenated hydrocarbon may be used as the main solvent, or as described in the Technical Report of Japan Institute of Invention and Innovation, Publication No. 2001-1745, pp. 12-16, a non-chlorine-based solvent may be used as the main solvent.

In addition, the solvents for the cellulose derivative solution and film of the invention are disclosed, including the method for dissolution, in the following publications of unexamined patent applications as preferred embodiments. They are, for example, JP-A No. 2000-95876, JP-A No. 12-95877, JP-A No. 10-324774, JP-A No. 8-152514, JP-A No. 10-330538, JP-A No. 9-95538, JP-A No. 9-95557, JP-A No. 10-235664, JP-A No. 12-63534, JP-A No. 11-21379, JP-A No. 10-182853, JP-A NO. 10-278056, JP-A No. 10-279702, JP-A No. 10-323853, JP-A No. 10-237186, JP-A No. 11-60807, JP-A No. 11-152342, JP-A No. 11-292988, JP-A No. 11-60752, JP-A No. 11-60752, and the like. These publications have descriptions on not only the solvents preferred for the cellulose derivative of the invention, but also properties of solutions thereof and substances to be co-present, and thus constitute preferred embodiments for the present invention as well.

[Process for Preparing Cellulose Derivative Film]

[Dissolving Process]

In the preparation of the cellulose derivative solution (dope) of the invention, the method of dissolution is not particularly limited, and the cellulose derivative solution may be prepared at room temperature, or by a cooled dissolution method or a high temperature dissolution method, or a combination thereof. For the process for preparation of the cellulose derivative solution of the invention, and the processes for concentration and filtration of the solution associated with the dissolution process, the preparation process described in detail in the Technical Report of Japan Institute of Invention and Innovation (Technical Publication No. 2001-1745, pp. 22-25, published on Mar. 15, 2001, by Japan Institute of Invention and Innovation) is favorably used.

(Transparency of Dope Solution)

The cellulose derivative solution has a dope transparency of preferably 85% or higher, more preferably 88% or higher, and more preferably 90% or higher. It was confirmed that various additives are sufficiently dissolved in the cellulose derivative dope solution of the invention. For the specific method of calculating the dope transparency, a dope solution was injected into a glass cell having 1 cm-long edges, and the absorbance at 550 nm was measured using a spectrophotometer (UV-3150, manufactured by Shimadzu Corp.). The absorbance of the solvent was measured in advance as a blank, and the transparency of the cellulose derivative solution was calculated from the ratio of the absorbance of the solution to the absorbance of the blank.

[Casting, Drying and Winding Processes]

Next, the process for producing a film using the cellulose derivative solution of the invention will be illustrated. For the method and apparatus for producing the cellulose derivative film of the invention, the solution casting film-forming method and the solution casting film-forming apparatus conventionally provided for the preparation of the cellulose triacetate films are used. First, the dope (cellulose derivative solution) prepared in a dissolving tank (pot) is stored in a stock tank, where the dope is defoamed and finally prepared. Then, the dope is sent from a dope outlet to a pressurizable die through a pressurizable metering gear pump which can quantitatively send the dope with high precision, for example, by means of the rotation speed, and from an orifice (slit) of the pressurizable die, the dope is evenly cast on a metal support at the casting unit, which is running endlessly. At the peeling point where the metal support has completed a nearly full rotation, the insufficiently dried dope film (also referred to as web) is peeled off from the metal support. While both edges of the obtained web are fixed with clips to maintain the width, the web is conveyed by a tenter and dried, and then the continuously obtained web is mechanically conveyed to a group of rollers in a drying apparatus to complete drying, and is wound up by a winder in a predetermined length. The combination of the tenter and the rollers in the drying apparatus can be varied in accordance with the purpose. In the solution casting method used for the functional protective films, which are optical members for electronic displays, and which constitute the main application of the cellulose derivative film of the invention, a coating apparatus is often added to the solution casting film-forming apparatus, for the purpose of surface processing of the film by providing an undercoat layer, an antistatic layer, an anti-glare layer, a protective layer or the like. These processes are described in detail in the Technical Report of Japanese Institute of Invention and Innovation, pp. 25 to 30 (No. 2001-1745, published on Mar. 15, 2001, Japan Institute of Invention and Innovation), and are classified into casting (including co-casting), metal support, drying, peeling and the like, so that the processes can be favorably used for the invention.

The metal support is generally constituted such that an endless belt installed between two drums is used as the support, or such that the drum itself is used as an endless support. However, from the aspect of improving the productivity, the constitution of using the drum itself as an endless support is used, and a cellulose derivative solution containing a solvent comprising two or more species of alcohol-based solvents is used as the dope solution. Also, when the temperature of the drum is kept at an appropriate temperature to accelerate gelation of the web, thereby improving the peelability of the web from the support, consequently the productivity can be further improved.

The thickness of the cellulose derivative film to be produced is preferably 10 to 200 μm, more preferably 20 to 150 μm, and still more preferably 30 to 100 μm.

[Changes in Optical Performance of Film after High Humidity Treatment]

With respect to the changes in the optical performance of the cellulose derivative film of the invention due to environmental changes, it is preferable that the variations of Re(400), Re(700), Rth(400) and Rth(700) of a film conditioned under an environment at 60° C. and 90% RH for 240 hours are from 0 nm to 15 nm, more preferably from 0 nm to 12 nm, and still more preferably from 0 nm to 10 nm.

[Changes in Optical Performance of Film after High Temperature Treatment]

It is also preferable that the variations of Re(400), Re(700), Rth(400) and Rth(700) of a film conditioned at 80° C. for 240 hours is from 0 nm to 15 nm, more preferably from 0 nm to 12 nm, and still more preferably from 0 nm to 10 nm.

[Amount Of Volatilized Compound after Heat Treatment of Film]

For the compound having the maximum value in the range of 250 nm to 400 nm in the spectroscopic absorption spectrum, which can be favorably used in cellulose derivative film of the invention, it is preferable that the amount of the compound volatilized from a film conditioned at 80° C. for 240 hours is from 0% to 30%, more preferably from 0% to 25%, and still more preferably from 0% to 20% or below.

Furthermore, the amount of the compound volatilized from the film is evaluated as follows. A film conditioned at 80° C. for 240 hours and an unconditioned film are each dissolved in a solvent, and the compound is detected by high performance liquid chromatography. The amount of the compound remaining in the film is calculated from the peak area of the compound by the following equation.

Amount volatilized (%)={(amount of compound remaining in untreated product)−(amount of compound remaining in treated product)}/(amount of compound remaining in untreated product)×100

[Glass Transition Temperature Tg of Film]

The glass transition temperature Tg of the cellulose derivative film of the invention is preferably 80 to 165° C. From the viewpoint of thermal resistance, Tg is more preferably 100 to 160° C., and particularly preferably 110 to 150° C. The glass transition temperature Tg is calculated using a 10 mg sample of the cellulose derivative film of the invention, by measuring the amount of heat with a differential scanning calorimeter (for example, DSC2910, manufactured by T.A. Instrument), at a rate of 5° C./min for temperature raising and dropping from room temperature to 200° C.

[Haze of Film]

The haze of the cellulose derivative film of the invention is preferably 0.0 to 2.0%, more preferably 0.0 to 1.5%, and still more preferably 0.0 to 1.0%. The transparency of a film as an optical film is important. The haze is measured using a sample of the cellulose derivative film of the invention cut into the size of 40 mm×80 mm, with a hazemeter (HGM-2DP, manufactured by Suga Test Instruments Co., Ltd.) at 25° C. and 60% RH, according to JIS K-6714.

[Retardation]

According to the present specification, the Re retardation value and the Rth retardation value of the cellulose derivative film (transparent support) are calculated based on the following. Re(λ) and Rth(λ) represent the in-plane retardation and the retardation in the thickness direction, respectively, at a wavelength λ. Re(λ) is measured using KOBRA 21ADH (manufactured by Oji Scientific Instruments, Ltd.), by irradiating a light at a wavelength of λ nm incidentally to the normal direction of the film.

Rth(λ) is calculated using KOBRA 21ADH, based on the retardation values measured in three directions in total, such as the above-mentioned Re(λ), the retardation value measured by irradiating a light having a wavelength of λ nm from a direction which results from tilting the slow axis (determined by the KOBRA 21ADH) as the tilting axis (rotating axis) by +40° to the normal direction of the film, and the retardation value measured by irradiating a light having a wavelength of λ nm from a direction which results from tilting the slow axis as the tilting axis (Rotating axis) by −40° to the normal direction of the film, and an assumed value of the average refractive index, and the inputted film thickness value. Furthermore, by inputting an assumed vale of the average refractive index, 1.48, and the film thickness, the KOBRA 21ADH calculates nx, ny, nz and Rth. Also, for the retardation at a wavelength which cannot be directly measured, the retardation value was determined by curve fitting the retardation values of wavelengths in the vicinity, using Cauthy's equation.

According to the invention, the Rth(589) of the cellulose derivative film is a value which preferably satisfies the following Expression (2), more preferably satisfies the following Expression (2-1), and particularly preferably satisfies the following Expression (2-2).

$$-600\ \text{nm} \leqq Rth(589) \leqq 0\ \text{nm} \quad \text{Expression (2)}$$

$$-500\ \text{nm} \leqq Rth(589) \leqq -20\ \text{nm} \quad \text{Expression (2-1)}$$

$$-400\ \text{nm} \leqq Rth(589) \leqq -40\ \text{nm} \quad \text{Expression (2-2)}$$

Wherein Rth(λ) is the retardation in the film thickness direction at a wavelength of λ nm.

The inventors of the invention devotedly conducted investigation, and as a result, they found that when a compound having absorption in the ultraviolet region over wavelengths 250 to 400 nm is used, the resulting film does not undergo coloration, and the chromatic dispersions of Re(λ) and Rth(λ)

of the film can be controlled, and that consequently the values of the difference between Re and Rth at wavelengths of 400 nm and 700 nm, that is, (Re(400)−Re(700)) and (Rth(400)−Rth(700)), can be reduced, thereby completing the invention.

[Humidity Dependency of Re and Rth of Film]

The Re and Rth of the cellulose derivative film of the invention preferably undergo minor changes under the effect of humidity. Specifically, it is preferable that the frontal retardation Re(λ) and the retardation in the film thickness direction Rth(λ) of the film (wherein λ represents a wavelength (nm)) satisfy the following Expression (4).

$$(RthA)-(RthB)\leqq 30\text{ nm, and }(ReA)-(ReB)\leqq 10\text{ nm} \quad \text{[Expression 4]}$$

wherein (RthA) represents Rth(589) at 25° C. and 10% RH, and (RthB) represents Rth(589) at 25° C. and 80% RH; while (ReA) represents Re(589) at 25° C. and 10% RH, and (ReB) represents Re(589) at 25° C. and 80% RH.

Further, for Rth, (RthA)−(RthB) is more preferably 0 to 25 nm, and still more preferably 0 to 20 nm, and for Re, (ReA)−(ReB) is more preferably 0 to 8 nm, and still more preferably 0 to 5 nm.

[Equilibrium Moisture Content of Film]

When the cellulose derivative film of the invention is used as a protective film for polarizing plates, in order to sufficiently improve the durability of the polarizing plate under high temperature and high humidity without impairing the adhesiveness with aqueous polymers such as polyvinyl alcohol and the like, the equilibrium moisture content of the cellulose derivative film at 25° C. and 80% RH is, irrespective of the film thickness, preferably 3.0% or less, more preferably 0.1 to 3.0%, still more preferably 0.1 to 2.5%, and particularly preferably 0.1 to 2.0%. By controlling the equilibrium moisture content to the aforementioned range, the changes in the polarization performance of polarizing plates under high temperature and high humidity can be reduced.

The equilibrium moisture content can be determined by subjecting the cellulose derivative film of the invention to humidity conditioning by leaving a sample having a size of 7 mm×35 mm under the conditions of 25° C. and 80% RH for 6 hours or longer, and then subtracting the moisture content (g) obtained by measuring with a moisture meter and a sample dryer (CA-03 and VA-05, all manufactured by Mitsubishi Chemical Corp.) by the Karl Fischer's method, from the sample mass (g).

[Evaluation of Cellulose Derivative Film of the Invention]

The evaluation of the cellulose derivative film of the invention is performed by the following measurements.

(Transmittance)

The transmittance of visible light (615 nm) of a sample having a size of 20 mm×70 mm is measured at 25° C. and 60% RH using a transparency measuring instrument (AKA photoelectric tube calorimeter, KOTAKI, Ltd.).

(Surface Energy)

The surface energy of the cellulose derivative film of the invention can be measured by the following method. That is, a sample is placed horizontally on a horizontal platform, and certain amounts of water and methylene iodide are placed on the sample surface. Then, after a predetermined time, the contact angles of water and methylene iodide on the sample surface are determined. The surface energy is determined from the measured contact angles, according to Owens' method.

[In-Plane Variation in Retardations of Cellulose Derivative Film]

It is preferred that the cellulose derivative film of the invention satisfies following expressions.

$$|Re(\text{MAX})-Re(\text{MIN})|\leqq 3 \quad \text{and} \quad |Rth(\text{MAX})-Rth(\text{MIN})|\leqq 5$$

Wherein Re(MAX) and Rth(MAX) are the maximum retardation values of a film arbitrarily cut into 1 m-long sides, and Re(MIN) and Rth(MIN) are the minimum values thereof, respectively.

[Retainability of Film]

The cellulose derivative film of the invention is required to have retainability for various compounds added to the film. Specifically, when the cellulose derivative film of the invention is left to stand under the conditions of 80° C. and 90% RH for 48 hours, the change in mass of the film is preferably 0 to 5%, more preferably 0 to 3%, and still more preferably 0 to 2%.

<Evaluation of Retainability>

A sample is cut into a size of 10 cm×10 cm, and is conditioned under an atmosphere of 23° C. and 55% RH for 24 hours, and then the mass of the sample is measured. Then, the sample is left to stand under the conditions of 80±5° C. and 90±10% RH for 48 hours, and then the surface of the sample after the conditioning is lightly wiped, and left at 23° C. and 55% RH for one day, and then the mass was measured. The retention property was calculated by the following method.

$$\text{Retainability (\% by mass)}=\{(\text{mass before standing}-\text{mass after standing})/\text{mass before standing}\}\times 100$$

[Functional Layers]

The cellulose derivative film of the invention is applied to optical applications and photographic photosensitive materials. In particular, the optical application is preferably a liquid crystal display device, and it is preferable that the liquid crystal display device has a constitution comprising a liquid crystal cell formed by placing liquid crystals between two sheets of electrode substrates, two sheets of polarizing plates disposed on both sides of the liquid crystal cell, and at least one sheet of optically compensatory film (hereinafter, also referred to as optically compensatory sheet) disposed between the liquid crystal cell and the polarizing plate. Such a liquid crystal display device is preferably TN, IPS, FLC, AFLC, OCB, STN, ECB, VA and HAN mode display devices, and particularly IPS and VA mode display devices are preferred.

Herein, when the cellulose derivative film of the invention is used in the above-described optical applications, various functional layers are provided thereto. The functional layers include, for example, an antistatic layer, a curable resin layer (transparent hard coat layer), an anti-reflection layer, a reverse adhesive layer, an anti-glare layer, an optical compensation layer, an alignment layer, a liquid crystal layer, and the like. For such functional layers and materials thereof, for which the cellulose derivative film of the invention can be used, surfactants, gliding agents, matting agents, antistatic layers, hard coat layers and the like may be mentioned, which are described in detail in the Technical Report of Japan Institute of Invention and Innovation, Technology No. 2001-1745 (published on Mar. 15, 2001, Japan Institute of Invention and Innovation), pp. 32-45, and can be favorably used in the present invention.

[Applications (Polarizing Plate)]

As an application of the cellulose derivative film of the invention, protective films for polarizing plates may be mentioned in particular.

That is, the polarizing plate of the invention is a polarizing plate having a polarizing film and two sheets of transparent protective films (protective films) disposed on both sides of the polarizing film, and at least one of the transparent protective films is characterized by being an optically compensatory film produced by providing an optical anisotropic layer on the above-described cellulose derivative film or cellulose acylate derivative film of the invention.

The polarizing plate consists of a polarizing film and protective films protecting both sides of the polarizing film, and further consists of a protector film bonded on one side of the polarizing plate, and a separator film bonded on the other side of the polarizing plate. The protector film and the separator film are sued for the purpose of protective the polarizing plate upon shipping of the polarizing plate, product inspection, or the like. In this case, the protector film is bonded to the polarizing plate for the purpose of protecting the surface of the polarizing plate, and is used on the side opposite to the side where the polarizing plate is bonded to the liquid crystal cell. The separator film is used to cover the adhesive layer which is bonded to the liquid crystal cell, and thus is used on the side where the polarizing plate is bonded to the liquid crystal cell. For the protector film, the cellulose derivative film of the invention may be used.

The polarizing film is preferably a coated type polarizing film which is represented by the products of Optiva, Inc., or a polarizing film comprising a binder, and iodine or a dichromatic dye.

The iodine and the dichromatic dye in the polarizing film exhibit a polarization performance by aligning within the binder. It is preferable that the iodine and the dichromatic dye align along with the binder molecules, or the dichromatic dye aligns in one direction by the mechanism of self-assembly as in liquid crystals.

Currently, polarizing films for general uses are prepared in general by immersing a stretched polymer in a solution of iodine or a dichromatic dye in a bath, so that the iodine or the dichromatic dye penetrates into the binder. Polarizing films for general uses have the iodine or the dichromatic dye distributed to a depth of about 4 μm from the polymer surface (about 8 μm in total for both sides). Thus, to obtain sufficient polarization performance, the polarizing film needs to have a thickness of at least 10 μm. The degree of penetration can be controlled by the concentration of the solution of iodine or dichromatic dye, the temperature of the solution bath, and the immersion time.

The binder of the polarizing film may be crosslinked. For the crosslinked binder, a polymer which is capable of self-crosslinking can be used. A binder comprising a polymer having a functional group, or obtained by introducing a functional group to a polymer can be subjected to a reaction between the binder molecules induced by light, heat or pH change, thus to form a polarizing film.

Furthermore, a crosslinked structure may also be introduced to a polymer using a crosslinking agent. The crosslinked structure can be formed using a compound having high reactivity as the crosslinking agent, by introducing a binding group derived from the crosslinking agent to the binder, and allowing the binder molecules to crosslink.

Crosslinking is generally performed by applying a coating solution containing a polymer, or a mixture of a polymer and a crosslinking agent, on a transparent support, and then heating the coated support. Since it is desirable to secure durability at the final product stage, the crosslinking treatment may be performed at any stage until final polarizing plates are obtained.

As the binder of the polarizing film, both self-crosslinkable polymers and polymers crosslinked by a crosslinking agent can be all used. Examples of the polymer include polymethyl methacrylate, polyacrylic acid, polymethacrylic acid, polystyrene, gelatin, polyvinyl alcohol, modified polyvinyl alcohol, poly(N-methylol acrylamide), polyvinyltoluene, chlorosulfonated polyethylene, nitrocellulose, chlorinated polyolefins (e.g., polyvinyl chloride), polyesters, polyimide, polyvinyl acetate, polyethylene, carboxymethylcellulose, polypropylene, polycarbonates, and copolymers thereof (e.g., acrylic acid/methacrylic acid copolymer, styrene/maleimide copolymer, styrene/vinyltoluene copolymer, vinyl acetate/vinyl chloride copolymer, ethylene/vinyl acetate copolymer). Water-soluble polymers (e.g., poly(N-methylol acrylamide), carboxymethylcellulose, gelatin, and polyvinyl alcohol and modified polyvinyl alcohol) are preferred, and gelatin, polyvinyl alcohol and modified polyvinyl alcohol are more preferred, with polyvinyl alcohol and modified polyvinyl alcohol being most preferred.

The degree of saponification of polyvinyl alcohol and modified polyvinyl alcohol is preferably 70 to 100%, more preferably 80 to 100%, and most preferably 95 to 100%. The degree of polymerization of polyvinyl alcohol is preferably 100 to 5000.

Modified polyvinyl alcohol is obtained by introducing a modifying group to polyvinyl alcohol by means of copolymerization modification, chain transfer modification or block copolymerization modification. In the copolymerization modification, COONa, Si(OH)3, N(CH3)3.Cl, C9H19COO, SO3Na, or C12H25 can be introduced as the modifying group. In the chain transfer modification, COONa, SH or SC12H25 can be introduced as the modifying group. The degree of polymerization of modified polyvinyl alcohol is preferably 100 to 3000. The modified polyvinyl alcohols are disclosed in JP-A No. 8-338913, JP-A No. 9-152509 and JP-A No. 9-316127. Unmodified polyvinyl alcohol and alkylthio-modified polyvinyl alcohol having degrees of saponification of 85 to 95% are particularly preferred.

Polyvinyl alcohol and modified polyvinyl alcohol may be used in combination of two or more species.

If the crosslinking agent of the binder is added in large quantities, the resistance to moisture and heat can be improved. However, if the crosslinking agent is added in an amount of 50% by mass or more based on the binder, the alignability of iodine or the dichromatic dye is deteriorated. The amount of the crosslinking agent to be added is preferably 0.1 to 20% by mass, and more preferably 0.5 to 15% by mass, based on the binder.

The binder contains unreacted crosslinking agent to some extent even after completion of the crosslinking reaction. However, the amount of the crosslinking agent remaining in the binder is preferably 1.0% by mass or less, and more preferably 0.5% by mass or less. When the binder layer contains the crosslinking agent in an amount exceeding 1.0% by mass, there may be a problem of durability. That is, when a polarizing film having a large amount of the residual crosslinking agent is incorporated in a liquid crystal display device, and used for a long time or stored under an atmosphere of high temperature and high humidity for a long time, there may be deterioration in the degree of polarization. Descriptions on the crosslinking agent are found in U.S. Reissued Pat. No. 23297. In addition, boron compounds (e.g., boric acid, borax) can also be used as the crosslinking agent.

As the dichromatic dye, azo dyes, stilbene dyes, pyrazolone dyes, triphenylmethane dyes, quinoline dyes, oxazine dyes, thiazine dyes or anthraquinone dyes are used. The dichromatic dye is preferably water-soluble. It is preferable that the dichromatic dye has a hydrophilic substituent (e.g., sulfo, amino, hydroxyl). Examples of the dichromatic dye include C.I. Direct Yellow 12, C.I. Direct Orange 39, C.I. Direct Orange 72, C.I. Direct Red 39, C.I. Direct Red 79, C.I. Direct Red 81, C.I. Direct Red 83, C.I. Direct Red 89, C.I. Direct Violet 48, C.I. Direct Blue 67, C.I. Direct Blue 90, C.I. Direct Green 59, and C.I. Acid Red 37. Descriptions on the dichromatic dye are found in JP-A No. 1-161202, JP-A No. 1-172906, JP-A No. 1-172907, JP-A No. 1-183602, JP-A No. 1-248105, JP-A No. 1-265205, and JP-A No. 7-261024. The dichromatic dye is used in the form of free acid, or alkali metal salt, ammonium salt or amine salt. By blending two or more of dichromatic dyes, polarizing films having a variety of colors can be produced. A polarizing film using a compound (dye) which exhibits black color when the polarizing axis is orthogonal, or a polarizing film or polarizing plate comprising a blend of various dichromatic molecules to exhibit black color has excellent single plate transmittance and polarization ratio, and is preferred.

According to the invention, the single plate transmittance, parallel transmittance and cross transmittance of the polarizing plate were measured using UV3100PC (Shimadzu Corp.). The measurement was made under the conditions of 25° C. and 60% RH in the range of 380 nm to 780 nm, and for all of the single plate, parallel and cross transmittances, average values of 10 measurements were respectively used. The polarizing plate durability test was conducted as follows, using two forms of samples, such as (1) the polarizing plate only and (2) the polarizing plate adhered to glass by means of an adhesive. The measurement for the polarizing plate only was made using two orthogonally disposed, identical specimens produced by combining an optically compensatory film to be interposed between two polarizers. The sample in the form of being adhered to glass was produced by attaching a polarizing plate onto glass such that the optically compensatory film is adhered to the glass, and two of such samples (about 5 cm×5 cm) were produced. The measurement of the single plate transmittance was made by setting the film side of the sample to face the light source. Measurements were made using two samples, and the average value was taken as the single plate transmittance. The polarization performance, shown in order of the single plate transmittance (TT), parallel transmittance (PT) and cross transmittance (CT), is in the ranges of $40.0 \leqq TT \leqq 45.0$, $30.0 \leqq PT \leqq 40.0$, $CT \leqq 2.0$, more preferably in the ranges of $40.2 \leqq TT \leqq 44.8$, $32.2 \leqq PT \leqq 39.5$, $CT \leqq 1.6$, and still more preferably $41.0 \leqq TT \leqq 44.6$, $34 \leqq PT \leqq 39.1$, $CT \leqq 1.3$.

The degree of polarization P is calculated from these transmittances, and a large degree of polarization P leads to high performance of the polarizing plate, due to decreased light leakage when disposed orthogonally. The degree of polarization P is preferably 95.0% or higher, more preferably 96.0% or higher, and still more preferably 97.0% or higher.

Regarding the polarization plate of the invention, it is preferable that when the cross transmittance at a wavelength λ is referred to as T(λ), T(380), T(410) and T(700) satisfy at least one or more of the following Expressions (e) to (g).

$$T(380) \leqq 2.0 \quad (e)$$

$$T(410) \leqq 1.0 \quad (f)$$

$$T(700) \leqq 0.5 \quad (g)$$

It is more preferable that $T(380) \leqq 1.95$, $T(410) \leqq 0.9$, and $T(700) \leqq 0.49$, and more preferably $T(380) \leqq 1.90$, $T(410) \leqq 0.8$, and $T(700) \leqq 0.48$.

Regarding the polarizing plate of the invention, it is preferable that when the polarizing plate is left to stand at 60° C. and 95% RH for 650 hours, the change in the cross single plate transmittance, ΔCT, and the change in the degree of polarization, ΔP, satisfy at least one or more of the following Expressions (h) and (i).

$$-0.6 \leqq \Delta CT \leqq 0.6 \quad (h)$$

$$-0.3 \leqq \Delta P \leqq 0.0 \quad (i)$$

Regarding the polarizing plate of the invention, it is preferable that when the polarizing plate is conditioned at 80° C. for 650 hours, the change in the cross single plate transmittance, ΔCT, and the change in the degree of polarization, ΔP, satisfy at least one or more of the following Expressions (l) and (m).

$$-0.6 \leqq \Delta CT \leqq 0.6 \quad (l)$$

$$-0.3 \leqq \Delta P \leqq 0.0 \quad (m)$$

Also, in the polarizing plate durability test, it is preferred to have smaller changes.

(Constitution of Liquid Crystal Display Device)

Liquid crystal display devices usually have a liquid crystal cell disposed between two sheets of polarizing plates; however, the cellulose derivative film of the invention can give excellent display characteristics irrespective of the positions. In particular, since the protective film for the polarizing plate on the outermost surface of the display side of a liquid crystal display device, is provided thereon with a transparent hard coat layer, an anti-glare layer, an anti-reflection layer and the like, it is particularly preferable to use the cellulose derivative film for such applications.

In the case of producing the polarizing plate of the invention, to use the cellulose derivative film of the invention as a protective film for polarizing film (protective film for polarizing plate), it is necessary to improve the adhesiveness between the outermost side (surface) on the side to be adhered to the polarizing film and the polarizing film comprising polyvinyl alcohol as the main component. If the adhesiveness is insufficient, the processability is poor or the durability is insufficient, for the polarizing plate to be produced and appropriately used in the panel of liquid crystal display devices, and peeling upon long term use may pose a problem. For the adhesion, an adhesive can be used, and the component of the adhesive may be exemplified by a polyvinyl alcohol-based adhesive such as polyvinyl alcohol, polyvinyl butyral or the like, or a vinyl-based latex such as butyl acrylate. To take the adhesiveness into account, the surface energy may be considered as an index. When the surface energy of polyvinyl alcohol which is the main component of the polarizing film, or the surface energy of an adhesive layer which comprises an adhesive containing polyvinyl alcohol or a vinyl-based latex as the main component, and the surface energy of a protective film to be bonded are closer to each other, the bondability, and the processability and durability of the bonded polarizing plate are further improved. From this point of view, it is possible to sufficiently impart adhesiveness to a polarizing film comprising polyvinyl alcohol as the main component, by adjusting the surface energy on the side to be bonded to the polarizing plate or adhesive, to a desired range by means of surface treatment such as hydrophilization treatment or the like.

Since the cellulose derivative film of the invention usually contains a compound which reduces optical anisotropy, or additives such as chromatic dispersion controlling agent and the like, the surface of the film becomes more hydrophobic.

Therefore, it is required to improve the bondability by the hydrophilization treatment to be described later, in order to impart processability and durability to the polarizing plate.

The surface energy of the film after film formation, prior to performing any surface treatment such as hydrophilization treatment, is hydrophobic because of the use of additives as described above, and thus, from the aspects of the humidity dependency of the optical properties or mechanical properties of the film, or feasibility in the treatment for improving bondability, the surface energy is preferably from 30 mN/m to 50 mN/m, and more preferably from 40 mN/m to 48 mN/m. If the surface energy before treatment is less than 30 mN/m, large energy is required in improving the bondability by the hydrophilization treatment to be described later, consequently the film properties being deteriorated, or balance with the productivity being poor. If the surface energy before treatment is greater than 50 mN/m, the hydrophilicity of the film itself is too high, and the humidity dependency of the optical performance or mechanical properties of the film becomes too high, causing a problem.

The surface energy at the surface of polyvinyl alcohol is in the range of from 60 mN/m to 80 mN/m, depending on the additives used in combination, the degree of dryness, or the adhesive used. Thus, the surface energy of the film of the invention after surface treatment such as the hydrophilization treatment to be described later, at the surface being bonded to the polarizing film, is preferably from 50 mN/m to 80 mN/m, more preferably from 60 mN/m to 75 mN/m, and still more preferably from 65 mN/m to 75 mN/m.

[Surface Treatment Such as Hydrophilization Treatment]

The hydrophilization treatment of the surface of the film of the invention can be carried out by a known method. For example, methods of modifying the film surface by means of corona discharge treatment, glow discharge treatment, ultraviolet radiation treatment, flame treatment, ozone treatment, acid treatment, alkali treatment and the like, may be mentioned. The glow discharge treatment as used herein may be performed with low temperature plasma generated in a low pressure gas of 10−3 to 20 Torr (0.133 to 2660 Pa), or plasma treatment under the atmospheric pressure is also preferred. As the gas capable of plasma excitation, which is plasma excited under such conditions, argon, helium, neon, krypton, xenon, nitrogen, carbon dioxide, Freon such as tetrafluoromethane, and mixtures thereof may be mentioned. Detailed descriptions on these are found in the Technical Report of Japan Institute of Invention and Innovation, Technology No. 2001-1745 (published on Mar. 15, 2001, Japan Institute of Invention and Innovation), pp. 30 to 32, and the gases can be favorably used for the present invention.

[Alkali Saponification Treatment]

Inter alia, particularly preferred is alkali saponification treatment, which is extremely effective for the surface treatment of cellulose derivative films. The method of treatment is as follows.

(1) Immersion Method

The method comprises saponifying all surfaces of a film which are reactive with alkali by immersing the film in an alkali solution under appropriate conditions, and the method is preferable in view of costs because no special equipment is needed. The alkali solution is preferably an aqueous solution of sodium hydroxide. The concentration is preferably 0.5 to 3 mol/l, and particularly preferably 1 to 2 mol/l. The liquid temperature of the alkali solution is preferably 25 to 70° C., and particularly preferably 30 to 60° C. After immersing in the alkali solution, it is preferable that the film is washed with water for 10 minutes or immersed in dilute acid to neutralize the alkali component, so that no alkali component remains on the film surface.

Saponification treatment leads to hydrophilization of both surfaces of the film. A protective film for polarizing plates is used such that the hydrophilized surface is adhered to the polarizing film.

The hydrophilized surface is effective in improving the adhesiveness to the polarizing film comprising polyvinyl alcohol as the main component.

Meanwhile, in the immersion method, in case that an anti-reflection layer is laminated on a protective film, it is important to perform the reaction under minimum necessary reaction conditions, because the protective film is damaged by alkali even to the main surface. When the contact angle of water on the support on the main surface on the opposite side is used as an index of the damage exerted by alkali to the anti-reflection layer, particularly in case the support is a cellulose derivative, the contact angle is preferably 20° to 50°, more preferably 30° to 50°, and still more preferably 40° to 50°. Within this range, the damage exerted to the anti-reflection film practically does not cause any loss, and the adhesiveness to the polarizing film can be maintained.

(2) Alkali Solution Coating Method

As a means to avoid damage to the anti-reflection film in the above-described immersion method, an alkali solution coating method comprising coating an alkali solution on the main surface holding the anti-reflection film and the main surface on the opposite side under appropriate conditions, heating, washing and drying the resultant, is favorably used. Descriptions on the alkali solution and the treatment are found in JP-A No. 2002-82226 and WO 02/46809. However, since separate equipments and processes for coating alkali solutions are required, this method is less favorable than the immersion method from the aspect of costs.

[Plasma Treatment]

The plasma treatment used in the invention may include vacuum glow discharge, atmospheric pressure glow discharge and the like, and in addition to those, flame plasma treatment and the like may be mentioned. For these, the methods described in, for example, JP-A No. 6-123062, JP-A No. 11-293011, JP-A No. 11-5857 and the like can be used.

By the plasma treatment, strong hydrophilicity can be imparted to the surface of a plastic film by treating the film surface in plasma. For example, the surface treatment is performed by placing a film to which hydrophilicity is to be imparted, between electrodes facing each other in an apparatus for generating plasma by the aforementioned glow discharge, introducing a gas capable of plasma excitation to the apparatus, and applying a high frequency voltage between the electrodes to submit the gas to plasma excitation and to generate glow discharge between the electrodes. Among those, atmospheric pressure glow discharge is preferably used.

[Corona Discharge Treatment]

Among surface treatment methods, corona discharge treatment is a best known method, and can be achieved by any conventionally known method, for example, those methods disclosed in JP-B No. 48-5043, JP-B No. 47-51905, JP-B No. 47-28067, JP-B No. 49-83767, JP-B No. 51-41770, JP-B No. 51-131576 and the like. For the corona treatment instrument to be used in the corona treatment, various commercially available corona treatment instruments that are currently used as means for surface modification of plastic films and the like can be used. Among those, the corona treatment instrument of Softal Electronic GmbH, having multi-knife electrodes, comprises a plurality of electrodes and has a structure for sending air between the electrodes, which allows prevention of heating of the film or removal of low molecular weight substances generated from the film surface. Thus, the instrument has very high energy efficiency and allows high efficiency corona treatment, thus being a particularly useful corona treatment instrument for the present invention.

In order to use the cellulose derivative film of the invention as protective films for polarizing plates or the like, it is necessary to adjust the surface energy of at least one surface of the cellulose derivative film to a suitable range, and thus, surface treatment as described above is carried out. On the other hand, when the cellulose derivative film of the invention is subjected to surface treatment, there is a possibility that volatilization/elution/decomposition of the additives contained in the cellulose derivative film take place, and there is a risk that the optical performance, film performance or durability of the cellulose derivative film may be deteriorated. In the case of volatilization or elution occurring, the treatment system is further contaminated, and the ability to be treated is deteriorated, thereby it being impossible to perform the treatment continuously. For this reason, it is required to suppress a decrease in the amount of additives. The change in the amount of added additives due to the surface treatment is preferably 0.2% or less, more preferably 0.1% or less, and still more preferably 0.01% or less, relative to the total amount of additives added before the treatment.

[Application (Optically Compensatory Film)]

The cellulose derivative film of the invention can be used in various applications, and is particularly effectively used as an optically compensatory film for liquid crystal display devices.

In addition, an optically compensatory film refers to an optical material generally used in liquid crystal display devices for compensating retardations, and is interchangeably used with retardation plate, optically compensatory sheet or the like. An optically compensatory film has birefringence and is used for the purpose of eliminating coloration in the display screen of liquid crystal display devices, or improving the viewing angle characteristics. The cellulose derivative film of the invention exhibits a negative Rth, and Rth(589) thereof is suitably in the range of $-600 \leqq Rth \leqq 0$ nm. Also, in addition to having birefringence, the cellulose derivative film can be suitably used in combination with an optically anisotropic layer, and thus, an optically compensatory film having a desired optical performance can be obtained.

Therefore, when the cellulose derivative film of the invention is used as an optically compensatory film of a liquid crystal display device, Re(589) and Rth(589) of the optically anisotropic layer used in combination are preferably such that Re(589)=0 to 200 nm, and |Rth(589)|=0 to 400 nm. Within these ranges, any optically anisotropic layer may be used. The liquid crystal display device using the cellulose derivative film of the invention is not limited in the optical performance of the liquid crystal cell or in the driving mode, and any optically anisotropic layer can be used in combination, as required as the optically compensatory film. The optically anisotropic layer used in combination may be formed from a composition containing a liquid crystalline compound, or may be formed from a polymer film having birefringence.

The liquid crystalline compound is preferably a discotic liquid crystalline compound or a rod-shaped liquid crystalline compound.

(Discotic Liquid Crystalline Compound)

Examples of the discotic liquid crystalline compound that can be used in the invention include those compounds described in various documents (C. Destrade et al., Mol. Cryst. Liq. Cryst., Vol. 71, p. 111 (1981); Chemical Society of Japan, Quarterly Chemistry Review, No. 22, Chemistry of Liquid Crystals, Chapter 5, Chapter 10 Section 2 (1994); B. Kohne et al., Angew. Chem. Soc. Chem. Comm., p. 1794 (1985); J. Zhang et al., J. Am. Chem. Soc., Vol. 116, p. 2655 (1994)).

In the optically anisotropic layer, the discotic liquid crystalline molecules are preferably fixed in an aligned state, and most preferably fixed by a polymerization reaction. The polymerization of discotic liquid crystalline molecules is illustrated in JP-A No. 8-27284. In order to fix the discotic liquid crystalline molecules by polymerization, it is required to attach a polymerizable group as a substituent to the disk-shaped core of the discotic liquid crystalline molecules. However, when the polymerizable group is directly attached to the disk-shaped core, it becomes difficult to maintain the aligned state during the polymerization reaction. Therefore, a linking group is introduced between the disk-shaped core and the polymerizable group. Discotic liquid crystalline molecules having a polymerizable group are disclosed in JP-A No. 2001-4387.

(Rod-Shaped Liquid Crystalline Compound)

Examples of the rod-shaped liquid crystalline compound that can be used in the invention include azomethine compounds, azoxy compounds, cyanobiphenyl compounds, cyanophenyl esters, benzoic acid esters, cyclohexanecarboxylic acid phenyl esters, cyanophenylcyclohexane compounds, cyano-substituted phenylpyrimidine compounds, alkoxy-substituted phenylpyrimidine compounds, phenyldioxane compounds, tolane compounds, and alkenylcyclohexylbenzonitrile compounds. In addition to these low molecular weight liquid crystalline compounds, high molecular weight liquid crystalline compounds can also be used.

In the optically anisotropic layer, rod-shaped liquid crystalline molecules are preferably fixed in an aligned state, and most preferably fixed by a polymerization reaction. Examples of the polymerizable rod-shaped liquid crystalline compound that can be used in the invention include those compounds described in Makromol. Chem., Vol. 190, p. 2255 (1989), Advanced Materials, Vol. 5, p. 107 (1993), U.S. Pat. Nos. 4,683,327, 5,622,648, 5,770,107, WO 95/22586, WO 95/24455, WO 97/00600, WO 98/23580, WO 98/52905, JP-A No. 1-272551, JP-A No. 6-16616, JP-A No. 7-110469, JP-A No. 11-80081, JP-A No. 2001-328970, and the like.

(Optically Anisotropic Layer Formed from Polymer Film)

The optically anisotropic layer may be formed from a polymer film. The polymer film is formed of a polymer which is capable of exhibiting optical anisotropy. Examples of the polymer include polyolefins (e.g., polyethylene, polypropylene, and norbornene polymers), polycarbonate, polyarylate, polysulfone, polyvinyl alcohol, polymethacrylic acid esters, polyacrylic acid esters, and cellulose esters (e.g., cellulose triacetate, cellulose diacetate). Copolymers or polymer mixtures of these polymers may also be used.

It is preferable that the optical anisotropy of a polymer film is obtained by elongation treatment such as stretching. Stretching is preferably uniaxial stretching or biaxial stretching. Specifically, longitudinal uniaxial stretching utilizing the difference in the rotating speeds of two or more rollers, or tenter stretching in which a polymer film is stretched in the width direction with both edges of the film fixed, or biaxial stretching combining these two methods is preferred. From the viewpoint of the productivity of optically compensatory film and polarizing plate to be described later, tenter stretching or biaxial stretching is more preferred. In addition, the overall optical properties obtained by combining two or more sheets of polymer films may also be used, as long as the conditions described above are satisfied. It is preferable that the polymer film is produced by solvent casting method, so that irregularities in the birefringence are decreased. The thickness of the polymer film is preferably 20 to 500 μm, and most preferably 40 to 100 μm.

[Formation of Optically Anisotropic Layer by Polymer Coating]

According to the invention, the formation of an optically anisotropic layer by coating a polymer is carried out by spreading a liquefied polymer which is dissolved in a solvent on the cellulose derivative film of the invention and drying, and subjecting the resulting laminate to a treatment for aligning molecules in-plane. Thus, an optically compensatory film imparted with desired optical properties is obtained. For the molecular orientation treatment, elongation treatment, shrinking treatment, or both of them may be used, but from the aspects of productivity and feasibility of control, stretching treatment is preferred.

The polymer is not particularly limited, and one or two or more polymers having appropriate light transmittance can be used. Among those, a polymer which can form a film having excellent translucency, with a light transmittance of 75% or greater, particularly 85% or greater, is preferred. Also from the aspect of stabilized mass production of film, a solid polymer exhibiting positive birefringence with increasing retardation in the stretching direction can be favorably used.

Furthermore, examples of the solid polymer described above include polyamide or polyester (for example, JP-W No. 10-508048), polyimide (for example, JP-W No. 2000-511296), polyether ketone or particularly polyaryl ether ketone (for example, JP-A No. 2001-49110), polyamideimide (for example, JP-A No. 61-162512), polyester imide (for example, JP-A No. 64-38472) and the like. For the formation of a birefringent film, such solid polymers can be used individually or as a mixture of two or more species. The molecular weight of the solid polymer is not particularly limited, but generally from the viewpoint of the processability of films, the molecular weight is 2,000 to 1,000,000, preferably 1,500 to 750,000, and even more preferably 1,000 to 500,000, based on the weight average molecular weight.

In the case of forming a polymer film, various additives comprising stabilizers, plasticizers, metals and the like can be mixed in as necessary. The liquefaction of a solid polymer can be performed appropriately by heating and melting a thermoplastic solid polymer, or by dissolving a solid polymer in a solvent.

The solidification of the polymer spread on the cellulose derivative film (spread layer) can be performed by cooling the spread layer in the former molten liquid method, and by removing the solvent from the spread layer and drying the spread layer in the latter solution method. For the drying process, one or two or more of a natural drying (air drying) method or a drying by heating method, particularly drying by heating at 40 to 200° C., a drying under reduced pressure method and the like may be mentioned. From the viewpoints of production efficiency or of suppressing generation of optical anisotropy, the method of coating a polymer solution is preferred.

For the solvent mentioned above, one or two or more of appropriate solvents, for example, methylene chloride, cyclohexanone, trichloroethylene, tetrachloroethane, N-methylpyrrolidone, tetrahydrofuran and the like can be used. It is preferable from the viewpoint of providing a viscosity appropriate for film formation, that the solution is prepared by dissolving a polymer in an amount of 2 to 100 parts by mass, more preferably 5 to 50 parts by mass, and particularly preferably 10 to 40 parts by mass, relative to 100 parts by mass of the solvent.

Spreading of the liquefied polymer may be performed by appropriate film forming methods such as, for example, spin coating, roll coating, flow coating, printing, dip coating, film forming by casting, bar coating, casting such as gravure printing, extrusion and the like. Among these, a casting method or a solution film forming method can be favorably used, in view of mass producing films having less thickness irregularity, irregularity in orientational distortion, and the like. In particular, it is preferable to form a film by laminating a polymer that has been liquefied by dissolving in a solvent, on the cellulose derivative film by co-casting. In this case, a solvent-soluble polyimide prepared from an aromatic dianhydride and a polyaromatic diamine (See JP-W NO. 8-511812) can be favorably used.

The above-described preparation method of the invention of liquefying a polymer, spreading it on a cellulose derivative film, and subjecting the polymer to elongation or shrinkage, controls Rth during the formation of the spread layer on the cellulose derivative film, and by subjecting the laminate to elongation or shrinkage, align molecules and control Re. Such role sharing method can achieve the object with a smaller stretch ratio compared with conventional methods of simultaneously controlling Rth and Re, such as in a biaxial stretching method, and thus is advantageous in design and production such that a biaxial optically compensatory film having excellent characteristics of Rth and Re or excellent degree of precision for each of the optical axes is easily obtained.

The above-described molecular aligning treatment can be carried out as an elongation treatment and/or a shrinkage treatment for the film, and the stretching treatment can be carried out by, for example, stretching treatment. The stretching treatment can be carried out by applying one or two or more of a biaxial stretching method involving a sequential method or a simultaneous method, and a uniaxial stretching method involving a free end method or a fixed end method. The uniaxial stretching method is preferred in view of controlling the bowing phenomenon.

Herein, the temperature for stretching treatment can follow the convention, and for example, the temperature is generally in the vicinity of the glass transition temperature of the solid polymer, or above the glass transition temperature. Also, in order to further decreasing the retardations of the stretched cellulose derivative film of the invention, the stretching temperature is favorably in the vicinity of the glass transition temperature Tg of the cellulose derivative film, and it is preferable to stretch at a temperature of (Tg−20)° C. or higher, more preferably at a temperature of (Tg−10)° C. or higher, and still more preferably at Tg or above.

A preferred range of stretch ratio is preferably from 1.03 to 2.50, more preferably from 1.04 to 2.20, and still more preferably from 1.05 to 1.80, as the ratio of the film length after stretching to the film length before stretching. If the stretch ratio is 1.05 or less, the stretch ratio is insufficient for the purpose of forming the above-described optically anisotropic layer. If the stretch ratio is 2.50 or higher, the curl or the change in optical properties is increased after a durability test of the film.

Meanwhile, the shrinkage treatment can be performed by, for example, forming a coating of the polymer film on a substrate, and exerting a contractile force using the dimensional change associated with the temperature change of the substrate, or the like. In this case, a substrate to which the contractile capacity of a thermoshrinkable film or the like is imparted, can be used, and for this, it is preferable to control the shrinkage ratio using a stretching machine or the like.

The birefringent film produced by the above-described method is suitably used as an optically compensatory film which improves the viewing angle characteristics of liquid crystal display devices, and is preferably used in the form of being directly bonded to a polarizer (polarizing film) as a protective film of the polarizing plate, for the purposes of further thickness reduction of liquid crystal display devices and productivity enhancement due to a decrease in the number of processes. Herein, since it is required to provide polarizing plates using the optically compensatory film at lower costs with good productivity, it is desired to make the production processes up to the polarizing plate stage with better productivity and lower costs. Thus, the optically compensatory film of the invention is used in the form of being bonded to a polarizer such that the direction of development of the in-plane Re of the optically anisotropic layer is in a straight direction with respect to the absorption axis of the polarizing plate. Furthermore, a polarizer having a general constitution comprising iodine and pVA is produced by longitudinal uniaxial stretching, and the absorption axis of the polarizer becomes the longitudinal direction. Moreover, in order to provide a polarizing plate which uses the optically compensatory film having a birefringent film, it is primarily required to perform the production process consistently in a roll-to-roll mode. Due to these factors, and particularly from the viewpoint of productivity, for the method of producing the optically compensatory film comprising a birefringent film, it is preferable to perform the elongation treatment or shrinkage treatment after laminating the spread layer comprising the polymer on the cellulose derivative film of the invention, so that the polymer in the spread layer is aligned in the width direction, thereby Re being developed in the width direction. When the optically compensatory film in a rolled form thus produced is used as a protective film for a polarizer, manufacture of a polarizing plate having an effective optical compensation function can be carried out directly in a roll-to-roll form.

Herein, the film in a rolled form according to the invention is a film having a length of 1 m or more in the longitudinal direction and being wound 3 or more rounds in the longitudinal direction. The term roll-to-roll means that for a film in a rolled form, the rolled form is maintained throughout the procedure of performing all possible treatments, such as film formation, lamination/bonding to other rolled film, surface treatment, heating/cooling treatment, and elongation treatment/shrinkage treatment. In particular, from the aspect of productivity, costs or handlability, it is preferable to perform treatments in the roll-to-roll mode.

The sizes of Rth and Re in the obtained birefringent film can be controlled by the kind of solid polymer, the method of forming the spread layer such as the method of coating a liquefied product, the method of solidifying the spread layer such as the drying conditions, or the thickness of the optically compensatory layer comprising the solid polymer formed. The general thickness of the solid polymer layer which is used as the optically compensatory layer is 0.5 to 100 μm, preferably 1 to 50 μm, and particularly preferably 2 to 20 μm.

The birefringent film produced by this method may be used directly, or may be bonded to other films using adhesives.

(Constitution of Liquid Crystal Display Device)

The liquid crystal display device preferably has a constitution comprising, as described in the [Functional layers] section, a liquid crystal cell formed by supporting liquid crystals between two sheets of electrode substrates, two sheets of polarizing plates disposed on both sides of the liquid crystal cell, and at least one sheet of optically compensatory film disposed between the liquid crystal cell and the polarizing plate. When a cellulose acylate film is used as the optically compensatory film, the transmission axis of the polarizing plate and the slow axis of the optically compensatory film comprising the cellulose acylate film may be arranged at any angle. The liquid crystal display device of the invention is a liquid crystal display device having a liquid crystal cell and two sheets of polarizing plates disposed on both sides of the liquid crystal cell, and is characterized in that at least one sheet of the polarizing plate is the polarizing plate of the invention described above.

The liquid crystal layer of the liquid crystal cell is usually formed by encapsulating liquid crystals in a space formed between two sheets of substrates with a spacer interposed therebetween. A transparent electrode layer is a transparent film containing an electroconductive material, and is formed on the substrate. In the liquid crystal cell, a gas barrier layer, a hard coat layer, or an undercoat layer (used for the adhesion of the transparent electrode layer) may also be installed. These layers are usually installed on the substrate. The substrate of the liquid crystal cell is in general 50 μm to 2 mm in thickness.

(A Kind of Liquid Crystal Display Device)

The cellulose derivative film of the present invention can be applied to a liquid crystal cell of various indicating mode. Various indicating mode such as TN (Twisted Nematic), IPS (In-Plane Switching), FLC(Ferroelectric Liquid Crystal), AFLC (Anti-ferroectric Liquid Crystal) OCB (Optically Compensatory Bend), STN(Supper Twisted Nematic), VA (Vertially Aligned), ECB (Electrically Controlled Birefringence), and HAN (Hybrid Aligned Nematic) is suggested. In addition, the indication mode which the indication mode is aligned and divided is also suggested. The cellulose film of the present invention are effective in liquid crystal display device of any indication mode, it is preferably to be used for liquid crystal display device of IPS mode. In addition, it is effective in any liquid crystal display device of a transmission type, a reflection type, half transmission type.

(TN Type Liquid Crystal Display Device)

The cellulose derivative film of the present invention may be used as support of an optically-compensatory sheet of TN type liquid crystal display device having a liquid crystal cell of a TN mode. For a liquid crystal cell of a TN mode and a TN type liquid crystal display device, it is known well for a long time. About an optically-compensatory sheet which is applied to a TN type liquid crystal display device, there are descriptions at each bulletin such as Japanese Unexamined Patent Application Numbers 3-9325, 6-148429, 8-50206, 9-26572. In addition, there are descriptions in the article of Mori (Mori) et al. (Jpn. J. Appl. Phys. Vol. 36 (1997) p. 143 and Jpn. J. Appl. Phys. Vol. 36 (1997) p. 1068).

(STN-type Liquid Crystal Display)

The Cellulose Film of the Present Invention May be Used as Support of an Optically-compensatory sheet of STN-type liquid crystal display device having a liquid crystal cell of a STN mode. In the STN-type liquid crystal display device, the stick-type liquid crystal molecule in liquid crystal cells is generally turned to a range from 90 to 360 degree, and the product (Δnd) of the refractive anisotropy of the stick-type liquid crystal molecule×the cell gap (d) is in the range from 300 to 150 nm. About optically-compensatory sheet to apply to STN-type liquid crystal display device, there is description at Japanese Unexamined Patent Application No. 2000-105316 bulletin.

(VA-type Liquid Crystal Display Device)

The Cellulose Derivative Film of the Present Invention is Particularly Advantageously Used as support of an optically-compensatory sheet of VA-type liquid crystal display device having a liquid crystal cell of VA mode. It is preferable that the Re of an optically-compensatory used for VA-type liquid crystal display device is from 0 to 150 nm, and Rth is from 70 to 400 nm. Re is more preferably 20 to 70 nm. When two pieces of optically-anisotropic polymer film is used for VA type-liquid crystal display device, it is preferable that Rth of a film is from 70 to 250 nm. When one piece of optically anisotropic polymer film is used for VA-type liquid crystal display device, it is preferable that Rth of a film is from 150 to 400 nm. The VA-type liquid crystal display device may be the method that is aligned and divided described in for example, Japanese Unexamined Patent Application No. 10-123576 bulletin.

(IPS-type Liquid Crystal Display Device and ECB-type Liquid Crystal Display Device)

The cellulose derivative film of the present invention is particularly advantageously used as a support of optically-compensatory film sheet of IPS-type liquid crystal display device and ECB-type liquid crystal display device, or also as a protecting film of polarizing plate. These mode is the embodiment that liquid crystal material does alignment in generally parallelism at the time of black indication, and it makes do parallel alignment for basal plate face, and black displays liquid crystal molecules in voltage nothing application condition. These modes are the embodiments that liquid crystal material align in almost parallel at the time of black indication, with a condition that voltage is not applied, and it makes liquid crystal molecules align in parallel to basal plate surface to indicating in black. In these embodiments, the polarizing plate with the use of a cellulose derivative film of the present invention contributes to improvement of color, expansion of viewing angle, improvement of contrast. In this embodiment, it is preferable that among protective film of the above mentioned polarizing plate above and below a liquid crystal cell, for the protective film placed between a liquid crystal cell and polarizing plate (protective film of the cell side), the polarizing plate with the use of cellulose derivative film of the present invention is used in at least one side. More preferably, an optically anisotropic layer is placed between protective film and liquid crystal cells of polarizing plate, and it is preferable that a value of retardation of a placed optically anisotropic layer
is set less than 2-fold of a value of $\Delta n \cdot d$ of a liquid crystal layer.

(OCB-type Liquid Crystal Display Device and HAN-type Liquid Crystal Display Device)

The cellulose derivative film is particularly advantageously used as a support of optically-compensatory film sheet of OCB-type liquid crystal display device having a liquid crystal cell of OCB mode or HAN-type liquid crystal display device having a liquid crystal cell of HAN mode. It is preferable that in the optically-compensatory film used for OCB-type liquid crystal display device or HAN-type liquid crystal display device, there is the direction that absolute value of retardation is minimized in neither plane of optically compensatory sheet nor normal direction. The optical property of optically-compensatory film sheet to apply to OCB-type liquid crystal display device or HAN-type liquid crystal display device is also determined by arrangement with optical property of an optically anisotropic layer, optical property of support and configuration of an optically anisotropic layer and support. About an optically-compensatory sheet which is applied to a OCB-type liquid crystal display device or HAN-type liquid crystal display device, there are descriptions at Japanese Unexamined Patent Application No. 9-197397 bulletin. In addition, there is description in the article of Mori (Mori) et al. (Jpn. J. Appl. Phys. Vol. 38 (1999) p. 2837 and Jpn.

(Reflective Liquid Crystal Display Device)

A cellulose film of the present invention is also advantageously used as optically-compensatory sheet of Reflective liquid crystal display device such as TN-type, STN-type, HAN-type, GH (Guest-Host) type. These indication modes are known well for a long time. About TN type reflective liquid crystal display device, there are descriptions at each bulletin such as Japanese Unexamined Patent Application No. 10-123478, WO9848320, and U.S. Pat. No. 3,022,477. About an optically-compensatory sheet to apply to reflective type liquid crystal display device, there is description in WO00/65384.

(Other Liquid Crystal Display Device)

The cellulose film of the present invention is also advantageously used as support of optically-compensatory sheet of ASM-type liquid crystal display device having a liquid crystal cell of ASM (Axially Symmetric Aligned Microcell) mode. There is a characteristic that in a liquid crystal cell of ASM mode, thickness of a cell is maintained with the resin spacer which can adjust position. The other properties are similar to a liquid crystal cell of TN mode. About a liquid crystal cell of an ASM mode and ASM type liquid crystal display device, there is description in the article of Kume (Kume) et al. (Kume et al., SID 98 Digest 1089 (1998)).

(Self-light-emitting Display Device)

The optically compensatory film and polarizing plate using the cellulose derivative film according to the invention may be provided to self-light-emitting type display devices to improve the visual quality or the like. There is no particularly limitation on the self-light-emitting display devices. Furthermore, examples thereof include organic EL, PDP, FED and the like. When a birefringent film having Re at a ¼ wavelength is applied to a self-light-emitting flat panel display, the linear polarization can be converted to radial polarization, thus forming an anti-reflection filter.

The elements forming the display device in liquid crystal display devices may be integrated by lamination or may be in a separated state. In the case of forming a display device, appropriate optical elements such as, for example, a prism array sheet, a lens array sheet, a light diffusion plate, a protective plate and the like can be appropriately arranged. Such elements can also be provided to the formation of a display device in the form of the optical member formed by lamination on the optically compensatory film.

(Hard Coat Film, Anti-glare Film, Anti-reflection Film)

The cellulose derivative film of the invention can be favorably benefited by the application of a hard coat film, an anti-glare film or an anti-reflection film. For the purpose of improving visibility in flat panel displays such as LCD, PDP, CRT, EL and the like, any one or all of a hard coat layer, an anti-glare layer and an anti-reflection layer can be provided on one side or both sides of the cellulose derivative film of the invention. Preferred embodiments for such anti-glare film and anti-reflection film are described in detail in the Technical Report of Japan Institute of Invention and Innovation, Technology No. 2001-1745 (published on Mar. 15, 2001, Japan Institute of Invention and Innovation), pp. 54-57, and the cellulose derivative film can be favorably used.

(Photographic Film Support)

Furthermore, the cellulose derivative film of the invention can be applied as a support for silver halide photographic photosensitive materials. For this technology, detailed descriptions on color negatives are found in JP-A No. 2000-105445, and the cellulose derivative film of the invention is favorably used. The cellulose derivative film can also be favorably applied as a support for color inversion silver halide photographic photosensitive materials, and various materials, prescriptions and treatment methods as described in JP-A NO. 11-282119 can be employed.

(Transparent Substrate)

Since the cellulose derivative film of the invention has excellent transparency, the film can be used as a replacement for the glass substrate for liquid crystal cell in liquid crystal display devices, that is, the transparent substrate for encapsulating driving liquid crystals.

The transparent substrate for encapsulating liquid crystals needs to have excellent gas barrier properties, and thus, a gas barrier layer may be provided on the surface of the cellulose derivative film of the invention, if necessary. There is no particular limitation on the form or material of the gas barrier layer, but methods of vapor depositing SiO2 or the like on at least one side of the cellulose derivative film of the invention, or providing a coating layer of a polymer having relatively high gas barrier properties, such as a vinylidene chloride polymer, a vinyl alcohol polymer or the like, can be contemplated and appropriately used.

To use the cellulose derivative film as the transparent substrate for encapsulating liquid crystals, a transparent electrode may be provided to drive the liquid crystals by applying voltage. There is no particular limitation on the transparent electrode, but the transparent electrode can be prepared by laminating a metal film, a metal oxide film or the like on at least one side of the cellulose derivative film of the invention. Among these, a metal oxide film is preferred from the viewpoints of transparency, conductivity and mechanical properties, and inter alia, a thin film of indium oxide mainly containing tin oxide and containing 2 to 15% of zinc oxide can be favorably used. Details of these technologies are disclosed in, for example, JP-A No. 2001-125079, JP-A No. 2000-227603 or the like.

Hereinafter, the third present invention will be described detail.

Hereinafter, one embodiment of the liquid crystal display device of the present invention and its component members will be successively explained. In the specification, ranges indicated with 'to' means ranges including the numerical values before and after 'to' as the minimum and maximum values. In the specification, Re (λ) and Rth (λ) respectively mean in-plane retardation and retardation in a thickness-direction at wavelength λ. The Re (λ) is measured with KOBRA-21ADH or WR (manufactured by Ooji Keisokuki Co., Ltd.) for an incoming light of a wavelength [λ] nm in a direction normal to a film.

When a film to be measured can be represented by a uniaxial or biaxial refractive index ellipsoid, Rth (λ) is calculated by using a following method. The Rth (λ) is calculated with KOBRA-21ADH or WR on the basis of retardation values, a hypothetical mean refractive index, and an entered thickness value of the film, by first measuring the retardation values Re (λ) of total 6 points for an incident light of wavelength λ nm in each direction tilted by every 10° up to 50° to one side away from the direction normal to a film, with respect to the normal direction of the film around an in-plane slow axis (which is decided by KOBRA 21ADH or WR) as a tilt axis (a rotation axis) (in the absence of a slow axis, arbitrary position of in-plane film is a rotation axis).

In the above, when a film has a direction giving a retardation value of zero at an angle inclining away from the normal direction under a condition that the in-plane slow axis is taken as a rotation axis, any retardation values at an inclining angle larger than the above inclining angle are changed in its sign to negative, and then calculated with KOBRA21ADH or WR.

By measuring retardation values from arbitrary two directions tilted under a condition that the slow axis is taken as an axis of tilt (a rotation axis) (in the absence of a slow axis, arbitrary direction of in-plane film is a rotation axis), Rth can also be calculated on the basis of the values measured, a hypothetical mean refractive index, and an entered thickness value of the film, according to the following mathematical formulae (10) and (20).

Mathematical Expression (10)

$$Re(\theta)=\left[nx-\frac{ny\times nz}{\sqrt{\left\{ny\sin\left(\sin^{-1}\left(\frac{\sin(-\theta)}{nx}\right)\right)\right\}^2+\left\{nz\cos\left(\sin^{-1}\left(\frac{\sin(-\theta)}{nx}\right)\right)\right\}^2}}\right]\times\frac{d}{\cos\left\{\sin^{-1}\left(\frac{\sin(-\theta)}{nx}\right)\right\}}$$

Above Re (θ) represents a retardation value in a direction tilted by θ degree from a normal direction.

In Mathematical Expression (10), nx is the in-plane refractive index observed in the slow axis direction, ny is the in-plane refractive index observed in the direction normal to nx, and nz is the refractive index observed in the direction normal to nx and ny.

$$Rth=((nx+ny)/2-nz)\times d$$ Mathematical Expression (20)

When the film to be measured cannot be represented by a uniaxial or biaxial refractive index ellipsoid, so-called a film having no optic axis, Rth (λ) is calculated by using a following method. The Rth (λ) is calculated with KOBRA-21ADH or WR on the basis of retardation values, a hypothetical mean refractive index, and an entered thickness value of the film, by first measuring the retardation values Re (λ) of total 11 points for an incident light of wavelength λ nm in each direction tilted by every 10° from −50° to +50° with respect to the normal direction of the film under a condition that the in-plane slow axis (which is decided by KOBRA 21ADH or WR) is taken as an axis of tilt (a rotation axis).

In the above measurement, as the hypothetical mean refractive indexes, those values listed in Polymer Handbook (JOHN WILEY & SONS, INC) and catalogs of various optical films can be used. If the values of mean refractive indexes are unknown, the values may be measured with an Abbe refractometer. The values of mean refractive indexes of major optical films are exemplified below: cellulose acylate (1.48), cycloolefin polymer (1.52), polycarbonate (1.59), polymethyl methacrylate (1.49), and polystyrene (1.59). When the hypothetical mean refractive index and a thickness value are put into KOBRA 21ADH or WR, nx, ny and nz are calculated. An Nz, which is equal to (nx−nz)/(nx−ny), is calculated on a basis of the calculated nx, ny, and nz.

Herein, as the hypothetical mean refractive indexes, those values listed in Polymer Handbook (JOHN WILEY & SONS, INC) and catalogs of various optical films can be used. If the values of mean refractive indexes are unknown, the values may be measured with an Abbe refractometer. The values of mean refractive indexes of major optical films are exemplified below: cellulose acylate (1.48), cycloolefin polymer (1.52), polycarbonate (1.59), polymethyl methacrylate (1.49), and polystyrene (1.59). When the hypothetical mean refractive index and a thickness value are put into KOBRA 21ADH or WR, nx, ny and nz are calculated.

Rth sign is judged positive when the retardation, which is measured for an incident light of wavelength 590 nm in a direction tilted by 20° with respect to the normal direction of a film under a condition that the in-plane slow axis is taken as an axis of tilt (a rotation axis), is greater than the Re, and judged negative when the retardation is less than the Re. In a sample having |Rth/Re| of 9 or more, with the use of a polarization microscope equipped with a rotatable seat, it is judged positive when a slow axis of sample which can be decided with the use of a tint plate of a polarizing plate is in parallel with a film surface in a state tilted by 40° with respect to the normal direction of a film under a condition that in-plane fast axis is taken as a tilt axis (a rotation axis), and judged negative when the slow axis is in a film thickness-direction.

In the present specification, the terms 'parallel' and 'orthogonal' mean to include the range of less than ±10° with respect to precise angles. Difference from the precise angles is preferably less than ±5°, and more preferably less than ±2°. The term 'substantially vertical' mean to include the range of ±20° less than the precise vertical angles. Difference from the precise angles is preferably less than ±15°, and more preferably less than ±10°. The 'slow axis' means a direction in which the refractive index becomes maximum. The measurement wavelength for the refractive index is λ=590 nm in the visible light region, unless otherwise specifically noted.

In the specification, the term 'polarizing plate', unless otherwise noted, is intended to include both a long length of polarizing plate and a polarizing plate cut in a size suitable for incorporation into a liquid crystal device (the term 'cut' as used in the present specification is intended to include 'stamp' and 'cut up into'). In addition, the term 'polarizing plate' is used in the present specification as distinguished from the term 'a polarizing film', and the term 'a polarizing plate' is used for any laminated body comprising on at least one side a transparent protective film which protects the polarizing film.

According to the absorption axis direction and transmission axis direction of the polarizing plate, for example a transmittance can be measured with the use of a spectrophotometer using polarizing light source. That is, the transmittance is measured by varying an azimuth angle direction of polarizing plate, and the alignment is orthogonal to polarizing light of the light source when the transmittance is at its lowest. In a general polarizing plate, a stretching direction of the polarizer is the absorption axis, and a longitudinal direction in a long length of polarizing plate is the absorption axis.

Figure 2:
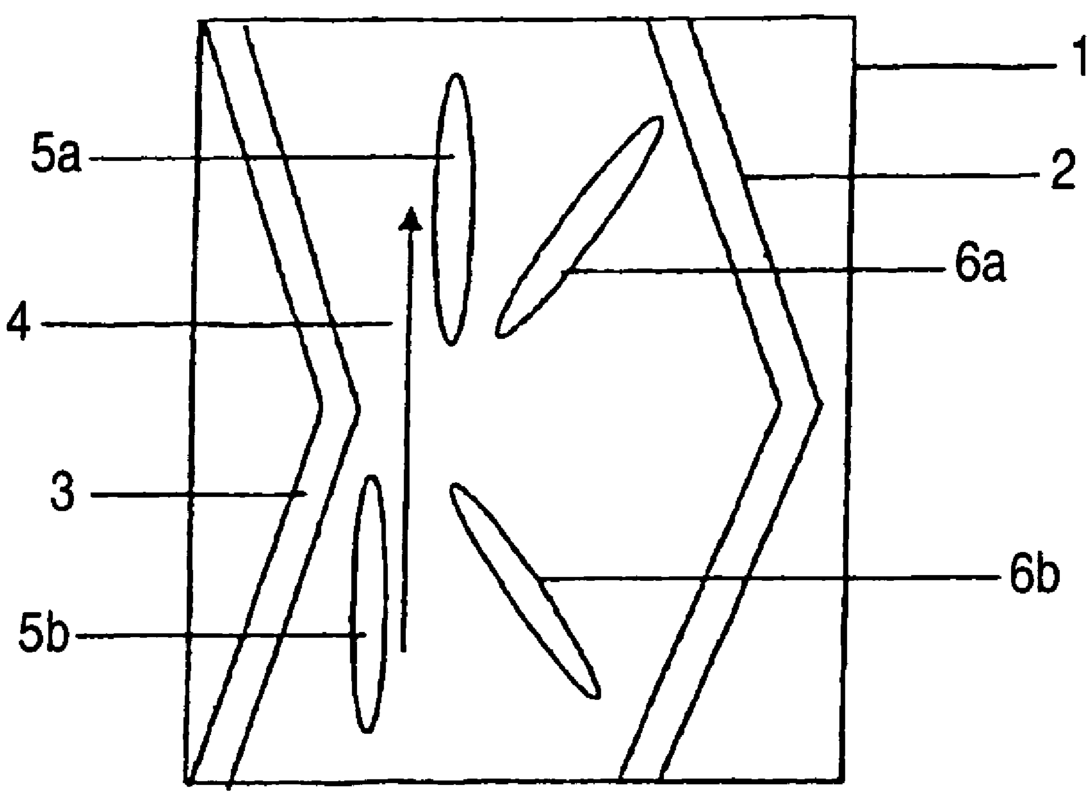
FIG. 2 is a schematic diagram of an IPS mode liquid crystal cell.
Figure 3:
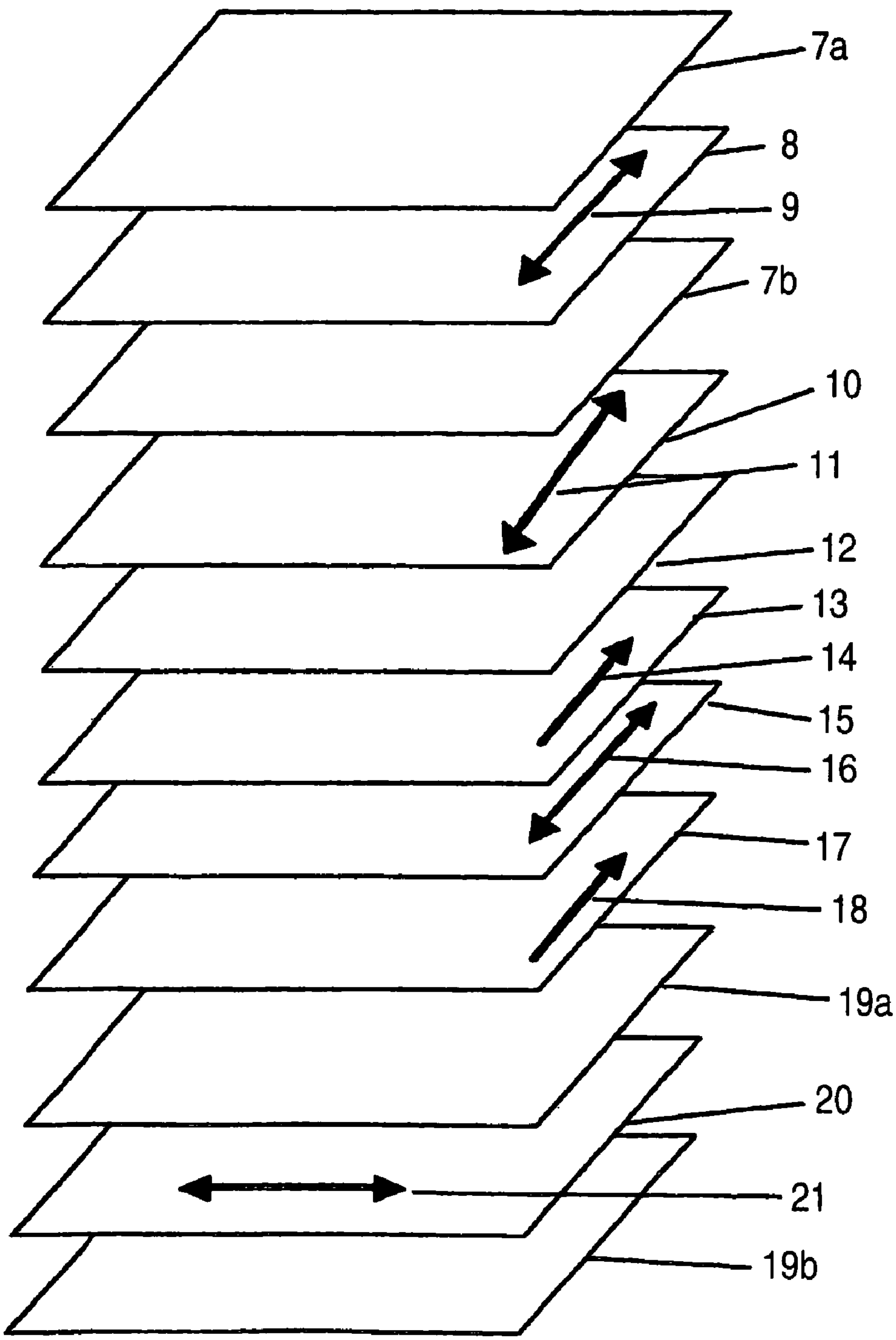
FIG. 3 is a schematic drawing showing one example of a liquid crystal display device of the present invention.
Figure 4:
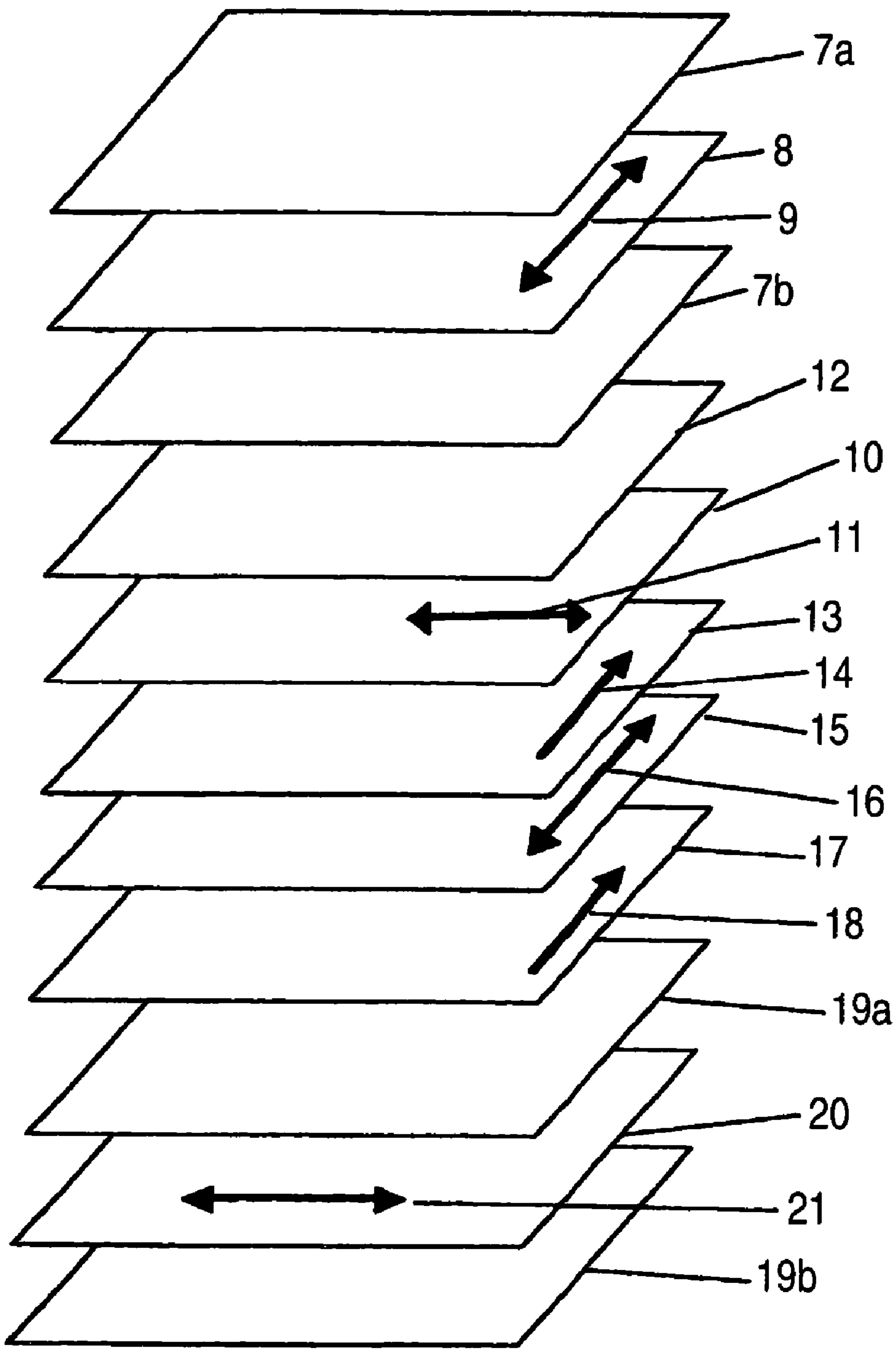
FIG. 4 is a schematic drawing shoving another example of a liquid crystal display device of the present invention, wherein 1 denotes liquid crystal element pixel region; 2 denotes pixel electrode; 3 denotes display electrode; 4 denotes rubbing direction; 5*a*, 5*b* denote director of liquid crystal compound during black display; 6*a*, 6*b* denote director of liquid crystal compound during white display; 7*a*, 7*b*, 19*a*, 19*b* denote protective film for polarizing film; 8, 20 denote polarizing film; 9, 21 denote polarizing transmission axis of polarizing film; 10 denotes first phase difference area; 11 denotes slow axis of first phase difference area; 12 denotes second phase difference area; 13, 17 denote substrate; 14, 18 denote rubbing treatment direction; 15 denotes liquid-crystal layer; and 16 denotes slow axis direction of liquid-crystal layer.

Hereinafter, embodiments of the present invention will be explained in detail referring to drawings. FIG. 2 shows a schematic drawing of an exemplary pixel region of a liquid crystal display device of the present invention. FIGS. 3 and 4 each shows a schematic drawing of one embodiment of a liquid crystal display device of the present invention.

[Liquid Crystal Display Device]

A liquid crystal display device shown in FIG. 3 comprises polarizing films 8, 20, a first phase difference area 10, a second phase difference area 12, a pair of substrates 13 and 17, and a liquid-crystal cell comprising a liquid-crystal layer 15 interposed between the substrates. The polarizing films 8, 20 are interposed between protective films 7*a* and 7*b*, and 19*a* and 19*b*, respectively.

In the liquid crystal display device shown in FIG. 3, a liquid-crystal cell comprises the substrates 13 and 17, and the liquid-crystal layer 15 interposed between those substrates. For an IPS-mode liquid-crystal cell without twisting structures in a transmission mode, the best value of a thickness of a liquid-crystal layer, d (μm), and a refractive-index anisotropy, Δn, is 0.2 to 0.4 μm. In this range, the display device gives a high brightness in a white state and a low brightness in a black state, and thus a device giving a high brightness and a high contrast can be obtained. Alignment films (not shown) are formed on the surfaces of the substrates 13 and 17 where the liquid-crystal layer 15 is contacting, and thus the liquid-crystal molecules are aligned almost parallel to the surface of the substrates and the liquid-crystal molecules alignments are controlled along with rubbing treatment directions 14 and 18, which are applied on the alignment films, in the field-free state or in the low-field applied state, thereby determining the direction of slow axis 16. Electrodes (not shown in FIG. 3) which can apply the field to liquid-crystal molecules, are formed on the inner surfaces of the substrates 13 and 17.

FIG. 2 schematically shows the alignment of liquid-crystal molecules in a pixel region of the liquid-crystal layer 15. FIG. 2 is a schematic view showing the alignment of liquid-crystal molecules in an extremely small area corresponding to one pixel region of the liquid-crystal layer 15, with the rubbing direction 4 of the alignment films formed on the inner surfaces of the substrates 13 and 17 and electrodes 2 and 3 formed on the inner surfaces of the substrates 13 and 17 which are capable of applying the field to liquid-crystal molecules. When nematic liquid crystal having a positive dielectric anisotropy is used as a field-effect type liquid crystal and active driving is carried out, the alignment direction of the liquid-crystal molecules in the field-free state or the low-field-applied state are 5*a* and 5*b*. This state displays black. When the field is applied between the pixel electrode 2 and display electrode 3, the liquid-crystal molecules change the alignments to the directions 6*a* and 6*b*. Usually, this state displays white.

Without limiting the liquid-crystal cell used in the invention to an IPS-mode or FFS-mode, as long as it is a liquid crystal display device in which the liquid-crystal molecules are aligned substantially parallel to the surfaces of a pair of substrates mentioned above at the black display, any cells are preferably used. Examples include a ferroelectric-liquid crystal display device, an anti-ferroelectric-liquid crystal display device, and an ECB-type liquid crystal display device.

To return to FIG. 3, the transmission axis 9 of the polarizing film 8, which is the first polarizing film, is orthogonal to the transmission axis 21 of the polarizing film 20, which is the second polarizing film. A slow axis 11 of the first phase difference area 10 (first phase difference film) is aligned in parallel with the transmission axis 9 of the polarizing film 8 (that is, it is orthogonal to the absorption axis (not shown) of the first polarizing film 8). In addition, the transmission axis 9 of the polarizing film 8 is in parallel with the slow axis 16 of the liquid-crystal molecules in the liquid-crystal layer 15 at the black display, that is, the slow axis 11 of the first phase difference area 10 is in parallel with the slow axis 16 of the liquid-crystal layer 15 at the liquid-crystal black display.

The liquid crystal display device shown in FIG. 3 is in a configuration that the polarizing film 8 is interposed between two protective films 7*a* and 7*b*, but it may be a configuration without the protective film 7*b*. If the protective film 7*b* is not disposed, the first phase difference area 10 is necessary to have specific optical properties described later and further a function for protecting the polarizing film 8. If the protective film 7*b* is disposed, the retardation in-thickness direction Rth of the protective film is preferably from −40 to 40 nm, and more preferably from −20 to 20 nm. In addition, the polarizing film 20 is interposed between two protective films 19*a* and 19*b*, but the protective film 19*a* which is nearer to the liquid-crystal layer 15 may be absent. If the protective film 19*a* is disposed, the retardation Rth of the protective film in-thickness direction is preferably from −40 to 40 nm, and more preferably from −20 to 20 nm. The protective films 7*b* and 19*a* are preferably a thin film, and specifically preferable to be 60 μm or less.

In one embodiment shown in FIG. 3, the first phase difference area 10 and the second phase difference area 12 (second phase difference film) may be disposed on the basis of the liquid-crystal cell position, either between the liquid-crystal cell and viewing side of the polarizing film or between the liquid-crystal cell and the rear side of the polarizing film, but is preferably disposed between the liquid-crystal cell and the rear side of the polarizing film from the yield point of view. Also, the first phase difference area 10 and the second phase difference area 12 (second phase difference film) are preferably disposed at a position nearer to the substrates of the liquid-crystal cell, without intercalating any other film. In any embodiments, the second phase difference area is disposed nearer to the liquid-crystal cell for a configuration of FIG. 3. Herein, a horizontal direction in FIG. 3 is a longitudinal direction.

Other embodiment of the present invention is shown in FIG. 4. In FIG. 4, same members as in FIG. 3 are shown in same numerals and detailed explanation is omitted. In a liquid crystal display device shown in FIG. 4, the first phase difference area 10 and the second phase difference area 12 are alternatively placed. The first phase difference area 10 is disposed further away from the polarizing film 8 than the second phase difference area 12 meaning that the area 10 is disposed nearer to the liquid-crystal cell. Also, in the embodiment shown in FIG. 4, the first phase difference area 10 is disposed so that its slow axis 11 is orthogonal to the transmission axis 9 of the polarizing film 8 (that is, it is in parallel with the absorption axis (not shown) of the first polarizing film 8). Further, the transmission axis 9 of the polarizing film 8 is in parallel with the slow axis 16 of liquid-crystal molecules in the liquid-crystal layer 15 at the black display, thus, the slow axis 11 of the first phase difference area 10 is orthogonal to the slow axis 16 of the liquid-crystal layer 15 at the liquid-crystal black display.

In the liquid crystal display device shown in FIG. 4, as above, the protective film 7*b* and the protective film 19*a* may be absent. If the protective film 7*b* is not disposed, the second phase difference area 12 is necessary to have specific optical properties described later and further a function for protecting the polarizing film 8. If the protective film 7*b* is disposed, the retardation Rth of the protective film in-thickness direction is preferably from −40 to 40 nm, and more preferably from −20 to 20 nm. In addition, the polarizing film 20 is interposed between two protective films 19*a* and 19*b*, but the protective film 19*a* which is nearer to the liquid-crystal layer 15 may be absent. If the protective film 19*a* is disposed, the retardation Rth of the protective film in-thickness direction is preferably from −40 to 40 nm, and more preferably from −20 to 20 nm. The protective films 7*b* and 19*a* are preferably a thin film, and specifically preferable to be 60 μm or less.

In one embodiment shown in FIG. 4, the first phase difference area and the second phase difference area may be disposed on the basis of the liquid-crystal cell position, either between the liquid-crystal cell and viewing side of the polarizing film or between the liquid-crystal cell and the rear side of the polarizing film, but is preferably disposed between the liquid-crystal cell and the rear side of the polarizing film from the yield point of view. Also, the first phase difference area 10 and the second phase difference area 12 (second phase difference film) are preferably disposed at a position nearer to the substrates of the liquid-crystal cell, without intercalating any other film. In any embodiments, the first phase difference area is disposed nearer to the liquid-crystal cell for a configuration of FIG. 4. Herein, a horizontal direction in FIG. 4 is a longitudinal direction.

In embodiments shown in FIGS. 3 and 4, the first phase difference area 10 has in-plane retardation Re of from 60 to 200 nm and an Nz value of greater than 0.8 and less than or equal to 1.5. The second phase difference area 12 has in-plane retardation Re of 50 nm or less and retardation in a thickness-direction Rth, of −300 to −40 nm. A film comprising a cellulose acylate which includes a substituent having a polarizability anisotropy $\Delta\alpha$ of $2.5\times10^{-24}$ $cm^{-3}$ or more is satisfied further in optical properties required for the second phase difference area by controlling a kind of substituents for cellulose acylate and a substitution degree of acyl to a hydroxyl group, and by adjusting preparation conditions. Since such film satisfies the property required for a protective film for a polarizing film, in the FIG. 3 embodiment, although the protective film 7*b* is absent, the decrease in a display characteristic caused by a deterioration of the polarizing film 8 can be reduced even if the film is left under a harsh environment such as under a high temperature or a low humidity, by preparing the polarizing film 8, the first phase difference area 10, and the second phase difference area 12 as in one unit. Also, in the FIG. 4 embodiment, although the protective film 7*b* is absent, the decrease in a display characteristic caused by a deterioration of the polarizing film 8 can be reduced even if the film is left under a harsh environment such as under a high temperature or a low humidity, by preparing the polarizing film 8 and the second phase difference area 12 as in one unit.

The liquid crystal display device of the present invention is not limited to the configuration shown in FIGS. 2 to 4, and may further comprise other members. For example, a color filter may be disposed between the liquid-crystal layer and the polarizing film. Also, an antireflection treatment or a hard coat treatment may be applied to the surface of the protective film for the polarizing film. Configuration members applied with conductive materials may be used. For the transmissive mode, a back light having a light source such as a cold cathode or a hot cathode fluorescent tube, light-emitting diode, field-emission element, or electroluminescent element may be disposed on a back face. In this case, the back light may be disposed upper side or under side in FIGS. 3 and 4, but since it is not so necessary to be put together with the polarizing plate of antireflection treated or antistatic treated that is slightly high in defective rate, the back light is preferably disposed under in the figure. The reflective polarizing plate, a diffuser plate, a prism sheet, or an optical waveguide plate may be also disposed between the liquid-crystal layer and the back light. As above, the liquid crystal display device of the present invention may be a reflective mode, and in such an embodiment, single polarizing plate may be disposed at viewing side and a reflective film may be disposed on a back face or an inner face of the under-side substrate of the liquid-crystal cell. It is possible to dispose a front light having the light source described above at a viewing side of the liquid-crystal cell.

The liquid crystal display device of the present invention include image-direct types, image-projection types, and light modulation types. The embodiments of active-matrix liquid crystal display device comprising a 3 or 2 terminal semiconductor elements such as a TFT or a MIM are especially effective. The embodiments of passive matrix so-called as a time-division driving, liquid crystal display device are effective as well as the above embodiments.

Hereinafter, preferable optical properties for various members useful for the liquid crystal display device of the present invention, materials to be used in the members, and the manufacturing methods will be explained in detail.

[First Phase Difference Area]

In the present invention, the in-plane retardation Re of the first phase difference area is preferably from 60 to 200 nm. In order to effectively reduce the light leakage in a tilt direction, the Re of the first phase difference area is preferably from 70 to 180 nm, and more preferably from 90 to 160 nm. Also, from the viewpoints of the angle tolerances for a lamination with the polarizing plate, yield, and contrast, Nz defined by Nz=Rth/Re+0.5 is preferably more than 0.8 and less than or equal to 1.5, so as to effectively reduce the light leakage in a tilt direction. The Nz of the first phase difference area is preferably from 0.9 to 1.3, and more preferably from 0.95 to 1.2. Such optical properties can be attained by generally known methods such as a stretching treatment of a film or a liquid-crystal layer coating, which will be described later.

The materials and form of the first phase difference area are not essentially particularly limited. For example, any films such as a phase difference film comprising a birefringent polymer film, a film heat-treated after coating a high-molecular compound on a transparent support, and a phase difference film having an optically anisotropic layer formed by coating or transferring a low-molecular or high-molecular liquid-crystal compound on a transparent support, can be used. Also, each of them may be laminated for a use.

The birefringent polymer film which is excellent in controllability of birefringence and transparency, and has an excellent heat-resistance and small photoelasticity is preferable. In this case, the high-molecular material to be used is not particularly limited as long as it is a high molecule capable of giving a uniform uniaxial alignment or biaxial alignment. The materials generally known and capable of forming films by a solution casting method or an extrusion molding method are preferable, and examples include aromatic polymer such as polycarbonate polymer, polyarylate polymer, polyester polymer, polysulfone polymer, etc., polyolefin such as polypropylene, etc., cellulose acylate, and polymers mixed with two or more kinds of those polymers.

The liquid crystal display device of the present invention includes an embodiment that the first phase difference area is not comprising a phase difference layer obtained by stretching an alicyclic structure-containing polymer resin film.

The biaxial alignment of the film can be attained by stretching a film produced by an appropriate method such as a molding method or a casting method, in accordance with a stretching process such as stretching in the longitudinal direction through rolls, stretching in the width direction by a tenter, or biaxial stretching. The film can be also attained by a uniaxial or biaxial stretching in a plane direction, and controlling birefringence of in-thickness direction according to a method of stretching in a thickness-direction. In addition, the film can be attained by adhering a thermal-shrinkage film on a high-molecular polymer film; and aligning the polymer film subjected to a stretching treatment or/and shrinking treatment under the effect of contractile force due to a heat (e.g., Japanese Unexamined Patent Application Publication Nos. 5-157911, 11-125716, 2001-13324). For the longitudinal-direction stretching process through rolls mentioned above, an appropriate heating method such as using heat rolls, heating the atmosphere, or combination of those methods can be adopted. For the biaxial stretching process by a tenter, an appropriate method such as a simultaneous-biaxial stretching method according to a complete tentering process, successive-biaxial stretching method according to a roll-tentering process, etc., can be adopted.

In addition, a film having no ununiform alignment and uneven phase difference is preferable. The thickness thereof can be suitably determined according to a phase difference etc., but in general, the thickness is preferably from 1 to 300 μm, more preferably from 10 to 200 μm, and even more preferably from 20 to 150 μm, from the viewpoint of thinning the film.

The first phase difference area may be a layer formed with fixed liquid-crystal molecules substantially aligned in horizontal (homogeneous) (hereinbelow, sometimes referred to as 'optically anisotropic layer'). The term 'substantially horizontal (homogeneous) alignment of liquid-crystal molecules' means that a mean angle of a director direction of liquid-crystal molecules and a layer plane is within the range of from 0 to 20°. The liquid-crystal molecules are preferably fixed in an alignment state, and preferably fixed by a polymerization. The kind of liquid-crystal compound is not particularly limited as long as it satisfies the above optical properties. For example, an optically anisotropic layer obtained by forming a low-molecular liquid-crystal compound in a nematic alignment in liquid crystal state and then fixing it by a photo-crosslinking or a heat-crosslinking, or an optically anisotropic layer obtained by forming a high-molecular liquid-crystal compound in a nematic alignment in liquid crystal state and then fixing the alignment by cooling, can be used. In the present invention, although a liquid-crystal compound is used for an optically anisotropic layer, since the layer is formed by fixing the compound with a polymerization etc., the optically anisotropic layer no more has to show its liquid crystallinity after being formed as a layer.

The first phase difference area may be an optically anisotropic layer formed of a composition comprising a liquid-crystal compound. As the liquid-crystal compound, a rod-like liquid-crystal compound is preferable. It is preferable that the liquid-crystal compound is fixed in a state of nematic alignment, and more preferable that the compound is fixed by a polymerization reaction. Preferable examples of the rod-like liquid-crystal compound include azomethines, azoxys, cyanobiphenyls, cyanophenyl esters, benzoic acid esters, cyclohexanecarboxylic acid phenyl esters, cyanophenylcyclohexanes, cyano-substituted phenylpyrimidines, alkoxy-substituted phenylpyrimidines, phenyldioxanes, tolans, and alkenylcyclohexylbenzonitriles. Other than these low-molecular liquid-crystal compounds, a high-molecular liquid-crystal compound may also be used. The rod-like liquid-crystal molecules are preferably fixed in the aligned state by a polymerization reaction. The liquid-crystal molecules preferably constitute a substructure which can cause a polymerization or crosslinking reaction by active lights, electron rays, heat, etc. The number of substructure is from 1 to 6, and preferably from 1 to 3. Examples of the polymerizable rod-like liquid-crystal compound include the compounds disclosed in Makromol. Chem., Vol. 190, page 2255 (1989), Advanced Materials. Vol. 5, page 107 (1993), U.S. Pat. Nos. 4,683,327, 5,622,648 and 5,770,107, International Publication Nos. (WO)95/22586, 95/24455, 97/00600, 98/23580 and 98/52905, Japanese Unexamined Patent Application Publication Nos. 1-272551, 6-16616, 7-110469, 11-80081, and 2001-328973.

The optically anisotropic layer can be formed by coating an alignment film with a coating liquid comprising a liquid-crystal compound and, if necessary, a polymerization initiator or an optional component. As a solvent used for preparing the coating liquid, an organic solvent is preferably used. Examples of the organic solvent include amide (e.g., N,N-dimethylformamide), sulfoxide (e.g., dimethyl sulfoxide), heterocyclic compounds (e.g., pyridine), hydrocarbons (e.g., benzene, hexane), alkyl halide (e.g., chloroform, dichloromethane), ester (e.g., methyl acetate, butyl acetate), ketone (e.g., acetone, methyl ethyl ketone), and ether (e.g., tetrahydrofuran, 1,2-dimethoxyethane). Alkyl halide and ketone are preferred. Two or more kinds of organic solvents may be used in combination. The coating liquid can be applied by known techniques (e.g., extrusion coating, direct gravure coating, reverse gravure coating, and die coating). The thickness of the optically anisotropic layer is preferably from 0.5 to 100 μm, and more preferably from 0.5 to 30 μm.

The aligned liquid-crystal molecules are preferably fixed in the alignment state by polymerization reaction. The polymerization reaction includes thermal polymerization reactions employing a thermal polymerization initiator and photo-polymerization reactions employing a photo-polymerization initiator, and the photo-polymerization reaction is preferable. Examples of the photo-polymerization initiators include α-carbonyl compounds (disclosed in each specification of U.S. Pat. Nos. 2,367,661 and 2,367,670), acyloin ether (disclosed in a specification of U.S. Pat. No. 2,448,828), α-hydrocarbon-substituted aromatic acyloin compounds (disclosed in a specification of U.S. Pat. No. 2,722,512), polynuclearquinone compounds (disclosed in each specification of U.S. Pat. Nos. 3,046,127 and 2,951,758), combinations of triarylimidazole dimers and p-aminophenyl ketones (disclosed in a specification of U.S. Pat. No. 3,549,367), acridine and phenadine compounds (disclosed in each specification of Japanese Unexamined Patent Application Publication No. 60-105667 and U.S. Pat. No. 4,239,850), and oxadiazole compounds (disclosed in a specification of U.S. Pat. No. 4,212,970). The amount of photo-polymerization initiator used is preferably from 0.01 to 20 mass %, more preferably from 0.5 to 5 mass %, of the solid portion of the coating liquid. Irradiation for polymerization of liquid-crystal molecules is preferably conducted with ultraviolet radiation. The irradiation energy is preferably from 20 to 5,000 $mJ/cm^2$, more preferably from 100 to 800 $mJ/cm^2$. Irradiation may be conducted under heated conditions to promote the photo-polymerization reaction. A protective layer may be disposed on an optically anisotropic layer.

In addition to the liquid-crystal compound, plasticizers, surfactants or polymerizable monomers can be also used to achieve an improvement in uniformity of a coating film, strength of a coating film, alignment ability of liquid-crystal molecules or the like. Such materials preferably are compatible with a liquid-crystal compound and do not obstruct the alignment.

The polymerizable monomer can be exemplified by radical-polymerizable or cation-polymerizable compounds. Preferably, the monomer is a radical-polymerizable compound having a plural function group, and is preferably a compound which can copolymerize with the above polymerizable group-containing liquid-crystal compound. Examples include those disclosed in sections [0018] to [0020] in the specification of Japanese Unexamined Patent Application Publication No. 2002-296423. The adding amount of the compound is usually from 1 to 50 mass %, and preferably from 5 to 30 mass %, with respect to the liquid-crystal molecules.

The surfactant can be exemplified by any known surfactants, and in particular, it is preferably a fluorine-based surfactant. In specific, examples include compounds disclosed in sections [0028] to [0056] in the specification of Japanese Unexamined Patent Application Publication No. 2001-330725, and compounds disclosed in sections [0069] to [0126] in the specification of Japanese Unexamined Patent Application Publication No. 2005-62673.

The polymer to be used with a liquid-crystal compound is preferably a polymer which can increase a viscosity of a coating liquid. An example of the polymer includes cellulose ester. Preferred examples of the cellulose ester include those disclosed in the section [0178] in the specification of Japanese Unexamined Patent Application Publication No. 2000-155216. In order to avoid obstructing the alignment of the liquid-crystal compound, the adding amount of the polymer is preferably from 0.1 to 10 mass %, and more preferably from 0.1 to 8 mass %, with respect to the liquid-crystal molecules.

[Alignment Film]

When forming the optically anisotropic layer, it is preferable to employ an alignment film to define an alignment direction of liquid-crystal molecules. The alignment film can be provided by means of following such as rubbing treatment of an organic compound (preferably a polymer), oblique vapor deposition of an inorganic compound, formation of a layer with microgrooves, or the deposition of an organic compound (e.g., co-tricosanoic acid, dioctadecylmethylammonium chloride, and methyl stearate) by the Langmuir-Blodgett (LB film) method. The alignment film is preferably formed by a rubbing treatment of polymer. The rubbing treatment is conducted by rubbing the surface of an alignment film for several times with paper or cloth in one direction. It is preferable to use a cloth in which a fabric having a similar length and width is uniformly filled. Once liquid-crystal molecules of optically anisotropic layer are fixed in the alignment on an alignment film, the alignment state of the liquid-crystal molecules can be maintained even if the alignment film is removed. That is, the alignment film is essential in the process of producing a phase difference plate to align liquid-crystal molecules, but is not essential in the produced phase difference plate. When the alignment film is disposed between a transparent support and an optically anisotropic layer, an undercoating layer (adhesion layer) can be further disposed between the transparent support and the alignment film.

The first phase difference area may be formed on a support. The support is preferably transparent, and in particular, preferably has a light transmission of 80% or more. The support is preferably those having a small wavelength dispersion, and in particular, preferably has a Re400/Re700 ratio of less than 1.2. Of these, a polymer film is preferable. For example, a film, which is the second phase difference area described later, comprising cellulose acylate which includes a substituent having a polarizability anisotropy $\Delta\alpha$ of $2.5\times10^{-24}$ $cm^{-3}$ or more is used as a support, and thereon, an optically anisotropic layer which is the first phase difference area may be formed. The support preferably has a small optical anisotropy, and has an in-plane retardation (Re) of preferably 20 nm or less, more preferably 10 nm or less, and most preferably 5 nm or less.

Examples of a polymer film forming the support include films of cellulose ester, polycarbonate, polysulfone, polyethersulfone, polyacrylate, and polymethacrylate. Among these, cellulose ester film is preferred, acetyl cellulose film is more preferred, and triacetyl cellulose film is much more preferred. The polymer film is preferably formed by a solution casting method. The thickness of the transparent support is preferably from 20 to 500 μm, and more preferably from 40 to 200 μm. In order to improve adhesion between the transparent substrate and a layer formed thereon (an adhesion layer, an alignment film, or a phase difference layer), the transparent support may be subjected to a surface treatment (e.g., glow discharge treatment, corona discharge treatment, UV irradiation treatment, or flame treatment). An adhesion layer (an undercoating layer) may be formed on the transparent support. For the transparent support and long transparent support, in order to improve a slide ability in a feeding step or to prevent an adhesion of the surface to the rear surface after being rolled up, a polymer layer containing inorganic particles having an average particle diameter of about 10 to 100 nm in an amount of 5 to 40% by weight with respect to the solid ingredients is preferably formed on one side of the support, by coating or co-flow casting method.

An optically anisotropic layer may be formed on a temporary support, and then the optically anisotropic layer may be transferred on a film, which is the second phase difference area described later, comprising cellulose acylate which includes a substituent having a polarizability anisotropy $\Delta\alpha$ of $2.5\times10^{-24}$ $cm^{-3}$ or more. Further, not being limited to a single optically anisotropic layer, a plurality of optically anisotropic layers can be laminated to constitute the first phase difference area showing the above-mentioned optical properties. In addition, the first phase difference area may be constituted by a whole laminated body with a support and optically anisotropic layers.

[Second Phase Difference Area]

In the present invention, the second phase difference area has retardation in a thickness-direction Rth of from −200 to −50 nm, preferably from −180 to −60 nm, and more preferably from −150 to −70 nm. The in-plane retardation Re of the second phase difference area is 50 nm or less, preferably from 0 to 30 nm, and more preferably from 0 to 10 nm.

In the present invention, in order to attain the above-mentioned optical properties so that an optical axis is not included in a film plane, the second phase difference area preferably comprises a substituent having a high polarizability anisotropy as a substituent coupling to three hydroxyl groups in a β glucose ring, which is the structural unit of cellulose acylate. By introducing a substituent having a high polarizability anisotropy in cellulose acylate, and controlling other substituents and substitution degree, an optically-compensatory film in which the refractive index becomes maximum in a film thickness-direction can be obtained.

(Interterminal Distance and Polarizability Anisotropy of Substituent)

The interterminal distance and polarizability anisotropy of a substituent of cellulose derivative used in the present invention are calculated by using Gaussian 03(Revision B.03, U.S. Gaussian Corporation software). The distance between the most-distanced atoms is calculated as the interterminal distance after optimizing the structure with the B3LYP/6-31G* level calculation. For the polarizability anisotropy, the polarizability is calculated with B3LYP/6-311+G** level by using the structure optimized with B3LYP/6-31G* level, the obtained polarizability tensor is diagonalized, and a diagonal component is used to calculate the polarizability anisotropy. In the calculation of the interterminal distance and polarizability anisotropy of the substituent in the present invention, the substituent coupled with hydroxyl groups in a β glucose ring, which is a structural unit of cellulose derivative, is found by a calculation based on a partial structure having an oxygen atom of a hydroxyl group.

The polarizability anisotropy of cellulose derivative used in the present invention is defined by the following mathematical formula (1).

$$\Delta\alpha=\alpha x-(\alpha y+\alpha z)/2 \qquad \text{Mathematical Expression (1)}$$

(wherein αx, αy, and αz are each a characteristic value obtained after diagonalizing a polarizability tensor, and is $\alpha x \geqq \alpha y \geqq \alpha z$).

The polarizability anisotropy relates to manifestation of the refractive index in a direction orthogonal to stretching when stretching a film. That is, when it is low in polarizability anisotropy, a slow axis occurs in a stretching direction, and when it is high, a slow axis occurs in a direction orthogonal to stretching. For the purpose of obtaining an optically-compensatory film in which the retardation in a film thickness-direction of the present invention is a negative value, the higher polarizability anisotropy is preferable, and is preferably $2.5\times10^{-24}$ $cm^{-3}$ or more, more preferably $3.5\times10^{-24}$ $cm^{-3}$ or more, particularly preferably $4.5\times10^{-24}$ $cm^{-3}$ or more.

The preferred cellulose derivative of the present invention is preferably mixed acid ester having an acyl fatty acid group and a substituted or nonsubstituted aromatic acyl group. As the substituted or nonsubstituted aromatic acyl group, a group represented by the following Formula (A) can be exemplified.

Formula (A)

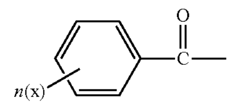

First, Formula (A) will be explained. Here, X is the substituent, and the examples of the substituent include a halogen atom, cyano, an alkyl group, an alkoxy group, an aryl group, an aryloxy group, an acyl group, a carbonamide group, a sulfonamide group, an ureido group, an aralkyl group, nitro, an alkoxycarbonyl group, an aryloxycarbonyl group, an aralkyloxycarbonyl group, a carbamoyl group, a sulfamoyl group, an acyloxy group, an alkenyl group, an alkynyl group, an alkylsulfonyl group, an arylsulfonyl group, an alkyloxysulphonyl group, an aryloxysulfonyl group, an alkylsulfonyloxy group and an aryloxysulfonyl group, —S—R, —NH—CO—OR, —PH—R, $—P(—R)_2$, —PH—O—R, —P(—R)(—O—R), $—P(—O—R)_2$, $—PH(=O)—R—P(=O)(—R)_2$, —PH(=O)—O—R, —P(=O)(—R)(—O—R), $—P(=O)(—O—R)_2$, —O—PH(=O)—R, $—O—P(=O)(—R)_2—O—PH(=O)—O—R$, —O—P(=O)(—R)(—O—R), $—O—P(=O)(—O—R)_2$, —NH—PH(=O)—R, —NH—P(=O)(—R)(—O—R), $—NH—P(=O)(—O—R)_2$, $—SiH_2—R$, $—SiH(—R)_2$, $—Si(—R)_3$, $—O—SiH_2—R$, $—O—SiH(—R)_2$ and $—O—Si(—R)_3$. The above mentioned R is an aliphatic group, an aromatic group or a heterocycle group. The number of substituent is preferably 1 to 5, more preferably 1 to 4, even more preferably 1 to 3, most preferably 1 to 2. For substituent, a halogen atom, cyano, an alkyl group, an alkoxy group, an aryl group, an aryloxy group, an acyl group, a carbonamide group, a sulfonamide group, and an ureido group are preferable, a halogen atom, cyano, an alkyl group, an alkoxy group, an aryloxy group, an acyl group, and a carbonamide group are more preferable, a halogen atom, cyano, an alkyl group, an alkoxy group, and an aryloxy group are even more preferable, a halogen atom, an alkyl group, and an alkoxy group are most preferable.

The above mentioned halogen atoms include fluorine atom, chlorine atom, bromine atom and iodine atom. The above mentioned alkyl group may have cyclic structure or branch structure. The number of carbon atom of alkyl group is preferably 1 to 20, more preferably 1 to 12, even more preferably 1 to 6, most preferably 1 to 4. The examples of alkyl groups include methyl, ethyl, propyl, isopropyl, butyl, t-butyl, hexyl, cyclohexyl, octyl and 2-ethylhexyl. The above mentioned alkoxy group may have cyclic structure or branch structure. The number of carbon atom of alkoxy group is preferably 1 to 20, more preferably 1 to 12, even more preferably 1 to 6, most preferably 1 to 4. The alkoxy group may additionally be substituted with another alkoxy group. The examples of alkoxy groups include methoxy, ethoxy, 2-methoxyethoxy, 2-methoxy-2-ethoxyethoxy, butyloxy, hexyloxy and octyloxy.

The number of carbon atom of aryl group is preferably 6 to 20, more preferably 6 to 12. The examples of aryl group include phenyl and naphthyl. The number of carbon atom of aryloxy group is preferably 6 to 20, more preferably 6 to 12.

The examples of aryloxy group include phenoxy and naphthoxy. The number of carbon atom of acyl group is preferably 1 to 20, more preferably 1 to 12. The examples of acyl group include formyl, acetyl and benzoyl. The number of carbon atom of carbonamide group is preferably 1 to 20, more preferably 1 to 12. The examples of carbonamide group include acetamide and benzamide. The number of carbon atom of sulfonamide group is preferably 1 to 20, more preferably 1 to 12. The examples of sulfonamide group include methane sulfonamide, benzene sulfonamide and p-toluene sulfonamide. The number of carbon atom of ureido group is preferably 1 to 20, more preferably 1 to 12. The examples of ureido group include (unsubstituted) ureido.

The number of carbon atom of aralkyl group is preferably 7 to 20, more preferably 7 to 12. The examples of aralkyl group include benzil, phenethyl and naphthylmethyl. The number of carbon atom of alkoxycarbonyl group is preferably 1 to 20, more preferably 2 to 12. The examples of alkoxycarbonyl group include methoxycarbonyl. The number of carbon atom of aryloxycarbonyl group is preferably 7 to 20, more preferably 7 to 12. The examples of aryloxycarbonyl group include phenoxycarbonyl. The number of carbon atom of aralkyloxycarbonyl group is preferably 8 to 20, more preferably 8 to 12. The examples of aralkyloxycarbonyl group include benzyloxycarbonyl. The number of carbon atom of carbamoyl group is preferably 1 to 20, more preferably 1 to 12. The examples of carbamoyl group include (unsubstituted) carbamoyl, and N-methylcarbamoyl. The number of carbon atom of sulfamoyl group is preferably less than 20, more preferably less than 12. The examples of sulfamoyl group include (unsubstituted) sulfamoyl, and N-methylsulfamoyl. The number of carbon atom of acyloxy group is preferably 1 to 20, more preferably 2 to 12. The examples of acyloxy group include acetoxy, benzoyloxy.

The number of carbon atom of alkenyl group is preferably 2 to 20, more preferably 2 to 12. The examples of alkenyl group include vinyl, allyl and isopropenyl. The number of carbon atom of alkynyl group is preferably 2 to 20, more preferably 2 to 12. The examples of alkynyl group include thienyl. The number of carbon atom of alkynylsulfonyl group is preferably 1 to 20, more preferably 1 to 12. The number of carbon atom of arylsulfonyl group is preferably 6 to 20, more preferably 6 to 12. The number of carbon atom of alkyloxysulfonyl group is preferably 1 to 20, more preferably 1 to 12. The number of carbon atom of aryloxysulfonyl group is preferably 6 to 20, more preferably 6 to 12. The number of carbon atom of alkylsulfonyloxy group is preferably 1 to 20, more preferably 1 to 12. The number of carbon atom of aryloxysulfonyl group is preferably 6 to 20, more preferably 6 to 12.

Next, with regard to the fatty acid ester residue in the cellulose mixed acid ester of the invention, the aliphatic acyl group has 2 to 20 carbon atoms, and specifically, acetyl, propionyl, butyryl, isobutyryl, valeryl, pivaloyl, hexanoyl, octanoyl, lauroyl, stearoyl and the like may be mentioned. Preferred are acetyl, propionyl and butyryl, and particularly preferred is acetyl. According to the invention, the aliphatic acyl group is meant to be further substituted, and substituents therefore may be exemplified by those listed as X in Formula (A) described in the above.

In addition, number (n) of substituent X which substitutes to an aromatic ring in Formula (A) is 0 or 1 to 5, preferably 1 to 3, and particularly preferably 1 or 2.

When the number of substituent which substitutes to an aromatic ring is 2 or more, they may be same with or different from each other, or may be combined with each other to form a condensed polycyclic compound (e.g., naphthalene, indene, indane, phenanthrene, quinoline, isoquinoline, chromene, chroman, phthalazine, acridine, indole, indoline, etc.). Specific examples of the aromatic acyl group represented by Formula (A) is described as follows, and preferably No. 1, 3, 5, 6, 8, 13, 18, 28, more preferably No. 1, 3, 6, 13.

For the substitution of an aromatic acyl group to the hydroxyl group of cellulose, generally a method of using a symmetric acid anhydride derived from an aromatic carboxylic acid chloride or an aromatic carboxylic acid, and a mixed acid anhydride may be mentioned. Particularly preferably, a method of using an acid anhydride derived from an aromatic carboxylic acid (described in Journal of Applied Polymer Science, Vol. 29, 3981-3990 (1984)) may be mentioned. For the method of preparing the cellulose mixed acid ester compound of the invention among the methods described above, (1) a method of first preparing a cellulose fatty acid monoester or diester, and then introducing the aromatic acyl group represented by Formula (A) to the remaining hydroxyl groups, (2) a method of directly reacting a mixed acid anhydride of an aliphatic carboxylic acid and an aromatic carboxylic acid with cellulose, and the like may be mentioned. In the first step of (1), the method itself for preparing a cellulose fatty acid ester or diester is a well known method; however, the reaction of the second step in which an aromatic acyl group is further introduced to the ester or diester, is performed at a reaction temperature of preferably 0 to 100° C., and more preferably 20 to 50° C., for a reaction time of preferably 30 minutes or longer, and more preferably 30 to 300 minutes, although the reaction conditions may vary depending on the type of the aromatic acyl group. Also, for the latter method of using a mixed acid anhydride, the reaction conditions may vary depending on the type of the mixed acid anhydride, the reaction temperature is preferably 0 to 100° C., and more preferably 20 to 50° C., and the reaction time is preferably 30 to 300 minutes, and more preferably 60 to 200 minutes. For both of the above-described reactions, the reaction may be performed either without solvent or in a solvent, but the reaction is preferably performed using a solvent. A solvent that can be used may be dichloromethane, chloroform, dioxane or the like.

The substitution degree in the present invention is said to be 3.0 when 100% of hydroxyl groups of cellulose are substituted. The substitution degree can be obtained by a $C^{13}$-NMR peak intensity of carbonyl carbon in an acyl group.

In the present invention, in the case of cellulose fatty acid monoester, the substitution degree of the aromatic acyl group is 2.0 or less, preferably 0.1 to 2.0, more preferably 0.1 to 1.0, with respect to remained hydroxyl groups. In the case of cellulose fatty acid diester (diacetic acid cellulose), the substitution degree is 1.0 or less, preferably 0.1 to 1.0, with respect to remained hydroxyl groups. The total substitution degree PA of cellulose acylate is preferably 2.4 to 3.

To give a negative Rth, a substituent having a high polarizability anisotropy is preferably introduced to a second or third position of β-glucose ring. The second and third positions are assumed that they are low in a degree of freedom than the sixth position to which a substituent is introduced via a carbon atom from a β-glucose ring, and introduced substituents are easy in film thickness-direction alignment, and thus can be easily aligned in a film thickness-direction by a stretching treatment.

Hereinbelow, specific examples of the aromatic acyl group represented by Formula (A) will be shown, but the present invention is not limited thereto.

1
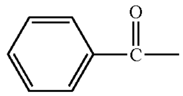
2
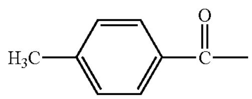
3
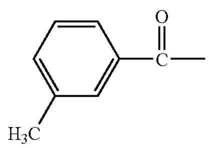
4
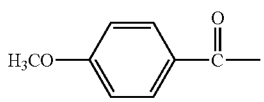
5
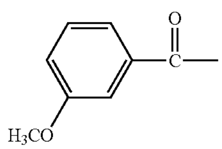
6
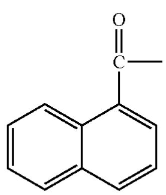
7
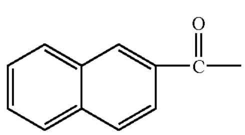
8
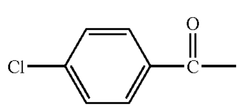
9
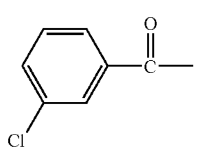
10
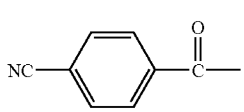
11
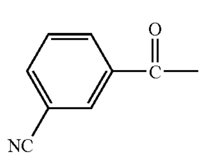
-continued
12
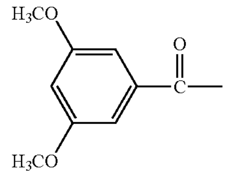
13
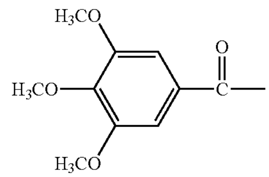
14
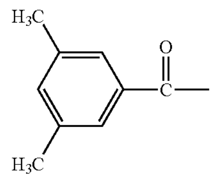
15
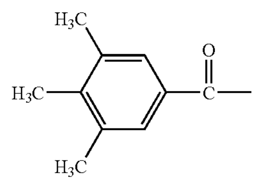
16
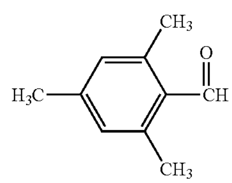
17
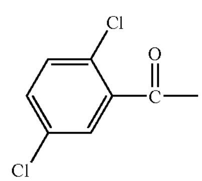
18
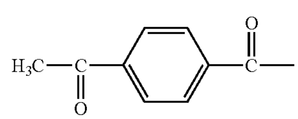
19
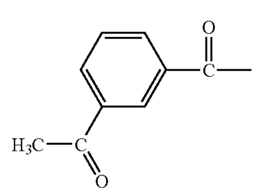
20
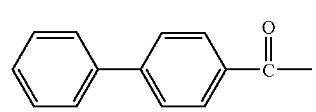
21
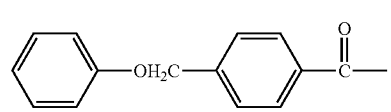

-continued
22
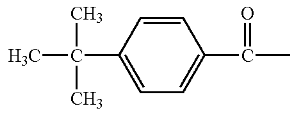
23
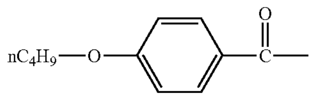
24
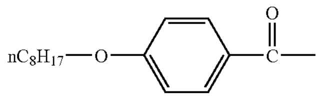
25
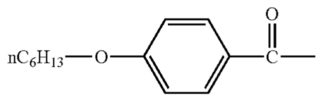
26
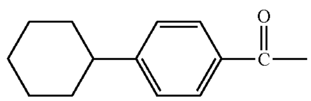
27
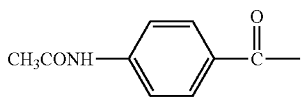
28
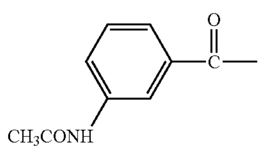
29
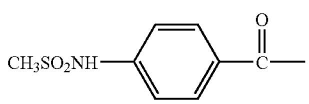
30
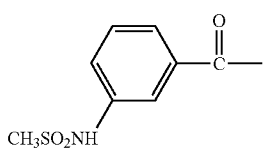
31
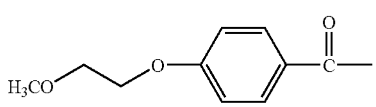
32
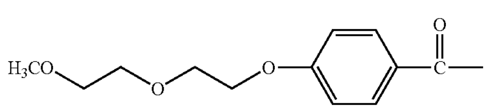
33
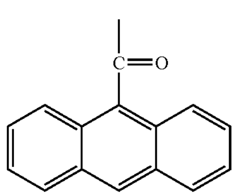
34
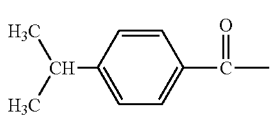
-continued
35
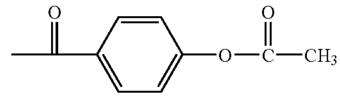
36
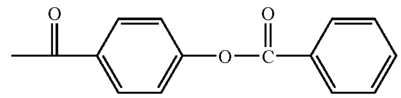
37
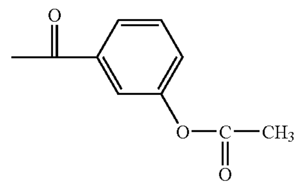
38
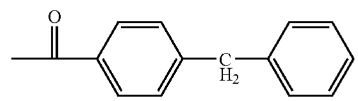
39
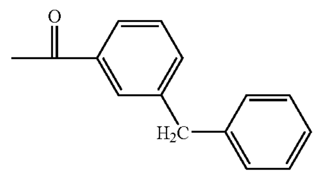
40
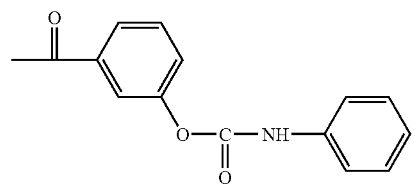
41
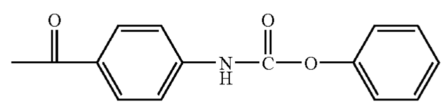
42
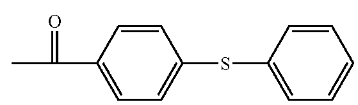
43
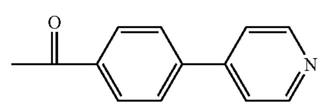
44
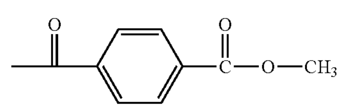
45
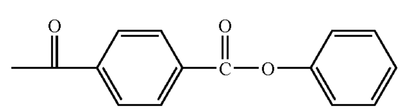
46
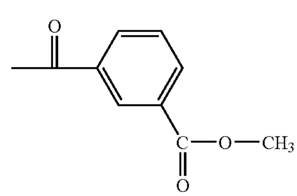

-continued

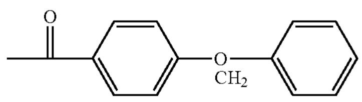

47

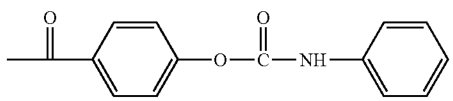

48

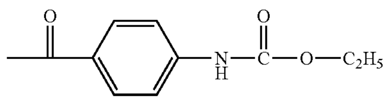

49

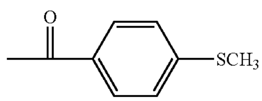

50

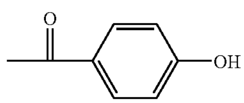

51

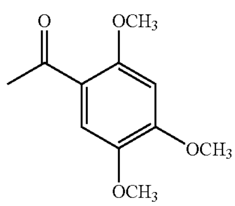

52

The cellulose derivative used for the invention preferably has a mass average degree of polymerization of 350 to 800, and more preferably has a mass average degree of polymerization of 370 to 600. The cellulose derivative used for the invention preferably has a number average molecular weight of 70,000 to 230,000, more preferably has a number average molecular weight of 75,000 to 230,000, and most preferably has a number average molecular weight of 78,000 to 120,000.

The cellulose derivative used for the invention can be synthesized employing an acid anhydride, an acid chloride or a halide as an acylating agent, alkylating agent or arylating agent. When an acid anhydride is used as the acylating agent, an organic acid (for example, acetic acid) or methylene chloride is used as the reaction solvent. For the catalyst, a protic catalyst such as sulfuric acid is used. When an acid chloride is used as the acylating agent, an alkaline compound is used as the catalyst. In the most general method of synthesis from an industrial viewpoint, cellulose ester is synthesized by esterifying cellulose with a mixed organic acid component containing an organic acid (acetic acid, propionic acid, butyric acid) which correspond to an acetyl group and another acyl group, or such an acid anhydride (acetic anhydride, propionic anhydride, butyric anhydride). In one of general methods for introducing an alkyl group or an aryl group as the substituent, a cellulose ester is synthesized by dissolving cellulose in an alkali solution, and then esterifying the cellulose to an alkyl halide compound, an aryl halide compound, or the like.

In this method, there are many cases that cellulose such as cotton linter, wood pulp is activated in the organic acid such as acetic acid, and then esterified in such blending organic acid constituent above with the sulfuric acid catalyst. An organic acid anhydride constituent is generally used in excessive quantity for quantity of hydroxy group existing in cellulose. In this esterification process, hydrolysis reaction (depolymerization reaction) of cellulose main chain β1→4-glycosidic bond is performed as well as esterification reaction. When hydrolysis reaction of main chain advances, degree of polymerization of cellulose ester decrease, and resulting this, properties of a cellulose ester film decrease. Therefore it is preferable to determine that reaction conditions such as reaction temperature in consideration for degree of polymerization and molecular weight of obtained cellulose ester.

It is important to regulate the highest temperature in an esterification reaction process in lower than 50° C. to obtain cellulose ester that degree of polymerization is high (molecular weight is large). The highest temperature is regulated to be preferably from 35 to 50° C., more preferably from 37 to 47° C. The condition that reaction temperature is higher than 35° C. is preferable, as the esterification reaction progress smoothly. The condition that reaction temperature is lower than 50° C. is preferable, as the inconvenience such that degree of polymerization of cellulose ester decrease dose not occur.

After reaction termination, inhibiting increase of the temperature to stop the reaction, further decrease of degree of polymerization can be inhibited, and cellulose ester that degree of polymerization is high can be synthesized. More specifically, after reaction, adding the reaction terminator (for example, water, acetic acid), the surplus acid anhydride which did not participate in esterification reaction hydrolyzes to give the corresponding organic acid as side product. Temperature in reaction apparatus rises because of intense exothermic heat due to this hydrolysis reaction. If addition speed of reaction terminator is not too fast, due to sudden exothermic heat exceeding the ability of cooling of reaction apparatus, hydrolysis reaction of cellulose main chain is remarkably performed, according to this, problem such that degree of polymerization of obtained cellulose ester falls does not occur. In addition, a part of a catalyst couples with cellulose during esterification reaction, the most part thereof that dissociate from cellulose during addition of reaction terminator. If addition speed of reaction terminator is not too fast then, enough reaction time is obtained so that a catalytic substance dissociate from cellulose, and it is hard to produce a problem such that one part of catalyst stay in cellulose in coupled condition. As for the cellulose ester which a part of the catalyst of strong acid couples, stability is so bad that it is easily break down with heat of drying time of product, and degree of polymerization decrease. For these reasons, after esterification reaction, it is desirable to stop reaction by adding reaction terminator, taking time, preferably more than 4 minutes, more preferably for 4 to 30 minutes. In addition, if addition time of reaction terminator is less than 30 minutes, it is preferable because problems such as decrease of industrial producing ability do not occur.

As reaction terminator, water and alcohol which generally break acid anhydride down were used. But, in the present invention, in order to prevent triester precipitation that solubility to various organic solvent is low, mixture of water and organic acid was preferably used as reaction terminator. When esterification reaction is performed in a condition such as the above, cellulose ester having the high molecular weight whose mass average degree of polymerization is higher than 500 can be easily synthesized.

In order to give a desired retardation in a thickness-direction Rth, the cellulose acylate film to be used for the present invention may use a compound capable of reducing Rth (also known as an Rth decreasing agent). The compound capable of reducing the Rth is included in the amount from 0.01 to 30 mass %, preferably from 0.1 to 25 mass %, more preferably from 0.1 to 20 mass %, of the solid portion of the cellulose acylate.

The compound capable of reducing Rth which is sufficiently compatible with cellulose acylate and the compound itself is not in a rod-like or plane structure, is advantageous. In specific, when a plurality of plane functional groups such as an aromatic group is comprised, a structure having those functional groups in a non-planar form and not in a one-planar form is advantageous. For the process for producing the cellulose acylate film to be used for the present invention, among the compounds capable of controlling the in-plane or in-thickness direction alignment of cellulose acylate in a film and capable of reducing an optical anisotropy, a compound having an octanol-water partition coefficient (log P value) of 0 to 7 is preferable. A compound having a log P value of 7 or less is excellent in compatibility with cellulose acylate and hardly causes a film clouding and crumbling. A compound having a log P value of 0 or less has a suitable hydrophilicity, and thus improves the water-resisting property of a cellulose acylate film. The log P value is preferably in the range of from 1 to 6 and particularly preferably in the range of from 1.5 to 5.

The measurement of octanol-water partition coefficient (log P value) can be carried out by a shake-flask method disclosed in JIS Japanese Industrial Standards Z 7260-107 (2000). The octanol-water partition coefficient (log P value) can also be estimated by a computational chemical method or an empirical method instead of the experimental measurement. As the computational method, a Crippen's fragmentation method (J. Chem. Inf. Comput. Sci., 27, 21 (1987)); a Viswanadhan's fragmentation method (J. Chem. Inf. Comput. Sci., 29, 163 (1989)); and a Broto's fragmentation method (Eur. J. Med. Chem.-Chim. Theor., 19, 71 (1984)); etc., are preferably used, and the Crippen's fragmentation method (J. Chem. Inf. Comput. Sci., 27, 21 (1987)) is more preferable. When the log P value of a certain compound differs when measured according to a measuring method or a computational method, the Crippen's fragmentation method can be preferably used to determine whether the compound is within the range of the present invention or not.

The compound capable of reducing Rth may or may not comprise an aromatic group. The compound capable of reducing the optical anisotropy has a molecular weight of preferably from 150 or more to 3000 or less, also preferably from 170 or more to 2000 or less, and particularly preferably from 200 or more to 1000 or less. If the molecular weight is within the above range, the compound may be a specific monomer structure, or may be a polymer structure which is an oligomer structure where the plural monomer units are bonded.

The compound capable of reducing Rth is preferably a liquid at 25° and a solid having a melting point of from 25° to 250°, and more preferably is a liquid at 25° and a solid having a melting point of from 25° to 200°. The compound capable of reducing the optical anisotropy preferably does not sublimate during a dope casting or drying in the process for producing a cellulose acylate film.

The compound capable of reducing Rth may be used alone or as a mixture of two or more kinds of compounds mixed in an arbitrary ratio. The timing of adding the compound capable of reducing the optical anisotropy may be at any time during the dope preparation process, and may be added at last in the dope preparation process.

In the compound capable of reducing Rth, the average content ratio of the compound in 10% part of the total film-thickness from the surface of at least one side is 80 to 99% of the average content ratio of the compound in central part of the cellulose acylate film. The abundance of the compound of the present invention, for example, can be obtained by measuring the amount of compound on a surface or in a central part according to a method employing the infrared absorption spectrum disclosed in Japanese Unexamined Patent Application Publication No. 8-57879.

Hereinbelow, specific examples of the compound capable of reducing the optical anisotropy of a cellulose acylate film which is preferably used in the present invention will be shown, but the present invention is not limited to these compounds.

Formula (B):

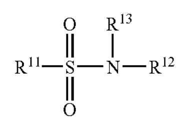

In the above Formula (B), $R^{11}$ is an alkyl group or an aryl group; and $R^{12}$ and $R^{13}$ each independently is a hydrogen atom, an alkyl group, or an aryl group. The total carbon atoms in $R^{11}$, $R^{12}$, and $R^{13}$ are particularly preferably 10 or more.

The above alkyl group and aryl group may have a substituent, and preferable examples of the substituent include a fluorine atom, an alkyl group, an aryl group, an alkoxy group, a sulfone group, and a sulfonamide group, and particularly preferable examples include an alkyl group, an aryl group, an alkoxy group, a sulfone group, and a sulfonamide group.

The alkyl group may be a linear, branched, or cyclic form, and has preferably 1 to 25 carbon atom(s), more preferably 6 to 25 carbon atoms, and particularly preferably 6 to 20 carbon atoms (for example, methyl, ethyl, propyl, isopropyl, butyl, isobutyl, t-butyl, amyl, isoamyl, t-amyl, hexyl, cyclohexyl, heptyl, octyl, bicyclooctyl, nonyl, adamanthyl, decyl, t-octyl, undecyl, dodecyl, tridecyl, tetradecyl, pentadecyl, hexadecyl, heptadecyl, octadecyl, nonadecyl, didecyl, etc.).

The aryl group has preferably 6 to 30 carbon atoms, and particularly preferably 6 to 24 carbon atoms (for example, phenyl, biphenyl, terphenyl, naphthyl, binaphthyl, triphenylphenyl, etc.). Preferred examples of the compound represented by Formula (B) will be described below, but the present invention is not limited to these specific examples.

(101)

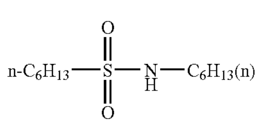

(102)

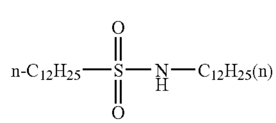

-continued
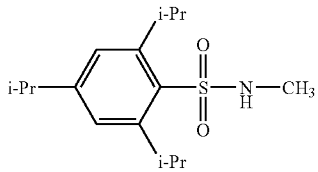
(103)
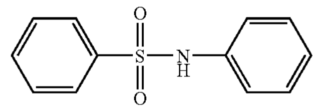
(104)
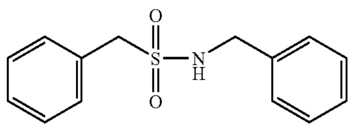
(105)
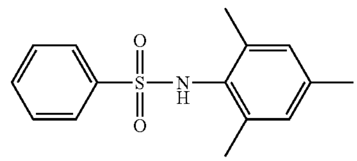
(106)
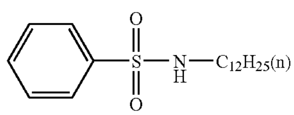
(107)
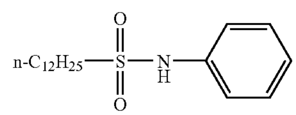
(108)
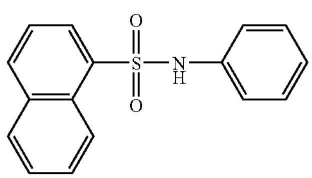
(109)
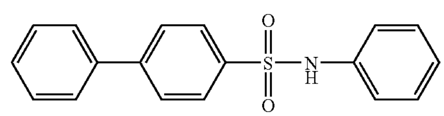
(110)
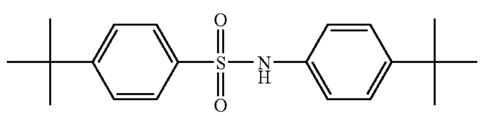
(111)
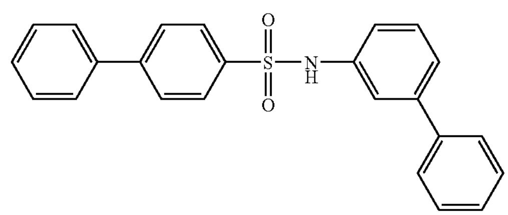
(112)
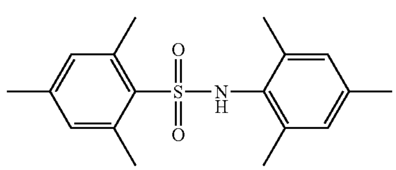
(113)
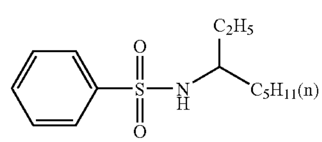
(114)
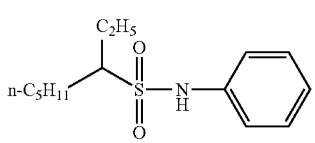
(115)
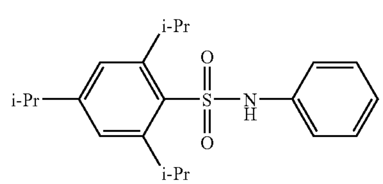
(116)
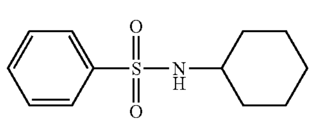
(117)
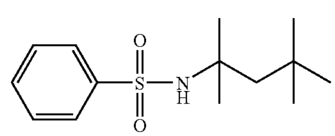
(118)
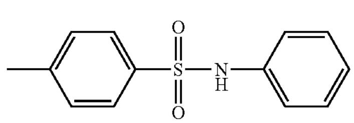
(119)
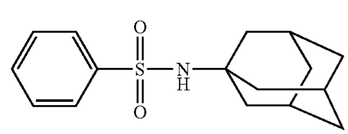
(120)

-continued
(121)
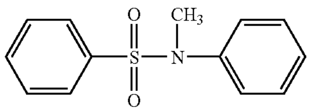
(122)
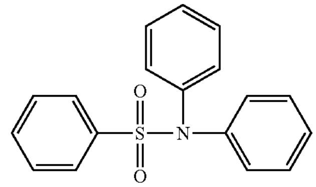
(123)
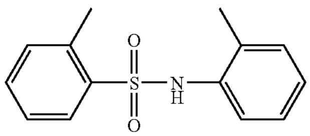
(124)
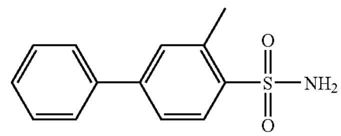
(125)
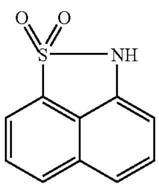
(126)
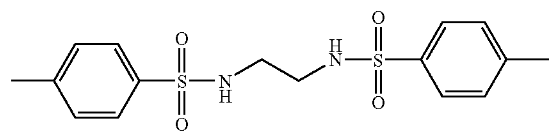
(127)
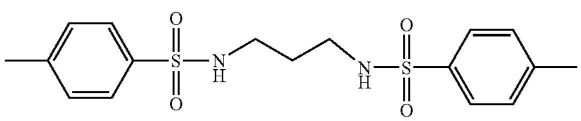
(128)
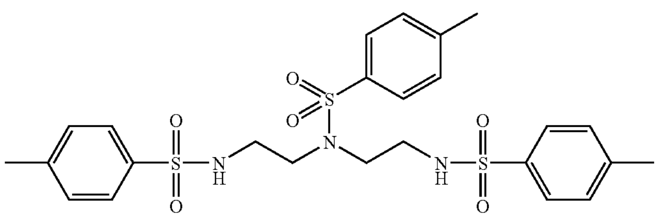
(129)
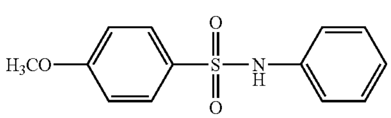
(130)
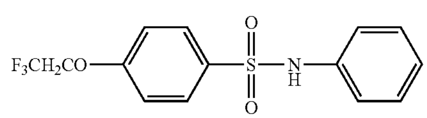
(131)
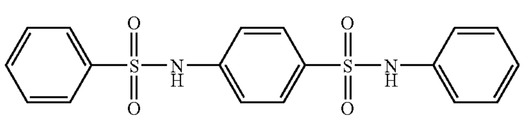
(132)
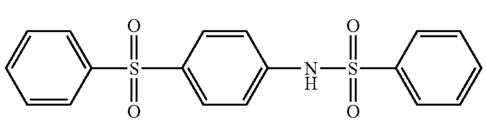
(133)
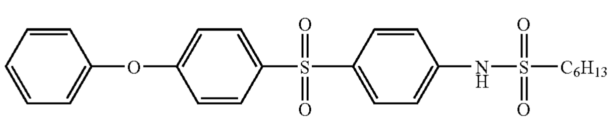
(134)
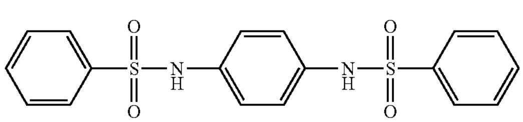

-continued
(135)
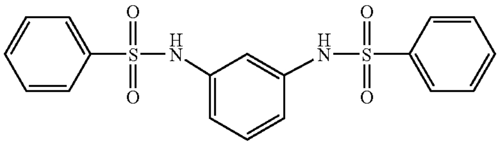
(136)
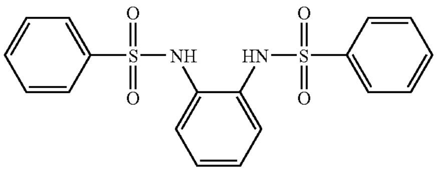
(137)
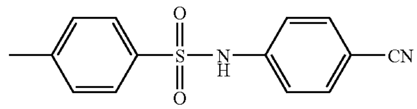
(138)
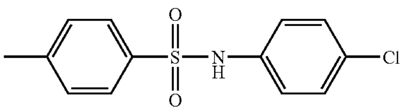
(139)
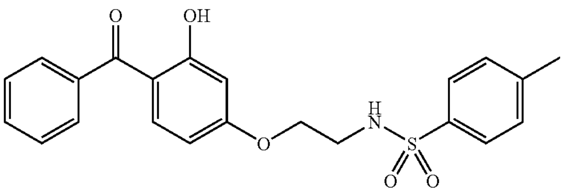
(140)
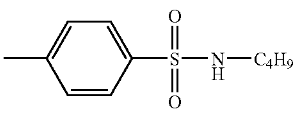
(141)
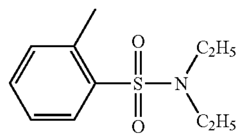
(142)
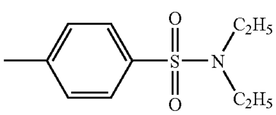
(143)
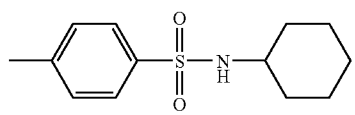
(144)
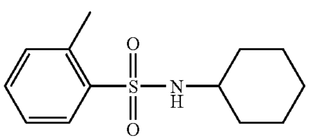
(145)
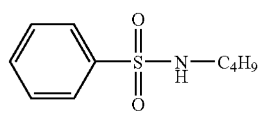
(146)
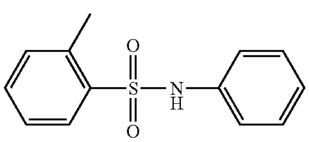
(147)
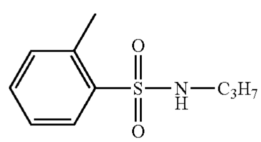
(148)
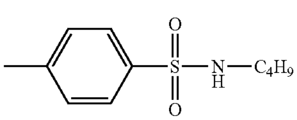
(149)
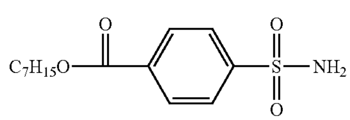
(150)
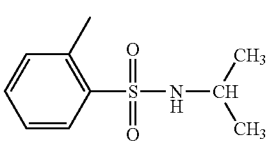
(151)
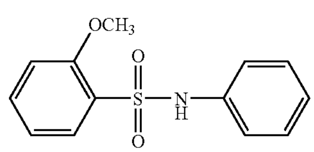
(152)
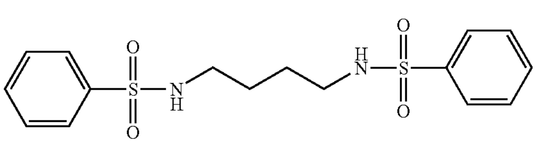

-continued
(153)
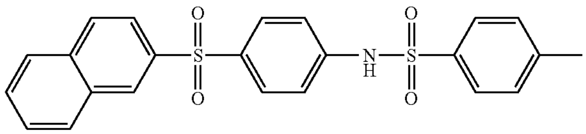
(154)
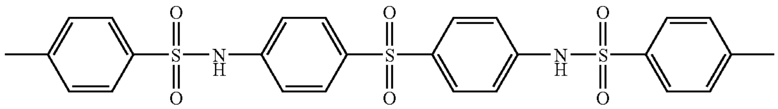
(155)
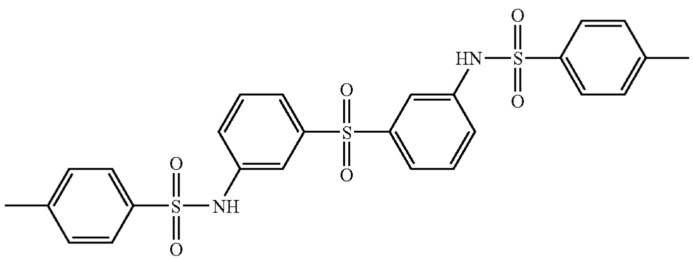
(156)
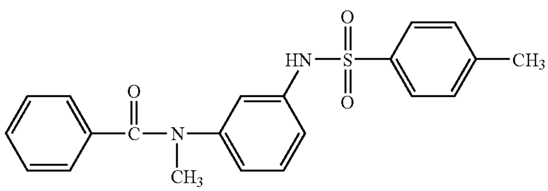
(157)
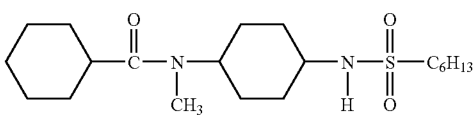
(158)
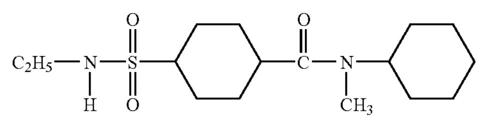
(159)
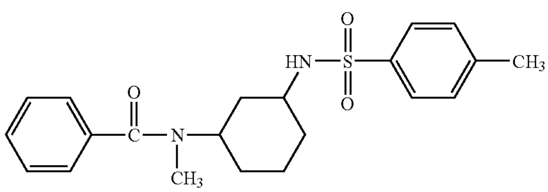
(160)
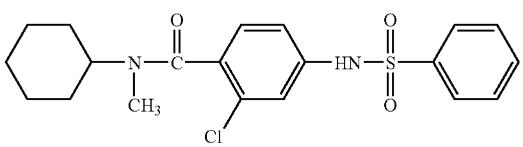
(161)
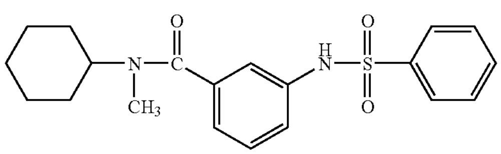
(162)
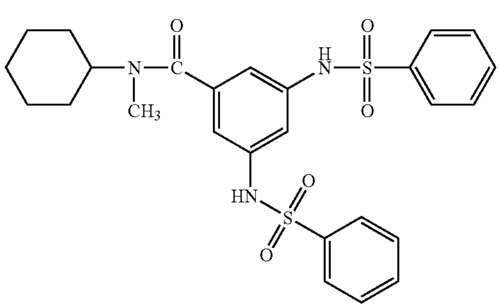

-continued (163)

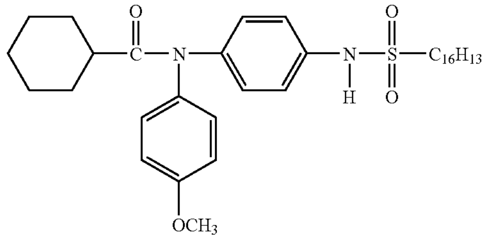

(164)

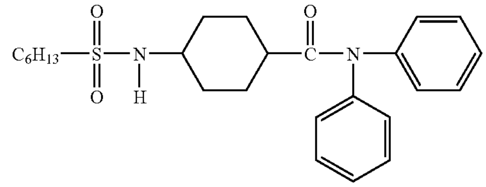

Formula (C):

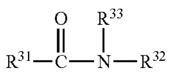

In the above Formula (C), $R^{31}$ is an alkyl group or an aryl group; and $R^{32}$ and $R^{33}$ each independently is a hydrogen atom, an alkyl group, or an aryl group. Herein, the alkyl group may be a linear, branched, or cyclic form, and has preferably 1 to 20 carbon atom(s), more preferably 1 to 15 carbon atom(s), and most preferably 1 to 12 carbon atom(s). As the cyclic alkyl group, a cyclohexyl group is particularly preferred. The aryl group has preferably 6 to 36 carbon atoms, and more preferably 6 to 24 carbon atoms.

The above alkyl group and aryl group may have a substituent, and preferable examples of the substituent include a halogen atom (for example, chlorine, bromine, fluorine, iodine, etc.), an alkyl group, an aryl group, an alkoxy group, an aryloxy group, an acyl group, an alkoxycarbonyl group, an aryloxycarbonyl group, an acyloxy group, a sulfonylamino group, a hydroxy group, a cyano group, an amino group, and an acylamino group, more preferable examples include a halogen atom, an alkyl group, an aryl group, an alkoxy group, an aryloxy group, a sulfonylamino group, and an acylamino group, and particularly preferable examples include an alkyl group, an aryl group, a sulfonylamino group, and an acylamino group.

Hereinbelow, preferable examples of the compound represented by Formula (C) will be shown below, but the present invention is not limited to these specific examples.

(301)

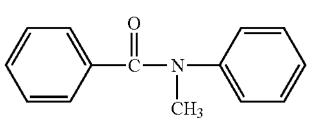

(302)

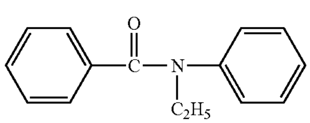

(303)

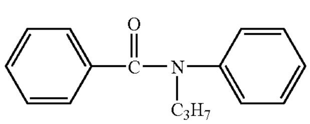

(304)

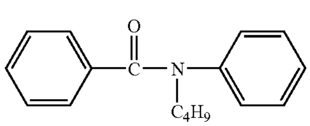

-continued (305)

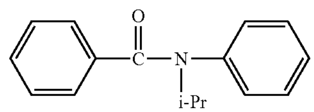

(306)

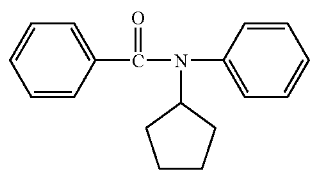

(307)

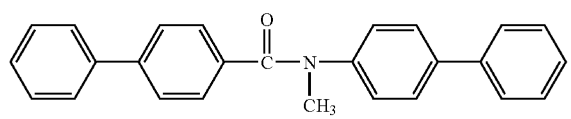

(308)

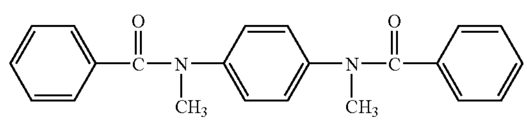

(309)

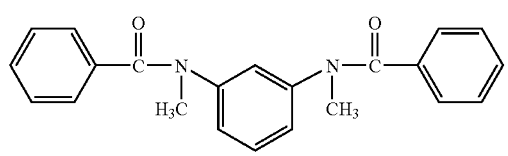

(310)

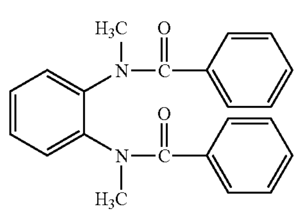

(311)

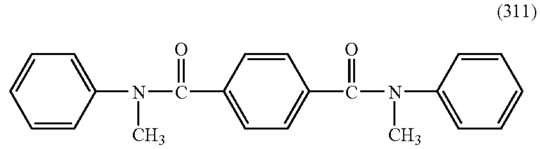

-continued
(312)
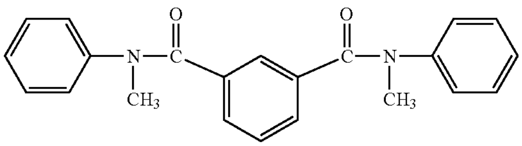
(313)
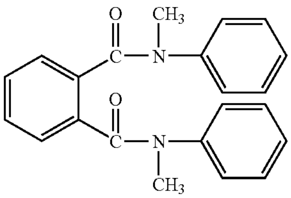
(314)
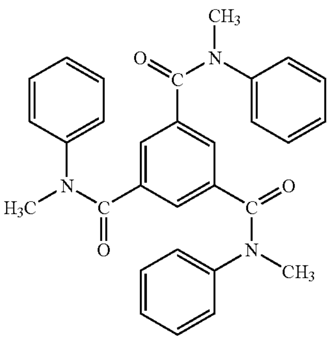
(315)
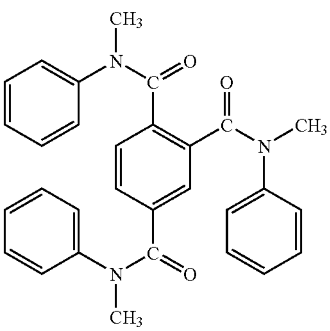
(316)
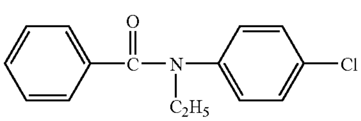
(317)
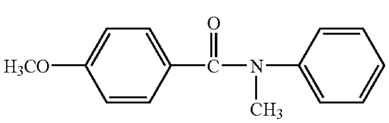
(318)
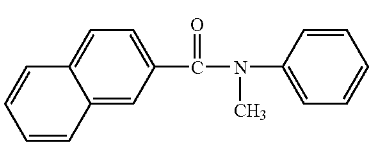
(319)
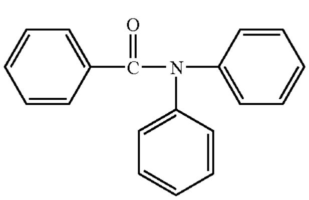
-continued
(320)
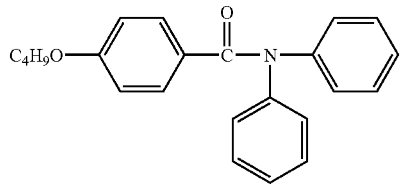
(321)
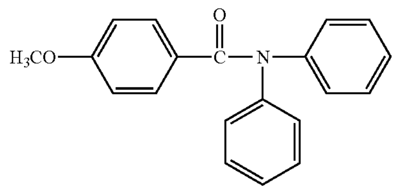
(322)
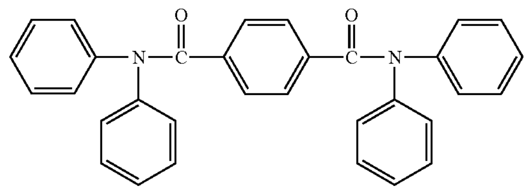
(323)
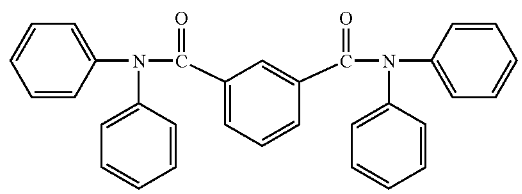
(324)
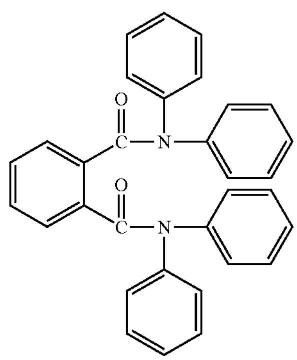
(325)
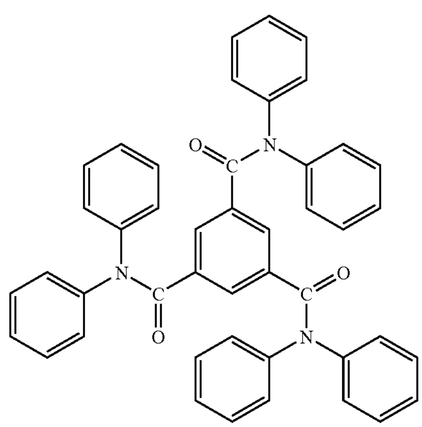

-continued
(326)
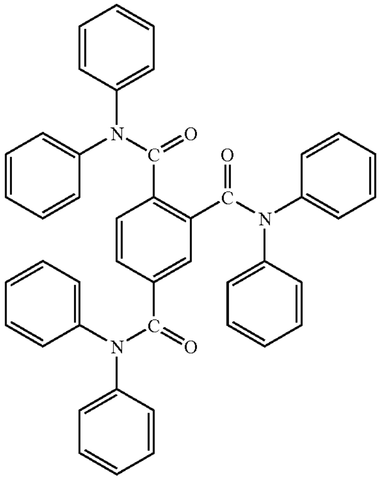
(327)
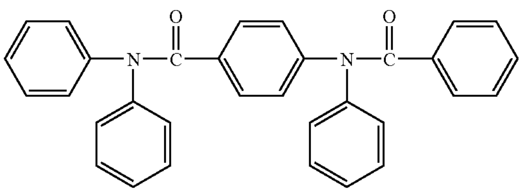
(328)
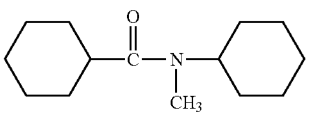
(329)
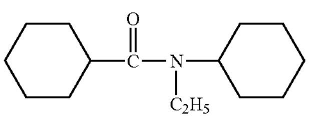
(330)
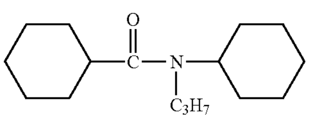
(331)
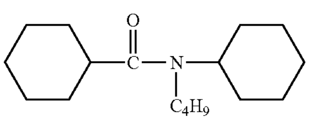
(332)
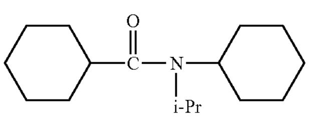
(333)
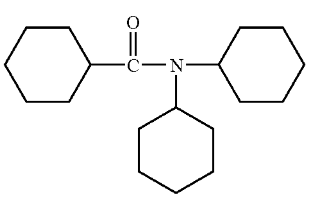
(334)
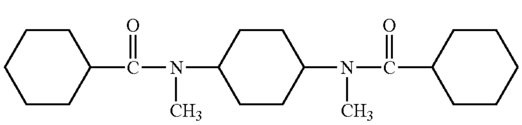
-continued
(335)
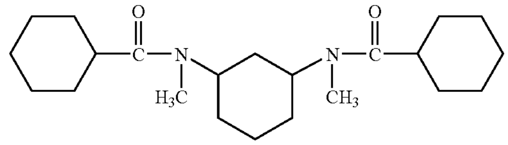
(336)
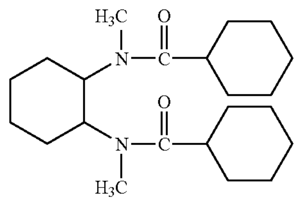
(337)
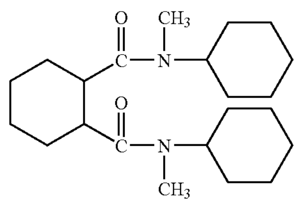
(338)
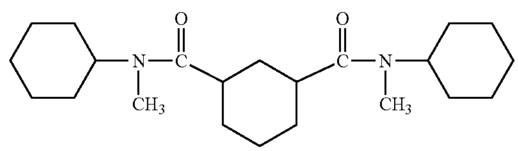
(339)
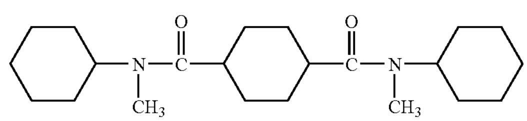
(340)
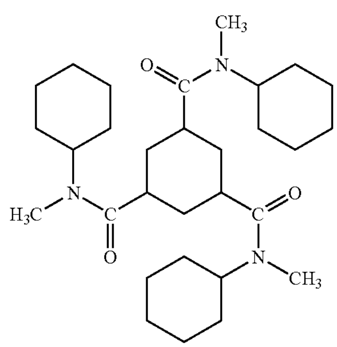
(341)
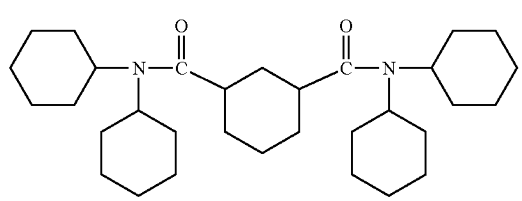

-continued
(342)
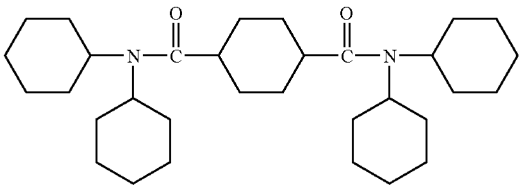
(343)
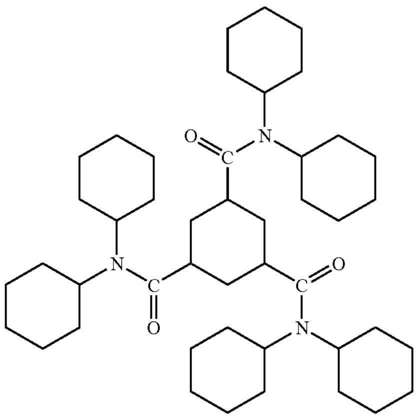
(345)
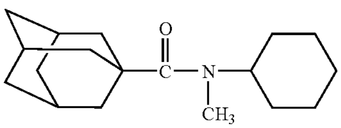
(346)
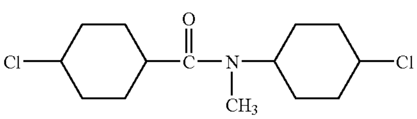
(347)
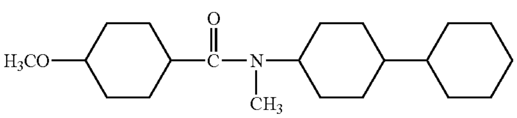
(348)
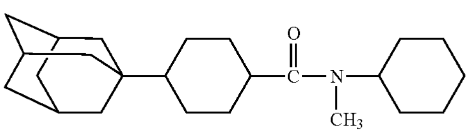
(349)
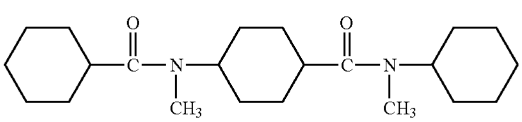
(350)
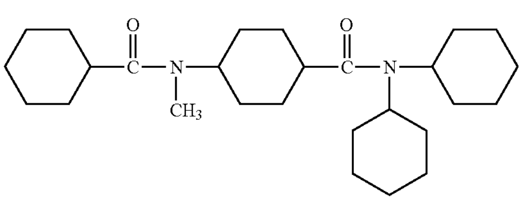
-continued
(351)
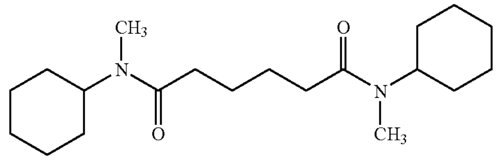
(352)
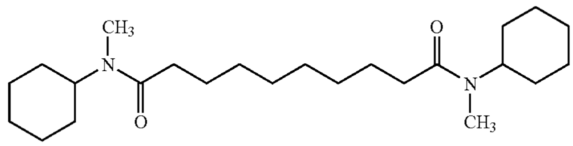
(353)
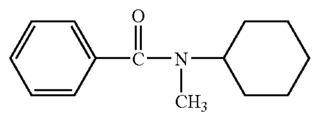
(354)
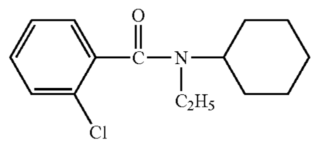
(355)
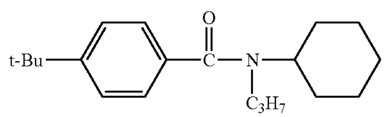
(356)
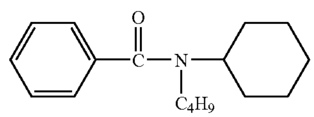
(357)
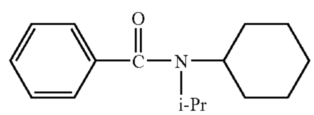
(358)
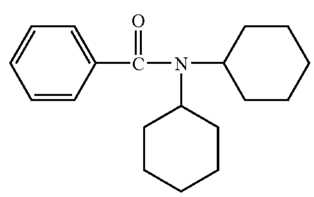
(359)
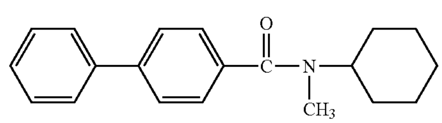
(360)
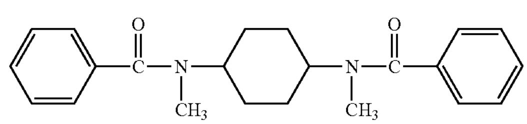
(361)
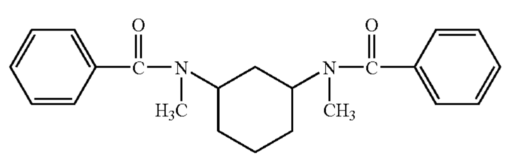

-continued
(362)
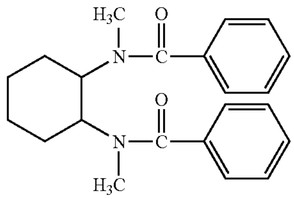
(363)
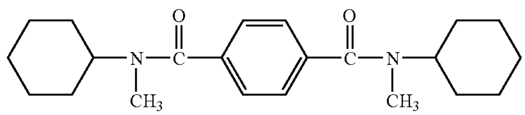
(364)
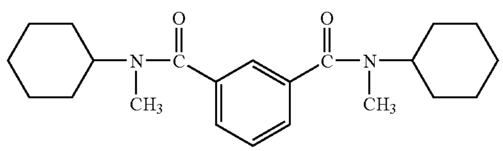
(365)
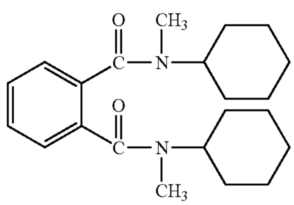
(366)
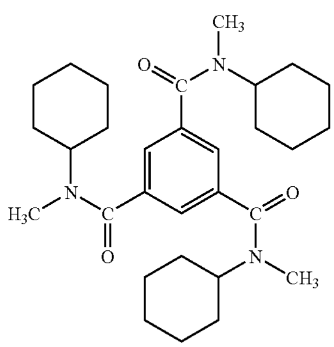
(367)
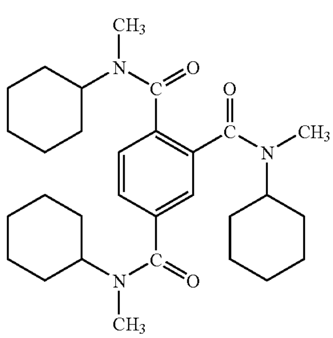
(368)
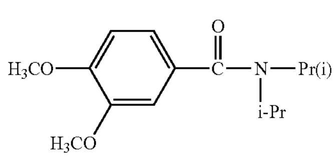
-continued
(369)
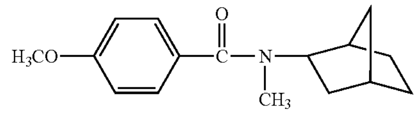
(370)
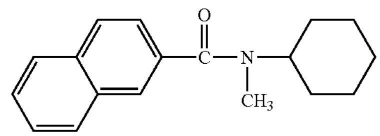
(371)
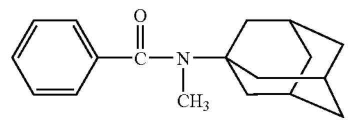
(372)
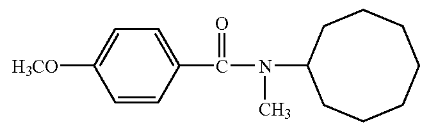
(373)
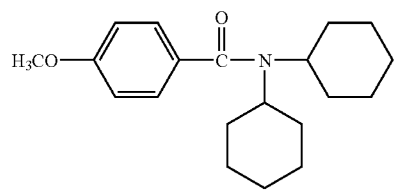
(374)
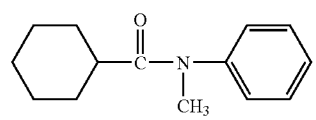
(375)
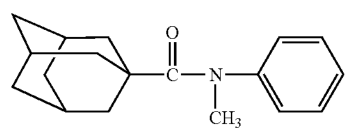
(376)
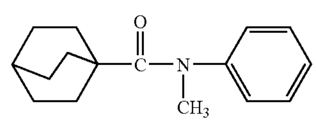
(377)
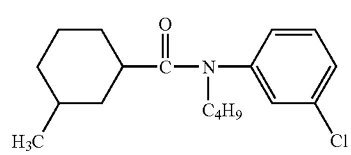
(378)
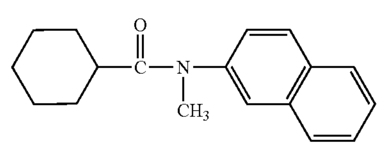
(379)
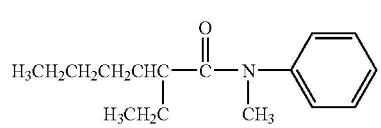

-continued
(380)
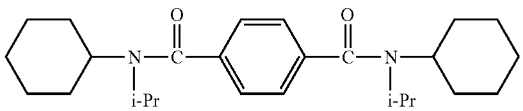
(381)
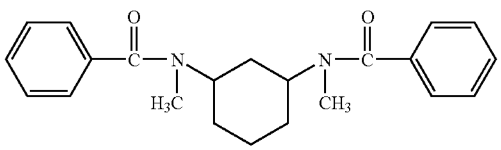
(382)
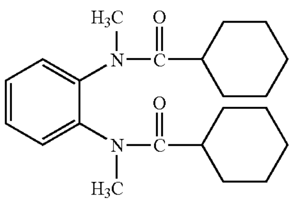
(383)
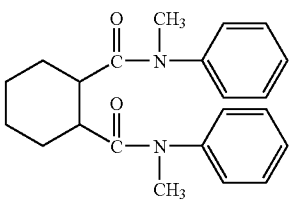
(384)
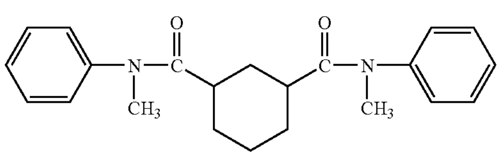
(385)
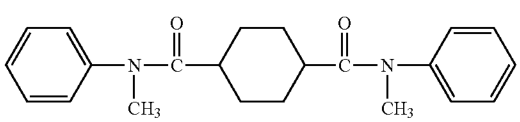
(386)
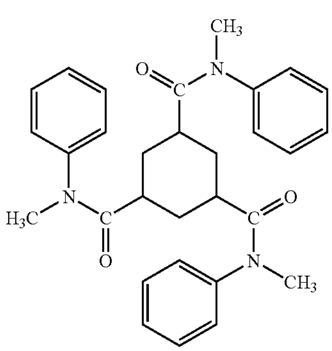
(387)
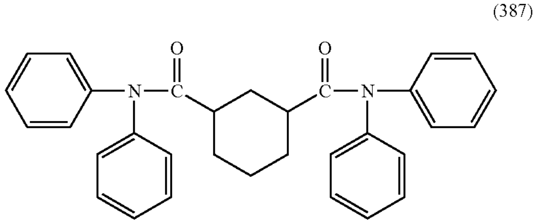
-continued
(388)
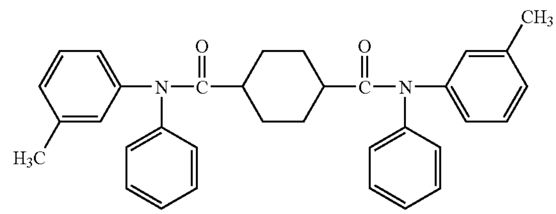
(389)
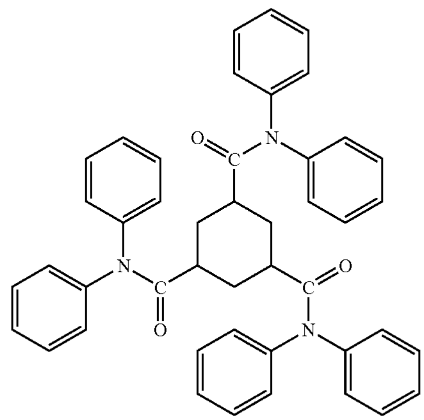
(390)
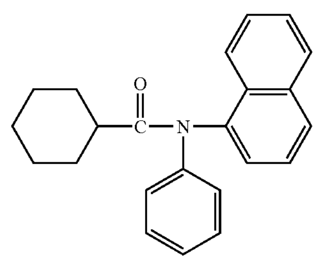
(391)
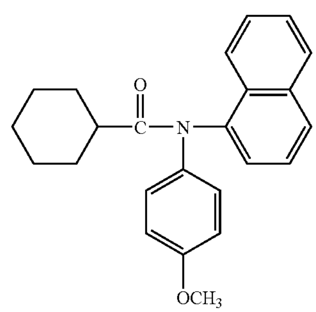
(392)
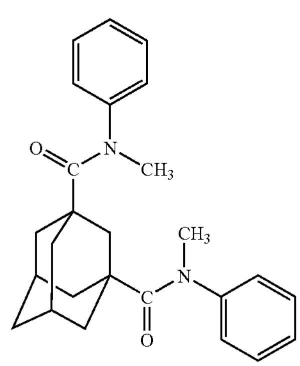

-continued (393)

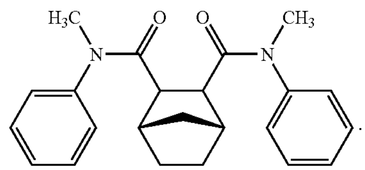

In the present invention, for a desirable wavelength dispersion, a wavelength dispersion adjusting agent may be used.

Specific examples of the wavelength dispersion adjusting agent preferably used in the present invention include a benzotriazole-based compound, a benzophenone-based compound, a compound comprising a cyano group, an oxybenzophenone-based compound, a salicylate ester-based compound, a complex nickel-based compound, and the like, but the present invention is not only limited to these compounds.

As the benzotriazole-based compound, a compound represented by Formula (101) can be preferably used as the wavelength dispersion adjusting agent of the present invention.

$Q^1$-$Q^2$-OH Formula (101)

(wherein $Q^1$ is a nitrogen-containing aromatic hetero ring, and $Q^2$ is an aromatic ring).

Q1 is a nitrogen-containing aromatic hetero ring, and preferably a 5- to 7-membered nitrogen-containing aromatic hetero ring and more preferably a 5- or 6-membered nitrogen-containing aromatic hetero ring. Examples include imidazole, pyrazole, triazole, tetrazole, thiazole, oxazole, selenazole, benzotriazole, benzothiazole, benzoxazole, benzoselenazole, thiadiazole, oxadiazole, naphthooxazole, azabenzimidazole, purine, pyridine, pyrazon, pyrimidine, pyridazine, triazine, triazaindene, tetrazaindene, and the like, a more preferable example is a 5-membered nitrogen-containing aromatic hetero ring and specifically imidazole, pyrazole, triazole, tetrazole, thiazole, oxazole, benzotriazole, benzothiazole, benzoxazole, thiadiazole, or oxadiazole is preferable, and a particularly preferable example is benzotriazole.

The nitrogen-containing aromatic hetero ring represented by $Q^1$ may have a substituent, and as for the substituent, a substituent T described later can be applied. In addition, when a plurality of substituents is present, they may be condensed respectively to further form a ring.

The aromatic ring represented by $Q^2$ may be an aromatic hydrocarbon ring or an aromatic hetero ring. In addition, these may be a monocyclic ring, or may form a condensed ring with another ring.

The aromatic hydrocarbon ring is preferably (preferably a monocyclic or dicyclic aromatic hydrocarbon ring having 6 to 30 carbon atoms (for example, a benzene ring, a naphthalene ring, etc.), more preferably an aromatic hydrocarbon ring having 6 to 20 carbon atoms, and even more preferably an aromatic hydrocarbon ring having 6 to 12 carbon atoms), and more preferably a benzene ring.

The aromatic hetero ring is preferably an aromatic hetero ring containing a nitrogen atom or a sulfur atom. Specific examples of the hetero ring include thiophen, imidazole, pyrazole, pyridine, pyrazine, pyridazine, triazole, triazine, indole, indazole, purine, thiazoline, thiazole, thiadiazole, oxazoline, oxazole, oxadiazole, quinoline, isoquinoline, phthalazine, naphthyridine, quinoxaline, quinazoline, cinnoline, pteridine, acridine, phenanthroline, phenazine, tetrazole, benzimidazole, benzoxazole, benzthiazole, benztriazole, tetrazaindene, and the like. The aromatic hetero ring is preferably pyridine, triazine, or quinoline.

The aromatic ring represented by $Q^2$ is preferably an aromatic hydrocarbon ring, more preferably a naphthalene ring or a benzene ring, and particularly preferably a benzene ring. $Q^2$ may further have a substituent and the substituent is preferably the substituent T described later.

Examples of the substituent T include an alkyl group (preferably having 1 to 20 carbon atom(s), more preferably 1 to 12 carbon atom(s), particularly preferably 1 to 8 carbon atom(s), e.g., methyl, ethyl, iso-propyl, tert-butyl, n-octyl, n-decyl, n-hexadecyl, cyclopropyl, cyclopentyl, cyclohexyl, etc.), an alkenyl group (preferably having 2 to 20 carbon atoms, more preferably 2 to 12 carbon atoms, particularly preferably 2 to 8 carbon atoms, e.g., vinyl, allyl, 2-butenyl, 3-pentenyl, etc.), an alkynyl group (preferably having 2 to 20 carbon atoms, more preferably 2 to 12 carbon atoms, particularly preferably from 2 to 8 carbon atoms, e.g., propargyl, 3-pentynyl, etc.), an aryl group (preferably having 6 to 30 carbon atoms, more preferably 6 to 20 carbon atoms, particularly preferably 6 to 12 carbon atoms, e.g., phenyl, p-methylphenyl, naphthyl, etc.), a substituted or unsubstituted amino group (preferably having 0 to 20 carbon atom(s), more preferably 0 to 10 carbon atom(s), particularly preferably 0 to 6 carbon atom(s), e.g., amino, methylamino, dimethylamino, diethylamino, dibenzylamino, etc.), an alkoxy group (preferably having 1 to 20 carbon atom(s), more preferably 1 to 12 carbon atom(s), particularly preferably from 1 to 8 carbon atom(s), e.g., methoxy, ethoxy, butoxy, etc.), an aryloxy group (preferably having 6 to 20 carbon atoms, more preferably 6 to 16 carbon atoms, particularly preferably 6 to 12 carbon atoms, e.g., phenyloxy, 2-naphthyloxy, etc.), an acyl group (preferably having 1 to 20 carbon atom(s), more preferably 1 to 16 carbon atom(s), particularly preferably 1 to 12 carbon atom(s), e.g., acetyl, benzoyl, formyl, pivaloyl, etc.), an alkoxycarbonyl group (preferably having 2 to 20 carbon atoms, more preferably 2 to 16 carbon atoms, particularly preferably 2 to 12 carbon atoms, e.g., methoxycarbonyl, ethoxycarbonyl, etc.), an aryloxycarbonyl group (preferably having 7 to 20 carbon atoms, more preferably 7 to 16 carbon atoms, particularly preferably 7 to 10 carbon atoms, e.g., phenyloxycarbonyl, etc.), an acyloxy group (preferably having 2 to 20 carbon atoms, more preferably 2 to 16 carbon atoms, particularly preferably 2 to 10 carbon atoms, e.g., acetoxy, benzoyloxy, etc.), an acylamino group (preferably having 2 to 20 carbon atoms, more preferably 2 to 16 carbon atoms, particularly preferably 2 to 10 carbon atoms, e.g., acetylamino, benzoylamino, etc.), an alkoxycarbonylamino group (preferably having 2 to 20 carbon atoms, more preferably 2 to 16 carbon atoms, particularly preferably 2 to 12 carbon atoms, e.g., methoxycarbonylamino, etc.), an aryloxycarbonylamino group (preferably having 7 to 20 carbon atoms, more preferably 7 to 16 carbon atoms, particularly preferably 7 to 12 carbon atoms, e.g., phenyloxycarbonylamino, etc.), a sulfonylamino group (preferably having 1 to 20 carbon atom(s), more preferably 1 to 16 carbon atom(s), particularly preferably 1 to 12 carbon atom(s), e.g., methanesulfonylamino, benzenesulfonylamino, etc.), a sulfamoyl group (preferably having 0 to 20 carbon atom(s), more preferably 0 to 16 carbon atom(s), particularly preferably from 0 to 12 carbon atom(s), e.g., sulfamoyl, methylsulfamoyl, dimethylsulfamoyl, phenylsulfamoyl, etc.), a carbamoyl group (preferably having 1 to 20 carbon atom(s), more preferably 1 to 16 carbon atom(s), particularly preferably 1 to 12 carbon atom(s), e.g., carbamoyl, methylcarbamoyl, diethylcarbamoyl, phenylcarbamoyl, etc.), an alkylthio group (preferably having 1 to 20 carbon atom(s), more preferably 1 to 16 carbon atom(s), particularly preferably 1 to 12 carbon atom(s), e.g., methylthio, ethylthio, etc.), an arylthio group (preferably having 6 to 20 carbon atoms, more preferably 6 to 16 carbon atoms, particularly preferably 6 to 12 carbon atoms, e.g., phenylthio, etc.), a sulfonyl group (preferably having 1 to 20 carbon atom(s), more preferably from 1 to 16 carbon atom(s), particularly preferably 1 to 12 carbon atom(s), e.g., mesyl, tosyl, etc.), a sulfinyl group (preferably having 1 to 20 carbon atom(s), more preferably 1 to 16 carbon atom(s), particularly preferably 1 to 12 carbon atom(s), e.g., methanesulfinyl, benzenesulfinyl, etc.), a ureido group (preferably having 1 to 20 carbon atom(s), more preferably 1 to 16 carbon atom(s), particularly preferably 1 to 12 carbon atom(s), e.g., ureido, methylureido, phenylureido, etc.), a phosphoric acid amide group (preferably having 1 to 20 carbon atom(s), more preferably 1 to 16 carbon atom(s), particularly preferably 1 to 12 carbon atom(s), e.g., diethylphosphoric acid amide, phenylphosphoric acid amide, etc.), a hydroxy group, a mercapto group, a halogen atom (e.g., fluorine atom, chlorine atom, bromine atom, iodine atom), a cyano group, a sulfo group, a carboxyl group, a nitro group, a hydroxamic acid group, a sulfino group, a hydrazino group, an imino group, a heterocyclic group (preferably having 1 to 30 carbon atom(s), more preferably 1 to 12 carbon atom(s); examples of the heteroatom include a nitrogen atom, an oxygen atom, and a sulfur atom; specific examples include imidazolyl, pyridyl, quinolyl, furyl, piperidyl, morpholino, benzoxazolyl, benzimidazolyl, and benzothiazolyl), and a silyl group (preferably having 3 to 40 carbon atoms, more preferably 3 to 30 carbon atoms, particularly preferably 3 to 24 carbon atoms, e.g., trimethylsilyl, triphenylsilyl, etc.). These substituents each may be further substituted. When two or more substituents are present, the substituents may be the same or different. If possible, they may combine with each other to form a ring.

The compound of Formula (101) is preferably a compound represented by the following Formula (101-A).

Formula (101-A):

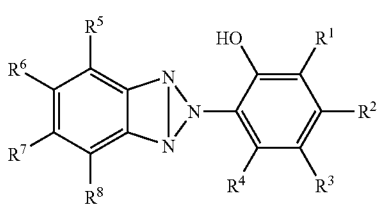

(wherein $R^1$, $R^2$, $R^3$, $R^4$, $R^5$, $R^6$, $R^7$ and $R^8$ each independently is a hydrogen atom or a substituent).

$R^1$, $R^2$, $R^3$, $R^4$, $R^6$, $R^7$ and $R^8$ each independently is a hydrogen atom or a substituent and as for the substituent, the substituent T can be applied. The substituent may be further substituted by another substituent, and the substituents may be condensed with each other to form a cyclic structure.

$R^1$ and $R^3$ each is preferably a hydrogen atom, an alkyl group, an alkenyl group, an alkynyl group, an aryl group, a substituted or unsubstituted amino group, an alkoxy group, an aryloxy group, a hydroxy group, or a halogen atom, more preferably a hydrogen atom, an alkyl group, an aryl group, an alkyloxy group, an aryloxy group, or a halogen atom, even more preferably a hydrogen atom or an alkyl group having 1 to 12 carbon atom(s), particularly preferably an alkyl group having 1 to 12 carbon atom(s) (preferably 4 to 12 carbon atoms).

$R^2$ and $R^4$ each is preferably a hydrogen atom, an alkyl group, an alkenyl group, an alkynyl group, an aryl group, a substituted or unsubstituted amino group, an alkoxy group, an aryloxy group, a hydroxy group, or a halogen atom, more preferably a hydrogen atom, an alkyl group, an aryl group, an alkyloxy group, an aryloxy group, or a halogen atom, even more preferably a hydrogen atom or an alkyl group having from 1 to 12 carbon atom(s), particularly preferably a hydrogen atom or a methyl group, and most preferably a hydrogen atom.

$R^5$ and $R^8$ each is preferably a hydrogen atom, an alkyl group, an alkenyl group, an alkynyl group, an aryl group, a substituted or unsubstituted amino group, an alkoxy group, an aryloxy group, a hydroxy group, or a halogen atom, more preferably a hydrogen atom, an alkyl group, an aryl group, an alkyloxy group, an aryloxy group, or a halogen atom, even more preferably a hydrogen atom or an alkyl group having from 1 to 12 carbon atom(s), particularly preferably a hydrogen atom or a methyl group, and most preferably a hydrogen atom.

$R^6$ and $R^7$ each is preferably a hydrogen atom, an alkyl group, an alkenyl group, an alkynyl group, an aryl group, a substituted or unsubstituted amino group, an alkoxy group, an aryloxy group, a hydroxy group, or a halogen atom, more preferably a hydrogen atom, an alkyl group, an aryl group, an alkyloxy group, an aryloxy group, or a halogen atom, even more preferably a hydrogen atom or a halogen atom, and particularly preferably a hydrogen atom or a chlorine atom.

The compound of Formula (101) is more preferably a compound represented by the following Formula (101-B).

Formula (101-B):

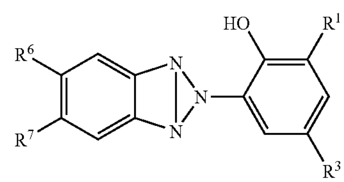

(wherein $R^1$, $R^3$, $R^6$ and $R^7$ have the same meanings as in formula (101-A) and preferred ranges are also the same).

Specific examples of the compound represented by Formula (101) are exemplified below, but the present invention is not limited to these specific examples.

UV-1

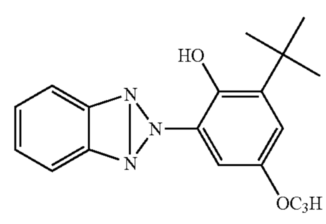

UV-2

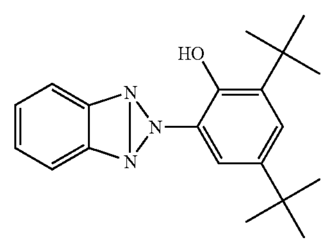

-continued
UV-3
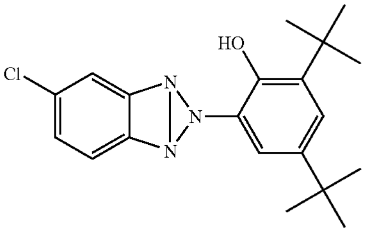
UV-4
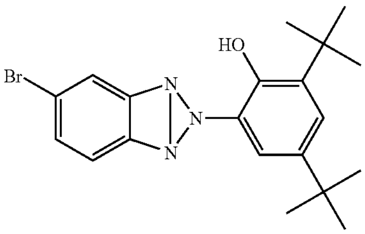
UV-5
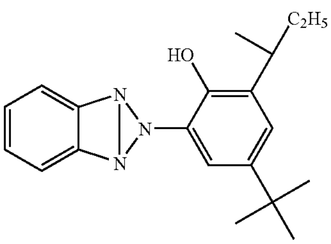
UV-6
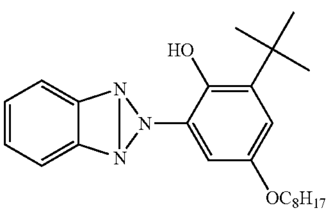
UV-7
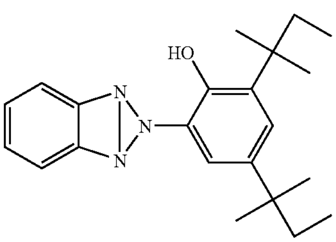
UV-8
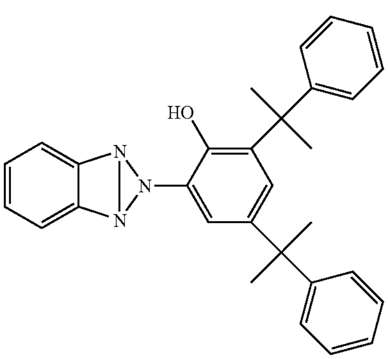
-continued
UV-9
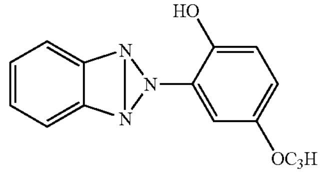
UV-10
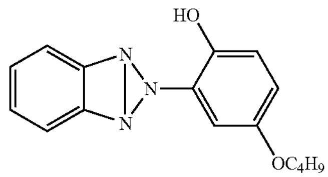
UV-11
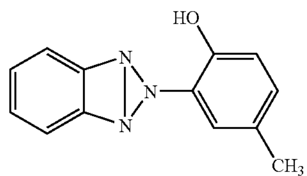
UV-12
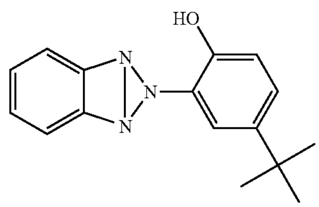
UV-13
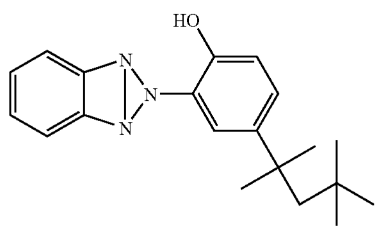
UV-14
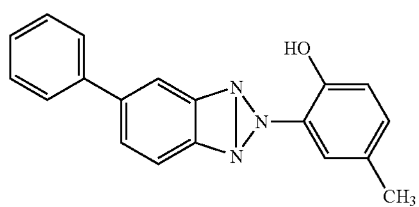
UV-15
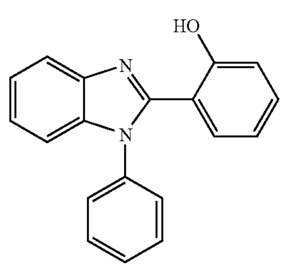

-continued

UV-16

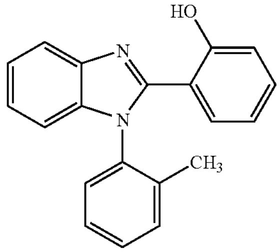

UV-17

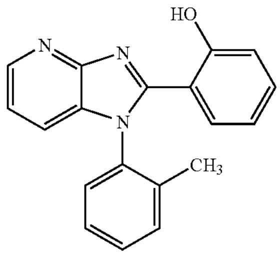

UV-18

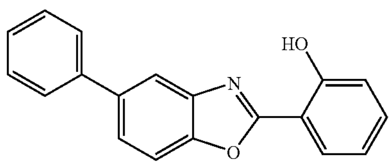

UV-19

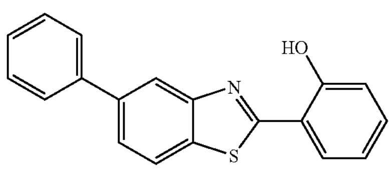

UV-20

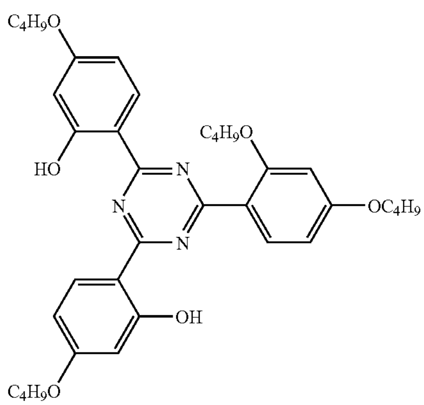

UV-21

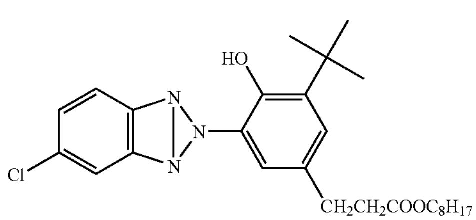

-continued

UV-22

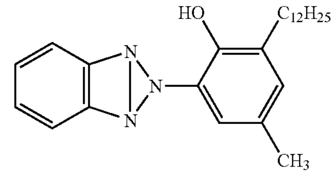

UV-23

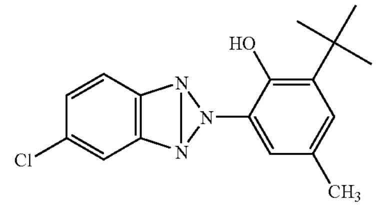

Among these benzotriazole-based compounds, when the cellulose acylate film is produced without containing a compound having a molecular weight of 320 or less, it is confirmed to be advantageous from the viewpoint of retentivity.

As the benzophenone-based compound which is one of the wavelength dispersion adjusting agents used in the present invention, a compound represented by the following Formula (102) is preferably used.

Formula (102):

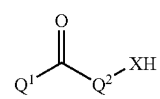

(In Formula (102), $Q^1$ and $Q^2$ each independently is an aromatic ring. X is NR(R represents a hydrogen atom or a substituent), an oxygen atom, or a sulfur atom).

In Formula (102), the aromatic ring represented by $Q^1$ and $Q^2$ may be either an aromatic hydrocarbon ring or an aromatic hetero ring. Also, the aromatic ring may be a monocyclic ring or may form a condensed ring with another ring.

The aromatic hydrocarbon ring represented by $Q^1$ and $Q^2$ is preferably (preferably a monocyclic or dicyclic aromatic hydrocarbon ring having 6 to 30 carbon atoms (for example, a benzene ring, a naphthalene ring, etc.), more preferably an aromatic hydrocarbon ring having 6 to 20 carbon atoms, and even more preferably an aromatic hydrocarbon ring having 6 to 12 carbon atoms), and more preferably a benzene ring.

The aromatic hetero ring represented by $Q^1$ and $Q^2$ is preferably an aromatic hetero ring containing at least one of an oxygen atom, a nitrogen atom, and a sulfur atom. Specific examples of the hetero ring include furan, pyrrole, thiophene, imidazole, pyrazole, pyridine, pyrazine, pyridazine, triazole, triazine, indole, indazole, purine, thiazoline, thiazole, thiadiazole, oxazoline, oxazole, oxadiazole, quinoline, isoquinoline, phthalazine, naphthylidine, quinoxaline, quinazoline, cinnoline, pteridine, acridine, phenanthroline, phenazine, tetrazole, benzimidazole, benzoxazole, benzothiazole, benzotriazole, tetrazaindene, and the like. The aromatic hetero ring is preferably pyridine, triazine, or quinoline.

The aromatic ring represented by $Q^1$ and $Q^2$ is preferably an aromatic hydrocarbon ring, more preferably an aromatic hydrocarbon ring having 6 to 10 carbon atoms, even more preferably a substituted or unsubstituted benzene ring.

$Q^1$ and $Q^2$ each may further have a substituent and the substituent is preferably the substituent T to be described later, but a carboxylic acid, a sulfonic acid, and a quaternary ammonium salt are not included in the substituent. If possible, the substituents may combine with each other to form a cyclic structure.

X is NR (R represents a hydrogen atom or a substituent. As for the substituent, the substituent T can be applied), an oxygen atom, or a sulfur atom, and X is preferably NR (R is preferably an acyl group or a sulfonyl group and this substituent may be further substituted) or O, and particularly preferably O.

In Formula (102), examples of the substituent T include an alkyl group (preferably having 1 to 20 carbon atom(s), more preferably 1 to 12 carbon atom(s), particularly preferably 1 to 8 carbon atom(s), e.g., methyl, ethyl, iso-propyl, tert-butyl, n-octyl, n-decyl, n-hexadecyl, cyclopropyl, cyclopentyl, cyclohexyl, etc.), an alkenyl group (preferably having 2 to 20 carbon atoms, more preferably 2 to 12 carbon atoms, particularly preferably 2 to 8 carbon atoms, e.g., vinyl, allyl, 2-butenyl, 3-pentenyl, etc.), an alkynyl group (preferably having 2 to 20 carbon atoms, more preferably 2 to 12 carbon atoms, particularly preferably from 2 to 8 carbon atoms, e.g., propargyl, 3-pentynyl, etc.), an aryl group (preferably having 6 to 30 carbon atoms, more preferably 6 to 20 carbon atoms, particularly preferably 6 to 12 carbon atoms, e.g., phenyl, p-methylphenyl, naphthyl, etc.), a substituted or unsubstituted amino group (preferably having 0 to 20 carbon atom(s), more preferably 0 to 10 carbon atom(s), particularly preferably 0 to 6 carbon atom(s), e.g., amino, methylamino, dimethylamino, diethylamino, dibenzylamino, etc.), an alkoxy group (preferably having 1 to 20 carbon atom(s), more preferably 1 to 12 carbon atom(s), particularly preferably from 1 to 8 carbon atom(s), e.g., methoxy, ethoxy, butoxy, etc.), an aryloxy group (preferably having 6 to 20 carbon atoms, more preferably 6 to 16 carbon atoms, particularly preferably 6 to 12 carbon atoms, e.g., phenyloxy, 2-naphthyloxy, etc.), an acyl group (preferably having 1 to 20 carbon atom(s), more preferably 1 to 16 carbon atom(s), particularly preferably 1 to 12 carbon atom(s), e.g., acetyl, benzoyl, formyl, pivaloyl, etc.), an alkoxycarbonyl group (preferably having 2 to 20 carbon atoms, more preferably 2 to 16 carbon atoms, particularly preferably 2 to 12 carbon atoms, e.g., methoxycarbonyl, ethoxycarbonyl, etc.), an aryloxycarbonyl group (preferably having 7 to 20 carbon atoms, more preferably 7 to 16 carbon atoms, particularly preferably 7 to 10 carbon atoms, e.g., phenyloxycarbonyl, etc.), an acyloxy group (preferably having 2 to 20 carbon atoms, more preferably 2 to 16 carbon atoms, particularly preferably 2 to 10 carbon atoms, e.g., acetoxy, benzoyloxy, etc.), an acylamino group (preferably having 2 to 20 carbon atoms, more preferably 2 to 16 carbon atoms, particularly preferably 2 to 10 carbon atoms, e.g., acetylamino, benzoylamino, etc.), an alkoxycarbonylamino group (preferably having 2 to 20 carbon atoms, more preferably 2 to 16 carbon atoms, particularly preferably 2 to 12 carbon atoms, e.g., methoxycarbonylamino, etc.), an aryloxycarbonylamino group (preferably having 7 to 20 carbon atoms, more preferably 7 to 16 carbon atoms, particularly preferably 7 to 12 carbon atoms, e.g., phenyloxycarbonylamino, etc.), a sulfonylamino group (preferably having 1 to 20 carbon atom(s), more preferably 1 to 16 carbon atom(s), particularly preferably 1 to 12 carbon atom(s), e.g., methanesulfonylamino, benzenesulfonylamino, etc.), a sulfamoyl group (preferably having 0 to 20 carbon atom(s), more preferably 0 to 16 carbon atom(s), particularly preferably from 0 to 12 carbon atom(s), e.g., sulfamoyl, methylsulfamoyl, dimethylsulfamoyl, phenylsulfamoyl, etc.), a carbamoyl group (preferably having 1 to 20 carbon atom(s), more preferably 1 to 16 carbon atom(s), particularly preferably 1 to 12 carbon atom(s), e.g., carbamoyl, methylcarbamoyl, diethylcarbamoyl, phenylcarbamoyl, etc.), an alkylthio group (preferably having 1 to 20 carbon atom(s), more preferably 1 to 16 carbon atom(s), particularly preferably 1 to 12 carbon atom(s), e.g., methylthio, ethylthio, etc.), an arylthio group (preferably having 6 to 20 carbon atoms, more preferably 6 to 16 carbon atoms, particularly preferably 6 to 12 carbon atoms, e.g., phenylthio, etc.), a sulfonyl group (preferably having 1 to 20 carbon atom(s), more preferably from 1 to 16 carbon atom(s), particularly preferably 1 to 12 carbon atom(s), e.g., mesyl, tosyl, etc.), a sulfinyl group (preferably having 1 to 20 carbon atom(s), more preferably 1 to 16 carbon atom(s), particularly preferably 1 to 12 carbon atom(s), e.g., methanesulfinyl, benzenesulfinyl, etc.), a ureido group (preferably having 1 to 20 carbon atom(s), more preferably 1 to 16 carbon atom(s), particularly preferably 1 to 12 carbon atom(s), e.g., ureido, methylureido, phenylureido, etc.), a phosphoric acid amide group (preferably having 1 to 20 carbon atom(s), more preferably 1 to 16 carbon atom(s), particularly preferably 1 to 12 carbon atom(s), e.g., diethylphosphoric acid amide, phenylphosphoric acid amide, etc.), a hydroxy group, a mercapto group, a halogen atom (e.g., fluorine atom, chlorine atom, bromine atom, iodine atom), a cyano group, a sulfo group, a carboxyl group, a nitro group, a hydroxamic acid group, a sulfino group, a hydrazino group, an imino group, a heterocyclic group (preferably having 1 to 30 carbon atom(s), more preferably 1 to 12 carbon atom(s); examples of the heteroatom include a nitrogen atom, an oxygen atom, and a sulfur atom; specific examples include imidazolyl, pyridyl, quinolyl, furyl, piperidyl, morpholino, benzoxazolyl, benzimidazolyl, and benzothiazolyl), and a silyl group (preferably having 3 to 40 carbon atoms, more preferably 3 to 30 carbon atoms, particularly preferably 3 to 24 carbon atoms, e.g., trimethylsilyl, triphenylsilyl, etc.). These substituents each may be further substituted. When two or more substituents are present, the substituents may be the same or different. If possible, they may combine with each other to form a ring.

The compound of Formula (102) is preferably a compound represented by the following Formula (102-A).

Formula (102-A):

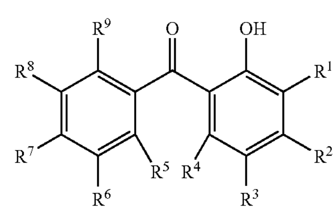

(In Formula (102-A), $R^1$, $R^2$, $R^3$, $R^4$, $R^6$, $R^7$, $R^8$ and $R^9$ each independently represents a hydrogen atom or a substituent).

In Formula (102-A), $R^1$, $R^2$, $R^3$, $R^4$, $R^5$, $R^6$, $R^7$, $R^8$ and $R^9$ each independently represents a hydrogen atom or a substituent, and as for the substituent, the substituent T can be applied. Also, the substituent may be further substituted by another substituent, and the substituents may be condensed with each other to form a cyclic structure.

$R^1$, $R^2$, $R^3$, $R^4$, $R^5$, $R^6$, $R^7$, $R^8$ and $R^9$ each is preferably a hydrogen atom, an alkyl group, an alkenyl group, an alkynyl group, an aryl group, a substituted or unsubstituted amino group, an alkoxy group, an aryloxy group, a hydroxy group, or a halogen atom, more preferably a hydrogen atom, an alkyl group, an aryl group, an alkyloxy group, an aryloxy group, or a halogen atom, even more preferably a hydrogen atom or an alkyl group having 1 to 12 carbon atom(s), particularly preferably a hydrogen atom or a methyl group, and most preferably a hydrogen atom.

$R^2$ is preferably a hydrogen atom, an alkyl group, an alkenyl group, an alkynyl group, an aryl group, a substituted or unsubstituted amino group, an alkoxy group, an aryloxy group, a hydroxy group, or a halogen atom, more preferably a hydrogen atom, an alkyl group having 1 to 20 carbon atom(s), an amino group having 0 to 20 carbon atom(s), an alkoxy group having 1 to 12 carbon atom(s), an aryloxy group having 6 to 12 carbon atoms, or a hydroxy group, even more preferably an alkoxy group having 1 to 20 carbon atom(s), particularly preferably an alkoxy group having 1 to 12 carbon atom(s).

$R^7$ is preferably a hydrogen atom, an alkyl group, an alkenyl group, an alkynyl group, an aryl group, a substituted or unsubstituted amino group, an alkoxy group, an aryloxy group, a hydroxy group, or a halogen atom, more preferably a hydrogen atom, an alkyl group having 1 to 20 carbon atom(s), an amino group having 0 to 20 carbon atom(s), an alkoxy group having 1 to 12 carbon atom(s), an aryloxy group having 6 to 12 carbon atoms, or a hydroxy group, even more preferably a hydrogen atom or an alkyl group having from 1 to 20 carbon atom(s) (preferably having 1 to 12 carbon atom(s), more preferably 1 to 8 carbon atoms, even more preferably a methyl group), and particularly preferably a methyl group or a hydrogen atom.

The compound of Formula (102) is more preferably a compound represented by the following Formula (102-B).

Formula (102-B):

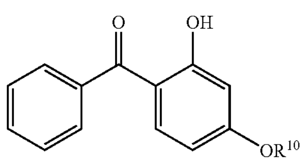

(In Formula (102-B), $R^{10}$ is a hydrogen atom, a substituted or unsubstituted alkyl group, a substituted or unsubstituted alkenyl group, a substituted or unsubstituted alkynyl group, or a substituted or unsubstituted aryl group).

$R^{10}$ is a hydrogen atom, a substituted or unsubstituted alkyl group, a substituted or unsubstituted alkenyl group, a substituted or unsubstituted alkynyl group, or a substituted or unsubstituted aryl group, and as for the substituent, the substituent T can be applied.

$R^{10}$ is preferably a substituted or unsubstituted alkyl group, more preferably a substituted or unsubstituted alkyl group having 5 to 20 carbon atom(s), even more preferably a substituted or unsubstituted alkyl group having 5 to 12 carbon atoms (exemplified by an n-hexyl group, a 2-ethylhexyl group, an n-octyl group, an n-decyl group, an n-dodecyl group, a benzyl group, etc.), particularly preferably a substituted or unsubstituted alkyl group having 6 to 12 carbon atoms (a 2-ethylhexyl group, an n-octyl group, an n-decyl group, an n-dodecyl group, a benzyl group).

The compound represented by Formula (102) can be synthesized by the known method disclosed in Japanese Unexamined Patent Application Publication No. 11-12219.

Hereinbelow, specific examples of the compound represented by Formula (102) are exemplified below, but the present invention is not limited to these specific examples.

UV-101

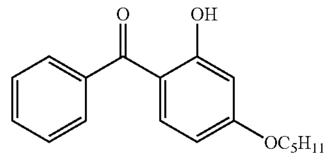

UV-102

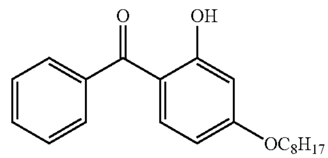

UV-103

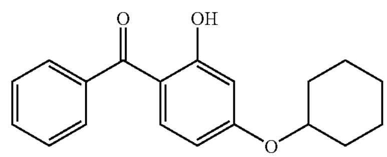

UV-104

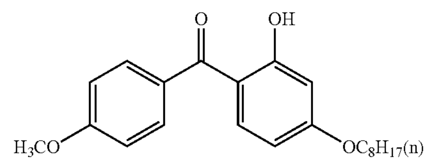

UV-105

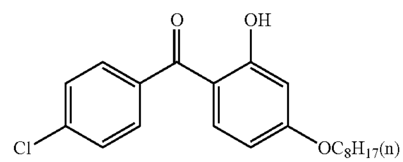

UV-106

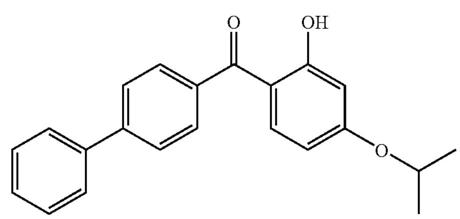

UV-107

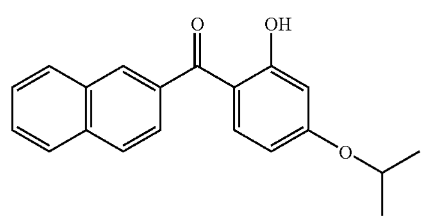

UV-108

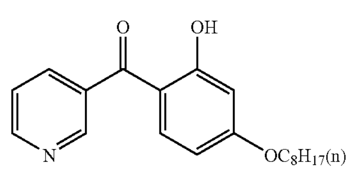

UV-109

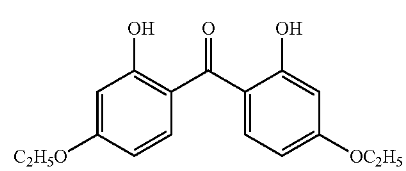

-continued

UV-110

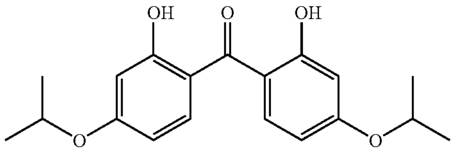

UV-111

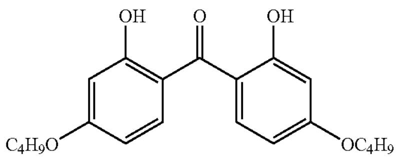

UV-112

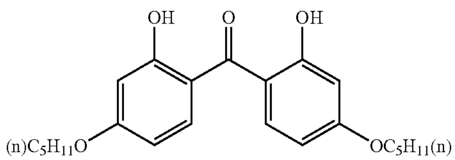

UV-113

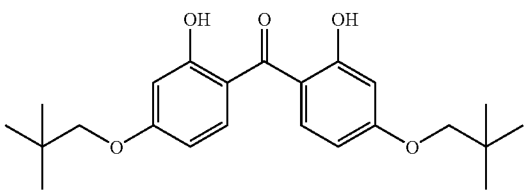

UV-114

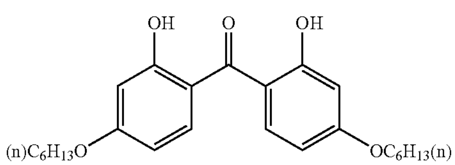

UV-115

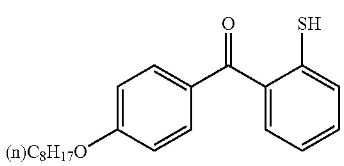

UV-116

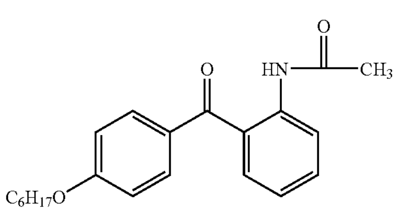

UV-117

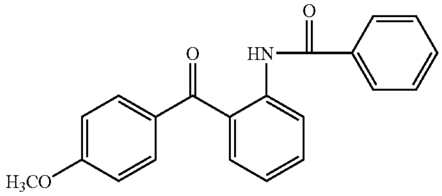

-continued

UV-118

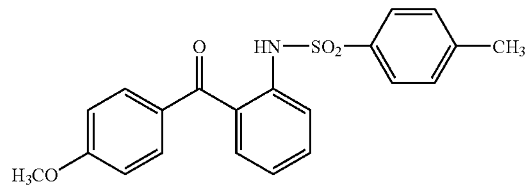

UV-119

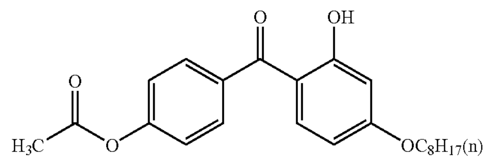

UV-120

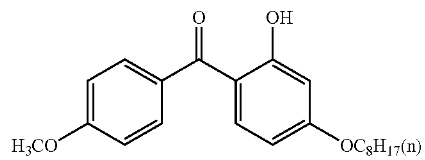

UV-121

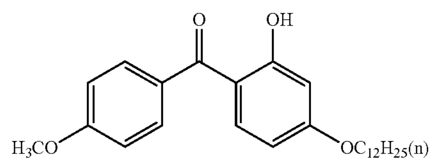

As the cyano group-containing compound which is one of the wavelength dispersion adjusting agents to be used for the present invention, a compound represented by the following Formula (103) is preferably used.

Formula (103):

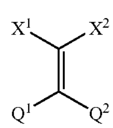

(In Formula (103), $Q^1$ and $Q^2$ each independently represents an aromatic ring. $X^1$ and $X^2$ each represents a hydrogen atom or a substituent, and at least one of them is a cyano group, and other one is preferably a carbonyl group, a sulfonyl group, or an aromatic hetero ring). The aromatic ring represented by $Q^1$ and $Q^2$ may be either an aromatic hydrocarbon ring or an aromatic hetero ring. Also, the aromatic ring may be a monocyclic ring or may form a condensed ring with another ring.

The aromatic hydrocarbon ring is preferably (preferably a monocyclic or dicyclic aromatic hydrocarbon ring having 6 to 30 carbon atoms (for example, a benzene ring, a naphthalene ring, etc.), more preferably an aromatic hydrocarbon ring having 6 to 20 carbon atoms, and even more preferably an aromatic hydrocarbon ring having 6 to 12 carbon atoms), and more preferably a benzene ring.

The aromatic hetero ring is preferably an aromatic hetero ring containing a nitrogen atom or a sulfur atom. Specific examples of the hetero ring include thiophen, imidazole, pyrazole, pyridine, pyrazine, pyridazine, triazole, triazine, indole, indazole, purine, thiazoline, thiazole, thiadiazole, oxazoline, oxazole, oxadiazole, quinoline, isoquinoline, phthalazine, naphthyridine, quinoxaline, quinazoline, cinnoline, pteridine, acridine, phenanthroline, phenazine, tetrazole, benzimidazole, benzoxazole, benzthiazole, benztriazole, tetrazaindene, and the like. The aromatic hetero ring is preferably pyridine, triazine, or quinoline.

The aromatic ring represented by $Q^1$ and $Q^2$ is preferably an aromatic hydrocarbon ring, more preferably a benzene ring.

$Q^1$ and $Q^2$ each may further have a substituent and the substituent is preferably the substituent T described later. Examples of the substituent T include an alkyl group (preferably having 1 to 20 carbon atom(s), more preferably 1 to 12 carbon atom(s), particularly preferably 1 to 8 carbon atom(s), e.g., methyl, ethyl, iso-propyl, tert-butyl, n-octyl, n-decyl, n-hexadecyl, cyclopropyl, cyclopentyl, cyclohexyl, etc.), an alkenyl group (preferably having 2 to 20 carbon atoms, more preferably 2 to 12 carbon atoms, particularly preferably 2 to 8 carbon atoms, e.g., vinyl, allyl, 2-butenyl, 3-pentenyl, etc.), an alkynyl group (preferably having 2 to 20 carbon atoms, more preferably 2 to 12 carbon atoms, particularly preferably from 2 to 8 carbon atoms, e.g., propargyl, 3-pentynyl, etc.), an aryl group (preferably having 6 to 30 carbon atoms, more preferably 6 to 20 carbon atoms, particularly preferably 6 to 12 carbon atoms, e.g., phenyl, p-methylphenyl, naphthyl, etc.), a substituted or unsubstituted amino group (preferably having 0 to 20 carbon atom(s), more preferably 0 to 10 carbon atom(s), particularly preferably 0 to 6 carbon atom(s), e.g., amino, methylamino, dimethylamino, diethylamino, dibenzylamino, etc.), an alkoxy group (preferably having 1 to 20 carbon atom(s), more preferably 1 to 12 carbon atom(s), particularly preferably from 1 to 8 carbon atom(s), e.g., methoxy, ethoxy, butoxy, etc.), an aryloxy group (preferably having 6 to 20 carbon atoms, more preferably 6 to 16 carbon atoms, particularly preferably 6 to 12 carbon atoms, e.g., phenyloxy, 2-naphthyloxy, etc.), an acyl group (preferably having 1 to 20 carbon atom(s), more preferably 1 to 16 carbon atom(s), particularly preferably 1 to 12 carbon atom(s), e.g., acetyl, benzoyl, formyl, pivaloyl, etc.), an alkoxycarbonyl group (preferably having 2 to 20 carbon atoms, more preferably 2 to 16 carbon atoms, particularly preferably 2 to 12 carbon atoms, e.g., methoxycarbonyl, ethoxycarbonyl, etc.), an aryloxycarbonyl group (preferably having 7 to 20 carbon atoms, more preferably 7 to 16 carbon atoms, particularly preferably 7 to 10 carbon atoms, e.g., phenyloxycarbonyl, etc.), an acyloxy group (preferably having 2 to 20 carbon atoms, more preferably 2 to 16 carbon atoms, particularly preferably 2 to 10 carbon atoms, e.g., acetoxy, benzoyloxy, etc.), an acylamino group (preferably having 2 to 20 carbon atoms, more preferably 2 to 16 carbon atoms, particularly preferably 2 to 10 carbon atoms, e.g., acetylamino, benzoylamino, etc.), an alkoxycarbonylamino group (preferably having 2 to 20 carbon atoms, more preferably 2 to 16 carbon atoms, particularly preferably 2 to 12 carbon atoms, e.g., methoxycarbonylamino, etc.), an aryloxycarbonylamino group (preferably having 7 to 20 carbon atoms, more preferably 7 to 16 carbon atoms, particularly preferably 7 to 12 carbon atoms, e.g., phenyloxycarbonylamino, etc.), a sulfonylamino group (preferably having 1 to 20 carbon atom(s), more preferably 1 to 16 carbon atom(s), particularly preferably 1 to 12 carbon atom(s), e.g., methanesulfonylamino, benzenesulfonylamino, etc.), a sulfamoyl group (preferably having 0 to 20 carbon atom(s), more preferably 0 to 16 carbon atom(s), particularly preferably from 0 to 12 carbon atom(s), e.g., sulfamoyl, methylsulfamoyl, dimethylsulfamoyl, phenylsulfamoyl, etc.), a carbamoyl group (preferably having 1 to 20 carbon atom(s), more preferably 1 to 16 carbon atom(s), particularly preferably 1 to 12 carbon atom(s), e.g., carbamoyl, methylcarbamoyl, diethylcarbamoyl, phenylcarbamoyl, etc.), an alkylthio group (preferably having 1 to 20 carbon atom(s), more preferably 1 to 16 carbon atom(s), particularly preferably 1 to 12 carbon atom(s), e.g., methylthio, ethylthio, etc.), an arylthio group (preferably having 6 to 20 carbon atoms, more preferably 6 to 16 carbon atoms, particularly preferably 6 to 12 carbon atoms, e.g., phenylthio, etc.), a sulfonyl group (preferably having 1 to 20 carbon atom(s), more preferably from 1 to 16 carbon atom(s), particularly preferably 1 to 12 carbon atom(s), e.g., mesyl, tosyl, etc.), a sulfinyl group (preferably having 1 to 20 carbon atom(s), more preferably 1 to 16 carbon atom(s), particularly preferably 1 to 12 carbon atom(s), e.g., methanesulfinyl, benzenesulfinyl, etc.), a ureido group (preferably having 1 to 20 carbon atom(s), more preferably 1 to 16 carbon atom(s), particularly preferably 1 to 12 carbon atom(s), e.g., ureido, methylureido, phenylureido, etc.), a phosphoric acid amide group (preferably having 1 to 20 carbon atom(s), more preferably 1 to 16 carbon atom(s), particularly preferably 1 to 12 carbon atom(s), e.g., diethylphosphoric acid amide, phenylphosphoric acid amide, etc.), a hydroxy group, a mercapto group, a halogen atom (e.g., fluorine atom, chlorine atom, bromine atom, iodine atom), a cyano group, a sulfo group, a carboxyl group, a nitro group, a hydroxamic acid group, a sulfino group, a hydrazino group, an imino group, a heterocyclic group (preferably having 1 to 30 carbon atom(s), more preferably 1 to 12 carbon atom(s); examples of the heteroatom include a nitrogen atom, an oxygen atom, and a sulfur atom; specific examples include imidazolyl, pyridyl, quinolyl, furyl, piperidyl, morpholino, benzoxazolyl, benzimidazolyl, and benzothiazolyl), and a silyl group (preferably having 3 to 40 carbon atoms, more preferably 3 to 30 carbon atoms, particularly preferably 3 to 24 carbon atoms, e.g., trimethylsilyl, triphenylsilyl, etc.). These substituents each may be further substituted. When two or more substituents are present, the substituents may be the same or different. If possible, they may combine with each other to form a ring.

$X^1$ and $X^2$ each represents a hydrogen atom or a substituent, and at least one of them is a cyano group, and other one is preferably a carbonyl group, a sulfonyl group, or an aromatic hetero ring. As for the substituent represented by $X^1$ and $X^2$, the substituent T can be applied. Also, the substituent represented by $X^1$ and $X^2$ may be further substituted by another substituent, and $X^1$ and $X^2$ may be condensed to form a cyclic structure.

$X^1$ and $X^2$ each is preferably a hydrogen atom, an alkyl group, an aryl group, a cyano group, a nitro group, a carbonyl group, a sulfonyl group, or an aromatic hetero ring, more preferably a cyano group, a carbonyl group, a sulfonyl group, or an aromatic hetero ring, still more preferably a cyano group or a carbonyl group, particularly preferably a cyano group or an alkoxycarbonyl group (—C(═O)OR(R: an alkyl group having 1 to 20 carbon atom(s), an aryl group having 6 to 12 carbon atoms or a combination thereof)).

The compound of Formula (103) is preferably a compound represented by the following formula (103-A).

Formula (103-A):

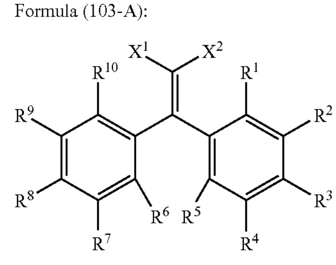

(In Formula (103-A), $R^1$, $R^2$, $R^3$, $R^4$, $R^5$, $R^6$, $R^7$, $R^8$, $R^9$ and $R^{10}$ each independently represents a hydrogen atom or a substituent. $X^1$ and $X^2$ have the same meanings as in Formula (103) and preferred ranges are also the same).

$R^1$, $R^2$, $R^3$, $R^4$, $R^5$, $R^6$, $R^7$, $R^8$, $R^9$ and $R^{10}$ each independently represents a hydrogen atom or a substituent and as for the substituent, the substituent T can be applied. The substituent may be further substituted by another substituent, and the substituents may be condensed with each other to form a cyclic structure.

$R^1$, $R^2$, $R^3$, $R^4$, $R^5$, $R^6$, $R^7$, $R^8$, $R^9$ and $R^{10}$ each is preferably a hydrogen atom, an alkyl group, an alkenyl group, an alkynyl group, an aryl group, a substituted or unsubstituted amino group, an alkoxy group, an aryloxy group, a hydroxy group, or a halogen atom, more preferably a hydrogen atom, an alkyl group, an aryl group, an alkyloxy group, an aryloxy group, or a halogen atom, even more preferably a hydrogen atom or an alkyl group having 1 to 12 carbon atom(s), particularly preferably a hydrogen atom or a methyl group, and most preferably a hydrogen atom.

$R^3$ and $R^8$ each is preferably a hydrogen atom, an alkyl group, an alkenyl group, an alkynyl group, an aryl group, a substituted or unsubstituted amino group, an alkoxy group, an aryloxy group, a hydroxy group, or a halogen atom, more preferably a hydrogen atom, an alkyl group having 1 to 20 carbon atom(s), an amino group having 0 to 20 carbon atom(s), an alkoxy group having 1 to 12 carbon atom(s), or an aryloxy group having 6 to 12 carbon atoms, even more preferably a hydrogen atom, an alkyl group having 1 to 12 carbon atom(s) or an alkoxy group having 1 to 12 carbon atom(s), particularly preferably a hydrogen atom.

The compound of formula (103) is more preferably a compound represented by the following formula (103-B).

Formula (103-B):

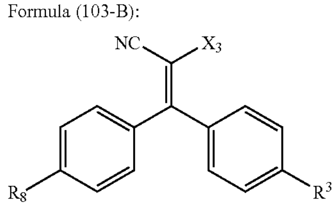

(In Formula (103-B), $R^3$ and $R^8$ have the same meaning as in Formula (103-A) and preferred ranges are also the same. $X^3$ represents a hydrogen atom or a substituent).

$X^3$ represents a hydrogen atom or a substituent and as for the substituent, the substituent T can be applied. Also, if possible, the substituent may be substituted by another substituent. $X^3$ is preferably a hydrogen atom, an alkyl group, an aryl group, a cyano group, a nitro group, a carbonyl group, a sulfonyl group, or an aromatic hetero ring, more preferably a cyano group, a carbonyl group, a sulfonyl group, or an aromatic hetero ring, even more preferably a cyano group or a carbonyl group, particularly preferably a cyano group or an alkoxycarbonyl group (—C(═O)OR(R: an alkyl group having 1 to 20 carbon atom(s), an aryl group having 6 to 12 carbon atoms or a combination thereof)).

The compound of Formula (103) is even more preferably a compound represented by formula (103-C).

Formula (103-C):

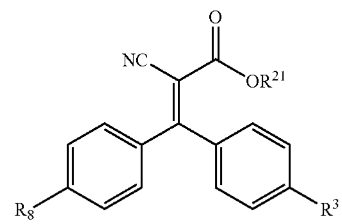

(In Formula (103-C), $R^3$ and $R^8$ have the same meanings as in Formula (103-A) and preferred ranges are also the same. $R^{21}$ represents an alkyl group having 1 to 20 carbon atom(s)).

When $R^3$ and $R^8$ both are a hydrogen atom, $R^{21}$ is preferably an alkyl group having 2 to 12 carbon atoms, more preferably an alkyl group having 4 to 12 carbon atoms, even more preferably an alkyl group having 6 to 12 carbon atoms, particularly preferably an n-octyl group, a tert-octyl group, a 2-ethylhexyl group, an n-decyl group, or an n-dodecyl group, and most preferably a 2-ethylhexyl group.

When $R^3$ and $R^8$ are other than hydrogen, $R^{21}$ is preferably an alkyl group having 20 or less carbon atoms and causing the compound represented by Formula (103-C) to have a molecular weight of 300 or more.

The compound represented by Formula (103) can be synthesized by the method disclosed in Journal of American Chemical Society. Vol. 63, page 3452 (1941).

Specific examples of the compound represented by Formula (103) are exemplified below, but the present invention is not limited to these specific examples.

UV-201

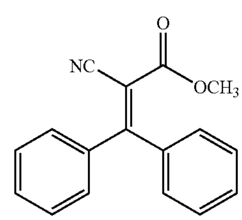

UV-202

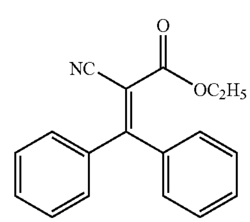

UV-203

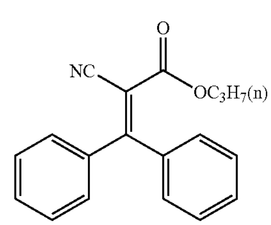

-continued
UV-204
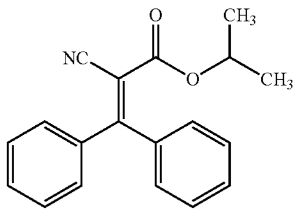
UV-205
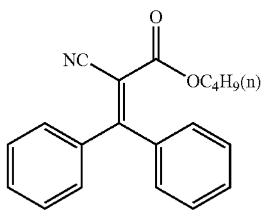
UV-206
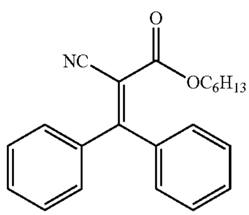
UV-207
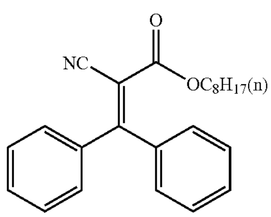
UV-208
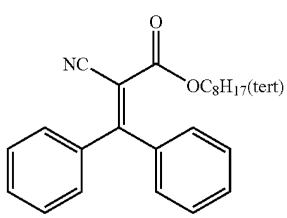
UV-209
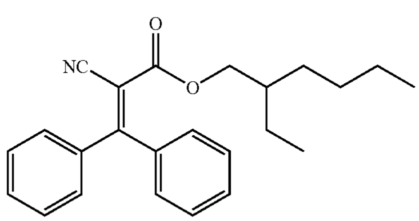
UV-210
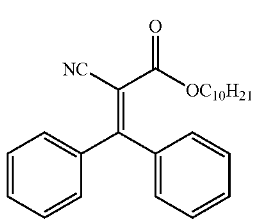
-continued
UV-211
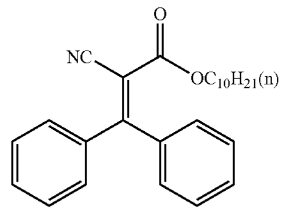
UV-212
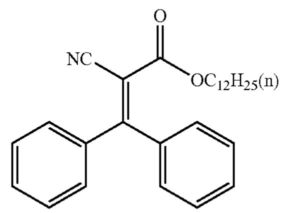
UV-213
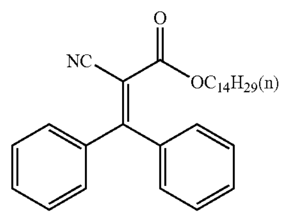
UV-214
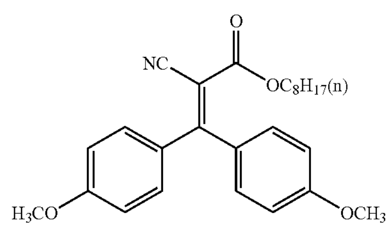
UV-215
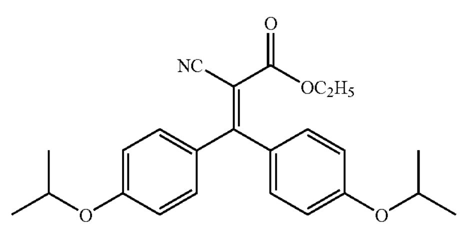
UV-216
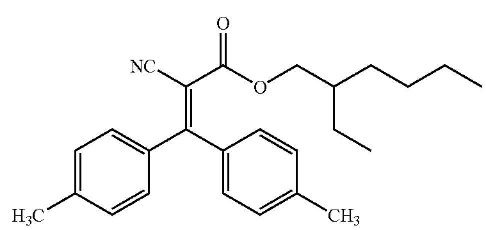
UV-217
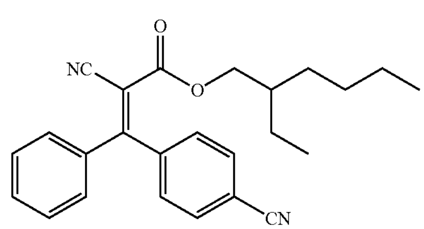

-continued
UV-218
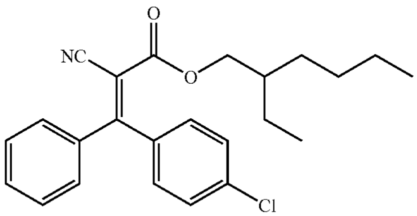
UV-219
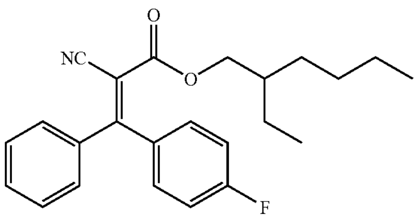
UV-220
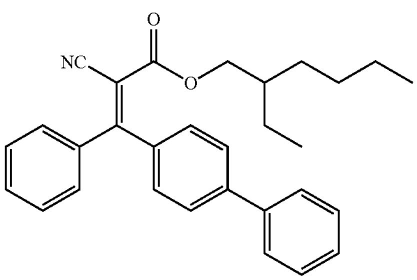
UV-221
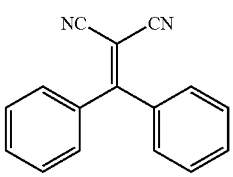
UV-222
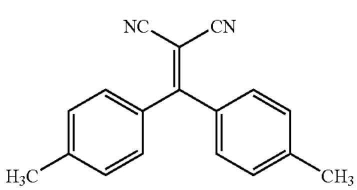
UV-223
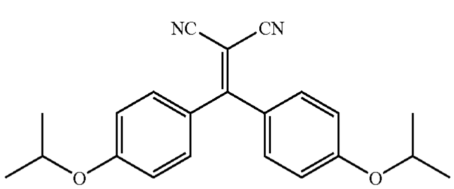
-continued
UV-224
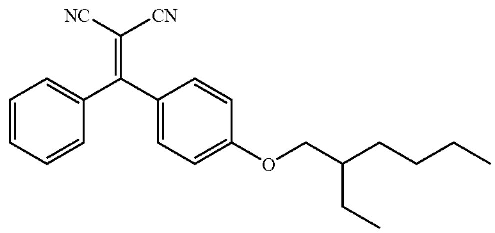
UV-225
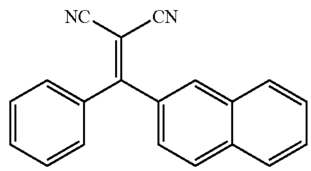
UV-226
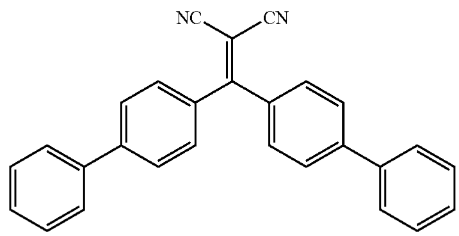
UV-227
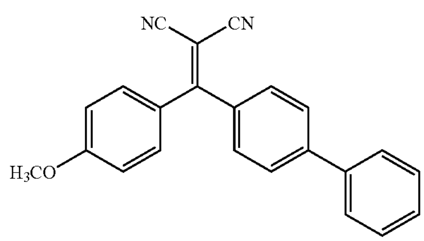
UV-228
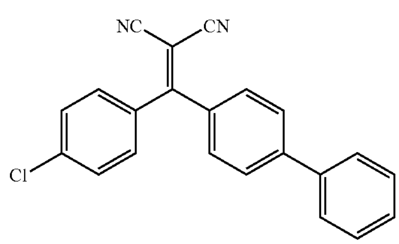
UV-229
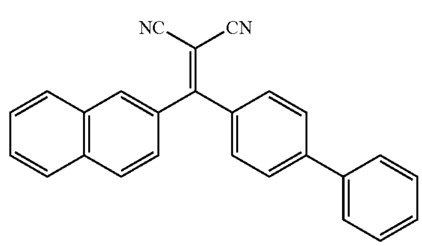

-continued

UV-230

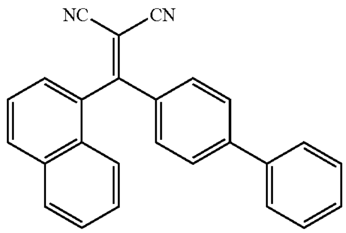

UV-231

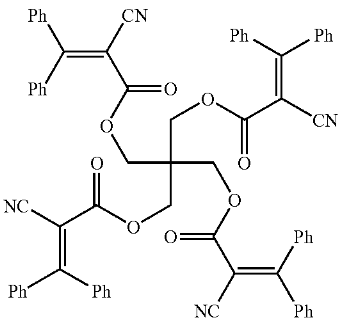

The cellulose acylate film to be used for the present invention can be prepared in a long film by using various methods such as an extrusion method, a solution casting method, etc. After the film molding, it is desirable to be further subjected to a stretching treatment to obtain required optical properties. When preparing the film in accordance with the solution casting method, additives such as plasticizer (preferred adding amount is 0.1 to 20 mass % of the cellulose ester, same in below), modifying agent(0.1 to 20 mass %), UV absorbing agent (0.001 to 10 mass %), fine-particle powders having an average particle diameter of 5 to 3000 nm (0.001 to 5 mass %), fluorine-based surfactant (0.001 to 2 mass %), release agent (0.0001 to 2 mass %), deterioration inhibitor (0.0001 to 2 mass %), optical anisotropy adjusting agent (0.1 to 15 mass %), infrared absorption agent (0.1 to 5 mass %), etc. may be included in dopes. The preparation method of the film is described in detail in Journal of Technical Disclosure. No. 2001-1745 (Mar. 15, 2001), and which can be applied in the present invention.

The obtained cellulose acylate film can be appropriately subjected to a surface treatment to improve adhesion between the cellulose acylate layer and any other layer. Examples of the surface treatment include glow discharge treatment, ultraviolet irradiation treatment, corona treatment, flame treatment, and saponification treatment (acid or alkali treatment), and particularly preferred treatments are the glow discharge treatment and alkali saponification treatment.

As above, only a film comprising cellulose acylate which includes a substituent having a polarizability anisotropy $\Delta\alpha$ of $2.5\times10^{-24}$ $cm^{-3}$ or more is satisfied in optical properties required for the second phase difference area, but the present invention also includes embodiments comprising other birefringence film and phase difference film.

[Protective Film for Polarizing Film]

The protective film for the polarizing film preferably has no absorption in a visible light region, a light transmission of 80% or more, and a small retardation based on birefringence. In specific, the in-plane retardation Re is preferably from 0 to 30 nm, more preferably from 0 to 15 nm, and most preferably from 0 to 5 nm. The retardation in thickness-direction Rth is preferably from −40 to 40 nm, more preferably from −20 to 20 nm, and most preferably from −10 to 10 nm n. Any films having such optical properties can be favorably used, and from the viewpoint of durability of the polarizing film, cellulose acylate films and norborne-based films are preferable. As the method of reducing Rth of the cellulose acylate film, methods disclosed in the specifications of Japanese Unexamined Patent Application Publication Nos. 11-246704, 2001-247717, and Japanese Patent Application No. 2003-379975, can be exemplified. In addition, the Rth can be reduced by decreasing the thickness of the cellulose acylate film. The thickness of the cellulose acylate film as the protective film for the first and second polarizing films is preferably from 10 to 100 μm, more preferably from 10 to 60 μm, and even more preferably from 20 to 45 μm.

[Optically-Compensatory Film incorporating Polarizing Plate]

The present invention relates to an optically-compensatory film incorporating a polarizing plate, prepared by incorporating the polarizing film and the first and second phase difference films having an optical compensation function. According to the use of the optically-compensatory film incorporating a polarizing plate of the present invention, the viewing angle of a liquid crystal display can be improved with a simple configuration. In addition, since it is possible to prepare the compensation film incorporating a polarizing plate of the present invention with a simple process comprising preparing into a long film by a roll-to-roll production, cutting into a desired size, and incorporating to a liquid crystal display device, thus it contributes to improvement of productivity of liquid crystal display device.

One embodiment of the optically-compensatory film incorporating a polarizing plate of the present invention at least comprises (A) a long polarizing film which has an absorption axis in parallel with a longitudinal direction, (B) a long second phase difference film which has a film comprising cellulose acylate that includes a substituent having a polarizability anisotropy $\Delta\alpha$ of $2.5\times10^{-24}$ $cm^3$ or more, retardation in a thickness-direction Rth of −200 to −50 nm, and in-plane retardation Re of 50 nm or less, in which the optical axis is not included in an in-plane film, and (C) a long first phase difference film which has a slow axis substantially orthogonal to a longitudinal direction, which is interposed between the polarizing film and the second phase difference film. The compensation film incorporating a polarizing plate of the present embodiment has phase difference films, respectively, which has functions for the polarizing film and also satisfies the optical properties for the first phase difference area and the second phase difference area. The compensation film incorporating a polarizing plate of this embodiment is simple to fit optical axes of the polarizing film, the first phase difference film, and the second phase difference film, and for example, simply adopted in a liquid crystal display device (e.g., a liquid crystal display device having a configuration shown in FIG. 3) after being prepared into a long film by a roll-to-roll production and cut into a predetermined size.

Other embodiment of the optically-compensatory film incorporating a polarizing plate of the present invention at least comprises in the order of (A) a long polarizing film which has an absorption axis in parallel with a longitudinal direction, (B) a long second phase difference film which has a film comprising cellulose acylate that includes a substituent having a polarizability anisotropy $\Delta\alpha$ of $2.5\times10^{-24}$ $cm^{-3}$ or more, retardation in a thickness-direction Rth of −200 to −50 nm, and in-plane retardation Re of 50 nm or less, in which the optical axis is not included in an in-plane film, and (C) a long first phase difference film which has a slow axis substantially in parallel with a longitudinal direction. The compensation film incorporating a polarizing plate of this embodiment has phase difference films, respectively, which has functions for the polarizing film and also satisfies the optical properties for the first phase difference area and the second phase difference area. The compensation film incorporating a polarizing plate of the present embodiment is simple to fit optical axes of the polarizing film, the first phase difference film, and the second phase difference film, and for example, simply adopted in a liquid crystal display device (e.g., a liquid crystal display device having a configuration shown in FIG. 4) after being prepared into a long film by a roll-to-roll production and cut into a predetermined size.

The first phase difference film and the second phase difference film are laminated with the polarizing film in a long-form. For example, in the embodiment of forming the first phase difference film from a composition containing a liquid-crystal compound, a laminated body of the long first phase difference film and second phase difference film can be prepared by transferring a long film which comprises a cellulose acylate constituting a substituent having a polarizability anisotropy $\Delta\alpha$ of $2.5\times10^{-24}$ $cm^{-3}$ or more; forming an alignment film by successively coating the surface with an alignment-film composition liquid; subjecting the surface to a successive rubbing treatment; and successively coating the rubbing-treated face with a liquid-crystal compound-containing liquid.

The slow axis direction of the long first phase difference film formed from the composition containing a liquid-crystal compound is either in a parallel or orthogonal direction to a film in-longitudinal direction. As above, in the case of aligning a liquid-crystal compound by carrying out a successive rubbing treatment while transferring the alignment film formed on a long film, the materials for an alignment film is appropriately selected depending on the alignment of the liquid-crystal molecules whether to be parallel or orthogonal direction to the longitudinal direction. For the slow axis of the first phase difference film to be in parallel with a rubbing direction (that is, to be in parallel with a longitudinal direction), a polyvinyl alcohol-based alignment film can be used. For the slow axis of the first phase difference film to be orthogonal to a rubbing direction (that is, to be orthogonal to a longitudinal direction), orthogonal alignment films disclosed in sections [0024] to [0210] in Japanese Unexamined Patent Application Publication No. 2002-98836 can be used. The extensively generally-used polarizing film using iodine is produced by a successive longitudinal-uniaxial stretching treatment process, thereby the absorption axis is in parallel with a longitudinal direction of a roll. Therefore, in the case of adhering a common long-polarizing film subjected to a longitudinal-uniaxial stretching and a long first phase difference film by a roll-to-roll production, so that the absorption axis of the polarizing film is orthogonal to the slow axis of the first phase difference film, the above-mentioned orthogonal alignment film is preferably used.

The compensation film incorporating a polarizing plate of the present invention may comprise a protective film for the polarizing film on a surface opposite to the side on which the above-mentioned phase difference film of the polarizing film is formed. In addition, the protective film for a polarizing film may be comprised between the polarizing film and the above-mentioned phase difference film, and in this case, smaller retardation based on the birefringence of the protective film is preferable, and the in-plane retardation Re and in-thickness retardation Rth nearer to 0 nm are preferable.

EXAMPLES

Hereinafter, the first present invention will be explained in further detail with reference to Examples, but the first present invention is not limited to the following specific examples.

Example 1-1

<Production of the Cellulose Derivative Solution>

A composition shown in table 1-1-1 and table 1-1-2 were charged into a mixing tank of resistance to pressure, and each component was dissolved by stirring for 6 hours to prepare the cellulose derivative solution T-1-1 to T-1-15. Additionally, the group name of acyl group substituted is shown in ( ) of section of the substituent degree in the table 1-1-1 and table 1-1-2.

TABLE 1-1-1

Cellulose acylate solution component table (unit: Part by mass)

| Cellulose acylate solution | Metylene chloride | Methanol | Cellulose derivative Substitution degree | Additive amount | Additive |
|---|---|---|---|---|---|
| T-1-1 | 630 | 100 | 2.1/0.9 (Acetyl/No. 1) | 100 | TPP/BDP 7.8/3.9 |
| *1 | 630 | 100 | 2.4/0.6 (Acetyl/No. 1) | 100 | TPP/BDP 7.8/3.9 |
| *2 | 630 | 100 | 2.4/0.6 (Acetyl/No. 1) | 100 | TPP/BDP 3.9/2.0 |
| *3 | 630 | 100 | 2.4/0.6 (Acetyl/No. 1) | 100 | — |
| *4 | 630 | 100 | 2.4/0.6 (Acetyl/No. 1) | 100 | Compound mentioned below α 11.7 |
| *5 | 630 | 100 | 2.4/0.6 (Acetyl/No. 1) | 100 | Compound mentioned below β 11.7 |
| *6 | 630 | 100 | 2.4/0.6 (Acetyl/No. 1) | 100 | PMMA 25 |
| *7 | 730 | 0 | 2.4/0.6 (Acetyl/No. 1) | 100 | TPP/BDP 3.9/2.0 |
| *8 | 630 | 100 | 2.6/0.3/0.1 (Acetyl/No. 1/ Hydroxyl group) | 100 | TPP/BDP 7.8/3.9 |
| *9 | 630 | 100 | 2.4/0.55/0.05 (Acetyl/No. 1/ Hydroxyl group) | 100 | TPP/BDP 7.8/3.9 |
| *10 | 730 | 0 | 1.5/1.5 (Acetyl/No. 1) | 100 | TPP/BDP 7.8/3.9 |
| *11 | 730 | 0 | 1.1/1.9 (Acetyl/No. 1) | 100 | TPP/BDP 7.8/3.9 |
| T-1-2 | 630 | 100 | 0.9/1.1/1.0 (Acetyl/No. 1/ Hydroxyl group) | 100 | TPP/BDP 7.8/3.9 |
| T-1-3 | 630 | 100 | 0.3/1.1/0.6/1.0 (Acetyl/No. 1/ Propanoyl/ Hydroxyl group) | 100 100 | TPP/BDP 7.8/3.9 |

TABLE 1-1-2

Cellulose acylate liquid solution component table (unit: Part by mass)

| Cellulose Acylate solution | Metylene Chloride | Meth-anol | Cellulose derivative: Substitution degree | Cellulose derivative: Additive amount | Cellulose derivative: Additive |
|---|---|---|---|---|---|
| T-1-4 | 630 | 100 | 0/1.1/0.9/1.0 (Acetyl/No. 1/ Propanoyl/ Hydroxyl group) | 100 | TPP/BDP 7.8/3.9 |
| T-1-5 | 630 | 100 | 0.3/1.1/0.6/1.0 (Acetyl/No. 1/ Butyryl/ Hydroxyl group) | 100 | TPP/BDP 7.8/3.9 |
| T-1-6 | 630 | 100 | 0/1.1/0.9/1.0 (Acetyl/No. 1/ Butyryl/ Hydroxyl group) | 100 | TPP/BDP 7.8/3.9 |
| T-1-7 | 630 | 100 | 2.1/0.9 (Acetyl/No. 20) | 100 | TPP/BDP 7.8/3.9 |
| T-1-8 | 630 | 100 | 1.3/0.9/0.8 (Acetyl/No. 20/ Propanoyl) | 100 | TPP/BDP 7.8/3.9 |
| T-1-9 | 630 | 100 | 1.4/0.9/0.7 (Acetyl/No. 20/ Butyryl) | 100 | TPP/BDP 7.8/3.9 |
| T-1-10 | 630 | 100 | 0.4/1.1/1.5 (Acetyl/No. 1/ Hydroxyl group) | 100 | TPP/BDP 7.8/3.9 |
| T-1-11 | 630 | 100 | 0.2/1.3/1.5 (Acetyl/No. 7/ Hydroxyl group) | 100 | TPP/BDP 7.8/3.9 |
| T-1-12 | 630 | 100 | 0.3/1.2/1.5 (Acetyl/No. 1/ Hydroxyl group) | 100 | TPP/BDP 7.8/3.9 |
| T-1-13 | 630 | 100 | 2.8/0.2 (Acetyl/ Hydroxyl group) | 100 | TPP/BDP 7.8/3.9 |
| T-1-14 | 630 | 100 | 2.2/0.5/0.3 (Acetyl/ Propanoyl/ Hydroxyl group) | 100 | TPP/BDP 7.8/3.9 |
| T-1-15 | 630 | 100 | 1.5/1.2/0.3 (Acetyl/Butyryl/ Hydroxyl group) | 100 | TPP/BDP 7.8/3.9 |

A No. in the table is corresponding to a specific example No. of aromatic acyl group in formula (A) of the specification. $\Delta\alpha$ of acetyl group is $0.91\times10^{-24}$ $cm^3$, and $\Delta\alpha$ of butyryl group is $2.2\times10^{-24}$ $cm^3$, and $\Delta\alpha$ of propanoyl group is $1.4\times10^{-24}$ $cm^3$, and $\Delta\alpha$ of No. 1 is $5.1\times10^{-24}$ $cm^3$, and $\Delta\alpha$ of No. 13 is $7.1\times10^{-24}$ $cm^3$.

TPP: Triphenyl phosphate

BDP: Biphenyl diphenyl phosphate

PMMA: Polymethyl methacrylate (Oligomer: Molecular weight approximately 9,000)

Compound α:

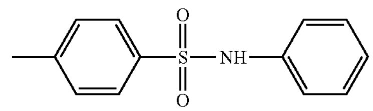

Compound β:

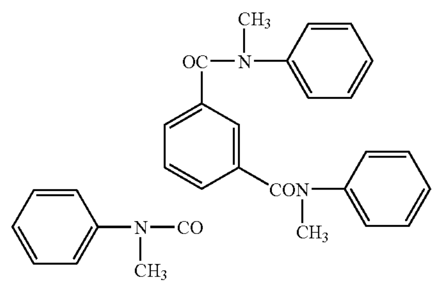

<Production of Additive Liquid Solution>

A composition shown in Table 1-2 was charged into a mixing tank of resistance to pressure, and each component was dissolved by stirring at 39° C., to prepare an additive solution U-1.

TABLE 1-2

Additive solution component table (unit: Part by mass)

| Additive solution | Formulation: Metylent chloride Additive amount | Formulation: Methanol Additive amount | Formulation: Additive amount Kind | Formulation: Additive amount Additive amount |
|---|---|---|---|---|
| U-1 | 84 | 16 | Following (1) | 15 |

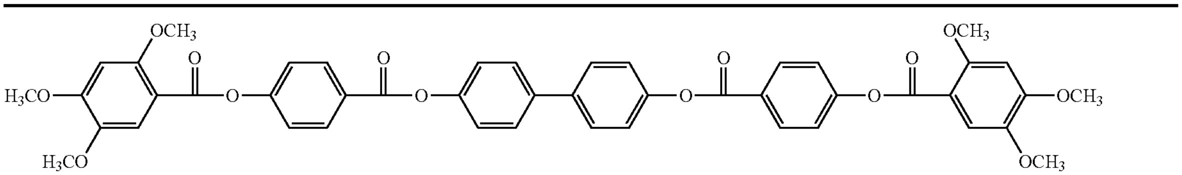

(1)

<Production of Cellulose Acylate Film Samples 1001 to 1002>

In mixing tank of resistance to pressure, 477 parts by mass of a cellulose acylate liquid solution T-1-1 was stirred adequately to prepare the dope. The dope prepared was cast on the metal support in the band casting machine, and then dried, and the dope casting film having self-supporting property was peeled off from the band. Edge of the dope film peeled off was gripped with the tenter and stretched by the tenter so that the width of film become respectively 1.0-fold, 1.1-fold, then dried while the film was gripped with the tenter, to prepare the cellulose acylate film samples of the thickness of 80 μm, 1001, 1002 by the size of 100 m in a longitudinal direction (casting direction), 1.3 m in the across-the-width direction.

<Production of Cellulose Acylate Film Samples 1005 to 1006, 1008 to 1016, 1018 to 1020, 1024, 1025, *B, *C, *K, *L, and *N to *S>

The cellulose acylate film samples of the thickness of 80 μm, cellulose acylate film samples 1005 to 1006, 1008 to 1016, 1018 to 1020, 1024, 1025, were produced by the size of 100 m in a longitudinal direction (casting direction), 1.3 m in the across-the-width direction in the same manner as in the production of the cellulose acylate film sample 1001, except that cellulose acylate solution was accordingly changed in accordance with table 1-1-1, table 1-1-2, and table 1-3, and the stretching magnification was given as shown in table 1-3.

<Production of Cellulose Acylate Film Samples 1007, 1017, and 1021>

The cellulose acylate film samples of the thickness of 80 μm, cellulose acylate film samples 1007, 1017, 1021, were produce by the size of 100 m in a longitudinal direction (casting direction), 1.3 m in the across-the-width direction in the same manner as in the production of the cellulose acylate film samples 1001, except that cellulose acylate solution used for the dope prepared liquid was accordingly changed into T-1-2, T-1-10, T-1-13 in accordance with table 1-1-1, table 1-1-2, and table 1-3, and the additive solution shown in Table 1-2 is added with the ratio of 1 part by mass for 4 part by mass of cellulose acylate solution and the stretching magnification was given as shown in table 1-3.

<Production of Cellulose Acylate Film Sample *G>

A cellulose acylate film sample *G was produced by the size of 1.5 m of the width of the film, in the same manner as in the method of preparation of an cellulose acylate film samples *C, except that the width of the die used at the time of casting on the metal support of the band casting machine was expanded.

<Production of Cellulose Acylate Film Sample *H>

The cellulose acylate solution *1 was put in a stock tank made of resistance to pressure, and left at rest, and then casted on a metal support of a band casting machine by means of the solution sending piping having pump, filter (filter diameter: 10 μm), using die for exclusive use of 800 m width. After drying on the band casting machine, the casting film which has self-supporting properties was peeled off from the metal support, and then the edge of the dope film was gripped with the tenter clip and subjected to a stretching treatment of 1.08-fold in a width-direction under the condition of temperature at 140° C. After stretching, the film was separated from the clip, cutting off the clip gripping portion of both ends of the film, and then the film was dried at 135° C. by means of drying zone where roll was continually placed so as to transport film. After drying the film, both ends of the film was cut off again to prepare the film of width 680 mm, and length of 500 m was wound up to a wick. In this way sample of cellulose acylate film sample *H was prepared. Film thickness after reel up was 102 μm.

<Production of Cellulose Acylate Film Sample *I>

A cellulose acylate film sample of *I was produced by the size of 100 m in a longitudinal direction (casting direction), 1.3 m in the across-the-width direction in the same manner as cellulose acylate film samples 1002, expect that cellulose acylate solution used for the dope prepared liquid was accordingly changed into *2, in accordance with table 1-1-1, and table 1-1-2, and the thickness of 60 μm was given.

<Preparation of Cellulose Acylate Film Sample *J, *N>

In the method of preparation of cellulose acylate film samples 1002, cellulose acylate solution used for the dope prepared liquid was accordingly changed into *3, *6, in accordance with table 1-1-1, and table 1-1-2, and by the method that was similar except giving stretching magnification of 1.3-fold, the thickness of 40 μm, to prepare the cellulose acylate film samples of *J, N by the size of 100 m in a longitudinal direction (casting direction), 1.3 m in the across-the-width direction.

<Preparation of Cellulose Acylate Film Sample 1003, 1022, *D>

In the method of preparation of cellulose acylate film samples 1001, by the method that was similar except giving stretching magnification as 1.2-hold, the cellulose acylate film sample of the thickness of 80 μm, 1003 was prepared. Additionally, in the method of preparation of cellulose acylate film samples 1001, cellulose acylate solution was changed into T-1-13, by the method that was similar except giving stretching magnification as 1.2-hold, to prepare the cellulose acylate film sample of the thickness of 80 μm, 1022.

Furthermore, in the method of preparation of cellulose acylate film samples 1001, cellulose acylate solution was changed into *1, by the method that was similar except giving stretching magnification of 1.16-fold, the thickness of 150 μm, to prepare the cellulose acylate film samples of *D.

After saponification of the surface of the above mentioned film 1003, 1002, to these films, the aligned film coating liquid as following composition was applied by 20 ml/m$^2$, with a wire bar coater. The film was dried in warm air of 60° C. for 60 seconds, further in warm air of 100° C. for 120 seconds to form the film. Next, for the formed film, a rubbing process was provided in a direction parallel to slow axis direction of the film to obtain the aligned film.

| Composition of the aligned film coating liquid | |
|---|---|
| Following modification polyvinyl alcohol | 10 part by mass |
| Water | 371 part by mass |
| Methanol | 119 part by mass |
| Glutaraldehyde | 0.5 part by mass |
| Additive (compound 1-1 exemplified below) | 0.2 part by mass |

Modification polyvinyl alcohol

-continued

Composition of the aligned film coating liquid

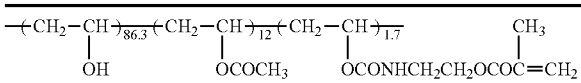

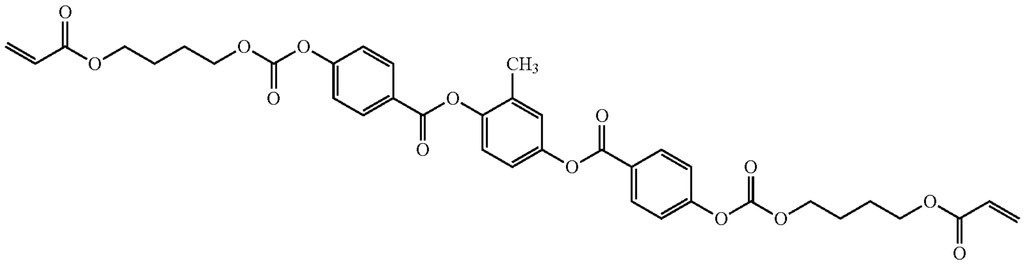

I-1)

Next, on aligned film, the solution that 1.8 g of discotic-type liquid crystal compound (D1), 0.2 g of ethylene oxide modification trimethylolpropane triacrylate (V#360, produced by Osaka organic chemical Industry Ltd.), 0.06 g of Photopolymerization initiator (Irgacure907, produce by Ciba-geigy Co., Ltd.) was dissolved in methylene chloride was applied with the wire bar of #3.4. This was attached to a metal flame, and heated in constant-temperature bath of 125° C. for 3 minutes so that the discotic-type liquid crystal compound was aligned. Next, by means of a 120 W/cm high pressure mercury vapor lamp at 100° C., irradiating UV for 30 seconds, the discotic-type liquid crystal compound was cross-linked to form the optically anisotropic layer, and then left to be room temperature. In this way, cellulose acylate film samples 1003, 1022 were prepared. Re (546) of the optically anisotropic layer was 1.1 nm, Rth (546) was −230 nm.

<Preparation of Cellulose Acylate Film Sample 1004, 1023>

After saponification process of the above mentioned film 1003 and 1022 and the formation of the aligned film was performed, the solution that 1.8 g of following discotic-type liquid crystal compound (D1), 0.2 g of ethylene oxide modification trimethylolpropane triacrylate (V#360, produced by Osaka organic chemical Industry Ltd.), 0.06 g of Photopolymerization initiator (Irgacure907, produce by Ciba-geigy Co., Ltd.), 0.02 g of sensitizer (Kayacure DETX, produced by Nippon Kayaku Co., Ltd.), 0.0072 g of air-interface side orthogonal alignment agent(fluorine-based polymer, following compound p-15) was dissolved in 3.9 g of methyl ethyl ketone, was applied with the wire bar of #3.4. This is attached to a metal flame, and heated in constant-temperature bath of 125° C. for 3 minutes so that the discotic-type liquid crystal compound was aligned. Next, by means of a 120 W/cm high pressure mercury vapor lamp at 100° C., irradiating UV for 30 seconds, the discotic-type liquid crystal compound was cross-linked to form the optically anisotropic layer, and then left to be room temperature. In this way, cellulose acylate film samples 1004, 1023 were prepared. Re (546) of the optically anisotropic layer was 3.4 nm, Rth (546) was −130 nm.

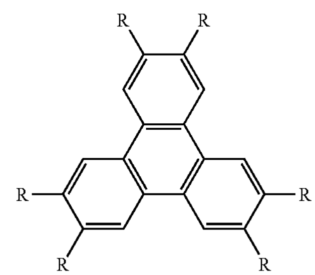

Discotic-type liquid crystal compound

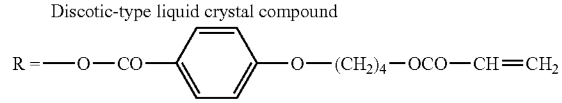

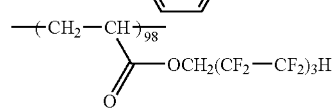

P-15

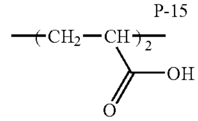

Mw25000

<Preparation of Cellulose Acylate Film Sample *E>

In the method of preparation of cellulose acylate film samples 1001, cellulose acylate solution was changed into *1, by the method that was similar except giving stretching magnification as 1.4-fold, the film thickness of 60 μm after the stretching, to prepare the cellulose acylate film. After the saponification process of the surface, by the method that was similar to the cellulose acylate film 1004 except that the discotic-type liquid crystal coating liquid was applied with the wire bar of #3, the aligned film, the optically anisotropic layer is provided to prepare cellulose acylate film sample *E. Re (546) of the optically anisotropic layer was 2.8 nm, Rth (546) was −98 nm.

<Preparation of Cellulose Acylate Film Sample *A, *F>

In the method of preparation of cellulose acylate film samples 1001, by the method that was similar except giving stretching magnification as 1.2-hold, the film *A of the thickness of 80 μm was prepared. Furthermore, cellulose acylate solution was changed into *1, by the method that was similar except giving stretching magnification as 1.2-hold, to prepare the film *F of the thickness of 80 μm.

After saponification of the surface of the above mentioned film, to these films, the aligned film coating liquid as following composition was applied by 20 ml/m$^2$, with a wire bar coater. The film was dried in warm air of 60° C. for 60 seconds, further in warm air of 100° C. for 120 seconds to form the film. Next, for the formed film, a rubbing process was provided in a direction parallel to slow axis direction of the film to obtain the aligned film.

| <Composition of the aligned film coating liquid> | |
|---|---|
| Above mentioned modification polyvinyl alcohol | 10 part by mass |
| Water | 371 part by mass |
| Methanol | 119 part by mass |
| Glutaraldehyde | 0.5 part by mass |

The coating liquid containing the rod-like liquid crystal compound of the following composition was applied on the aligned film prepared above. The transportation speed of a film was set in 20 m/min. Solvent was dried by a process to warm to 80° C. from room temperature continually, and then heated with a drying zone of 80° C. for 90 seconds, so that the rod-like liquid crystal compound was aligned. Next, temperature of the film was held at 60° C., and alignment of the liquid crystal compound was entrenched by UV irradiation to form the optically anisotropic layer. Re (546) of the optically anisotropic layer was 0.5 nm, Rth (546) was −265 nm.

<Alkali Saponification Process>

Next, for each cellulose acylate film sample prepared, alkali saponification process was performed. As for the saponification liquid, using sodium hydroxide aqueous solution of 1.5 mol/L, the film sample was soaked in at 55° C., for 2 minutes. It was washed in a water washing bath of room temperature, and neutralized with sulfuric acid of 0.05 mol/L, at 30° C. It was washed in a water washing bath of room temperature again, and further dried in warm air of 100° C. In this way optically-compensatory film samples 1001 to 1025 that saponification process was performed on both surfaces were saponified was prepared.

<Preparation of Polarizing Plate>

Using the above mentioned optically-compensatory film samples 1001 that saponification process had been performed on surface, preparation of polarizing plate was carried out. Thus, in the surface of one side of the film samples that saponification process had been performed on, acrylic pressure sensitive adhesive liquid was applied by 20 ml/m$^2$ respectively, and dried at 100° C., for 5 minutes to prepare the film samples with adhesive.

Next, roll polyvinyl alcohol film of thickness 80 μm was continuously stretched to 5-hold in iodine aqueous solution, and dried to prepare the polarizer of thickness 30 μm. So that the polarizer face to the side, where the adhesive was not applied, of the above mentioned optically-compensatory film samples 1001 with adhesive, the polarizer was pasted, further, to the other side of the polarizer, cellulose acetate film (FUJI-

| | |
|---|---|
| Above mentioned rod-like liquid crystal compound (I-1) | 100 part by mass |
| Photopolymerization initiator | 3 part by mass |
| (Irgacure907, produce by Ciba-geigy Co., Ltd.) | |
| Sensitizer | 1 part by mass |
| (Kayacure DETX, produced by Nippon Kayaku Co., Ltd.) | |
| Following fluorine-based polymer | 0.4 part by mass |
| Following pyridinium salt | 1 part by mass |
| Methyl ethyl ketone | 172 part by mass |

Fluorine-based polymer

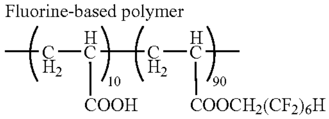

Pyridinium salt

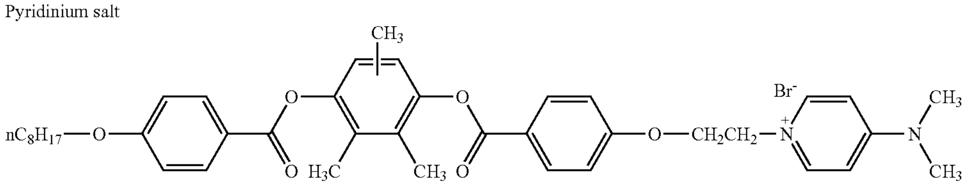

<Evaluation test>

[Panel Evaluation]

Example 1-2

(Implementation Evaluation to IPS-Type Liquid Crystal Display Device)

Using the cellulose acylate film sample prepared in Example 1-1, implementation evaluation to IPS-type liquid crystal display device is carried out and it was determined if optical performance was adequate. Additionally, in the present example, IPS-type liquid crystal was used, but the application of the polarizing plate using the present invention is not limited to the operation mode of the liquid crystal display device.

TAC TD80UF, prepared by Fuji Photo Film Co., Ltd, Re(630) is 3 nm, Rth(630) is 50 nm.) was pasted, by the similar method as above mentioned, performing the following process, alkali saponification process, application of adhesive layer, and pasting to the polarizer, to prepare the polarizing plate sample with the optically-compensatory film 1001.

Further, for the other side of the liquid crystal cell, the commercial polarizing plate (HLC-5618 prepared by Sanritz Corporation) was used.

Using the above mentioned polarizing plate samples 1001 produced and the commercial polarizing plate, as shown in the FIG. 1, so that the optically-compensatory film faces to each liquid crystal cell side, the display device that the film are sandwiched in the order of 'polarizing plate sample 1001+IPS-type liquid crystal cell+polarizing plate HLC-5618', and built in, were prepared. At this time, so that transmission axis of the polarizing plate above and below is in a direction orthogonal, and transmission axis of the polarizing plate sample 1001 of upper side is in a direction parallel to long axis of liquid crystal cell molecule (i.e. slow axis of the optically-compensatory film is in a direction orthogonal to long axis of liquid crystal cell molecule). As for the liquid crystal cell and electrode basal plate, the things which has been used as IPS in the past, can be used as itself. The alignment of the liquid crystal cell is horizontal alignment, and the liquid crystal has positive dielectric constant anisotropic, the things which are developed for the IPS liquid crystal use and marketed. The properties of the liquid crystal cell are Δn of the liquid crystal: 0.099, cell gap of the liquid crystal layer: 3.0 μm, pretilt angle: 5 degree, rubbing direction: both of above and below the basal plate is 75 degree.

Similarly, for the optically-compensatory film sample 1002 to 1015, in the method similar to the above mentioned polarizing plate sample 1001, the polarizing plate was prepared to prepare the display device built in with IPS-type liquid crystal cell.

Example 1-3

(Implementation Evaluation to IPS-type Liquid Crystal Display Device)

Using the cellulose acylate film sample *D prepared in Example 1-1, implementation evaluation to IPS-type liquid crystal display device is carried out and it was determined if optical performance was adequate as below.

(Preparation of the Front Polarizing Plate)

Next, roll polyvinyl alcohol film of thickness 75 μm was continuously stretched to 5.1-hold in iodine aqueous solution, and dried to prepare the polarizer of thickness 28 μm. Similarly to Example 1-2, So that the polarizer face to the opposite side of the optically anisotropic layer of *D, that saponification process is performed, the polarizer was pasted by the polyvinyl alcohol adhesive, further, to the other side of the polarizer, cellulose acetate film (FUJITAC TFY80UL, prepared by Fuji Photo Film Co., Ltd.), that alkali saponification process is similarly performed, was pasted to prepare the polarizing plate with the optically-compensatory film.

The polarizing plate of front side of the panel of commercial IPS liquid crystal display device (manufactured by TOSHIBA CORPORATION 37Z1000) was exfoliated, and the front polarizing plate prepared above was pasted by the means of the adhesive sheet. The absorption axis of polarizing plate prepared in the present invention is accommodated to direction of absorption axis of polarizing plate of the product exfoliated. In addition, after pasting, the autoclave process was carried out at 50° C., at 5 atmosphere. In this way the IPS liquid crystal cell with the use of an optically-compensatory film was prepared.

Example 1-4

(Implementation Evaluation to IPS-type Liquid Crystal Display Device)

Using the cellulose acylate film sample *E prepared in Example 1-1, implementation evaluation to IPS-type liquid crystal display device is carried out and it was determined if optical performance was adequate as below.

(Preparation of the Protective Film for Front Polarizing Plate)

250 g of Desolite KZ-7869 (ultraviolet hardened hard coating composition, 72 mass prepared by JSR (Co., Ltd)) are dissolved in the mixed solvent of 62 g methyl ethyl ketone, and 88 g of cyclohexanone, to prepare hard coating layer coating liquid.

Next, 91 g of mixture of dipentaerythritolpentaacrylate and dipentaerythritolhexaacrylate (DPHA, prepared by Nippon Kayaku Co., Ltd.) and 199 g of Desolite KZ-7115, Desolite KZ-7161, ($ZrO_2$ dispersion liquid, prepared by JSR (Co., Ltd)) were dissolved in 52 g of the mixed solvent of methyl ethyl ketone/cyclohexanone=54/46 mass %. To the obtained solution, 10 g of Photopolymerization initiator (Irgacure907, produce by Ciba-geigy Co., Ltd.) was added. The refraction index of the film of coating that this solution was applied to and hardened with ultraviolet, was 1.61. Further, to this solution, 29 g of the dispersion liquid prepared by dispersing 20 g of cross-linked polystyrene particle of average particle diameter 2.0 μm (SX-200H, prepared by Soken Chemical & Engineering Co., Ltd.) into 80 g of the mixed solvent of methyl ethyl ketone/cyclohexanone=54/46 mass % in High-speed Dispa, at 5,000 rpm, for 1 hour, and stirred, then filtered through the polypropylene filter of pore diameter 30 μm, to prepare the coating liquid of glare-proof layer.

On a commercial cellulose acetate film (TF80UL prepared by Fuji Photo Film Co., Ltd), the mentioned above hard coat layer coating liquid was applied with a bar coater, and dried at 120° C., and then using the air cooling metal halide lamp (manufactured by Eyegraphics Co., Ltd.) of 160 W/cm, the coating layer was hardened by irradiating the ultraviolet of 400/cm$^2$ illumination and 300 mJ/cm$^2$ irradiance to form the hard coating layer of 4 μm thickness. On this film, the above mentioned glare-proof layer coating liquid was applied with a bar coater, and dried at 120° C. in the atmosphere oxygen concentration of less than 0.01%, and then using the air cooling metal halide lamp (manufactured by Eyegraphics Co., Ltd.) of 160 W/cm, the coating layer was hardened by irradiating the ultraviolet of 400/cm$^2$ illumination and 300 mJ/cm$^2$ irradiance to form the glare-proof hard coating layer of 1.4 μm thickness.

(Preparation of the Front Polarizing Plate)

Roll polyvinyl alcohol film of thickness 80 μm was continuously stretched to 5-hold in iodine aqueous solution, and dried to prepare the polarizer of thickness 30 μm. Similarly to Example 1-3, so that the polarizer face to the opposite side of the optically anisotropic layer of *E, that saponification process is performed, the polarizer was pasted by the polyvinyl alcohol adhesive, further, to the other side of the polarizer, the protective film prepared above was saponified and pasted, so that the polarizer face to the opposite side of the glare-proof layer, to prepare the polarizing plate with the optically-compensatory film.

(Preparation of the Rear Polarizing Plate)

Similarly to the above mentioned the front polarizing plate, the polarizer was prepared, and to one side of the polarizer, the low retardation film (ZRF80s prepared by Fuji Photo Film Co., Ltd.) that saponification process was performed was pasted, and to the other side, the cellulose acetate film (TF80UL prepared by Fuji Photo Film Co., Ltd.) that saponification process was performed was pasted to prepare the rear polarizing plate.

The polarizing plate of front side and the polarizing plate of rear side of the panel of commercial IPS liquid crystal display device (manufactured by TOSHIBA CORPORATION 37Z1000) was exfoliated, and the front polarizing plate and the rear side polarizing plate prepared above was pasted by the means of the adhesive sheet. The absorption axis direction of polarizing plate is accommodated to, direction of absorption axis of polarizing plate of the product exfoliated, and similarly to Example 1-3, the autoclave process was carried out. In this way the IPS liquid crystal cell with the use of an optically-compensatory film was prepared.

<Color Change of Black Indication>

Color change of the black indication of the liquid crystal display device loading cellulose acylate film prepared in Example 1-2 at the time of moving viewing point from front (polar angle 0°/azimuthal angle 0°) to right upward direction (maximum polar angle 80°/azimuthal angle 45°) was evaluated with the following standards.

A: the case that black tinge does not change, when a viewing point was moved from front to upward direction.

B: the case that blue tinge or red tinge can be seen, when a viewing point was moved from front to upward direction.

C: the case that blue tinge or red tinge can be seen remarkably, when a viewing point was moved from front to upward direction.

<Contrast Retention>

From front direction of the liquid crystal display device of the present invention prepared in Example 1-2, measuring white brightness and black brightness, with brightness meter, and using the ratio of both, the front contrast (CRI) was measured.

On the other hand, instead of the cellulose acylate film of the present invention sample, using FUJITAC TD80UF, the front contrast (CRI) was similarly measured. And using following formula, contrast retention was measured.

$$\text{Contrast retention} = CR1/CRO \times 100(\%)$$

<Evaluation of Optical Performance>

As for each sample prepared, by the method described in the specification, evaluation of optical performance of Re (630), Rth (630) was performed.

<Humidity Dependency of Re, Rth of the Film>

For both the in-plane retardation Re and the retardation in a thickness-direction Rth of the cellulose film of the present invention, it is preferable that the change by humidity is small. Specifically, it is preferable that difference ΔRth (=Rth10% RH−Rth80% RH) of Rth value in 10% RH at 25° C. and Rth value in 80% RH at 25° C. is from 0 to 25 nm. More preferably is from 0 to 40 nm, even more preferably from 0 to 35 nm.

The result was indicated in the table 1-3.

In addition, as for the in-plane retardation Re, the case that slow axis expresses in a direction parallel to stretching direction was indicated as positive value, and the case that slow axis, expresses in a direction orthogonal to stretching direction was indicated as negative value.

TABLE 1-3

| Film Sample NO. | *1 | Dope No | Cotton substituent OH group | Acetyl | Propanoyl | Butyryl | Aromatic acyl | | Substituent degree PB | PA | Additive *2 | *3 *4 | *5 | *6 *7 | Film thickness |
|---|---|---|---|---|---|---|---|---|---|---|---|---|---|---|---|
| 1001 | PI | T-1 | 0 | 2.1 | 0 | 0 | No. 1 | 0.9 | 0.9 | 2.1 | | | | 1 | 80 μm |
| 1002 | PI | ↑ | ↑ | ↑ | ↑ | ↑ | ↑ | ↑ | ↑ | ↑ | | | | 1.2 | ↑ |
| 1003 | PI | ↑ | ↑ | ↑ | ↑ | ↑ | ↑ | ↑ | ↑ | ↑ | U-1 | PVA | D1 | ↑ | ↑ |
| 1004 | PI | ↑ | ↑ | ↑ | ↑ | ↑ | ↑ | ↑ | ↑ | ↑ | | PVA | D1 | ↑ | ↑ |
| *A | PI | ↑ | ↑ | ↑ | ↑ | ↑ | ↑ | ↑ | ↑ | ↑ | | PVA | St | ↑ | ↑ |
| *B | PI | *1 | 0 | 2.4 | 0 | 0 | No. 1 | 0.6 | 0.6 | 2.4 | | | | 1 | ↑ |
| *C | PI | ↑ | ↑ | ↑ | ↑ | ↑ | ↑ | ↑ | ↑ | ↑ | | | | 1.2 | ↑ |
| *D | PI | ↑ | ↑ | ↑ | ↑ | ↑ | ↑ | ↑ | ↑ | ↑ | | PVA | D1 | 1.16 | 150 |
| *E | PI | ↑ | ↑ | ↑ | ↑ | ↑ | ↑ | ↑ | ↑ | ↑ | | PVA | D1 | 1.4 | 60 |
| *F | PI | ↑ | ↑ | ↑ | ↑ | ↑ | ↑ | ↑ | ↑ | ↑ | | PVA | St | 1.2 | 80 |
| *G | PI | ↑ | ↑ | ↑ | ↑ | ↑ | ↑ | ↑ | ↑ | ↑ | | | | ↑ | ↑ |
| *H | PI | ↑ | ↑ | ↑ | ↑ | ↑ | ↑ | ↑ | ↑ | ↑ | | | | 1.08 | 102 |
| *I | PI | *2 | ↑ | ↑ | ↑ | ↑ | ↑ | ↑ | ↑ | ↑ | | | | 1.2 | 60 |
| *J | PI | *3 | ↑ | ↑ | ↑ | ↑ | ↑ | ↑ | ↑ | ↑ | | | | 1.3 | 40 |
| *K | PI | *4 | ↑ | ↑ | ↑ | ↑ | ↑ | ↑ | ↑ | ↑ | | | | 1.2 | 80 |
| *L | PI | *5 | ↑ | ↑ | ↑ | ↑ | ↑ | ↑ | ↑ | ↑ | | | | ↑ | ↑ |
| *M | PI | *6 | ↑ | ↑ | ↑ | ↑ | ↑ | ↑ | ↑ | ↑ | | | | 1.3 | 40 |
| *N | PI | *7 | ↑ | ↑ | ↑ | ↑ | ↑ | ↑ | ↑ | ↑ | | | | 1.2 | 80 |
| *O | PI | *8 | 0.2 | 2.4 | 0 | 0 | No. 1 | 0.4 | 0.4 | 2.6 | | | | 1 | 80 μm |
| *P | PI | ↑ | ↑ | ↑ | ↑ | ↑ | ↑ | ↑ | ↑ | ↑ | | | | 1.2 | ↑ |
| *Q | PI | *9 | 0.05 | 2.4 | ↑ | ↑ | ↑ | 0.55 | 0.55 | 2.35 | | | | ↑ | ↑ |
| *R | PI | *10 | 0 | 1.5 | ↑ | ↑ | ↑ | 1.5 | 1.5 | 1.5 | | | | ↑ | ↑ |
| *S | PI | *11 | 0 | 1.1 | ↑ | ↑ | ↑ | 1.9 | 1.9 | 1.1 | | | | ↑ | ↑ |
| 1005 | PI | T-1-2 | 1 | 0.9 | 0 | 0 | No. 7 | 1.1 | 1.1 | 0.9 | | | | 1 | 80 μm |
| 1006 | PI | ↑ | ↑ | ↑ | ↑ | ↑ | ↑ | ↑ | ↑ | ↑ | | | | 1.2 | ↑ |
| 1007 | PI | ↑ | ↑ | ↑ | ↑ | ↑ | ↑ | ↑ | ↑ | ↑ | u-1 | | | ↑ | ↑ |
| 1008 | PI | T-1-3 | ↑ | 0.3 | 0.6 | ↑ | ↑ | ↑ | ↑ | ↑ | | | | 1.3 | ↑ |
| 1009 | PI | T-1-4 | ↑ | 0 | 0.9 | ↑ | ↑ | ↑ | ↑ | ↑ | | | | ↑ | ↑ |
| 1010 | PI | T-1-5 | ↑ | 0.3 | 0 | 0.6 | ↑ | ↑ | ↑ | ↑ | | | | ↑ | ↑ |
| 1011 | PI | T-1-6 | ↑ | 0 | ↑ | 0.9 | ↑ | ↑ | ↑ | ↑ | | | | ↑ | ↑ |
| 1012 | PI | T-1-7 | 0 | 2.1 | 0 | 0 | No. 20 | 0.9 | 0.9 | 2.1 | | | | 1 | 80 μm |
| 1013 | PI | ↑ | ↑ | ↑ | ↑ | ↑ | ↑ | ↑ | ↑ | ↑ | | | | 1.2 | ↑ |
| 1014 | PI | ↑ | ↑ | ↑ | ↑ | ↑ | ↑ | ↑ | ↑ | ↑ | | | | ↑ | ↑ |
| 1015 | PI | T-1-8 | ↑ | 1.3 | 0.8 | ↑ | ↑ | ↑ | ↑ | ↑ | | | | 1.3 | ↑ |
| 1016 | PI | T-1-9 | ↑ | 1.4 | 0 | 0.7 | ↑ | ↑ | ↑ | ↑ | | | | ↑ | ↑ |
| 1017 | CE | T-1-10 | 1.5 | 0.4 | 0 | 0 | No. 1 | 1.1 | 1.1 | 0.4 | U-1 | | | 1.2 | 80 μm |
| 1018 | CE | T-1-11 | ↑ | 0.2 | ↑ | ↑ | No. 7 | 1.3 | 1.3 | 0.2 | | | | ↑ | ↑ |
| 1019 | CE | T-1-12 | ↑ | 0.3 | ↑ | ↑ | No. 20 | 1.2 | 1.2 | 0.3 | | | | ↑ | ↑ |
| 1020 | CE | T-1-13 | 0.2 | 2.8 | 0 | 0 | | | 0 | 2.8 | | | | 1.2 | 80 μm |
| 1021 | CE | ↑ | ↑ | ↑ | ↑ | ↑ | | | ↑ | ↑ | U-1 | | | ↑ | ↑ |
| 1022 | CE | ↑ | ↑ | ↑ | ↑ | ↑ | | | ↑ | ↑ | | PVA | D1 | ↑ | ↑ |
| 1023 | CE | ↑ | ↑ | ↑ | ↑ | ↑ | | | ↑ | ↑ | | PVA | D1/pO | ↑ | ↑ |

TABLE 1-3-continued

| | | | | | | | | | | | | |
|---|---|---|---|---|---|---|---|---|---|---|---|---|
| 1024 | CE | T-1-14 | 0.3 | 2.2 | 0.5 | ↑ | | ↑ | ↑ | | ↑ | ↑ |
| 1025 | CE | T-1-15 | ↑ | 1.5 | 0 | 1.2 | | ↑ | ↑ | | ↑ | ↑ |

| Film Sample | | Optical performance *8 | | *8 | | *9 | |
|---|---|---|---|---|---|---|---|
| NO. | *1 | Re | Rth | ΔRe | ΔRth | *10 | *11 |
| 1001 | PI | −22 | −54 | 3 | 8 | B | 99.1 |
| 1002 | PI | −87 | −102 | 4 | 11 | A | 98.5 |
| 1003 | PI | −121 | −93 | 5 | 12 | A | 97.8 |
| 1004 | PI | −106 | −138 | 4 | 11 | A | 97.5 |
| *A | PI | −105 | −95 | 4 | 12 | A | 97.9 |
| *B | PI | 5 | −92 | 1 | 9 | A | 97.9 |
| *C | PI | −49 | −99 | 2 | 11 | A | 98.1 |
| *D | PI | −59 | −193 | 1 | 10 | A | 99.7 |
| *E | PI | −132 | −67 | 3 | 12 | A | 99.6 |
| *F | PI | −48 | −100 | 2 | 11 | A | 98 |
| *G | PI | −48 | −100 | 2 | 11 | A | 98.2 |
| *H | PI | −22 | −130 | 1 | 10 | A | 97.8 |
| *I | PI | −35 | −118 | 2 | 9 | A | 98.6 |
| *J | PI | −20 | −110 | 1 | 7 | A | 98 |
| *K | PI | −48 | −108 | 2 | 11 | A | 98.5 |
| *L | PI | −45 | −115 | 2 | 11 | A | 98.8 |
| *M | PI | −21 | −105 | 2 | 7 | A | 97.9 |
| *N | PI | −49 | −99 | 2 | 11 | A | 98 |
| *O | PI | −7 | −9 | 2 | 7 | B | 97.2 |
| *P | PI | −44 | −48 | 7 | 15 | A | 97.6 |
| *Q | PI | −45 | −80 | 3 | 13 | A | 97.7 |
| *R | PI | −60 | −140 | 1 | 7 | A | 98.8 |
| *S | PI | −66 | −160 | 1 | 5 | A | 99.1 |
| 1005 | PI | 1.3 | −89 | 3 | 7 | A | 99.3 |
| 1006 | PI | 83 | −161 | 4 | 10 | A | 98.8 |
| 1007 | PI | 128 | −88 | 5 | 11 | A | 97.7 |
| 1008 | PI | 104 | −130 | 3 | 9 | A | 99.5 |
| 1009 | PI | 112 | −121 | 2 | 5 | A | 99.3 |
| 1010 | PI | 102 | −133 | 3 | 10 | A | 99.4 |
| 1011 | PI | 115 | −119 | 2 | 4 | A | 99 |
| 1012 | PI | −54 | −116 | 2 | 9 | A | 99.2 |
| 1013 | PI | −154 | −178 | 8 | 14 | A | 98.5 |
| 1014 | PI | −104 | −96 | 9 | 13 | A | 98.9 |
| 1015 | PI | −103 | −130 | 4 | 13 | A | 99.3 |
| 1016 | PI | −105 | −133 | 5 | 14 | A | 98.8 |
| 1017 | CE | 43 | 68 | 9 | 18 | C | 95.5 |
| 1018 | CE | 67 | 102 | 7 | 12 | C | 95.3 |
| 1019 | CE | 74 | 165 | 9 | 18 | C | 94.8 |
| 1020 | CE | 12 | 53 | 21 | 34 | C | 96.9 |
| 1021 | CE | 76 | 134 | 15 | 29 | C | 96.4 |
| 1022 | CE | −34 | 78 | 14 | 28 | C | 96.5 |
| 1023 | CE | 82 | 103 | 15 | 28 | C | 95.9 |
| 1024 | CE | 67 | 134 | 12 | 22 | C | 96.6 |
| 1025 | CE | 84 | 193 | 13 | 23 | C | 96.8 |

*1: Classification
*2: (Direct addition)
*3: Optically anisotropic layer
*4: Aligned film
*5: Coating
*6: Stretching magnification
*7: (Width direction)
*8: Humidity dependency
*9: IPS panel evaluation at the time of black indication
*10: Color change
*11: CR retention
PVA: Modification PVA
Fo: Formula
PI: Present invention
CE: Comparative example
St: Rod-like liquid crystal
po: Perpendicular alignment As shown in table 1-3, when cellulose acylate film of the invention having acyl group wherein polarizability anisotropy is high, was loaded in the liquid crystal display device, because the in-plate retardation Rth has negative value, the results that black tinge change is hardly shown and front contrast retention is high were obtained. Thus, controlling kinds of substituent wherein polarizability anisotropy is high, and substitution degree including the other acyl group (acetyl group, propanoyl group, butyryl group, etc), and hydroxyl group, and adding or coating of retardation regulator which shows optical anisotropy made it possible to widely control retardation value. Moreover, using cellulose acylate film of the invention, the result that humidity dependency of optical performance is improved, was obtained and which showed that not only visibility but also durability is high.

Hereinafter, the second present invention will be further illustrated with reference to Examples, but the second invention is not limited by these Examples.

Example 2-1

<Preparation Of Cellulose Derivative Solution>

Each of the compositions described in Table 2-7 was introduced into a pressure-tight mixing tank and stirred for 6 hours to dissolve the respective components. Thus, cellulose derivative solutions (hereinafter, also referred to as dope) T-2-1 to T-2-30 were prepared. Furthermore, the term described in brackets in the Degree of substitution column in Table 2-7 represents the group name of the substituted acyl group, and the term described in brackets next to the group name represents the polarizability anisotropy of the group calculated by the method described in the specification.

TABLE 2-7

Components of cellulose derivative solutions (unit: parts by mass)

| Cellulose derivative solution | Methylene chloride | Methanol | Cellulose derivative: Degree of substitution (group name (polarizability anisotropy)) | Cellulose derivative: Amount added | Retardation controlling agent, amount added |
|---|---|---|---|---|---|
| T-2-1 | 261 | 39 | 2.85 (acetyl (1.01)) | 100 | — |
| T-2-2 | 261 | 39 | 2.85 (acetyl (1.01)) | 100 | TPP/BDP 7.8/3.9 |
| T-2-3 | 261 | 39 | 2.85 (acetyl (1.01)) | 100 | C-416 12.0 |
| T-2-4 | 261 | 39 | 2.85 (acetyl (1.01)) | 100 | A-20 12.0 |
| T-2-5 | 261 | 39 | 2.85 (acetyl (1.01)) | 100 | SC-1 12.0 |
| T-2-6 | 261 | 39 | 2.85 (acetyl (1.01)) | 100 | PL-1 12.0 |
| T-2-7 | 261 | 39 | 2.85 (acetyl (1.01)) | 100 | D-7 12.0 |
| T-2-8 | 261 | 39 | 2.85 (acetyl (1.01)) | 100 | E-1 12.0 |
| T-2-9 | 261 | 39 | 2.85 (acetyl (1.01)) | 100 | FA-1 12.0 |
| T-2-10 | 261 | 39 | 2.85 (acetyl (1.01)) | 100 | FA-26 12.0 |
| T-2-11 | 261 | 39 | 2.85 (acetyl (1.01)) | 100 | FB-6 12.0 |
| T-2-12 | 261 | 39 | 2.85 (acetyl (1.01)) | 100 | CA-13 12.0 |
| T-2-13 | 261 | 39 | 2.85 (acetyl (1.01)) | 100 | I-6 12.0 |
| T-2-14 | 261 | 39 | 2.54/0.28 (acetyl (1.01)/benzoyl (6.82)) | 100 | — |
| T-2-15 | 261 | 39 | 2.54/0.28 (acetyl (1.01)/benzoyl (6.82)) | 100 | TPP/BDP 7.8/3.9 |
| T-2-16 | 261 | 39 | 2.54/0.28 (acetyl (1.01)/benzoyl (6.82)) | 100 | C-416 12.0 |
| T-2-17 | 261 | 39 | 2.54/0.28 (acetyl (1.01)/benzoyl (6.82)) | 100 | A-20 12.0 |
| T-2-18 | 261 | 39 | 2.54/0.28 (acetyl (1.01)/benzoyl (6.82)) | 100 | SC-1 12.0 |
| T-2-19 | 261 | 39 | 2.54/0.28 (acetyl (1.01)/benzoyl (6.82)) | 100 | PL-1 12.0 |
| T-2-20 | 261 | 39 | 2.54/0.28 (acetyl (1.01)/benzoyl (6.82)) | 100 | D-7 12.0 |
| T-2-21 | 261 | 39 | 2.54/0.28 (acetyl (1.01)/benzoyl (6.82)) | 100 | E-1 12.0 |
| T-2-22 | 261 | 39 | 2.54/0.28 (acetyl (1.01)/benzoyl (6.82)) | 100 | FA-1 12.0 |
| T-2-23 | 261 | 39 | 2.54/0.28 (acetyl (1.01)/benzoyl (6.82)) | 100 | FB-6 12.0 |
| T-2-24 | 261 | 39 | 2.54/0.41 (acetyl (1.01)/asaronyl (8.61)) | 100 | — |
| T-2-25 | 261 | 39 | 2.54/0.41 (acetyl (1.01)/asaronyl (8.61)) | 100 | TPP/BDP 7.8/3.9 |
| T-2-26 | 261 | 39 | 2.54/0.41 (acetyl (1.01)/asaronyl (8.61)) | 100 | C-416 12.0 |
| T-2-27 | 261 | 39 | 2.54/0.41 (acetyl (1.01)/asaronyl (8.61)) | 100 | A-20 12.0 |
| T-2-28 | 261 | 39 | 2.54/0.41 (acetyl (1.01)/asaronyl (8.61)) | 100 | FA-26 12.0 |

TABLE 2-7-continued

| Components of cellulose derivative solutions (unit: parts by mass) | | | | | |
|---|---|---|---|---|---|
| | | | Cellulose derivative | | |
| Cellulose derivative solution | Methylene chloride | Methanol | Degree of substitution (group name (polarizability anisotropy)) | Amount added | Retardation controlling agent, amount added |
| T-2-29 | 261 | 39 | 2.54/0.41 (acetyl (1.01)/ asaronyl (8.61)) | 100 | CA-13 12.0 |
| T-2-30 | 261 | 39 | 2.54/0.41 (acetyl (1.01)/ asaronyl (8.61)) | 100 | I-6 12.0 |

Unit of polarizability anisotropy: $\times 10^{-24}$ $cm^3$

TPP: Triphenyl phosphate

BDP: Biphenyldiphenyl phosphate

UVB-3: 2-(2-hydroxy-3',5'-di-tert-butylphenyl)-5-chlorobenzotriazole

UVB-7: 2-(2'-hydroxy-3',5'-di-tert-pentylphenyl)-benzotriazole

Asaronyl: Substituent having the following structure

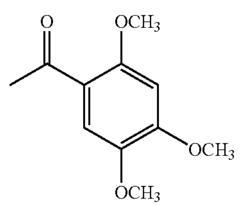

<Production of Cellulose Derivative Film Sample 2001>

A conditioned cellulose derivative solution T-2-1 was cast on a metal support in a band casting machine and dried, and then a dope cast film having self-supportability was peeled off from the band. The peeled dope film was dried while gripping the dope film with a tenter so that the film width was maintained, and then the dried film was wound on a roll. Thus, a cellulose derivative film sample 2001 having a thickness of 80 μm and a length of 1.3 m in the width direction was produced.

<Production of Cellulose Derivative Film Samples 2002 to 2030>

Cellulose derivative film samples 2002 to 2030 having a thickness of 80 μm and the respective lengths in the width direction as described in Table 2-8 were produced in the same manner as in the production of the cellulose derivative film sample 2001, except that the cellulose derivative solution and additive solution used for the preparation of dope solution were changed to those described in Table 2-8.

<Production of Cellulose Derivative Film Sample 2031>

(Preparation of Cellulose Derivative Solution)

In a stainless steel dissolution tank which has a stirring blade and has cooling water circulating along the perimeter, 80.0 parts by mass of dichloromethane (main solvent), 10.0 parts by mass of methanol (second solvent), 5.0 parts by mass of butanol (third solvent), 2.4 parts by mass of trimethylolpropane triacetate (plasticizer), UVB-3 (0.2 parts by mass), UVB-7 (0.2 parts by mass), and 0.2 parts by mass of 2-(2'-hydroxy-3',5'-di-tert-amylphenyl)-5-chlorobenzotriazole (ultraviolet absorbent C) were introduced.

While stirring and dispersing the respective components, 20 parts by mass of a cellulose acetate powder (flakes) having a degree of acetyl substitution of 2.92 was slowly added. The cellulose acetate powder was introduced into the dispersion tank, and the pressure inside the tank was reduced to 1300 Pa. Stirring was performed using a stirring axis which has dissolver-type anchor blades along an eccentric stirring axis and the central axis stirring at a rotating speed of 15 m/sec (shear stress 5×104 kgf/m/sec2), and stirs at a rotating speed of 1 m/sec (shear stress 1×104 kgf/m/sec2), for 30 minutes. The initial temperature for stirring was 25° C., and stirring was carried out while allowing the cooling water to flow, so that the final temperature reached was 35° C. Then, the high speed stirring axis was stopped, the rotating speed of the stirring axis having anchor blades was set to 0.5 m/sec, and then stirring was performed for 100 minutes to swell the cellulose acetate powder (flakes).

The obtained non-uniform glue-like material was transported via a screw pump having the axial center part warmed to 30° C., and the pump was cooled from the periphery of the screw, so that the material passed the cooled part to −75° C. for 3 minutes. Cooling was performed using a coolant cooled to −80° C. in a freezer. The solution obtained by cooling was warmed to 35° C. while being transported via the screw pump, and was transported to a stainless steel vessel. The material was stirred at 50° C. for 2 hours to form a uniform solution, and was filtered through a filter paper (FH025, Pall Corp.) having an absolute filtration precision of 2.5 μm. The resulting cellulose derivative solution was heated and pressurized to 110° C. and 1 MPa at a heating and pressurizing unit in the transporting pipe, and released at normal pressure (about 0.1 MPa) to volatilize the organic solvent and simultaneously cool the solution. Thus, a dope solution was obtained.

(Production of Cellulose Derivative Film)

A cellulose derivative film having a thickness of 80 μm was produced to have the same length in the width direction as described in Table 2-8, by casting a filtered cellulose derivative solution at 50° C. in the same manner as in Example 2-1, thus obtaining a cellulose derivative film 2031.

<Surface Treatment>

Next, the produced film sample 2001 was subjected to surface treatment as follows.

The produced film sample 2001 was immersed in a 1.5 mol/L aqueous solution of sodium hydroxide at 55° C. for 2 minutes. The film sample was washed in a washing bath at room temperature, and neutralized with a 0.05 mol/L sulfuric acid at 30° C. Again the film sample was washed in the washing bath at room temperature, and dried with hot air at 100° C. Thus, a sample in which the surface of the cellulose derivative film was alkali saponified. Further, samples 2002 to 2031 as prepared were also subjected to surface treatment.

<Evaluation of Optical Performance>

Each of the samples produced were subjected to evaluation of the optical performance of Re(589) and Rth(589) according to the method described in the present specification. The results are presented in Table 2-8.

<Measurement of Equilibrium Moisture Content of Film>

For each of the sample films produced, the equilibrium moisture content of the film at 25° C. and 80% RH was measured according to the method described in the present specification. The results are presented in Table 2-8.

<Production of Polarizing Plate>

Using the surface treated film samples 2001 to 2031, polarizing plates were produced as follows. That is, a rolled polyvinyl alcohol film having a thickness of 80 μm was continuously stretched 5 times in an aqueous solution of iodine, and dried to obtain a polarizing film. Two sheets of the produced surface treated film sample were provided. While arranging one side (surface treated side) of each film sheet to face the polarizing film side, the film sheets were adhered to the polarizing film using a polyvinyl alcohol adhesive such that the polarizing film was interposed between the film sheets, to thereby obtain a polarizing plate having both sides protected by the cellulose derivative film 2001. Here, the cellulose derivative film samples 2001 on both sides were adhered such that the slow axis of the film sample was in parallel with the transmission axis of the polarizing film. The surface treated film samples 2002 to 2031 produced as in the above were also used to produce polarizing plates.

<Evaluation of Polarizing Plate Sample>

For the produced polarizing plate samples, evaluation of durability was performed as follows.

<Evaluation of Durability of Polarizing Plate>

For each of the produced polarizing plate samples, the durability of the polarizing plate was evaluated by determining the difference in the average values of transmittance at 400 nm to 700 nm in a cross-Nicol configuration, obtained before and after standing under the conditions of 60° C. and 95% RH for 1300 hours.

The obtained results are presented in Table 2-8.

TABLE 2-8

| | | | cotton | | | Additive | |
|---|---|---|---|---|---|---|---|
| | | | Total degree of | Substituent a) | | | Amount |
| Sample No. | Remarks | Dope No. | acetyl substitution | Polarizability anisotrophy | Degree of substitution | Type | (vs. total) |
| 2001 | Comparative | T-2-1 | 2.85 | — | — | None | 0% |
| 2002 | Comparative | T-2-2 | 2.85 | — | — | TPP/BDP | 12.00% |
| 2003 | Comparative | T-2-3 | 2.85 | — | — | C-416 | 12.00% |
| 2004 | Comparative | T-2-4 | 2.85 | — | — | A-20 | 12.00% |
| 2005 | Comparative | T-2-5 | 2.85 | — | — | SC-1 | 12.00% |
| 2006 | Comparative | T-2-6 | 2.85 | — | — | PL-1 | 12.00% |
| 2007 | Comparative | T-2-7 | 2.85 | — | — | D-7 | 12.00% |
| 2008 | Comparative | T-2-8 | 2.85 | — | — | E-1 | 12.00% |
| 2009 | Comparative | T-2-9 | 2.85 | — | — | FA-1 | 12.00% |
| 2010 | Comparative | T-2-10 | 2.85 | — | — | FA-26 | 12.00% |
| 2011 | Comparative | T-2-11 | 2.85 | — | — | FB-6 | 12.00% |
| 2012 | Comparative | T-2-12 | 2.85 | — | — | CA-13 | 12.00% |
| 2013 | Comparative | T-2-13 | 2.85 | — | — | I-6 | 12.00% |
| 2014 | Comparative | T-2-14 | 2.54 | benzoyl (6.82) | 0.28 | None | 0% |
| 2015 | Comparative | T-2-15 | 2.54 | benzoyl (6.82) | 0.28 | TPP/BDP | 12.00% |
| 2016 | Inventive | T-2-16 | 2.54 | benzoyl (6.82) | 0.28 | C-416 | 12.00% |
| 2017 | Inventive | T-2-17 | 2.54 | benzoyl (6.82) | 0.28 | A-20 | 12.00% |
| 2018 | Inventive | T-2-18 | 2.54 | benzoyl (6.82) | 0.28 | SC-1 | 12.00% |
| 2019 | Inventive | T-2-19 | 2.54 | benzoyl (6.82) | 0.28 | PL-1 | 12.00% |
| 2020 | Inventive | T-2-20 | 2.54 | benzoyl (6.82) | 0.28 | D-7 | 12.00% |
| 2021 | Inventive | T-2-21 | 2.54 | benzoyl (6.82) | 0.28 | E-1 | 12.00% |
| 2022 | Inventive | T-2-22 | 2.54 | benzoyl (6.82) | 0.28 | FA-1 | 12.00% |
| 2023 | Inventive | T-2-23 | 2.54 | benzoyl (6.82) | 0.28 | FB-6 | 12.00% |
| 2024 | Comparative | T-2-24 | 2.51 | asaronyl (8.61) | 0.41 | None | 0% |
| 2025 | Comparative | T-2-25 | 2.51 | asaronyl (8.61) | 0.41 | TPP/BDP | 12.00% |
| 2026 | Inventive | T-2-26 | 2.51 | asaronyl (8.61) | 0.41 | C-416 | 12.00% |
| 2027 | Inventive | T-2-27 | 2.51 | asaronyl (8.61) | 0.41 | A-20 | 12.00% |
| 2028 | Inventive | T-2-28 | 2.51 | asaronyl (8.61) | 0.41 | FA-26 | 12.00% |

TABLE 2-8-continued

| | | | | | | | |
|---|---|---|---|---|---|---|---|
| 2029 | Inventive | T-2-29 | 2.51 | asaronyl (8.61) | 0.41 | CA-13 | 12.00% |
| 2030 | Inventive | T-2-30 | 2.51 | asaronyl (8.61) | 0.41 | I-6 | 12.00% |
| 2031 | Comparative | T-2-31 | 2.92 | — | — | trimethylolpropane triacetate | 12.00% |
| | | | | | | UVB-3 | 1.00% |
| | | | | | | UVB-7 | 1.00% |

| | Sample | Performance of cast sample Optical performance | | | | |
|---|---|---|---|---|---|---|
| Sample No. | length in width direction (m) | Rth (nm) | Re (nm) | Rth(a) − Rth(0)/a (nm/wt. %)) | Re(a) − Re(0)/a (nm/wt. %)) | Equilibrium moisture content (%) |
| 2001 | 1.3 | 35 | 2 | — | — | 5.5 |
| 2002 | 1.3 | 44 | 1 | 0.8 | −0.1 | 2.9 |
| 2003 | 1.3 | 2 | 2 | −2.8 | 0.0 | 3.2 |
| 2004 | 1.3 | −18 | 2 | −4.4 | 0.0 | 3 |
| 2005 | 1.1 | −5 | 2 | −3.3 | 0.0 | 3.1 |
| 2006 | 1.3 | −15 | 2 | −4.2 | 0.0 | 3.8 |
| 2007 | 1.3 | −12 | 1 | −3.9 | −0.1 | 3 |
| 2008 | 1.3 | −8 | 1 | −3.6 | −0.1 | 3.2 |
| 2009 | 1.3 | −19 | 2 | −4.5 | 0.0 | 2.9 |
| 2010 | 1.3 | −9 | 1 | −3.7 | −0.1 | 3.3 |
| 2011 | 1.3 | −22 | 2 | −4.8 | 0.0 | 3.1 |
| 2012 | 1.3 | −23 | 2 | −4.8 | 0.0 | 3.2 |
| 2013 | 1.3 | 4 | 1 | −2.6 | −0.1 | 3.1 |
| 2014 | 1.3 | −19 | 3 | — | — | 2.5 |
| 2015 | 1.3 | −21 | 1 | −0.2 | −0.2 | 1.9 |
| 2016 | 1.3 | −78 | −1 | −4.9 | −0.3 | 1.7 |
| 2017 | 1.6 | −98 | −3 | −6.6 | −0.5 | 1.6 |
| 2018 | 1.7 | −85 | −1 | −5.5 | −0.3 | 1.9 |
| 2019 | 1.5 | −89 | −2 | −5.8 | −0.4 | 2.1 |
| 2020 | 1.3 | −93 | −2 | −6.2 | −0.4 | 1.7 |
| 2021 | 1.3 | −83 | −1 | −5.3 | −0.3 | 1.7 |
| 2022 | 1.5 | −96 | −2 | −6.4 | −0.4 | 1.8 |
| 2023 | 1.5 | −105 | −2 | −7.2 | −0.4 | 1.8 |
| 2024 | 1.3 | −42 | 4 | — | — | 2.2 |
| 2025 | 1.3 | −36 | 1 | 0.5 | −0.3 | 1.5 |
| 2026 | 1.3 | −119 | −2 | −6.4 | −0.5 | 1.5 |
| 2027 | 1.6 | −141 | −4 | −8.3 | −0.7 | 1.4 |
| 2028 | 2.1 | −131 | −2 | −7.4 | −0.5 | 1.6 |
| 2029 | 1.4 | −145 | −4 | −8.6 | −0.7 | 1.7 |
| 2030 | 1.3 | −104 | −4 | −5.2 | −0.7 | 1.7 |
| 2031 | 1.3 | −45 | −2 | −4.6 b) | −0.3 b) | 3.3 |

| | | | IPS (Nell Evaluation (Example 2-2) | | IPS (Nell Evaluation (Example 2-3) | |
|---|---|---|---|---|---|---|
| Sample No. | Remarks | Polarizing plate durability ΔP (%) | Light leakage (%) | Increase ratio of black bright (%) | Light leakage (%) | Increase ratio of black bright (%) |
| 2001 | Comparative | 0.83 | 0.58 | 1.45 | 0.6 | 1.44 |
| 2002 | Comparative | 0.19 | 0.63 | 0.32 | 0.62 | 0.33 |
| 2003 | Comparative | 0.24 | 0.55 | 0.42 | 0.56 | 0.42 |
| 2004 | Comparative | 0.21 | 0.43 | 0.34 | 0.44 | 0.35 |
| 2005 | Comparative | 0.23 | 0.51 | 0.39 | 0.52 | 0.38 |
| 2006 | Comparative | 0.33 | 0.45 | 0.58 | 0.45 | 0.56 |
| 2007 | Comparative | 0.21 | 0.42 | 0.35 | 0.43 | 0.37 |
| 2008 | Comparative | 0.24 | 0.5 | 0.43 | 0.48 | 0.44 |
| 2009 | Comparative | 0.2 | 0.43 | 0.33 | 0.42 | 0.32 |
| 2010 | Comparative | 0.26 | 0.5 | 0.48 | 0.48 | 0.47 |
| 2011 | Comparative | 0.22 | 0.39 | 0.38 | 0.4 | 0.35 |
| 2012 | Comparative | 0.24 | 0.39 | 0.42 | 0.37 | 0.4 |
| 2013 | Comparative | 0.24 | 0.53 | 0.44 | 0.51 | 0.43 |
| 2014 | Comparative | 0.1 | 0.41 | 0.18 | 0.42 | 0.17 |
| 2015 | Comparative | 0.05 | 0.4 | 0.09 | 0.38 | 0.09 |
| 2016 | Inventive | 0.04 | 0.15 | 0.06 | 0.16 | 0.06 |
| 2017 | Inventive | 0.04 | 0.12 | 0.06 | 0.13 | 0.07 |
| 2018 | Inventive | 0.05 | 0.13 | 0.06 | 0.11 | 0.06 |
| 2019 | Inventive | 0.05 | 0.13 | 0.06 | 0.13 | 0.07 |
| 2020 | Inventive | 0.04 | 0.11 | 0.06 | 0.12 | 0.07 |
| 2021 | Inventive | 0.04 | 0.13 | 0.06 | 0.11 | 0.06 |
| 2022 | Inventive | 0.04 | 0.11 | 0.06 | 0.12 | 0.06 |

TABLE 2-8-continued

| | | | | | | |
|---|---|---|---|---|---|---|
| 2023 | Inventive | 0.04 | 0.1 | 0.06 | 0.11 | 0.07 |
| 2024 | Comparative | 0.06 | 0.34 | 0.11 | 0.32 | 0.12 |
| 2025 | Comparative | 0.03 | 0.37 | 0.06 | 0.38 | 0.05 |
| 2026 | Inventive | 0.03 | 0.05 | 0.05 | 0.06 | 0.06 |
| 2027 | Inventive | 0.03 | 0.04 | 0.05 | 0.04 | 0.06 |
| 2028 | Inventive | 0.04 | 0.05 | 0.06 | 0.05 | 0.05 |
| 2029 | Inventive | 0.04 | 0.04 | 0.07 | 0.05 | 0.07 |
| 2030 | Inventive | 0.04 | 0.1 | 0.07 | 0.09 | 0.08 |
| 2031 | Comparative | 0.25 | 0.36 | 0.45 | 0.38 | 0.44 |

a) Unit of polarizability anisotropy: $\times 10^{-24}$ $cm^3$ b) When a film composed of only cotton (acetyl substitution degree = 2.92) was prepared in the same manner as film sample No. 2031, Rth was 10.0, and Re is 1.0.

From these results, it was found that the film samples 2016 to 2023 and 2026 to 2030 prepared by combining a cellulose derivative having a substituent with high polarizability anisotropy, and a retardation regulator satisfying the Expression (11-1), has an increasing effect of reducing Rth, thus sufficiently lowering the retardation in the film thickness direction (Rth). Furthermore, it was found that the film samples can further lower the equilibrium moisture content, and when used as the protective films for polarizing plates, the film samples can suppress a decrease in the degree of polarization after the durability test under high temperature and high humidity conditions, thereby improving the polarizing plate durability.

Example 2-2

<Production of Polarizing Plate-integrated Type Optically Compensatory Film Sample 2001>

The surface of the cellulose derivative film sample 2001 produced in Example 2-1 was subjected to saponification in the same manner as in Example 2-1, and then an alignment film coating solution having the composition as described below was applied on the film in an amount of 20 ml/m2 with a wire bar coater. The coating solution was dried with hot air at 60° C. for 60 seconds, and then with hot air at 100° C. for 120 seconds to form a film. Subsequently, the formed film was subjected to rubbing in a direction parallel to the direction of the slow axis of the film, to thus form an alignment film.

| (Composition of alignment film coating solution) | |
|---|---|
| Modified polyvinyl alcohol as shown below | 10 parts by mass |
| Water | 371 parts by mass |
| Methanol | 119 parts by mass |
| Glutaraldehyde | 0.5 parts by mass |
| Tetramethylammonium fluoride | 0.3 parts by mass |

Modified polyvinyl alcohol

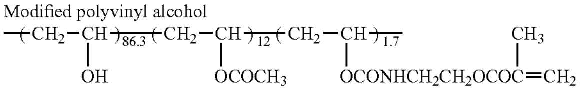

Next, a solution prepared by dissolving 1.8 g of a discotic liquid crystalline compound as shown below, 0.2 g of ethylene oxide-modified trimethylolpropane triacrylate (V#360, Osaka Organic Chemical Industry, Ltd.), 0.06 g of a photopolymerization initiator (Irgacure 907, Ciba Geigy Chemical Corp.), 0.02 g of a sensitizer (Kayacure-DETX, Nippon Kayaku Co., Ltd.), and 0.01 g of a vertical alignment agent for the air interface side as shown below (Exemplary Compound P-6) in 3.9 g of methyl ethyl ketone was applied on the alignment film using a #5.4 wire bar. The resultant was attached to a metal mold and heated in a constant temperature bath at 125° C. for 3 minutes to align the discotic liquid crystalline compound. Subsequently, the discotic liquid crystalline compound was crosslinked by UV irradiation for 30 seconds at 90° C. using a high pressure mercury lamp at 120 W/cm, and then was allowed to cool to room temperature to form a discotic liquid crystal retardation layer. The support formed from the cellulose derivative film sample 2001 and the film formed from the discotic liquid crystal retardation layer thus produced were used to produce an optically anisotropic layer-attached cellulose derivative film sample 2001.

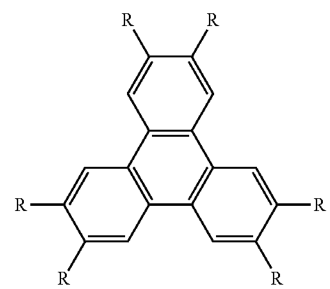

Discotic liquid crystalline compound

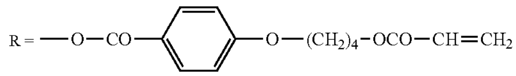

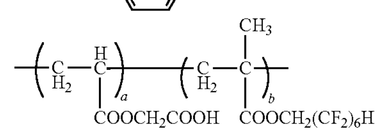

Vertical alignment agent for air interface side P-6

$a/b = 10/90$
Mw. = 35000

Using an automatic birefringence meter (KOBRA-21 ADH, Oji Scientific Instruments Co., Ltd.), the light incidence angle dependency of the optically anisotropic layer-attached cellulose derivative film 2001 of the invention was measured, and the fraction contributed by the cellulose derivative film sample 2001 that had been measured in advance was subtracted therefrom, to calculate the optical property of the discotic liquid crystal retardation layer only. It was found that Re was 195 nm, Rth was 97 nm, and the average tilt angle of the liquid crystals was 89.9°, and thus, it was confirmed that the discotic liquid crystals were aligned vertically with respect to the film surface. The direction of the slow axis was in parallel with the rubbing direction of the alignment layer. The discotic liquid crystal retardation layer thus produced was a retardation layer having a negative refractive anisotropy, and in which the light axis was substantially in a direction parallel with the layer surface. This discotic liquid crystal retardation layer was referred to as optically compensatory layer 1.

A polarizing film was produced in the same manner as in Example 2-1, by inducing a stretched polyvinyl alcohol film to adsorb iodine. The surface of the optically anisotropic layer-attached cellulose derivative film sample 2001 was subjected to saponification in the same manner as in Example 2-1, and using a polyvinyl alcohol adhesive, the film sample was adhered to one side of the polarizing film such that the cellulose derivative film was facing the polarizing film side. The transmission axis of the polarizing film, and the slow axis of the optically anisotropic layer-attached cellulose derivative film sample 2001 (the slow axis of the optically compensatory layer 1 is also congruent to this) were arranged to be perpendicular to each other. Also, a commercially available cellulose acetate film (Fujitac TD80UF, Fuji Photo Film Co., Ltd.) was subjected to saponification treatment, and the film was adhered on the other side of the polarizing film using a polyvinyl alcohol adhesive. Thus, an integrated type optically compensatory film 2001 was produced.

<Production of Polarizing Plate-integrated Type Optically Compensatory Film Samples 2002 to 2031>

The polarizing plate-integrated type optically compensatory films 2002 to 2031 were produced in the same manner as in the method for producing the polarizing plate-integrated type optically compensatory film sample 2001, except that the cellulose derivative film samples 2002 to 2031 were used instead of the cellulose derivative film sample 2001.

<Production of IPS Mode Liquid Crystal Cell>

On one sheet of glass substrate, electrodes (numerals 2 and 3 in FIG. 2) were arranged so that the distance between the neighboring electrodes was 20 μm, as shown in FIG. 2, and a polyimide film was provided thereon as an alignment film, where a rubbing treatment was applied. The rubbing treatment was performed in the direction represented by numeral 4 shown in FIG. 2. A polyimide film was provided on the surface of one side of one sheet of separately provided glass substrate, and a rubbing treatment was performed to provide an alignment film. The two sheets of glass substrate were superposed and bonded, with the alignment films facing each other, such that the gap (d) between the substrates was 3.9 μm, and the rubbing directions of the two sheets of glass substrates were in parallel. Subsequently, a nematic liquid crystal composition having a refractive index anisotropy (Δn) of 0.0769 and a dielectric anisotropy (Δ∈) of +4.5 was encapsulated therebetween. The value of d·Δn of the liquid crystal layer was 300 nm.

<Evaluation of Light Leakage in IPS Mode Liquid Crystal Display Device>

Next, a liquid crystal display device was produced using the polarizing plate-integrated type optically compensatory film produced as in the above, and was evaluated for light leakage. Furthermore, the polarizing plate-integrated type optically compensatory film produced in a long shape was cut to a predetermined size and then incorporated into the liquid crystal display device.

Using an adhesive, the polarizing plate-integrated type optically compensatory film 2001 was adhered on one side of the IPS mode liquid crystal cell produced, such that the slow axis of the optically anisotropic layer-attached cellulose derivative film sample 2001 was perpendicular to the rubbing direction of the liquid crystal cell (that is, the slow axis of the optically compensatory layer 1 was perpendicular to the slow axis of the liquid crystal molecules in the liquid crystal cell during black display), and such that the surface of the discotic liquid crystal retardation layer was facing the liquid crystal cell side. Subsequently, a commercially available polarizing plate (BLC2-5618, Sanritz Corp.) was adhered on the other side of the IPS mode liquid crystal cell in a cross-Nicol configuration. Thus, a liquid crystal display device 2001 was produced.

For the polarizing plate-integrated type optical compensatory films 2002 to 2031, liquid crystal display devices 2002 to 2031 were produced by incorporating the films into IPS mode liquid crystal display devices.

<Evaluating Tests>

[Panel Evaluation]

<Evaluation of Viewing Angle Dependency of Produced Liquid Crystal Display Device>

The viewing angle dependency of the transmittance of the produced liquid crystal display devices was measured. The polar angle was measured from 10° to 80° from the frontal side to the tilt direction, and the azimuthal angle was measured from 10° to 360° with reference to the horizontal right-hand-side direction (0°). It was found that the brightness during black display increased with an increase in the polar angle from the frontal direction, due to light leakage, and reached the maximum value at a polar angle of near 70°. It was also found that as the brightness during black display increased, the contrast was deteriorated. Therefore, the contrast was evaluated by measuring the brightness LA, which was measured during black display at a polar angle of 60°, and at an azimuthal angle reached after rotating 45° from the rubbing direction of the liquid crystal cell to the left-hand-side direction, and the brightness LB, which was measured during white display at a polar angle of 60°, and at an azimuthal angle reached after rotating 45° from the rubbing direction of the liquid crystal cell to the left-hand-side direction, and determining the light leakage as a ratio of LA to LB. The results are presented in Table 2-8.

$$(\text{Light leakage})=LA/LB$$

<Evaluation of Durability of Produced Liquid Crystal Display Device>

The frontal black brightness at the center of the screen and the black brightness after durability test, of the produced liquid crystal display device were measured, and the durability of the liquid crystal display device was evaluated by taking the ratio (%) of the difference in the black brightness before and after time lapse with respect to the white brightness before time lapse, as the increase ratio of black brightness before and after durability test. The evaluation results are presented in Table 2-8.

$$(\text{Durability evaluation})=((\text{black brightness after time lapse})-(\text{black brightness before time lapse}))/(\text{white brightness before time lapse})$$

As a result, it was found that when a liquid crystal display device using a polarizing plate using the film sample (film samples 2015 to 2023 and 2025 to 2030) of the invention as the protective film for polarizing plate was used, a liquid crystal display device having excellent viewing angle characteristics and excellent durability due to suppressed increase in the black brightness after a high temperature and high humidity durability test, could be obtained.

Example 2-3

<Production of Polarizing Plate-integrated Type Optically Compensatory Film Sample 2001A>

A polarizing film was produced in the same manner as in Example 2-1, by inducing a stretched polyvinyl alcohol film to adsorb iodine. The surface of the cellulose derivative film sample 2001 of the invention was subjected to saponification treatment in the same manner as in Example 2-1, and then the film was adhered to one side of the polarizing film using a polyvinyl alcohol adhesive. The cellulose derivative film sample 2001 was adhered such that the slow axis of the film sample was in parallel with the transmission axis of the polarizing film. Also, a commercially available cellulose acetate film (Fujitac TD80UF, Fuji Photo Film Co., Ltd.) was subjected to saponification treatment, and was adhered to the other side of the polarizing film using a polyvinyl alcohol adhesive, to thus produce a polarizing plate-integrated type optically compensatory film 2001A.

<Production of Polarizing Plate-integrated Type Optically Compensatory Film Samples 2002A to 2031A>

The polarizing plate-integrated type optically compensatory films 2002A to 2031A were produced in the same manner as in the production of the polarizing plate-integrated type optically compensatory film sample 2001A, except that the cellulose derivative film samples 2002 to 2031 were used instead of the cellulose derivative film sample 2001.

<Production of Polarized Plate-Integrated Optically Compensatory Film Sample 2003B>

The surface of the cellulose derivative film sample 2003 produced in Example 2-1 was subjected to saponification treatment in the same manner as in Example 2-1, and then, an alignment film coating solution having the following composition was applied on the film in an amount of 20 ml/m2 using a wire bar coater. The coating solution was dried with hot air at 60° C. for 60 seconds, and then with hot air at 100° C. for 120 seconds to form a film. Subsequently, the formed film was subjected to rubbing in a direction parallel to the direction of the slow axis of the film, to thus form an alignment film.

| (Composition of alignment film coating solution) | |
|---|---|
| Modified polyvinyl alcohol as shown below | 10 parts by mass |
| Water | 371 parts by mass |
| Methanol | 119 parts by mass |
| Glutaraldehyde | 0.5 parts by mass |
| Tetramethylammonium fluoride | 0.3 parts by mass |

Modified polyvinyl alcohol

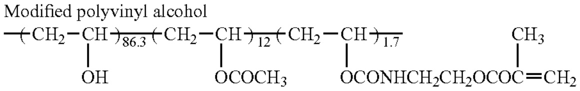

Next, a solution prepared by dissolving 1.8 g of a discotic liquid crystalline compound as shown below, 0.2 g of ethylene oxide-modified trimethylolpropane triacrylate (V#360, Osaka Organic Chemical Industry, Ltd.), 0.06 g of a photopolymerization initiator (Irgacure 907, Ciba Geigy Chemical Corp.), 0.02 g of a sensitizer (Kayacure-DETX, Nippon Kayaku Co., Ltd.), and 0.01 g of a vertical alignment agent for the air interface side as shown below (Exemplary Compound P-6) in 3.9 g of methyl ethyl ketone was applied on the alignment film using a #5.4 wire bar. The resultant was attached to a metal mold and heated in a constant temperature bath at 125° C. for 3 minutes to align the discotic liquid crystalline compound. Subsequently, the discotic liquid crystalline compound was crosslinked by UV irradiation for 30 seconds at 90° C. using a high pressure mercury lamp at 120 W/cm, and then was allowed to cool to room temperature to form a discotic liquid crystal retardation layer. The support formed from the cellulose derivative film sample 003 and the film formed from the discotic liquid crystal retardation layer thus produced were used to produce an optically anisotropic layer-attached cellulose derivative film sample 2003B.

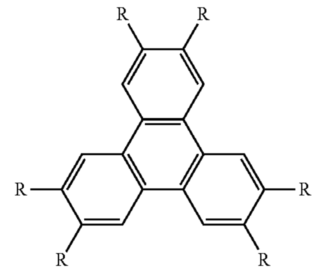

Discotic liquid crystalline compound

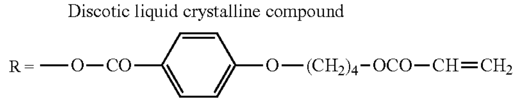

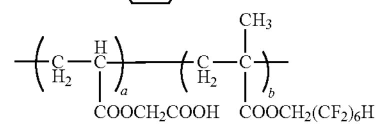

Vertical alignment agent for air interface side P-6

$a/b = 10/90$

Mw. = 35000

Using an automatic birefringence meter (KOBRA-21 ADH, Oji Scientific Instruments Co., Ltd.), the light incidence angle dependency of the optically anisotropic layer-attached cellulose derivative film 2003B of the invention was measured, and the fraction contributed by the cellulose derivative film sample 2003B that had been measured in advance was subtracted therefrom, to calculate the optical property of the discotic liquid crystal retardation layer only. It was found that Re was 191 nm, Rth was −105 nm, and the average tilt angle of the liquid crystals was 89.3°, and thus, it was confirmed that the discotic liquid crystals were aligned vertically with respect to the film surface. The direction of the slow axis was in parallel with the rubbing direction of the alignment layer. The discotic liquid crystal retardation layer thus produced was a retardation layer having a negative refractive anisotropy, and in which the light axis was substantially in a direction parallel with the layer surface. This discotic liquid crystal retardation layer was referred to as optically compensatory layer 3B.

A polarizing film was produced in the same manner as in Example 2-1, by inducing a stretched polyvinyl alcohol film to adsorb iodine. The surface of the optically anisotropic layer-attached cellulose derivative film sample 2003B was subjected to saponification in the same manner as in Example 2-1, and using a polyvinyl alcohol adhesive, the film sample was adhered to one side of the polarizing film such that the cellulose derivative film was facing the polarizing film side. The transmission axis of the polarizing film, and the slow axis of the optically anisotropic layer-attached cellulose derivative film sample 003B (the slow axis of the optically compensatory layer 3B is also congruent to this) were arranged to be perpendicular to each other. Also, a commercially available cellulose acetate film (Fujitac TD80UF, Fuji Photo Film Co., Ltd.) was subjected to saponification treatment, and the film was adhered on the other side of the polarizing film using a polyvinyl alcohol adhesive. Thus, an integrated type optically compensatory film 2003B was produced.

<Evaluation of Light Leakage in IPS Mode Liquid Crystal Display Device>

Next, a liquid crystal display device was produced using the polarizing plate-integrated type optically compensatory film produced as in the above, and was evaluated for light leakage. Furthermore, the polarizing plate-integrated type optically compensatory film produced in a long shape was cut to a predetermined size and then incorporated into the liquid crystal display device.

Using an adhesive, the polarizing plate-integrated type optically compensatory film 2003B was adhered on one side of the IPS mode liquid crystal cell produced in Example 2-2, such that the slow axis of the optically anisotropic layer-attached cellulose derivative film sample 2003 was perpendicular to the rubbing direction of the liquid crystal cell (that is, the slow axis of the optically compensatory layer 1 was perpendicular to the slow axis of the liquid crystal molecules in the liquid crystal cell during black display), and such that the surface of the discotic liquid crystal retardation layer was facing the liquid crystal cell side. Subsequently, the polarizing plate-integrated type optically compensatory film 2001A was adhered on the other side of the IPS mode liquid crystal cell in a cross-Nicol configuration. Thus, a liquid crystal display device 2001C was produced.

For the polarizing plate-integrated type optical compensatory films 2002 to 2031, liquid crystal display devices 2002C to 2031C were produced by incorporating the films into IPS mode liquid crystal display devices.

<Evaluating Tests>

[Panel Evaluation]

<Evaluation of Viewing Angle Dependency of Produced Liquid Crystal Display Device>

The contrast was evaluated by determining light leakage in the same manner as in Example 2-2. The results are presented in Table 2-8.

(Light leakage)=LA/LB

<Evaluation of Durability of Produced Liquid Crystal Display Device>

The durability of the liquid crystal display device was evaluated by determining the increase ratio of the black brightness in the same manner as in Example 2-2. The results of evaluation are presented in Table 2-8.

As a result, it was found that when a liquid crystal display device using a polarizing plate using the film sample (film samples 2015 to 2023 and 2025 to 2030) of the invention as the protective film for polarizing plate was used, a liquid crystal display device having excellent viewing angle characteristics and excellent durability due to suppressed increase in the black brightness after a high temperature and high humidity durability test, could be obtained.

Hereinafter, the third present invention will be explained in further detail with reference to Examples. Herein, materials, reagents, substance amounts and ratios thereof, operations, etc. can be appropriately varied unless it deviates from a purpose of the third present invention. Therefore, the range of the third present invention is not limited to the following specific examples.

<Production of IPS-mode Liquid Crystal Cell>

On a piece of a glass substrate, as shown in FIG. 2, electrodes were disposed with a space to give a distance of 20 μm between adjacent electrodes (2 and 3 in FIG. 2). A polyimide film was disposed thereon as an alignment film and subjected to a rubbing treatment. The rubbing treatment was carried out in a direction 4 shown in FIG. 2. Also, a polyimide film was disposed on the surface of one separately prepared glass substrate and subjected to a rubbing treatment to form an alignment film. The two glass substrates were laminated and adhered in a manner that the alignment films were opposed to arrange the rubbing directions of two substrates in anti-parallel and the gap (d) between substrates was kept to 3.9 μm. Subsequently, a nematic liquid crystal composition having a refractive index anisotropy (Δn) of 0.0769 and a positive dielectric anisotropy (Δ∈) of 4.5 was enclosed therein. The d·Δn value of the liquid crystal layer was 300 nm.

<Production of Ferroelectric Liquid Crystal Cell>

A polyimide film on an ITO electrode-glass substrate was disposed as an alignment film and subjected to a rubbing treatment. Two of this substrate were prepared, and then laminated and adhered in a manner that the alignment films were opposed to arrange the rubbing directions of two glass substrates in parallel and the gap (d) between substrates was kept to 1.9 μm. Subsequently, a ferroelectric liquid crystal composition having a refractive index anisotropy (Δn) of 0.15 and an intrinsic polarization (Ps) of 12 $nCcm^{-2}$ was enclosed therein. The d·Δn value of the liquid crystal layer was 280 nm.

<Production of First Phase Difference Area 1, First Phase Difference Area 2, First Phase Difference Area 3, First Phase Difference Area 4, and First Phase Difference Area 5>

A polycarbonate pellet was dissolved in methylene chloride, cast on a metal band, and subsequently dried to obtain a polycarbonate film having the thickness of 80 μm. The polycarbonate film was subjected to an uniaxial stretching of 3.5% and 4.5% in a width direction by using a tenter machine uniaxially stretching in a width direction under the condition of temperature at 170° C., and thus obtained 500 m long First Phase Difference Area 1 and First Phase Difference Area 2, respectively. Further, the polycarbonate film having the thickness of 80 μm was subjected to a biaxial stretching of 3.5% in a longitudinal direction and 1% in a width direction under the condition of temperature at 170° C., to obtain a 500 m long First Phase Difference Area 3. Subsequently, the polycarbonate film having the thickness of 80 μm was subjected to a uniaxial stretching of 4.5% in a longitudinal direction under the condition of temperature at 170° C., to obtain a 500 m long First Phase Difference Area 4. A norborne-based polymer film (Arton, produced by JSR Corp.) which is in a roll-form having the thickness of 100 μm was successively stretched in a longitudinal direction at a temperature of 180° C., and obtained a 500 m long First Phase Difference Area 5.

<Production of First Phase Difference Area 7>

A commercially available norborne-based film (brand name 'Zeonoah', produced by Nippon Zeon Corp.) was subjected to a stretching treatment of 1.25-fold in a width-direction under the condition of temperature at 170° C. by using a tenter machine uniaxially stretching in a width direction, and then a clip-fixed portion was cut off and wound up to obtain a First Phase Difference Area 7.

<Production of First Phase Difference Area 8>

A commercially available norborne-based film (brand name 'Arton', produced by JSR Corp.) was subjected to a stretching treatment of 1.27-fold in a width-direction by using a tenter machine uniaxially stretching in a width direction under the condition of temperature at 145° C. Hereat, the transferring tension of the film was adjusted to give a 3% shrinkage in a longitudinal direction. After the stretching treatment, a clip-fixed portion was cut off and wound up to obtain a First Phase Difference Area 8.

<Production of First Phase Difference Area 9>

The First Phase Difference Area 9 was prepared in the same manner as with the cellulose acylate film S6 disclosed in Examples of Japanese Unexamined Patent Application Publication No. 2005-352138.

The light incidence-angular dependency of Re was measured by using an automatic birefringence analyzer (KOBRA-21ADH, manufactured by Ooji Keisokuki Co., Ltd.). When the optical properties were calculated, the First Phase Difference Area 1 had Re of 100 nm, Rth of 50 nm, and Nz of 1.0; the First Phase Difference Area 2 had Re of 140 nm, Rth of 70 nm, and Nz of 1.0; and the First Phase Difference Area 3 had Re of 80 nm, Rth of 80 nm, and Nz of 1.0, and all of those slow axes were right angle to the longitudinal direction of a long film. The First Phase Difference Area 4 had Re of 140 nm, Rth of 70 nm, and Nz of 1.0; the First Phase Difference Area 5 had Re of 170 nm, Rth of 85 nm, and Nz of 1.0; the First Phase Difference Area 7 had Re of 93 nm, Rth of 133 nm, and Nz of 1.9; and the First Phase Difference Area 8 had Re of 102 nm, Rth of 123 nm, and Nz of 1.7, and confirmed that the all of those slow axes were in parallel with the longitudinal direction of a long film.

<<Production of Second Phase Difference Area and Protective Film>>

According to the followings, second phase difference areas A to E which are in a roll-form were produced.

(Preparation of Cellulose Acylate)

The cellulose acylate of different kind and substitution degree of an acyl group described in Table 3-1 were synthesized according to the following methods. The polarizability anisotropy $\Delta\alpha$ was measured according to the above-mentioned method. The cellulose acylate of the present invention can be obtained by reacting cellulose acylate produced by Aldrich (acetyl substitution degree: 2.45) or cellulose acetate produced by Daicel (acetyl substitution degree: 2.41 (product name: L-70), 2.14 (product name: LM-80)) as a starting material with the corresponding acid chloride.

Synthesis Example 3-1

Synthesis of Asaronic Acid Chloride 106.1 g of asaronic acid (2,4,5-trimethoxybenzoate) and 400 ml of toluene were measured in a IL three-mouthed flask equipped with a mechanical stirrer, thermometer, cooling pipe, and a dropping funnel, and then stirred at 80° C. Thereto, 40.1 ml of thionyl chloride was slowly added dropwise, and then stirred at 80° C. for 2 hours. After the reaction, the reaction solvent was removed by distillation with the use of an aspirator to obtain White solid. To White solid, 300 ml of hexane was added and vigorously stirred/dispersed, White solid was separated by suction filtration, and washed for 3 times with large amounts of hexane. Thus-obtained White solid was dried under vacuum at 60° C. for 4 hours to obtain target asaronic acid chloride as a white powder. (115.3 g, yield 99%).

Synthesis Example 3-2

Synthesis of Cellulose Acylate 3-1

40 g of cellulose acylate (acetyl substitution degree: 2.45) produced by Aldrich, 46.0 ml of pyridine, 300 ml of methylene chloride were measured in a 1 L three-mouthed flask equipped with a mechanical stirrer, thermometer, cooling pipe, and a dropping funnel, and then stirred at room temperature. Thereto, 84.0 g of asaronic acid chloride was powdery added in fractional amounts, and then further stirred at room temperature for 6 hours. After the reaction, the reaction solution was charged to 4 L of methanol while being stirred vigorously to precipitate White-Peach solid. The White-Peach solid was separated by suction filtration and washed for 3 times with large amounts of methanol. Thus-obtained White-Peach solid was dried at 60° C. for overnight, and then dried under vacuum at 90° C. for 6 hours to obtain a target compound as a white-peach powder. For the obtained sample, a substitution degree measurement was conducted and the substitution degree was obtained from a peak intensity of carbonyl carbon in an acyl group according to C13-NMR.

Synthesis Example 3-3

Synthesis of Cellulose Acylate 3-2

40 g of cellulose acylate (acetyl substitution degree: 2.45) produced by Aldrich, 46.0 ml of pyridine, 300 ml of methylene chloride were measured in a IL three-mouthed flask equipped with a mechanical stirrer, thermometer, cooling pipe, and a dropping funnel, and then stirred at room temperature. Thereto, 62.4 mL of benzoyl chloride was slowly added dropwise, and then further stirred at room temperature for 6 hours. After the reaction, the reaction solution was charged to 4 L of methanol while being stirred vigorously to precipitate White solid. The White solid was separated by suction filtration and washed for 3 times with large amounts of methanol. Thus-obtained White solid was dried at 60° C. for overnight, and then dried under vacuum at 90° C. for 6 hours to obtain a target compound as a white powder. The substitution degree was obtained in the same manner as in Synthesis Example 3-2.

Synthesis Example 3-4

Synthesis of Cellulose Acylate 3-3

40 g of cellulose acylate (acetyl substitution degree: 2.41) produced by Daicel, 46.0 ml of pyridine, 300 ml of methylene chloride were measured in a 1 L three-mouthed flask equipped with a mechanical stirrer, thermometer, cooling pipe, and a dropping funnel, and then stirred at room temperature. Thereto, 62.4 mL of benzoyl chloride was slowly added dropwise, and then further stirred at room temperature for 4 hours. After the reaction, the reaction solution was charged to 4 L of methanol while being stirred vigorously to precipitate White solid. The White solid was separated by suction filtration and washed for 3 times with large amounts of methanol. Thus-obtained White solid was dried at 60° C. for overnight, and then dried under vacuum at 90° C. for 6 hours to obtain a target compound as a white powder.

Synthesis Example 3-5

Synthesis of Cellulose Acylate 3-4

Cellulose Acylate 3-4 was obtained as a white powder in the same manner as in Synthesis Example 3-4, except that the benzoyl chloride after the addition was stirred for a longer period of time.

TABLE 3-1

| | Substituent Kind | Substituent Polarizability Anisotropy | Total substitution degree (PA) of acyl group | Substitution degree of aromatic acyl group |
|---|---|---|---|---|
| Cellulose Acylate 3-1 | Asaronic acid | $8.6 \times 10^{-24}$ | 2.91 | 0.46 |
| Cellulose Acylate 3-2 | Benzoyl | $6.8 \times 10^{-24}$ | 2.90 | 0.45 |
| Cellulose Acylate 3-3 | Benzoyl | $6.8 \times 10^{-24}$ | 2.81 | 0.40 |

| | Substituent Kind | Substituent Anisotropy | PA | Substitution degree of aromatic acyl group |
|---|---|---|---|---|
| Cellulose Acylate 3-4 | Benzoyl | $6.8 \times 10^{-24}$ | 3.00 | 0.58 |

(Production of Second Phase Difference Area A)

Cellulose Acylate 3-1 of Synthesis Example 3-2 was dried at 120° C. for 2 hours, thereafter the composition shown below was charged into a mixing tank, and each component was dissolved by heating and stirring, to prepare a cellulose acylate solution.

| | |
|---|---|
| Methylene chloride | 261 parts by mass |
| Methanol | 39 parts by mass |
| Triphenyl phosphate | 5.9 parts by mass |
| Biphenyldiphenyl phosphate | 5.9 parts by mass |
| Cellulose Acylate 3-1 | 100 parts by mass |
| Silicon dioxide particle | 0.25 parts by mass |

400 liter stainless-mixing tank which has stirring wings and cooling water circulating along the perimeter was used. The above solvent and additives other than cellulose acylate were charged, stirred, dispersed or dissolved, and then the above cellulose acylate was added little by little. After the completion of charging, the resultant was stirred at room temperature for 2 hours, allowed the swelling for 3 hours, and then again stirred.

Stirring was performed using a stirring axis which has dissolver-type anchor blades along an eccentric stirring axis and the central axis stirring at a rotating speed of 15 m/sec (shear stress 5×104 kgf/m/sec$^2$), and stirs at a rotating speed of 1 m/sec (shear stress $1\times10^4$ kgf/m/sec$^2$). Swelling was performed by stopping the high speed stirring axis, and setting the rotation speed of the stirring axis having anchor blades to 0.5 m/sec.

Thus-obtained cellulose acylate solution was filtered through a filter paper (#63, manufactured by Toyo Roshi, Ltd) having an absolute filtration precision of 0.01 mm, and further filtered through a filter paper (FH025, Pall Corp.) having an absolute filtration precision of 2.5 μm to obtain a cellulose acylate solution.

The above cellulose acylate solution was heated to 30° C., and cast on a mirror-surface stainless support having a band length of 60 m through a casting geeser (disclosed in Japanese Unexamined Patent Application Publication No. 11-314233). A casting point was set above the roll set to 18° C., and other roll supporting the band was set to a temperature of 35° C. The space temperature of total casting portion was set to 80° C. The casting speed and coating width were 40 m/min and 140 cm, respectively.

At 50 cm behind the casting portion, cast and rotated cellulose acylate film was peeled off from the band, and the both ends of the film were gripped with a tenter. The tenter part at 110° C. was transported while narrowing the film width little by little, and removed from the tenter while allowing it to be 98% of the width at the time of gripping the film. After clipped parts of both ends on the film were cut off, the film was passed to a dried part heated to 135 to 140° C. comprising plural pass rolls, and dried until the amount of residual solvent is 0.2% or less. In this manner, a long Second Phase Difference Area A having a film thickness of 90 μm was obtained.

For the obtained Second Phase Difference Area A, the light incidence-angular dependency of retardation was measured by using an automatic birefringence analyzer (KOBRA-21ADH, manufactured by Ooji Keisokuki Co., Ltd.), and optical properties were calculated. Results were shown in Table 3-2.

(Production of Second Phase Difference Area B)

Cellulose Acylate 3-2 of Synthesis Example 3-3 was dried at 120° C. for 2 hours, thereafter the composition shown below was charged into a mixing tank, and each component was dissolved by heating and stirring, to prepare a cellulose acylate solution. The charge of materials and stirring were carried out in the same manner as in the production of Second Phase Difference Area A.

| | |
|---|---|
| Methylene chloride | 285 parts by mass |
| Methanol | 15 parts by mass |
| Triphenyl phosphate | 7.0 parts by mass |
| Biphenyldiphenyl phosphate | 3.5 parts by mass |
| Cellulose Acylate 3-2 | 100 parts by mass |
| Silicon dioxide particle | 0.25 parts by mass |

The Second Phase Difference Area B was produced in the same manner as in the film-production of Second Phase Difference Area A, except that the above cellulose acylate solution was heated to 30° C. and the thickness of the final film was 43 μm. For the obtained Second Phase Difference Area B, the light incidence-angular dependency of retardation was measured by using an automatic birefringence analyzer (KOBRA-21ADH, manufactured by Ooji Keisokuki Co., Ltd.), and optical properties were calculated. Results were shown in Table 3-2.

(Production of Second Phase Difference Area C)

The Second Phase Difference Area C was produced in the same manner as in Second Phase Difference Area B, except that the cellulose acylate solution prepared in Second Phase Difference Area B was heated to 30° C. and the thickness of the final film was 65 μm. For the obtained Second Phase Difference Area C, the light incidence-angular dependency of retardation was measured by using an automatic birefringence analyzer (KOBRA-21ADH, manufactured by Ooji Keisokuki Co., Ltd.), and optical properties were calculated. Results were shown in Table 3-2.

(Production of Second Phase Difference Area D)

Cellulose Acylate 3-3 of Synthesis Example 3-4 was dried at 120° C. for 2 hours, thereafter the composition shown below was charged into a mixing tank, and each component was dissolved by heating and stirring, to prepare a cellulose acylate solution. The charge of materials and stirring were carried out in the same manner as in the production of Second Phase Difference Area A.

| | |
|---|---|
| Methylene chloride | 261 parts by mass |
| Methanol | 39 parts by mass |
| Compound shown below | 12.0 parts by mass |
| Cellulose Acylate 3-3 | 100 parts by mass |
| Silicon dioxide particle | 0.25 parts by mass |

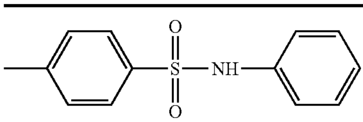

The Second Phase Difference Area D was produced in the same manner as in the film-production of Second Phase Difference Area A, except that the above cellulose acylate solution was heated to 30° C. and the thickness of the final film was 45 μm. For the obtained Second Phase Difference Area D, the light incidence-angular dependency of retardation was measured by using an automatic birefringence analyzer (KOBRA-21ADH, manufactured by Ooji Keisokuki Co., Ltd.), and optical properties were calculated. Results were shown in Table 3-2.

(Production of Second Phase Difference Area E)

Cellulose Acylate 3-3 of Synthesis Example 3-4 was dried at 120° C. for 2 hours, thereafter the composition shown below was charged into a mixing tank, and each component was dissolved by heating and stirring, to prepare a cellulose acylate solution. The charge of materials and stirring were carried out in the same manner as in the production of Second Phase Difference Area A.

| | |
|---|---|
| Methylene chloride | 285 parts by mass |
| Methanol | 15 parts by mass |
| Ethylphthalyl ethylglycolate | 2.4 parts by mass |
| Triphenyl phosphate | 9.0 parts by mass |
| Biphenyldiphenyl phosphate | 5.9 parts by mass |
| Cellulose Acylate 3-3 | 100 parts by mass |
| Silicon dioxide particle | 0.25 parts by mass |

The above cellulose acylate solution was heated to 30° C., and cast on a mirror-surface stainless support having a band length of 60 m through a casting geeser. A casting point was set above the roll set to 20° C., and other roll supporting the band was set to a temperature of 35° C. The space temperature of total casting portion was set to 100° C. The casting speed and coating width were 50 m/min and 140 cm, respectively.

At 50 cm behind the casting portion, cast and rotated cellulose acylate film was peeled off from the band, and the both ends of the film were gripped with a tenter. The tenter part at 110° C. was transported while maintaining the film width. After being removed from the tenter and clipped parts of both ends on the film were cut off, the film was passed to a dried part heated to 135 to 145° C. comprising plural pass rolls, and dried until the amount of residual solvent is 0.1% or less. After drying, the film was wound in a roll, and thus a long Second Phase Difference Area E having a film thickness of 80 μm was obtained.

The light incidence-angular dependency of retardation was measured by using an automatic birefringence analyzer (KOBRA-21ADH, manufactured by Ooji Keisokuki Co., Ltd.), and optical properties were calculated. Results were shown in Table 3-2.

(Production of Second Phase Difference Area F)

Cellulose Acylate 3-4 of Synthesis Example 3-5 was dried at 120° C. for 2 hours, thereafter the composition shown below was charged into a mixing tank, and dissolved by stirring, to prepare a cellulose acylate solution.

| | |
|---|---|
| Methylene chloride | 335 parts by mass |
| Triphenyl phosphate | 7.9 parts by mass |
| Biphenyldiphenyl phosphate | 3.8 parts by mass |
| Cellulose Acylate 3-4 | 100 parts by mass |
| Silicon dioxide particle | 0.25 parts by mass |

The above cellulose acylate solution was heated to 30° C., and cast on a mirror-surface stainless support through a casting geeser having the width of 800 mm. A casting point was set above the roll set to 20° C., and other roll supporting the band was set to a temperature of 30° C. The space temperature of total casting portion was set to 50° C. The casting speed and coating width were 3 ml/min and 80 cm, respectively.

At 50 cm behind the casting portion, cast and rotated cellulose acylate film was peeled off from the band, and the both ends of the film were gripped with a tenter. A tenter pattern was adjusted to give the 1.03-fold of film width, and the tenter part at 110° C. was transported. After being removed from the tenter and clipped parts of both ends on the film were cut off, the film was passed to a dried part heated to 135 to 145° C. comprising plural pass rolls, and dried until the amount of residual solvent is 0.1% or less. After drying, the film was wound in a roll, and thus a long Second Phase Difference Area F having a film thickness of 115 μm was obtained.

The light incidence-angular dependency of retardation was measured by using an automatic birefringence analyzer (KOBRA-21ADH, manufactured by Ooji Keisokuki Co., Ltd.), and optical properties were calculated. Results were shown in Table 3-2.

(Production of Second Phase Difference Area G)

A long Second Phase Difference Area G was produced in the same manner as in Second Phase Difference Area E, except that the final thickness was 70 μm and there is adjusted to maintain the film width after the holding with tenter.

The light incidence-angular dependency of retardation was measured by using an automatic birefringence analyzer (KOBRA-21ADH, manufactured by Ooji Keisokuki Co., Ltd.), and optical properties were calculated. Results were shown in Table 3-2.

(Production of Second Phase Difference Area H)

Cellulose Acylate 3-4 of Synthesis Example 3-5 was dried at 120° C. for 2 hours, thereafter the composition shown below was charged into a mixing tank, and dissolved by stirring, to prepare a cellulose acylate solution.

| | |
|---|---|
| Methylene chloride | 291 parts by mass |
| Methanol | 44 parts by mass |

-continued

| | |
|---|---|
| Cellulose Acylate 3-4 | 100 parts by mass |
| Silicon dioxide particle | 0.25 parts by mass |

The above cellulose acylate solution was heated to 30° C., and cast on a mirror-surface stainless support through a casting geeser having the width of 800 mm. A casting point was set above the roll set to 22° C., and other roll supporting the band was set to a temperature of 30° C. The space temperature of total casting portion was set to 70° C. The casting speed and coating width were 3 m/min and 80 cm, respectively.

At 50 cm behind the casting portion, cast and rotated cellulose acylate film was peeled off from the band, and the both ends of the film were gripped with a tenter. The tenter part at 110° C. was transported while maintaining the film width. After being removed from the tenter and clipped parts of both ends on the film were cut off, the film was passed to a dried part heated to 135 to 145° C. comprising plural pass rolls, and dried until the amount of residual solvent is 0.1% or less. After drying, the film was wound in a roll, and thus a long Second Phase Difference Area G having a film thickness of 80 μm was obtained.

The light incidence-angular dependency of retardation was measured by using an automatic birefringence analyzer (KOBRA-21ADH, manufactured by Ooji Keisokuki Co., Ltd.), and optical properties were calculated. Results were shown in Table 3-2.

(Production of Second Phase Difference Area I)

A long Second Phase Difference Area I was produced in the same manner as in Second Phase Difference Area H, except that the final thickness was 50 μm.

The light incidence-angular dependency of retardation was measured by using an automatic birefringence analyzer (KOBRA-21ADH, manufactured by Ooji Keisokuki Co., Ltd.), and optical properties were calculated. Results were shown in Table 3-2.

(Production of Second Phase Difference Area J)

A long Second Phase Difference Area J was produced in the same manner as in Second Phase Difference Area H, except that the final thickness was 167 μm.

The light incidence-angular dependency of retardation was measured by using an automatic birefringence analyzer (KOBRA-21ADH, manufactured by Ooji Keisokuki Co., Ltd.), and optical properties were calculated. Results were shown in Table 3-2.

(Production of Second Phase Difference Area K)

Cellulose Acylate 3-4 of Synthesis Example 3-5 was dried at 120° C. for 2 hours, thereafter the composition shown below was charged into a mixing tank, and dissolved by stirring, to prepare a cellulose acylate solution.

| | |
|---|---|
| Methylene chloride | 308 parts by mass |
| Methanol | 27 parts by mass |
| Triphenyl phosphate | 3.8 parts by mass |
| Biphenyldiphenyl phosphate | 1.9 parts by mass |
| Cellulose Acylate 3-4 | 100 parts by mass |
| Silicon dioxide particle | 0.25 parts by mass |

A long Second Phase Difference Area K was produced in the same manner as in Second Phase Difference Area H, except that the thickness of the final film was 95 μm.

The light incidence-angular dependency of retardation was measured by using an automatic birefringence analyzer (KOBRA-21ADH, manufactured by Ooji Keisokuki Co., Ltd.), and optical properties were calculated. Results were shown in Table 3-2.

(Production of Second Phase Difference Area L)

Cellulose Acylate 3-3 of Synthesis Example 3-4 was dried at 120° C. for 2 hours, thereafter the composition shown below was charged into a mixing tank, and each component was dissolved by heating and stirring, to prepare a cellulose acylate solution. The charge of materials and stirring were carried out in the same manner as in the production of Second Phase Difference Area A.

| | |
|---|---|
| Methylene chloride | 285 parts by mass |
| Methanol | 15 parts by mass |
| Triphenyl phosphate | 10.0 parts by mass |
| Biphenyldiphenyl phosphate | 5.0 parts by mass |
| Cellulose Acylate 3-2 | 100 parts by mass |
| Silicon dioxide particle | 0.25 parts by mass |

The Second Phase Difference Area L was produced in the same manner as in the film-production of Second Phase Difference Area A, except that the above cellulose acylate solution was heated to 30° C. and the thickness of the final film was 50 μm. For the obtained Second Phase Difference Area L, the light incidence-angular dependency of retardation was measured by using an automatic birefringence analyzer (KOBRA-21ADH, manufactured by Ooji Keisokuki Co., Ltd.), and optical properties were calculated. Results were shown in Table 3-2.

TABLE 3-2

| Second Phase Difference Area, Film | Re | Rth | Thickness |
|---|---|---|---|
| A | −3 nm | −100 nm | 90 μm |
| B | 0 nm | −50 nm | 43 μm |
| C | −2 nm | −75 nm | 65 μm |
| D | 0 nm | −47 nm | 45 μm |
| E | 0 nm | 0 nm | 80 μm |
| F | 0 nm | −135 nm | 115 μm |
| G | −3 nm | −90 nm | 70 μm |
| H | −4.5 nm | −141 nm | 80 μm |
| I | 0 nm | −90 nm | 50 μm |
| J | 0 nm | −248 nm | 167 μm |
| K | −1 nm | −152 nm | 95 μm |
| L | 1 nm | −29 nm | 50 μm |

<Production of Optically-Compensatory Film Incorporating Polarizing Plate 3-1>

A rolled polyvinyl alcohol film successively dyed in an aqueous solution of iodine and having the thickness of 80 μm was stretched to 5-folds in a transporting direction, and dried to obtain a long polarizing film having the length of 500 m. On one surface of this polarizing film, a saponified cellulose triacetate film (Fujitac TD80UF, produced by Fuji Photo Film Co., Ltd.) was attached, and on the other surface thereof, a saponified cellulose triacetate film (Fujitac TZ40UZ, produced by Fuji Photo Film Co., Ltd., thickness: 40 μm, Re=1 nm, Rth=35 nm) was attached, continuously by using a polyvinyl alcohol-based adhesive. Further the above-mentioned First Phase Difference Area 1 was attached continuously on T40UZ by using an adhesive. Subsequently, the above-mentioned Second Phase Difference Area C was attached continuously on the side of that First Phase Difference Area 1 by using an adhesive, and produced a long Optically-Compensatory Film incorporating Polarizing Plate 3-1 having the length of 500 m. The absorption axis of the polarizing film was parallel to a longitudinal direction of the film, and the slow axis of First Phase Difference Area 1 was orthogonal to a longitudinal direction of the film.

This Optically-Compensatory Film incorporating Polarizing Plate 3-1 which is in a roll-form was cut from an arbitrary part to obtain 10 sheets of a laminating layer of Polarizing Plate 3-1 in the size of 20 cm×20 cm. Hereat, the cutting was performed such that the one side becomes parallel with the absorption axis of the polarizing film (orthogonal to the slow axis of First Phase Difference Area 1).

<Production of Optically-Compensatory Film Incorporating Polarizing Plate 3-2>

A polarizing film having the length of 500 m was obtained in the same manner as above. On one surface of this polarizing film, a saponified cellulose triacetate film (Fujitac TD80UF, produced by Fuji Photo Film Co., Ltd.) was attached, and on the other surface thereof, a saponified above-mentioned Second Phase Difference Area E was attached, continuously by using a polyvinyl alcohol-based adhesive. Further the above-mentioned First Phase Difference Area 2 was attached continuously on Second Phase Difference Area E by using an adhesive. Subsequently, the above-mentioned film A (Second Phase Difference Area) was attached continuously on the side of that First Phase Difference Area 2 by using an adhesive, and produced a long Optically-Compensatory Film incorporating Polarizing Plate 3-2 having the length of 500 m. The absorption axis of the polarizing film was parallel to a longitudinal direction of the film, and the slow axis of First Phase Difference Area 2 was orthogonal to a longitudinal direction of the film.

This Optically-Compensatory Film incorporating Polarizing Plate 3-2 which is in a roll-form was cut from an arbitrary part to obtain 10 sheets of a laminating layer of Polarizing Plate 3-2 in the size of 20 cm×20 cm. Hereat, the cutting was performed such that the one side becomes parallel with the absorption axis of the polarizing film.

<Production of Optically-Compensatory Film Incorporating Polarizing Plate 3-3>

A polarizing film having the length of 500 m was obtained in the same manner as above. On both surfaces of this polarizing film, saponified Fujitac TD80UFs were continuously attached. Further the above-mentioned First Phase Difference Area 3 was attached continuously on Fujitac TD80UF by using an adhesive. Subsequently, Second Phase Difference Area A and Second Phase Difference Area B were attached continuously on the side of that First Phase Difference Area 3 by using an adhesive, and produced a long Optically-Compensatory Film incorporating Polarizing Plate 3-3 having the length of 500 m. The absorption axis of the polarizing film was parallel to a longitudinal direction of the film, and the slow axis of First Phase Difference Area was orthogonal to a longitudinal direction of the film. Additive properties were achieved in the optical properties of Re and Rth of A and B, and Re and Rth of the laminated body of films A and B were assumed to be −3 nm and −150 nm, respectively.

This Optically-Compensatory Film incorporating Polarizing Plate 3-3 which is in a roll-form was cut from an arbitrary part to obtain 10 sheets of a laminating layer of Polarizing Plate 3-3 in the size of 20 cm×20 cm. Hereat, the cutting was performed such that the one side becomes parallel with the absorption axis of the polarizing film.

<Production of Optically-Compensatory Film Incorporating Polarizing Plate 3-4>

A polarizing film having the length of 500 in was obtained in the same manner as above. On one surface of this polarizing film, a saponified cellulose triacetate film (Fujitac TD80UF, produced by Fuji Photo Film Co., Ltd.) was attached, and on the other surface thereof, Second Phase Difference Area B and Second Phase Difference Area D were attached, continuously. Further the above-mentioned First Phase Difference Area 5 was attached continuously on Second Phase Difference Area D by using an adhesive, and produced a long Optically-Compensatory Film incorporating Polarizing Plate 3-4 having the length of 500 m. The absorption axis of the polarizing film was parallel to a longitudinal direction of the film, and the slow axis of First Phase Difference Area 5 was orthogonal to a longitudinal direction of the film. Additive properties were achieved in the optical properties of Re and Rth of Second Phase Difference Area B and Second Phase Difference Area D, and Re and Rth of the laminated body of B and D were assumed to be 0 nm and −97 nm, respectively.

This Optically-Compensatory Film incorporating Polarizing Plate 3-4 which is in a roll-form was cut from an arbitrary part to obtain 10 sheets of a laminating layer of Polarizing Plate 3-4 in the size of 20 cm×20 cm. Hereat, the cutting was performed such that the one side becomes parallel with the absorption axis of the polarizing film.

<Production of Optically-Compensatory Film Incorporating Polarizing Plate 3-5>

A polarizing film having the length of 500 m was obtained in the same manner as above. On one surface of this polarizing film, a saponified cellulose triacetate film (Fujitac TD80UF, produced by Fuji Photo Film Co., Ltd.) was attached, and on the other surface thereof, Second Phase Difference Area A was attached, continuously. Further the above-mentioned First Phase Difference Area 4 was attached continuously on Second Phase Difference Area A by using an adhesive, and produced a long Optically-Compensatory Film incorporating Polarizing Plate 3-5 having the length of 500 m. The absorption axis of the polarizing film was parallel to a longitudinal direction of the film, and the slow axis of First Phase Difference Area 4 was orthogonal to a longitudinal direction of the film.

This Optically-Compensatory Film incorporating Polarizing Plate 3-5 which is in a roll-form was cut from an arbitrary part to obtain 20 sheets of a laminating layer of Polarizing Plate 3-5 in the size of 20 cm×20 cm. Hereat, the cutting was performed such that the one side becomes parallel with the absorption axis of the polarizing film.

<Production of Optically-Compensatory Film Incorporating Polarizing Plate 3-6>

(Formation of First Phase Difference Area 6)

The surface of the film A was saponified, and then, an alignment film coating liquid having the following composition was applied on the film in an amount of 20 ml/m2 using a wire bar coater, while transporting the film. The film was dried with hot air at 60° C. for 60 seconds, and further dried with hot air at 100° C. for 120 seconds to form a film. Next, the formed film was subjected to a rubbing treatment in a direction parallel to the longitudinal direction of the film, to thus form an alignment film.

| Composition of Alignment Film Coating Liquid | |
|---|---|
| Modified polyvinyl alcohol shown below | 10 parts by mass |
| Water | 371 parts by mass |
| Methanol | 119 parts by mass |
| Glutaraldehyde | 0.5 parts by mass |

-continued

Modified polyvinyl alcohol

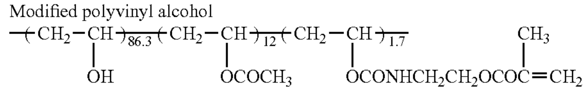

The above alignment film was coated successively with the coating liquid having the following composition using a bar coater. The coated layer was heated at 100° C. for 1 minute, rod-like liquid-crystal molecules were aligned, and the rod-like liquid-crystal molecules were polymerized by irradiating UV rays, to fix the alignment state.

| Coating Liquid Composition of First Phase Difference Area 6 | |
|---|---|
| Rod-like liquid-crystal compound shown below | 38.4% by mass |
| Sensitizer shown below | 0.38% by mass |
| Photo-polymerization initiator shown below | 1.15% by mass |
| Horizontal alignment agent for air interface shown below | 0.06% by mass |
| Methlethyleketone | 60.0% by mass |

Rod-like liquid-crystal compound

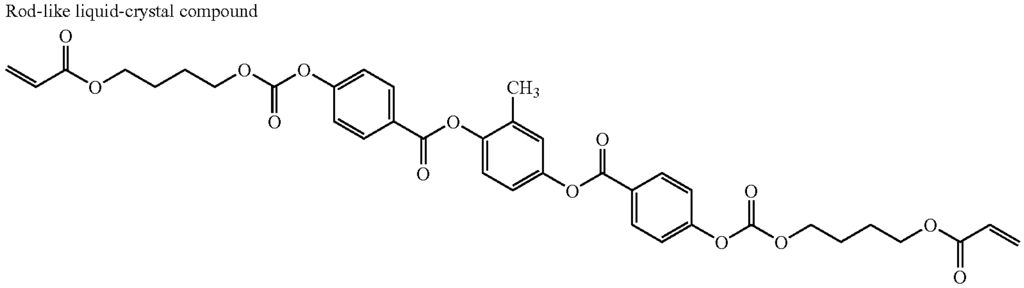

Sensitizer

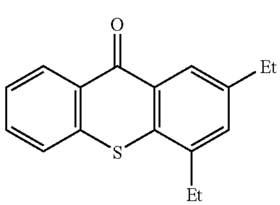

Photo-polymerization initiator

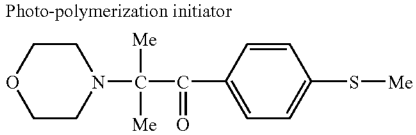

-continued

| Coating Liquid Composition of First Phase Difference Area 6 |
|---|

Horizontal alignment agent for air interface

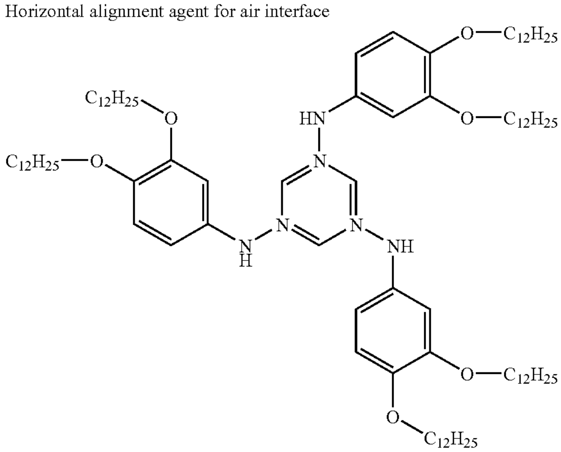

The light incidence-angular dependency of Re of a film forming First Phase Difference Area 6 was measured by using an automatic birefringence analyzer (KOBRA-21ADH, manufactured by Ooji Keisokuki Co., Ltd.), and the predetermined extent of contribution of second phase difference area A was subtracted to calculate the optical properties of only First Phase Difference Area 6. The Re was 137 nm, Rth was 69 nm, Nz value was 1.0, average inclining angle with respect to a layer plane of the long axis of the rod-like liquid-crystal molecules was 0°, and the alignment was parallel to the film plane. Further, the rod-like liquid-crystal molecules were aligned such that the long axis direction is in parallel with a longitudinal direction of the rolled cellulose acetate film (that is, the slow axis direction of First Phase Difference Area 6 was in parallel with the longitudinal direction of the rolled Second Phase Difference Area A).

A polarizing film having the length of 500 m was obtained in the same manner as above. On one surface of this polarizing film, a saponified cellulose triacetate film (Fujitac TD80UF, produced by Fuji Photo Film Co., Ltd.) was attached, and on the other surface thereof, Second Phase Difference Area A forming First Phase Difference Area 6 was attached in the manner such that Second Phase Difference Area A is in contact with the polarizing film, continuously, and produced a long Optically-Compensatory Film incorporating Polarizing Plate 3-6 having the length of 500 m. The absorption axis of the polarizing film was parallel to a longitudinal direction of the film, and the slow axis of First Phase Difference Area was parallel to a longitudinal direction of the film.

This Optically-Compensatory Film incorporating Polarizing Plate 3-6 which is in a roll-form was cut from an arbitrary part to obtain 10 sheets of a laminating layer of Polarizing Plate 3-6 in the size of 20 cm×20 cm. Hereat, the cutting was performed such that the one side becomes parallel with the absorption axis of the polarizing film.

<Production of Optically-Compensatory Film Incorporating Polarizing Plate 3-7>

A polarizing film having the length of 500 m was obtained in the same manner as above, except that the width was 650 mm. On one surface of this polarizing film, the width was cut to 680 mm and a saponified cellulose triacetate film (Fujitac TD80UF, produced by Fuji Photo Film Co., Ltd.) was attached, and on the other surface thereof, Second Phase Difference Area F was attached, by using a water-soluble adhesive, and then dried.

Further, First Phase Difference Area 8 was attached continuously on Second Phase Difference Area F by using an adhesive, and produced a long Optically-Compensatory Film incorporating Polarizing Plate 3-7 having the length of 500 m. The absorption axis of the polarizing film was parallel to a longitudinal direction of the film, and the slow axis of First Phase Difference Area 8 was parallel to a longitudinal direction of the film.

This Optically-Compensatory Film incorporating Polarizing Plate 3-7 which is in a roll-form was cut from an arbitrary part to obtain 10 sheets of a laminating layer of Polarizing Plate 3-7 in the size of 20 cm×20 cm. Hereat, the cutting was performed such that the one side becomes parallel with the absorption axis of the polarizing film.

<Production of Optically-Compensatory Film Incorporating Polarizing Plate 3-8>

Optically-Compensatory Film incorporating Polarizing Plate 3-8 was produced in the same manner as in Optically-Compensatory Film incorporating Polarizing Plate 3-7, except that Second Phase Difference Area G was used instead of Second Phase Difference Area F and First Phase Difference Area 5 was used instead of First Phase Difference Area 8. This Optically-Compensatory Film incorporating Polarizing Plate 3-8 which is in a roll-form was cut from an arbitrary part to obtain 10 sheets of a laminating layer of Polarizing Plate 3-8 in the size of 20 cm×20 cm. Hereat, the cutting was performed such that the one side becomes parallel with the absorption axis of the polarizing film.

<Production of Optically-Compensatory Film Incorporating Polarizing Plate 3-9>

Optically-Compensatory Film incorporating Polarizing Plate 3-9 was produced in the same manner as in Production of Optically-Compensatory Film incorporating Polarizing Plate 3-7, except that Second Phase Difference Area H was used instead of Second Phase Difference Area F. This Optically-Compensatory Film incorporating Polarizing Plate 3-9 which is in a roll-form was cut from an arbitrary part to obtain 10 sheets of a laminating layer of Polarizing Plate 3-9 in the size of 20 cm×20 cm. Hereat, the cutting was performed such that the one side becomes parallel with the absorption axis of the polarizing film.

<Production of Optically-Compensatory Film Incorporating Polarizing Plate 3-10>

A polarizing film having the length of 500 m was obtained in the same manner as in Production of Optically-Compensatory Film incorporating Polarizing Plate 3-7. On one surface of this polarizing film, the width was cut to 680 mm and a saponified cellulose triacetate film (Fujitac TD80UF, produced by Fuji Photo Film Co., Ltd.) was attached, and on the other surface thereof, Second Phase Difference Area I was attached, by using a water-soluble adhesive, and then dried.

Further, commercially available phase difference film (Pure-Ace WRF, produced by Teijin CHEMICALS LTD.) was attached continuously on Second Phase Difference Area I by using an adhesive, and produced a long Optically-Compensatory Film incorporating Polarizing Plate 3-10 having the length of 500 m. The absorption axis of the polarizing film was parallel to a longitudinal direction of the film, and the slow axis of First Phase Difference Area 8 was parallel to a longitudinal direction of the film.

<Production of Optically-Compensatory Film Incorporating Polarizing Plate 3-11>

A polarizing film having the length of 500 m was obtained in the same manner as in Optically-Compensatory Film incorporating Polarizing Plate 3-7. On one surface of this polarizing film, the width was cut to 680 mm and a saponified cellulose triacetate film (Fujitac TD80UF, produced by Fuji Photo Film Co., Ltd.) was attached, and on the other surface thereof, Second Phase Difference Area J was attached, by using a water-soluble adhesive, and then dried.

Further, the width was cut to 680 mm, a saponified First Phase Difference Area 9 was attached on a surface opposite to the polarizer of Second Phase Difference Area J by using a water-soluble adhesive, and then dried, to produce a long Optically-Compensatory Film incorporating Polarizing Plate 3-11. The absorption axis of the polarizing film was parallel to a longitudinal direction of the film, and the slow axis of First Phase Difference Area 8 was parallel to a longitudinal direction of the film.

<Production of Optically-Compensatory Film Incorporating Polarizing Plate 3-12>

Optically-Compensatory Film incorporating Polarizing Plate 3-12 was produced in the same manner as in Production of Optically-Compensatory Film incorporating Polarizing Plate 3-7, except that Second Phase Difference Area K was used instead of Second Phase Difference Area F and First Phase Difference Area 7 was used instead of First Phase Difference Area 8. This Optically-Compensatory Film incorporating Polarizing Plate 3-8 which is in a roll-form was cut from an arbitrary part to obtain 10 sheets of a laminating layer of Polarizing Plate 3-7 in the size of 20 cm×20 cm. Hereat, the cutting was performed such that the one side becomes parallel with the absorption axis of the polarizing film.

<Production of Optically-Compensatory Film Incorporating Polarizing Plate 3-13>

A polarizing film having the length of 500 m was obtained in the same manner as in Optically-Compensatory Film incorporating Polarizing Plate 3-1. On one surface of this polarizing film, a saponified cellulose triacetate film (Fujitac TD80UF, produced by Fuji Photo Film Co., Ltd.) was attached, and on the other surface thereof, Second Phase Difference Area D was attached, by using a water-soluble adhesive, to obtain Optically-Compensatory Film incorporating Polarizing Plate 3-13.

<Production of Optically-Compensatory Film Incorporating Polarizing Plate 3-14>

Optically-Compensatory Film incorporating Polarizing Plate 3-8 was produced in the same manner as in Optically-Compensatory Film incorporating Polarizing Plate 3-7, except that Second Phase Difference Area L was used instead of Second Phase Difference Area F. This Optically-Compensatory Film incorporating Polarizing Plate 3-8 which is in a roll-form was cut from an arbitrary part to obtain 10 sheets of a laminating layer of Polarizing Plate 3-7 in the size of 20 cm×20 cm. Hereat, the cutting was performed such that the one side becomes parallel with the absorption axis of the polarizing film.

<Production of Polarizing Plate A>

A rolled polyvinyl alcohol film successively dyed in an aqueous solution of iodine and having the thickness of 80 μm was stretched to 5-folds in a transporting direction, and then dried to obtain a polarizing film having the length of 500 m. On both surfaces of this polarizing film, saponified cellulose triacetate films (Fujitac TZ40UZ, produced by Fuji Photo Film Co., Ltd., thickness: 40 μm, Re=1 nm, Rth=35 nm) were continuously attached by using a polyvinyl alcohol-based adhesive, and produced Polarizing Plate A having the length of 500 m.

The absorption axis of the polarizing film was parallel to a longitudinal direction of the film.

Polarizing Plate A which is in a roll-form was cut from an arbitrary part to obtain 20 sheets of Polarizing Plate A in the size of 20 cm×20 cm. Hereat, the cutting was performed such that the one side becomes parallel with the absorption axis of the polarizing film.

<Production of Polarizing Plate B>

A rolled polyvinyl alcohol film successively dyed in an aqueous solution of iodine and having the thickness of 80 μm was stretched to 5-folds in a transporting direction, and then dried to obtain a polarizing film having the length of 500 m. On one surface of this polarizing film, a saponified cellulose triacetate film (Fujitac TD80UF, produced by Fuji Photo Film Co., Ltd.) was attached, and on the other surface thereof, Film E was attached, by using a polyvinyl alcohol-based adhesive, to produce Polarizing Plate B having the length of 500 m. The absorption axis of the polarizing film was parallel to a longitudinal direction of the film.

Polarizing Plate B which is in a roll-form was cut from an arbitrary part to obtain 50 sheets of Polarizing Plate A in the size of 20 cm×20 cm. Hereat, the cutting was performed such that the one side becomes parallel with the absorption axis of the polarizing film.

Example 3-1

<Production of Liquid Crystal Display Device 3-1>

On a side of the produced IPS-mode liquid-crystal cell, the produced laminating layer of Polarizing Plate 3-1 was attached in the manner such that its absorption axis is orthogonal to the rubbing direction of the liquid-crystal cell (slow axis direction of the liquid-crystal molecules at the black display), or in other words, the transmission axis is in parallel with the slow axis direction of liquid-crystal molecules at black display, and also that Second Phase Difference Area is on the side of liquid-crystal cell. Subsequently, Polarizing Plate A produced above was attached to another side of the liquid-crystal cell in a cross-nicole alignment. Thus, Liquid Crystal Display Device 3-1 was produced.

10 units of the above Liquid Crystal Display Device 3-1 were produced, and white and black displays were performed to obtain the brightness ratio of their frontal direction as a contrast ratio. For the liquid crystal display device in which the phase difference plate is not included and only the polarizing plate is attached, the contrast ratio of 90% or less was concerned as a defective unit. The number of defective generated from the 10 units of Liquid Crystal Display Device 3-1 was zero.

Further, the light leakage from the produced liquid crystal display device was measured. For the measurement, first the above IPS-mode liquid-crystal cell was placed on a fluorescent lamp box in a dark room without being attached with a polarizing plate, and Brightness 1 was measured at an azimuth direction of 450 from the rubbing direction of the liquid-crystal cell to the left-hand-side direction and at a direction of 600 from the normal direction of the liquid-crystal cell with the luminance meter disposed at 1 meter distance.

Next, the above Liquid Crystal Display Device 3-1 was placed in the same manner on the same fluorescent lamp box, and Brightness 2 was measured in the same manner in a dark display condition. Ratio of Brightness 2 to Brightness 1 shown in percentage was found as the light leakage. The average value of the light leakage measured for 10 non-defective units was 0.09%.

Example 3-2

<Production of Liquid Crystal Display Device 3-2>

On a side of the produced IPS-mode liquid-crystal cell, the produced laminating layer of Polarizing Plate 3-2 was attached in the manner such that its absorption axis is orthogonal to the rubbing direction of the liquid-crystal cell (slow axis direction of the liquid-crystal molecules at the black display), and also that Second Phase Difference Area is on the side of liquid-crystal cell. Subsequently, Polarizing Plate B produced above was attached to another side of the liquid-crystal cell in a cross-nicole alignment. Thus, Liquid Crystal Display Device 3-2 was produced.

10 units of the above Liquid Crystal Display Device 3-2 were produced. The number of defective generated from the 10 units of Liquid Crystal Display Device 3-2 was zero. When the light leakage was measured in the same manner as in Example 3-1, the average value of 10 non-defective units was 0.06%.

Example 3-3

<Production of Liquid Crystal Display Device 3-3>

On a side of the produced IPS-mode liquid-crystal cell, the produced laminating layer of Polarizing Plate 3-3 was attached in the manner such that its absorption axis is orthogonal to the rubbing direction of the liquid-crystal cell (slow axis direction of the liquid-crystal molecules at the black display), and also that Second Phase Difference Area is on the side of liquid-crystal cell. Subsequently, Polarizing Plate B produced above was attached to another side of the liquid-crystal cell in a cross-nicole alignment. Thus, Liquid Crystal Display Device 3-3 was produced.

10 units of the above Liquid Crystal Display Device 3-3 were produced. The number of defective generated from the 10 units of Liquid Crystal Display Device 3-3 was zero. When the light leakage was measured in the same manner as in Example 3-1, the average value of 10 non-defective units was 0.06%.

Example 3-4

<Production of Liquid Crystal Display Device 3-4>

On a side of the produced IPS-mode liquid-crystal cell, the produced laminating layer of Polarizing Plate 3-4 was attached in the manner such that its absorption axis is orthogonal to the rubbing direction of the liquid-crystal cell (slow axis direction of the liquid-crystal molecules at the black display), and also that First Phase Difference Area is on the side of liquid-crystal cell. Subsequently, Polarizing Plate A produced above was attached to another side of the liquid-crystal cell in a cross-nicole alignment. Thus, Liquid Crystal Display Device 3-4 was produced.

10 units of the above Liquid Crystal Display Device 3-4 were produced. The number of defective generated from the 10 units of Liquid Crystal Display Device 3-4 was zero. When the light leakage was measured in the same manner as in Example 3-1, the average value of 10 non-defective units was 0.12%.

Example 3-5

<Production of Liquid Crystal Display Device 3-5>

On a side of the produced IPS-mode liquid-crystal cell, the produced laminating layer of Polarizing Plate 3-5 was attached in the manner such that its absorption axis is orthogonal to the rubbing direction of the liquid-crystal cell (slow axis direction of the liquid-crystal molecules at the black display), and also that First Phase Difference Area is on the side of liquid-crystal cell. Subsequently, Polarizing Plate B produced above was attached to another side of the liquid-crystal cell in a cross-nicole alignment. Thus, Liquid Crystal Display Device 3-5 was produced.

10 units of the above Liquid Crystal Display Device 3-5 were produced. The number of defective generated from the 10 units of Liquid Crystal Display Device 3-5 was zero. When the light leakage was measured in the same manner as in Example 3-1, the average value of 10 non-defective units was 0.05%.

Example 3-6

<Production of Liquid Crystal Display Device 3-6>

On a side of the produced ferroelectric liquid-crystal cell, the produced laminating layer of Polarizing Plate 3-5 was attached in the manner such that its absorption axis is in parallel with the slow axis of liquid-crystal molecules when 10 V of direct voltage is applied to the liquid-crystal cell (such to be orthogonal to the slow axis direction of liquid-crystal molecules at the black display), and also that First Phase Difference Area is on the side of liquid-crystal cell. Subsequently, Polarizing Plate B produced above was attached to another side of the liquid-crystal cell in a cross-nicole alignment. Thus, Liquid Crystal Display Device 3-6 was produced.

10 units of the above Liquid Crystal Display Device 3-6 were produced. The number of defective generated from the 10 units of Liquid Crystal Display Device 3-6 was zero. When the light leakage was measured in the same manner as in Example 3-1, the average value of 10 non-defective units was 0.06%.

Example 3-7

<Production of Liquid Crystal Display Device 3-7>

On a side of the produced IPS-mode liquid-crystal cell, the produced laminating layer of Polarizing Plate 3-6 was attached in the manner such that its absorption axis is orthogonal to the rubbing direction of the liquid-crystal cell (slow axis direction of the liquid-crystal molecules at the black display), and also that First Phase Difference Area is on the side of liquid-crystal cell. Subsequently, Polarizing Plate B produced above was attached to another side of the liquid-crystal cell in a cross-nicole alignment. Thus, Liquid Crystal Display Device 3-7 was produced.

10 units of the above Liquid Crystal Display Device 3-7 were produced. The number of defective generated from the 10 units of Liquid Crystal Display Device 3-7 was zero. When the light leakage was measured in the same manner as in Example 3-1, the average value of 10 non-defective units was 0.05%.

Reference Example 3-1

<Production of Laminating Layer of Polarizing Plate 3-7>

Produced Film A forming First Phase Difference Area 6 which is in a roll-form was cut from an arbitrary part to obtain 10 sheets of phase difference plate 16A in the size of 20 cm×20 cm. Hereat, the cutting was performed such that the one side becomes in parallel with the slow axis of First Phase Difference Area 6.

Subsequently, a rolled polyvinyl alcohol film successively dyed in an aqueous solution of iodine and having the thickness of 80 μm was stretched to 5-folds in a transporting direction, and then dried to obtain a polarizing film having the length of 500 m. On one surface of this polarizing film, a saponified cellulose triacetate film (Fujitac TD80UF, produced by Fuji Photo Film Co., Ltd.) was attached, and cut in 10 sheets of 20 cm×20 cm in size. Hereat, the cutting was performed such that the one side becomes parallel with the absorption axis of the polarizing film. Phase Difference Plate 16A and the polarizing plate were attached together in the manner such that the slow axis of Phase Difference Plate 16A is parallel with the absorption axis of the polarizing plate and that Film A side is on the side of the polarizing film, to give a laminating layer of Polarizing Plate 3-7, and 10 sheets thereof were produced.

Example 3-8

<Production of Liquid Crystal Display Device 3-8>

On a side of the produced IPS-mode liquid-crystal cell, the produced laminating layer of Polarizing Plate 3-7 was attached in the manner such that its absorption axis is orthogonal to the rubbing direction of the liquid-crystal cell (slow axis direction of the liquid-crystal molecules at the black display), and also that First Phase Difference Area is on the side of liquid-crystal cell. Subsequently, Polarizing Plate B produced above was attached to another side of the liquid-crystal cell in a cross-nicole alignment. Thus, Liquid Crystal Display Device 3-8 was produced.

10 units of the above Liquid Crystal Display Device 3-8 were produced, and the number of defective generated when determined in the same manner as in Example 3-1 was 3. When the light leakage was measured from a distance in a leftward 60° oblique direction, the average value of 7 non-defective units was 0.11%. From the result, it was found that the generation of defective is much lower in the case where first a long optically-compensatory film incorporating a polarizing plate is formed and then cut for production, than in the case where each of polarizing plate and phase difference plate is cut first and then laminated in a layer for production.

Comparative Example 3-1

<Production of Liquid Crystal Display Device 3-9>

As same in Example 3-1, on both sides of produced IPS-mode liquid-crystal cell, a commercially available polarizing plate (HLC2-5618, manufactured by SANRITZ CORPORATION) which is cut in 20 cm×20 cm size and its one side is made parallel with the absorption axis of the polarizing film was attached in a cross-nicole alignment. Thus Liquid Crystal Display Device 3-9 was produced.

10 units of the above Liquid Crystal Display Device 3-9 were produced, and the number of defective generated when determined in the same manner as in Example 3-1 was zero. When the light leakage was measured in the same manner as in Example 3-1, the average value of 10 non-defective units was 0.55%.

Example 3-9

<Production of Liquid Crystal Display Device 3-10>

A polarizing plate on a front side of a panel in a commercially available IPS liquid crystal display device (37Z1000, manufactured by TOSHIBA CORPORATION) was peeled off, and Optically-Compensatory Film incorporating Polarizing Plate 3-7 produced above was attached using an adhesive sheet in the manner such that the phase difference area is on the side of the liquid-crystal cell. The absorption axis of the polarizing plate produced in the present invention was fit in a direction of the absorption axis of a polarizing plate of the peeled product. After being attached, the product was autoclave treated at 50° C. and 5 atmosphere, and produced Liquid Crystal Display Device 3-10 using IPS liquid-crystal cell.

10 units of the above Liquid Crystal Display Device 3-10 were produced. The number of defective generated from the 10 units of Liquid Crystal Display Device 3-10 was zero. When the light leakage was measured in the same manner as in Example 3-1, the average value of 10 non-defective units was 0.05%.

Example 3-10

<Production of Liquid Crystal Display Devices 3-11 to 3-15>

Liquid Crystal Display Devices 3-11 to 3-15 were produced in the same manner as in Liquid Crystal Display Device 3-10, except that Optically-Compensatory Film incorporating Polarizing Plates 3-8 to 3-12 were used instead of Optically-Compensatory Film incorporating Polarizing Plate 3-7. When the numbers of defective generated was determined in the same manner as in the evaluation of Liquid Crystal Display Device 3-10, the number generated for all the devices was zero. When the light leakage was measured, Liquid Crystal Display Devices 3-11 and 3-13 were 0.04%, Liquid Crystal Display Devices 3-12 and 3-15 were 0.05%, and Liquid Crystal Display Device 3-14 was 0.06%.

Example 3-11

<Production of Liquid Crystal Display Device 3-16>

A polarizing plate on a rear side of the panel in a commercially available IPS liquid crystal display device (37Z1000, manufactured by TOSHIBA CORPORATION) was peeled off, and Optically-Compensatory Film incorporating Polarizing Plate 3-13 produced above was attached using an adhesive sheet in the manner such that the phase difference area is on the side of the liquid-crystal cell. The absorption axis of the polarizing plate produced in the present invention was fit in a direction of the absorption axis of a polarizing plate of the peeled product. After being attached, the product was autoclave treated at 50° C. and 5 atmosphere, and produced Liquid Crystal Display Device 3-16 using IPS liquid-crystal cell.

10 units of the above Liquid Crystal Display Device 3-16 were produced. The number of defective generated from the 10 units of Liquid Crystal Display Device 3-16 was zero.

When the light leakage was measured in the same manner as in Example 3-1, the average value of 10 non-defective units was 0.07%.

Comparative Example 3-2

<Production of Liquid Crystal Display Device 3-17>

Liquid Crystal Display Device 3-17 was produced in the same manner as in Liquid Crystal Display Device 3-10, except that Optically-Compensatory Film incorporating Polarizing Plate 3-14 was used instead of Optically-Compensatory Film incorporating Polarizing Plate 3-7. When the numbers of defective generated was determined in the same manner as in the evaluation of Liquid Crystal Display Device 3-10, the number generated was 1. When the light leakage was measured, it was 0.49%.

Industrial Applicability

According to the first present invention, it is possible to provide a cellulose derivative film in which defects in the film caused by environmental changes are not generated since a negative retardation in a thickness-direction can be controlled in a wide range, a method of producing the same, and a polarizing plate and a liquid crystal display device which use the cellulose film, exhibit high contrast, and can maintain an excellent visibility even in a prolonged use.

According to the second present invention, a cellulose derivative film exhibiting a negative Rth can be provided. The cellulose derivative film of the invention can be used as a retardation film suitable for, for example, IPS mode liquid crystal display devices, due to the above-mentioned performance. The cellulose derivative film can also be used in combination with other optical films having various optical properties, thus significantly improving the degree of freedom in optical designs. Furthermore, according to the invention, a cellulose derivative film which has, in addition to the performance described above, low moisture content in the film and is useful for the preparation of polarizing plates having excellent durability under high temperature and high humidity conditions, can be provided. When the cellulose derivative film of the invention is used as a support for protective films for polarizing plates or for optically compensatory films used in liquid crystal display devices, a liquid crystal display device having excellent viewing angle properties or excellent durability under high temperature and high humidity conditions can be provided.

According to the liquid crystal display device of the third present invention, improvement can be made on a contrast decrease generated by slippage of absorption axes of two polarizing plates from 90° when viewed from an oblique azimuth angle direction.

Particularly, the above-mentioned effect can be further improved according to a liquid crystal display device which comprises at least a first polarizing film, a first phase difference area, a second phase difference area, a liquid-crystal cell in which a liquid-crystal layer is interposed between the pair of substrates, and a second polarizing film, in which liquid-crystal molecules of the liquid-crystal layer are aligned parallel to surfaces of the pair of substrates at the black display, the first phase difference area having in-plane retardation Re of 60 to 200 nm and an Nz value of greater than 0.8 and less than or equal to 1.5, and the second phase difference area having in-plane retardation Re of 50 nm or less, retardation in a thickness-direction Rth of −200 to −50 nm, and a cellulose acylate film which includes a substituent having a polarizability anisotropy $\Delta\alpha$ of $2.5\times10^{-24}$ cm−3 or more, are used, and a transmission axis of the first polarizing film is in parallel with a slow axis direction of the liquid-crystal molecules at the black display. In addition, further improvement on a contrast can be attained by a protective layer of polarizing film having Rth of 40 nm or less. In the optically-compensatory film incorporating a polarizing plate according to the present invention, the second phase difference film is provided with cellulose acylate which includes a substituent having a polarizability anisotropy $\Delta\alpha$ of 2.5×10−24 cm−3 or more. The film can be even more satisfied in optical properties required for the second phase difference area by controlling a kind of substituents for cellulose acylate and a substitution degree of acyl to a hydroxyl group, and by adjusting preparation conditions. Thus, according to the use of the film, a liquid crystal display device having a simple configuration and improved in viewing angle characteristics can be prepared. Further, since the film has properties required for a protective film for a polarizing film, the film can be formed on a surface of the polarizing film to function as a protective layer, and a liquid crystal display device having a simple configuration and improved in viewing angle characteristics can be prepared.

The entire disclosure of each and every foreign patent application from which the benefit of foreign priority has been claimed in the present application is incorporated herein by reference, as if fully set forth.

The invention claimed is:

1. An optically-compensatory film incorporating a polarizing plate, which comprises:

(A) a long polarizing film which has an absorption axis in parallel with a longitudinal direction;

(B) a long second phase difference film which comprises a cellulose acylate that includes a substituent having a polarizability anisotropy Da represented by following Expression (1) of 2.5' $10^{-24}$ $cm^{-3}$ or more that is an aromatic acyl group, and which has a retardation in a thickness-direction Rth of −300 to −40 nm and an in-plane retardation Re of 50 nm or less, wherein an optical axis is not included in an in-plane film, wherein the long second phase difference film consists of a single layer; and (C) a long first phase difference film which has a slow axis substantially orthogonal to a longitudinal direction, wherein the long first phase difference film is interposed between the long polarizing film and the long second phase difference film:

$$Da=ax-(ay+az)/2 \qquad \text{Expression (1)}$$

wherein, ax, ay and az are each a characteristic value obtained after diagonalization of polarizability tensor, and satisfy $ax^3$ $ay^3$ az, wherein the total substitution degree of an acyl group in the cellulose acylate film is 2.4 or more to 3.0 or less, and a substitution degree of the aromatic acyl group in the cellulose acylate film is 0.1 or more to 1.0 or less.

2. An optically-compensatory film incorporating a polarizing plate, which comprises following (A), (B) and (C), in this order:

(A) a long polarizing film which has an absorption axis in parallel with a longitudinal direction;

(B) a long second phase difference film which comprises a cellulose acylate that includes a substituent having a polarizability anisotropy Da represented by following Expression (1) of 2.5' $10^{-24}$ $cm^{-3}$ or more that is an aromatic acyl group, and which has a retardation in a thickness-direction Rth of −300 to −40 nm and an in-plane retardation Re of 50 nm or less, wherein an optical axis is not included in an in-plane film, wherein the long second phase difference film consists of a single layer; and (C) a long first phase difference film which has a slow axis substantially orthogonal to a longitudinal direction:

$$Da = ax - (ay + az)/2 \qquad \text{Expression (1)}$$

wherein, ax, ay and az are each a characteristic value obtained after diagonalization of polarizability tensor, and satisfy $ax^3$ $ay^3$ az, wherein the total substitution degree of an acyl group in the cellulose acylate film is 2.4 or more to 3.0 or less, and a substitution degree of the aromatic acyl group in the cellulose acylate film is 0.1 or more to 1.0 or less.

3. The optically-compensatory film incorporating a polarizing plate according to claim 1, wherein the long first phase difference film has Re of from 60 to 200 nm and Nz value of greater than 0.8 and less than or equal to 1.5 in which Nz value is defined by Nz=Rth/Re+0.5.

4. The optically-compensatory film incorporating a polarizing plate according to claim 1, wherein the cellulose acylate film is subjected to a stretching treatment.

5. The optically-compensatory film incorporating a polarizing plate according to claim 1, which further comprises at least one compound capable of reducing Rth in an amount from 0.01 to 30 mass % of a solid portion of the cellulose acylate.

* * * * *